(12) United States Patent
Skaaksrud

(10) Patent No.: US 12,549,925 B2
(45) Date of Patent: Feb. 10, 2026

(54) METHODS AND SYSTEMS FOR MOTION-BASED MANAGEMENT OF AN ENHANCED LOGISTICS CONTAINER

(71) Applicant: Federal Express Corporation, Memphis, TN (US)

(72) Inventor: Ole-Petter Skaaksrud, Germantown, TN (US)

(73) Assignee: Federal Express Corporation, Memphis, TN (US)

(*) Notice: Subject to any disclaimer, the term of this patent is extended or adjusted under 35 U.S.C. 154(b) by 7 days.

(21) Appl. No.: 17/367,461

(22) Filed: Jul. 5, 2021

(65) Prior Publication Data

US 2021/0337347 A1 Oct. 28, 2021

Related U.S. Application Data

(62) Division of application No. 15/433,043, filed on Feb. 15, 2017, now Pat. No. 11,096,009.
(Continued)

(51) Int. Cl.
*H04W 4/02* (2018.01)
*G06Q 10/08* (2024.01)
(Continued)

(52) U.S. Cl.
CPC .......... *H04W 4/023* (2013.01); *G06Q 10/083* (2013.01); *G06Q 10/0833* (2013.01);
(Continued)

(58) Field of Classification Search
CPC ............. G06Q 10/083; G06Q 10/0833; G06Q 10/087; G06Q 50/28; G08B 21/18;
(Continued)

(56) References Cited

U.S. PATENT DOCUMENTS 3,750,167 A 7/1973 Gehman et al.
4,750,197 A 6/1988 Denekamp et al.
(Continued)

FOREIGN PATENT DOCUMENTS

CN 1529959 A 9/2004
CN 1715951 A 1/2006
(Continued)

OTHER PUBLICATIONS

Wasner et al., "An integrated multi-depot hub-location vehicle routing model for network planning of parcel service", International journal of production economics, 2004, pp. 403-419, www.sciencedirect.com, Elsevier B.V., doi: 10.1016j.ijpe.2003.12.002.
(Continued)

*Primary Examiner* — Stephen R Burgdorf
(74) *Attorney, Agent, or Firm* — Withers & Keys, LLC

(57) ABSTRACT

Motion-based management of a logistics container uses elements of a wireless node network including a container node associated with the logistics container and equipped with a motion sensor. The motion sensor detects a motion status (e.g., moving, stationary, accelerating, decelerating) for the logistics container. The container node compares the motion status to a prior motion status, and then identifies a changed motion condition for the logistics container based upon the comparison. In response to the changed motion condition, the container node alters a broadcast profile used by the container node in communicating with other nodes in the wireless node network. The container node may be deployed as an apparatus within a logistics container, be considered together with the logistics container as a motion sensing container node apparatus, and be considered with multiple package ID nodes as a motion-based management system for the logistics container.

25 Claims, 104 Drawing Sheets

Related U.S. Application Data

(60) Provisional application No. 62/312,155, filed on Mar. 23, 2016.

(51) Int. Cl.

| | |
|---|---|
| *G06Q 10/083* | (2024.01) |
| *G06Q 10/0833* | (2023.01) |
| *G06Q 10/087* | (2023.01) |
| *G08B 21/18* | (2006.01) |
| *G08B 25/08* | (2006.01) |
| *H04L 43/16* | (2022.01) |
| *H04L 67/12* | (2022.01) |
| *H04L 67/303* | (2022.01) |
| *H04W 4/029* | (2018.01) |
| *H04W 4/80* | (2018.01) |
| *H04W 28/02* | (2009.01) |
| *H04W 36/08* | (2009.01) |
| *H04W 36/30* | (2009.01) |
| *H04W 52/32* | (2009.01) |
| *H04W 64/00* | (2009.01) |
| *H04W 76/11* | (2018.01) |
| *H04W 76/15* | (2018.01) |
| *H04W 84/18* | (2009.01) |

(52) U.S. Cl.
CPC ........... *G06Q 10/087* (2013.01); *G08B 21/18* (2013.01); *G08B 25/08* (2013.01); *H04L 43/16* (2013.01); *H04L 67/12* (2013.01); *H04L 67/303* (2013.01); *H04W 4/02* (2013.01); *H04W 4/025* (2013.01); *H04W 4/029* (2018.02); *H04W 4/80* (2018.02); *H04W 28/0252* (2013.01); *H04W 36/08* (2013.01); *H04W 36/302* (2023.05); *H04W 52/322* (2013.01); *H04W 64/006* (2013.01); *H04W 76/11* (2018.02); *H04W 76/15* (2018.02); *G06Q 10/08* (2013.01); *H04W 84/18* (2013.01)

(58) Field of Classification Search
CPC ......... G08B 25/08; H04L 43/16; H04L 67/01; H04L 67/12; H04L 67/303; H04W 4/02; H04W 4/023; H04W 4/025; H04W 4/029; H04W 4/80; H04W 28/0252; H04W 36/08; H04W 36/30; H04W 52/322; H04W 64/006; H04W 76/11; H04W 84/18
USPC ...................................................... 340/686.1
See application file for complete search history.

(56) References Cited

U.S. PATENT DOCUMENTS

| | | |
|---|---|---|
| 5,142,278 A | 8/1992 | Moallemi et al. |
| 5,154,228 A | 10/1992 | Gambertoglio et al. |
| 5,223,844 A | 6/1993 | Mansell et al. |
| 5,400,020 A | 3/1995 | Jones et al. |
| 5,400,246 A | 3/1995 | Wilson et al. |
| 5,414,432 A | 5/1995 | Penny, Jr. et al. |
| 5,430,730 A | 7/1995 | Sepulveda-Garese et al. |
| 5,491,486 A | 2/1996 | Welles, II et al. |
| 5,515,419 A | 5/1996 | Sheffer |
| 5,673,304 A | 9/1997 | Connor et al. |
| 5,686,888 A | 11/1997 | Welles et al. |
| 5,691,980 A | 11/1997 | Welles, II et al. |
| 5,799,252 A | 8/1998 | Nakagoshi et al. |
| 5,854,994 A | 12/1998 | Canada et al. |
| 5,884,216 A | 3/1999 | Shah |
| 5,907,286 A | 5/1999 | Kuma |
| 5,917,632 A | 6/1999 | Lesesky |
| 5,946,612 A | 8/1999 | Johansson |
| 5,953,650 A | 9/1999 | Villevieille |
| 5,959,577 A | 9/1999 | Fan et al. |
| 5,969,673 A | 10/1999 | Bickley et al. |
| H1815 H | 11/1999 | Campbell et al. |
| 6,011,510 A | 1/2000 | Yee et al. |
| 6,052,597 A | 4/2000 | Ekstrom |
| 6,070,793 A | 6/2000 | Reichl et al. |
| 6,085,090 A | 7/2000 | Yee et al. |
| 6,148,291 A | 11/2000 | Radican |
| 6,240,365 B1 | 5/2001 | Bunn |
| 6,255,989 B1 | 7/2001 | Munson et al. |
| 6,311,069 B1 | 10/2001 | Havinis et al. |
| 6,334,047 B1 | 12/2001 | Andersson et al. |
| 6,360,102 B1 | 3/2002 | Havinis et al. |
| 6,466,788 B1 | 10/2002 | Carlsson |
| 6,483,433 B2 | 11/2002 | Moskowitz et al. |
| 6,496,806 B1 | 12/2002 | Horwitz et al. |
| 6,505,048 B1 | 1/2003 | Moles |
| 6,526,335 B1 | 2/2003 | Treyz et al. |
| 6,574,484 B1 | 6/2003 | Carley |
| 6,611,686 B1 | 8/2003 | Smith et al. |
| 6,631,378 B1 | 10/2003 | Rosinus et al. |
| 6,662,016 B1 | 12/2003 | Buckham et al. |
| 6,674,860 B1 | 1/2004 | Pirila |
| 6,711,399 B1 | 3/2004 | Granier |
| 6,748,318 B1 | 6/2004 | Jones |
| 6,748,320 B2 | 6/2004 | Jones |
| 6,853,911 B1 | 2/2005 | Sakarya |
| 6,859,831 B1 | 2/2005 | Gelvin et al. |
| 6,901,304 B2 | 5/2005 | Swan et al. |
| 6,904,359 B2 | 6/2005 | Jones |
| 6,961,711 B1 | 11/2005 | Chee |
| 6,970,183 B1 | 11/2005 | Monroe |
| 6,972,682 B2 | 12/2005 | Lareau et al. |
| 6,982,640 B2 | 1/2006 | Lindsay et al. |
| 6,982,656 B1 | 1/2006 | Coppinger et al. |
| 6,985,750 B1 | 1/2006 | Vicknair et al. |
| 7,035,240 B1 | 4/2006 | Balakrishnan et al. |
| 7,039,164 B1 | 5/2006 | Howe |
| 7,085,629 B1 | 8/2006 | Gotou et al. |
| 7,165,102 B2 | 1/2007 | Shah et al. |
| 7,183,924 B1 | 2/2007 | Ku |
| 7,212,829 B1 | 5/2007 | Lau et al. |
| 7,221,668 B2 | 5/2007 | Twitchell, Jr. |
| 7,242,926 B1 | 7/2007 | Murakami et al. |
| 7,321,774 B1 | 1/2008 | Lau et al. |
| 7,370,079 B2 | 5/2008 | Murata et al. |
| 7,512,783 B2 | 3/2009 | Naghian et al. |
| 7,518,511 B1 | 4/2009 | Panja et al. |
| 7,529,597 B1 | 5/2009 | Hertz et al. |
| 7,539,622 B1 | 5/2009 | Harris et al. |
| 7,545,326 B2 | 6/2009 | Caliri et al. |
| 7,609,159 B2 | 10/2009 | Benson et al. |
| 7,623,033 B2 | 11/2009 | Ainsworth et al. |
| 7,653,003 B2 | 1/2010 | Stine |
| 7,737,857 B2 | 6/2010 | Ebert et al. |
| 7,788,522 B1 | 8/2010 | Abdelaziz et al. |
| 7,876,239 B2 | 1/2011 | Horstemeyer |
| 7,885,601 B2 | 2/2011 | Kawakami et al. |
| 7,969,913 B2 | 6/2011 | Park et al. |
| 7,978,631 B1 | 7/2011 | Abdelaziz et al. |
| 8,000,276 B2 | 8/2011 | Scherzer et al. |
| 8,205,788 B1 | 6/2012 | Gazdzinski et al. |
| 8,207,816 B2 | 6/2012 | Crigger et al. |
| 8,239,169 B2 | 8/2012 | Gregory et al. |
| 8,253,557 B2 | 8/2012 | Ani et al. |
| 8,299,920 B2 | 10/2012 | Hamm et al. |
| 8,311,952 B1 | 11/2012 | Lundberg et al. |
| 8,341,106 B1 | 12/2012 | Scolnicov et al. |
| 8,392,275 B2 | 3/2013 | Scipioni |
| 8,447,882 B2 | 5/2013 | Twitchell, Jr. |
| 8,471,706 B2 | 6/2013 | Schuster et al. |
| 8,555,355 B2 | 10/2013 | Rathbun |
| 8,560,274 B2 | 10/2013 | Gregory et al. |
| 8,626,193 B1 | 1/2014 | Crossno et al. |
| 8,688,101 B1 | 4/2014 | Hayes et al. |
| 8,725,165 B2 | 5/2014 | Lau et al. |
| 8,755,823 B2 | 6/2014 | Proietti et al. |

(56) References Cited

U.S. PATENT DOCUMENTS

| | | |
|---|---|---|
| 8,766,797 B2 | 7/2014 | Hamm et al. |
| 8,769,661 B2 | 7/2014 | Wang |
| 8,886,215 B1 | 11/2014 | Crossno et al. |
| 8,989,053 B1 | 3/2015 | Skaaksrud et al. |
| 8,994,514 B1 | 3/2015 | Juels et al. |
| 9,013,324 B2 | 4/2015 | Johnson et al. |
| 9,163,962 B2 | 10/2015 | Ainsworth et al. |
| 9,177,282 B2 | 11/2015 | Stevens et al. |
| 9,178,369 B2 | 11/2015 | Partovi |
| 9,182,231 B2 | 11/2015 | Skaaksrud |
| 9,182,232 B2 | 11/2015 | Skaaksrud et al. |
| 9,215,075 B1 | 12/2015 | Poltorak |
| 9,234,757 B2 | 1/2016 | Skaaksrud et al. |
| 9,247,396 B2 | 1/2016 | Alexander et al. |
| 9,256,852 B1 | 2/2016 | Myllymaki |
| 9,256,992 B2 | 2/2016 | Davidson |
| 9,260,244 B1 | 2/2016 | Cohn |
| 9,350,734 B1 | 5/2016 | Jamshidi et al. |
| 9,402,242 B2 | 7/2016 | Skaaksrud et al. |
| 9,501,920 B2 | 11/2016 | Harring et al. |
| 9,524,648 B1 | 12/2016 | Gopalakrishnan et al. |
| 9,569,944 B2 | 2/2017 | Barnes et al. |
| 9,591,607 B2 | 3/2017 | Skaaksrud |
| 9,628,502 B2 | 4/2017 | Clark et al. |
| 9,633,327 B2 | 4/2017 | Hamm et al. |
| 9,652,990 B2 | 5/2017 | Rhee |
| 9,674,812 B2 | 6/2017 | Skaaksrud et al. |
| 9,769,785 B2 | 9/2017 | Skaaksrud et al. |
| 9,769,786 B2 | 9/2017 | Skaaksrud |
| 9,775,126 B2 | 9/2017 | Skaaksrud |
| 9,786,187 B1 | 10/2017 | Bar-Zeev et al. |
| 9,788,297 B2 | 10/2017 | Skaaksrud |
| 9,811,796 B2 | 11/2017 | Ogilvie et al. |
| 9,854,556 B2 | 12/2017 | Skaaksrud et al. |
| 9,904,902 B2 | 2/2018 | Skaaksrud |
| 9,913,240 B2 | 3/2018 | Skaaksrud |
| 9,930,635 B2 | 3/2018 | Skaaksrud et al. |
| 9,949,228 B2 | 4/2018 | Skaaksrud |
| 9,958,533 B2 | 5/2018 | Manku |
| 9,973,391 B2 | 5/2018 | Skaaksrud et al. |
| 9,974,041 B2 | 5/2018 | Skaaksrud et al. |
| 9,974,042 B2 | 5/2018 | Skaaksrud |
| 9,978,035 B2 | 5/2018 | Skaaksrud et al. |
| 9,984,348 B2 | 5/2018 | Skaaksrud et al. |
| 9,984,349 B2 | 5/2018 | Skaaksrud |
| 9,984,350 B2 | 5/2018 | Skaaksrud |
| 9,985,839 B2 | 5/2018 | Skaaksrud et al. |
| 9,992,623 B2 | 6/2018 | Skaaksrud |
| 10,033,594 B2 | 7/2018 | Skaaksrud et al. |
| 10,040,628 B1 | 8/2018 | Misra et al. |
| 10,057,133 B2 | 8/2018 | Skaaksrud et al. |
| 10,057,722 B2 | 8/2018 | Skaaksrud |
| 10,074,069 B2 | 9/2018 | Skaaksrud |
| 10,078,811 B2 | 9/2018 | Skaaksrud |
| 10,102,494 B2 | 10/2018 | Skaaksrud |
| 10,149,104 B2 | 12/2018 | Skaaksrud |
| 10,157,363 B2 | 12/2018 | Skaaksrud |
| 10,187,748 B2 | 1/2019 | Skaaksrud |
| 10,229,382 B2 | 3/2019 | Skaaksrud |
| 10,271,165 B2 | 4/2019 | Skaaksrud |
| 10,271,166 B2 | 4/2019 | Skaaksrud |
| 10,305,744 B2 | 5/2019 | Skaaksrud et al. |
| 10,313,199 B2 | 6/2019 | Skaaksrud et al. |
| 10,438,162 B2 | 10/2019 | Sharma et al. |
| 10,453,023 B2 | 10/2019 | Skaaksrud |
| 10,484,820 B2 | 11/2019 | Skaaksrud |
| 10,491,479 B2 | 11/2019 | Skaaksrud et al. |
| 10,521,759 B2 | 12/2019 | Skaaksrud |
| 10,572,851 B2 | 2/2020 | Skaaksrud |
| 10,579,954 B2 | 3/2020 | Skaaksrud |
| 10,592,845 B2 | 3/2020 | Skaaksrud |
| 10,671,962 B2 | 6/2020 | Skaaksrud |
| 10,726,382 B2 | 7/2020 | Skaaksrud |
| 10,726,383 B2 | 7/2020 | Skaaksrud |
| 10,733,564 B2 | 8/2020 | Skaaksrud |
| 10,740,717 B2 | 8/2020 | Skaaksrud |
| 10,748,111 B2 | 8/2020 | Skaaksrud |
| 10,762,465 B2 | 9/2020 | Skaaksrud |
| 10,762,466 B2 | 9/2020 | Skaaksrud |
| 10,839,339 B2 | 11/2020 | Skaaksrud |
| 10,839,340 B2 | 11/2020 | Skaaksrud |
| 10,846,649 B2 | 11/2020 | Skaaksrud |
| 10,860,973 B2 | 12/2020 | Skaaksrud |
| 10,952,018 B2 | 3/2021 | Skaaksrud |
| 10,977,607 B2 | 4/2021 | Skaaksrud |
| 11,023,847 B2 | 6/2021 | Skaaksrud |
| 11,049,062 B2 | 6/2021 | Skaaksrud |
| 11,096,009 B2 | 8/2021 | Skaaksrud |
| 11,164,142 B2 | 11/2021 | Skaaksrud |
| 11,227,255 B2 | 1/2022 | Skaaksrud |
| 11,238,397 B2 | 2/2022 | Skaaksrud |
| 11,609,553 B2 | 3/2023 | Cella et al. |
| 11,720,852 B2 | 8/2023 | Skaaksrud |
| 11,734,644 B2 | 8/2023 | Skaaksrud |
| 11,843,990 B2 | 12/2023 | Skaaksrud |
| 11,843,991 B2 | 12/2023 | Skaaksrud |
| 11,847,607 B2 | 12/2023 | Skaaksrud |
| 12,014,318 B2 | 6/2024 | Skaaksrud |
| 12,165,099 B2 | 12/2024 | Skaaksrud |
| 2001/0022615 A1 | 9/2001 | Fernandez et al. |
| 2001/0050615 A1 | 12/2001 | Kucharczyk et al. |
| 2001/0056544 A1 | 12/2001 | Walker |
| 2002/0000916 A1 | 1/2002 | Richards |
| 2002/0062388 A1 | 5/2002 | Ogier et al. |
| 2002/0080063 A1 | 6/2002 | Bloebaum et al. |
| 2002/0084889 A1 | 7/2002 | Bolavage et al. |
| 2002/0087375 A1 | 7/2002 | Griffin et al. |
| 2002/0090063 A1 | 7/2002 | Bach |
| 2002/0103653 A1 | 8/2002 | Huxter |
| 2002/0103724 A1 | 8/2002 | Huxter |
| 2002/0113703 A1 | 8/2002 | Moskowitz et al. |
| 2002/0143670 A1 | 10/2002 | Cushing et al. |
| 2002/0156645 A1 | 10/2002 | Hansen |
| 2002/0163912 A1 | 11/2002 | Carlson |
| 2002/0178966 A1 | 12/2002 | Forbes |
| 2002/0184497 A1 | 12/2002 | Gage et al. |
| 2002/0194495 A1 | 12/2002 | Gladstone et al. |
| 2002/0198937 A1 | 12/2002 | Diwan et al. |
| 2003/0018478 A1 | 1/2003 | Mays |
| 2003/0030568 A1 | 2/2003 | Lastinger et al. |
| 2003/0043073 A1 | 3/2003 | Gray et al. |
| 2003/0050874 A1 | 3/2003 | Sesek et al. |
| 2003/0052778 A1 | 3/2003 | Wong |
| 2003/0052786 A1 | 3/2003 | Dickinson |
| 2003/0125963 A1 | 7/2003 | Haken |
| 2003/0144971 A1 | 7/2003 | Das et al. |
| 2003/0149599 A1 | 8/2003 | Goodall et al. |
| 2003/0149674 A1 | 8/2003 | Good et al. |
| 2003/0149794 A1 | 8/2003 | Morris et al. |
| 2003/0179073 A1 | 9/2003 | Ghazarian |
| 2003/0184475 A1 | 10/2003 | Williams et al. |
| 2003/0220711 A1 | 11/2003 | Allen |
| 2003/0231112 A1 | 12/2003 | Raju |
| 2004/0002352 A1 | 1/2004 | Sendonariz |
| 2004/0049451 A1 | 3/2004 | Berardi et al. |
| 2004/0100379 A1 | 5/2004 | Boman et al. |
| 2004/0108938 A1 | 6/2004 | Entrekin |
| 2004/0143428 A1 | 7/2004 | Rappaport et al. |
| 2004/0143654 A1 | 7/2004 | Poirot et al. |
| 2004/0174259 A1 | 9/2004 | Peel et al. |
| 2004/0198392 A1 | 10/2004 | Harvey et al. |
| 2004/0215532 A1 | 10/2004 | Boman et al. |
| 2004/0225916 A1 | 11/2004 | Clark |
| 2004/0233055 A1 | 11/2004 | Canich et al. |
| 2004/0233065 A1 | 11/2004 | Freeman |
| 2004/0236635 A1 | 11/2004 | Publicover |
| 2004/0246130 A1 | 12/2004 | Lambright et al. |
| 2004/0253923 A1 | 12/2004 | Braley et al. |
| 2005/0006452 A1 | 1/2005 | Aupperle et al. |
| 2005/0013245 A1 | 1/2005 | Sreemanthula et al. |
| 2005/0015624 A1 | 1/2005 | Ginter et al. |
| 2005/0043594 A1 | 2/2005 | Dinsmoor et al. |
| 2005/0049821 A1 | 3/2005 | Sahinoglu |
| 2005/0052290 A1 | 3/2005 | Naden et al. |

(56) References Cited

U.S. PATENT DOCUMENTS

| | | |
|---|---|---|
| 2005/0068178 A1 | 3/2005 | Lee et al. |
| 2005/0088284 A1 | 4/2005 | Zai et al. |
| 2005/0141465 A1 | 6/2005 | Kato et al. |
| 2005/0154685 A1 | 7/2005 | Mundy et al. |
| 2005/0179545 A1 | 8/2005 | Bergman et al. |
| 2005/0192741 A1 | 9/2005 | Nichols et al. |
| 2005/0205719 A1 | 9/2005 | Hendrickson et al. |
| 2005/0208959 A1 | 9/2005 | Chen et al. |
| 2005/0222853 A1 | 10/2005 | Black et al. |
| 2005/0232747 A1* | 10/2005 | Brackmann ............... B60P 3/14 414/803 |
| 2005/0236479 A1 | 10/2005 | Schmidtberg et al. |
| 2005/0250440 A1 | 11/2005 | Zhou et al. |
| 2005/0251330 A1 | 11/2005 | Waterhouse et al. |
| 2005/0285740 A1 | 12/2005 | Kubach et al. |
| 2006/0006987 A1 | 1/2006 | Hashimoto et al. |
| 2006/0011721 A1 | 1/2006 | Olsen, III et al. |
| 2006/0012476 A1 | 1/2006 | Markhavsky et al. |
| 2006/0018274 A1 | 1/2006 | Twitchell, Jr. |
| 2006/0018275 A1 | 1/2006 | Park |
| 2006/0022801 A1 | 2/2006 | Husak et al. |
| 2006/0023679 A1 | 2/2006 | Twitchell |
| 2006/0036722 A1 | 2/2006 | Larkin et al. |
| 2006/0054705 A1 | 3/2006 | Garton et al. |
| 2006/0055508 A1 | 3/2006 | Kumar et al. |
| 2006/0061476 A1 | 3/2006 | Patil et al. |
| 2006/0168644 A1 | 7/2006 | Richter et al. |
| 2006/0171332 A1 | 8/2006 | Barnum |
| 2006/0173749 A1 | 8/2006 | Ward et al. |
| 2006/0187032 A1 | 8/2006 | Kunkel et al. |
| 2006/0192652 A1 | 8/2006 | Mandava et al. |
| 2006/0200560 A1 | 9/2006 | Waugh et al. |
| 2006/0206246 A1 | 9/2006 | Walker |
| 2006/0208885 A1 | 9/2006 | Lin |
| 2006/0208899 A1 | 9/2006 | Suzuki et al. |
| 2006/0220840 A1 | 10/2006 | Culpepper et al. |
| 2006/0229895 A1 | 10/2006 | Kodger, Jr. |
| 2006/0244624 A1 | 11/2006 | Wang et al. |
| 2006/0250249 A1 | 11/2006 | Cheng |
| 2006/0253590 A1 | 11/2006 | Nagy et al. |
| 2006/0259377 A1 | 11/2006 | Fedor et al. |
| 2006/0261935 A1 | 11/2006 | McAden |
| 2006/0261946 A1 | 11/2006 | Himberger et al. |
| 2007/0002139 A1 | 1/2007 | Benson et al. |
| 2007/0005452 A1 | 1/2007 | Klingenberg et al. |
| 2007/0013481 A1 | 1/2007 | Zhu et al. |
| 2007/0021124 A1 | 1/2007 | Niu et al. |
| 2007/0030151 A1 | 2/2007 | Marrow |
| 2007/0040647 A1* | 2/2007 | Saenz ..................... H04W 4/40 340/3.1 |
| 2007/0050313 A1 | 3/2007 | Park et al. |
| 2007/0060050 A1 | 3/2007 | Lee et al. |
| 2007/0060212 A1 | 3/2007 | Shah |
| 2007/0075833 A1 | 4/2007 | Hunt et al. |
| 2007/0075861 A1 | 4/2007 | Cook et al. |
| 2007/0091821 A1 | 4/2007 | Seo et al. |
| 2007/0095904 A1 | 5/2007 | Barta et al. |
| 2007/0096881 A1 | 5/2007 | Pillai |
| 2007/0103303 A1 | 5/2007 | Shoarinejad |
| 2007/0110010 A1 | 5/2007 | Kotola et al. |
| 2007/0130463 A1 | 6/2007 | Law et al. |
| 2007/0138268 A1 | 6/2007 | Tuchman et al. |
| 2007/0151883 A1 | 7/2007 | Smith et al. |
| 2007/0159301 A1 | 7/2007 | Hirt et al. |
| 2007/0171997 A1 | 7/2007 | Weissman et al. |
| 2007/0174136 A1 | 7/2007 | Kwak |
| 2007/0178908 A1 | 8/2007 | Doyle |
| 2007/0202886 A1 | 8/2007 | Dhebri et al. |
| 2007/0238417 A1 | 10/2007 | Bennett |
| 2007/0244817 A1 | 10/2007 | Dolivo et al. |
| 2007/0247276 A1 | 10/2007 | Murchison et al. |
| 2007/0279222 A1 | 12/2007 | Carrigan |
| 2007/0279225 A1 | 12/2007 | Pellerano et al. |
| 2007/0290836 A1 | 12/2007 | Ainsworth et al. |
| 2008/0004967 A1 | 1/2008 | Gillen |
| 2008/0004994 A1 | 1/2008 | Ainsworth et al. |
| 2008/0010878 A1 | 1/2008 | Hansen et al. |
| 2008/0015884 A1 | 1/2008 | Jamula |
| 2008/0016537 A1 | 1/2008 | Little et al. |
| 2008/0021731 A1 | 1/2008 | Rodgers |
| 2008/0040242 A1 | 2/2008 | Chang et al. |
| 2008/0040243 A1 | 2/2008 | Chang et al. |
| 2008/0040244 A1 | 2/2008 | Ricciuti et al. |
| 2008/0055068 A1 | 3/2008 | Van Wageningen et al. |
| 2008/0056162 A1 | 3/2008 | Lal |
| 2008/0061963 A1 | 3/2008 | Schnitz et al. |
| 2008/0061966 A1 | 3/2008 | Nelson |
| 2008/0062883 A1 | 3/2008 | Shima |
| 2008/0062904 A1 | 3/2008 | Tzu-Ming |
| 2008/0089296 A1 | 4/2008 | Kazmi et al. |
| 2008/0098467 A1 | 4/2008 | Miller et al. |
| 2008/0112378 A1 | 5/2008 | Twitchell |
| 2008/0123665 A1 | 5/2008 | Zeng et al. |
| 2008/0130536 A1 | 6/2008 | Twitchell |
| 2008/0151793 A1 | 6/2008 | Wright |
| 2008/0167897 A1 | 7/2008 | Arroyo et al. |
| 2008/0180935 A1 | 7/2008 | Burdeen et al. |
| 2008/0186183 A1 | 8/2008 | Nagai et al. |
| 2008/0189161 A1 | 8/2008 | Daily et al. |
| 2008/0191877 A1 | 8/2008 | Ferguson et al. |
| 2008/0209026 A1 | 8/2008 | Qi et al. |
| 2008/0224831 A1 | 9/2008 | Arai et al. |
| 2008/0250141 A1 | 10/2008 | McCall et al. |
| 2008/0252414 A1 | 10/2008 | Crigger et al. |
| 2008/0255748 A1 | 10/2008 | Kumazaki et al. |
| 2008/0255758 A1 | 10/2008 | Graham et al. |
| 2008/0255863 A1 | 10/2008 | Mack et al. |
| 2008/0257656 A1 | 10/2008 | Skinner et al. |
| 2008/0267150 A1 | 10/2008 | Rofougaran |
| 2008/0300985 A1 | 12/2008 | Shamp et al. |
| 2008/0303638 A1 | 12/2008 | Nguyen et al. |
| 2009/0009340 A1 | 1/2009 | Weaver et al. |
| 2009/0018768 A1 | 1/2009 | Jo et al. |
| 2009/0026263 A1 | 1/2009 | Schmid et al. |
| 2009/0034419 A1 | 2/2009 | Flammer, III et al. |
| 2009/0037196 A1 | 2/2009 | Chang et al. |
| 2009/0058635 A1 | 3/2009 | LaLonde et al. |
| 2009/0070861 A1 | 3/2009 | Jain |
| 2009/0084836 A1 | 4/2009 | Dudley |
| 2009/0091144 A1 | 4/2009 | Debrody et al. |
| 2009/0115600 A1 | 5/2009 | Lee et al. |
| 2009/0123665 A1 | 5/2009 | Zaima |
| 2009/0157420 A1 | 6/2009 | Lou et al. |
| 2009/0201850 A1 | 8/2009 | Davis et al. |
| 2009/0251295 A1 | 10/2009 | Norair et al. |
| 2009/0252130 A1 | 10/2009 | Sheth et al. |
| 2009/0252134 A1 | 10/2009 | Schlicht et al. |
| 2009/0254426 A1 | 10/2009 | Rodriguez et al. |
| 2009/0261975 A1 | 10/2009 | Ferguson et al. |
| 2009/0267770 A1 | 10/2009 | Twitchell, Jr. |
| 2009/0281825 A1 | 11/2009 | Larsen |
| 2009/0287587 A1 | 11/2009 | Bloebaum et al. |
| 2009/0287827 A1 | 11/2009 | Horn et al. |
| 2009/0295537 A1 | 12/2009 | Lane et al. |
| 2009/0296704 A1 | 12/2009 | Kim et al. |
| 2009/0319078 A1 | 12/2009 | Jackson |
| 2009/0322510 A1* | 12/2009 | Berger ................. H04W 60/00 340/568.1 |
| 2009/0322551 A1 | 12/2009 | Kanagala et al. |
| 2009/0322890 A1 | 12/2009 | Bocking et al. |
| 2009/0327333 A1 | 12/2009 | Diener et al. |
| 2009/0327391 A1 | 12/2009 | Park et al. |
| 2010/0013635 A1 | 1/2010 | Berger et al. |
| 2010/0022190 A1 | 1/2010 | Laroia et al. |
| 2010/0029232 A1 | 2/2010 | Kursawe et al. |
| 2010/0036674 A1 | 2/2010 | Johnson |
| 2010/0039284 A1 | 2/2010 | Hall et al. |
| 2010/0060452 A1 | 3/2010 | Schuster et al. |
| 2010/0063847 A1 | 3/2010 | Eisenberg et al. |
| 2010/0063889 A1 | 3/2010 | Proctor, Jr. et al. |
| 2010/0067420 A1* | 3/2010 | Twitchell, Jr. ......... H04W 4/029 370/311 |
| 2010/0076902 A1 | 3/2010 | Kraft |
| 2010/0091703 A1 | 4/2010 | Morimoto |

(56) References Cited

U.S. PATENT DOCUMENTS

| | | |
|---|---|---|
| 2010/0091818 A1 | 4/2010 | Sen et al. |
| 2010/0102964 A1 | 4/2010 | Steer |
| 2010/0105406 A1 | 4/2010 | Luo et al. |
| 2010/0117820 A1 | 5/2010 | Mitschele |
| 2010/0134301 A1 | 6/2010 | Borth et al. |
| 2010/0135178 A1 | 6/2010 | Aggarwal et al. |
| 2010/0141445 A1 | 6/2010 | Venkatasubramaniyam et al. |
| 2010/0142448 A1 | 6/2010 | Schlicht et al. |
| 2010/0151885 A1 | 6/2010 | Buford et al. |
| 2010/0156651 A1 | 6/2010 | Broer |
| 2010/0157838 A1 | 6/2010 | Vaswani et al. |
| 2010/0195507 A1 | 8/2010 | Marinier et al. |
| 2010/0202346 A1 | 8/2010 | Sitzes et al. |
| 2010/0214074 A1 | 8/2010 | Twitchell, Jr. |
| 2010/0214960 A1 | 8/2010 | Bahr et al. |
| 2010/0216432 A1 | 8/2010 | Wu |
| 2010/0223127 A1 | 9/2010 | Bettez et al. |
| 2010/0228602 A1 | 9/2010 | Gilvar et al. |
| 2010/0228917 A1 | 9/2010 | Ikeuchi et al. |
| 2010/0250460 A1 | 9/2010 | Twitchell, Jr. |
| 2010/0253519 A1 | 10/2010 | Brackmann et al. |
| 2010/0254327 A1 | 10/2010 | McBeath et al. |
| 2010/0267375 A1 | 10/2010 | Lemmon et al. |
| 2010/0274604 A1 | 10/2010 | Crilly |
| 2010/0281150 A1 | 11/2010 | Sailhan et al. |
| 2010/0295665 A1 | 11/2010 | Landau et al. |
| 2010/0299640 A1 | 11/2010 | Titus |
| 2010/0308967 A1 | 12/2010 | Lauronen |
| 2010/0315197 A1 | 12/2010 | Solomon et al. |
| 2010/0317289 A1 | 12/2010 | Desai et al. |
| 2010/0326146 A1 | 12/2010 | Powers et al. |
| 2011/0005282 A1 | 1/2011 | Powers et al. |
| 2011/0009075 A1 | 1/2011 | Jantunen et al. |
| 2011/0018707 A1 | 1/2011 | Dobson et al. |
| 2011/0022533 A1 | 1/2011 | Lau et al. |
| 2011/0050424 A1 | 3/2011 | Cova et al. |
| 2011/0068906 A1 | 3/2011 | Shafer et al. |
| 2011/0074587 A1 | 3/2011 | Hamm et al. |
| 2011/0077909 A1 | 3/2011 | Gregory et al. |
| 2011/0078089 A1 | 3/2011 | Hamm et al. |
| 2011/0106954 A1 | 5/2011 | Chatterjee et al. |
| 2011/0112858 A1 | 5/2011 | Neal |
| 2011/0119360 A1 | 5/2011 | Kish et al. |
| 2011/0134797 A1 | 6/2011 | Banks et al. |
| 2011/0137775 A1 | 6/2011 | Killian et al. |
| 2011/0153190 A1 | 6/2011 | Rolinski et al. |
| 2011/0153818 A1 | 6/2011 | Vandwalle et al. |
| 2011/0195701 A1 | 8/2011 | Cook et al. |
| 2011/0221568 A1 | 9/2011 | Giobbi |
| 2011/0228696 A1 | 9/2011 | Agarwal et al. |
| 2011/0238235 A1 | 9/2011 | Xia et al. |
| 2011/0238843 A1 | 9/2011 | Pan et al. |
| 2011/0255444 A1 | 10/2011 | Soliman et al. |
| 2011/0258058 A1 | 10/2011 | Carroll et al. |
| 2011/0273294 A1 | 11/2011 | Harwell |
| 2011/0273852 A1 | 11/2011 | Debrody et al. |
| 2011/0279245 A1 | 11/2011 | Hynes et al. |
| 2011/0295411 A1 | 12/2011 | Rotella et al. |
| 2011/0299469 A1 | 12/2011 | Kang et al. |
| 2011/0302014 A1 | 12/2011 | Proctor, Jr. et al. |
| 2011/0316674 A1 | 12/2011 | Joy et al. |
| 2011/0316716 A1 | 12/2011 | MacKay et al. |
| 2012/0014309 A1 | 1/2012 | Tizuka et al. |
| 2012/0017008 A1 | 1/2012 | Twitchell, Jr. |
| 2012/0022907 A1 | 1/2012 | Fidler |
| 2012/0034906 A1 | 2/2012 | Ueno et al. |
| 2012/0036198 A1 | 2/2012 | Marzencki et al. |
| 2012/0036250 A1 | 2/2012 | Vaswani et al. |
| 2012/0127318 A1 | 5/2012 | Song et al. |
| 2012/0158606 A1 | 6/2012 | Moudy |
| 2012/0187916 A1 | 7/2012 | Duer et al. |
| 2012/0190379 A1 | 7/2012 | Hassan et al. |
| 2012/0197810 A1 | 8/2012 | Haarmann et al. |
| 2012/0201251 A1 | 8/2012 | Kim et al. |
| 2012/0202491 A1 | 8/2012 | Fox et al. |
| 2012/0209730 A1 | 8/2012 | Garrett |
| 2012/0216252 A1 | 8/2012 | Skaaksrud et al. |
| 2012/0225639 A1 | 9/2012 | Gazdzinski |
| 2012/0233326 A1 | 9/2012 | Shaffer et al. |
| 2012/0235791 A1 | 9/2012 | Donlan et al. |
| 2012/0252418 A1 | 10/2012 | Kandekar et al. |
| 2012/0252488 A1 | 10/2012 | Hartmann et al. |
| 2012/0253587 A1 | 10/2012 | Davidson |
| 2012/0258669 A1 | 10/2012 | Honkanen et al. |
| 2012/0262277 A1 | 10/2012 | Oliveira |
| 2012/0262307 A1* | 10/2012 | Poon ..................... G06Q 10/08 340/984 |
| 2012/0271646 A1 | 10/2012 | Feldman et al. |
| 2012/0279304 A1* | 11/2012 | Lee ..................... G01P 15/0891 73/514.16 |
| 2012/0299721 A1 | 11/2012 | Jones |
| 2012/0307725 A1 | 12/2012 | Yamada et al. |
| 2012/0310854 A1 | 12/2012 | Cova et al. |
| 2012/0312250 A1 | 12/2012 | Jesurum |
| 2012/0317297 A1 | 12/2012 | Bailey |
| 2012/0320790 A1 | 12/2012 | Shaffer et al. |
| 2012/0326847 A1 | 12/2012 | Strauman |
| 2013/0002443 A1 | 1/2013 | Breed et al. |
| 2013/0003591 A1 | 1/2013 | Novak et al. |
| 2013/0016636 A1 | 1/2013 | Berger et al. |
| 2013/0023339 A1 | 1/2013 | Davis et al. |
| 2013/0039201 A1 | 2/2013 | Kwon et al. |
| 2013/0047233 A1 | 2/2013 | Fisk et al. |
| 2013/0056533 A1 | 3/2013 | Zimberoff et al. |
| 2013/0057388 A1 | 3/2013 | Attanasio |
| 2013/0069782 A1 | 3/2013 | Duggal et al. |
| 2013/0070636 A1 | 3/2013 | Farley et al. |
| 2013/0072223 A1 | 3/2013 | Berenberg et al. |
| 2013/0085968 A1 | 4/2013 | Schultz et al. |
| 2013/0094346 A1 | 4/2013 | Beser |
| 2013/0106608 A1 | 5/2013 | Griesmann et al. |
| 2013/0106893 A1 | 5/2013 | Davis et al. |
| 2013/0114580 A1 | 5/2013 | Saitou et al. |
| 2013/0127620 A1 | 5/2013 | Siebers et al. |
| 2013/0128894 A1 | 5/2013 | Shah et al. |
| 2013/0141219 A1 | 6/2013 | Karabinis |
| 2013/0165149 A1 | 6/2013 | Wilson et al. |
| 2013/0166246 A1 | 6/2013 | Rousu et al. |
| 2013/0170335 A1 | 7/2013 | Pace et al. |
| 2013/0174282 A1 | 7/2013 | Cui et al. |
| 2013/0201316 A1 | 8/2013 | Binder et al. |
| 2013/0201957 A1 | 8/2013 | Van Phan et al. |
| 2013/0214906 A1 | 8/2013 | Wojak |
| 2013/0214909 A1 | 8/2013 | Meijers et al. |
| 2013/0217332 A1 | 8/2013 | Altman et al. |
| 2013/0217333 A1 | 8/2013 | Sprigg et al. |
| 2013/0225087 A1 | 8/2013 | Uhm |
| 2013/0230009 A1 | 9/2013 | Lee et al. |
| 2013/0241712 A1 | 9/2013 | Motley et al. |
| 2013/0245973 A1 | 9/2013 | Ross et al. |
| 2013/0262336 A1 | 10/2013 | Wan et al. |
| 2013/0271280 A1 | 10/2013 | Alnafisah |
| 2013/0273938 A1 | 10/2013 | Ng et al. |
| 2013/0288668 A1 | 10/2013 | Pragada et al. |
| 2013/0298652 A1 | 11/2013 | Gillette, II |
| 2013/0303085 A1 | 11/2013 | Boucher et al. |
| 2013/0324147 A1 | 12/2013 | Ong et al. |
| 2013/0324164 A1 | 12/2013 | Vulcano |
| 2013/0335193 A1 | 12/2013 | Hanson et al. |
| 2013/0335231 A1 | 12/2013 | Caldwell et al. |
| 2013/0346135 A1 | 12/2013 | Siemens et al. |
| 2014/0006206 A1 | 1/2014 | Scrivner |
| 2014/0006943 A1 | 1/2014 | Robbins et al. |
| 2014/0006964 A1 | 1/2014 | Pan |
| 2014/0016458 A1 | 1/2014 | Moritomo |
| 2014/0018001 A1 | 1/2014 | Nakra et al. |
| 2014/0023363 A1 | 1/2014 | Apte et al. |
| 2014/0025746 A1 | 1/2014 | Rhee et al. |
| 2014/0026158 A1 | 1/2014 | Rowe et al. |
| 2014/0052832 A1 | 2/2014 | Dina et al. |
| 2014/0059218 A1 | 2/2014 | Ganu et al. |
| 2014/0066089 A1 | 3/2014 | Monks et al. |
| 2014/0067609 A1 | 3/2014 | Heger |
| 2014/0073262 A1 | 3/2014 | Gutierrez et al. |

(56) References Cited

U.S. PATENT DOCUMENTS

| | | |
|---|---|---|
| 2014/0074743 A1 | 3/2014 | Rademaker |
| 2014/0089243 A1 | 3/2014 | Oppenheimer |
| 2014/0094137 A1 | 4/2014 | Gregory |
| 2014/0096215 A1 | 4/2014 | Hessler |
| 2014/0099916 A1 | 4/2014 | Mallikarjunan et al. |
| 2014/0112199 A1 | 4/2014 | Beser |
| 2014/0116569 A1 | 5/2014 | Clark et al. |
| 2014/0120910 A1 | 5/2014 | Batada et al. |
| 2014/0122255 A1 | 5/2014 | Snyder |
| 2014/0129109 A1 | 5/2014 | Meyer et al. |
| 2014/0133656 A1 | 5/2014 | Wurster et al. |
| 2014/0136594 A1 | 5/2014 | Belmonte |
| 2014/0150630 A1 | 6/2014 | Juszkiewicz |
| 2014/0155019 A1 | 6/2014 | Schwartz et al. |
| 2014/0155116 A1 | 6/2014 | Dakshinamurthy et al. |
| 2014/0162702 A1 | 6/2014 | Crawford et al. |
| 2014/0180511 A1 | 6/2014 | Daum |
| 2014/0180959 A1 | 6/2014 | Gillen et al. |
| 2014/0184386 A1 | 7/2014 | Regler et al. |
| 2014/0196140 A1 | 7/2014 | Gong |
| 2014/0211691 A1 | 7/2014 | Emadzadeh et al. |
| 2014/0213176 A1 | 7/2014 | Mendelson |
| 2014/0219091 A1 | 8/2014 | Hellhake et al. |
| 2014/0222298 A1 | 8/2014 | Gurin |
| 2014/0222711 A1 | 8/2014 | Tibbs et al. |
| 2014/0226559 A1 | 8/2014 | Jactat et al. |
| 2014/0229375 A1 | 8/2014 | Zaytzsev et al. |
| 2014/0229399 A1 | 8/2014 | Ranganathan et al. |
| 2014/0244834 A1 | 8/2014 | Guedalia et al. |
| 2014/0253297 A1 | 9/2014 | Kawaguchi et al. |
| 2014/0254466 A1 | 9/2014 | Wurster et al. |
| 2014/0257748 A1 | 9/2014 | Lundquist et al. |
| 2014/0257877 A1 | 9/2014 | L'Heureux et al. |
| 2014/0257889 A1 | 9/2014 | Ashley, Jr. et al. |
| 2014/0258168 A1 | 9/2014 | Crawford |
| 2014/0277691 A1 | 9/2014 | Jacobus et al. |
| 2014/0279596 A1 | 9/2014 | Waris et al. |
| 2014/0279648 A1 | 9/2014 | Whitehouse |
| 2014/0294821 A1 | 10/2014 | Dumont et al. |
| 2014/0302774 A1 | 10/2014 | Burke et al. |
| 2014/0304399 A1 | 10/2014 | Chaudhary et al. |
| 2014/0316616 A1 | 10/2014 | Kugelmass |
| 2014/0324527 A1 | 10/2014 | Kulkarni et al. |
| 2014/0330603 A1 | 11/2014 | Corder et al. |
| 2014/0335901 A1 | 11/2014 | Lacasse et al. |
| 2014/0341042 A1 | 11/2014 | Racz et al. |
| 2014/0341043 A1 | 11/2014 | Prydekker et al. |
| 2014/0341227 A1 | 11/2014 | Redi et al. |
| 2014/0351163 A1 | 11/2014 | Tussy |
| 2014/0355503 A1 | 12/2014 | Kainulainen et al. |
| 2014/0379529 A1 | 12/2014 | Agasti et al. |
| 2015/0006005 A1 | 1/2015 | Yu et al. |
| 2015/0012457 A1 | 1/2015 | Gonzalez et al. |
| 2015/0019391 A1 | 1/2015 | Kumar et al. |
| 2015/0039347 A1 | 2/2015 | Sharma |
| 2015/0043428 A1 | 2/2015 | Erdmann et al. |
| 2015/0043528 A1 | 2/2015 | Salkintzis |
| 2015/0045983 A1 | 2/2015 | Fraser et al. |
| 2015/0054621 A1 | 2/2015 | Lin et al. |
| 2015/0057497 A1 | 2/2015 | Chiba et al. |
| 2015/0088731 A1 | 3/2015 | Ackerman |
| 2015/0095255 A1 | 4/2015 | Hall et al. |
| 2015/0102903 A1 | 4/2015 | Wilkinson |
| 2015/0106291 A1 | 4/2015 | Robinson et al. |
| 2015/0120045 A1 | 4/2015 | Tan et al. |
| 2015/0120094 A1 | 4/2015 | Kimchi et al. |
| 2015/0120601 A1 | 4/2015 | Fee |
| 2015/0120602 A1 | 4/2015 | Huffman et al. |
| 2015/0131479 A1 | 5/2015 | Fukui |
| 2015/0135305 A1 | 5/2015 | Cabrera et al. |
| 2015/0139124 A1 | 5/2015 | Da et al. |
| 2015/0140933 A1 | 5/2015 | Muller et al. |
| 2015/0146655 A1 | 5/2015 | Hui et al. |
| 2015/0148140 A1 | 5/2015 | Morehouse et al. |
| 2015/0153175 A1 | 6/2015 | Skaaksrud |
| 2015/0154041 A1 | 6/2015 | Provis et al. |
| 2015/0154431 A1 | 6/2015 | Skaaksrud et al. |
| 2015/0154531 A1 | 6/2015 | Skaaksrud |
| 2015/0154532 A1 | 6/2015 | Skaaksrud |
| 2015/0154536 A1 | 6/2015 | Skaaksrud et al. |
| 2015/0154538 A1 | 6/2015 | Skaaksrud |
| 2015/0154539 A1 | 6/2015 | Skaaksrud et al. |
| 2015/0154540 A1 | 6/2015 | Skaaksrud |
| 2015/0154541 A1 | 6/2015 | Skaaksrud |
| 2015/0156066 A1 | 6/2015 | Skaaksrud |
| 2015/0156100 A1 | 6/2015 | Skaaksrud |
| 2015/0172202 A1 | 6/2015 | Xealey et al. |
| 2015/0186085 A1 | 7/2015 | Ito et al. |
| 2015/0193731 A1 | 7/2015 | Stevens et al. |
| 2015/0208230 A1 | 7/2015 | Kazmi et al. |
| 2015/0222517 A1 | 8/2015 | McLaughlin et al. |
| 2015/0245179 A1 | 8/2015 | Jarvis et al. |
| 2015/0248801 A1 | 9/2015 | Froitzheim et al. |
| 2015/0262123 A1 | 9/2015 | Sharma et al. |
| 2015/0282232 A1 | 10/2015 | Yamazaki |
| 2015/0301511 A1 | 10/2015 | Zhang |
| 2015/0310381 A1 | 10/2015 | Lyman et al. |
| 2015/0324745 A1 | 11/2015 | Goodall et al. |
| 2015/0325103 A1 | 11/2015 | Ngyuen et al. |
| 2015/0334123 A1 | 11/2015 | Di Pietro et al. |
| 2015/0347959 A1 | 12/2015 | Skaaksrud |
| 2015/0349917 A1 | 12/2015 | Skaaksrud |
| 2015/0351109 A1 | 12/2015 | Naim et al. |
| 2015/0358837 A1 | 12/2015 | Iwai |
| 2015/0379796 A1 | 12/2015 | Glasgow et al. |
| 2016/0019775 A1 | 1/2016 | Fokkelman |
| 2016/0029376 A1 | 1/2016 | Fukuta et al. |
| 2016/0044566 A1 | 2/2016 | Nammi et al. |
| 2016/0048796 A1 | 2/2016 | Todasco |
| 2016/0066012 A1 | 3/2016 | Friedlander et al. |
| 2016/0092704 A1 | 3/2016 | Russell |
| 2016/0094910 A1 | 3/2016 | Vallabhan et al. |
| 2016/0094940 A1 | 3/2016 | Vigier et al. |
| 2016/0098678 A1 | 4/2016 | Levy |
| 2016/0127985 A1 | 5/2016 | Kayargadde et al. |
| 2016/0148440 A1 | 5/2016 | Kwak |
| 2016/0150470 A1 | 5/2016 | Fujishiro |
| 2016/0171439 A1 | 6/2016 | Ladden et al. |
| 2016/0183183 A1 | 6/2016 | Zhang et al. |
| 2016/0224929 A1 | 8/2016 | Blanchard et al. |
| 2016/0241910 A1 | 8/2016 | Rowe |
| 2016/0260059 A1 | 9/2016 | Benjamin et al. |
| 2016/0292636 A1 | 10/2016 | Moody et al. |
| 2016/0327956 A1 | 11/2016 | Zhang et al. |
| 2016/0338123 A1 | 11/2016 | Yang |
| 2016/0339827 A1 | 11/2016 | Dexter |
| 2017/0012719 A1 | 1/2017 | Skaaksrud et al. |
| 2017/0012720 A1 | 1/2017 | Skaaksrud et al. |
| 2017/0012812 A1 | 1/2017 | Gotoh et al. |
| 2017/0012813 A1 | 1/2017 | Skaaksrud et al. |
| 2017/0012829 A1 | 1/2017 | Skaaksrud et al. |
| 2017/0012830 A1 | 1/2017 | Skaaksrud et al. |
| 2017/0013487 A1 | 1/2017 | Skaaksrud et al. |
| 2017/0013547 A1 | 1/2017 | Skaaksrud et al. |
| 2017/0019833 A1 | 1/2017 | Luo et al. |
| 2017/0061171 A1 | 3/2017 | Lombardi et al. |
| 2017/0070847 A1 | 3/2017 | Altman et al. |
| 2017/0090794 A1 | 3/2017 | Huang |
| 2017/0164319 A1 | 6/2017 | Skaaksrud et al. |
| 2017/0193443 A1 | 7/2017 | Barcala et al. |
| 2017/0251507 A1 | 8/2017 | Fodor et al. |
| 2017/0278061 A1 | 9/2017 | Skaaksrud |
| 2017/0278374 A1 | 9/2017 | Skaaksrud |
| 2017/0279892 A1 | 9/2017 | Skaaksrud |
| 2017/0280289 A1 | 9/2017 | Skaaksrud |
| 2017/0280347 A1 | 9/2017 | Skaaksrud |
| 2017/0280351 A1 | 9/2017 | Skaaksrud |
| 2017/0318011 A1 | 11/2017 | Yoo et al. |
| 2018/0090992 A1 | 3/2018 | Shrivastava et al. |
| 2018/0144300 A1 | 5/2018 | Wiechers |
| 2018/0218185 A1 | 8/2018 | High et al. |
| 2018/0324139 A1 | 11/2018 | Yamamoto |

(56) References Cited

U.S. PATENT DOCUMENTS

| | | | |
|---|---|---|---|
| 2019/0263219 A1 | 8/2019 | Spath | |
| 2020/0336925 A1 | 10/2020 | Stamatakis | |
| 2023/0059493 A1 | 2/2023 | Schmidt et al. | |

FOREIGN PATENT DOCUMENTS

| | | |
|---|---|---|
| CN | 1864365 A | 11/2006 |
| CN | 1871133 A | 11/2006 |
| CN | 101077016 A | 11/2007 |
| CN | 101160598 A | 4/2008 |
| CN | 101191832 A | 6/2008 |
| CN | 101309165 A | 11/2008 |
| CN | 101344814 A | 1/2009 |
| CN | 101461271 A | 6/2009 |
| CN | 101477188 A | 7/2009 |
| CN | 101594570 A | 12/2009 |
| CN | 101604396 A | 12/2009 |
| CN | 101609138 A | 12/2009 |
| CN | 101661590 A | 3/2010 |
| CN | 101663679 A | 3/2010 |
| CN | 101819609 A | 9/2010 |
| CN | 101883381 A | 11/2010 |
| CN | 101904200 A | 12/2010 |
| CN | 101940055 A | 1/2011 |
| CN | 102204398 A | 9/2011 |
| CN | 102317983 A | 1/2012 |
| CN | 102325344 A | 1/2012 |
| CN | 102325345 A | 1/2012 |
| CN | 102469406 A | 5/2012 |
| CN | 102547973 A | 7/2012 |
| CN | 102612170 A | 7/2012 |
| CN | 102741893 A | 10/2012 |
| CN | 102946650 A | 2/2013 |
| CN | 103049838 A | 4/2013 |
| CN | 103120003 A | 5/2013 |
| CN | 103188119 A | 7/2013 |
| CN | 103199311 A | 7/2013 |
| CN | 103220778 A | 7/2013 |
| CN | 103246971 A | 8/2013 |
| CN | 102248958 B | 9/2013 |
| CN | 103400254 A | 11/2013 |
| CN | 103444247 A | 12/2013 |
| CN | 103477606 A | 12/2013 |
| CN | 103518408 A | 1/2014 |
| CN | 103609071 A | 2/2014 |
| CN | 103632243 A | 3/2014 |
| CN | 103686761 A | 3/2014 |
| CN | 103827914 A | 5/2014 |
| CN | 103891251 A | 6/2014 |
| CN | 103907124 A | 7/2014 |
| CN | 104200544 A | 12/2014 |
| CN | 104246529 A | 12/2014 |
| CN | 104412177 A | 3/2015 |
| CN | 104471921 A | 3/2015 |
| CN | 104539315 A | 4/2015 |
| CN | 104604284 A | 5/2015 |
| CN | 105142175 A | 12/2015 |
| DE | 10106351 A1 | 9/2002 |
| DE | 102008063377 A1 | 7/2010 |
| DE | 102015111033 A1 | 1/2017 |
| EP | 936794 A3 | 8/1999 |
| EP | 2765547 A2 | 8/2014 |
| ES | 2216985 T3 | 11/2004 |
| GB | 2521224 A | 6/2015 |
| JP | H05187167 A | 7/1993 |
| JP | H08218732 A | 8/1996 |
| JP | H1051840 A | 2/1998 |
| JP | H10307879 A | 11/1998 |
| JP | 2000341740 A | 12/2000 |
| JP | 2001520610 A | 10/2001 |
| JP | 2002044109 A | 2/2002 |
| JP | 2002220957 A | 8/2002 |
| JP | 2003151075 A | 5/2003 |
| JP | 2004018125 A | 1/2004 |
| JP | 2004516463 A | 6/2004 |
| JP | 2005063046 A | 3/2005 |
| JP | 2005343674 A | 12/2005 |
| JP | 2006019840 A | 1/2006 |
| JP | 2006125942 A | 5/2006 |
| JP | 2006248789 A | 9/2006 |
| JP | 2006339970 A | 12/2006 |
| JP | 2007261815 A | 10/2007 |
| JP | 2007265279 A | 10/2007 |
| JP | 2008041104 A | 2/2008 |
| JP | 2008118256 A | 5/2008 |
| JP | 2008158841 A | 7/2008 |
| JP | 2008281522 A | 11/2008 |
| JP | 2009528546 A | 8/2009 |
| JP | 2009206749 A | 9/2009 |
| JP | 2009264747 A | 11/2009 |
| JP | 2009269682 A | 11/2009 |
| JP | 2009540470 A | 11/2009 |
| JP | 2010089850 A | 4/2010 |
| JP | 2010093606 A | 4/2010 |
| JP | 2010093742 A | 4/2010 |
| JP | 2010256295 A | 11/2010 |
| JP | 2011184150 A | 9/2011 |
| JP | 2011219181 A | 11/2011 |
| JP | 2011529217 A | 12/2011 |
| JP | 2012043072 A | 3/2012 |
| JP | 2012080482 A | 4/2012 |
| JP | 2012086945 A | 5/2012 |
| JP | 2012113548 A | 6/2012 |
| JP | 2012222378 A | 11/2012 |
| JP | 2013003084 A | 1/2013 |
| JP | 2013037663 A | 2/2013 |
| JP | 2013098748 A | 5/2013 |
| JP | 2013526188 A | 6/2013 |
| JP | 2013148972 A | 8/2013 |
| JP | 2013222448 A | 10/2013 |
| JP | 2014012575 A | 1/2014 |
| JP | 2014509381 A | 4/2014 |
| JP | 2016519352 A | 6/2016 |
| KR | 20140009739 A | 1/2014 |
| KR | 101396570 B1 | 5/2014 |
| KR | 20150000516 A | 1/2015 |
| TW | 201124907 A | 7/2011 |
| WO | 2001028274 A1 | 4/2001 |
| WO | 2001046649 A1 | 6/2001 |
| WO | 2001060038 A1 | 8/2001 |
| WO | 2001063318 A1 | 8/2001 |
| WO | 2004051868 A2 | 6/2004 |
| WO | 2005034425 A1 | 4/2005 |
| WO | 2005042267 A1 | 5/2005 |
| WO | 2007005030 A2 | 1/2007 |
| WO | 2007110964 A1 | 10/2007 |
| WO | 2009140669 A2 | 11/2009 |
| WO | 2010091528 A1 | 8/2010 |
| WO | 2011038018 A1 | 3/2011 |
| WO | 2011078646 A1 | 6/2011 |
| WO | 2011096813 A1 | 8/2011 |
| WO | 2012023836 A2 | 2/2012 |
| WO | 2012097356 A1 | 7/2012 |
| WO | 2012131280 A1 | 10/2012 |
| WO | 2012148407 A1 | 11/2012 |
| WO | 2013008886 A1 | 1/2013 |
| WO | 2013133536 A1 | 9/2013 |
| WO | 2013166216 A1 | 11/2013 |
| WO | 2013184603 A1 | 12/2013 |
| WO | 2014042507 A1 | 3/2014 |
| WO | 2014060033 A1 | 4/2014 |
| WO | 2014138090 A1 | 9/2014 |
| WO | 2015064501 A1 | 5/2015 |
| WO | 2015078277 A1 | 6/2015 |
| WO | 2015099890 A2 | 7/2015 |
| WO | 2015155087 A1 | 10/2015 |
| WO | 2015184055 A1 | 12/2015 |

OTHER PUBLICATIONS

Heydon, "Bluetooth Low Energy: The Developer's Handbook", Prentice Hall, Oct. 2012, pp. 1-368.

(56) References Cited

OTHER PUBLICATIONS

"How the Railroad Industry Invented, Then Immediately Discarded, the Barcode", https://www.vice.com/en/article/qv38wp/howthe-railroad-industry-invented-thenimmediately-discarded-the-barcode.

SiLabs, "Optimizing Current Consumption in Bluetooth Low Energy Devices", https://docs.silabs.com/bluetooth/2.13/general/system-and-performance/optimizingcurrent-consumption-in-bluetooth-low-energydevices.

Xia et al., "A Privacy Protection Protocol for RFID-enabled Supply Chain System", Jul. 28, 2009, 2009 6th International Conference on Service Systems and Service Management, pp. 305-308.

"A Standard Smart Transducer Interface", IEEE 1451, Sensors Expo, Philadelphia, Oct. 2, 2011, pp. 1-27.

Amutha et al., "Location Update Accuracy in Human Tracking System Using Zigbee Modules", International Journal of Computer Science and Information Security, vol. 6, No. 2, 2009.

Anwar et al., "Design and Implementation of a Wireless Network System in a Smart Campus", CommIT, Oct. 2007, pp. 127-139, vol. 1, No. 2.

Arora et al., "A line in the sand: a wireless sensor network for target detection, classification, and tracking", Computer Networks, Dec. 5, 2004, pp. 605-634, vol. 46, No. 5, Elsevier B.V., ISSN: 1389-1286, DOI: 10.1019/j.comnet.2004.06.007.

"AutonoNav Scalable Autonomous Navigation System", online publication dated Oct. 21, 2013 (www.torcrobotics.com/products/autononav).

"Awarepoint Real-time Awareness Solutions", online publication dated Oct. 1, 2013 (http://www.awarepoint.com/solutions).

Betters, "Apple's iBeacons Explained: What It Is and Why It Matters", online publication dated Sep. 18, 2013 (http://www.pocket-lint.com/news/123730-apple-s-ibeacons-explained-what-it-is-and-why-it-matters).

"Bluetooth 4.1 Quick Reference Guide", Bluetooth SIG 2013, Nov. 2013.

Bose et al., "Autonomously controlled storage management in vehicle logistics—applications of RFID and mobile computing systems", International Journal of RF Technologies: Research and Applications, Jan. 30, 2008, pp. 1-20, iFirst Article.

Boushka et al., Accenture, "Auto-ID on the Move: The Value of Auto-ID Technology in Freight Transportation", Feb. 1, 2003.

Cekerevac et al., "Use of RFID Technology for Measurement of Quality of Transport of Postal Parcels", Mechanics Transport Communications Academic Journal, 2011, Pages III-84-III-90, Issue 3, Article No. 0562; available online at http://www.mtc-aj.com/library/562_EN.pdf.

"Environmental Cyberinfrastructure Needs for Distributed Sensor Networks", A Report from a National Science Foundation Sponsored Workshop, Scripps Inst. Oceanography, Aug. 12-13, 2003, pp. 1-66.

"Estimote for Retail", online publication undated (http://www.estimote.com/estimote-for-retail.html).

Gheza et al., "Real Time Location System—Case Study: ZigBee System-on-Chip Solution", online publication dated Aug. 22, 2013 (www.slideshare.net/mihaigheza/real-time-location-system-with-zigbee).

Grobschadl et al., "The Energy Cost of Cryptographic Key Establishment in Wireless Sensor Networks", Proceedings of the ASIACCS, ACM, 2 Penn Plaza, Suite 701, New York, NY 10121-0701, Mar. 20, 2007 (Mar. 20, 2007), pp. 380-382.

Hachman, "Bluetooth 4.1 Prepares Headsets and More to Connect to the 'Net", online publication dated Dec. 4, 2013 (http://www.techhive.com/category/holiday/.

Hernandez et al., "Position Location Monitoring Using IEEE 802.15.4/ZigBee Technology", online publication undated, (http://www.freescale.com_files_microcontrollers_doc_broachure_PositionLocationMonitoring.pdf).

Ho et al., "In-Situ Chemiresistor Sensor Package for Real-Time Detection of Volatile Organic Compounds in Soil and Groundwater", Sensors vol. 2, 2002, pp. 23-34.

Horblyuk et al., "Out of Control: Little-Used Clinical Assets Are Draining Healthcare Budgets", Healthcare Financial Management, Jul. 2012 issue, pp. 68-72.

"Intelligent Transportation System—Wikipedia, the free encyclopedia", online publication dated Oct. 21, 2013 (http://en.wikipedia.org/wiki/Intelligent_transportion_system).

Johnson et al., "Ultra-Wideband Aiding of GPS for Quick Deployment of Anchors in a GPS-denied Ad-hoc Sensor Tracking and Communication System", presented at ION GNSS (Portland, OR Sep. 10-23, 2011).

Jung et al., "Integration of GIS, GPS, and optimization technologies for the effective control of parcel delivery service", Computers & Industrial Engineering 51, 154, '62 (Year: 2006).

Katz, "E-Mail, Anywhere, in the Palm of Your Hand", Technology Cypertimes, http://partners.nytimes.com/week/091497email.html, Sep. 14, 1997.

Liu et al., "Location Tracking by ZigBee", online publication undated (http://ir.csu.edu.tw/dspace/bitstream/987654321/1288/1/496.pdf).

"Locating ZigBee Nodes Using TI's CC2431 Location Engine and Daintree's SNA", Daintree Networks Application Note AN016, Copyright 2008 (http://www.daintree.net_downloads_appnotes_appnote_016_sna_ti_locationing.pdf).

Long et al., "Wasting Away: The Quality, Safety, and Financial Case for Clinical Asset Optimization", undated publication from GE Healthcare.

Luo et al., "Comparative Evaluation of Received Signal-Strength Index (RSSI) Based Indoor Localization Techniques for Construction Jobsites", Adv. Eng. Informat. (2010), doi:10.1016/j.aei.2010.09.003.

Maestas et al., "Demonstration of the Radio Frequency Identification Transportation Security and Safety System", Applied Sci. Laboratory, Oct. 15, 2003, pp. 1-11.

Marmasse, "comMotion: A Context-Aware Communication System" Item: Masters Thesis submitted to MIT Libraries, Date: Oct. 1, 1999, Copy of the document: http://dspace.mit.edu/bitstrea/handle/1721.1/61841/44869691.pdf?sequence=1.

Marmasse et al., "Location-Aware Information Delivery with comMotion", HUC 2000 Proceedings, pp. 1-15.

Merino et al., "Supply Chain Management in International Logistics—RFID Applications", In: "Business Dynamics in the 21st Century", May 23, 2012 (May 23, 2012), InTech, ISBN: 978-953-51-0628-9.

Needham et al., "Using Encryption for Authentication in Large Networks of Computers", Communications of the ACM, Association for Computing Machinery, Inc., vol. 21, No. 12, Dec. 1, 1978 (Dec. 1, 1978), pp. 993-999, ISSN: 0001-0782.

Ngai et al., "Mobile Commerce Integrated with RFID Technology in a Container Depot", Decision Support Systems, available online at www.sciencedirect.com Jun. 16, 2005, pp. 62-76, 43, Elsevier.

Online Estimote App for Managing Estimote Beacons, online publication dated Aug. 18, 2014 (https://itunes.apple.com/us/app/estimote-virtual-beacon/id686915066).

"P410 UWB OEM Modules for Ranging and Communications | Time Domain", online publication dated Apr. 24, 2014 (http://www.timedomain.com/p400.php).

Pachal, "Bluetooth Devices Are About to Get a Lot Smarter", online publication dated Dec. 5, 2013 (http://mashable.com/2013/12/05/bluetooth-4-1/).

Product Brochure for Time Domain's PulsON 410 (P410) Ultra Wideband (UWB) Ranging and Communication Module, undated.

Remote Sensing for Transportation: Report of a Conference, Washington D.C., Dec. 4-5, 2000, pp. 1-59.

Schuster, "The Biggest iPhone 5S Feature Nobody's Talking About", online publication dated Sep. 18, 2013 (http://www.minyanville.com/sectors/technology/articles/The-Biggest-iPhone-5S-Feature-Nobodys/9/18/2013/id/51810#ixzz2fHNaHphq).

Self-Service Mail Technologies, USPS, Available at: https://www.uspsoig.gov/blog/self-service-mail-technologies (Year: 2008).

Shamsuzzoha et al., "Logistic Tracking: An Implementation Issue for Delivery Network", (Year: 2011).

Shamsuzzoha et al., "Real-time Tracking and Tracing System: Potentials for the Logistics Network", Proceedings of the 2011 International Conference on Industrial Engineering and Operations

(56) References Cited

OTHER PUBLICATIONS

Management, Jan. 22-24, 2011, pp. 242-250, retrieved from http://ieomsociety.org/ieom2011/pdfs/IEOM038.pdf (Year: 2011).
Sutter, "What's next for 'check-in' apps?", CNN.com, Aug. 27, 2010, available at: http://www.cnn.com/2010/TECH/innovation/08/27/checkin.apps/index.html (last accessed May 22, 2020) (Year: 2010).
"System Planning Corp. Helps Evaluate Seamless Container-Security System", Jrnl. Commerce, May 30, 2005.
Terry et al., "Patient Flow and Access. Unlocking the Capacity of Acute Care Hospitals and Our National Healthcare Infrastructure", undated publication from GE Healthcare.
White, "How Computers Work", Oct. 15, 2003, Que Publishing, 7th Ed., p. 4.
Wiczer, Ph.D., "Connectivity: Smart Sensors or Smart Interfaces", ISA 2001 Emerging Technologies Conference, Sep. 2001, pp. 1-9.
"Wireless ZigBee Networks for Real-Time Location Systems", online publication undated (www.ece.gatech.edu_academic_courses_ece4007_11spring_EDE4007L04_da2_ECE4007TRP_Sheng.pdf).
Wolfe, "Electronic Cargo Seals: Context, Technologies and Marketplace", http://ops.fhwa.dot.gov/freight/E-Seal% 20WP%final% 20Jul%2012.htm, Jul. 12, 2002, pp. 1-47.
Yingjun et al., "Shipping Containers of Dangerous Goods Condition Monitoring System based on Wireless Sensor Network", (Year: 2010).
Techopedia, "Definition: Media Access Control Address (MAC Address)", The Wayback Machine—https://web.archive.org/web/20120719022804/http://www.techopedia.com:80/definition, Copyright 2010-2012 Janalta Interactive Inc., 4 pages.
Techopedia, "Media Access Control Address (MAC Address)", Nov. 18, 2014, 7 pages.
Lane, "Geofencing, A Useful Way to Corral Your Devices," https://Meraki.Cisco.com, Sep. 11, 2013.
Japanese Patent Application No. 2020-020316 Office Action dated Jun. 29, 2021 with English Translation.
Qiao et al., "RFID Applications in Transportation Operation and Intelligent Transportation System (ITS)", Jun. 2009, Texas Southern University, retrieved from https://static.tti.tarnu.edu/swutc.tarnu.edu/publications/technicalreports/476660-00044-1.pdf.
Gonzalez, "Google, Same-Day Delivery, and Container Tracking", Logistics Viewpoints, Oct. 31, 2012, Retrieved from https://logisticsviewpoints.com/tag/phantom-inventory/.
European Patent Application No. 17770762.7 Office Action dated Jul. 6, 2023.
Chinese Patent Application No. 202110572653.7 Office Action dated Sep. 23, 2023 English Translation.
Chinese Patent Application No. 202110572114.3 Office Action dated Oct. 7, 2023 English Translation.
Chinese Patent Application No. 202110572121.3 Office Action dated Oct. 11, 2023 English Translation.
Chinese Patent Application No. 202110572648.6 Office Action dated Oct. 17, 2023 English Translation.
Chinese Patent Application No. 202110572112.4 Office Action dated Oct. 18, 2023 English Translation.
Canadian Patent Application No. 3014870 Requisition by the Examiner dated Aug. 21, 2024.
Chinese Patent Application No. 202111368554.3 Office Action dated Aug. 10, 2024 English Translation.
Chinese Patent Application No. 202111368557.7 Office Action dated Aug. 10, 2024 English Translation.
Chinese Patent Application No. 202111368563.2 Office Action dated Aug. 10, 2024 English Translation.
Lindsay et al., "Cascading RFID Tags", jefflindsay.com, Dec. 23, 2003, Retrieved from https://www.jefflindsay.com/rfid3.shtml.
European Patent Application No. 24165119.9 Extended European Search Report mailed Oct. 7, 2024.
Heinzelman et al., "Energy-Efficient Communication Protocol for Wireless Microsensor Networks", Proceedings of the 33rd Hawaii International Conference on System Sciences, Jan. 4, 2000, pp. 1-10, XP055158497, DOI: 10.11 09/HICSS.2000.926982, ISBN: 978-0-76-950493-3.

\* cited by examiner

• Location of ID Node C determined through triangulation across ID Node B and Master Nodes M1 and M2

Section A-A'

Alternative Section A-A'

Section A-A'

Alternative Section A-A'

Section B-B'

Alternative Section B-B'

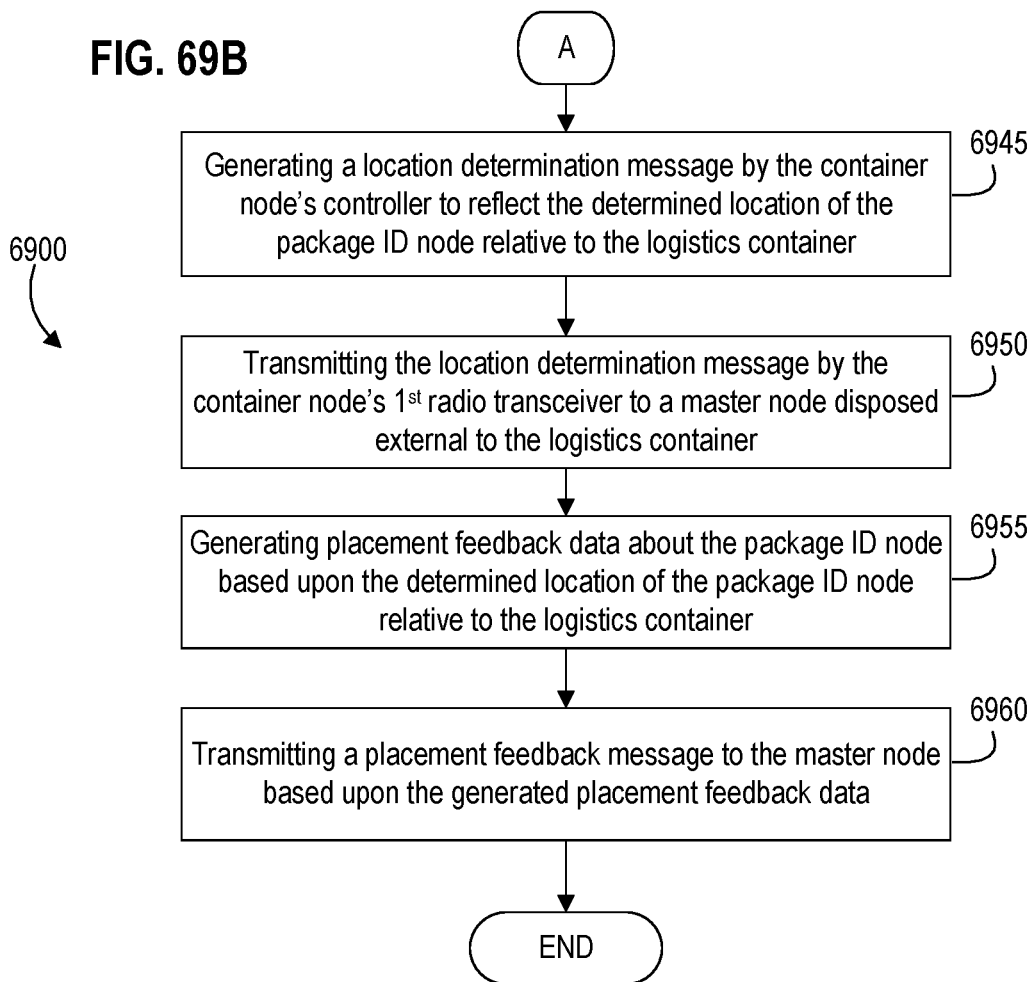

79100A—
Enhanced Container Node Enabled
Logistics Storage Platform

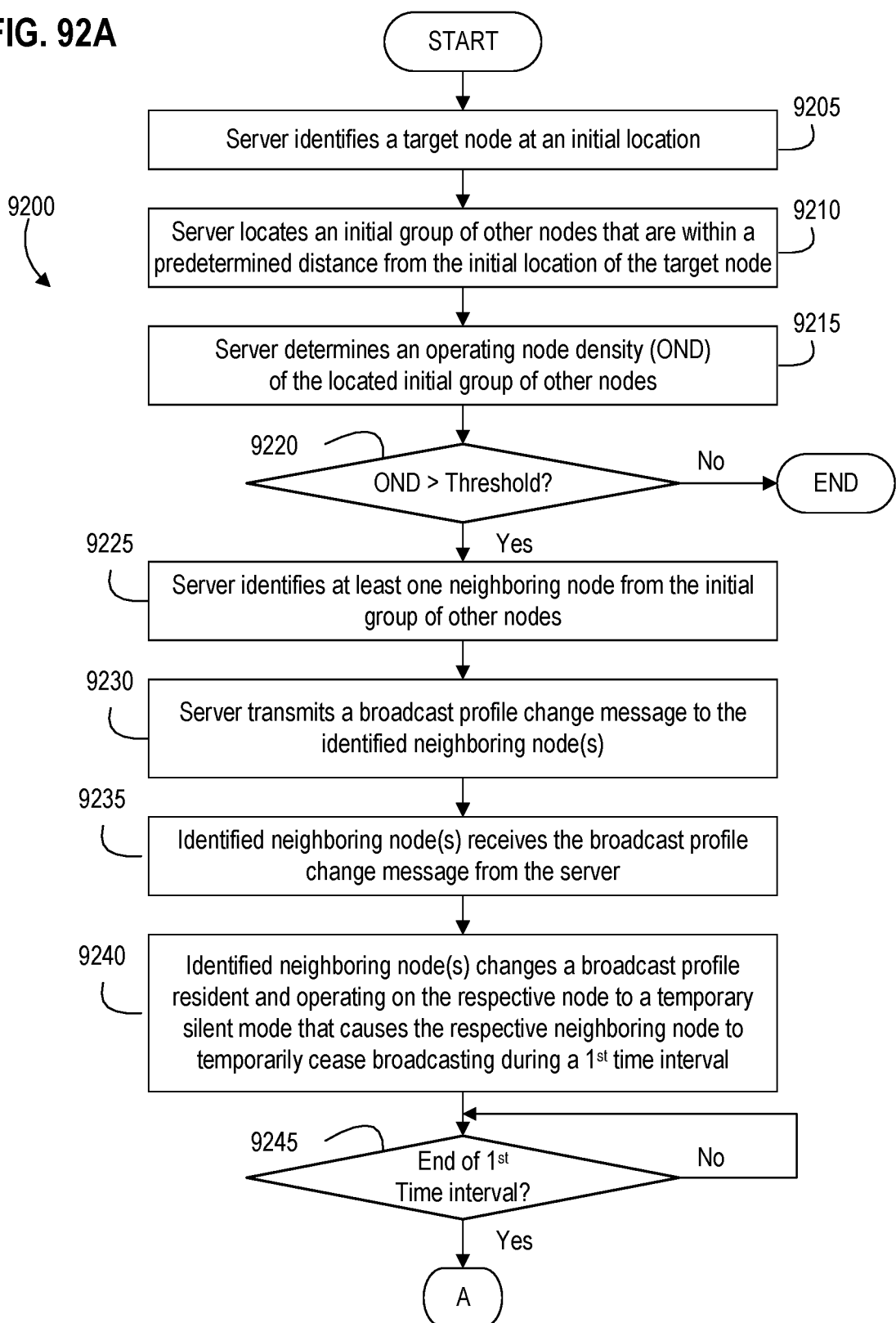

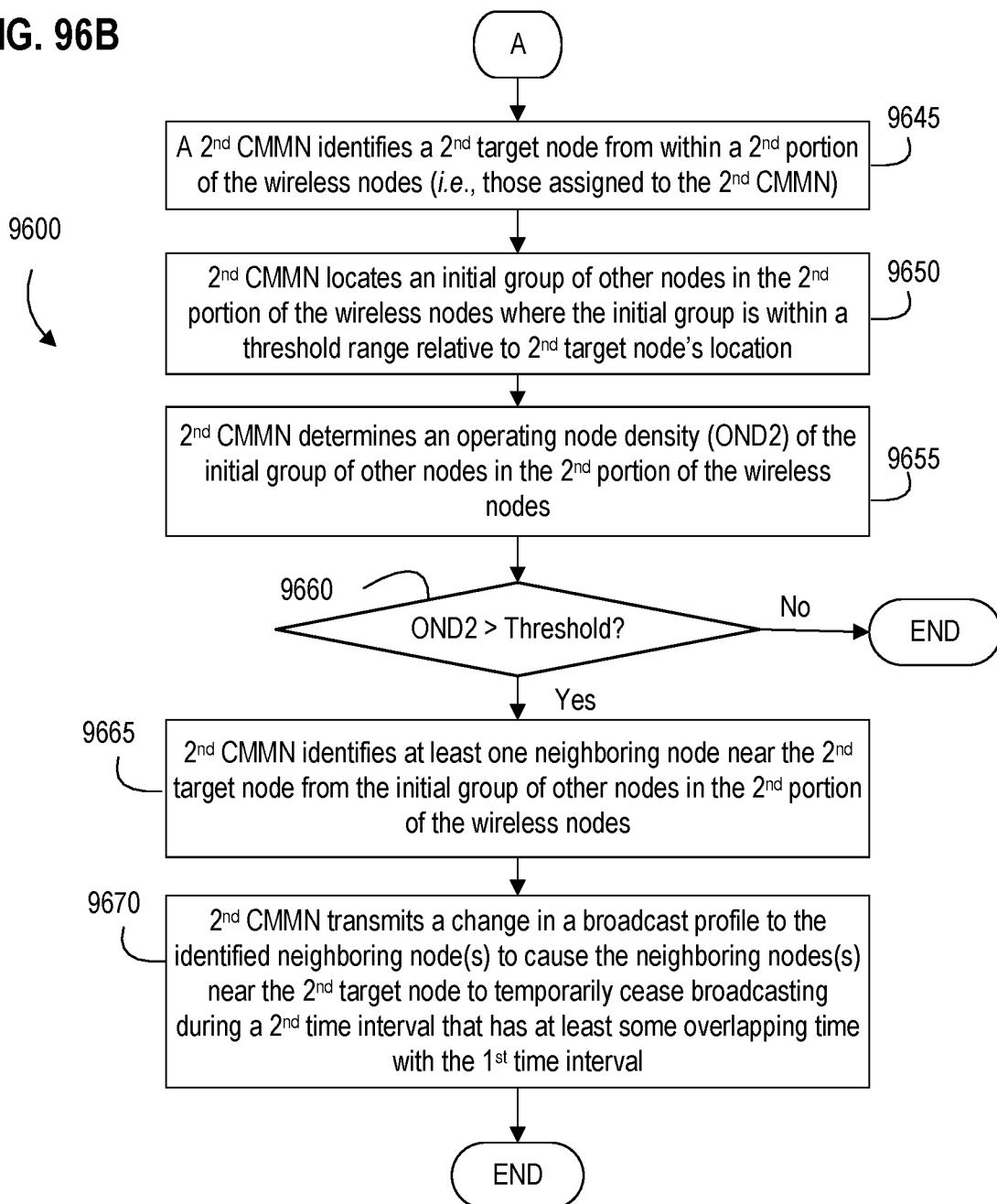

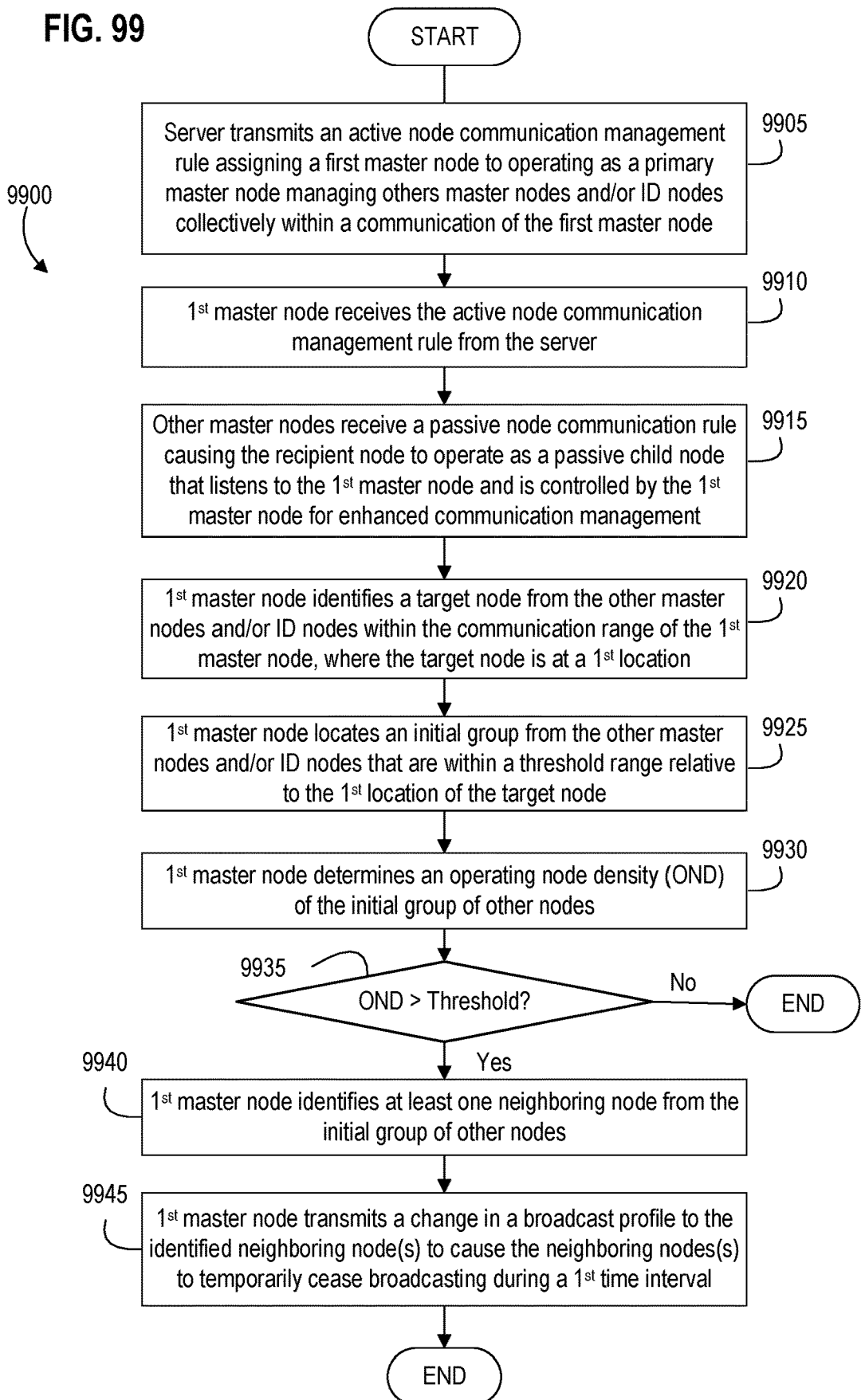

METHODS AND SYSTEMS FOR MOTION-BASED MANAGEMENT OF AN ENHANCED LOGISTICS CONTAINER

RELATED APPLICATIONS

The present application claims the benefit of priority to the Provisional Patent Application No. 62/312,155 entitled "Methods, Apparatus, and Systems Using Enhanced Power Profiles, Container Nodes, Multi-Radio Element Nodes, and Node Communication Equipment" and parent U.S. Non-Provisional patent application Ser. No. 15/433,043 entitled "Methods and Systems for Motion-based Management of an Enhanced Logistics Container."

The present application is also related in subject matter to the following non-provisional patent applications where each also claims the benefit of priority to the same above-referenced provisional patent application: (1) Non-Provisional patent application Ser. No. 15/430,859 entitled "Systems, Apparatus, and Methods for Self-Adjusting a Broadcast Setting of a Node in a Wireless Node Network"; (2) Non-Provisional patent application Ser. No. 15/433,023 entitled "Methods and Systems for Container Node-Based Enhanced Management of a Multi-Level Wireless Node Network"; (3) Non-Provisional patent application Ser. No. 15/433,074 entitled "Methods and Systems for Motion-Enhanced Package Placement Tracking Using a Container Node Associated with a Logistics Container"; (4) Non-Provisional patent application Ser. No. 15/433,097 entitled "Methods and Systems for Active Shipment Management Using a Container Node Within a Wireless Network Enabled Vehicle"; (5) Non-Provisional patent application Ser. No. 15/433,273 entitled "Methods, Apparatus, and Systems for Enhanced Multi-Radio Container Node Elements Used in a Wireless Node Network"; (6) Non-Provisional patent application Ser. No. 15/962,052 entitled "Methods, Apparatus, and Systems for Enhanced Multi-Radio Container Node Elements Used in a Wireless Node Network"; (7) Non-Provisional patent application Ser. No. 15/434,404 entitled "Methods, Apparatus, and Systems for Improved Node Monitoring in a Wireless Node Network"; and (8) Non-Provisional patent application Ser. No. 15/434,425 entitled "Methods, Non-Transitory Computer Readable Media, and Systems for Improved Communication Management of a Plurality of Wireless Nodes in a Wireless Node Network".

FIELD OF THE DISCLOSURE

The present disclosure generally relates to systems, apparatus and methods in the field of managed logistics for items (e.g., an object, a package, a person, a piece of equipment). More particularly, the present disclosure relates to various aspects involving systems, apparatus and methods that leverage an adaptive, context-aware wireless node network that may use enhanced power profiles, proactive movement notification, one or dedicated container nodes as node elements in the network, enhanced nodes that deploy multiple radio elements, and/or enhanced node communication management for highly congested operating node environments.

BACKGROUND

Asset management has always been an important part of commerce, and the ability to identify an item and locate its whereabouts may be considered core to companies that ship items from one location to another. For example, tracking packages is important to organizations of all kinds, whether it be a company keeping track of inventory to be sold in its stores, or a package delivery provider keeping track of packages being transported through its delivery network. To provide quality service, an organization typically creates and maintains a highly organized network for tracking its items—packages, people, objects, etc. Effective management of such networks allows lower cost, reduced delivery time, and enhanced customer service. And efficient deployment of the network helps manage costs.

In addition to tracking packages, parties that ship and receive packages may also need information regarding the conditions of the packages, such as the temperature and humidity of the package. For example, a customer that has ordered a box of wine may want to monitor the temperature of the contents of the box to determine if the temperature and/or humidity goes above or below a set range. Likewise, the party that ships the package may also want to monitor the conditions of the package to ensure that the content arrives in the proper condition.

Conventionally, this tracking function may be provided by a variety of known mechanisms and systems. Machine-readable barcodes are one way organizations keep track of items. A retailer, for example, may use bar codes on items in its inventory. For example, items to be sold in a retailer's store may each be labeled with a different machine-readable bar code. In order to keep track of inventory, the retailer typically scans or otherwise captures an image of the bar code on each item so that a back-end part of the retailer's operation can keep track of what is coming in and leaving their possession from suppliers. In addition, when an item is sold to a consumer, the bar code for that item is scanned or captured to track sales and inventory levels.

Similarly, a package delivery provider may utilize machine-readable bar codes by associating a bar code with packages to be delivered to a recipient. For example, a package may have a bar code corresponding to a tracking number for that package. Each time the package goes through a transit checkpoint (e.g., the courier taking initial control of the package, the package being temporarily placed in a storage facility while being moved from a pickup point to a delivery location, and the package being delivered to the recipient, etc.), the package's bar code may be scanned. Bar codes, however, have the disadvantage that personnel must manually scan each bar code on each item in order to effectively track the items.

Radio-frequency identification (RFID) tags are another known mechanism for tracking items. In contrast to barcodes, RFID tags do not usually require manual scanning. For example, in a retail context, an RFID tag on an inventory item may be able to communicate with an electronic reader that actively interrogates for a tag and, when it does, it detects items in a shopping cart and adds the cost of each item to a bill for the consumer. The RFID tag usually transfers a coded number only when queried or prompted by the reader. RFID tags have also been used to track items such as livestock, railroad cars, trucks, and even airline baggage. These tags typically only allow for basic polled or actively interrogated tracking, but do not provide a way to improve asset management using information about the environment in which the items are tracked.

Sensor-based tracking systems are also known which can provide more information than RFID systems. Shippers, carriers, recipients, and other parties often wish to know the location, condition, and integrity of shipments before, during, and after transport to satisfy quality control goals, meet regulatory requirements, and optimize business processes.

However, such systems are typically expensive given the complexity of the sensors, and may provide extraneous and redundant item information.

Systems exist that deploy different types of nodes in a wireless node network used for logistics related tracking and monitoring operations. Some networks may have a server at a top level, a master node at a middle level of the network, and a less complex node (generally referred to as an ID node) at a lower level of the network. In some implementations, it is known to associate and otherwise pair an ID node with a shipping item (such as a box, package, product, or other packaging for the product being shipped). One problem that may be encountered with such a wireless network of nodes involves the dependence of the ID node on the master node, which can in some situations create a large overhead burden of communication traffic between multiple ID nodes and a master node associated with those ID nodes. Such master node processing burdens may be experienced when there is an unduly burdensome concentration or density of package ID nodes that, for example, enter a logistics transport or facility. In such a situation, the master node may face an undesirably dynamic processing load for monitoring and controlling aspects of how the ID nodes need to be operating.

Further needs exist related to enhanced methods and systems for tracking nodes and their movement while inside containers or vehicles. Still further needs exist in how to better use radio elements of a node when deployed in such a logistics related wireless node network so to allow for improved positional awareness when managing items, nodes associated with the items, and/or containers for such managed items.

Additionally, the prospect of a dynamic congested operating node environment may cause communication issues where nodes are not able to communicate with other nodes. Thus, there exists a need for improved ways and systems that facilitate an intelligent and adaptive approach to managing congested node landscapes so that nodes may still effectively communicate with one another while operating in such a congested environment.

To address these types of requirements and logistics related issues, one or more systems are needed that may leverage one or more elements of an adaptive, context-aware wireless node network that may use enhanced power profiles, proactive movement notification, one or dedicated container nodes as node elements in the network, enhanced nodes that deploy multiple radio elements, and/or enhanced node communication management for highly congested operating node environments.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, a type of container node is described for use with a logistics container and as an element in a wireless node network. This type of container node deploys a motion sensor to detect a changed motion condition for the related logistics container and responsively alter a broadcast profile as a result so that it changes how the container node communicates with other elements of the wireless network.

In more detail, one aspect of the disclosure describes a method for motion-based management of a logistics container using one or more elements of a wireless node network including a container node associated with the logistics container and equipped with a motion sensor. The method has the motion sensor of the container node detecting a motion status for the logistics container and comparing the detected motion status to a prior motion status for the logistics container. Based upon the comparison of the detected motion status and the prior motion status, the container node identifies a changed motion condition for the logistics container. The method then has the container node altering a broadcast profile for the container node based upon the changed motion condition for the logistics container.

In another aspect of the disclosure, a motion sensing container node apparatus is described that is deployed within a logistics container and may be used as one of a plurality of elements in a wireless node network. This motion sensing container node apparatus includes at least a node housing, a node processing unit, a memory storage, a communication interface, and a motion sensor. The node housing is attached to the logistics container and the node processing unit is disposed within the node housing. The memory storage, which is disposed within the node housing and coupled to the node processing unit, maintains motion-based management code for execution by the node processing unit and a broadcast profile defining at least one operational communication parameter for the container node apparatus. The communication interface is coupled to the node processing unit and operative to communicate with a second node element in the network over a communication path in accordance with the broadcast profile maintained in the memory storage. The motion sensor is coupled to the node processing unit, detects a motion status of the logistics container and reports the detected motion status to the node processing unit. In operation, when executing the motion-based management code maintained on the memory storage, the node processing unit is operative to receive the detected motion status from the motion sensor; store the detected motion status in the memory storage as a first motion status for the logistics container; receive a subsequent detected motion status from the motion sensor; compare the subsequent detected motion status to the first detected motion status for the logistics container; identify a changed motion condition for the logistics container based upon the comparison of the subsequent detected motion status and the first detected motion status; alter the operational communication parameter defined in the broadcast profile based upon the identified changed motion condition; and cause the communication interface to communicate with the second node in accordance with the altered operational communication parameter.

In another aspect of the disclosure, another motion sensing container node apparatus is described that operates as part of a wireless node network. This motion sensing container node apparatus includes a logistics container and a container node attached to the logistics container. The logistics container can maintain multiple packages, and includes at least a housing portion defining an interior storage area for the packages and a door portion movably coupled to the housing portion. The door portion of the logistics container secures the interior storage area when in a closed position relative to the housing portion and provides access to the interior storage area when in an open position relative to the housing portion. The container node is a first node element that can interactively operate in the wireless node network, and includes at least a motion sensor that detects a motion status of the logistics container, and a communication interface operative to allow the container node to communicate with a second node in the wireless node network in accordance with a motion-dependent broadcast profile based upon the motion status detected by the motion sensor.

In yet another aspect of the disclosure, another motion sensing container apparatus is described that is deployed in a wireless node network having at least a second node that communicates with the apparatus. This motion sensing container includes at least a logistics container and a container node. The logistics container is configured to maintain a plurality of packages, and, more specifically, includes at least a base platform and a flexible cover. The base platform is capable of supporting the packages and has a central support surface and different base attachment points disposed relative to a periphery of the base platform and outside the central support base surface. The flexible cover has multiple cover attachment points capable of being temporarily secured to a corresponding one of the base attachment points of the base platform. As such and when secured to the base attachment points, the flexible cover is capable of securing the plurality of packages to the base platform. The container node (a node in the wireless node network) is attached to the base platform and includes at least a motion sensor that detects a motion status of the logistics container, and a communication interface operative to allow the container node to communicate with the second node in the wireless node network in accordance with a motion-dependent broadcast profile based upon the motion status detected by the motion sensor.

In still another aspect of the disclosure, a motion-based management system is described for a logistics container that maintains a plurality of packages within the logistics container. Such a system operates with one or more elements of a wireless node network. This system includes multiple package ID nodes and a container node. Each of the package ID nodes are associated with a different one of the packages maintained within the logistics container. The container node is associated with the logistics container and manages the package ID nodes. In more detail, the container node at least includes a motion sensor that detects a motion status of the logistics container, and a communication interface operative to allow the container node to communicate with at least one of the package ID nodes in accordance with a motion-dependent broadcast profile based upon the motion status detected by the motion sensor.

Generally stated, each of these aspects respectively effect improvements to the wireless logistics node technology used to track and monitor items being shipped and more effectively communicate with other node elements based on detected motions of a logistics container. Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 69A and 69B are, collectively, a flow diagram illustrating an exemplary method implemented by a multi-antenna container node for locating a package ID node within a storage area of the logistics container in accordance with an embodiment of the invention;

FIGS. 92A-92B are collective a flow diagram illustrating a more detailed exemplary enhanced method of communication management of a plurality of wireless nodes by a server and a target node's neighboring node(s) as they interact within a wireless node network in accordance with an embodiment of the invention;

FIGS. 96A-96B are collectively a flow diagram illustrating another exemplary enhanced method of communication management of a plurality of wireless nodes by a server and multiple communication management master nodes as they interact within a wireless node network in accordance with an embodiment of the invention;

FIG. 99 is a flow diagram illustrating an exemplary enhanced method of communication management of a plurality of wireless nodes that leverages use of a primary master node that controls other master nodes in accordance with an embodiment of the invention.

DESCRIPTION OF THE EMBODIMENTS

Figure 1:
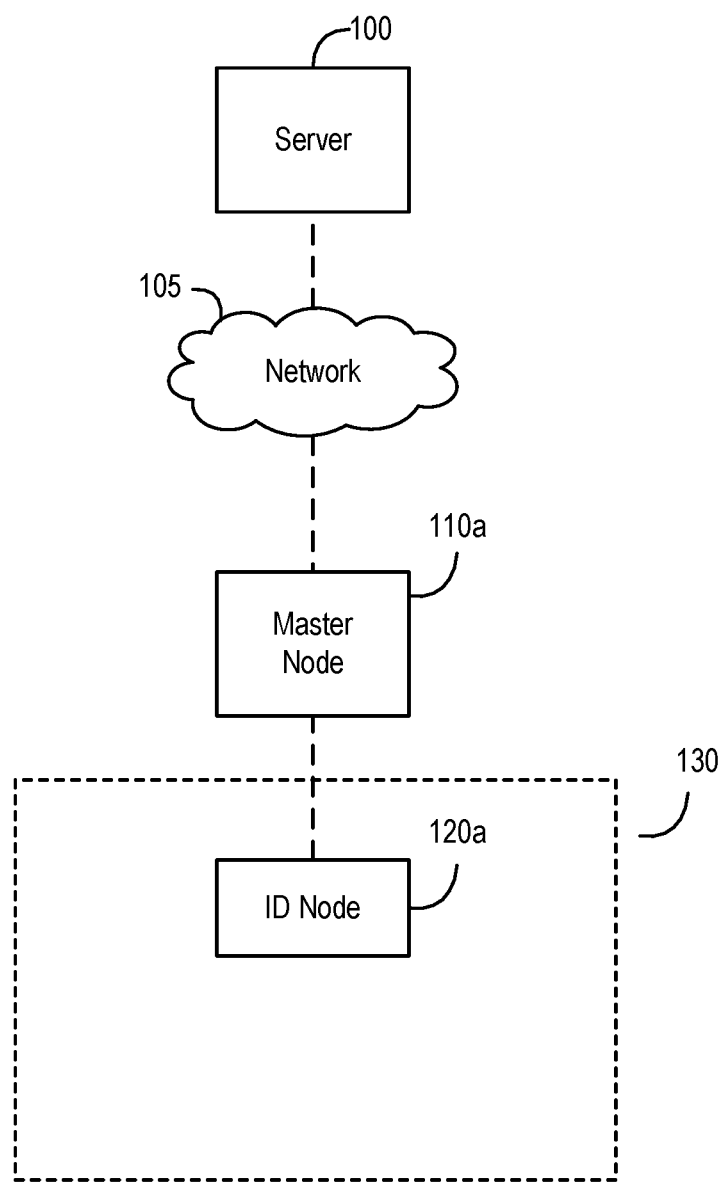
FIG. 1 is a diagram of an exemplary wireless node network in accordance with an embodiment of the invention.

Reference will now be made in detail to exemplary embodiments. Wherever possible, the same reference numbers are used in the drawings and the description to refer to the same or like parts.

In general, the following describes various embodiments of a contextually aware hierarchical wireless node network that may be managed, operated, and applied by principles as set forth herein. In general, embodiments of the wireless node network may include one or more lower level devices or nodes (e.g., an ID node) that rely on shorter-range communication with a higher level device or node (e.g., a master node), which is operative to communicate with a server over a different communication path while the lower level node is unable to communicate directly with the server. Those skilled in the art will appreciate that such a hierarchy of different functional communicating network components (generally referred to as network devices) may be characterized as a network of nodes. Those skilled in the art will appreciate that in some embodiments, the wireless node network may include the server as well as different wireless nodes despite the fact that the server may not be a dedicated wireless component. In other embodiments, the network may include similar types of wireless nodes or different types of wireless nodes.

Further, those skilled in the art will appreciate that each embodiment described herein effects improvements to particular technologies, such as motion-based management of a logistics container using elements of an adaptive, context-aware wireless node network of node devices. Each embodiment describes a specific technological application of one or more nodes that operate in such a wireless node network where the specific technological application improves or otherwise enhances such technical fields as explained and supported by the disclosure that follows.

Those skilled in the art will understand through the following detailed description that the nodes may be associated with items (e.g., an object, a package, a person, a piece of equipment) and may be used to identify and locate the items while being dynamically programmed during operation of the network and while the items move along an anticipated path (e.g., a transit path from an origin point to a destination point). The following further describes various embodiments of a wireless node network, exemplary ways to manage components of a wireless node network, exemplary ways to better determine the location of components of a wireless node network, and applications of a wireless node network to enhance logistics operations that rely upon a wireless node network.

Wireless Node Networks

FIG. 1 illustrates a basic diagram of an exemplary wireless node network in accordance with an embodiment of the invention. The exemplary network shown in FIG. 1 comprises a server 100 connected to a network 105, which is also operatively connected to different network components, such as a master node 110a and indirectly to an ID node 120a through master node 110a. Master node 110a is typically connected to an ID node 120a via short-range wireless communications (e.g., Bluetooth® formatted communications). Master node 110a is typically connected to server 100 through network 105 via longer-range wireless communication (e.g., cellular) and/or medium range wireless communication (e.g., wireless local area data networks or Wi-Fi). ID node 120a is typically a low cost device that may be easily placed into a package, be integrated as part of packaging, or otherwise associated with an item to be tracked and located, such as package 130, a person, or object (e.g., vehicle, etc.). Generally, an ID node is capable of communicating directly with a master node but incapable of communicating directly with the server, while a master node is capable of communicating directly with the server and separately and directly communicating with other nodes (such as an ID node or another master node). The ability to deploy a hierarchy of nodes within an exemplary wireless node network to distribute tasks and functions at the different levels in an efficient and economical manner helps to facilitate a wide variety of adaptive locating, tracking, managing, and reporting applications using such a network of nodes as discussed in more detail below.

In general, the lower cost, lower complexity ID node 120a is managed by the higher complexity master node 110a and server 100 as part of keeping track of the location of ID node 120a (and the associated item), thereby providing intelligent, robust, and broad visibility about the location and status of ID node 120a. In a typical embodiment, ID node 120a is first associated with an item (e.g., package 130, a person, or object). As ID node 120a moves with the item, the ID node 120a becomes associated with the master node 110a, and the server 100 is updated with such information. Further movement of the ID node 120a and item may cause the ID node 120a to disassociate with master node 110a and be handed off to become associated another master node (not shown), after which the server 100 is again updated. As such, the server 100 generally operates to coordinate and manage information related to the ID node 120a as the item physically moves from one location to another. Further details of the architecture and functionality of an embodiment of an exemplary ID node and master node as described below in more detail with respect to FIGS. 3 and 4, while exemplary server 100 is described below in more detail with respect to FIG. 5.

While server 100 is shown connecting through network 105, those skilled in the art will appreciate that server 100 may have a more direct or dedicated connections to other components illustrated in FIG. 1, such as master node 110a, depending upon implementation details and desired communication paths. Furthermore, those skilled in the art will appreciate that an exemplary server may contain a collection of information in a database (not shown in FIG. 1), while multiple databases maintained on multiple server platforms or network storage servers may be used in other embodiments to maintain such a collection of information. Furthermore, those skilled in the art will appreciate that a database may be implemented with cloud technology that essentially provides networked storage of collections of information that may be directly accessible to devices, such as master node 110a.

Network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network that interconnects server 100 and other components shown in FIG. 1 in an embodiment of the present invention.

Master node 110a and ID node 120a are types of nodes. A node is generally an apparatus or device used to perform one or more tasks as part of a network of components. An embodiment of a node may have a unique identifier, such as a Media Access Control (MAC) address or an address assigned to a hardware radio like an Internet Protocol 6 (IPv6) identifier. In some embodiments, the node's unique identifier may be correlated to a shipment identifier (e.g., a shipment tracking number in one example), or may itself be a shipment's tracking reference.

An ID node, such as ID node 120a, is generally a low cost active wireless device. In one embodiment, an exemplary ID node is a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. For example, the physical implementation of an exemplary ID node may be small, and, thus, amenable to integration into a package, label, container, or other type of object. In some implementations of an ID node, the node is rechargeable while other implementations do not permit recharging the power source for the ID node. In other implementations, the ID node is environmentally self-contained or sealed so as to enable robust and reliable operations in a variety of environmentally harsh conditions.

A master node, such as master node 110a, generally serves as an intelligent bridge between the ID node 120a and the server 100. Accordingly, a master node is generally more sophisticated than an ID node. In one example embodiment, an exemplary master node is a device having a processing or logic unit, a short-range radio (with may have variable RF characteristics) used for communicating with other nodes (ID nodes and other master nodes), a medium and/or long-range radio for communication with the server 100, memory accessible by the processing unit, a timer operatively coupled to the processing unit, and a power source (e.g., a battery or a wired power supply connection) that provides power for the circuitry of the master node. The exemplary master node, such as master node 110a, may be positioned in a known fixed location or, alternatively, be a mobile unit having dedicated location positioning circuitry (e.g., GPS circuitry) to allow the master node to determine its location by itself.

While the embodiment illustrated in FIG. 1 shows only a single master node and a single ID node, those skilled in the art will appreciate that a wireless network consistent with an embodiment of the invention may include a wide array of similar or different master nodes that each communicate with the server 100 and/or other master nodes, and a wide variety of similar or different ID nodes. Thus, the exemplary network shown in FIG. 1 is a basic embodiment, while the exemplary network shown in FIG. 2 is a more detailed exemplary wireless node network in accordance with another embodiment of the invention.

Figure 2:
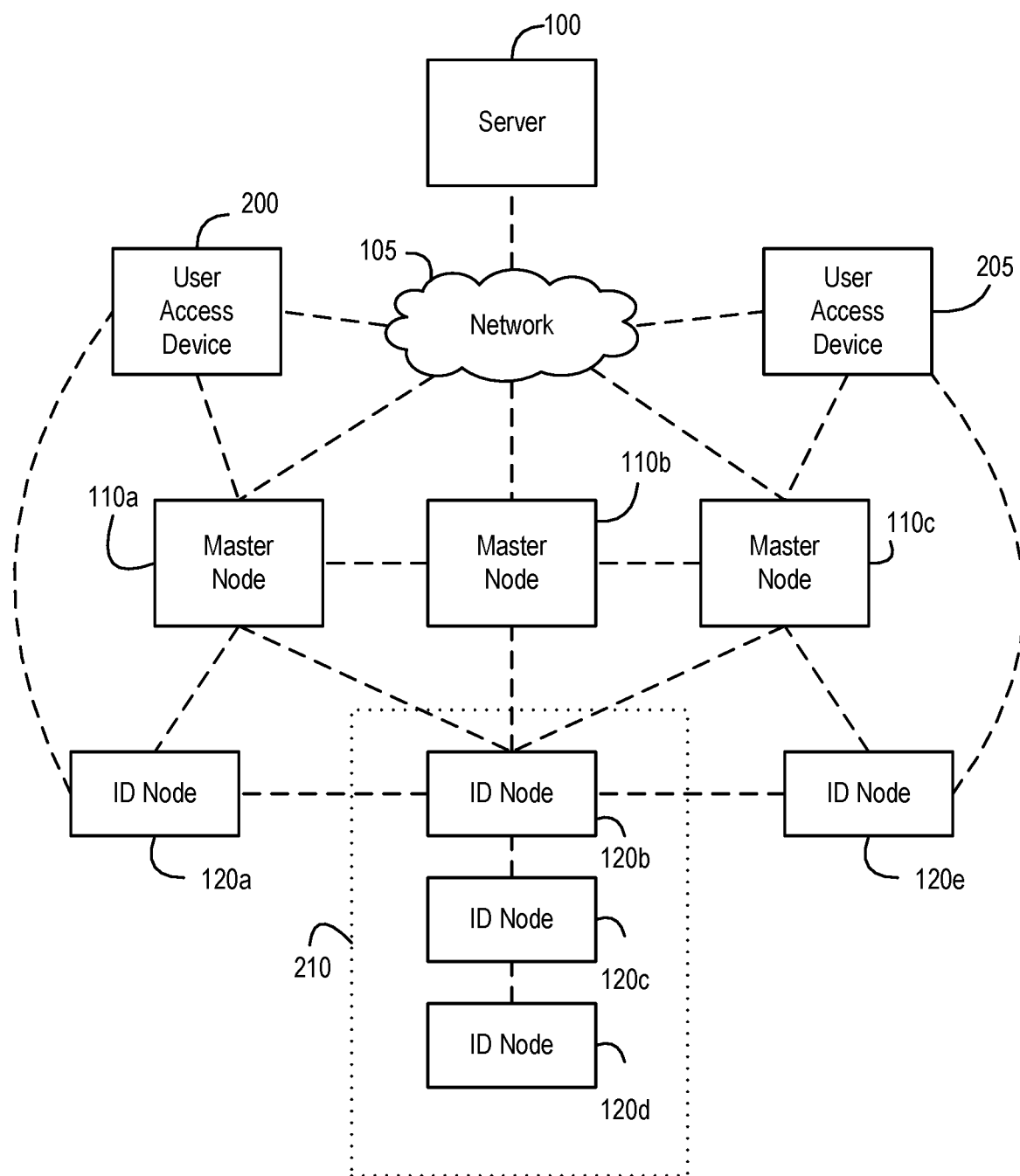
FIG. 2 is a more detailed diagram of an exemplary wireless node network in accordance with an embodiment of the invention.

Referring now to FIG. 2, another exemplary wireless node network is shown including server 100 and network 105. Here, master nodes 110a, 110b, 110c are deployed and connected to network 105 (and by virtue of those respective connections, to server 100) as well as to each other. ID nodes 120a, 120b, 120e are shown as connectable or operative to communicate via different paths to various master nodes. However, ID nodes 120c and 120d are shown in FIG. 2 connected to ID node 120b but not to any of the master nodes. This may be the case if, for example, ID nodes 120b, 120c, 120d are associated with different items (e.g., packages) within a larger container 210 (or grouped together on a pallet). In such an example, only ID node 120b may remain within the wireless communication range of any master node. This may, for example, be because of the positions of the different ID nodes within the container relative to the closest master node, adverse RF shielding caused by the container, adverse RF shielding caused by packaging of the item, or adverse RF shielding caused by other proximate material that interferes with radio transmissions (e.g., several packages of metal items between the ID node and any master node outside the container). Thus, in the illustrated configuration of the exemplary network shown in FIG. 2, ID nodes 120c and 120d may be out of range from the master nodes, yet still have an operative communication path to a master node through ID node 120b.

Indeed, in one example, prior to placement within container 210, ID node 120b may actually be a master node but the changed RF environment when placing it in container 210 may interfere with the master node's ability to locate itself via location signals (e.g., GPS signals) and cause the master node to temporarily operate as an ID node while still providing communications and data sharing with other ID nodes in container 210.

User access devices 200, 205 are also illustrated in FIG. 2 as being able to connect to network 105, master nodes, and ID nodes. Generally, user access devices 200 and 205 allow a user to interact with one or more components of the exemplary wireless node network. In various embodiments, user access devices 200, 205, may be implemented using a desktop computer, a laptop computer, a tablet (such as an Apple iPad® touchscreen tablet), a personal area network device (such as a Bluetooth® device), a smartphone (such as an Apple iPhone®), a smart wearable device (such as a Samsung Galaxy Gear™ smartwatch device, or a Google Glass™ wearable smart optics) or other such devices capable of communicating over network 105 with server 100, over a wired or wireless communication path to master node and ID nodes. Thus, an exemplary user access device may be a mobile type of device intended to be easily moved (such as a tablet or smartphone), and may be a non-mobile type of device intended to be operated from a fixed location (such as a desktop computer).

As shown in FIG. 2, user access devices 200, 205 are coupled and in communication with network 105, but each of them may also be in communication with each other or other network components in a more direct manner (e.g., via near field communication (NFC), over a Bluetooth® wireless connection, over a Wi-Fi network, dedicated wired connection, or other communication path).

In one example, a user access device, such as device 200 or 205, may facilitate associating an ID node (such as ID node 120a) with the tracking number of a package at the start of a shipment process, coordinating with the server 100 to check on the status and/or location of the package and associated ID node during transit, and possibly retrieving data from a master node or ID node related to the shipped package. Thus, those skilled in the art will appreciate that a user access device, such as devices 200, 205, are essentially interactive communication platforms by which a user may initiate shipment of an item, track an item, determine the status and location of an item, and retrieve information about an item.

An exemplary user access device, such as device 200 or 205, may include sufficient hardware and code (e.g., an app or other program code section or sections) to operate as a master node or an ID node in various embodiments as discussed in more detail below. For example, device 200 may be implemented as a mobile smartphone and functionally may operate as an exemplary ID node that broadcasts advertising packet messages to other ID nodes or master nodes for association and sharing data with such nodes. In another example, device 200 is implemented as a mobile smartphone and may operate as an exemplary master node that communicates and associates with ID nodes and other master nodes, as described herein, and communicates with the server 100. Thus, those skilled in the art will appreciate an exemplary ID node in FIG. 3 and an exemplary master node in FIG. 4, and their respective parts, code and program modules, may be implemented with an appropriately programmed user access device, such as device 200 or 205. Thus, the following description of an exemplary ID node in FIG. 3 and an exemplary master node in FIG. 4 will be applicable to a user access device operating as an ID node or a master node, respectively.

ID Node

Figure 3:
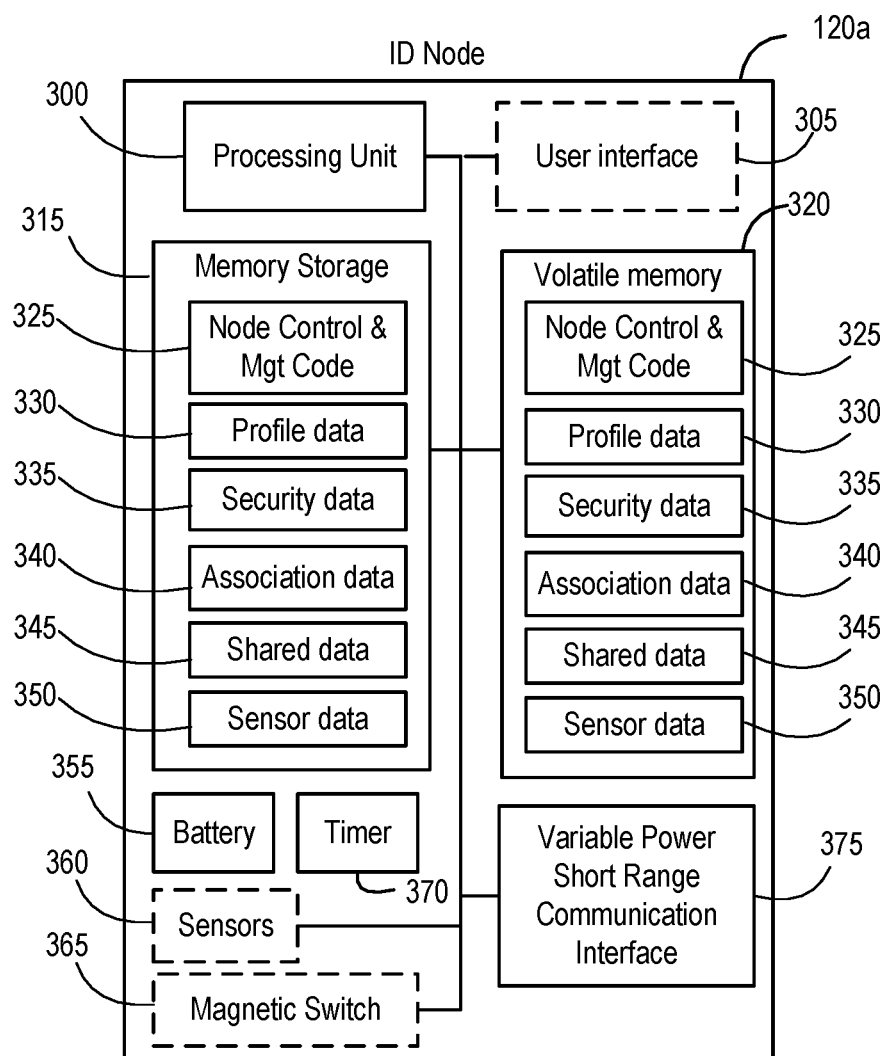
FIG. 3 is a more detailed diagram of an exemplary ID node device in accordance with an embodiment of the invention.

FIG. 3 is a more detailed diagram of an exemplary ID node device in accordance with an embodiment of the invention. As previously described, one embodiment of an ID node includes a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. Referring now to the more detailed embodiment of FIG. 3, exemplary ID node 120a is shown to comprise a processing or logic unit 300 coupled to a variable power short-range communication interface 375, memory storage 315, volatile memory 320, timer 370, and battery 355. Those skilled in the art will appreciate that processing unit 300 is logic, such as a low power consumption microcontroller, that generally performs computations on data and executes operational and application program code and other program modules or sections thereof within the ID node 120a. As such, exemplary processing unit 300 operates as a transceiver-based processing core of ID node 120a.

Those skilled in the art will also appreciate that exemplary ID node 120a is a hardware-based component that may be implemented with a single processor or logic unit, such as unit 300. In one embodiment, processing unit 300 may be implemented with an Intel® 8051 CPU Core and associated peripheral circuitry as dictated by the needs of the particular application. Less complex microcontrollers or discrete circuitry may be used to implement processing unit 300 as well as more complex and sophisticated microprocessors. Additionally, exemplary processing unit 300 may be integrated into a single chip transceiver used as a core of ID node 120a.

The variable power short-range communication interface 375 of ID node 120a is generally a programmable radio and an omni-directional antenna coupled to the processing unit 300. In other embodiments, interface 375 may use an antenna with a different antenna profile when directionality may be desired. Examples of variable power short-range communication interface 375 may include other interfacing hardware (not shown) for operatively coupling the device to a specific short-range communication path (e.g., a Bluetooth® Low Energy (BLE) connection path communicating at 2.4 GHz).

In one embodiment, various RF characteristics of the radio's transceiver, such as the RF output power and/or the RF receiver sensitivity may be dynamically and programmatically varied under control of processing unit 300. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal depending upon a desired implementation and anticipated use of ID node 120a. As will be explained in more detail below, some embodiments may use Broadcast Profile having parameters that may be programmatically altered or adjusted. In other words, embodiments of ID node 120a (or any other ID node) may have programmatically adjustable RF characteristics (such as an adjustable RF output signal power, an adjustable RF receiver sensitivity, the ability to switch to a different frequency or frequency band, etc.).

The battery 355 for ID node 120a is a type of power source that generally powers the circuitry implementing ID node 120a. In one embodiment, battery 355 may be a rechargeable power source. In other embodiments, battery 355 may be a non-rechargeable power source intended to be disposed of after use. In some embodiments of an ID node, the power source may involve alternative energy generation, such as a solar cell.

The timer 370 for ID node 120a generally provides one or more timing circuits used in, for example, time delay, pulse generation, and oscillator applications. In an embodiment where ID node 120a conserves power by entering a sleep or dormant state for a predetermined time period as part of overall power conservation techniques, timer 370 assists processing unit 300 in managing timing operations. Additionally, an embodiment may allow an ID node to share data to synchronize different nodes with respect to timer 370 and a common timing reference between nodes and the server.

An embodiment may implement ID node 120a to optionally include a basic user interface (UI) 305 indicating status and allowing basic interaction like start/stop. In one embodiment, the UI 305 may be implemented with status lights, such as multi-mode LEDs. Different colors of the lights may indicate a different status or mode for the ID node 120a (e.g., an advertising mode (broadcasting), a scanning mode (listening), a current power status, a battery level status, an association status, an error, as sensed condition (e.g., exceeding a temperature threshold, exceeding a moisture threshold, and the like)). Other embodiments of an ID node may implement U! 305 in a more sophisticated manner with a graphics display or the like where such status or mode information may be displayed as well as one or more prompts.

In a further embodiment, an exemplary status light used as part of the UI 305 of an ID node may also indicate a shipment state. In more detail, an exemplary shipment state may include a status of the shipped item or a status of the item's current shipment journey from an origin to a destination.

An embodiment may also implement ID node 120a to optionally include one or more sensors 360. In some embodiments, an ID node implemented with one or more sensors 360 may be referred to as a Sensor node. Examples of sensor 360 may include one or more environmental sensors (e.g., pressure, movement, light, temperature, humidity, magnetic field, altitude, attitude, orientation, acceleration, etc.) and dedicated location sensors (e.g., GPS sensor, IR sensor, proximity sensor, etc.). Those skilled in the art will understand that additional types of sensors that measure other characteristics are contemplated for use as sensor 360. Additionally, those skilled in the art will understand that a Sensor node may include additional program features to manage the collection, storage, sharing, and publication of the captured sensor data.

An embodiment may further implement ID node 120a to optionally include one or more magnetic switches 365. A magnetic switch 365, such as a reed switch, generally operates to close or open an electrical path or connection in response to an applied magnetic field. In other words, magnetic switch 365 is actuated by the presence of a magnetic field or the removal of a magnetic field. Various applications, as discussed in embodiments described in more detail below, may involve the operation of ID node 120a having magnetic switch 365.

Consistent with the embodiment shown in FIG. 3, exemplary ID node 120a may be implemented based upon a Texas Instruments CC2540 Bluetooth® Low Energy (BLE) System-on-Chip, which includes various peripherals (e.g., timer circuitry, USB, USART, general-purpose I/O pins, IR interface circuitry, DMA circuitry) to operate as an ID node and, if necessary, to interface with different possible sensors and other circuitry (e.g., additional logic chips, relays, magnetic switches) that make up the ID node.

In additional embodiments, one skilled in the art will appreciate that similar functionality in an ID node may be implemented in other types of hardware. For example, ID node 110a may be implemented with specially optimized hardware (e.g., a particular application specific integrated circuit (ASIC) having the same operational control and functionality as node control and management code, as described below, discrete logic, or a combination of hardware and firmware depending upon requirements of the ID node, such as power, processing speed, level of adjustability for the RF characteristics, number of memory storage units coupled to the processor(s), cost, space, etc.

As noted above, ID node 120a includes memory accessible by the processing unit 300. Memory storage 315 and volatile memory 320 are each operatively coupled to processing unit 300. Both memory components provide programming and data elements used by processing unit 300. In the embodiment shown in FIG. 3, memory storage 315 maintains a variety of program code (e.g., node control and management code 325) and other data elements (e.g., profile data 330, security data 335, association data 340, shared data 345, sensor data 350, and the like). Memory storage 315 is a tangible, non-transient computer readable medium on which information (e.g., executable code/modules, node data, sensor measurements, etc.) may be kept in a non-volatile and non-transitory manner. Examples of such memory storage 315 may include a hard disk drive, ROM, flash memory, or other media structure that allows long term, non-volatile storage of information. In contrast, volatile memory 320 is typically a random access memory (RAM) structure used by processing unit 300 during operation of the ID node 120a. Upon power up of ID node 120a, volatile memory 320 may be populated with an operational program (such as node control and management code 325) or specific program modules that help facilitate particular operations of ID node 120a. And during operation of ID node 120a, volatile memory 320 may also include certain data (e.g., profile data 330, security data 335, association data 340, shared data 345, sensor data 350, and the like) generated as the ID node 120a executes instructions as programmed or loaded from memory storage 315. However, those skilled in the art will appreciate that not all data elements illustrated in FIG. 3 must appear in memory storage 315 and volatile memory 320 at the same time.

Node Control & Management Code

Generally, an embodiment of node control and management code 325 is a collection of software features implemented as programmatic functions or program modules that generally control the behavior of a node, such as ID node 120a. In an embodiment, the functionality of code 325 may be generally similar as implemented in different types of nodes, such as a master node, an ID node, and a sensor node. However, those skilled in the art will appreciate that while some principles of operation are similar between such nodes, other embodiments may implement the functionality with some degree of specialization or in a different manner depending on the desired application and use of the node.

In a general embodiment, exemplary node control and management code 325 may generally comprise several programmatic functions or program modules including (1) a node advertise and query (scan) logic manager (also referred to herein as a node communications manager), which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; and (4) an association manager focusing on how the node associates with other nodes. What follows is description of various embodiments of these basic program modules used by nodes.

Node Communications Manager—Advertising & Scanning

In an exemplary embodiment, the node advertise and query (scan) logic manager governs how and when a node should advertise (transmit) its address or query (scan) for the address of neighboring nodes. Advertising is generally done with a message, which may have different information in various parts (e.g., headers, fields, flags, etc.). The message may be a single or multiple packets.

In the exemplary embodiment, the "advertise" mode (as opposed to "query" or "scan" mode) is a default mode for an ID Node and has the node broadcasting or transmitting a message with its address and related metadata regarding the node. For example, in one embodiment, exemplary metadata may include information such as the RF output power level, a reference number, a status flag, a battery level, and a manufacturer name for the node.

Figure 6:
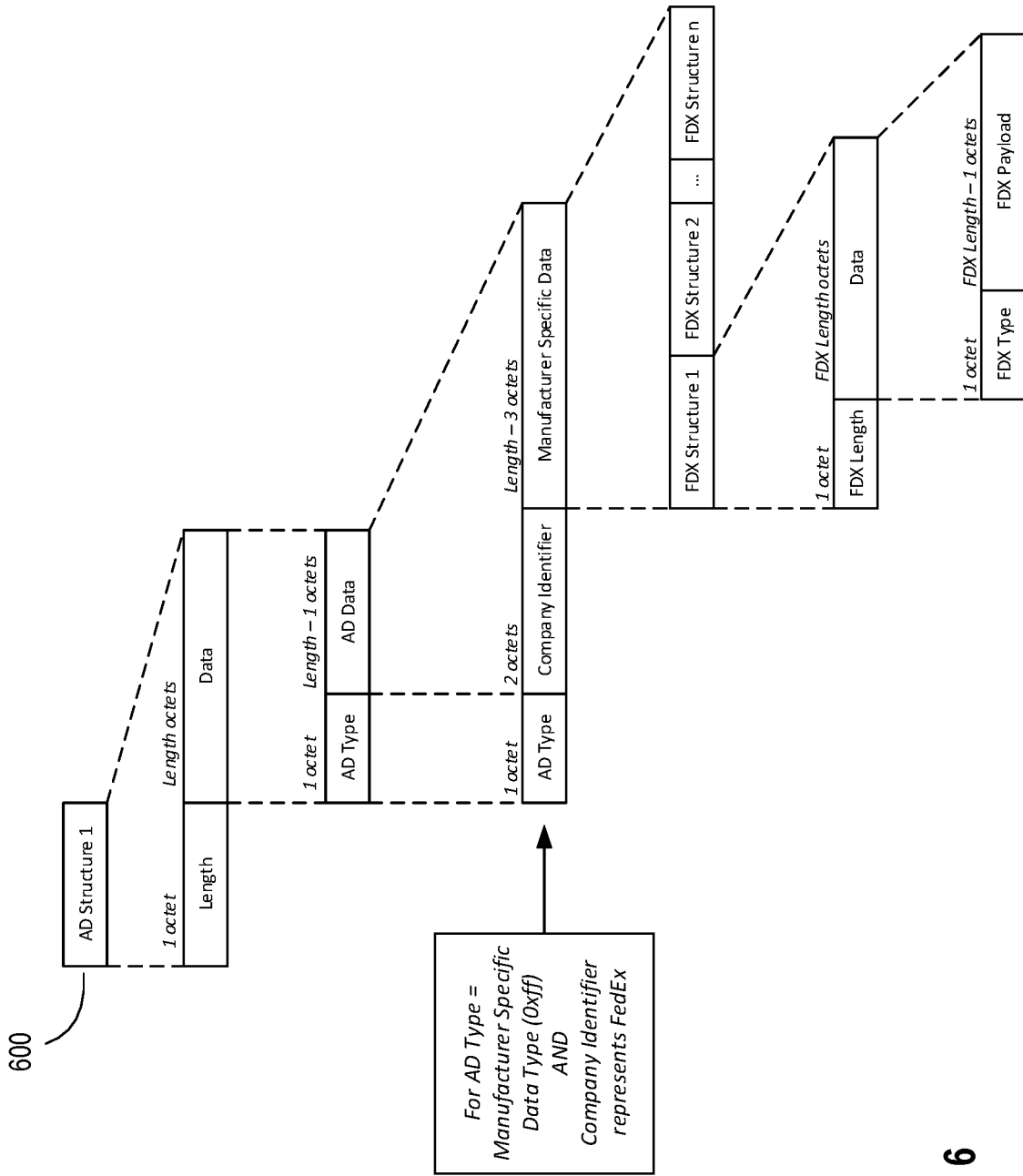
FIG. 6 is a diagram illustrating the structure or format of an exemplary advertisement data packet in accordance with an embodiment of the invention.

FIG. 6 is a diagram illustrating the structure or format of an exemplary advertisement data packet in accordance with a general embodiment of the invention. Referring now to FIG. 6, the structure of an exemplary advertisement data packet 600 broadcast as a signal or message from an ID node, such as ID node 120a, is shown. Packet 600 appears with an increasing level of detail showing exemplary metadata and a format that separately maintains distinct types of metadata in different parts of the packet. Different embodiments may include different types of metadata depending on the deployed application of the ID node.

Figure 7:
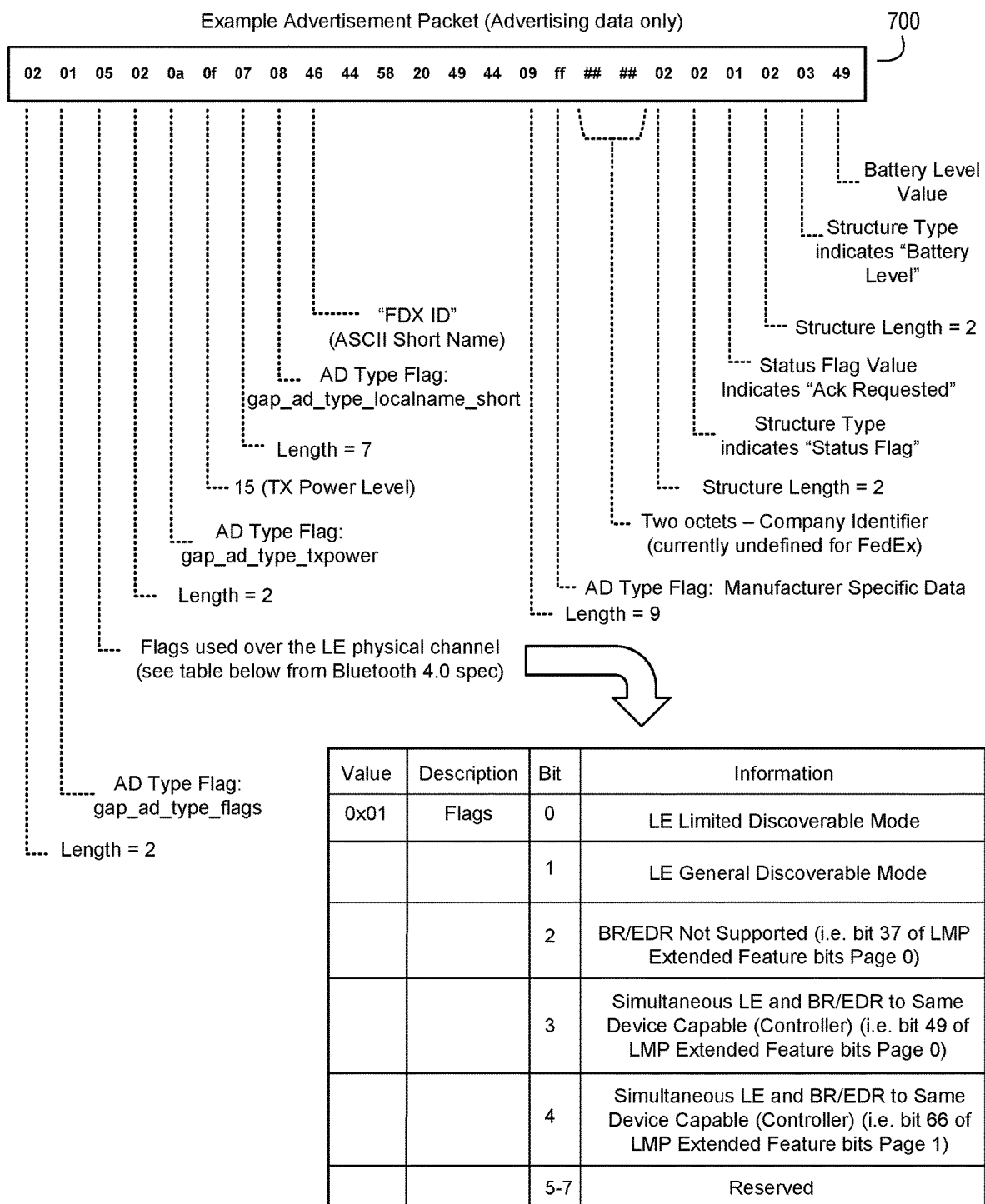
FIG. 7 is a diagram illustrating sample content for an exemplary advertisement data packet in accordance with an embodiment of the invention.

FIG. 7 is a diagram illustrating sample content for an exemplary advertisement data packet in accordance with an embodiment of the invention. Referring now to FIG. 7, an exemplary advertisement data packet 700 is illustrated with exemplary metadata including showing sample information such as the RF Output Power level (e.g., "TX Power Level"), a reference number (e.g., "'FDX ID' (ASCII Short Name)", a status flag (e.g., "Status Flag Value (indicates 'Ack Requested')"), a battery level (e.g., "Battery Level Value (Indicates 73% charge)", and a manufacturer name for the node (e.g., "Company Identifier (currently undefined for FedEx)"). In one embodiment, those skilled in the art will appreciate that the reference number may be omitted or obfuscated for security purposes.

In one embodiment, an exemplary advertising data packet may include the RF Output power level, as noted above in FIG. 7, to enable one way to help identify the type of node doing the broadcasting and the location of the broadcasting node. However, if the broadcast RF output power level is fixed and known by the node type, only the node type need be identifiable from an exemplary advertising data packet, such as packet 700.

Regarding how a node communicates, an exemplary node may be in one of several different communication modes. A node in an advertising (or transmit or broadcast) mode is visible to any other node set in a query (or scan or listen) mode. In an embodiment, the frequency and length of advertising may be application and power dependent. For example, in normal operations, an exemplary node will generally advertise in a periodic manner and expect to make an active connection to another node at certain intervals, which may be dictated by conditions set by server 100. In an embodiment, such conditions may be set individually for a node by the server or a higher level node in the network.

If an exemplary node has not received acknowledgement for an advertising packet within a particular period, it may enter one or more alert stages. For example, if an exemplary node has not received acknowledgement from another node for an advertising packet broadcast by the exemplary node within a particular time period (also generally referred to as an Alert Interval), the exemplary node will enter an Alert Stage 1 status. This prompts the exemplary node to issue a follow-up advertising packet having one or more parts of it altered to indicate the Alert Stage 1 status. In more detail, this exemplary follow-up advertising packet may have a different advertising alert header instructing nearby nodes to send a SCAN_REQ message upon receiving an advertisement packet.

If an exemplary node has not received acknowledgement from a master node for an advertising packet broadcast by the exemplary node within another time period (e.g., a request from the master node to actively connect and a success connection made), it will enter another alert stage, such as an Alert Stage 2 status. This prompts the exemplary node to issue a follow-up advertising packet having one or more parts of it altered to indicate the Alert Stage 2 status. In more detail, this exemplary follow-up advertising packet may have a different advertising alert header instructing nearby master nodes to send a SCAN_REQ message upon receiving an advertisement packet.

If an exemplary node has data to upload to the backend, it may also enter another type of alert stage. In one embodiment, for example, if an exemplary node has sensor data collected by the exemplary node (or received from one or more other nodes that have communicated with the exemplary node), and the data needs to be uploaded to server 100, the exemplary node may enter an update alert stage, such as an Alert Stage 3. This prompts the exemplary node to issue a follow-up advertising packet having one or more parts of it altered to indicate the Alert Stage 3 status. In more detail, this exemplary follow-up advertising packet may have a different advertising alert header instructing nearby master nodes to make a connection with the exemplary node so that the data (e.g., sensor data 350) may be transmitted from the exemplary node (e.g., ID node 120a) to a nearby master node (e.g., master node 110a). The transmitted data may then be stored by the nearby master node as sensor data 450 in either or both of the master node's volatile memory 420 and memory storage 415. Subsequent to that storage operation, the nearby master node will transfer the data (e.g., sensor data 450) to server 100.

As illustrated in FIG. 7 and explained in the above description of alert level stages, a status flag in a header of an exemplary advertising data packet is a field used in the association logic in one or more embodiments. For example, in one embodiment, the existence of a status flag in the advertising data packet allows a first node to communicate its status to a second node, and for the second node to report that status to the backend server, such as server 100, without an active direct connection from the first node to the server. In other words, the status flag helps facilitate passive interactions between nodes (such as passive associations).

In a more detailed embodiment, several exemplary status types are established with respect to communications with other nodes. For example, the exemplary status types may comprise the following:

Alert Level 0—no issue, operating normal;
Alert Level 1—The advertising node is requesting that any available node acknowledge the receipt of its advertisement packet;
Alert Level 2—The advertising node is requesting that any available master node acknowledge the receipt of its advertisement packet;
Alert Level 3—Data for Upload—node has captured data available for upload through a master node; and
Synchronize—The advertising node requests to connect with a device or sensor that can synchronize data (such as timer or location information).

By broadcasting the status via, for example, a portion of a header in an advertising data packet, one or more nodes within range of the broadcasting node can determine the node's status and initiate active connections if requested in the status message.

A request for more information from the advertising node may, in some embodiments, come in the form of a SCAN_REQ message. In general, an exemplary SCAN_REQ is a message sent from a scanning (listening) master node to an advertising node requesting additional information from the advertising node. In this example, the alert status bit may indicate to the scanning master node, for example, at an application layer, whether the advertising node is in a mode that will or will not accept a SCAN_REQ. In one embodiment, the non-connectable and discoverable modes of node advertising are in compliance with Bluetooth® Low Energy (BLE) standards.

In another embodiment, a node may have further different modes of operation while scanning or listening for other nodes. For example, a node's query or scanning mode may be active or passive. When a node is scanning while passive, the node will receive advertising data packets, but will not acknowledge and send SCAN_REQ. However, when a node is scanning while active, the node will receive advertising data packets, and will acknowledge receipt by sending a SCAN_REQ. A more detailed embodiment may provide the passive and active modes of scanning or inquiry in compliance with Bluetooth® Low Energy (BLE) standards.

In an embodiment, an exemplary node is scanning as it listens for other wireless nodes broadcasting on the short-range radio. An exemplary scanning node may capture, for example, a MAC address of the advertising node, a signal strength of the RF output signal transmitted from the advertising node, and any other metadata published by the advertising node (e.g., other information in the advertising data packet). Those skilled in the art will appreciate that the scope of "listening" when a node is scanning may vary. For example, the query may be limited. In other words, the scope of what a node is particularly interested in and for which it is listening may be focused or otherwise limited. In such a case, for example, the information collected may be limited to particular information from a targeted population of short-range wireless nodes advertising; but the information collection may be considered "open" where information from any advertising device is collected.

When nodes are advertising or scanning, an embodiment may make further use of status flags and additional modes when advertising or scanning as part of how nodes communicate and may be managed. In one example, when a scanning (listening) node receives an advertising data packet with the status flag indicating an Alert Level 1 or 2 status, and the scanning node is in "Passive" scanning mode, the node will switch to "Active" scanning mode for some interval. However, when the scanning node in this situation is already in an "Active" scanning mode, the node will send the SCAN_REQ message and receive a SCAN_RSP from the advertising node (e.g., a message providing the additional information requested from the advertising node). The scanning node will then switch back to a "Passive" scanning mode.

In another example, when an advertising (broadcasting) node receives a SCAN_REQ from a scanning node, the advertising node will consider that its advertising data packet has been acknowledged. Further, the advertising node will reset its "Alert" status flag back to an Alert Level 0 status. This allows the advertising node to effectively receive an acknowledgement to its advertisement without ever making a connection to the scanning node, which advantageously and significantly saves on power consumption.

In yet another example, when a scanning node receives an advertising data packet with an Alert Level 3 status flag set, the scanning node will attempt to make a connection with the advertising device. Once the connection is made, the advertising device will attempt to upload its data to the connected device.

Thus, an embodiment of the node advertise and query (scan) logic manager of code 325 may rely upon one or more status flags, advertising modes, scanning modes, as nodes communicate with each other in various advantageous manners.

Node Information Control & Exchange Manager

In an exemplary embodiment, the information control and exchange manager part of node control and management code 325 determines whether and how information may be exchanged between nodes. In the exemplary embodiment, the information control and exchange manager establishes different node operational states where information may be changed according to a desired paradigm for the state. In more detail, an embodiment of information control and exchange manager may establish different levels of information exchange between nodes with a "non-connectable advertising" state or mode of operation, a "discoverable advertising" state or mode, and a "general advertising" state or mode operation. When a node is in the "non-connectable advertising" mode, the node information exchange is limited. For example, the advertising node may broadcast information that is captured by one or more querying (scanning) nodes, but no two-way exchange of information happens.

When a node is in the "discoverable advertising" mode and a scanning node is in "Active" mode, the node information exchange in enabled both ways. For example, the advertising node sends the advertising packet, and in response the scanning node sends the SCAN_REQ packet. After the advertising node receives the SCAN_REQ requesting additional information, the advertising node sends the SCAN_RSP with the requested information. Thus, in the "discoverable advertising" mode there is a two-way exchange of information, but no active connection is made between the two nodes exchanging information.

Finally, for advanced two-way information exchange, an active connection may be used between nodes and information may be exchanged both ways to and from different nodes. In a more detailed embodiment, at this level of two-way information exchange, nodes are first identified and then authenticated as part of establishing the active connection. Once authenticated and thereafter actively connected to each other, the nodes may securely share information back and forth. In one example, a sensor node uploading previously captured environmental information to a master node may be in this mode or state. In another example, an ID node uploading the stored results of a node scanning operation to a master node may be in this mode or state. In yet another example, a master node sharing a timer and/or location information with corresponding nodes may be in this mode or state.

Node Power Manager

In an exemplary embodiment, the node power manager part of node control and management code 325 focuses on managing power consumption and the advantageous use of power (e.g., an adjustable level of RF output signal power) in a node. In general, nodes are either powered by a battery (such as battery 355 in an ID node), or by an interface (such as battery/power interface 470 in a master node) to an external power source. Examples of an external power source may include, in some embodiments, power supplied from an outlet or power connection within a facility, or power generated onboard a conveyance (e.g., automobile, truck, train, aircraft, ship, etc.). Those skilled in the art will appreciate that an interface to an external power source will be generally referred to as a "wired" power connection, and that node power manager may be informed whether a node is wired or powered off a battery, such as battery 355. Further embodiments may implement an interface to an external power source with wireless power transmission, such as via inductive coils.

In one embodiment, a node may manage power used when performing tasks. For example, a node may manage power when determining which node should perform a particular task. In more detail, the collective power consumption of a group of devices may be managed by electing to employ wired nodes, when feasible or desired, to accomplish a particular task, and saving the battery-powered nodes for other less energy burdensome or taxing tasks. In another embodiment, historic data may inform the system of the power needed to accomplish a particular task, and the system may make a determination of which node should accomplish the particular task based upon such historic data. In other embodiments, profile data may also be used to inform the system of the power needed to accomplish a particular task (e.g., a sensor profile that describes power requirements for operation of a sensor node that gathers sensor data over a certain period of time and under certain conditions). The system may also make a determination of which node should accomplish the particular task based upon such profile data.

In another example, the exemplary node power manager may manage power when determining how to best to use and adjust power to more accurately accomplish a particular task. In one embodiment, an RF signal output from a node (such as a short-range RF output signal from an ID node) may periodically move through a range of output power or simply switch between two or more settings that differ in a detectable manner. As disclosed in more detail below, the variability and dynamic adjustment of RF output signal power may allow other nodes (such as one or more master nodes) to see each node at the upper range of the RF output signal power, and only see nodes physically close to the advertising node at the lower range of signal power.

In another example, the exemplary node power manager may cause a change to a characteristic of its RF output signal power when the node has been associated to a physical place or another node by virtue of context data (such as context data 560 and association logic that utilizes that type of information). In one embodiment, the node may be instructed to change how often the node communicates and/or a characteristic of its RF output power to preserve power.

In yet another example, all advertising nodes may have their respective node power managers periodically cause each respective node to broadcast at a maximum RF output signal power level to ensure they still are within range of a scanning ID Node or Master Node. Doing so may increase the chance of being in communication range and allows the individual nodes to be properly located and managed within the network. The broadcast duration may be set or dynamically changed to allow pairing to occur if needed.

Rather than adjust the RF output signal power level, the exemplary node power manager may, in some embodiments, adjust the RF receiver sensitivity of a node. This allows for an adjustable range of reception (as opposed to merely an adjustable range of broadcast), which may similarly be used to manage power and enhance location determinations as discussed herein.

In yet another embodiment, a combination approach may be used in which the node power manager may concurrently and independently adjust more than one RF characteristic of a node. For example, an exemplary node power manager may adjust an RF output signal power level and also adjust the RF receiver sensitivity of a node as the node is located and associated with other nodes. Those skilled in the art will realize that this may be especially useful in an area with an unusually dense concentration of nodes, and a combination of changing RF output signal power levels.

An embodiment of the exemplary node manager may refer to a power profile (e.g., an exemplary type of profile data 330, 430) when adjusting a node's power characteristics (e.g., consumption of power, use of power, output signal frequency, duty cycle of the output put signal, timing, power levels, etc.).

Node Association Manager

In an exemplary embodiment, the node association manager part of node control and management code 325 focuses on how the nodes associate with other nodes in conjunction and consistent with the server-side association manager in code 525, as discussed in more detail below. Thus, exemplary node association manager, when executing in a node, directs how the node associates (e.g., enters an active connection mode) with one or more other nodes with input from the server.

The exemplary node association manager for a node may indicate through a Status Flag if the node requires an acknowledgement or connection, or if it has information available for upload to the backend. Thus, while a node may not be associated or actively connected yet to another node, a status of the node may be inferred from, for example, the status information in the node's broadcast header.

Regarding connections between nodes, there are generally secure connections and unsecure connections. While an embodiment may allow unsecure connections between one or more sets of nodes, other embodiments rely upon secure connections or authenticate pairings of nodes. In one embodiment, for a node to pair with another node, the exemplary node association manager first identifies the nodes to be associated and transmits an association request to the server. The request may include a specific request to pair the nodes and ask for the corresponding pairing credentials from the server, such as server 100. The server 100 may have staged pairing credentials on particular nodes based on information indicating the nodes would be within wireless proximity and future pairing may occur. Visibility to the node relationship may have been determined through scan-advertising, or $3^{rd}$ party data such as barcode scan information indicating the nodes to be within proximity currently or at a future state.

When connecting or not connecting to exchange information under the exemplary node information exchange modes described above, nodes generally operate in a number of states, which make up an exemplary advertise cycle for an exemplary ID node. Such an exemplary advertise cycle for a node is further explained below with reference to FIG. 8 and in conjunction and consistent with the server-side association manager in code 525, as discussed in more detail below.

Airborne Mode Program Module

In one embodiment, node control and management code 325 may also include an airborne mode program module (not shown). In another embodiment, the airborne mode program module may be implemented as a part of the node power manager program module of code 325. An exemplary airborne mode program module generally operates to manage the output power of the ID node's variable power short-range communication interface 375 when the ID node is operating in an aircraft. Operating a wireless device within an aircraft may, in some circumstances, have an unintentional impact on other electronic systems on the aircraft. In more detail, an embodiment of the airborne mode program module may operate to transition the ID node from different states or modes depending upon particular operations and/or operational conditions of the aircraft. For example, an exemplary airborne mode program module may operate to transition the ID node from one state or mode (e.g., a normal mode prior to takeoff, a disabled mode during takeoff, an airborne mode while aloft, a disabled mode during descent, and a normal mode after landing) based upon detected environmental conditions (e.g., pressure, altitude) and/or flight detail information associated with the aircraft. In this way, an ID node may be allowed to normally operate when onboard an aircraft, be disabled from operating at all in some circumstances, and be able to operate in an airplane mode that allows sensing and sensor data capture, but that may limit transmission of an RF output signal to avoid interference with the aircraft's onboard electronics. Further information related to a method of managing a wireless device (such as an ID node) in an aircraft is disclosed in greater detail in U.S. patent application Ser. No. 12/761,963 entitled "System and Method for Management of Wireless Devices Aboard an Aircraft," which is hereby incorporated by reference.

Node Data

As previously noted, volatile memory 320 may also include certain data (e.g., profile data 330, security data 335, association data 340, shared data 345, sensor data, and the like) generated as the ID node 120a executes instructions as programmed or loaded from memory storage 315. In general, data used on a node, such as an ID node, may be received from other nodes or generated by the node during operations.

In one embodiment, profile data 330 is a type of data that defines a general type of behavior for an ID node, such as a Broadcast Profile (discussed in more detail below). In another embodiment where ID node 120a is a BLE device, profile data 330 may include a Bluetooth® compatible profile related to battery service (exposing the state of a battery within a device), proximity between BLE devices, or messaging between BLE devices. Thus, exemplary profile data 330 may exist in volatile memory 320 and/or memory storage 315 as a type of data that defines parameters of node behavior.

In one embodiment, it may be desired to allow secured pairings of nodes. As will be explained in more detail below, as part of secure pairing of nodes, a request for pairing credentials is generated and sent to server 100. Thus, exemplary security data 335 (e.g., PIN data, security certificates, keys, etc.) may exist in volatile memory 320 and/or memory storage 315 as a type of data associated with providing secured relationships between nodes, such as the requested security credentials.

Association data, such as association data 340, generally identifies a connected relationship between nodes. For example, ID node 120a may become associated with the master node 110a as the ID node 120a moves within range of the master node 110a and after the server directs the two nodes to associate (with authorization). As a result, information identifying the relationship between ID node 120a and master node 110a may be provided to server 100 and may be provided, as some point, to each of ID node 120a and master node 110a. Thus, exemplary association data 340 may exist in volatile memory 320 and/or memory storage 315 as a type of data identifying associations between nodes.

Shared data 345 may exist in volatile memory 320 and/or memory storage 315 as a type of data exchanged between nodes. For example, context data (such as environmental data) may be a type of shared data 345.

Sensor data 350 may also exist in volatile memory 320 and/or memory storage 315 as a type of data recorded and collected from an onboard sensor or from another node. For example, sensor data 350 may include temperature readings from a temperature sensor onboard an ID node and/or humidity readings from a humidity sensor in another ID node (e.g., from another of the ID nodes within container 210 as shown in FIG. 2).

Thus, an ID node (such as node 120a shown in FIG. 3) is a lower cost wireless node that communicates with other ID nodes and master nodes via a short-range radio with variable RF characteristics, can be associated with other nodes, can broadcast to and scan for other nodes, associated with other nodes, and store/exchange information with other nodes.

Master Node

Figure 4:
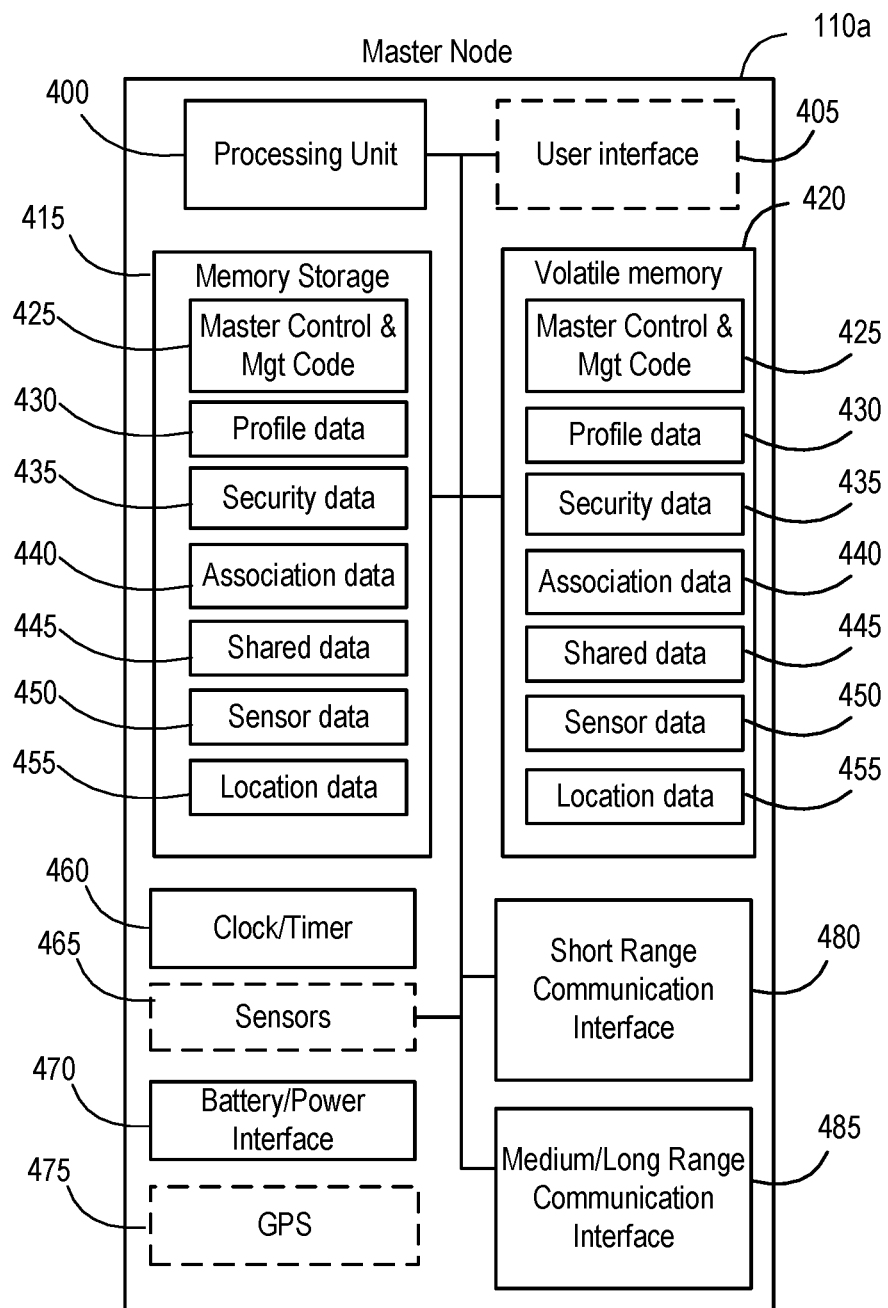
FIG. 4 is a more detailed diagram of an exemplary master node device in accordance with an embodiment of the invention.

A master node, such as master node 110a shown in more detail in FIG. 4, shares many ID node features but generally expands upon them in order to function as a bridge to the server 100. In general, while an ID node is a type of lower level node in an exemplary wireless node network, a master node is a type of higher level node. An exemplary master node may be in a fixed location or otherwise stationary, while other example master nodes may be implemented as movable and mobile devices.

Referring now to FIG. 4, exemplary master node 110a comprises a processing or logic unit 400 coupled to a short-range communication interface 480, memory storage 415, volatile memory 420, clock/timer 460, and battery/power interface 470. In some embodiments, the short-range communication interface 480 may have variable power characteristics, such as receiver sensitivity and RF output power level. Those skilled in the art will appreciate that processing unit 400 is logic, such as a microprocessor or microcontroller, which generally performs computations on data and executes operational and application program code and other program modules within the master node 110a.

In general, those skilled in the art will appreciate that the description of hardware with respect to ID node 110a in FIG. 4 applies to the similar hardware and software features appearing in each type of node, including a master node. Those skilled in the art will appreciate that exemplary master node 110a is a hardware-based component that may implement processor 400 with a single processor or logic unit, a more powerful multi-core processor, or multiple processors depending upon the desired implementation. In one embodiment, processing unit 400 may be implemented with a low power microprocessor and associated peripheral circuitry. Less complex microcontrollers or discrete circuitry may be used to implement processing unit 400 as well as more complex and sophisticated general purpose or dedicated purpose processors.

In yet another embodiment, exemplary processing unit 400 may be implemented by a low power ARM1176JZ-F application processor used as part of a single-board computer, such as the Raspberry Pi Computer Model B-Rev-2. The ARM application processor is embedded within a Broadcom® BCM2835 system-on-chip (SoC) deployed in the Raspberry Pi Computer. In this embodiment, the Raspberry Pi Computer device operates as a core of exemplary master node 110a and includes a Secure Digital memory card slot and flash memory card operating as memory storage 415, a 512 Mbyte RAM memory storage operating as volatile memory 420, an operating system (such as Linux) stored on memory storage 415 and running in volatile memory 420, and peripherals that implement clock/timer 460, and a power supply operating as a power interface 470.

Like short-range interface 375 in ID node 120a, exemplary master node 110a includes a short-range communication interface 480 as a programmable radio and an omni-directional antenna coupled to the processing unit 400. In some embodiments, the short-range communication interface 480 may have variable RF power characteristics, such as receiver sensitivity and/or RF output signal power level. In some embodiments, interface 480 may use an antenna with a different antenna profile when directionality may be desired. Examples of short-range communication interface 480 may include other hardware (not shown) for operatively coupling the device to a specific short-range communication path (e.g., a Bluetooth® Low Energy (BLE) connection path communicating at 2.4 GHz). While BLE is used in one embodiment to enable a short-range communication protocol, variable power short-range interface 480 may be implemented with other low power, short-range communication protocols, such as ultra-low power communication protocols used with ultra-wideband impulse radio communications, ZigBee protocols, IEEE 802.15.4 standard communication protocols, and the like.

In one embodiment, various RF characteristics of the radio's transceiver, such as the RF output power and the RF receiver sensitivity may be dynamically and programmatically varied under control of processing unit 400. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal as needed depending upon a desired implementation and anticipated use of exemplary master node 110a. In other words, embodiments of master node 110a (or any other master node) may have programmatically adjustable RF characteristics (such as an adjustable RF output signal power, an adjustable RF receiver sensitivity, the ability to switch to a different frequency or frequency band, etc.).

In addition to the short-range communication interface 480, exemplary master node 110a includes a medium and/or long-range communication interface 485 to provide a communication path to server 100 via network 105. Those skilled in the art will appreciate that in some embodiments, an exemplary communication interface deployed may be considered to embody a short-range communication interface (such as interface 480) or a medium/long range communication interface (such as interface 485). However, in more general embodiments, reference to a communication interface may include an interface that collectively implements a plurality of different exemplary data communication interfaces while still being generally referenced as "a communication interface" or "wireless communication interface."

In one embodiment, communication interface 485 may be implemented with a medium range radio in the form of an IEEE 802.11g compliant Wi-Fi transceiver. In another embodiment, communication interface 485 may be implemented with a longer range radio in the form of a cellular radio. In yet another embodiment, both a Wi-Fi transceiver and a cellular radio may be used when best available or according to a priority (e.g., first attempt to use the Wi-Fi transceiver if available due to possible lower costs; and if not, then rely on the cellular radio). In other words, an embodiment may rely upon the longer range cellular radio part of interface 485 as an alternative to the medium range Wi-Fi transceiver radio, or when the medium range radio is out of reach from a connecting infrastructure radio within network 105. Thus, in these embodiments, medium and/or long-range communication interface 485 may be used to communicate captured node information (e.g., profile data 430, association data 440, shared data 445, sensor data 450, and location data 455) to server 100.

The battery/power interface 470 for master node 110a generally powers the circuitry implementing master node 110a. In one embodiment, battery/power interface 470 may be a rechargeable power source. For example, a master node may have a rechargeable power source along with a solar panel that charges the power source in order to help facilitate deployment of the master in a remote location. In another embodiment, battery/power interface 470 may be a non-rechargeable power source intended to be disposed of after use. In yet another embodiment, battery/power interface 470 may be a power interface connector (such as a power cord and internal power supply on master node 110a). Thus, when an exemplary master node is in a fixed or stationary configuration, it may be powered by a power cord connected to an electrical outlet, which is coupled to an external power source. However, other mobile master nodes may use an internal power source, such as a battery.

The clock/timer 460 for master node 110a generally provides one or more timing circuits used in, for example, time delay, pulse generation, and oscillator applications. In an embodiment where master node 110a conserves power by entering a sleep or dormant state for a predetermined time period as part of overall power conservation techniques, clock/timer 460 assists processing unit 400 in managing timing operations.

Optionally, an embodiment may also implement master node 110a as including one or more sensors 465 (similar to sensors deployed on ID node based Sensor nodes and described above with respect to FIG. 3). Additionally, an embodiment of master node 110a may also provide a user interface 405 to indicate status and allow basic interaction for review of captured node data and interaction with nodes and server 100. In one embodiment, user interface 405 may provide a display, interactive buttons or soft keys, and a pointing device to facilitate interaction with the display. In a further embodiment, a data entry device may also be used as part of the user interface 405. In other embodiments, user interface 405 may take the form of one or more lights (e.g., status lights), audible input and output devices (e.g., a microphone and speaker), or touchscreen.

As previously noted, an exemplary master node, such as master node 110a, may be positioned in a known fixed location or, alternatively, includes dedicated location positioning circuitry 475 (e.g., GPS circuitry) to allow the master node self-determine its location or to determine its location by itself. In other embodiments, alternative circuitry and techniques may be relied upon for location circuitry 475 (rather than GPS), such as location circuitry compatible with other satellite-based systems (e.g., the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems).

Regarding memory storage 415 and volatile memory 420, both are operatively coupled to processing unit 400 in exemplary master node 110a. Both memory components provide program elements used by processing unit 400 and maintain and store data elements accessible to processing unit 400 (similar to the possible data elements stored in memory storage 315 and volatile memory 320 for exemplary ID node 120a).

In the embodiment shown in FIG. 4, memory storage 415 maintains a variety of executable program code (e.g., master control and management code 425), data similar to that kept in an ID node's memory storage 315 (e.g., profile data 430, security data 435, association data 440, shared data 445, sensor data 450, and the like) as well as other data more specific to the operation of master node 110a (e.g., location data 455 that is related to the location of a particular node). Like memory storage 315, memory storage 415 is a tangible, non-transient computer readable medium on which information (e.g., executable code/modules, node data, sensor measurements, etc.) may be kept in a non-volatile and non-transitory manner.

Like volatile memory 320 in ID node 120a, volatile memory 420 is typically a random access memory (RAM) structure used by processing unit 400 during operation of the master node 110a. Upon power up of master node 110a, volatile memory 120 may be populated with an operational program (such as master control and management code 425) or specific program modules that help facilitate particular operations of master node 110a. And during operation of master 110a, volatile memory 420 may also include certain data (e.g., profile data 430, security data 435, association data 440, shared data 445, sensor data 450, and the like) generated as the master node 110a executes instructions as programmed or loaded from memory storage 415.

Master Control & Management Code

Generally, an embodiment of master control and management code 425 is a collection of software features implemented as programmatic functions or program modules that generally control the behavior of a master node, such as master node 110a. In one embodiment, master control and management code 425 generally comprises several programmatic functions or program modules including (1) a node advertise and query (scan) logic manager, which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; (4) an association manager focusing on how the node associates with other nodes; and (5) a location aware/capture module to determine node location.

Master Node Program Modules and ID Node Modules

In an exemplary embodiment, program modules (1)-(4) of master node control and management code 425 generally align with the functionality of similarly named program modules (1)-(4) of node control and management code 325 as described above with respect to FIG. 3. Additionally, as node control and management code 325 may also comprise an airborne mode program module, those skilled in the art will appreciate and understand that master node control and management code 425 may also comprise a similar functionality airborne mode program module in order to allow advantageous operations of a master node while airborne. However, and consistent with examples set forth below, such modules may have some differences when in a master node compared with those controlling an ID node.

Location Aware/Capture Module

In addition to exemplary program modules (1)-(4) of code 425, an exemplary embodiment of master node control and management code 425 will further comprise an exemplary location aware/capture module related to node location (more generally referred to as a location manager module for a master node). In general, the exemplary location aware/capture module deployed in an exemplary master node may determine its own location and, in some embodiments, the location of a connected node. Embodiments of the exemplary location aware/capture module may work in conjunction with location manager program code residing and operating in a server (e.g., as part of server control and management code 525) when determining node locations of other nodes, as discussed in more detail herein.

In one embodiment, a master node may be positioned in a known, fixed location. In such an embodiment, the exemplary location aware/capture module may be aware that the master node location is a known, fixed location, which may be defined in a fixed, preset, or preprogrammed part of memory storage 415 (e.g., information in the location data 455 maintained in memory storage 415). Examples of such location information may include conventional location coordinates or other descriptive specifics that identify the location of the master node. In another embodiment where the master node may not be inherently known or a fixed location at all times (e.g., for a mobile master node), the exemplary location aware/capture module may communicate with location circuitry, such as GPS circuitry 475 on a master node, to determine the current location of the master node.

In an embodiment, the location of the master node may be communicated to the server, which may use this location information as part of managing and tracking nodes in the wireless node network. For example, if an exemplary master node is mobile and has determined a new current location using location circuitry 475, the master node may provide that new current location for the master node to the server. Additionally, when the master node's exemplary location aware/capture module determines the location of a node associated with the master node, the master node may also provide the location of that node associated with the master node to the server.

Server

Figure 5:
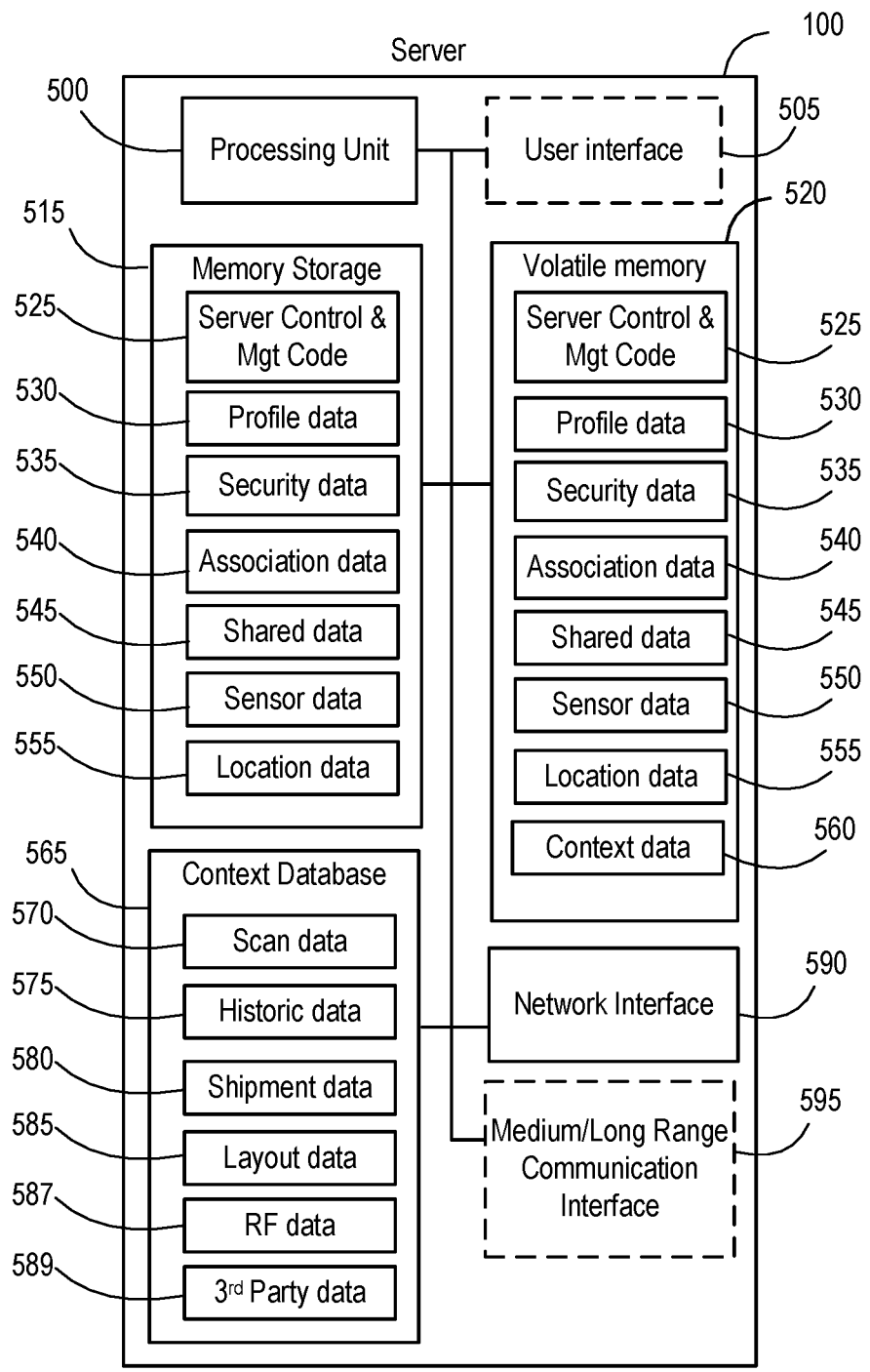
FIG. 5 is a more detailed diagram of an exemplary server in accordance with an embodiment of the invention.

While FIGS. 3 and 4 illustrate details of hardware and software aspects of an exemplary ID node and exemplary master node, respectively, FIG. 5 provides a more detailed diagram of an exemplary server that may operate as part of an exemplary wireless node network in accordance with an embodiment of the invention. In an exemplary embodiment, server 100 may be referred to as an Association and Data Management Server (ADMS) that manages the nodes, collects information from the nodes, stores the collected information from the nodes, maintains or has access to context data related to the environment in which the nodes are operating, and may provide information about the nodes (e.g., status, sensor information, etc.) to requesting entities. Further details on various embodiments that take advantage of this functionality are explained below. Those skilled in the art will appreciate that node density, geographic installation characterization, and network connectively are all types of examples of factors that may impact a final architecture desired for an embodiment of a wireless node network.

Referring now to FIG. 5, exemplary server 100 is shown as a networked computing platform capable of connecting to and interacting with at least the wireless master nodes. In other embodiments, exemplary server 100 is also capable of connecting to and interacting with one or more user access devices. Those skilled in the art will appreciate that exemplary server 100 is a hardware-based component that may be implemented in a wide variety of ways. For example, server 100 may use a single processor or may be implemented as one or more part of a multi-processor component that communicates with devices (such as user access devices 200, 205) and wireless nodes (such as master node 110*a*).

In general, those skilled in the art will further appreciate that server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that logically allows multiple distinct components to function as one server computing platform device from the perspective of a client device (e.g., devices 200, 205 or master node 110*a*). In some regional deployments, an exemplary server may include servers dedicated for specific geographic regions as information collected within different regions may include and be subject to different regulatory controls and requirements implemented on respective regional servers.

Likewise, while the embodiment shown in FIG. 5 illustrates a single memory storage 515, exemplary server 100 may deploy more than one memory storage media. And memory storage media may be in differing non-transitory forms (e.g., conventional hard disk drives, solid state memory such as flash memory, optical drives, RAID systems, cloud storage configured memory, network storage appliances, etc.).

At its core, exemplary server 100 shown in FIG. 5 comprises a processing or logic unit 500 coupled to a network interface 590, which facilitates and enables operative connections and communications through network 105 with one or more master nodes as well as, in some embodiments, user access devices, such as devices 200, 205. In one embodiment, server 100 may include a medium and/or long-range communication interface 595 with which to more directly communicate with one or more master nodes. Using these communication paths as well as program code or program modules (such as server control and management code 525), the server 100 generally operates to coordinate and manage information related to an ID node as an item associated with the ID node physically moves from one location to another.

As a computing platform, the processing unit 500 of exemplary server 100 is operatively coupled to memory storage 515 and volatile memory 520, which collectively store and provide a variety of executable program code (e.g., server control and management code 525), data similar to that kept in a master or ID node's respective memory storage (e.g., profile data 530, security data 535, association data 540, shared data 545, sensor data 550, location data 555) and context data 560 related to the environment in which the nodes are operating (e.g., information generated from within the wireless node network and information created external to the wireless node network).

Like memory storage 315 and storage 415, memory storage 515 is a tangible, non-transient computer readable medium on which information (e.g., executable code/modules (e.g., server control and management code 525), node-related data (e.g., profile data 530, security data 535, association data 540, location data 555, etc.), measurement information (e.g., a type of shared data 545, sensor data 550, etc.), and information on the contextual environment for the nodes (e.g., context data 560) may be kept in a non-volatile and non-transitory manner.

Those skilled in the art will appreciate that the above identification of particular program code and data are not exhaustive and that embodiments may include further executable program code or modules as well as other data relevant to operations of a processing-based device, such as an ID node, a master node, and a server.

Context Data

As noted above, server 100 may access context data 560 as part of managing nodes in the wireless node network. The exemplary server 100 may contain a collection of such context data 560 in a context database 565 according to an embodiment. As illustrated in FIG. 5, exemplary context database 565 is a single database accessible by processing unit 500 internal to server 100. Those skilled in the art will readily understand that other configurations that provide an accessible collection of context data 560 are possible and contemplated within the scope and principles of embodiments of the invention. For example, context database 565 may be an externally accessible database (or multiple databases), such as an accessible storage maintained outside the server 100 via a dedicated interface or a network storage device (or network attached storage (NAS) unit). In yet another embodiment, the context database may be separately maintained by an external database server (not shown) that is distinct from server 100, but accessible through a communication path from server 100 to a separate database server (e.g., via network 105). Furthermore, those skilled in the art will appreciate that context database 565 may be implemented with cloud technology that essentially provides a distributed networked storage of collections of information (such as context data 560, sensor data 550, shared data 545, etc.) accessible to server 100.

Within context database 565, an exemplary embodiment of the collection of context data 560 may be maintained that generally relates to an environment in which the nodes are operating or anticipated to be operating. In more detail, the context data 560 may generally relate to what a similar node has experienced in a similar environment to what a given node is presently experiencing or is anticipated to experience as the given node moves.

Figure 22A:
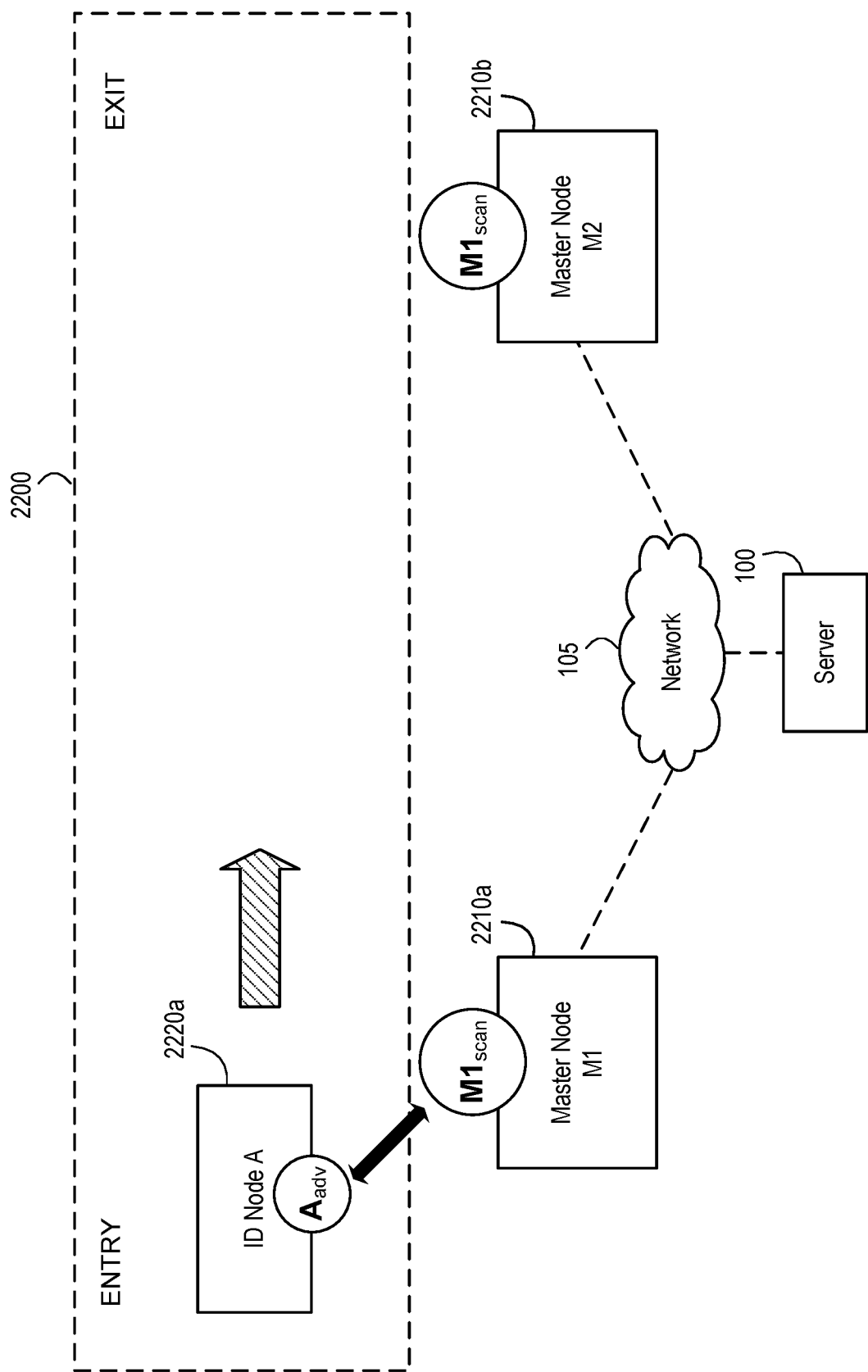
FIGS. 22A-22C are diagrams illustrating exemplary stages of an ID node moving through part of an exemplary transit path while associating with different master nodes in accordance with an embodiment of the invention.

In a general example, an environment in which a node may be actually or anticipated to be operating may include different types of environments—for example, an electronic communication environment (e.g., an RF environment that may be cluttered with signals or include materials or structure that may impede or otherwise shield RF communications), a physical environment of an anticipated path along with the identified node moves (e.g., temperature, humidity, security, and other physical characteristics), a conveyance environment related to how a node may move or be anticipated to be moving (e.g., speed and other parameters of a truck, airplane, conveyor system), and a density environment related to the density of nodes within an area near a particular node (e.g., how many nodes are anticipated to occupy a corridor, such as structure 2200 shown in FIG. 22A, or a storage facility through which a particular ID node is anticipated to transit on its shipping path).

In light of these different aspects of a node's operating environment, exemplary context data 560 may provide information related to different structures and conditions related to movement of an item (e.g., a particular type of courier device, vehicle, facility, transportation container, etc.). Such information may be generated by an entity operating the wireless node network, such as a shipping company. Additionally, exemplary context data 560 may include third party data generated external to the wireless node network. Thus, context data, such as data 560, may include a wide variety of data that generally relates to the environment in which the nodes are operating and may be used to advantageously provide enhanced node management capabilities in accordance with embodiments of the present invention.

In general, FIG. 5 illustrates exemplary types of context data 560 being maintained in database 565 and in volatile memory 520. Those skilled in the art will appreciate that context data 560 may also be maintained in other data structures, in addition to or instead of maintaining such information in a database. As illustrated in FIG. 5, exemplary types of context data 560 may include but are not limited to scan data 570, historic data 575, shipment data 580, layout data 585, RF data 587, and $3^{rd}$ party data.

Scan data 570 is generally data collected for a particular item related to an event. For example, when an item is placed in a package (such as package 130), a label may be generated and placed on the exterior of the package. The label may include a visual identifier that, when scanned by an appropriate scanning device capable of capturing, identifies the package. The information generated in response to scanning the identifier (a type of event), may be considered a type of scan data. Other scan data 570 may include, for example, general inventory data generated upon manual entry of information related to the package; captured package custodial control data; and bar code scan data.

Historic data 575 is generally data previously collected and/or analyzed related to a common characteristic. Historic data 575 embodies operational knowledge and know-how for a particular characteristic relevant to operations of the wireless node network. For example, the common characteristic may be a particular event (e.g., movement of an item from an open air environment to within a particular closed environment, such as a building), a type of item (e.g., a type of package, a type of content being shipped, a location, a shipment path, etc.), a success rate with a particular item (e.g., successful shipment), and the like. Another example of historic data 575 may include processing information associated with how an item has been historically processed as it is moved from one location to another (e.g., when moving within a particular facility, processing information may indicate the item is on a particular conveyor and may include information about the conveyor (such as speed and how long it is anticipated the item will be on the conveyor)).

Shipment data 580 is generally data related to an item being moved from one location to another location. In one embodiment, shipment data 580 may comprise a tracking number, content information for an item being shipped, address information related to an origin and destination locations, and other characteristics of the item being moved.

Layout data 585 is generally data related to the physical area of one or more parts of an anticipated path. For example, an embodiment of layout data 585 may include building schematics and physical dimensions of portions of a building in which a node may be transiting. An embodiment may further include density information associated with physical areas to be transited and anticipated numbers of potential nodes in those areas as types of layout data. In another example, an embodiment of layout data may include a configuration of how a group of packages may be assembled on a pallet, placed into a shipping container (e.g., a unit load device (ULD)) that helps move a collection of items on various forms with single mode or intermodal transport.

RF data 587 is generally signal degradation information about a signal path environment for a particular type of node and may relate to particular adverse RF conditions that may cause signal fluctuations, interference, or other degradation from the otherwise optimal signal path environment for that type of node. For example, RF data may include shielding effects when using a particular packaging or location, shielding effects when the package is within a particular type of container or assembled as part of a palletized shipment, shielding effects when particular content is shipped, and other physical and electronic interference factors.

Third party data 589 is an additional type of context data 560 that generally includes data generated outside the network. For example, third party data may include weather information associated with particular areas to be transited as the item is moved along an anticipated path from one location to another. Those skilled in the art will appreciate other types of third party data that relate to physical and environmental conditions to be faced by an item being moved from one location to another may also be considered context data 560.

The use of context data, such as context data 560 described above, advantageously helps server 100 better manage movement of items, provide better location determination, enhance intelligent operation and management of different levels of the wireless node network, and provide enhanced visibility to the current location and status of the item during operation of the wireless node network. In one embodiment, server control and management code 525 may provide such functionality that enables the wireless node network to be contextually aware and responsive.

Server Control & Management Code

Generally, server control and management code 525 controls operations of exemplary server 100. In an embodiment, server control and management code 525 is a collection of software features implemented as programmatic functions in code or separate program modules that generally control the behavior of server 100. Thus, exemplary server control and management code 525 may be implemented with several programmatic functions or program modules including, but not limited to, (1) a server-side association manager, which provides a framework for more robust and intelligent management of nodes in the wireless node network; (2) a context-based node manager, which enhances management of nodes in the wireless node network based upon context data; (3) a security manager, which manages secure pairing aspects of node management; (4) a node update manager, which provides updated or different programming for a particular node and shares information with nodes; (5) a location manager for determining and tracking the location of nodes in the network; and (6) an information update manager, which services requests for information related to the current status of a node or generally providing information about a node or collected from a node.

Server-Side Association Manager

The server-side association manager (also referred to as a server-side association management function) is generally a program module in exemplary code 525 that is responsible for intelligently managing the nodes in the wireless node network using a secure information framework. In an embodiment, this framework may be implemented to be a context-driven, learning sensor platform. The framework may also enable a way for information (such as RF scan, location, date/time, and sensor data) to be securely shared across nodes, a way to change the behavior of a node, and for a node to know it is considered "missing." The framework established during operation of the server-side association manager allows the network of nodes to be managed as a system with enhanced and optimized accuracy of determining the physical location of each ID Node. Further information regarding particular embodiments of such an association management framework and methods are explained below in more detail.

Context-Based Association Manager

The context-based node manager is generally a program module in exemplary code 525 that is responsible for incorporating context data as part of management operations to provide an enhanced data foundation upon which visibility of the nodes may be provided. In some embodiments, the context-based node manager may be implemented as part of the server-side association manager while other embodiments may implement the context-based node manager as a separate program module.

In one embodiment, the enhanced data foundation relies upon context data, such as context data 560 (e.g., scan data 570, historic data 575, shipment data 580, layout data 585, and other third party contextual data providing information regarding the conditions and environment surrounding an item and ID node moving from one location to another. Such context data (e.g., the network know-how, building layouts, and operational knowledge of nodes and shipping paths used with the wireless node network) may provide the enhanced building blocks that allow the server 100 to manage tracking and locating of nodes in a robustly enriched contextual environment. In an embodiment, context-based management provides visibility to the system through data analysis for when and how associations should be expected as the nodes travel through the wireless node network. In other embodiments, it may provide the foundation for better understanding RF signal degradation, which can be caused by the operating environment, packaging, package content, and/or other packages related to an item and its ID node.

Security Manager

The security manager module, which may be implemented separately or as part of the association manager module in exemplary server control and management code 525, helps with associating two nodes in the wireless node network by managing aspects of secure pairing of the nodes. In one embodiment, security manager module provides the appropriate pairing credentials to allow a node to securely connect to another node. Thus, when a node desires to connect to another node, an embodiment requires appropriate pairing credentials be generated by the server, provided to the nodes, and observed within the nodes to allow for a successful connection or association of nodes.

In operation, a node (such as master node 110*a*) identifies the address of the node (such as ID node 120*a*) to whom it desires to connect. With this address, the node prepares a pairing request and sends the request to the server 110. The server 100 operates under the control of the security manager module of the association manager, and determines whether the requesting node should be connected or otherwise associated with the other node. If not, the server does not issue the requested security credentials. If so and in accordance with the desired association management paradigm set by the association manager of code 525, server provides the requested credentials necessary for a successful wireless pairing and the establishment of secure communications between the associated nodes.

Node Update Manager

The exemplary server control and management code 525 may include a node update manager module that provides updated programming information to nodes within the wireless node network and collects information from such nodes (e.g., shared data 545, sensor data 550). The node update module may be implemented separately or as part of the association manager module in exemplary server control and management code 525.

Providing an update to a node's programming may facilitate and enable distribution of node functions to save power and better manage the nodes as a system. For example, one embodiment may alter the functional responsibility of different nodes depending on the context or association situation by temporarily offloading responsibility for a particular function from one node to another node. Typically, the server directs other nodes to change functional responsibility. However, in some embodiments, a master node may direct other nodes to alter functional responsibility.

Sharing information between nodes and with server (e.g., via an exemplary node update manager) facilitates collecting information from a node and sharing information with other nodes as part of an association management function of server 100. For example, one embodiment may collect and share RF scan data (a type of shared data 545), information about a node's location (a type of location data 555), system information about date/time (another type of shared data 545), and sensor measurements collected from sensor nodes (a type of sensor data 550).

Location Manager

The exemplary server control and management code 525 may include a location manager module that helps determine and track node locations. In a general embodiment, the location of a node may be determined by the node itself (e.g., a master node's ability to determine its own location via location circuitry 475), by a node associated with that node (e.g., where a master node may determine the location of an ID node), by the server itself (e.g., using location information determined by one or more techniques implemented as part of code 525), and by a combined effort of a master node and the server.

In general, an exemplary ID node may be directly or indirectly dependent on a master node to determine its actual physical location. Embodiments may use one or more methodologies to determine node location. For example and as more specifically described below, possible methods for determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. Further information and examples of how an exemplary location manager module may determine a node's location in accordance with such exemplary techniques are provided in more detail below.

Additionally, those skilled in the art will appreciate that it may also be possible to determine what constitutes an actionable location versus actual location based upon contextual information about the item being tracked. For example, a larger item may require relatively less location accuracy than a small item such that operational decisions and status updates may be easier implemented with knowledge of context. If the size of the item is known, the location accuracy can be tuned accordingly. Thus, if a larger item is to be tracked, or if the system's contextual awareness of it is such that lower location accuracy can be used, a stronger signal and thus wider area of scanning may be employed, which may help in situations where RF interference or shielding is an issue.

Information Update Manager

The exemplary server control and management code 525 may include an information update manager module that provides information related to operations of the wireless node network and status of nodes. Such information may be provided in response to a request from a device outside the wireless node network (such as user access device 200). For example, someone shipping an item may inquire about the current status of the item via their laptop or smartphone (types of user access devices), which would connect to server 100 and request such information. In response, the information update manager module may service such a request by determining which node is associated with the item, gathering status information related to the item (e.g., location data, etc.), and provide the requested information in a form that is targeted, timely, and useful to the inquiring entity.

In another example, a user access device may connect to server 100 and request particular sensor data from a particular node. In response, information update manager may coordinate with node update manager, and provide the gathered sensor data 545 as requested to the user access device.

Node Filtering Manager

An embodiment of exemplary server control and management code 525 may optionally comprise a node filtering manager, which helps manage the traffic of nodes with a multi-level filtering mechanism. The filtering essentially sets up rules that limit potential associations and communications. An example of such a node filtering management may define different levels or modes of filtering for a master node (e.g., which ID nodes can be managed by a master node as a way of limiting the communication and management burdens on a master node).

In one example, a "local" mode may be defined where the ID node only communicates and is managed by the assigned master node at the location where the last wireless node contact back to server 100 and/or where third party data indicates the assigned master node and ID node are in physical and wireless proximity. Thus, for the "local" mode of traffic filtering, only the assigned master node communicates and processes information from a proximately close and assigned ID node.

Moving up to a less restrictive filtering mode, a "regional" mode of filtering may be defined where the ID node may communicate and be managed by any master node at the location last reported back to server 100 and/or where third party data indicates the ID node is located. Thus, for the "regional" mode of traffic filtering, any master node near the ID node may communicate and process information from that ID node. This may be useful, for example, when desiring to implement a limit on associations and pairings to within a particular facility.

At the least restrictive filtering mode, a "global" mode of filtering may be defined as essentially system-wide communication where the ID node may be allowed to communicate and be managed by any master node. In other words, the "global" mode of traffic filtering allows any ID node within the wireless node network to communicate information through a particular master node near the ID node may communicate and process information from that ID node.

Thus, with such exemplary filtering modes, an ID node in a certain condition (e.g., distress, adverse environmental conditions, adverse conditions of the node, etc.) may signal the need to bypass any filtering mechanism in place that helps manage communications and association by using the "Alert" Status Flag. In such an example, this would operate to override any filtering rules set at the Master Node level in order to allow an ID node to be "found" and connect to another node.

Thus, exemplary server 100 is operative, when executing code 525 and having access to the types of data described above, to manage the nodes, collect information from the nodes, store the collected information from the nodes, maintain or have access to context data related to the environment in which the nodes are operating, and provide information about the nodes (e.g., status, sensor information, etc.) to a requesting entity.

Node Communication & Association Examples

Figure 22B:
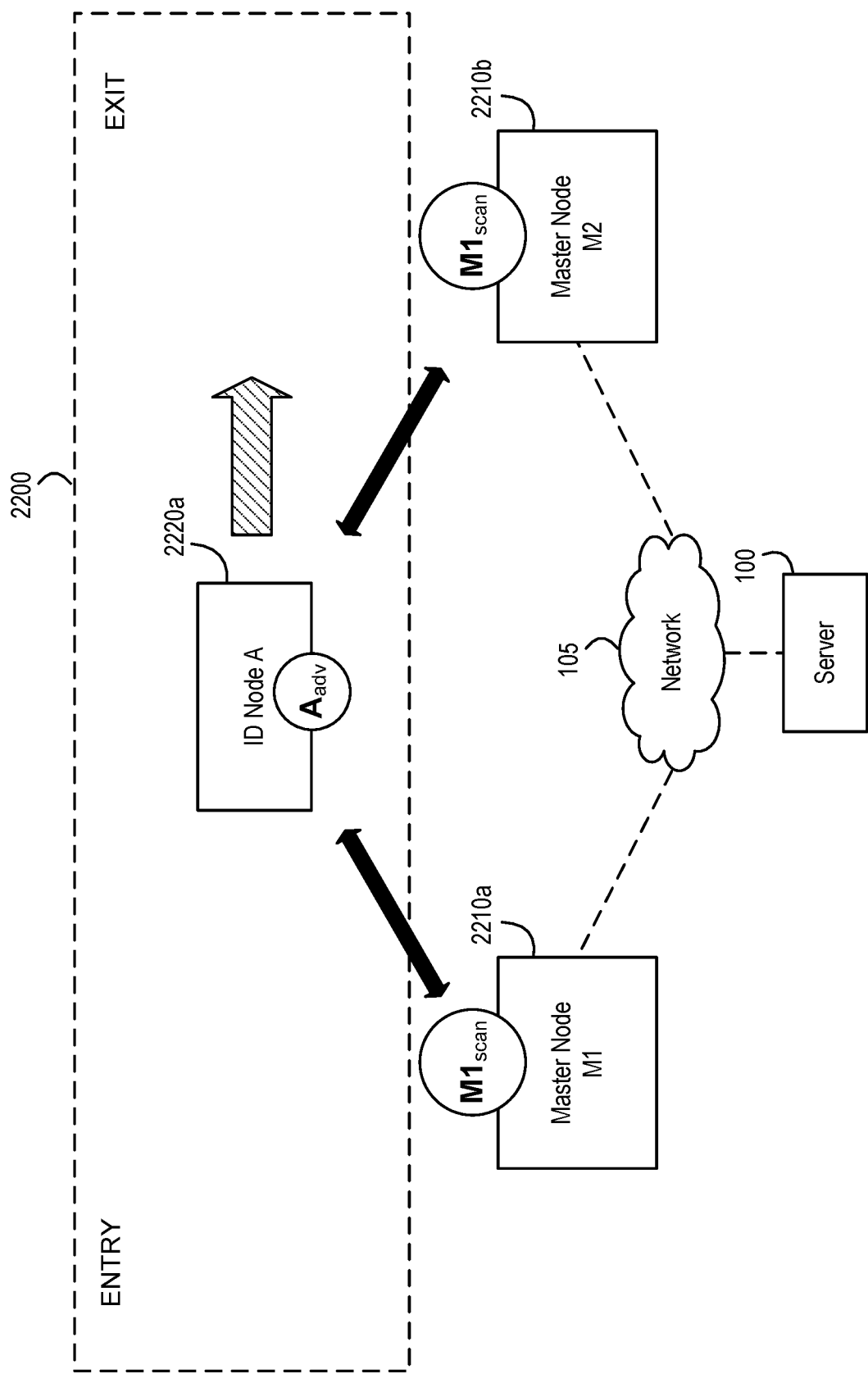
Figure 22C:
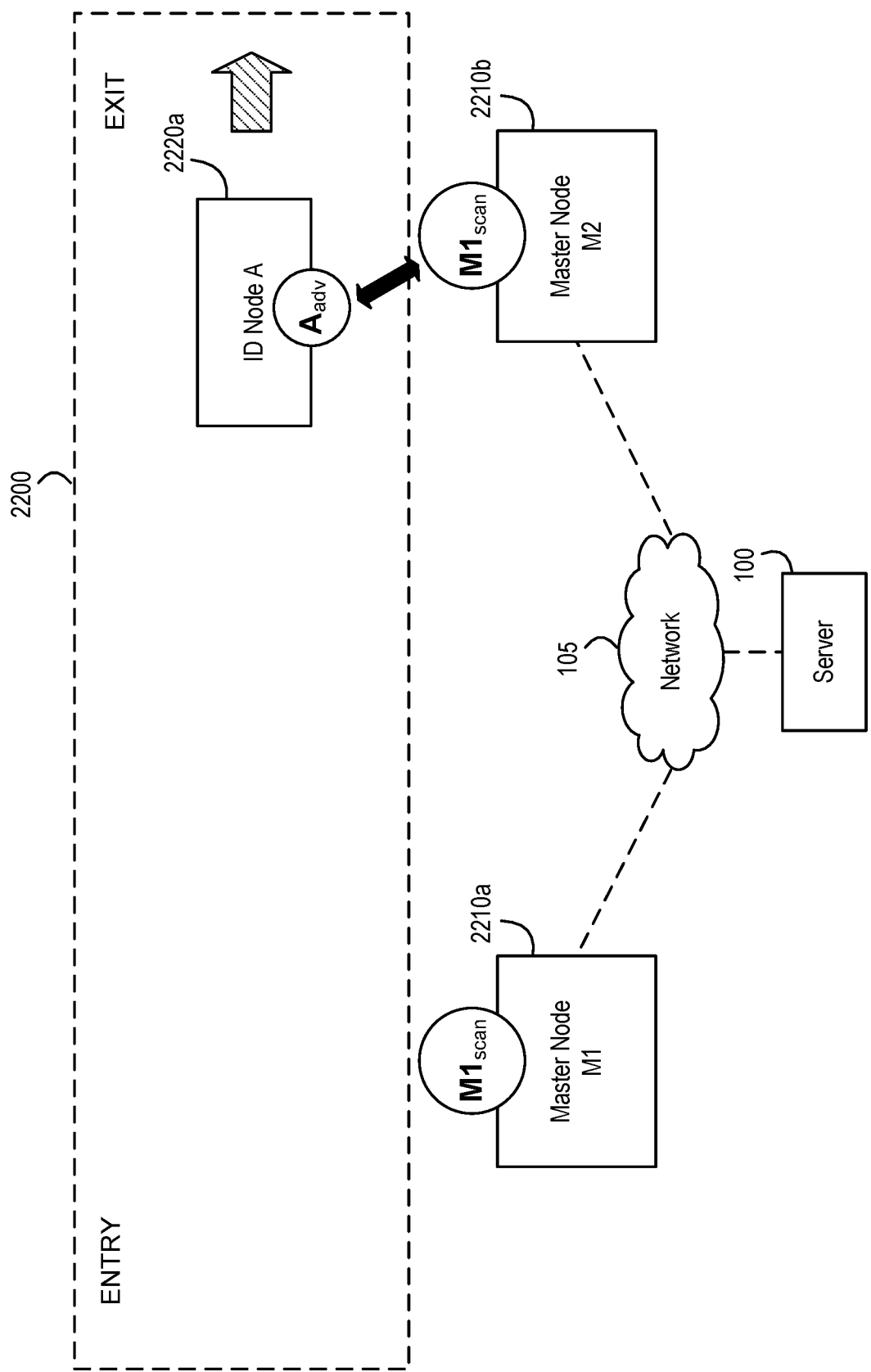

To better illustrate how exemplary management and communication principles may be implemented within an exemplary wireless node network, FIGS. 8-12 provide several examples of how exemplary components of the wireless node network may generally communicate (advertising & scanning), associate, and exchange information during different types of operations in various embodiments. FIGS. 22A-C also provide a more detailed application of such exemplary association and communication activities when an exemplary ID node moves along a transit path (e.g., through a corridor) and is tracked and managed by different master nodes and a server in an embodiment.

Node Advertising Cycle Example

As generally explained above, a node may have several different types of advertising states in which the node may be connectable with other nodes and may communicate with other nodes. And as a node moves within a wireless node network, the node's state of advertising and connection may change as the node disassociates with a previously connected node, associates with a new node, or finds itself not associated with other nodes. In some situations, a node may be fine and in normal operation not be connected or associated with another node. However, in other situations, a node may raise an issue with potentially being lost if it has not connected with any other node in a very long period of time. As such, a node may go through different types of advertising states in these different operational situations.

Generally, a node may be in a state where it is not connectable with other nodes for a certain period of time (also referred to as a non-connectable interval). But later, in another state, the node may want to be connected and advertises as such for a defined connectable period (also referred to as a connectable interval). As the node advertises to be connected, the node may expect to be connected at some point. In other words, there may be a selectable time period within which a node expects to be connected to another node. However, if the node is not connected to another node within that period of time (referred to as an Alert Interval), the node may need to take specific or urgent action depending upon the circumstances. For example, if a node has not been connected to another node for 30 minutes (e.g., an example alert interval), the node may change operation internally to look "harder" for other nodes with which to connect. More specifically, the node may change its status flag from an Alert Level 0 (no issue, operating normal) to Alert Level 2 in order to request that any available master node acknowledge receipt of the advertisement packet broadcasted by the node seeking a connection.

Figure 8:
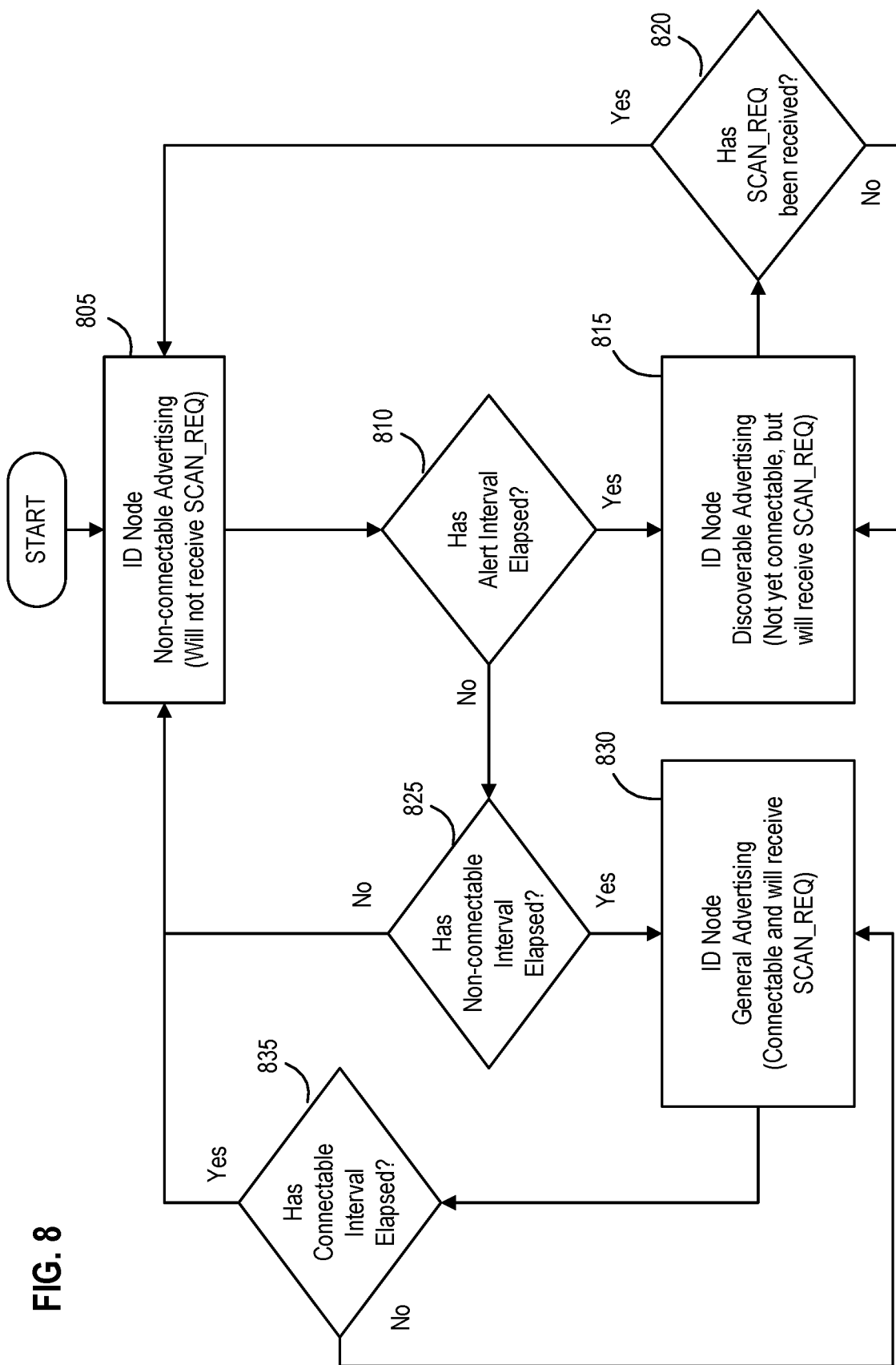
FIG. 8 is a state diagram illustrating exemplary states and transitions between the states as part of operations by an exemplary node in a wireless node network in accordance with an embodiment of the invention.

FIG. 8 is a diagram illustrating exemplary advertising states (or information exchange and node connectability states) and factors involved in transitions between the states by an exemplary ID node in a wireless node network in accordance with an embodiment of the invention. Referring now to FIG. 8, three exemplary states for a node are illustrated as part of an exemplary advertising cycle for the node—namely, an ID Node Non-Connectable Advertising state 805, an ID Node Discoverable Advertising state 815, and an ID Node General Advertising state 830. Transitions between these states will depend on factors related to expirations of the types of intervals described above. In an embodiment, the duration of each of these intervals will depend upon the system implementation and the contextual environment within which the ID node is operating. Such time intervals may, for example, be set by server 100 as part of data (e.g., profile data, association data, context data) provided to the node when updating the node and managing operations of the node.

Referring to the example illustrated in FIG. 8, an exemplary ID node may have an alert interval set at, for example, 30 minutes, and be in ID Node Non-Connectable Advertising state 805 with a non-connectable interval set at 5 minutes. In state 805, the ID node may broadcast or advertise, but is not connectable and will not receive a SCAN_REQ message (a type of request for more information sent to the advertising node from another node). Thus, the ID node in state 805 in this example may advertise in a non-connectable manner for at least 5 minutes but expects to be connected within 30 minutes.

If the alert interval has not yet elapsed (factor 810) and the non-connectable interval is still running (factor 825), the ID node simply stays in state 805. However, if the alert interval has not elapsed (factor 810) and the non-connectable interval elapses (factor 825), the ID node will enter a mode where it wants to try to connect to another node for a period of time (e.g., a 1 minute connectable interval) and will move to the ID Node General Advertising state 830 in the exemplary advertising cycle of FIG. 8. In state 830, as long as the connectable interval is running, the ID node will stay in this state where it is connectable to another node and will receive SCAN_REQ types of requests from other nodes in response to the advertising packets the ID node is broadcasting. However, when the connectable interval (e.g., the 1 min period) elapses or expires (factor 835), the ID node returns back to the Non-connectable Advertising state 805 for either the next time the non-connectable interval elapses (and the ID node again tries to connect in state 830) or the alert interval finally elapses (and the ID node finds itself in a situation where it has not connected to another node despite its efforts to connect in state 830).

When the alert interval finally elapses (factor 810), the ID node moves to the ID Node Discoverable Advertising state 815. Here, the ID node is not yet connectable but will receive a SCAN_REQ type of request from other nodes in response to advertising packets the ID node is broadcasting. In this state 815, the exemplary ID node may alter its status flag to indicate and reflect that its alert interval has expired and that the node is now no longer in normal operation. In other words, the ID node may change the status flag to a type of alert status being broadcasted to indicate the ID node urgently needs to connect with another node. For example, the status flag of the advertising packet broadcast by the ID node may be changed to one of the higher Alert Levels depending on whether the node needs to upload data (e.g., Alert Level 3 status) or synchronize timer or other data with another node (e.g., Synchronize status). With this change in status flag, and the ID node in state 815 broadcasting, the ID node awaits to receive a request from another node that has received the broadcast and requested more information via a SCAN_REQ message (factor 820) sent to the ID node from that other node. Once a SCAN_REQ message has been received by the ID node (factor 820), the ID node that went into the alert mode because it had not connected with another node within the alert interval can connect with that other node, upload or share data as needed, and then shift back to state 805 and restart the alert interval and non-connectable intervals.

Master Node to ID Node Association Example

Advertising (broadcasting) and scanning (listening) are ways nodes may communicate during association operations. FIGS. 9-12 provide examples of how network elements of a wireless node network (e.g., ID nodes, master nodes, and a server) may communicate and operate when connecting and associating as part of several exemplary wireless node network operations.

Figure 9:
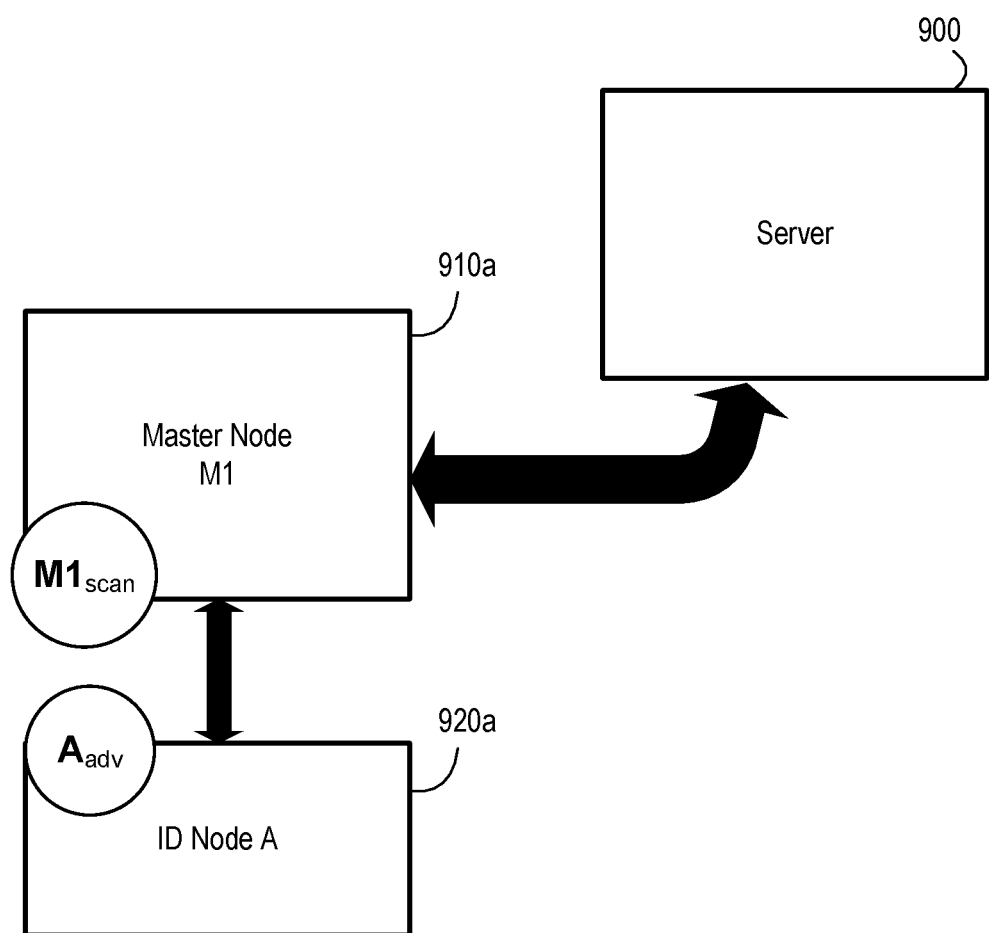
FIG. 9 is a diagram illustrating exemplary components of a wireless node network during an exemplary master-to-ID node association in accordance with an embodiment of the invention.

FIG. 9 is a diagram illustrating exemplary components of a wireless node network during an exemplary master-to-ID node association in accordance with an embodiment. Referring now to FIG. 9, exemplary master node M1 910a is illustrated within communication range of exemplary ID node A 920a. Master node M1 910a also has a communication path back to server 900. As shown, master node M1 910a is in a scanning or listening mode (e.g., indicated by the "M1$_{scan}$" label) while ID node A 920a is in an advertising or broadcasting mode (e.g., indicated by the "A$_{adv}$" label). In this example, M1 master node 910a has captured the address of ID node A 920a through A's advertising of at least one advertising data packet, and has reported it to the server 900. In this manner, the capturing and reporting operations effectively create a "passive" association between the nodes and proximity-based custodial control. Such an association may be recorded in the server, such as server 900, as part of association data, such as association data 540.

In another embodiment, passive association between a master node and ID node may be extended to an "active" association or connection. For example, with reference to the embodiment shown in FIG. 9, server 900 may instruct master node M1 910a to associate, connect, or otherwise pair with ID node A 920a, and forwards the required security information (e.g., PIN credentials, security certificates, keys) to master node M1 910a. Depending on the advertising state of ID node A 920a, ID node A 910a may only be visible (discoverable) but not connectable. In such a situation, the master node M1 910a must wait until ID node A 920a is in a connectable state (e.g., the ID Node General Advertising state) and can be paired. As discussed above with reference to FIG. 8, each ID node has a certain time window during each time period where it can be paired or connected.

In this example, when the ID node A 920a is successfully paired with master node M1 910a, ID node A 920a may no longer advertise its address. By default, only an unassociated device will advertise its address. A paired or associated node will only advertise its address if instructed to do so.

ID Node to ID Node Association Example

Figure 10:
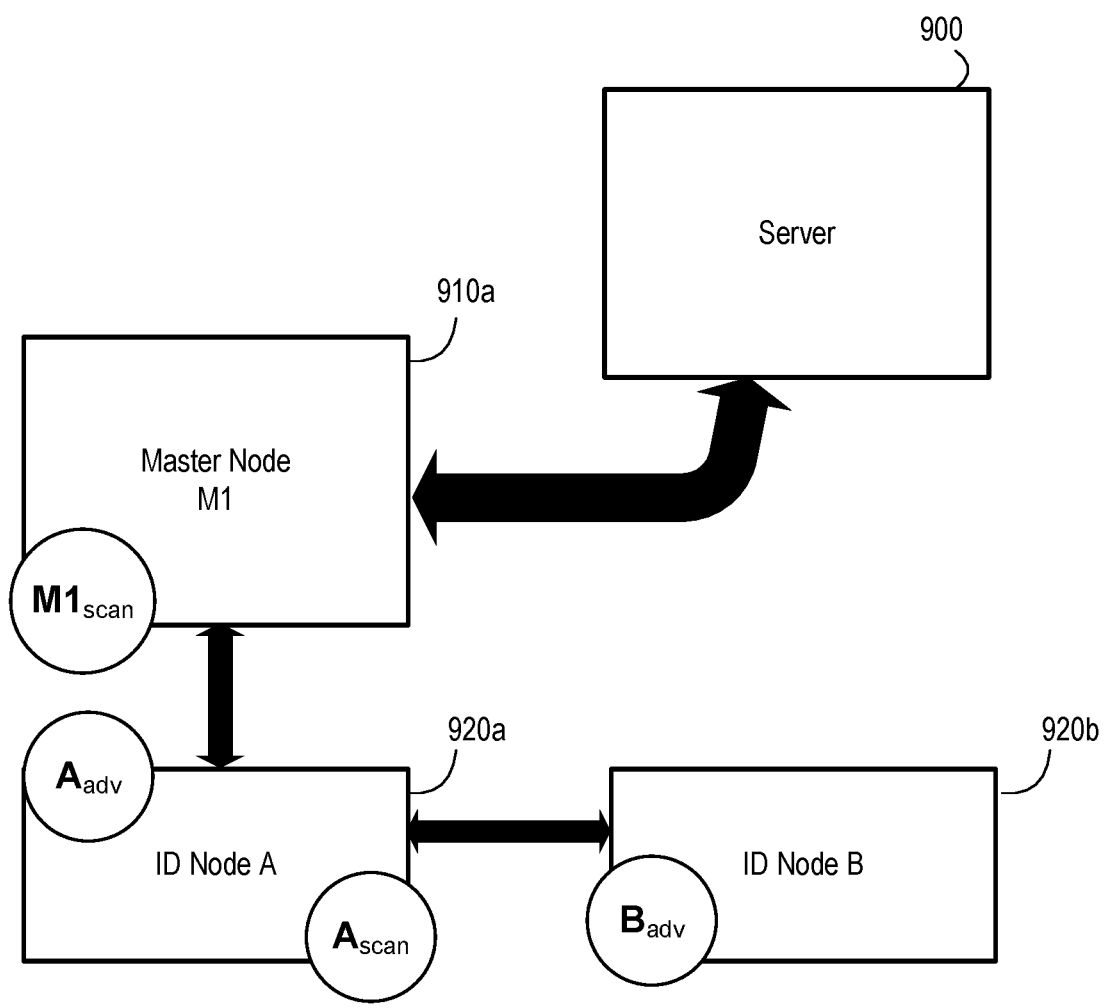
FIG. 10 is a diagram illustrating exemplary components of a wireless node network during an exemplary ID-to-ID node association in accordance with an embodiment of the invention.

In various embodiments, an ID node may associate with or connect to other ID nodes. FIG. 10 is a diagram illustrating exemplary components of a wireless node network during an exemplary ID-to-ID node association in accordance with an embodiment of the invention. Referring now to FIG. 10, exemplary master node M1 910a, ID node A 920a, and server 900 are similarly disposed as shown in FIG. 9, but with the addition of ID node B 920b, which is within communication range of ID node A 920a. In this example, ID node A 920a is running in query (scan) mode (e.g., A$_{scan}$) listening for ID node B 920b. When ID node A 910a detects ID node B 920b advertising (e.g., B$_{adv}$) with one or more advertising data packets as part of an advertised message from ID node B 920b, ID node A 920a identifies a status flag from the message indicating ID node B 920b has, for example, data (e.g., sensor data 350) for upload. As a result, ID node A 920a logs the scan result (e.g., as a type of association data 340) and, when next connected to master node M1 910a, ID node A 920a uploads the captured scan log information to the server 900. In this manner, the ID node scanning, capturing, and reporting operations effectively create a "passive" association between the different ID nodes. Such a passive association may be recorded in the server 900 as part of association data 540.

In another embodiment, passive association between two ID nodes may be extended to an "active" association or connection. For example, with reference to the embodiment shown in FIG. 10, based upon the captured status flag and uploaded information about ID node B 920b under that mode, the server 900 may issue a request to ID node A 920a through master node M1 910a to actively connect or pair with ID node B 920b for the purpose of downloading information from ID node B 920b. In one example, security credentials that authorize the active connection between ID node A 920a and ID node B 920b are downloaded to ID node A 920a from master node M1 910a, which received them from server 900. In another example, the requisite security credentials may have been pre-staged at ID node A 920a. And rather than rely upon an ID node to ID node connection, master node M1 may have connected directly with ID node B 920b if M1 was within communication range of ID node B 920b.

Information Query ID Node to Master Node Example

Figure 11:
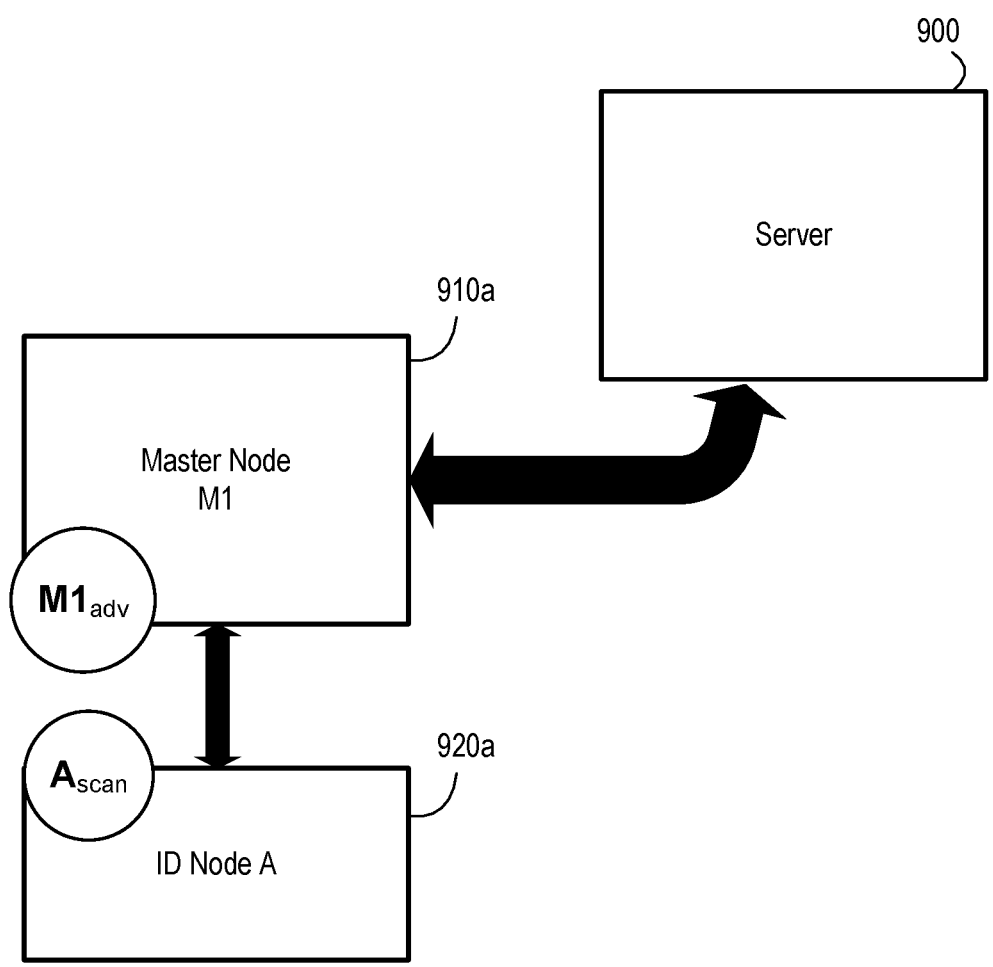
FIG. 11 is a diagram illustrating exemplary components of a wireless node network during an exemplary ID-to-master node query in accordance with an embodiment of the invention.

An exemplary ID Node may also issue queries to other nodes, both master nodes and ID nodes. FIG. 11 is a diagram illustrating exemplary components of a wireless node network during an exemplary ID-to-master node query in accordance with an embodiment of the invention. Referring now to FIG. 11, a similar group of nodes as shown in FIG. 9 appears, except that exemplary master node M1 910a is in an advertising or broadcasting mode (e.g., M1$_{adv}$) while ID node A 920a is in a scanning mode (e.g., A$_{scan}$). In this configuration, ID node A 920a may query master node M1 910a for information. In one embodiment, the query may be initiated through the ID node setting its status flag. The requested information may be information to be shared, such as a current time, location, or environmental information held by the master node M1 910a.

In a passive association example, ID node A 920a in A$_{scan}$ mode may have captured the address of master node M1 910a. However, since an ID node cannot directly connect to the server 900 to request pairing security credentials (e.g., security pin information that authorizes an active connection between ID node A 920a and master node M1 910a), a passive association and corresponding pairing will have been initiated from the master node. In another example, it may be possible for ID node A 920a to have the pairing credentials stored as security data 335 from a previous connection. This would allow ID node A 920a then to initiate the active association with master node M1 910a after a passive association.

Alert Level Advertising Example

Figure 12:
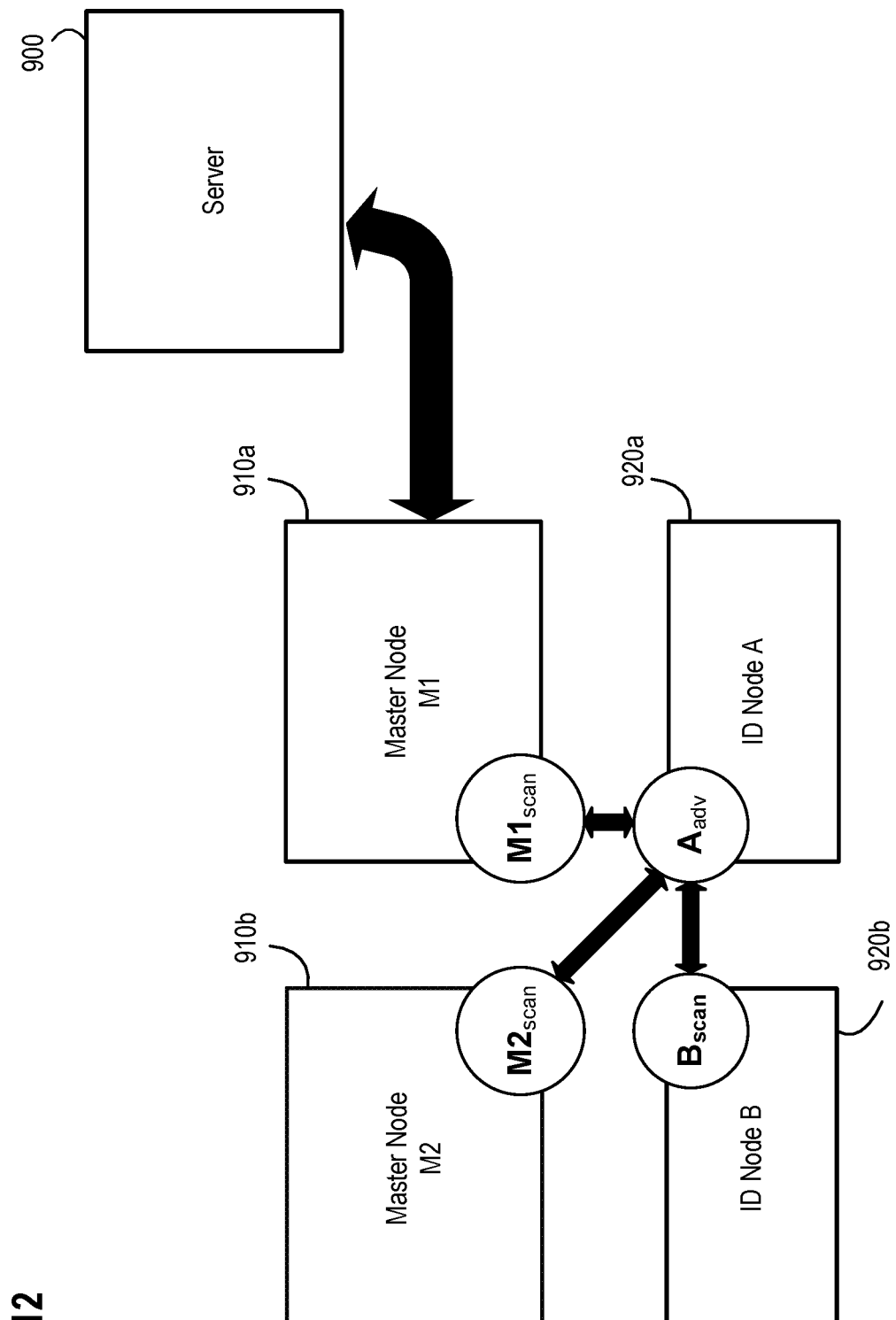
FIG. 12 is a diagram illustrating exemplary components of a wireless node network during an exemplary alert advertising mode in accordance with an embodiment of the invention.

As previously noted, a node may enter an alert stage or level in one or more embodiments. For example, if a node has not received an acknowledgement from a master node for an advertising packet within a set period (e.g., an Alert Interval as described in some embodiments), the node will enter a particular alert stage for more specialized advertising so that it may be "found" or pass along information. FIG. 12 is a diagram illustrating exemplary components of a wireless node network during an exemplary alert advertising mode in accordance with an embodiment of the invention. Referring now to FIG. 12, a similar group of nodes as shown in FIG. 9 appears, with the addition of another master node (master node M2 910b) and another ID node (ID node B 920b). Exemplary ID node A 920a is in an advertising or broadcasting mode (e.g., $A_{adv}$) while nodes M1, M2, and B are each in scanning mode (e.g., $M1_{scan}$, $M2_{scan}$, and $B_{scan}$). In this example and configuration as shown in FIG. 12, the status flag in an advertising message from ID node A 920a has been set to a particular alert level (e.g., Alert Level 2) in the header of the message, requesting any nearby master node to acknowledge it. In one example, this mode may be entered if ID node A 920a has not connected with another node for a set period or time. In another example, ID node A 920a may enter this specialized advertising mode upon received instructions (e.g., from server 900 or another nearby node) or a triggered condition (other than time), such as when a sensor input (such as light) is detected or otherwise registered and the node issues continuous updates of its address as a security feature. The ID node A 920a set at this alert level and in this specialized advertising mode is thus set in an active pairing mode, waiting for pairing credentials.

From a passive association perspective, any node in scanning mode can passively associate with such an advertising node (e.g., ID node A 920a in this alert mode). Thus, in an embodiment, the Alert Level 2 status flag in the advertising header broadcast by ID node A 920a indicates that urgent and active intervention is requested, rather than merely passively associate without an active connection.

From an active association perspective, any node that uploads the special advertising header of ID node A 920a may be forwarded the security credentials from the server 900. This would allow for the node receiving such credentials to actively associate or pair with ID node A 920a.

While FIG. 8 provides examples of how a node may advertise, and FIGS. 9-12 provide examples of how different exemplary devices (e.g., ID nodes, master nodes, and a server) may advertise and associate in different ways, FIGS. 22A-C provide a progressive set of illustrations that expand upon how associating and disassociating may be applied within an exemplary wireless node network. More specifically, FIGS. 22A-C show how associations and disassociations may occur when an exemplary ID node is tracked and managed by a server and different master nodes as the ID node moves through an exemplary transit path in accordance with an exemplary embodiment of the invention.

Referring now to FIG. 22A, a structure 2200 is shown having an entry and exit point. In one example, the structure 2200 may be a corridor or another part of a building or facility. In another example, structure 2200 may be a conveyor system that transports an item and its ID node from the entry point to the exit point. Master node M1 2210a is located near the entry point of structure 2200 while master node M2 2210b is located near the exit point. Those skilled in the art will appreciate that other master nodes may be disposed at additional points in structure 2200, but are not shown for sake of convenience and to simplify the association hand-off explanation that follows. Server 100 is operatively connected to each of master node M1 2210a and master node M2 2210b via network 105.

In one embodiment, server 100 has access to context data 560 related to the structure 2200, such as layout data 585 on dimensions and materials making up structure 2200. Context data 560 may include historic data 575 on how an ID node has operated and successfully been tracked as it traverses structure 2200 from the entry point to the exist point. For example, server 100 may have context data indicating structure 2200 is a conveyor that can transport an item and its ID node from the entry point to the exit point over a distance of 800 feet. The context data may further indicate typical items are moved at a certain speed on the conveyor of structure 2200 and a nominal time from the entry point to the exit point may be about 5 minutes. Thus, the server 100 has access to context data about the environment within with an ID node is operating and may leverage this to better and more accurately manage the ID node.

In FIG. 22A, ID node A 2220a is shown entering the structure 2200 at the entry point. Here, ID node A 2220a may be advertising in hopes of connecting with a master node as it enters structure 2200 with, for example, a non-connectable interval of 10 seconds with a connectable interval of 5 seconds. In this example, the server 100 knows that ID node A 2220a is located near the entry point and anticipates that ID node A 2220a should be coming near to master node M1 2210a at the entry point. Thus, server 100 may set the connectable and non-connectable intervals accordingly so as to provide a sufficient opportunity for ID node A 2220a to connect to the next master node along the predicted path of the ID node and in accordance with the speed of travel.

Additionally, server 100 may set the alert interval to 1 minute in this context. Here, if ID node A 2220a is not connected to another node within 1 minute, ID node A 2220a may broadcast or advertise with a message having a changed status flag that indicates an alert status so that ID node A 2220a can connect to a broader range of other nodes that see it is urgent for ID node A 2220a to connect and, essentially, be found. Depending on the context (e.g., the type of conveyor, the speed of the conveyor, the density of nodes near the entry point, etc.), those skilled in the art will appreciate that the server 100 can adjust the advertising cycle intervals to better accommodate the ID node's current environment.

When master node M1 2210a is scanning (listening), it may initially detect an advertising packet from ID node A 2220a during node A's non-connectable interval. But when ID node A 2220a changes advertising states and broadcasts as a connectable node in the general advertising state (i.e., during the connectable interval), master node M1 2210a may respond with a SCAN_REQ that acknowledge receipt of the broadcasted message and asks for further information from ID node A 2220a. Master node M1 2210a receives the requested information from ID node A 2220a, and then communicates with the server 100 to notify the server of its passive association with ID node A 2220a. Server 100 determines if active association is desired, and may authorize the active association between master node M1 2210a and ID node A 2220a by sending security credentials to master node M1 2210a, which allow the nodes to securely connect and share information. And master node M1 2210a may determine the location of ID node A 2220a (or server 100 may do so by directing master node M1 and/or ID node A), and provide the location of ID node A 2220a to server 100. Thus, server 100 is able to manage and track the location of ID node A 2220a as it enters structure 2220 via at least association.

In FIG. 22B, ID node A 2220a has traversed down part of the transit path through structure 2200 while remaining associated with master node M1 2210a. However, at some point master node M1 2210a and ID node A 2220a are disassociated at the direction of server 100 (or when they can no longer communicate). In one example where ID node A 2220a is on the conveyor within structure 2200, server 100 may instruct ID node A 2220a to go to a low power mode for a particular period of time in order to, for example, conserve ID node power. In another example, the low power mode may also provide better location accuracy. As the server 100 has access to the context data, the server 100 may know that ID node A 2220a was associated with master node M1 2210a near the entry point at a given time, and determine that ID node A 2220a will not be near the exit point until the end of the particular period of time. With the ID node A 2220a programmed this way, once the particular period elapses, the ID node A 2220a should be near the exit point and may again be placed into a normal operation mode so that it can seek to connect with master node M2 2210b.

Similar to the association process discussed with respect to ID node A and master node M1, ID node A 2220a and master node M2 2210b may be associated as ID node A 2220a approaches master node M2 2210b near the exit point. Once connected, the node locations and association data are updated on the server 100. And as ID node A 2220a continues to move through structure 2200, ID node A 2200a may arrive at the exit point as shown in FIG. 22C, where the node locations and association data are updated once again on the server 100.

Those skilled in the art will appreciate how such principles may be applied to further movements of an ID node as it is handed off (e.g., via active/passive associations and disassociations) between other master nodes and keeping track of these associations and node locations on the server 100. Additionally, as server 100 tracks and monitors associations, disassociations, and contextual environmental operations, server 100 essentially learns how to better use context information better track nodes, manage power used by ID nodes, and enhance accuracy for locations.

Those skilled in the art will also appreciate the general tradeoff with a level of RF power level and accuracy of location. If a node's RF power level is set high, it may advertise and connect with other nodes a longer distance away. But at such a high power level setting, the ability for the system to discriminate between and locate different nodes may be a challenge.

Association Management within a Wireless Node Network

As explained above in general, management of nodes may rely upon associations created and tracked between nodes. In some embodiments, the association relied upon may be an active association where the server expressly authorizes an active connection between nodes. In other embodiments, the association relied upon may be a passive association where the master node (a type of managing node) is associated with the other node, but not actively connected to the other node. By virtue of the passive association, the server may be able to keep track of and manage the other node without requiring an active association. Thus, those skilled in the art will appreciate that in still other embodiments, associations relied upon by the server for managing a wireless node network may include both active and passive associations and may be generally authenticated or, more specially, authorize a secure connection that has a degree of protection for the connection and communications using that connection.

Figure 23:
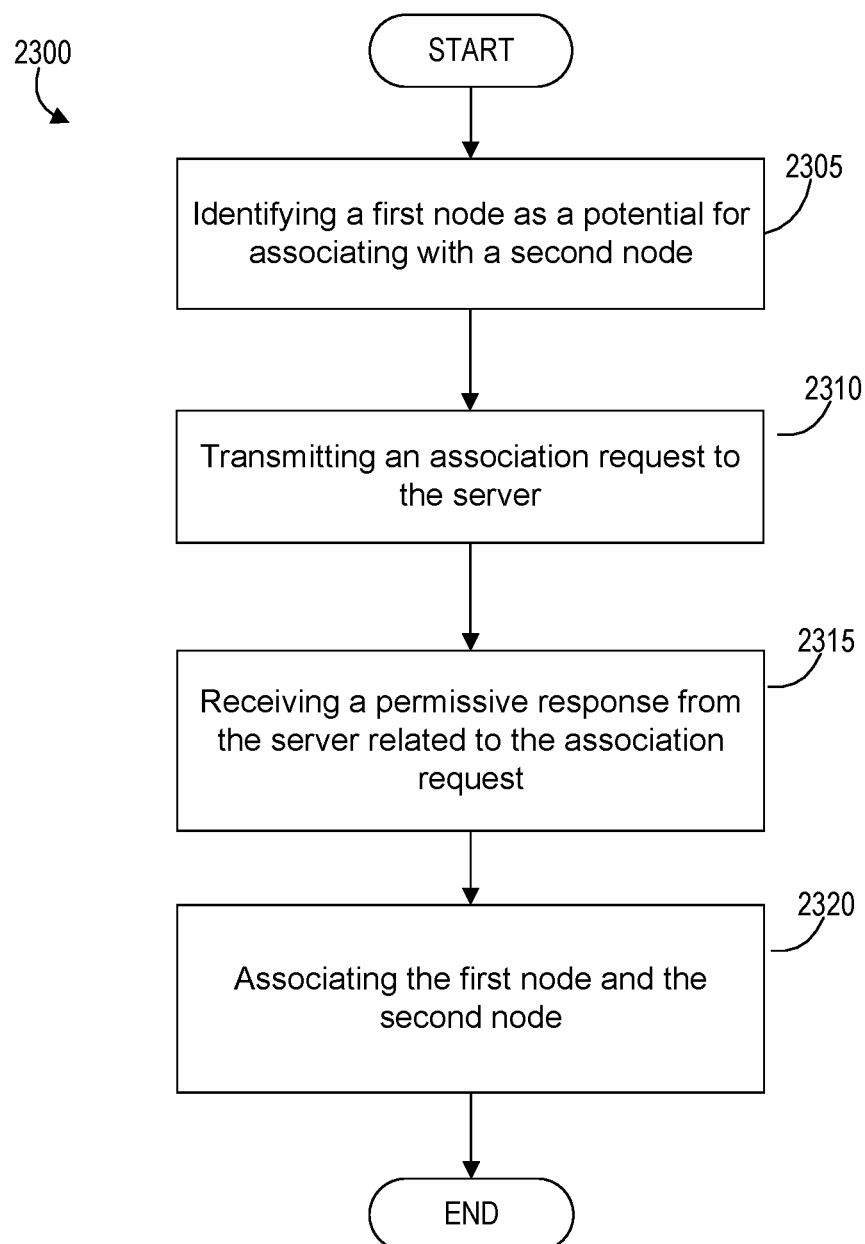
FIG. 23 is a flow diagram illustrating an example method for association management of a wireless node network in accordance with an embodiment of the invention.
Figure 24:
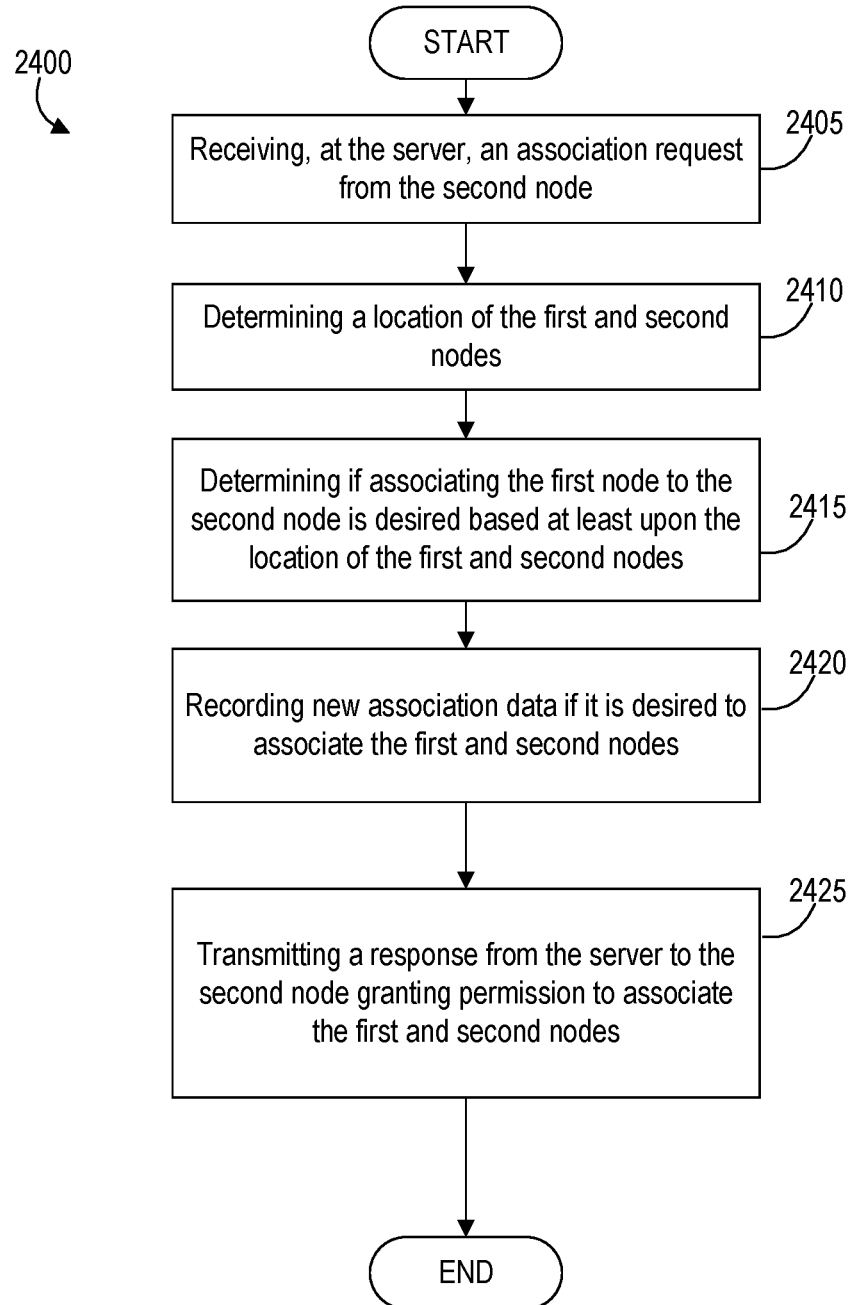
FIG. 24 is a flow diagram illustrating another example method for association management of a wireless node network in accordance with an embodiment of the invention.
Figure 25:
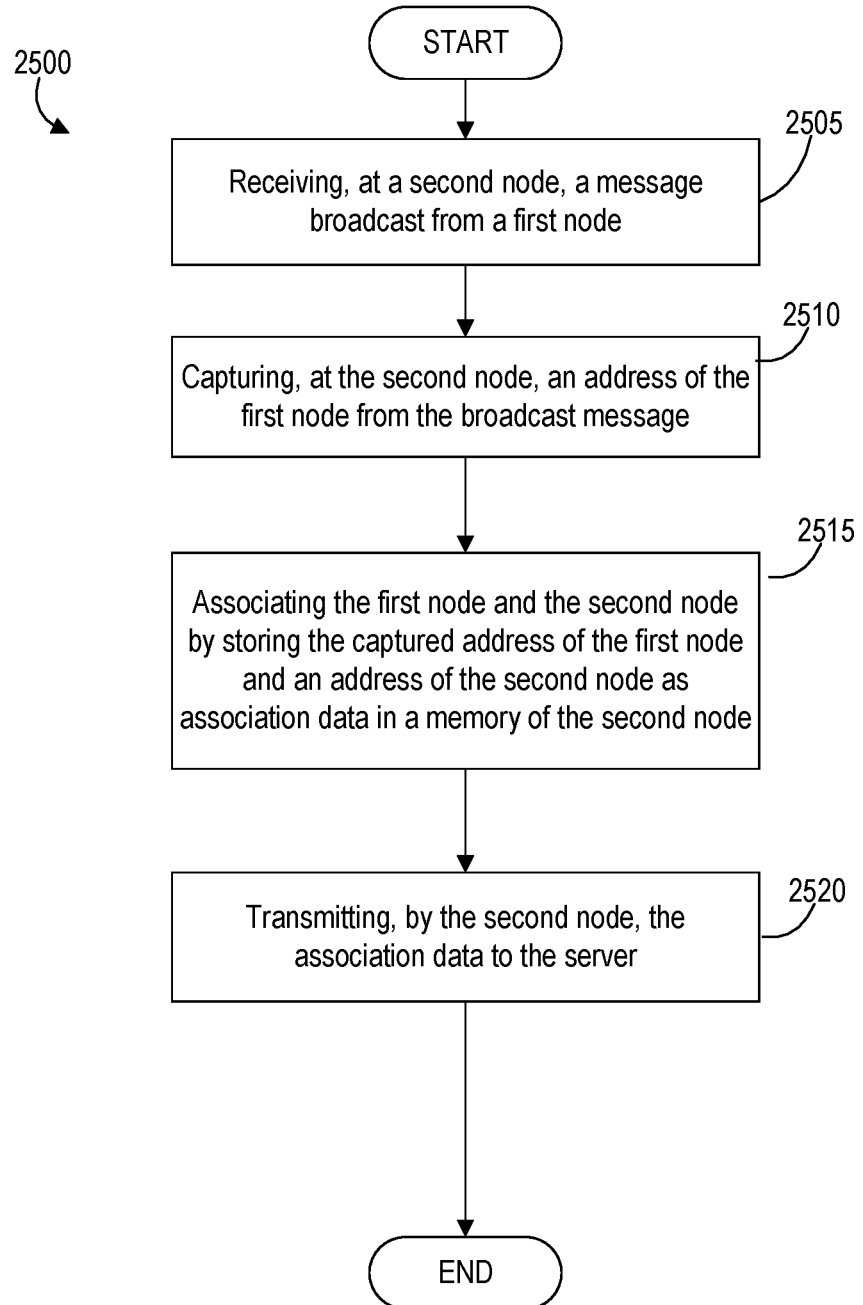
FIG. 25 is a flow diagram illustrating yet another example method for association management of a wireless node network in accordance with an embodiment of the invention.

FIGS. 23-25 provide flow diagrams of exemplary methods for association management of a wireless node network having at least a plurality of nodes and a server in accordance with different embodiments of the present invention involving active and passive association examples. Those skilled in the art will appreciate that each of these exemplary methods for association management of a wireless node network may be implemented by instructions stored on a non-transitory computer-readable medium, which when executed perform the steps of the respective methods described below (e.g., methods 2300, 2400, and 2500) and the described variations of those methods.

Referring now to FIG. 23, method 2300 begins by identifying a first node as a potential for actively associating with a second node at step 2305. In one example, identifying the nodes for association may involve reviewing a message sent by the first node to determine status information related to the first node, and analyzing the status information to determine whether the first node should be associated with the second node. In a further example, the status information may comprise one of a plurality of different status levels indicating whether the first node is requesting a connection to the second node when at that particular status level.

Next, an association request is transmitted to the server in step 2310. In one example, the association request may identify the first node and second node to be associated and may request transmission of one or more appropriate security credentials (e.g., PIN credentials, security certificates, keys, and the like) that may be used by the nodes to enable the first and second node to securely connect and share data as part of associating. An embodiment may request only one credential as an authorization credential from the server. Other embodiments may use two credentials where one may be later uses as a credential with which to reply to challenges. For example, if an ID node is challenged, the ID node may send a reply authorization credential so that the master node can confirm the response and supply the ID node with the appropriate security credential for the authorized association. In some cases, an ID node may have been supplied with such a reply authorization credential (also generally referred to as a key) by the server.

At step 2315, the second node receives a permissive response from the server related to the association request. In an example, the permissive response may include receiving a first authorization credential and a second authorization credential from the server (which may be stored on the nodes). As such, the first authorization credential and the second authorization credential may be created by the server as a type of security data, and may be provided to authorize connecting the first node and the second node and securely sharing information between the first node and the second node.

With this authorization from the server, the first node and second node may be associated at step 2320. In one example, the method 2300 may associate the nodes by establishing an authorized connection from the second node to the first node based upon the authorization credential. And the method 2300 may securely provide shared data between the first node and the second node according to a profile established by the server after the first and second nodes are associated.

In an embodiment, the method 2300 may also comprise having the second node gaining responsibility for a task after the second node is associated with the first node when responsibility for the task was previously with the first node. For example, when the second node is powered by an external power source and the first node is powered by a battery, this may advantageously shift the responsibility to a node that is better suited to perform the task (e.g., has more power available or has a power source that does not need recharging or replacing).

FIG. 24 is a flow diagram illustrating another example method for association management of a wireless node network in accordance with an embodiment of the invention from the perspective of the server. Referring now to FIG. 24, method 2400 begins with the server receiving an association request sent from a second of the nodes at step 2405. The association request asks for permission to associate a first of the nodes to the second node.

At step 2410, the server determines a location (actual or relative) of the first node and second node. In one embodiment, the server may receive location data for the second node. For example, when the second node is a master node, the location data for the second node may be GPS coordinates for the current location of the master node, which provides this to the server. And in an embodiment, the server may determine a location of the first node using at least one of a plurality of location methods available to the server for locating the first node, such as those discussed in detail above (or a combination of such methods so that a more refined location of the first node is determined).

At step 2415, the server determines if associating the first node to the second node is desired based at least upon the location of the first node and the location of the second node. In one embodiment, it may be determined if associating is desired by determining if associating the first node to the second node is anticipated based upon context data. In another embodiment, it may be determined if associating is desired by identifying a current mode of filtering that limits potential nodes to be associated, and granting the permission to associate the first node to the second node only if the current mode of filtering allows the first node to be associated with the second node. For example, this may involve granting the permission only if the current mode of filtering defines that the second node is within a locational range of the first node consistent with the current mode of filtering. This may be defined by a particular filtering mode, such as a local, regional, or global filtering mode that operates to restrict nodes that may associate with other nodes. As such, the method may alter the current mode of filtering to another mode of filtering that allows the first node to be associated with the second node as a sort of override of the current filtering mode (e.g., depending upon an alert status of the first node).

At step 2420, the server records new association data if it is desired to associate the first node with the second node at step 2420. At step 2425, the server transmits a response to the second node granting the permission to associate the first node to the second node. In an embodiment, the server may first generate an authorization credential that authorizes connecting the first node and the second node and sharing information between the first node and the second node. This may be by looking up the credential information or by going through a process to create specific an authorization credential that allows the two nodes to actively pair and share data. With the authorization credential, the server may transmit them as the response.

In another example, the server may have pre-staged an authorization credential related to the second node and a third node if the server anticipates the second node will disassociate with the first node and later request to associate with the third node. For example, this may be done if the context indicates the second node (e.g., a master node) may be placed in a container and need to connect with the third node in the future when the second node may lose its connection to the server.

Method 2400 may also include the server receiving shared data from the second node. The shared data may originate from the first node or may have parts that originate from both the first and second nodes. For example, the second node may have received the permission to associate, and actively paired with the first node in a secure manner. The first node may have indicated it has data to upload (e.g., sensor data), and the second node may receive the data from the first node. Subsequent to that sharing, the second node may upload the shared sensor data from the first node by transmitting it to the server.

The method may further comprise instructing the second node to take over responsibility for a task previously performed by the first node after the second node is associated with the first node. For example, when the second node is powered by an external power source and the first node is powered by a battery, the responsibility for certain tasks may be taken over by the node with a more robust power supply (e.g., the node powered by an external power source).

In more detail, the responsibility for certain tasks may be established, tracked and changed with a programmable profile. For example, in one embodiment, the server may establish a profile for how long the task responsibility would change. In some cases, the profile may define a period of time for how long a node having this profile would have responsibility for a certain task before it would revert back to a default node. In another example, a node (such as a master node) may have a default condition trigger (like a low power situation or when it cannot communicate with the server) that can override such a profile so that it does not take on more responsibilities under particular conditions.

Furthermore, an embodiment may have the master node deciding what other node may take on responsibility for certain tasks. This may be helpful in situations where access to the server may be limited (e.g., an airborne environment). However, managing such a profile may be more easily accomplished in other embodiments with easier access to more types of context data on the server level.

In an embodiment that implements association management as a system, such an exemplary system for association management of a wireless node network may comprise a first node, a second node, and a server. The second node includes a node processing unit, a node volatile memory coupled to the node processing unit, a first communication interface coupled to the node processing unit, and a second communication interface coupled to the node processing unit. The first communication interface provides a short-range communication path between the first node and the second node and the second communication interface provides a longer range communication path between the second node and the server.

The server includes a server processing unit, a server volatile memory coupled to the processing unit, and a third communication interface that provides a longer range communication path between the server and the second communication interface of the second node.

The node volatile memory maintains at least a first program code section (e.g., master control and management code 425 or parts thereof) while the server volatile memory maintains at least a second program code section (e.g., server control and management code 525 or parts thereof).

When executing the first program code section resident in the node volatile memory, the node processing unit of the second node is operative to identify the first node as a potential for associating with the second node, transmit an association request over the second communication interface to the server, receive an association response (having at least authorization information generated by the server) over the second communication interface from the server, provide the authorization information to the first node, and associate the first node and the second node.

In one example, the node processing unit may be further operative to review status information related to the first node to determine whether the first node desires association with the second node. In another example, the node processing unit may be further operative to securely provide shared data between the first and second node after the first and second node are associated and in accordance with a sharing profile provided by the server. The sharing profile may define types of information to be securely shared between particular nodes.

When executing the second program code section resident in the server volatile memory, the server processing unit is operative to determine a location of the first node and second node, determine if associating the first node to the second node is desired based at least upon the location of the first node and the location of the second node, store new association data in the server volatile memory if it is desired to associate the first node with the second node, and transmit the authorization response to the second node granting the permission to associate the first node to the second node.

In one embodiment, the second node in the system may take over responsibility of a task previously handled by the first node after the second node is successfully associated with the first node. For example, when the second node is powered by an external power source and the first node is powered by a battery, the system may be more effectively and efficiently managed by reassigning a task (especially a task that involves a significant expenditure of power, a series of operations over a significant period of time, or both) to another node, such as the second node, which has more power available than the first node.

In another embodiment, the server processing unit may be further operative to set a current mode of filtering that limits potential nodes to be associated, and grant the permission to associate the first node to the second node only if the current mode of filtering allows the first node to be associated with the second node. In a further embodiment, the server processing unit may be further operative to alter (e.g., override) the current mode of filtering to a different mode of filtering. In this way, the server may adapt how nodes are managed and allow the first node to be associated with the second node if it is desired, such as then the first node is in an alert status level and urgently is requesting connection to a larger group of nodes than permitted under the current mode of filtering.

While the exemplary methods illustrated in FIGS. 23 and 24 focus on active associations, FIG. 25 is a flow diagram illustrating an example method for association management of a wireless node network having at least a plurality of nodes and a server in accordance with an embodiment, but from the perspective of a node that is to be passively associated with another node. Referring now to FIG. 25, method 2500 begins with a second of the nodes receiving a message broadcasted from a first of the nodes at step 2505. At step 2510, the second node captures an address of the first node from the message. At step 2515, the first node and the second node are associated by storing the captured address of the first node and an address of the second node as association data in a memory of the second node. At step 2520, the second node transmits the association data to the server.

At some point, the server may be updated by the second node with updated association data when the second node does not receive an additional message broadcast from the first node. For example, the second node and the first node may stay associated and securely connected for a period of time, but eventually the first node may move such that the connection is no longer viable or the first node may move closer to another node along the anticipated path it is traveling (e.g., an anticipated shipping path along a conveyor within a structure from an entry point of the structure but now closer to an exit point of the structure). As the first node travels on the conveyor, it may get closer to another node near the exit point and is better managed by an association with that other node near the exit point. Thus, the updated association data reflects that the first node is disassociated from the second node.

Method 2500 may further include having the second node determining a location of the first node, and updating the server with a current location of the second node and the determined location of the first node. Additionally, method 2500 may include receiving location information from the server that defines a refined location of the first node.

In an embodiment that implements passive association management as a managing node (e.g., a master node) in a wireless node having at least another node and a server, such an exemplary managing node comprises a processing unit, a first and second communication interface each coupled to the processing unit, a volatile memory coupled to the processing unit, and a memory storage coupled to the processing unit. The first communication interface provides a first communication path to the other node, can receive a message broadcast from the other node, and provide the message to the processing unit. The second communication interface providing a second communication path to the server.

The memory storage may maintain at least a node association manager module as program code to be executed by the processing unit. When the processing unit loads the module into volatile memory and executes instructions of the module, the processing unit is operative to receive the message from the first communication interface, capture an address of the another node from the message, store the captured address of the another node and an address of the managing node as part of association data in the memory storage, and transmit the association data to the server through the second communication interface.

In one example, the memory storage also maintains a location manager module and, when the processing unit also loads the location manager module into volatile memory and executes instructions of that module, the processing unit is operative to determine a location of the other node, determine a current location of the managing node (e.g., via GPS location signals), and update the server with the current location of the managing node and the determined location of the other node.

The managing node may be further operative to update the server with updated association data when the first communication interface does not receive an additional message broadcast from the other node. The updated association data may reflect that the other node is disassociated from the managing node.

Context Management within a Wireless Node Network

As explained above in general, management of nodes may rely upon the contextual environment of the nodes. As shown in FIG. 5, server 100 has access to a wide variety of different context data 560. Context data, such as data 560, may include a wide variety of data that generally relates to the environment in which the nodes are operating and may be used to advantageously provide enhanced node management capabilities in accordance with embodiments of the present invention. As such, the use of such context data provides a data foundation in an embodiment so that the server may better and more efficiently implement management tasks related to nodes in the network, and adjust such tasks to account for relevant context data as nodes move within the network (e.g., as an ID node moves with an item being shipped along an anticipated or predicted transit path from an origin to a destination). For example, the server take advantage of its ability to rely upon relevant context data to advantageously alter how it instructs a node operate, how it associates a node with the another node, how it can better locate a node, and how it can more efficiently track and respond to requests to report the location of the node.

Figure 26:
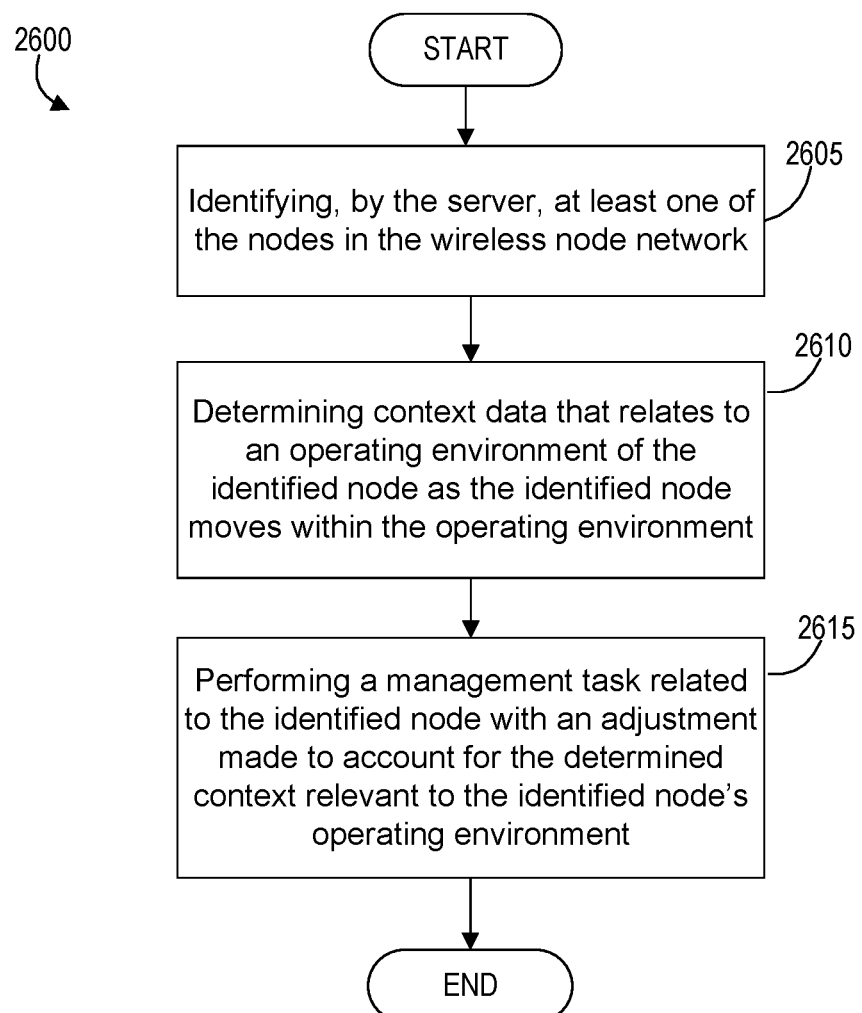
FIG. 26 is a flow diagram illustrating an exemplary method for context management of a wireless node network in accordance with an embodiment of the invention.

FIG. 26 is a flow diagram illustrating an exemplary method for context management of a wireless node network in accordance with an embodiment of the invention. Referring now to FIG. 26, method 2600 begins at step 2605 by identifying, by the server, at least one of the nodes. In one example, such as that shown in FIG. 22a, server 100 may identify ID node A 2220a as part of communications received from master node M1 2210a. At step 2610, the server determines context data that relates to an operating environment of the identified node as the identified node moves within the operating environment.

In one embodiment, the context data may include one or more types of data, such as scan data, historic data, shipment data, RF data, and layout data. For the example shown in FIG. 22a, server 100 may access context data 560 (which may be kept in context database 565) to determine parts of the context data 560 that relate to the operating environment of ID node A 2220a. Such context data 560 may include, in this example, shipment data that relates the item being shipped that is connected to ID node A 2220a, scan data for when the item connected to ID node A 2220a was scanned upon entering structure 2200, historic data for how long it takes a node to traverse the conveyor located within structure 2200, and layout data on dimensions of structure 220. Those skilled in the art will appreciate that context data may include operational environment information created within the wireless node network or created by a third party (e.g., weather information related to the operating environment of ID node A 2220a).

While the server determines context data that relates to an operating environment of the identified node in one embodiment, such a current or anticipated operating environment for a node in a more detailed embodiment may include one or more types of environments. For example, the current or anticipated operating environment for a node may include an electronic communication environment, a physical environment of an anticipated path along with a node moves, a conveyance environment related to how a node moves, and a density environment related to the density of nodes within an area near a particular node identified by the server.

Back at step 2610, the determining step may involve determining the context data that relates to an anticipated operating environment of the identified node as the identified node moves in a predicted path towards a location of another node. In another example, the determining step may involve determining the context data that relates to the anticipated operating environment of the identified node and an anticipated operating environment of the another node as the identified node moves in the predicted path towards the another node for an expected association with the another node.

At step 2615, the server performs a management task related to the identified node with an adjustment made to account for the determined context data. When the determined context data (such as RF signal degradation information) indicates that no adjustment is actually needed when performing the task, no adjustment is made given the determined context data. Thus, those skilled in the art will appreciate that an adjustment may be made when needed contextually and is not required at all times.

In one embodiment, performing the management task may comprise generally instructing the identified node to alter its operation based upon the determined context data. For example, server 100 may perform the management task of instructing ID node A 2220a to change its connectable and non-connectable intervals as it approaches master node M1 (which server 100 knows from context data, such as scan data generated when node A entered structure 2200). Thus, in this example, server 100 is able to leverage enhanced visibility of ID node A 2220a based upon context data and advantageously alter the operation of node A to increase the node's chance of successfully associating with master node M1 2210a.

In other embodiment, performing the management task may comprise associating the identified node with another node with the adjustment made to alter an associating parameter based upon the determined context data. In other words, context data may be helpful as part of associating nodes. In one example, the associating parameter may include at least one altered timing interval related to associating the identified node with the other node, such as an alert interval or connectable interval. These intervals are parameters that may be altered as part of adjustments made when a server associates two nodes and, for example, sets the intervals to more appropriate time durations in order to enhance the chance and opportunity the nodes have to actively pair and securely share data as needed.

In yet another embodiment, performing the management task may comprise locating the identified node with an adjustment made to a power setting based upon the determined context data. In one example, the power setting adjustment is done to a master node in direct communication with the server. In another example, the power setting adjustment may be done to an ID node, which is passed this operational adjustment information from another node. In one embodiment, the power setting itself may comprise an output power level adjusted to account for an adverse condition in the operating environment of the identified node (e.g., a master node with an adjusted RF output signal level). The adverse condition may be, for example, an adverse RF communication environment where structure attenuates or otherwise impedes normal RF communications. In another example, the adverse condition may be a highly dense population of nodes close to the identified node.

In more detail, the output power level may be adjusted to account for a shielding condition in the operating environment of the first node. Such a shielding condition may be caused, for example, by one or more of packaging, package contents, proximate package, proximate package contents, and physical infrastructure in the operating environment of the first node. For example, if the identified node is located near a metal container, it is operating in an adverse RF communications environment where it may have its output power level increased based on this context data in order to better deal with the adverse shielding condition.

In still another embodiment, performing the management task may comprise providing the location of the identified node in response to a request received by the server related to a status of the identified node. For example, if server 100 receives a request from user access device 205 about the status of ID node A 2220*a*, server 100 is able to provide the location of node A as being within structure 2200, but refined as being close to the entry of the structure given the adjustment to account for contextual data, such as scan data related to the item being shipped with node A 2220*a*.

Those skilled in the art will appreciate that method 2600 as disclosed and explained above in various embodiments may be implemented on a server, such as server 100 illustrated in FIGS. 5 and 22A, running one or more parts of server control and management code 525 (e.g., the context based node manager). Such code may be stored on a non-transitory computer-readable medium such as memory storage 515 on server 100. Thus, when executing code 525, the server's processing unit 500 may become unconventionally operative to perform operations or steps from the exemplary methods disclosed above, including method 2600 and variations of that method.

Node Location Determination Methodologies

As part of managing and operating a wireless node network in accordance with one or more embodiments of the invention, such as tracking ID node A 2220*a* in FIGS. 22A-C, determining a node's location is performed. As explained above, an exemplary ID node may be directly or indirectly dependent on a master node to determine its location. In the embodiments discussed and described herein, a location of a node may generally encompass a current or past location. For example, an embodiment that determines a node's location may be a current location if the node is not moving, but may necessarily determine the location as a past location should the node be in a state of motion.

Likewise, the term location alone may include a position with varying degrees of precision. For example, a location may encompass an actual position with defined coordinates in three-dimensional space, but use of the term location may also include merely a relative position. Thus, the term location is intended to have a general meaning unless otherwise expressly limited to a more specific type of location.

Determining node location may done by a master node alone, the server alone, or the master node working together with the server. And on such devices, embodiments may use one or more methodologies to determine a node's location and further refine the location. Such example methodologies may include, but are not limited to, determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. A more detailed description of these exemplary node location determination techniques is provided below.

Location Through Proximity

In one embodiment, a signal strength measurement between two or more nodes may be used to determine the proximity of the nodes. If neither node's actual location is known, one embodiment may infer a location relationship of the two nodes through proximity.

Proximity when Varying Power Characteristics

For example, an exemplary method of determining a node's location in a wireless node network of nodes may involve varying a node's power characteristic, such as the output power of one of the nodes. Generally and as explained with reference to FIG. 13, the power characteristic may be varied to identify closer ones of the nodes to the node broadcasting. The node broadcasting may transmit one or a series of signals while other nodes may report receiving one or more of the signals. Those other nodes that receive at least one signal broadcast from the transmitting node may be deemed part of a close group of nodes. And as the power characteristic is varied (increased or decreased or both), a closest group of nodes (or single node) may be identified as the smallest group of nodes of those that receive at least one signal from the broadcasting node. Accordingly, while not absolute, a type of location for the broadcasting node may be determined based on the closest one or group of nodes. This may be repeated for neighboring nodes to yield a set of closest node information for each of the nodes. In more detail, an exemplary set of closest node information for each of the nodes may include which nodes are closest (via the lowest power characteristic) and more robustly supplement this information with which other nodes are incrementally further away (via increasingly larger power characteristics). Thus, the set of closest node information provides the basis for a determination of how close the nodes in the network are to each other, which provides a type of location determination for each node.

Additionally, context data may be referenced in certain embodiments to further enhance determining how close the nodes are to each other. For example, combining the set of closest node information with context data, such as scan information that registers when an item changes custodial control in a delivery system, may further refine how to determine the location of the nodes. Scan and other context information will help determine if one or more of the nodes, for example, are known to be in the same container, vehicle or moving on a belt together. Thus, this type of context data may be integrated into a further step of refining how close the nodes are to each other based upon the context data.

Figure 28:
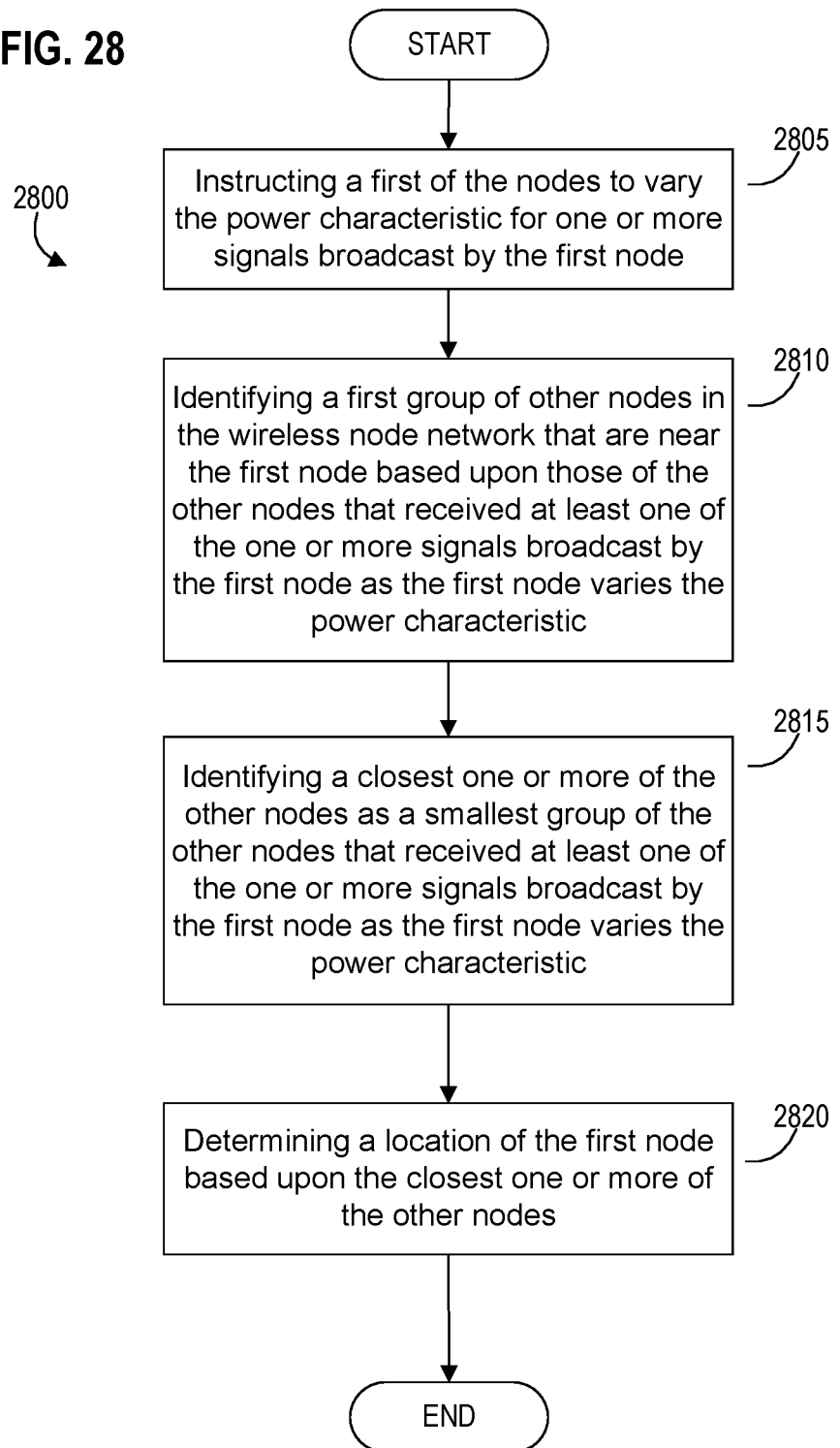
FIG. 28 is a flow diagram illustrating an exemplary method for location determination by varying a power characteristic of nodes in a wireless node network in accordance with an embodiment of the invention.

In general, a location of a node based upon proximity may be determined when a power characteristic of nodes is changed or varied in a wireless node network. FIG. 28 is a flow diagram illustrating an exemplary method for location determination by varying a power characteristic of nodes in a wireless node network in accordance with an embodiment of the invention. Referring now to FIG. 28, method 2800 begins by at step 2805 by instructing a first of the nodes to vary the power characteristic for one or more signals broadcast by the first node. In a more detailed embodiment, such an instruction may cause the first node, for example, to incrementally decrease or incrementally increase the power characteristic (such as an output power level) between values.

At step 2810, method 2800 continues by identifying a first group of other nodes in the wireless node network that are near the first node based upon those of the other nodes that received at least one of the signals broadcast by the first node as the first node varies the power characteristic. In a further embodiment, step 2810 may incrementally identifying which of the first group of other nodes are receiving at least one of the broadcast signals as the first node incrementally varies the output power level of the signals broadcast. The incrementally identified nodes may be deemed a set of increasingly close nodes to the first node.

At step 2815, method 2800 continues by identifying a closest one or more of the other nodes as a smallest group of the other nodes that received at least one of the one or more signals broadcast by the first node as the first node varies the power characteristic.

At step 2820, method 2800 concludes by determining a location of the first node based upon the closest one or more of the other nodes. Thus, as the power characteristic is varied, the group of nodes that have received at least one of the signals broadcast by the first node may change and the smallest such group being a closest group of nodes (even if just one node) to the first node. In a more detailed embodiment, step 2820 may comprise determining the location of the first node based upon the closest one or more of the other nodes and the set of increasingly close nodes to the first node as the set of increasingly close nodes provides more detailed proximity information for a refined location determination.

Figure 14:
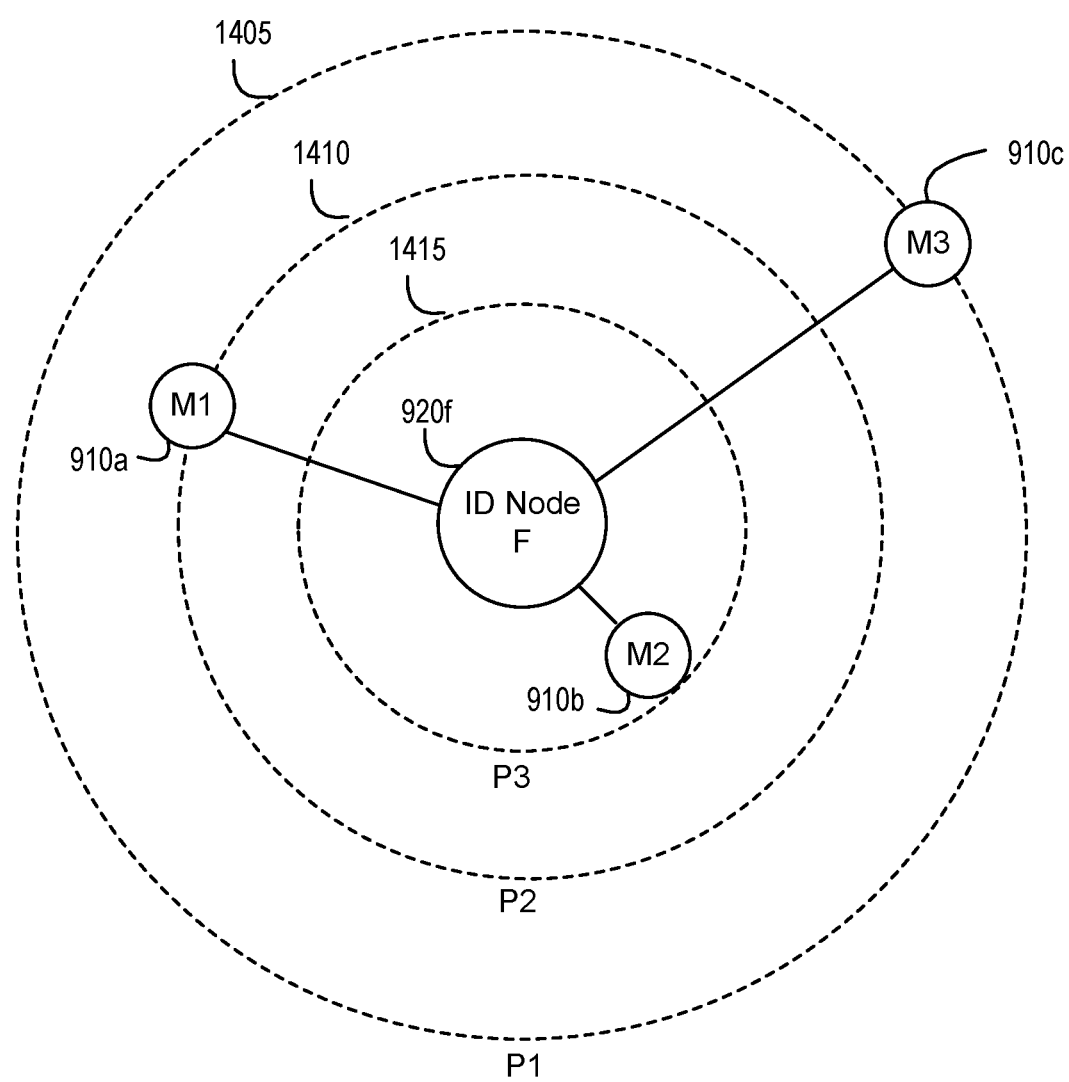
FIG. 14 is a diagram illustrating an exemplary location determination using ID node advertise in accordance with an embodiment of the invention.

For example, referring to FIG. 14, the set of increasingly close nodes to the ID node F 920*f* may include node M3 as being farthest away and M1 being closer than M3. When the power characteristic of ID node F incrementally decreases, and its output power level changes from P1 to P2, M3 can no longer receive the signal, but M1 and M2 still do. And as the power characteristic of ID node F continues to incrementally decrease, and its output power level is changed from P2 to P3, M1 can no longer receive the signal, but only M2 does as the last of the nodes closest to ID node F. Thus, in this example, determining the location of ID node F may be based upon the fact that M2 is the closest node and the set of increasingly close nodes include M1 and M3 with M1 being closer than M3.

In another embodiment, one or more further refinements to the first nodes location may be performed. In one example, steps 2805-2820 may be repeated where a second of the nodes is instructed to vary the power characteristic for one or more signals broadcast by the second node, and then method 2800 may further refine the location of the first node based upon a location of the second node. In a more detailed example, steps 2805-2820 may be repeated where a second of the nodes is instructed to vary the power characteristic for one or more signals broadcast by the second node, and then method 2800 may further the location of the first node based upon a location of the second node and a set of increasingly close nodes to the second node. With this increasingly cross-related information on what nodes are closer to other nodes and to what degree, which may be further repeated for additional nodes, embodiments may further refine the location of the first node within the network.

Method 2800 may further include determining context data related to the first node, and refining the location of the first node based upon the context data. In an embodiment where the power characteristic is output power level, the incremental changes in the output power level of the broadcast signal in steps 2805-2815 may be set according to the context data.

Method 2800 may also determine the context data to be related to the closest node to the first node, and refine the location of the first node based upon the context data. In still another example, method 2800 may determine the context data to be related to the incrementally identified nodes in the set of increasingly close nodes to the first node, and refining the location of the first node based upon the context data. For example, the closest node and the set of increasingly close nodes may have scan data that indicate they are within the same container. This exemplary context data may be used to further refine the location of the node being located, which may help efficiently determine that node is near the container. As such, those skilled in the will appreciate that context data for the node being located as well as nodes identified to be close to that node may provide relevant input to advantageously help further refine the location of the node.

Those skilled in the art will appreciate that method 2800 as disclosed and explained above in various embodiments may be implemented on a server apparatus, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be programmatically transformed to become unconventionally operative to perform operations or steps from the exemplary methods disclosed above, including method 2800 and variations of that method.

An embodiment of such a server apparatus may include a server (such as server 100) operative to communicate with a plurality of nodes in the wireless node network. As explained with respect to FIG. 5, the server generally includes a server processing unit, a server volatile memory, a server memory storage, and at least one communication interface. In this embodiment, the volatile memory, memory storage, and communication interface are each coupled to the processing unit. The memory storage maintains at least a program code section and location data related to a location of one or more of the nodes. The communication interface provides a communication path operatively coupling the server with the nodes.

The server processing unit, as mentioned above, is operative when running the program code section, to perform the steps and operations as described above relative to method 2800 and variations of that method described above.

Proximity when Observing Signal Patterns and Strengths Over a Time Period

In another embodiment, an improved method for determining a node's location through proximity may include analyzing the signal patterns and strengths between an advertising node and a listening node. In one embodiment, a threshold may be set for association based on an observed message count and/or recorded signal strength within a specific time period may improve the ability to locate a node (e.g., an ID node) to that of another node (e.g., a master node). In some embodiments, the observed message count may be implemented as an averaged count over a repeated time periods. Further still, other embodiments may filter outlying observations in the observation data set to help improve the quality of data relied upon for setting a threshold for association and, as a result, determine a node's location.

In a more detailed example, an improved method for determining a node's location through proximity may show captured advertising message counts as a component for a node's location and determining a node's direction of travel. In this example, two exemplary master nodes (e.g., master node M1 910*a* and M2 910*b*) may capture advertising messages from one ID node (e.g., ID node A 920*a*). Master node M1 may observe and capture (e.g., record information related to the observation) 60 messages from ID node A within a 2 minute period, while master node M2 only observes and captures 7 advertising messages from ID node A within that same period. Based upon the difference in how often messages are observed from ID node A by master node M1 compared to those observed by master node M2, the system is able to determine that ID node A would more proximate to master node M1, and it's known location.

In a further embodiment, comparing the average time stamp of the captured records may allow the system can make a more accurate determination of location. For example, if the average captured message found on master node M2 is increasingly growing larger (e.g., taking longer for messages to go from ID node A to master node M2), this indicates ID node A is moving away from master node M2. If the average captured message found on master node M2 is growing increasingly larger while the average captured message found on master node M1 is increasingly growing smaller, this indicates ID node A is moving away from master node M2 and toward master node M1. Thus, over a number of observed time periods, the change in message timing (transmission to reception) may also be relied upon to enhance or refine a node's location.

In yet another embodiment, the observed signal strength may be a component in location determination and estimating direction of travel and may allow the system can make a more accurate determination of location. For example, two master nodes (M1 910a and M2 920b) may be capturing advertising messages from a node (ID node A 920a). M1 captures 60 messages from ID node A within 2 minutes, while M2 captures only 7 messages. The average signal strength observed for signals from ID node A by master node M1 is higher compared to the average signal strength observed by master node M2. Based upon this observed signal strength information, the system would determine that ID node A to be at M1, but a predicted path may indicate ID node A is heading towards M2. As the master nodes M1 and M2 continue to capture records, the system (e.g., management code 524 operating on server 900, which is in communication with M1 and M2) processes the continued feed of capture records from M1 and M2. With this observed signal strength information, the server 900 would expect that the count and average signal strength of messages from ID node A over the time period observed (2 minutes) to increase for observations at M2 and to decrease for observations at M1 when ID node A is physically moving closer to M2 and away from M1. Thus, the change in observed powers levels and in how often messages are observed may indicate actual node movement in an embodiment.

Basing node proximity location and node directional determinations on observed signal patterns and characteristic strengths over a period of time has the advantage of reducing the likelihood of unwanted and spurious signal anomalies causing an ID node's location to be incorrectly determined. And the above exemplary methods for determining movement characteristics of a node (e.g., moving closer to one node, moving closer to one but away from another, etc.) as part of refining the node location may be applied in combination with the various embodiments for determining node location described herein.

Figure 27:
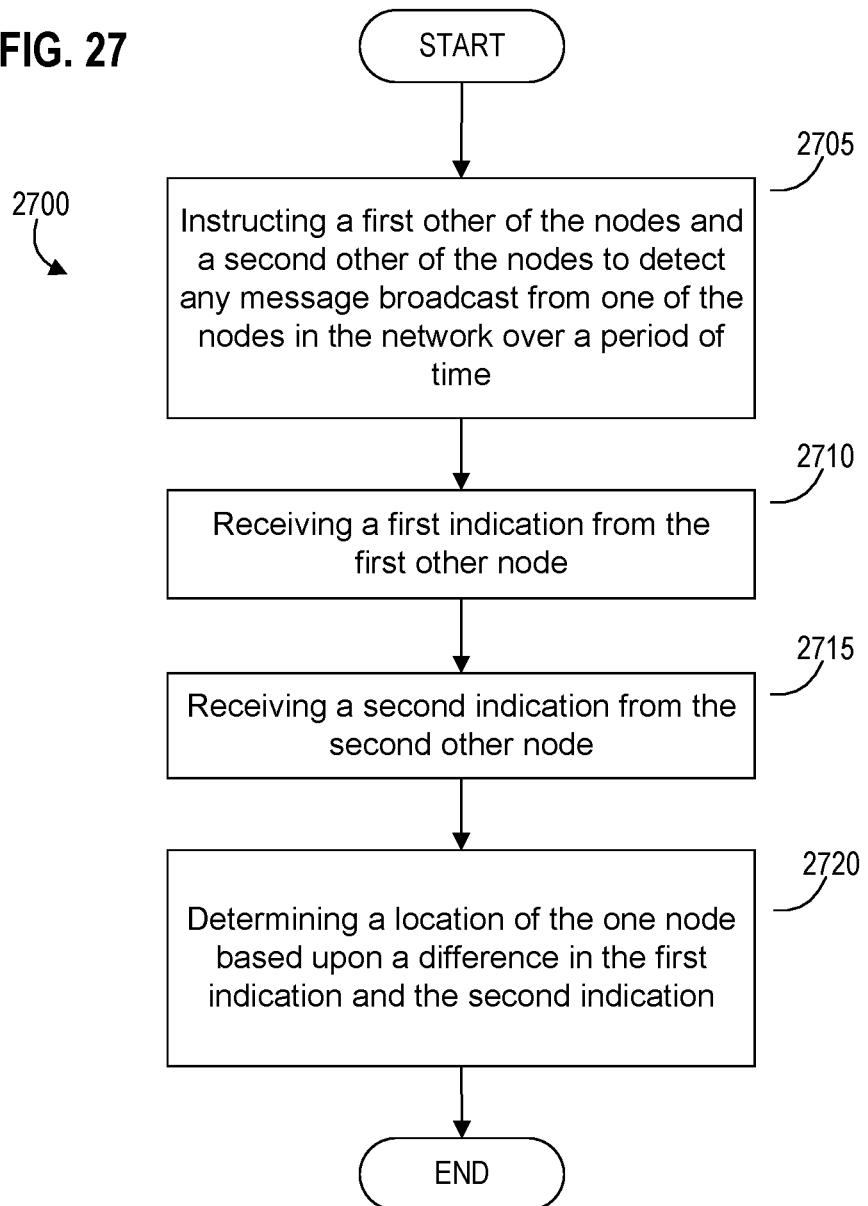
FIG. 27 is a flow diagram illustrating an exemplary method for locating a node in a wireless node network based upon observed signal patterns and characteristic indications over a period of time in accordance with an embodiment of the invention.

FIG. 27 is a flow diagram illustrating an exemplary method for proximity locating a node in a wireless node network based upon observed signal patterns and characteristic indications over a period of time in accordance with an embodiment of the invention. Referring now to FIG. 27, method 2700 begins at step 2705 by instructing a first and a second other nodes to detect any message broadcast from the one node over a period of time. The period of time may be set based upon a variety of factors, such as context data. In more detail, the period of time may be dynamically changed based upon context data as the one node moves into different contextual environments.

Method 2700 has the server receiving a first indication from the first other node at step 2710 and receiving a second indication from the second other node at step 2715. Finally, the method 2700 determines a location of the one node based upon a difference in the first indication and the second indication at step 2720.

The first indication is related to a characteristic of messages broadcast from the one node that are detected by the first other node during the period of time. Likewise, the second indication is related to the characteristic of messages broadcast from the one node that are detected by the second other node during the period of time. These indications may include, for example, a count of messages received by the respective other nodes, a transit time factor (e.g., an average transit time for a message to be detected after broadcast), and an average signal strength.

In one embodiment, the first indication may be a first count of messages broadcast from the one node that are detected by the first other node during the period of time, and the second indication may be a second count of messages broadcast from the one node that are detected by the second other node during the period of time. As such, determining the location of the one node may be the location that is closer to the first other node than the second other node when the first count is greater than the second count. Additionally, the method 2700 may further include determining an actual node movement direction for the one node based upon comparing the first count and the second count over a plurality of time periods. For example, the method 2700 may repeat observations over several of these time periods and track the first count and second count over time to determine which is increasing, which is decreasing, and determine movement of the one node based upon these measurements over time.

In another detailed embodiment, the first indication may be a first time factor of messages broadcast from the one node that are detected by the first other node during the predetermined time period, and the second indication may be a second time factor of messages broadcast from the one node that are detected by the second other node during the period of time. And an actual node movement direction for the one node may be based upon comparing the first time factor and the second time factor. In a more detailed embodiment, the first time factor may be an average transit time for a message detected at the first other node to go from the one node to the first other node, and the second time factor is an average transit time for a message detected at the second other node to go from the one node to the second other node. As such, determining the location of the one node may be that the location is closer to the first other node than the second other node when the first time factor is less than the second time factor.

In yet another embodiment, the first indication may be a first average signal strength of messages broadcast from the one node that are detected by the first other node during the period of time, and the second indication may be a second average signal strength of messages broadcast from the one node that are detected by the second other node during the period of time. As such, determining the location of the one node may be that the location is closer to the first other node than the second other node when the first average signal strength is greater than the second average signal strength.

The method 2700 may also include, in an embodiment, observing a degree of change in the first average signal strength and a degree of change in the second average signal strength over repeated time periods, and determining an actual node movement direction for the one node based upon comparing the degree of change in the first average signal strength and the degree of change in the second average signal strength.

In another embodiment, the method 2700 may also refine the determined location of the one node. In this embodiment, the method 2700 may further comprise refining the location of the one node based upon at least one of a first updated location received from the first other node and a second updated location received from the second other node. For example, when first other node is a mobile master node and it is the closer of the two nodes to the one node being located, the embodiment can take advantage of the location signaling onboard the first other node that provides the current location of the first other node. That current location data may be transmitted by the first other node to the server to update the server in its calculation of the location for the one node.

In still another embodiment, the method 2700 may layer context data with the determined location to refine the location of the node. Context data related to the one node may be determined by the server, and so the location of the one node may be refined based upon that context data. In another example, context data related to the closer of the first other node and the second other node when compared to the location of the one node. For example, the server may be aware that a particular master node is closer to the one node compared to a second master node, and that the particular master node is within a container. With this additional context data related to the particular master node, the server may refine the location of the one node based upon the context data. Other exemplary types of relevant context data may be relied upon when refining the location of the one node, such as context data of a particular shielding associated with the environment near the particular master node (e.g., a particular type of ULD having known RF shielding characteristics, etc.)

Additionally, the method 2700 may involve looking to see if the one node is behaving as expected. More specifically, a further embodiment of the method 2700 may further compare the location of the one node to a predicted path of the one node to determine if the one node is located outside the predicted path. This may allow the server to use learned, historic data when creating a predicted path, and keep track of the one node relative to being within an acceptable range associated with this predicted path. The method may also generate a notification if the one node is outside the predicted path. In this manner, actionable tasks can then be taken to locate the one node—e.g., changing filter mode options for nodes in that general area, etc.

Those skilled in the art will appreciate that method 2700 as disclosed and explained above in various embodiments may be implemented on a server, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be programmatically transformed to become unconventionally operative to perform operations or steps from the exemplary methods disclosed above, including method 2700 and variations of that method.

Association Driven Locating with Variable RF Characteristics

As noted above, a signal strength measurement between two or more nodes may be used to determine relative distance between nodes. If one of the nodes has a known location (such as master node M1 910*a*), a relative location of one or more nodes within a range of the known location node is generally a function of how accurate the system may determine a distance between the node with known location and associated nodes. In other words, an embodiment may identify a relative location of an item and its related node by relying upon association-driven variable low-power RF output signals to determine a distance the node is from a known location.

Location Determination Through Master Node Advertise

Figure 13:
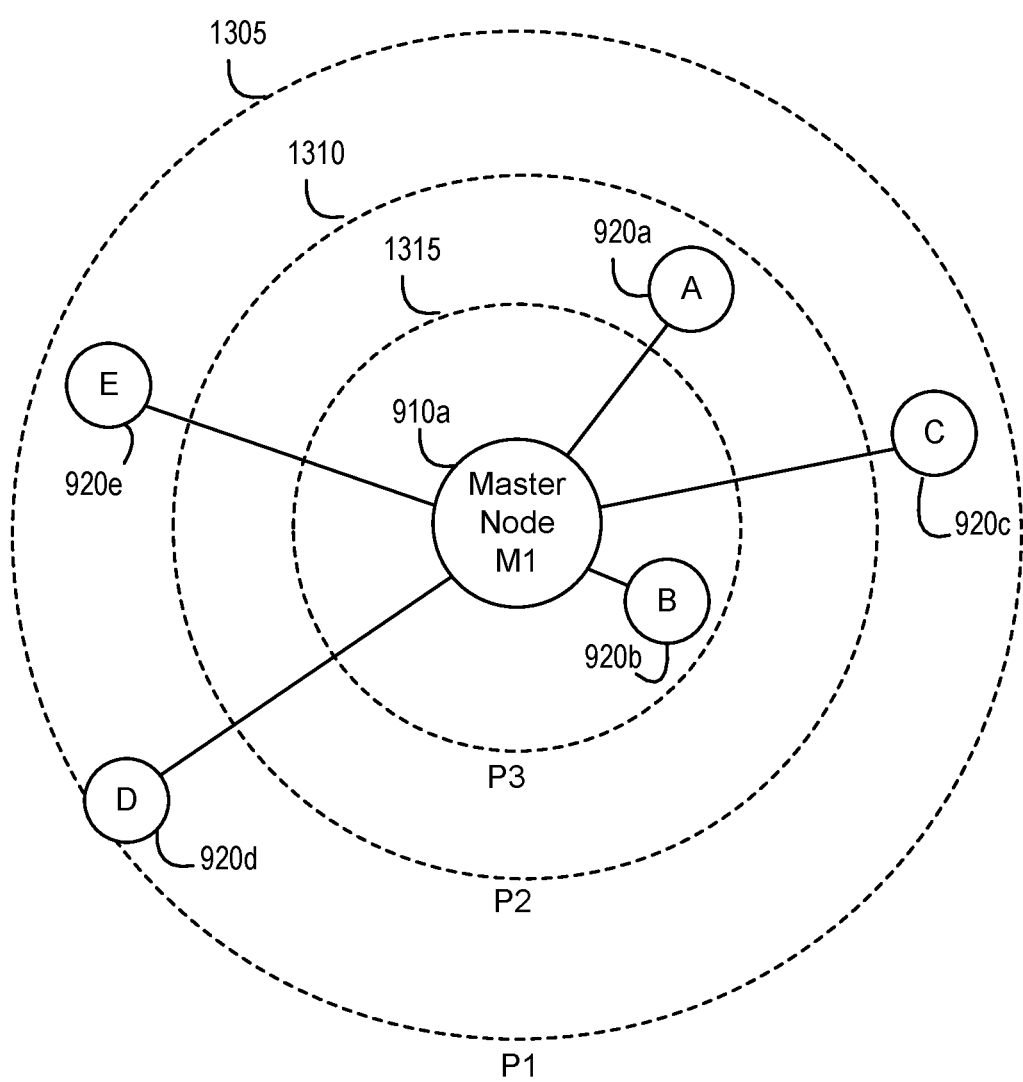
FIG. 13 is a diagram illustrating an exemplary location determination using master node advertise in accordance with an embodiment of the invention.

As generally mentioned above, determining node location may relate to controlling an RF characteristic of a node (e.g., an RF output signal level and/or RF receiver sensitivity level) and, more specifically, may involve aspects of controlling master node advertising. FIG. 13 is a diagram illustrating an exemplary location determination using master node advertise in accordance with an embodiment of the invention. In the illustrated embodiment shown in FIG. 13, a master node, such as master node M1 910*a*, with a known location is broadcasting an advertising message at varying RF output power levels. FIG. 13 illustrates the exemplary different RF output power levels as concentric ranges 1305-1315 about master node M1 910*a*. Thus, master node M1 910*a* may broadcast at a maximum power P1, related to range 1305, but may control the RF output power level and dynamically change the RF output power level to P2 and broadcast at a smaller range 1310, or to P3 and broadcast to an even smaller range 1315.

In the illustrated embodiment, receiving ID nodes A-E 920*a*-920*e* are in query (scan) mode and can each use the received signal at different levels to determine how far away from the transmitting M1 they are located. Those skilled in the art will appreciate that while the illustrated embodiment shown in FIG. 13 has the receiving nodes all as ID nodes, other embodiments may have receiving nodes be either master or ID nodes or a mixture.

In the exemplary embodiment of FIG. 13, the location for nodes A-E may be determined based upon the known location of master node M1 910*a*. That location, plus a range measurement when each of respective receiving nodes A-E last receives a signal from node M1, and factoring in a confidence factor of the range measurement, provides a location determination for the nodes according to variable RF signal power. Depending on a quality of the range measurement, the individual receiving nodes may or may not have an individually calculated location. In yet another embodiment, if third party or context data, such as scan information, is available, a refined location may be determined using such data as an additional confidence factor. As the communication range of M1 is limited from P1 to P3, the accuracy of location by association goes up.

In the illustrated example of FIG. 13, an exemplary method of determining a node's location may be described that uses master node advertising. First, when the master node M1's variable power short range communication interface 480 is set to P1, its maximum output, master node M1 910*a* is seen by each of ID nodes A-E 920*a*-920*e*. Based upon analytics or historic measurements, the open air performance (optimal range) of the radio in M1's variable power short range communication interface 480 at P1 power level may have been previously been found to be approximately 30 feet. Thus, without the need to examine RSSI levels from the individual ID nodes A-E 920*a*-920*e* and without the need for active calibration phases, the system may know that ID nodes A-E are within 30 feet of master node M1 910*a*.

Next, when the master node M1's variable power short range communication interface 480 is set to P2, a medium output level in this example, master node M1 is seen by nodes A and B. From previous analytics or historic measurements, it was determined the open air performance (optimal range) of the master node M1's variable power short range communication interface 480 running at P2 power level is approximately 15 feet. Thus, without the need to examine RSSI levels from the individual nodes, we know ID nodes A 920a and B 920b are within 15 feet of master node M1. Furthermore, we know the ID nodes no longer receiving the broadcasted RF signal from master node M1 910a (e.g., ID nodes C 920c, D 920d, and E 920e) are somewhere within 30 feet of master node M1 910a, but probably more than 15 feet away from M1.

And when the master node M1's variable power short range communication interface 480 is set to P3, its minimum output level in this example, it is seen by ID node B 920b. From previous analytics or historic measurements, it was determined the open air performance (optimal range) of the master node M1's variable power short range communication interface 480 running at P3 power level is approximately 5 feet. Thus, without the need to examine RSSI levels from the individual ID nodes, we know the location of ID node B 920b is within 5 feet of the known location of master node M1 910a.

The ranging steps, as discussed in the example above, may then be repeated for any of the identified nodes in order to build a more accurate picture of the relative location of each node. The granularity of RF characteristic settings (e.g., the RF output signal power level setting) will provide more granularity of location differentiation when performing the ranging steps. In one embodiment, the ranging steps may be performed over a set of gross RF characteristics settings (e.g., few settings over a wide range), and similar steps may then be performed over more select ranges for the RF characteristics settings.

Figure 29:
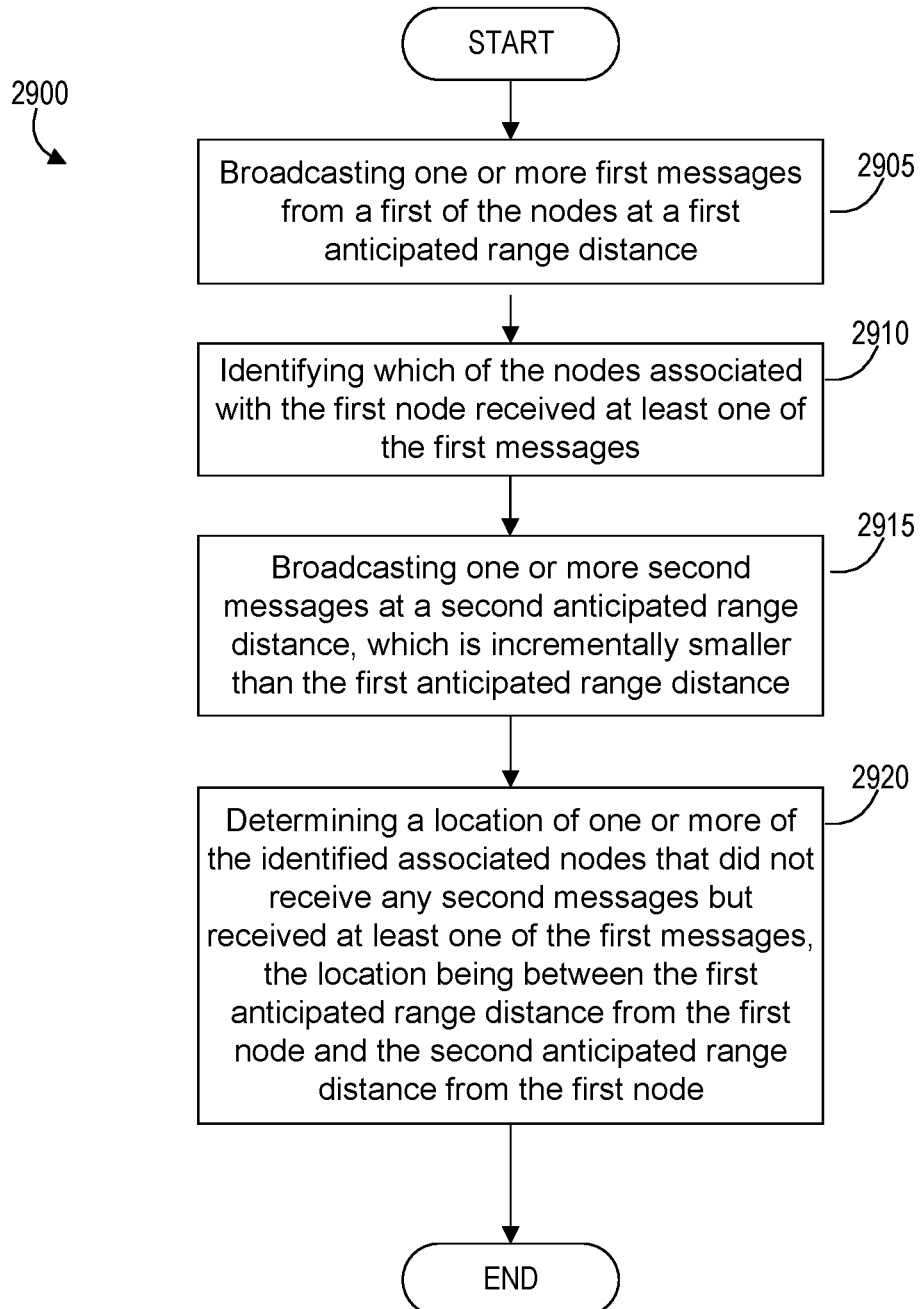
FIG. 29 is a flow diagram illustrating an exemplary method for location determination using one or more associations of nodes in a wireless node network in accordance with an embodiment of the invention.

FIG. 29 is a flow diagram illustrating an exemplary method for location determination using one or more associations of nodes in a wireless node network in accordance with an embodiment of the invention. Referring now to FIG. 29, method 2900 begins at step 2905 where a first of the nodes broadcasts one or more first messages at a first anticipated or predicted range distance. In one embodiment, the first anticipated range distance is an optimal range for the first node. For example, the first node's radio in its communication interface may have a maximum setting to allow the node to broadcast at maximized range assuming a clear environment. Such a setting provides a known anticipated range distance. In the example of FIG. 13, master node M1 910a may be broadcasting at a maximum power level P1 that reaches a first range distance from node M1. However, if node M1 is known to be within an adverse RF shielding environment, the first anticipated range distance may be a distance adjusted to account for the contextual environment of such shielding (e.g., a type of context data). Anticipated range distances may be adjusted depending upon one or more types of relevant context (e.g., one or more types of context data related to how an RF output signal from the node may be impeded).

At step 2910, method 2900 identifies which of the nodes associated with the first node received at least one of the first messages. In one embodiment, the first node may be able to access and review association data in its onboard memory storage as part of identifying which are the nodes associated with it. In one example, the associations with the first node may be passive associations (e.g., not actively paired and securely connected) or active associations (e.g., actively paired and able to securely connect and share data), or a combination of both types of associations.

Next, at step 2915, the first node broadcasts one or more second messages at a second anticipated range distance, which is incrementally smaller than the first anticipated range distance. In the example of FIG. 13, master node M1 910a may be the first node and now is broadcasting at a medium power level P2 that reaches a second anticipated range distance from node M1. By incrementally changing the RF power level in this manner, master node M1 910a now no longer can reach nodes C-E as shown in FIG. 13.

At step 2920, method 2900 concludes by determining a location of one or more of the identified associated nodes that did not receive any of the second messages but received at least one of the first messages, where the location is between the first and second anticipated range distances from the first node. Again, in the example of FIG. 13, master node M1 910a may determine the location of nodes C-E (given they did not receive the message sent out the second anticipated range distance at RF power level P2) to between the first anticipated range distance (when master node M1 was broadcasting at power level P1) and the second anticipated range distance (when master node M1 was broadcasting at power level P2) from the known location of master node M1.

In one embodiment, the method 2900 may also have the first node broadcasting one or more third messages at a third anticipated range distance (incrementally smaller range than the second anticipated range distance), and determining a location of one or more of the identified associated nodes that did not receive any of the third messages but received at least one of the second messages, where the location is approximately near the second anticipated range distance from the first node. Again, in the example of FIG. 13, by incrementally changing the power level down to P1 and broadcasting a third message at an anticipated range distance for that P1 level, the master node M1 can determine the location of node A (as node A received the second message but did not receive the third message) to be approximately near the anticipated range distance for P2 from the location of master node M1.

Additional embodiments of method 2900 may also refine such determined locations by updating the location of the first node. In one embodiment, the first node may be a mobile node. As such, refining may involve determining a current mobile location of the first node, and refining the location of the one or more of the identified associated nodes that did not receive any of the second messages but received at least one of the first messages based upon the current mobile location of the first node. Thus, as the first node moves and updates its own location (e.g., via GPS signals received by location circuitry 475 on a master node), the first node is able to leverage its own updated location and advantageously refine the location of nodes associated with it.

And, in some embodiments, the refined location of associated nodes may be transmitted to a server. This provides an update to the server, and aids in tracking and managing the location of nodes in the network. Again, referring back to the example of FIG. 13, master node M1 910a may take advantage of such a method for locating associated nodes, such as the locations of ID nodes A-E 920a-920e, and update server 100 with this new location data related to the current location of node M1 and any of the nodes associated with node M1.

Those skilled in the art will appreciate that method 2900 as disclosed and explained above in various embodiments may be implemented on a node (e.g., master node 110*a* in FIG. 4, master node M1 910*a* in FIG. 13, or master node M1 2210*a* in FIG. 22A) running one or more parts of master control and management code 425 (e.g., the location aware/ capture module). Such code may be stored on a non-transitory computer-readable medium, such as memory storage 415 on master node 110*a*. Thus, when executing code 425, the master node's processing unit 400 may be programmatically transformed to become unconventionally operative to perform operations or steps from the exemplary methods disclosed above, including method 2900 and variations of that method.

In another embodiment, a node apparatus is described in a wireless node network that uses location determination by association as described with reference to the steps related to method 2900. As mentioned above, such as node apparatus may be implemented with a master node having a node processing unit, a node volatile memory, a node memory storage, and a first and second communication interface. Each of the memories and communication interfaces are coupled to the node processing unit. Further, the node memory storage maintains at least a program code section, association data, and location data and, at times, shipping information. The first communication interface provides a first communication path operatively coupling the node with a plurality of other nodes in the network, while the second communication interface provides a second communication path operatively and separately coupling the node with a server in the network.

In this embodiment, the node processing unit is operative to transmit one or more first messages via the first communication interface at a first anticipated range distance, and identify which of the others nodes that are associated with the first node received at least one of the first messages. In one embodiment, the node processing unit may be operative to access the association data in the node memory storage when identifying which of the nodes associated (e.g., passive, active, or both types of associations) with the first node received at least one of the first messages.

The first anticipated range distance may be an optimal transmission range for the first communication interface and, in a more detailed example, may be adjusted based upon context data (e.g., RF shielding inherent from the surrounding environment of the node). In yet another embodiment, the first anticipated range distance and the second anticipated range distance may be adjusted based upon one or more types of context data related to how an RF output signal transmit from the first communication interface may be impeded by an environment of the node.

The node processing unit is also operative to transmit one or more second messages via the first communication interface at a second anticipate range distance (incrementally smaller than the first anticipated range distance) and determine a location of one or more of the identified associated nodes that did not receive any of the second messages but received at least one of the first messages. That location is between the first anticipate range distance from a known location of the node and the second anticipated range distance from the known location of the node. In a further example, the node processing unit may be operative to store the determined location in the node memory storage as part of the location data.

The node processing unit may also be operative to transmit one or more third messages via the first communication interface at a third anticipated range distance (incrementally smaller range than the second anticipated range distance) and determine a location of one or more of the identified associated nodes that did not receive any of the third messages but received at least one of the second messages, where the location is between the second anticipated range distance from the known location of the node and the third anticipated range distance from the known location of the node.

In another embodiment, the node may be mobile and the node processing unit may be further operative to refine the location of the one or more of the identified associated nodes that did not receive the second message but received the first message by updating a location of the first node. In more detail, the node processing unit may be operative to determine a current mobile location of the first node (e.g., check with location circuitry onboard the node for valid GPS signals and a location lock based on such signals), and refine the location of the one or more of the identified associated nodes that did not receive any of the second messages but received at least one of the first messages based upon the current mobile location of the first node. The node processing unit may also be operative to transmit the refined location to the server over the second communication interface.

Location Determination Through ID Node Advertise

While FIG. 13 provides an example of location determination through master node advertising, FIG. 14 focuses on location determination through ID node advertising. In particular, FIG. 14 is a diagram illustrating an exemplary location determination using ID node advertise in accordance with an embodiment of the invention. In the illustrated embodiment shown in FIG. 14, exemplary ID node F 920*f* is in an advertising mode but is without a known location. As with FIG. 13, FIG. 14 illustrates the exemplary different RF output power levels from ID node F 920*f* as concentric ranges 1405-1415 about ID node F 920*f*. Thus, ID node F 920*f* may broadcast at a maximum power P1, related to range 1405, but may control the RF output power level and dynamically change the RF output power level to P2 and broadcast at a smaller range 1410, or to P3 and broadcast to an even smaller range 1415. Master nodes M1-M3 910*a*-910*c* are disposed in various known locations relatively near ID node F 920*f*, which has an unknown location. As such, ID node F 920*f* may take advantage of the ability to adjust an RF characteristic, such as RF output signal power level, of its own short-range communication interface as part of how the system may determine location of ID node F through ID node advertising.

In the illustrated embodiment, an RF output signal power level of ID node F 920*f* may be varied or dynamically adjusted via programmable settings (such as profile settings or parameters) related to operations of variable power short range communication interface 375. Additionally, while an actual communication range may vary with the surrounding environment, a maximum anticipated communication range of the ID node's transmitter at each power level is known assuming an optimal operating environment or no substantial RF shielding or interference. Thus, a particular power level setting for a broadcasting node is inherently associated with a corresponding anticipated range distance.

In an exemplary method of determining a nodes location using ID node advertising, the RF output signal power level may be varied across multiple power levels to improve location through master node association. In more detail, when the ID node F's variable power short range communication interface 375 is set to P1, its maximum output, ID node F 920*f* is seen by each of master nodes M1-3 910*a*-910*c*. The anticipated open air performance or range distance (optimal range, or range based upon analytics or historic measurements) of the radio in ID node F's variable power short range communication interface 375 at P1 power level may have been previously been found to be approximately 30 feet. Thus, without any examination of RSSI levels from the individual master nodes, the system knows ID Node F is within 30 feet of master nodes M1-M3.

Next, when the ID node F's variable power short range communication interface 375 is set to P2, a medium output level in this example, ID node F 920*f* is seen by master nodes M1 910*a* and M2 910*b*. The anticipated open air performance or range distance (optimal range, or range based upon analytics or historic measurements) of the radio in ID node F's variable power short range communication interface 375 at running at P2 power level is approximately 15 feet. Thus, without any examination of RSSI levels from the individual nodes, we know master nodes M1 910*a* and M2 910*b* are within 15 feet of ID node F 920*f* in this example. Furthermore, we know the master node no longer receiving the broadcasted RF signal from ID node F 920*f* (e.g., master node M3 910*c*) is somewhere within 30 feet of ID node F 920*f*, but probably more than 15 feet away from node F in this example.

And when ID node F's variable power short range communication interface 375 is set to P3, its minimum output level in this example, ID node F 920*f* is seen by only master node M2 910*b*. The anticipated open air performance or range distance (optimal range, or range based upon analytics or historic measurements) of the radio in ID node F's variable power short range communication interface 375 at P3 power level is approximately 5 feet. Thus, without any examination of RSSI levels from the master nodes, we know the location of ID node F 920*f* is within 5 feet of the known location of master node M2 910*b* in this example.

The ranging steps with respect to the changed RF characteristics of an advertising ID node, as discussed in the example above, may then be repeated for any of the identified nodes in order to building a more complete picture of the relative location of each node.

Furthermore, the timing between such ranging steps may vary dynamically depending upon whether the node is moving. Those skilled in the art will appreciate that when moving, a quicker flow through such ranging steps will help to provide better accuracy given the movement of nodes. Thus, the time interval between instructing a node to broadcast one or more messages at a particular power level and then instructing that node to broadcast one or more messages at a different power level may be desired to be shorter when the node is moving, which can be determined based upon context data. For example, the context data may indicate the node is within a node package an on a moving conveyor system. As such, the node is moving relative to fixed master nodes that may be positioned along the conveyor system. Thus, server may have the first node perform the ranging steps where power is varied in relative quick succession compared to a situation where the context data indicates the node is not moving or is substantially stationary.

Figure 30:
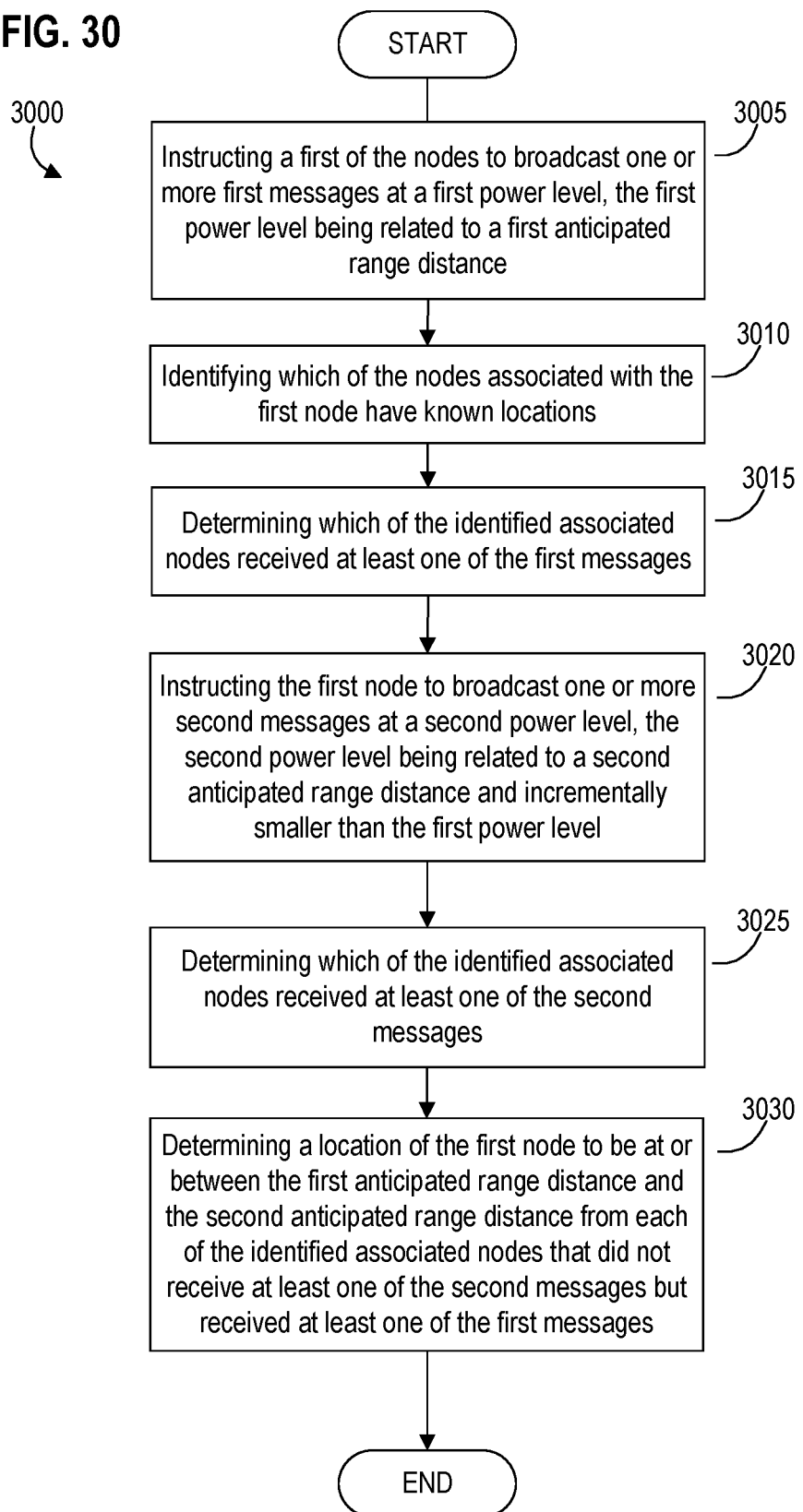
FIG. 30 is a flow diagram illustrating another exemplary method for location determination using one or more associations of nodes in a wireless node network in accordance with an embodiment of the invention.

FIG. 30 is a flow diagram illustrating another exemplary method for location determination using one or more associations of nodes in a wireless node network in accordance with an embodiment of the invention. Referring to FIG. 30 and how it explains a particular way to locate a node using associations and master node one or more master node advertising techniques, method 3000 begins at step 3005 by instructing a first of the nodes to broadcast one or more first messages at a first power level, the first power level being related to a first anticipated range distance. In one example, the first anticipated range distance may be an optimal range for the first of the nodes (e.g., a transmission range that assumes there are no obstructions and a clear signal path between nodes). In another example, the first anticipated range distance may be an optimal range for the first node adjusted based upon context data (e.g., data related to the surrounding RF environment of the first node).

At step 3010, the method 3000 identifies which of the nodes associated with the first node have known locations at step 3010. For example, this type of identification may be accomplished by reviewing association data that indicates which of the nodes are associated with the first node (e.g., via passive association, via active association, or via a combination of both), determining which of the nodes are associated with the first node based upon the reviewed association data, and identifying which of those associated nodes have known locations.

The method 3000 continues at step 3015 by determining which of the identified associated nodes received at least one of the first messages. Next, the method 3000 instructs the first node at step 3020 to broadcast one or more second messages at a second power level, where the second power level is related to a second anticipated range distance and the second power level incrementally smaller than the first power level. In a further example, the first anticipated range distance and the second anticipated range distance may be adjusted based upon one or more types of context data related to how an RF output signal from the first node may be impeded.

At step 3025, method 3000 determines which of the identified associated nodes received at least one of the second messages. Method 3000 concludes at step 3030 where the method determines a location of the first node to be at or between the first anticipated range distance and the second anticipated range distance from each of the identified associated nodes that did not receive at least one of the second messages but received at least one of the first messages.

As mentioned above, determining the node's location may be improved when accounting for movement. As such, an embodiment of method 3000 may instruct the first node to broadcast the one or more second messages within a time interval after instructing the first node to broadcast the one or more first messages. The time interval may be predetermined in some implementations, but also may be a dynamically set parameter in other implementations based upon context data related to the first node. In more detail, the time interval may be reduced from a prior value when the context data related to the first node indicates the first node is moving, but may be increased from a prior value when the context data related to the first node indicates the first node is substantially stationary.

In another embodiment, method 3000 may further include instructing the first node to broadcast one or more third messages at a third power level. Such a third power level is related to a third anticipated range distance and incrementally smaller range than the second anticipated range distance. Thereafter, the method may determining the location of the first node to be at or between the second anticipated range distance and the third anticipated range distance from each of the identified associated nodes that did not receive any of the third messages but received at least one of the second messages.

In another embodiment, method 3000 may comprise refining the location of the first node with an updated location of one or more of the identified associated nodes that did not receive at least one of the second messages but received at least one of the first messages. For example, if the first node is associated with a mobile master node, the location of the first node may be refined with an updated location of the mobile master node (which may be closer to the first node than previously determined).

In a further embodiment, the first node in the operation of method 3000 may not be self-aware of its own location. In another embodiment, the first node in the operation of method 3000 may have been previously self-aware of the location of the first node but may no longer be self-aware of the location of the first node prior to broadcasting the one or more first messages. In more detail, the first node may no longer be self-aware of the location of the first node prior to broadcasting the first message because of a change in the environment surrounding the first node. Such a change in the environment may be, for example, when the first node has moved inside a structure (e.g., building, vehicle, aircraft, container, etc.) that blocks location signals from being received by the first node.

Those skilled in the art will appreciate that method 3000 as disclosed and explained above in various embodiments may be implemented on a node (e.g., master node 110*a* in FIG. 4) running one or more parts of master control and management code 425 (e.g., the location aware/capture module) to control operations of an ID node (such as ID node F in FIG. 14) as part of location determination via ID node advertising. Such code may be stored on a non-transitory computer-readable medium, such as memory storage 415 on master node 110*a*. Thus, when executing code 425, the master node's processing unit 400 may be programmatically transformed to become unconventionally operative to perform operations or steps from the exemplary methods disclosed above, including method 3000 and variations of that method.

From an apparatus perspective, an exemplary node apparatus in a wireless node network that uses location determination by association may comprises a node processing unit, node memory coupled to and used by the node processing unit (e.g., a node volatile memory and a node memory storage). The node memory storage maintains at least a program code section, association data, and location data. The node apparatus further includes a first communication interface that provides a first communication path coupled to the node processing unit and operatively coupling the node with a plurality of other nodes in the network. For example, the master node 110 illustrated in FIG. 4 includes such types of operational structure.

The node processing unit (e.g., processing unit 400 of master node 110*a*), when executing at least the program code section resident in the node volatile memory, is operative to perform specific functions or steps. In particular, the node processing unit is operative to communicate an instruction to a first of the other nodes (e.g., an ID node or master node temporarily operating as an ID node) via the first communication interface to cause the first other node to broadcast one or more first messages at a first power level, where the first power level is related to a first anticipated range distance.

The first anticipated range distance may be an optimal range for the first of the nodes and, in more detail, an optimal range for the first of the nodes adjusted based upon context data. In even more detail, the first anticipated range distance and the second anticipated range distance may be adjusted based upon one or more types of context data related to how an RF output signal broadcast from the first node may be impeded.

The node processing unit is also operative to identify which of the nodes associated with the first node have known locations. To do this, the node processing unit may access and review association data stored on the node memory storage (e.g., data indicating what nodes are passively or actively associated with the first other node), may determine which of the remaining other nodes are associated with the first other node based upon the reviewed association data, and may identify which of the remaining other nodes determined to be associated with the first other node have known locations.

The node processing unit is also operative to determine which of the identified associated nodes received at least one of the first messages, and to communicate another instruction via the first communication interface to the first node to cause the first node to broadcast one or more second messages at a second power level, where the second power level being is to a second anticipated range distance and incrementally smaller than the first power level.

Finally, the node processing unit is operative to determine which of the identified associated nodes received at least one of the second messages, and then determine a location of the first node to be at or between the first anticipated range distance and the second anticipated range distance from each of the identified associated nodes that did not receive at least one of the second messages but received at least one of the first messages.

In a further embodiment, the node processing unit may be operative to communicate a third instruction via the first communication interface to the first node to cause the first node to broadcast one or more third messages at a third power level. The third power level is related to a third anticipated range distance and incrementally smaller range than the second anticipated range distance. Additionally, the node processing unit may then be operative to determine the location of the first node to be at or between the second anticipated range distance and the third anticipated range distance from each of the identified associated nodes that did not receive any of the third messages but received at least one of the second messages.

In still another embodiment, the node processing unit is able to account for movement of the first node with a time interval between instructions sent to the first node. In particular, the node processing unit may be further operative to communicate another instruction via the first communication interface to the first node to broadcast the second messages within a time interval after instructing the first node to broadcast the first messages. In a more detailed example, the time interval may be dynamically set based upon context data related to the first node. In even more detail, the time interval may be programmatically reduced from a prior value when the context data related to the first node indicates the first node is moving (e.g., the first node is on a moving conveyor system) and/or the time value of the interval may be increased from a prior value when the context data related to the first node indicates the first node is substantially stationary (e.g., the node is within a node package recently placed in a storage area).

The node processing unit, in a further embodiment, may be operative to refine the location of the first other node with an updated location of one or more of the identified associated nodes that did not receive at least one of the second messages but received at least one of the first messages, and cause a second communication interface (e.g., medium/long range communication interface 485 coupled to processing unit 400) to transmit the refined location to the server.

Figure 31:
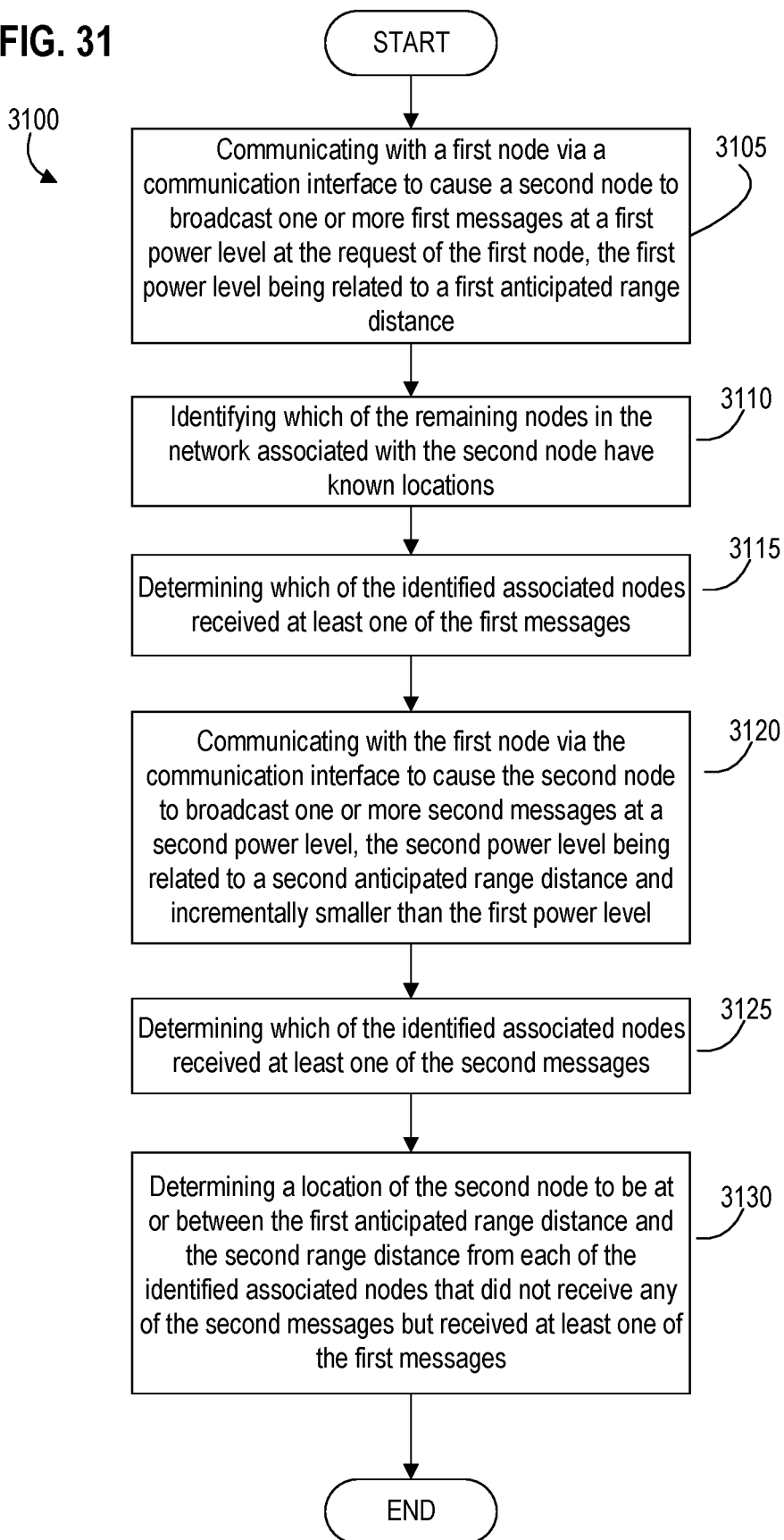
FIG. 31 is a flow diagram illustrating yet another exemplary method for location determination using one or more associations of nodes in a wireless node network in accordance with an embodiment of the invention.

From a server perspective, FIG. 31 is a flow diagram (similar to FIG. 30) illustrating yet another exemplary method for location determination using one or more associations of nodes in a wireless node network in accordance with an embodiment of the invention. Those skilled in the art will appreciate that while a server may operate to implement the steps as laid out in method 3000 and discussed above, FIG. 31 provides more details as to how a server processing unit (such as processing unit 500 running server code 525) may implement such a method at that level of the network via method 3100. In this more detailed embodiment, the server is communicating directly with a master node (e.g., a first node) to direct and control how the master node interacts with and causes operations to be undertaken on the ID node (e.g., a second node). Thus, step 3105 is similar to step 3005 but more precisely calls for communicating with a first node via a communication interface to cause a second node in the network to broadcast one or more first messages at a first power level at the request of the first node, where the first power level is related to and corresponds with a first anticipated range distance. Likewise, step 3120 is similar to step 3020 but more precisely calls for communicating with the first node via the communication interface to cause the second node to broadcast one or more second messages at a second power level at the request of the first node, the second power level being related to a second anticipated range distance and incrementally smaller than the first power level. The other steps of method 3100 are similar to those illustrated and explained above relative to method 3000, and that the similar principles will apply to method 3100.

Those skilled in the art will appreciate that method 3100 as disclosed and explained above in various embodiments may be implemented on a server (e.g., server 100 in FIG. 5) running one or more parts of server control and management code 525 to direct a master node to control operations of an ID node (such as ID node F in FIG. 14) as part of location determination via ID node advertising. Such code may be stored on a non-transitory computer-readable medium, such as memory storage 515 on server 100. Thus, when executing code 525, the server's processing unit 500 may be programmatically transformed to become unconventionally operative to perform operations or steps from the exemplary methods disclosed above, including method 3100 and variations of that method.

And similar to the node apparatus described above, one embodiment includes an exemplary server apparatus in a wireless node network that uses location determination by association. The exemplary server apparatus generally comprises a server processing unit, server memory coupled to and used by the server processing unit (e.g., a server volatile memory and a server memory storage). The server memory storage maintains at least a program code section, association data, and location data. The server apparatus further includes a communication interface coupled to the server processing unit and that provides access to a communication path operatively coupling the server with at least a first node in the network.

The exemplary server processing unit, when executing at least the program code section resident in the server volatile memory, is operative to perform specific functions or steps. In particular, the server processing unit is operative to communicate with the first node via the communication interface to cause a second node in the network to broadcast one or more first messages at a first power level at the request of the first node, where the first power level is related to a first anticipated range distance; identify which of the remaining nodes in the network associated with the second node have known locations; determine which of the identified associated nodes received at least one of the first messages; communicate with the first node via the communication interface to cause the second node to broadcast one or more second messages at a second power level at the request of the first node, where the second power level is related to a second anticipated range distance and incrementally smaller than the first power level; determine which of the identified associated nodes received at least one of the second messages; and determine a location of the second node to be at or between the first anticipated range distance and the second anticipated range distance from each of the identified associated nodes that did not receive any of the second messages but received at least one of the first messages. And in a further embodiment, the server apparatus' processing unit may be further operative to store the determined location in the server memory storage as part of the location data.

In another embodiment, the server apparatus' processing unit may be operative to communicate with the first node via the communication interface to cause the second node to broadcast the one or more second messages within a time interval after communicating with the first node to cause the second node to broadcast the one or more first messages. As previously mentioned, this type of time interval may dynamically set based upon context data related to the second node. Context data may also be used as set forth above with respect to the node apparatus but applied here to the second node—such was where the first anticipated range distance is the optimal range for the second node adjusted based upon context data.

Master Node Location Determination Through Advertise

In another embodiment, a master node may no longer know its location. For example, such a situation may occur when a master node determines its current location via GPS location circuitry 475, but the master node finds itself without access to an adequate number of GPS signals (e.g., it cannot determine a location due to the lack of a sufficient number of GPS signals from diverse GPS satellites). Such a situation may happen when the master node moves indoors is proximate to a structure that interferes with the location signals.

In an exemplary embodiment where a master node attempts to determine its own location via advertising techniques, the master node may detect a loss of location confidence (e.g., upon a loss of detected GPS signals; upon detecting a separate signal to processing unit 400 indicating the master node's location is unknown; when processing unit 400 senses movement (e.g., via accelerometers (not shown) or the like) but cannot confirm that the location circuitry 475 is providing updated location information for the node, etc.). In other words, the master node becomes aware that it no longer has a known location.

Next, the master node responds by beginning to broadcast one or more advertising messages in a similar way as ID node F 920*f* is described as doing with respect to FIG. 14. This is done so that the master node having an unknown location can advantageously leverage off the known locations of nearby other nodes. As such, an embodiment may allow a type of leveraged chaining effect whereby known locations of particular types of nodes may be used to extend location information to other nodes that do not know their locations (e.g., ID nodes) or nodes that have detected a loss of location confidence (e.g., master nodes). Thus, such an embodiment may be used to determine an indoor location of a master node (including equipment equipped with master node functionality) in cases where signals for the conventional onboard location circuitry 475 are not available.

Referring back to the exemplary method 3000 and FIG. 30, method 3000 may be such that the first node is not self-aware of the location of the first node. This may happen when the first node (e.g., an ID node) is actually a master node that was previously self-aware of its own location (e.g., via received GPS signals) but is no longer self-aware of its location (e.g., when the GPS signals can no longer be received), which has the master node changing operation to operate as an ID node prior to broadcasting the first message. In other words, the master node may no longer be self-aware of its location and begin operating as an ID node for purposes of location determination prior to broadcasting the first message because of a change in the environment surrounding the master node, such as when the master node has moved inside a structure that blocks location signals from being received by the master node. Thus, an embodiment may advantageously allow a node to adaptively alter operations when moving from a clear outdoor environment to an indoor environment. And a server may interact with such a master node while that master node is operating, for location purposes, as an ID node, temporarily.

Location with Improved RSSI Measurements

In another embodiment, a signal strength measurement between two or more nodes may be used to determine the proximity of the nodes by using one or more improvements to conventional RSSI measurements. In conventional RSSI measurements, such as with Bluetooth 4.0, those skilled in the art will appreciate that adaptive frequency hopping as part of spread spectrum techniques may cause undesirably cause the signal strength to fluctuate. In other words, the advantage of using frequency hopping and spread spectrum for security and avoidance of interference may have a negative impact on using such signals for stable proximity-based location determinations. Thus, it may be desired to emphasize stability of a signal and limits to fluctuation for purposes of location determination.

In one embodiment, a type of improvement for RSSI measurements may include reducing the number of channels and/or a corresponding frequency range in use during advertising from nodes. For example, a node may have processing unit 300/400 adaptively control variable power short range communication interface 375/480 to reduce the number of channels and/or the frequency range used during node advertising. Such a dynamic change may be implemented, in some embodiments, by altering the content of a particular type of profile data 330/430, such as an RF profile data that effectively defines RF characteristics of a node (e.g., frequency, power level, duty cycle, channel numbers, channel spacing, alternative fluctuation modes, etc.). In one further embodiment, a first fluctuation mode may be defined that provides a default or more standard communication protocol, such as the conventional frequency hopping, spread spectrum, and channel allocations for Bluetooth® communications. Other alternative modes (one or more) may be defined that alter one or more RF characteristics to provide increasingly more stable and less fluctuations of the RF output signal from a node. Thus, a node may be dynamically placed into one or more modes regarding such RF characteristics that increasingly emphasize stability of the node's RF output signal and limits fluctuation for purposes of enhanced location determination using RSSI measurements.

In another embodiment, a type of improvement for RSSI measurements may include ensuring visibility to and advantageously managing automatic gain control (AGC) circuitry (not shown) that may cause the RF output signal to vary for a node. For example, a node may include a type of AGC circuitry as part of variable power short range communication interface 375/480. This type of AGC circuitry may allow node processing unit 300/400 or other logic circuitry that is part of variable power short range communication interface 375/480 to limit fluctuations under certain conditions (e.g., when attempting to use RSSI location determination techniques). In this example, different AGC circuitry settings may be defined in exemplary RF profile data that effectively defines RF characteristics of a node (e.g., frequency, power level, duty cycle, channel numbers, channel spacing, alternative fluctuation modes, etc.). This is yet another example of how a node may be dynamically placed into one or more modes regarding such RF characteristics (including AGC circuitry settings) that increasingly emphasize stability of the node's RF output signal and limits fluctuation for purposes of enhanced location determination using RSSI measurements.

Location with Adjustments for Environmental Factors in RF Signal Quality

In general, those skilled in the art will appreciate that environmental factors may cause a communication signal, such as an RF signal, to fluctuate or be transmitted and received in a manner that undesirably varies depending upon a signal path environment. Passive physical interference factors (e.g., forms of electronic signal shielding) may be substantially close and cause drops in signal strength across the output ranges of the nodes. Additionally, active radio interference factors may vary across the RF output ranges of the nodes depending upon other active devices in the reception vicinity. Thus, the proximate environment of a node may have a multitude of adverse factors that impact communications and, as a result, the ability to locate the node.

In one embodiment, making location determinations may be enhanced by a data analytics type of approach that may adjust and account for different RF environmental factors for a similar type of node in a similar type of situation. For example, the quality of the RF output signal of a particular type of node and the corresponding physical range of that signal to a receiver of known sensitivity may be determined for a given environment. In this example, the system defines a maximum range of that signal based on a predetermined condition, such as open-air connectivity. This may assume an environment with no signal degradation due to interference or physical shielding. However, both interference and physical shielding may diminish the range of the RF output signal of a node. In a dynamically adaptive and learning manner, the system may collect information on how a particular type of node may operate in a particular environment under certain settings (e.g., reported signal strengths and corresponding settings for RF output signal power levels). This analysis of a similar environment may be repeated. In other words, through such data analytics of an anticipated environment to be faced by a similar node, signal loss information can be generated and applied as a type of context data (i.e., RF data) for a node in a similar environment to refine location determination. Thus, an exemplary embodiment may refine location determinations with adaptive signal loss characteristics based on a contextual appreciation of an anticipated environment (e.g., physical shielding such as packaging, package contents, proximate package, proximate package contents, and physical infrastructure causing signal variance) without requiring a calibration phase.

And advantageously combining those data points with $3^{rd}$ party data describing the physical environment, in which the node was located in at that time, may refine location even further. Such information may be used as RF data (a type of context data) in future efforts to manage and locate a similar type of node anticipated to be in a similar environment.

In more detail, in an embodiment that refines a location determination based upon context and data analytics to adjust for known RF impediments, the maximum physical range of a node's RF output signal relative to a receiver of known RF sensitivity is determined. In one example, this first range value may be referred to as a theoretical or nominal open-air range of a similar type transmitter-receiver node pair in a similar environment but with substantially no physical shielding or signal interference negatively impacting the signal range. A second range value, which may be considered an actual RF range value, may be the observed range of the signal in a similar environment but where there are contextual factors reducing the communication range, including physical shielding due to factors like packaging, package contents, proximate package, proximate package contents, physical infrastructure, interference from other radio sources, or shipper specific information such as vehicle or facility layout information. Through access to prior data analysis of the differing range values and with knowledge of the operational environment of the transmitting node was in (e.g., a similar environment to the proximate environment of the node), a refined location may be determined using an approximation of an actual RF output range that intelligently adjusts what may be anticipated to be the RF environment of the node. In other words, by knowing the appropriate contextual environment related to a node (such as signal degradation information on how a similar node operates in a similar environment), an improved location determination may be made to make intelligent yet efficient adjustments (such as communication distance adjustments) that provide a refined location of the node.

In one example, such as the example shown in FIG. 2, master node 110b is outside of a container (such as a Uniform Load Device (ULD) container 210 known to be used for transporting groups of items on aircraft) that has an ID node inside the container. A first or theoretical range value between master node 110b and ID node 120b may be determined to be 10 feet at a specific RF output power level when the package (and related ID node) may be known to be less than 10 feet away from the scanning node (e.g., master node 110b). A second range value at similar distances with similar types of nodes, but with incident RF signal loss as a result of communicating through the wall of the container 210, may be between 4 and 5 feet. If context data, such as $3^{rd}$ party information or scan data, indicates the transmitting node is within the ULD container 210, the system would expect the transmission range to be limited according to the data analytics associated with this known RF impediment (e.g., characteristics for transmitting through ULD container 210), thus reducing the possible scanning nodes that may see the broadcasting node within the ULD container, or require the transmitting node to increase its RF output power to be heard.

Figure 32:
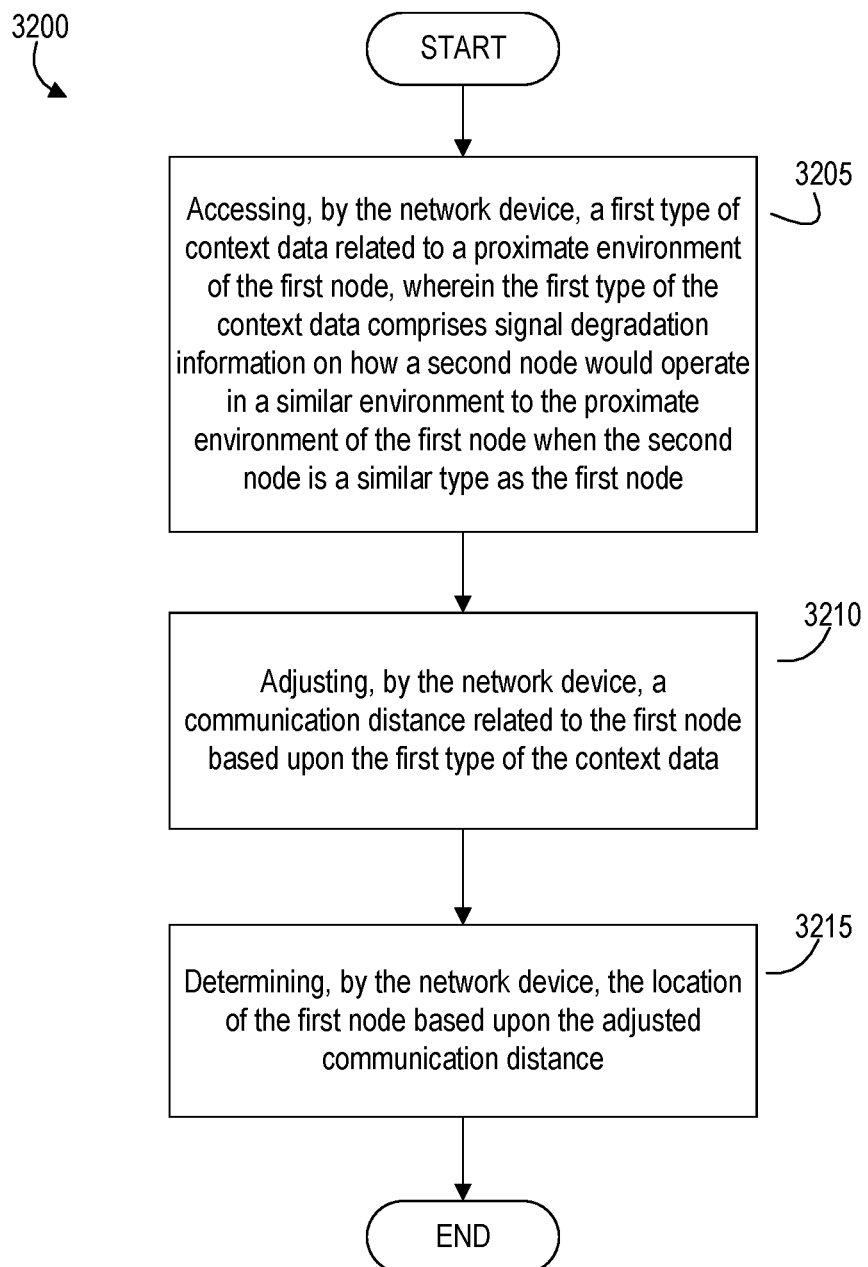
FIG. 32 is a flow diagram illustrating an exemplary method for location determination of a first node in a wireless node network based on context data in accordance with an embodiment of the invention.

FIG. 32 is a flow diagram illustrating an exemplary method for location determination of a first node in a wireless node network based on context data in accordance with an embodiment of the invention. Referring now to FIG. 32, method 3200 begins at step 3205 with a network device (such as a master node or server) accessing a first type of the context data related to a proximate environment of the first node.

The first type of context data comprises signal degradation information on how a second node would operate in a similar environment to the proximate environment of the first node when the second node is a similar type as the first node. Thus, rather than calibrating with an actual measurement relative to the current proximate environment of the first node, the signal degradation information provides compensation information on what may be generally anticipated in a more general proximate environment based on how a similar type of node may operate in a similar environment. As the similar environment of the similar node is generally an approximation for what is anticipated to be the proximate environment of the first node, this advantageously avoids the need for an actual calibration of the proximate environment. In one embodiment, the signal degradation information may be based upon a difference in how the second node communicates when exposed to an adverse communication environment (such as a similar environment to the proximate environment of the first node) compared to how the second node would communicates when exposed to a nominal communication environment (such as an environment that is unencumbered by shielding and interference factors). Those skilled in the art will appreciate that a nominal communication environment need not be perfectly clear of all influences that shield or interfere with communications.

The types and aspects of signal degradation information may vary depending on a wide variety of factors. In one embodiment, the signal degradation information may be related to at least one of shielding and interference. Thus, signal degradation information may include both passive and active factors that impact the communication environment.

In another embodiment, the signal degradation environment may be based upon a degraded operation of the second node when the similar environment is an adverse communication environment. In more detail, the signal degradation information may be based upon a difference in how the second node communicates when exposed to the adverse communication environment compared to how the second node communicates when exposed to a substantially normal communication environment, such as an open air environment.

In still another embodiment, signal degradation information may relate to at least shipment data for one or more items being shipped (e.g., currently shipped or shipped in the past) and located in the proximate environment of the first node. For instance, a package near the first node may include metallic materials that may impede or block RF signals and the signal degradation information may relate to such information about close packages being shipped near the first node. In another example, the signal degradation information may relate to at least layout data for one or more physical structures in the proximate environment of the first node. In more detail, the layout data may be for one or more physical structures (e.g., walls, machinery, enclosures, and conveyances) in the proximate environment of the node near a predicted path for the first node. In yet another example, the signal degradation information relates to at least historic data on one or more analyzed prior operations of the second node.

At step 3210, the network device, such as a master node or server, may adjust an anticipated communication distance related to the first node based upon on the first type of the context data. In one example, the anticipated communication distance may be a theoretical broadcast distance based upon parameters of the device's radio. Such an anticipated communication distance is known as it is an estimate of the radio's range. In one example, the adjusted communication distance comprises an anticipated reduced range distance for a transmission from the first node. In another example, the adjusted communication distance comprises an anticipated reduced receiver sensitivity distance for the first node.

In yet another example, adjusting the communication distance may be accomplished by adaptively adjusting, by the network device, the communication distance based upon the signal degradation information and a second type of the context data. In other words, the communication distance may be adjusted based upon signal degradation information considered along with other types of context data, such as how the first node is being moved (such as an anticipated movement of the first node along a predicted transit path for the first node) or a density of other nodes near the first node.

At step 3215, the network device determines the location of the first node based upon the adjusted communication distance. In a further embodiment, the method may also update the adjusted communication distance by the network device based upon movement of the first node, and may refine the location of the first node with an updated adjusted communication distance. This may happen with the first node is a mobile master node capable of self-determining its own location.

Those skilled in the art will appreciate that method 3200 as disclosed and explained above in various embodiments may be implemented on a network device (e.g., exemplary master node 110a in FIG. 4 or server 100 in FIG. 5) running one or more parts of their respective control and management code to perform steps of method 3200 as described above. Such code may be stored on a non-transitory computer-readable medium, such as memory storage 415 on master node 110a or memory storage 515 on server 100. Thus, when executing such code, the respective network device's processing unit may be programmatically transformed to become unconventionally operative to perform operations or steps from the exemplary methods disclosed above, including method 3200 and variations of that method.

In more detail, an exemplary network device apparatus for determining a location of a first node in a wireless node network based on context data, the exemplary network device may include a processing unit, a volatile memory coupled to the processing unit, and a memory storage coupled to the processing unit. The exemplary network device further includes a communication interface coupled to the processing unit and that provides a communication path operatively coupling the network device with the first node in the network.

The memory storage for the device maintains at least a program code section and context data having at least signal degradation information. Such signal degradation information, as a type of context data, is information on how a second node would operate in a similar environment to a proximate environment of the first node when the second node is a similar type as the first node. Examples of signal degradation information may include those discussed above relative to step 3205 of method 3200.

When executing at least the program code section when resident in the volatile memory, the processing unit of the network device is operative to perform the steps noted and described above with respect to method 3200. In more detail, the processing unit is operative to at least connect with the memory storage to access the signal degradation information, adjust a communication distance (if needed) related to the first node based upon on the signal degradation information, determine the location of the first node based upon the adjusted communication distance, and store the determined location of the first node as location data on the memory storage.

Adjusting the communication distance by the processing unit may be accomplished as described above with regard to step 3210 of method 3200. And as mentioned above, the processing unit may be further operative to adaptively adjust the communication distance where other types of context data are also considered, such as movement and anticipated node movement as detailed out above.

In a further embodiment, the network device may be a mobile master node that includes location circuitry (such as GPS circuitry 475 of exemplary master node 110a shown in FIG. 4). In this embodiment, the processing of the network device may be further operative to determine a location of the network device based upon an output signal from the location circuitry received by the processing unit, and determine the location of the first node based upon the adjusted communication distance and the location of the network device. As such, the first type of the context data related to the proximate environment of the first node is based upon the determined location of the first node.

Those skilled in the art will also appreciate that in some operational environments, the signal degradation information may not require any adjustment to the communication distance in an embodiment. However, in other environments (e.g., adverse RF environments), the signal degradation information may provide a basis for adjusting the communication distance in the embodiment, even if not performed every time. Thus, an adjustment to the communication distance may not be needed in all proximate environments of the first node but may be performed, if needed, based on the proximate environment of the first node. It is the ability of an embodiment to adjust this communication distance when needed and if needed that advantageously allows for locating the first node with more accuracy.

Location Through Triangulation

Figure 15:
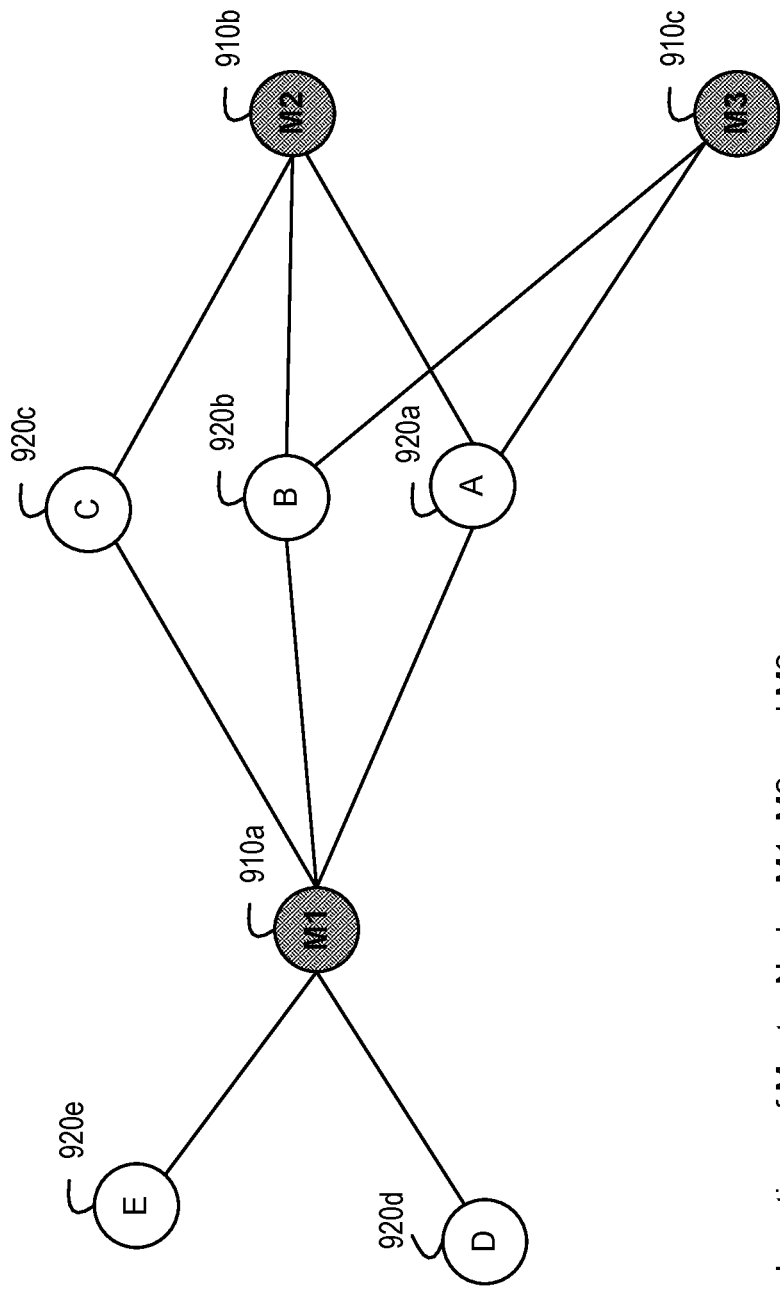
FIG. 15 is a diagram illustrating an exemplary location determination through triangulation in accordance with an embodiment of the invention.

In some embodiments, various methods for determining a node's location may rely upon, at least in part, triangulation techniques. In other words, as the wireless node network collects data on receiver-transmitter pairs, other methods for determining location of the individual nodes that utilize triangulation, at least in part, may become possible. FIG. 15 is a diagram illustrating an exemplary location determination through triangulation within a wireless node network in accordance with an embodiment of the invention. Referring now to the illustrated embodiment of FIG. 15, three exemplary master nodes M1-M3 910a-910c are shown with each master node having a known location. Exemplary ID nodes A-E 920a-920e are also shown where they are at least in communication range of one or more of exemplary master nodes MA-M3 910a-910c.

In this illustrated example, the master nodes M1-M3 may detect and collect advertising messages from ID nodes A-E at varying and known power levels. The captured information is forwarded by the master nodes M1-M3 to the backend server 100, where location determinations may be made. For example, factors like RSSI and visibility of each node at each power level may be used to determine, with a higher degree of accuracy, the location of nodes where sufficient information is available.

For an exemplary system to triangulate a node, three nodes with known locations must have seen the broadcasting node. In this example, two advertising ID nodes, A 920a and B 920b, were seen by the three nodes having known locations (master nodes M1-M3 910a-910c). Based upon the captured information, the locations of ID node A 920a and ID node B 920b are calculated.

Chaining Triangulation

Figure 16:
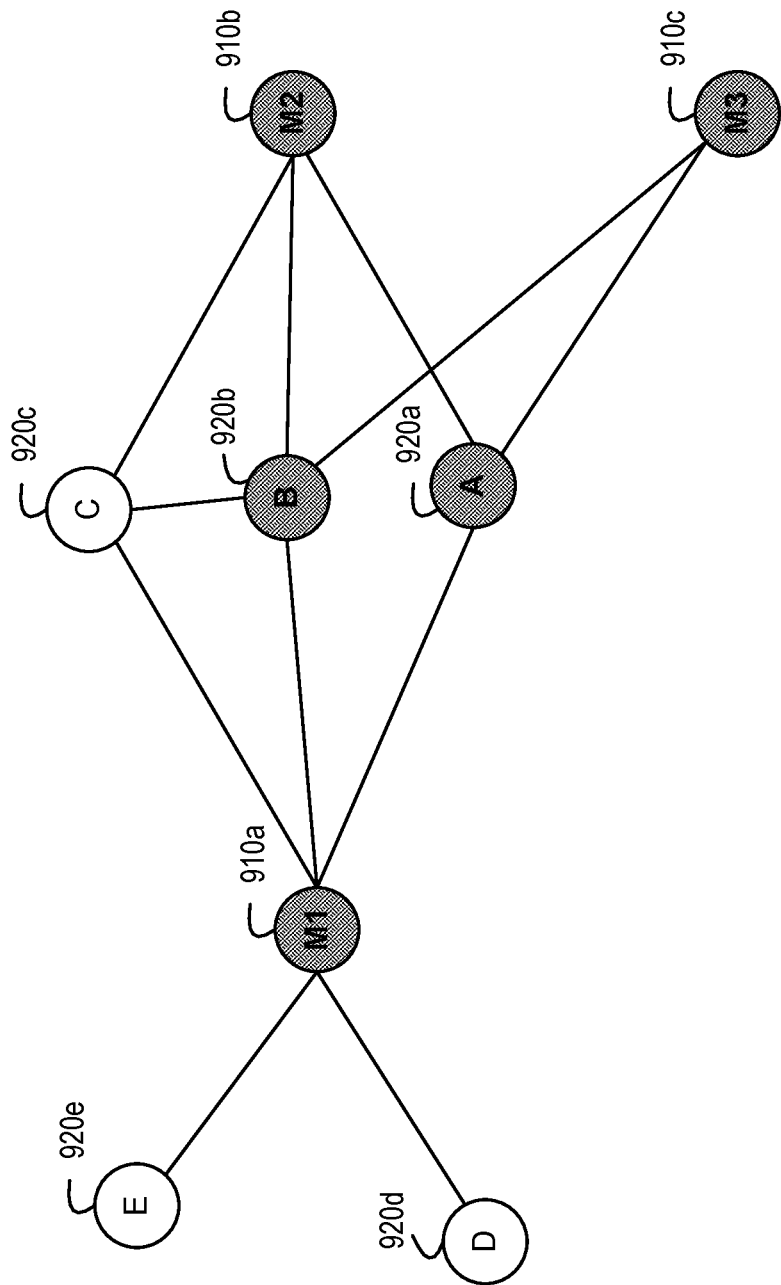
FIG. 16 is a diagram illustrating an exemplary location determination through chaining triangulation in accordance with an embodiment of the invention.

In another embodiment, a node with an inferred location may be used with triangulation techniques to determine a location of another node in a wireless node network. FIG. 16 is a diagram illustrating an exemplary location determination through chaining triangulation in accordance with an embodiment of the invention. The locations of ID nodes A 920a and B 920c have been determined by triangulating across master nodes M1-M3, as illustrated in the exemplary embodiment shown in FIG. 15. However, as illustrated in FIG. 16, the location of ID node C 920c may also be determined according to an embodiment.

For example, an exemplary method of determining a node's location through chaining triangulation begins with determining the calculated location of ID node B 920b (as explained with reference to FIG. 15). Next, a node closer to ID node B 920b may be used to get the missing third signal point needed for triangulation. This may be accomplished by placing ID node B 920b in a query (scan) mode such that it listens for a message from ID node C 902c. ID node C is instructed to advertise, thus providing a signal that may be captured by ID node B. After capturing the signal profile of C, ID node B may communicate or share the captured information and forward it along to the backend server 100 through either of the master nodes M1 or M2. The resulting location determination of ID node C 920c may have a higher level of position error due to it being partially based on a calculated reference (e.g., the location of ID node B), but the leveraged location determination of ID node C 920c may be sufficiently accurate (or be an actionable location) that useful information may be gleaned about ID node C 920c. For example, a leveraged or chained location determination of ID node C may indicate, with the help of context data, that nodes M1, M2, and ID node B are all close enough to ID node C that ID node C is determined to be within the same container nodes M1, M2, and ID node B.

Location Through Proximity to Triangulation (LP2T)

In an embodiment where chaining triangulation may determine location through proximity to triangulation (LP2T), a starting point may be determining the relative location of an ID node to a master node based on the proximity method, as explained above. However, when the relative location of the ID node has been determined, a more accurate or refined location of the ID node may be determined based upon the location of all master nodes that can capture the RF output signal broadcast from the ID node, and then triangulating based on observed signal strength of the ID node. In this example, the proximity-based location is used as an input in the triangulation calculation to estimate likely signal deterioration historically observed between a node at the proximity-determined location and scanning master nodes. In a further embodiment, by taking into account historic data on patterns of signal deterioration, a more accurate triangulation may be possible, leading to a more accurate location determination.

Figure 33:
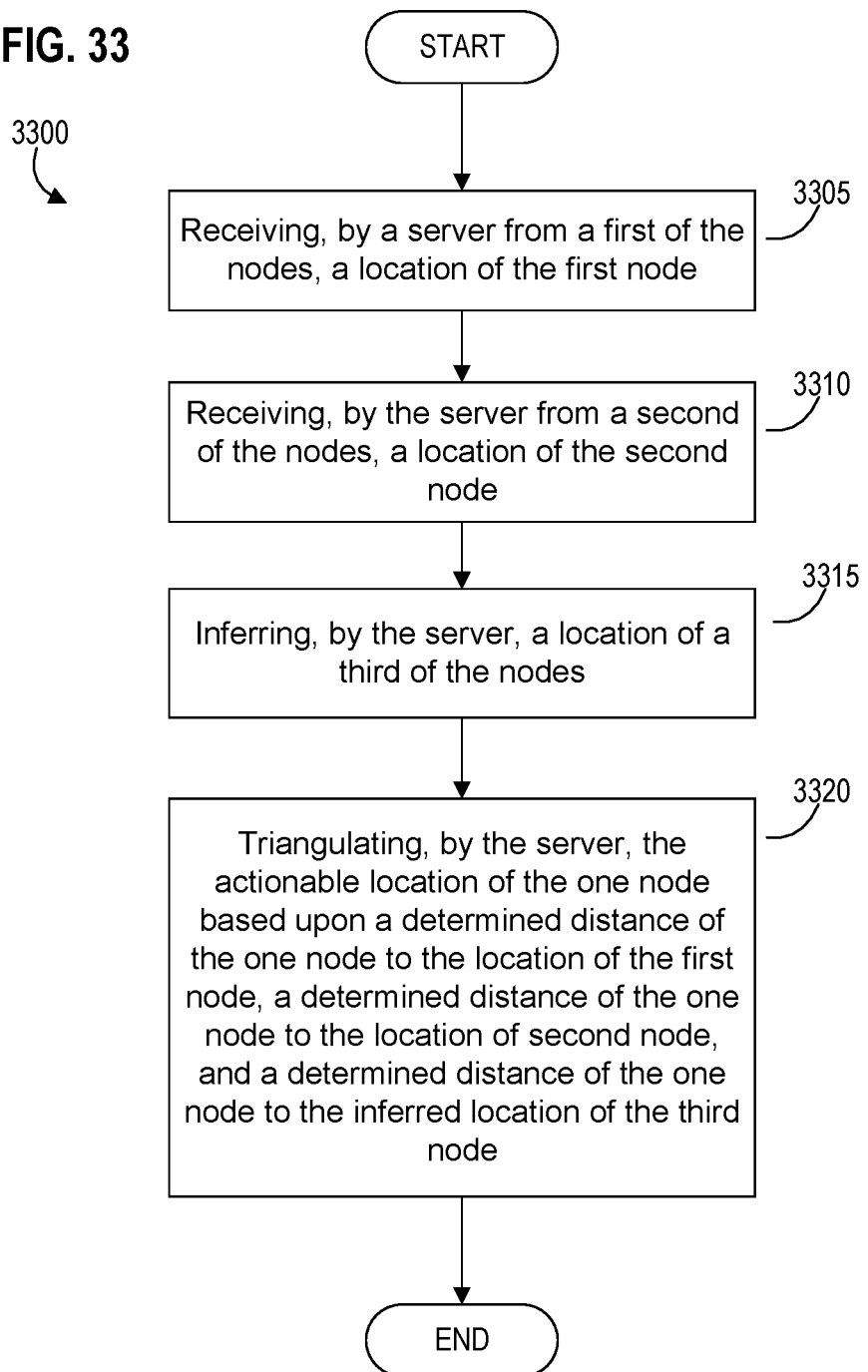
FIG. 33 is a flow diagram illustrating an exemplary method for determining a location using chaining triangulation for one of a plurality of nodes in a wireless node network having a server in accordance with an embodiment of the invention.

FIG. 33 is a flow diagram illustrating an exemplary method for determining a node location using chaining triangulation for one of a plurality of nodes in a wireless node network having a server in accordance with an embodiment of the invention. Such an exemplary node location need not be precise or exacting, but can be sufficiently accurate without absolutes.

Referring now to FIG. 33, method 3300 begins at step 3305 with the server receiving a location of a first of the nodes from the first node. Next, at step 3310, the server receives a location of a second of the nodes from the second node. For example, with reference to the example shown in FIG. 16, master nodes M1 910a and M2 910b may transmit their respective location coordinates from their respective onboard location circuitry to the server so that the server has the current locations of these two master nodes.

At step 3315, the server infers a location of a third of the nodes. For instance, in the example illustrated in FIG. 16, the server may infer the location of ID node B 920b. In one embodiment, inferring may comprise having the server determine a proximate-based location of the third node relative to another of the nodes having a known location, such that the proximate-based location operates as the inferred location of the third node.

In another embodiment, inferring the location of the third node may comprise having the server determine a relative location of the third node to the first node (as the node having a known location) or to the second node (as another node having a known location). Method 3300 may also, in another embodiment, include having the server adjust the inferred location of the third node to determine a refined location of the third node based upon third node context data related to the inferred location of the third node.

At step 3320, method 3300 concludes with the server triangulating the location of the one node based upon determined distances to each of the first and second nodes, and a determined distance of the one node to the inferred location of the third nodes.

In a more detailed embodiment, method 3300 may triangulate the location of the one node by accessing first node context data related to a contextual environment near the first node and second node context data related a contextual environment near the second node. Such contextual environments may include an environment of being on a conveyor system, or within a particular facility, or next to materials that may degrade or shield signals being received by the one node. Next, the more detailed triangulating may have the server adjust the determined distance of the one node to the location of the first node based upon the first node context data to provide a refined distance of the one node to the location of the of the first node. Then, the server may triangulate the location of the one node based upon the adjusted determined distance of the one node to the location of the first node, the adjusted determined distance of the one node to the location of second node, and a determined distance of the one node to the refined location of the third node.

In a further embodiment, method 3300 may also have the server transmitting an instruction so as to cause the server to transmit an instruction to cause the one node to broadcast a plurality of advertising signals over a period of time. In such an embodiment, the determined distance of the one node to the location of the first node may be based upon captured signals from the one node by the first node over the period of time and reported to the server by the first node. In another embodiment, the determined distance of the one node to the location of the second node may be based upon captured signals from the one node by the second node and reported to the server by the second node.

In still another embodiment, the server may transmit an instruction to cause the one node to broadcast a plurality of advertising signals at different power levels. In such an embodiment, the determined distance of the one node to the location of the first node may be based upon captured signals from the one node by the first node and reported to the server by the first node. In another embodiment, the determined distance of the one node to the location of the second node may be based upon captured signals from the one node by the second node and reported to the server by the second node.

In yet another embodiment, method 3300 may also have the server transmitting the location information out to a requesting entity (e.g., another node, a user access device, etc.) upon receipt of a request for a location of the one node from that entity.

Those skilled in the art will appreciate that method 3300 as disclosed and explained above in various embodiments may be implemented on a server (such as exemplary server 100 as illustrated in FIG. 5) running one or more parts of a control and management code (such as an code 525) to implement any of the above described functionality. Such code may be stored on a non-transitory computer-readable medium (such as memory storage 515 in an exemplary server). Thus, when executing such code, a processing unit of the server (such as unit 500) may be programmatically transformed to become unconventionally operative to perform operations or steps from the exemplary methods disclosed above, including method 3300 and variations of that method.

A server apparatus is also described in an embodiment for determining a location using chaining triangulation for one of a plurality of nodes in a wireless node network. The server apparatus generally comprises a server processing unit, a server volatile memory, a server memory storage, and a communication interface. The server volatile memory, server memory storage, and communication interface are each configured in the apparatus as coupled to the server processing unit. The server memory storage maintains at least a program code section and location data related to nodes in the network. In some embodiments, the server memory storage may also maintain context data, such as first node context data and second node context data. The communication interface provides a communication path operatively coupling the server with nodes in the network, such as a first and second node.

The server processing unit, when executing at least the program code section resident in the server volatile memory, is operative to perform various functions, such as the functions described in the steps above related to method 3300. In particular, the server processing unit is operative to receive a request over the communication interface for the location of the one node. Based on the request, the server processing unit is then operative to receive the respective locations of the first and second nodes, and store the locations as part of the location data kept on the server memory storage. The server processing unit is further operative to infer a location of a third of the nodes, and store the inferred location of the third node as part of the location data kept on the server memory storage. The server processing unit then is operative to triangulate the location of the one node based upon a determined distance of the one node to the location of the first node, a determined distance of the one node to the location of second node, and a determined distance of the one node to the inferred location of the third node. And finally, the server processing unit is operative to transmit the location information to the requesting entity over the communication interface in response to the request.

In one embodiment, the server processing unit may be further operative to infer the location of the third of the nodes by being operative to determine a proximate-based location of the third node relative to another of the nodes having a known location, where the proximate-based location operates as the inferred location of the third node.

In another embodiment, the server processing unit may be further operative to transmit an instruction over the communication interface to cause the one node to broadcast a plurality of advertising signals over a period of time. In this embodiment, the determined distance of the one node to the location of the first node may be based upon captured signals from the one node by the first node over the period of time and reported to the server by the first node. Alternatively, the determined distance of the one node to the location of the second node may be based upon captured signals from the one node by the second node and reported to the server by the second node.

In another embodiment, the server processing unit may be further operative to transmit an instruction over the communication interface to cause the one node to broadcast a plurality of advertising signals at different power levels. In such an embodiment, the determined distance of the one node to the location of the first node may be based upon captured signals from the one node by the first node and reported to the server by the first node. Alternatively, the determined distance of the one node to the location of the second node may be based upon captured signals from the one node by the second node and reported to the server by the second node.

In yet another embodiment, the server processing unit may be further operative to infer the location of the third node by being operative to determine a relative location of the third node to the first node or, alternatively, to the second node.

In still another embodiment, context data may be relied upon to refine locations. More specifically, the server processing unit may be further operative to adjust the inferred location of the third node to determine a refined location of the third node based upon third node context data related to the inferred location of the third node.

In a more detailed embodiment, the server memory storage may further maintains context data, and the server processing unit may be further operative to triangulate by being operative to access first node context data as part of the context data maintained on the server memory storage, where the first node context data is related to a contextual environment near the first node. Likewise, the server processing unit may be further operative to access second node context data as part of the context data maintained on the server memory storage, where the second node context data is related a contextual environment near the second node. The server processing unit may then be operative to adjust the determined distance of the one node to the location of the first node based upon the first node context data to provide a refined distance of the one node to the location of the of the first node. As such, the server processing unit may be operative to triangulate the location of the one node based upon the adjusted determined distance of the one node to the location of the first node, the adjusted determined distance of the one node to the location of second node, and a determined distance of the one node to the refined location of the third node.

Combined Methods for Determining Node Location

In light of the examples explained above for locating a node, one skilled in the art will appreciate that a further embodiment expressly contemplates using more than one of the above-described location determination techniques when determining a refined location of a node in a wireless node network. For example, such combination embodiments may apply an ordered or prioritized approach whereby a first location technique is applied to generate first location information regarding the location of a node in the wireless network. Thereafter, a second location technique may be selected from a hierarchy or prioritized set of techniques (some of which may work better in certain circumstances and be chosen or dynamically prioritized based upon the contextual environment), and applied to generate second location information regarding the location of the node or refining the location of the node. Other embodiments may apply additional location techniques to generate further refined location information.

In an embodiment, the information in the exemplary hierarchy generally identifies which technique may be preferred to be used initially as well as a ranked grouping or listing of when to apply other location techniques. Such information in the exemplary hierarchy may be fixed (based upon successful historic data and experience) or be dynamically altered over time as nodes may move relative to each other and, for example, based upon context data that provides more information relative to the a current or anticipated contextual environment.

Applying Node Location Determination in a Vehicular Environment

The various exemplary methods and techniques described above for determining the location of a node provide an advantageous way to locate a node. However, further embodiments may advantageously apply such methods and techniques in a vehicular environment when dealing with logistics operations where a node is to be located in a vehicle, moved within a vehicle, or removed for delivery from a vehicle.

Essentially, embodiments may use a package enabled with a node (generally referred to as a node package or node-enabled package) to ship one or more items and such a node package may be advantageously placed, located, moved, or removed for delivery in a vehicle/transportation/shipping/logistics environment. As explained throughout this description, a node package is generally a package to be shipped that is related to a particular node. The node and the related package travel together as part of the shipping process. In a general embodiment, the node may simply be within the package. In another embodiment, the node may be attached to the package (e.g., adhered to an interior portion of the package, fixed to a part of the package where one or more status indicators of the node may be visible through the package, etc.). In another embodiment, the node of the node package may be part of the package or the packaging materials used to comprise an exterior, interior, or separating/cushioning material within the node package. In more detail, the node may be integrated as part of the package or packaging materials (e.g., integrated as part of a pallet, a ULD container, a corrugated fiberboard box, and the like). In still another detailed embodiment, the node of the node package may be fully or partially embedded within the package or packaging materials used to help form a general container, which maintains an item to be shipped along with the node.

Figure 20:
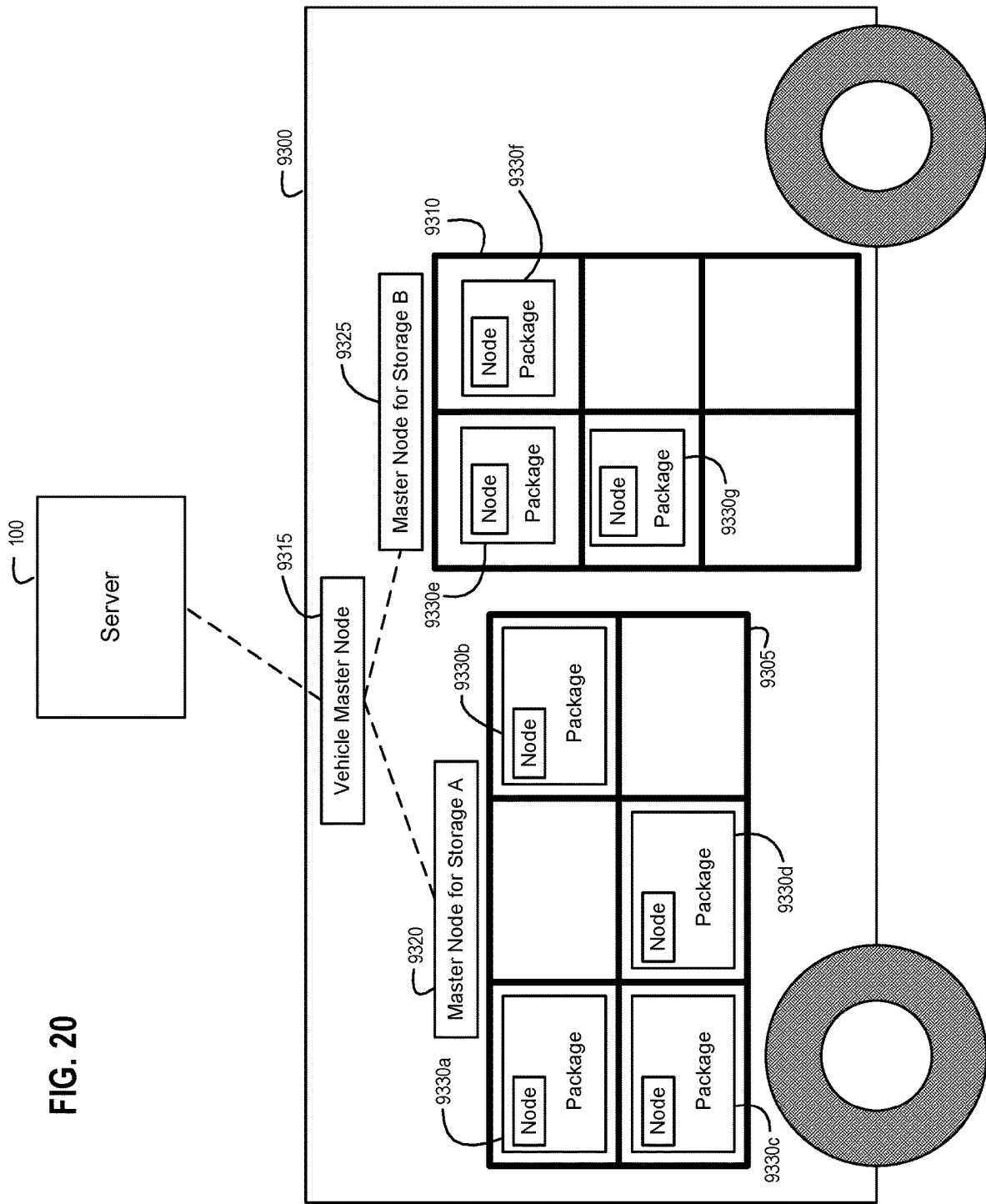
FIG. 20 is a diagram illustrating exemplary node packages located in an exemplary vehicle environment in accordance with an embodiment of the invention.

FIG. 20 is a diagram illustrating exemplary node packages located in an exemplary vehicle environment in accordance with an embodiment of the invention. Referring now to FIG. 20, exemplary vehicle 9300 is illustrated as an example of a general mobile logistics transport or conveyance carrying packages being shipped. Those skilled in the art will appreciate that vehicle 9300 may be implemented as various types of logistics conveyances (e.g., automobile, delivery van, autonomous vehicle, truck, trailer, train, aircraft, marine vessel (ship), etc.). Within exemplary vehicle 9300, packages may be placed, stored, and organized within different storage devices or units, such as storage unit A 9305 or storage unit B 9310. In general, a storage device or unit helps to maintain one or more packages in a configuration that helps to assure save shipment, minimize damage to the packages, and provide a way to organize what is being stored. Different embodiments of a storage unit may store a single package or may storage a wide variety of different types of packages that use different types of packaging materials (e.g., corrugated fiberboard boxes, wooden and non-wooden pallets, containers, etc.) and in large numbers.

Vehicle 9300 includes a vehicle master node 9315—an exemplary implementation of a master node, such as master node 110a shown and described with respect to FIG. 4. Vehicle master node 9315 is shown operative to communicate with server 100 over a longer-range communication interfaces (such as interface 485 on exemplary master node 110a) and operative to communicate with other nodes, such as master node 9320 associated with storage unit A 9305, master node 9325 associated with storage unit B 9310, and other nodes associated with parts of such storage units and node packages stored within the storage units. In more detail, each storage unit may include, in some embodiments, built-in nodes associated with particular shelves, lockers, receptacles, or other parts of the particular storage unit.

Thus, an exemplary storage unit (such as storage unit A 9305) may be a node-enabled storage unit used within a logistics vehicle to safely and intelligently transport node packages. As such, the exemplary storage unit may itself have a hierarchy of nodes (e.g., a master node, and one or more other nodes (ID nodes or other master nodes) assigned to different parts of the unit) and be operative to detect the location of particular node packages via the various location determination methods discussed herein as the node package is placed in a storage location within the unit, moved between storage locations of the unit or between different units, or simply removed from the storage location within the unit.

As shown in FIG. 20, various node packages 9330a-9330d may be kept in different storage locations of storage unit A 9305 within vehicle 9300. Similarly, other node packages 9330e-9330g are kept in portions of storage unit B 9310. Such node packages may be placed into particular storage locations according to shipping information related to the node packages. For example, the node packages may be placed into particular storage locations according to weights of the particular node packages, a planned loading scheme (such as according to an anticipated delivery schedule), to storage capacity of the particular different locations within the storage unit, or according to a storage type for the particular different locations (e.g., one location for storing envelope types of packages, another location for storing boxed container type of packages, another location for storing containerized packages (e.g., ULDs), etc.).

Figure 21:
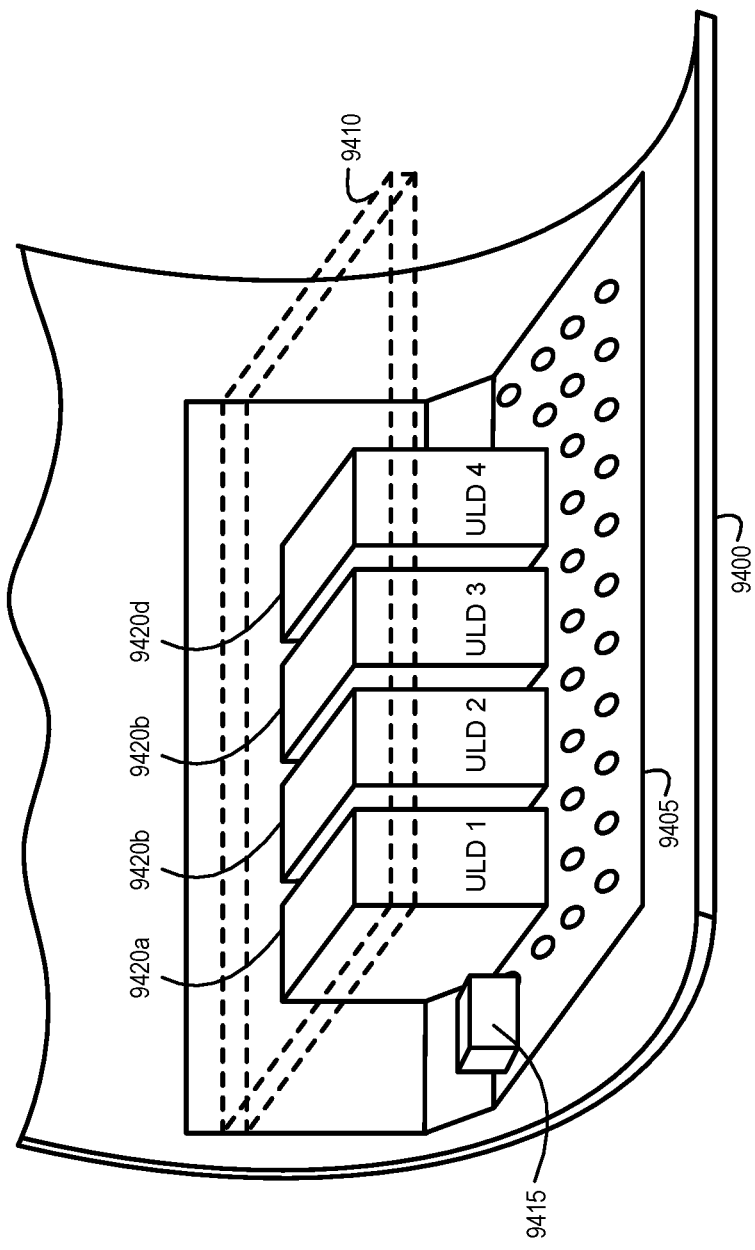
FIG. 21 is a diagram illustrating exemplary mobile storage units, such as ULDs, used as containers that help ship node packages in an exemplary airborne environment in accordance with an embodiment of the invention.

Shipping of containerized groups of packages (e.g., ULD types of containers made to optimize airborne logistics handling of packages) is an example of where a mobile storage unit (such as a movable unit load device (ULD)) may be deployed when shipping node packages in an airborne environment. FIG. 21 is a diagram illustrating exemplary mobile storage units, such as ULDs, used as containers that help ship node packages in an exemplary airborne environment in accordance with an embodiment of the invention. Referring now to FIG. 21, a cut-away perspective view of an exemplary aircraft fuselage 9400 is illustrated. In particular, an exemplary floor 9405 of a cargo storage area within fuselage 9400 is shown having multiple roller elements that help facilitate movement of cargo within the cargo area. Additionally, while not shown in FIG. 21, the cargo storage area and floor 9405 typically include structure and fastening points to help hold any cargo loaded within fuselage 9400. The cargo storage area within exemplary fuselage 9400 may be split into an upper area and a lower area by an additional floor 9410.

The cut-away perspective example illustrated in FIG. 21 shows a lower cargo area where various ULD containers 9420a-9420d are shown along with an airborne master node 9415, which is (depending on the aircraft's location and communication mode and status) operative to communicate with server 100—much like vehicle master node 9315 does as shown in FIG. 20. In general, the illustrated configuration of ULD containers 9420a-d is used similar to the storage units illustrated and described in FIG. 20. For example, each ULD container 9420a-d may have different storage locations within it and one or more master nodes (not shown) dedicated and attached internally so that they may track, monitor, and communicate with different node packages loaded within the ULD as well as other nodes and a server—much like the master node 9320 for storage unit A 9305 can track, monitor, and communicate with different node packages loaded within the storage unit as well as other nodes and server 100. Node packages within each ULD may communicate with nodes in the ULD and may communicate directly with airborne master node 9415 directly (or indirectly through other master nodes within the ULD). And as such, shipping information may be used when the node packages are placed into particular storage locations within a particular ULD according to weights of the particular node packages, a planned loading scheme for the ULDs (such as according to an anticipated delivery schedule), to storage capacity of the particular different locations within the ULD, or according to a storage type for the particular different locations.

In light of the exemplary vehicular environments shown in FIGS. 20 and 21 showing structure used when initially placing, storing, maintaining, locating, moving, and eventually removing a node package for delivery, those skilled in the art will appreciate that each of the embodiments described above related to methods for locating a node may be further enhanced when applied to an exemplary vehicular environment. For example, in one embodiment, determining a node's location may further comprise determining a location of the node-enabled package within a vehicle to be the location of the node. In a more detailed embodiment, the method that determines a node location may further generate a location message regarding where the node-enabled package is located within the vehicle based upon the determined location of the node. Such a message may be displayed to a user (e.g., logistics personnel that handle packages being shipped) on a user interface of a node or user access device operating as a node (e.g., smartphone or smart wearable device). For example, such a displayed message may be a type of an informed prompt ("Pickup Package X at Storage Location 01 in Storage Unit A") or strategic instruction ("Place Package X in Storage Location 01 in Storage Unit A") or ("Move Package X at Storage Location 01 in Storage Unit A to Storage Location 03 in Storage Unit B"). In some embodiments, the network device or node that determines the node's location may also provide such a display to the user, but in other embodiments, the location message may be transmitted to another node for display to the user.

In another embodiment, an exemplary method that determines a node's location may also access shipping information related to the node-enabled package and generate a relocation message regarding where the node-enabled package may be relocated within the vehicle based upon the determined location of the node and the accessed shipping information. Such a message may be displayed to a user similar to the location message described above—namely, that such a relocation message may be displayed to a user (e.g., logistics personnel that handle packages being shipped) on a user interface of a node or user access device operating as a node (e.g., smartphone or smart wearable device) and that in some embodiments, the network device or node that determines the node's location may provide such a display to the user, but in other embodiments, the relocation message may be transmitted to another node for display to the user.

In more detail, the shipping information may comprise weight information on the node-enabled package that is used in determining where to relocate or initially place the node-enabled package.

In another embodiment, such shipping information may be used to create a loading scheme to help organize where to locate or relocate the node-enabled packages. Thus, the location or relocation of the node-enabled package within the vehicle may be determined according to a loading scheme. In more detail, such a loading scheme may be related to an anticipated delivery schedule, where the node-enabled package may be placed within or removed from the vehicle according to the anticipated delivery schedule.

Logistics Applications of a Wireless Node Network

Figure 17:
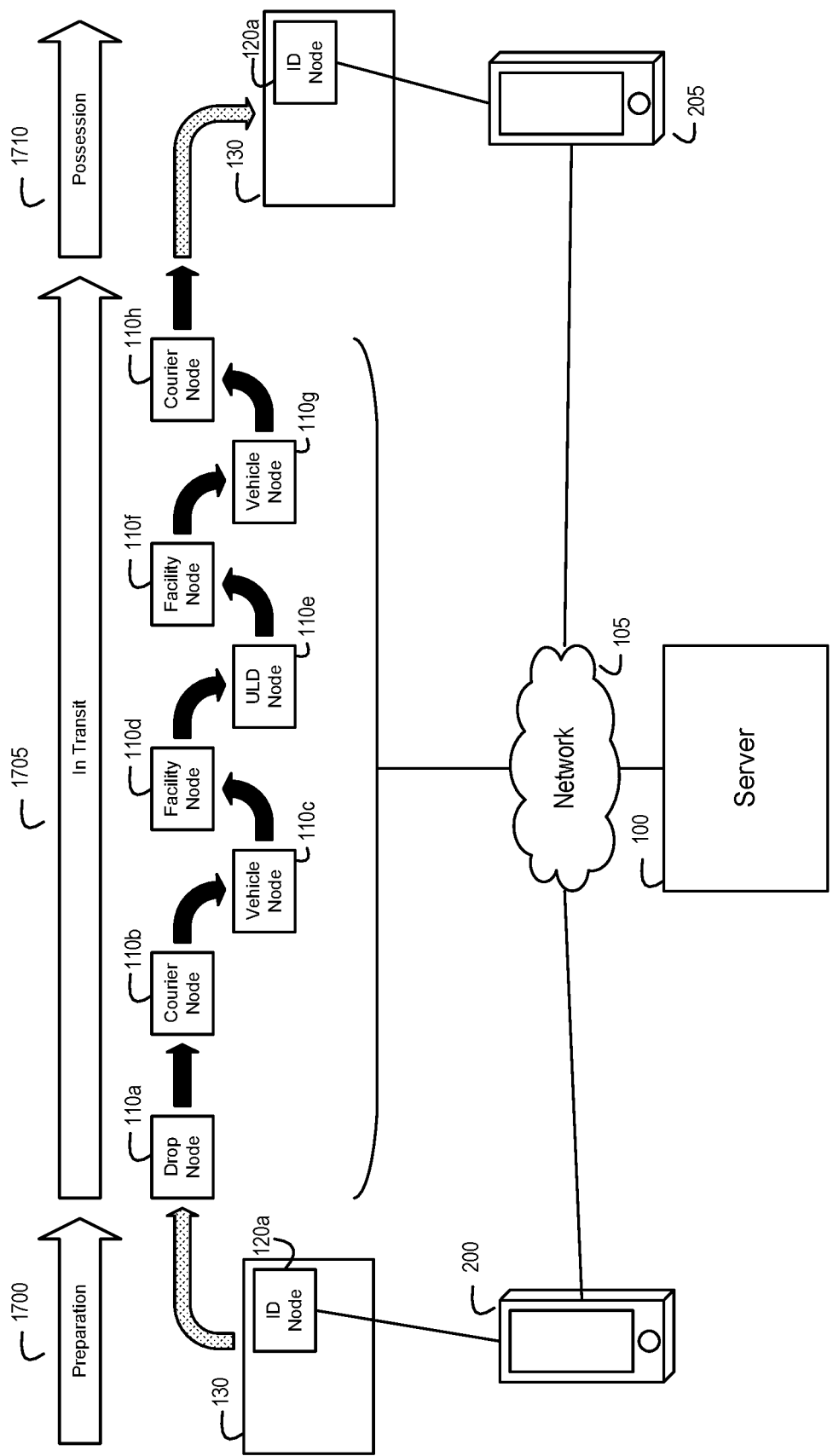
FIG. 17 is a diagram illustrating an example logistics operation using exemplary components of a wireless node network in accordance with an embodiment of the invention.

As described above, an exemplary wireless node network may be useful in a logistics application where an item is to be located. Further, such an exemplary wireless node network may also be useful in logistics applications where the item is moving between locations, and the network provides an enhanced level of visibility and management of the item within such a logistics environment. In other words, an embodiment of an exemplary wireless node network in accordance with one or more principles of the present invention helps enable enhanced logistical operations that manage information when shipping and tracking an item. FIG. 17 is a diagram illustrating an example logistics operation using exemplary components of a wireless node network in accordance with an embodiment of the invention.

Logistics Beyond Pickup and Delivery

Referring now to FIG. 17, an ID node 120a is illustrated as being deployed and associated with an item (e.g., package 130) to be shipped. As the package 130 is being prepared for shipping 1700, and is in transit as part of shipment 1705, and is in the possession of the intended recipient 1710, components of an exemplary wireless node network are deployed to manage information regarding the shipment during these three phases.

In a general example of using a wireless node network for managing logistics related to an item to be shipped, a shipping customer may initially register the item (such as package 130) with a node (such as an ID node) to be shipped from an origin location to a destination location. One or more management hand-offs of the item and node occurs as the item and the ID node collectively transit a path from the origin to the destination. Each hand-off may be based upon an awareness of the shipment path the ID node associated with package 130 will take as it is transferred through a shipping path from its origin to destination. Hand-off of the package 130 and ID node are managed and coordinated with master nodes (such as master nodes 110a-110h), which are managed by server 100, along the anticipated shipment path. During operation along the shipping path, server 100 receives information and updates from nodes, manages and authorizes hand-offs between different nodes, and tracks information related to current associations, shared data, sensor data available, locations of the nodes, and context data that helps to refine the location of nodes. Thus, with the ID node associated with package 130, the visibility of the package 130 may be extended for the customer beyond the conventional custodial control during transit 1705 as the shipping customer prepares the item for shipment 1700 prior to an initial drop-off and after delivery of the item to the recipient 1710.

In a more detailed embodiment, an exemplary method for managing logistics related to an item to be shipped using a wireless node network begins with registering a node with the item to be shipped. For example, the shipping customer may control user access device 200, and use device 200 to initially associate an ID node 120a and package 130 with a tracking number as part of preparing to ship the package 130 (a type of item). In one embodiment, device 200 may use a particular app or other program module resident and operating on device 200 to input the tracking number of the package 130. Device 200 then provides that information back to server 100 via network 105 to associate the tracking number with the package 130 and ID node 120a. Device 200, in some embodiments, may then print a label for the shipment of package 130 (and ID node 120a). In another embodiment, ID node 120a may be a pre-programmed node with pre-existing shipping and payment related information associated with it. Further details of a label-less shipping and payment in another embodiment are described below.

Concurrent with this action, the shipping customer may associate ID node 120a with package 130. For example, the shipping customer may place the ID node 120a within package 130 and, in some cases, physically attach the ID node 120a to a particular part of package 130. In another example, the shipping customer may place an exterior label on package 130 where the label itself includes ID node 120a. Other examples may effectively group ID node 120a with package 130 within a larger package, container, or pallet of items or packages that collectively travel together.

In this manner, device 200 may operate as a type of master node under control of the app or other program module, and be associated with the package 130 and ID node 120a from an association management perspective. For example, device 200 may operate via the app or other program module along with Bluetooth® hardware and software working on device 200 to communicate with ID node 120a. Other embodiments may rely on other short-range communication interfaces for device 200 to communicate with ID node 120a. And in one embodiment, device 200 may receive one or more security credentials from server 100 in order to connect and actively pair or connect with ID node 120a.

With at least the shipping information at the server 100, server 100 may determine a predicted shipping path for the package 130. In one embodiment, server 100 may have historic data indicating an optimal route for shipping an item from point A to point B that uses a particular shipping path (e.g., pick-up near A by a particular courier, transport by vehicle to a particular facility, further transport via aircraft to another facility near point B, and transport by vehicle to facilitate delivery by a courier at point B). In one example, the predicted path may only be for a portion of the route between two points, such as an origin point and a destination point.

In a further example, the predicted path (or part thereof) may be adjusted based on the contextual environment of an item being shipped. For instance, depending on context data (such as weather information, historic data on success for particular transit segments, capacity information for third party carriers, etc.), server 100 may alter the initially predicted shipping path to provide a refined predicted shipping path that is more optimized under the current conditions and context. This allows the server 100 to further anticipate which master nodes may be used along an anticipated shipping path (or refined shipping path), to help efficiently manage shipment of the package 130 to point B. Those skilled in the art will further appreciate that an embodiment may only partially identify what master nodes may be used along the anticipated shipping path (or refined shipping path), and that further master nodes may be identified as the package 130 is actively in route to point B depending on context data (e.g., master node availability, weather information, etc.).

In a more detailed example, server 100 may use sort data analytics to predict an appropriate shipping path along which the package 130 and the ID node 120a will travel, identifying predicted master nodes the ID node 120a will be within range of during its journey. In the example flow illustrated in FIG. 17, nodes 110a-110h refer to different master nodes along an exemplary predicted shipping path, which includes at least a pick-up and drop-off of ID node 120a and package 130 at an origin and destination, respectively.

In one example, the shipping customer may place package 130 and its associated ID node 120a in a drop box or repository for items to be shipped. In the illustrated example of FIG. 17, drop box is represented as drop node 110a. Essentially, drop node 110a may be implemented with a type of master node connected to or integrated into a drop box or locker unit type of logistics repository (more generally referred to herein as a node-enabled logistics receptacle). As the shipping customer physically places ID node 120a into drop node 110a, device 200 may hand-off ID node 120a to drop node 110a, update server 100 with this association information, and disassociate from ID node 120a. In this manner, the system has visibility into the status and location of an item (such as package 130) prior to pick-up from drop node 110a. Further details of an exemplary node-enabled logistics receptacle are described below.

At the drop node 110a, a courier may pick-up the package 130 and ID node 120a. The courier has a courier node 110b, which knows the tracking number and associated ID node 120a at time of pickup, or looks up the ID node 120a MAC address based on a captured tracking number (part of information broadcast or advertised by ID node 110a. Basically, the master node responsibility transfers to or is otherwise handed off to courier node 110b, which now acts as a master node actively connected and associated with ID node 120a (by virtue of communications from courier node 110b back to server that authorizes the association of ID node 110a with courier node 110b and disassociates drop node 110a with ID node 110a).

Similar handoffs occur between different master nodes and ID node 120a occur as package 130 and ID node 120a transit the anticipated shipping path in accordance with instructions sent to different master nodes by server 100. In one embodiment, associations are accomplished during such handoffs with security credentials requested, authorized, and transmitted to the appropriate master node. In another embodiment, associations are merely passive associations that do not require active and authorized pairings. Yet, the passive association still may allow the system to keep track of ID node 120a and package 130 as they transit the anticipated shipping path.

New associations (active and passive) and disassociations are updated to server 100. And server 100 may change programming in different nodes as package 130 and ID node 120a transit the shipping path—such as changing the operation of a master node (such as ULD node 110e) to shift to operating as an ID node while airborne or when GPS signals are lost. In another example, certain mobile types of node may have responsibilities changed to wired types of nodes as a way of preserving the power of a mobile type of node. If ID node 120*a* fails to associate for a certain interval and needs to be reacquired, ID node 120*a* may update its status flag to a particular Alert Stage and may attempt to communicate with an increasingly broader range of master nodes in order to be found.

During the transit, server 100 may share information with different nodes, such as context data, timer/clock data, environmental data, etc. Sensor data from the ID node 120*a* may be gathered via scans from a master node, and then forwarded back to server 100. And as server 100 manages the associations, handoffs, and information going to and coming from ID node 120*a* (via master nodes), server 100 is able to determine the location of ID node 120*a* using one or more of the various location determination techniques described above. As such, server 100 is able to provide information related to the ID node 120*a* and its related package 130 in response to requests for such information.

When package 130 and ID node 120*a* arrive at the destination (e.g., point B), courier node 110*h* may update server 100 once ID node 120*a* is placed at the destination and disassociated with courier node 110*h*. However, visibility need not end at such a drop-off event (such as arriving at the destination). The recipient customer's user access device 205 may act as another master node, and associate with ID node 120*a* after delivery. In one example, server 100 is notified by courier node 110*h* that delivery has been made. Thereafter, server 100 may notify device 205 with this information. In response, an app or other program module on device 205 may cause device 205 to operate as a node and to actively seek association with ID node 120*a*. When device 205 and ID node 120*a* connect and are given authorization by server 100 to actively associate, server 100 is notified and may provide further information to device 205 (e.g., sensor data, etc.) and may be able to determined updated location data about ID node 120*a* and package 130 after delivery has occurred. In another example, active association may not be needed between device 205 and ID node 120*a* as status information may still be gathered by device 205 via passive association, where the status information provides further visibility regarding the ID node 120 after delivery to the destination.

Figure 18:
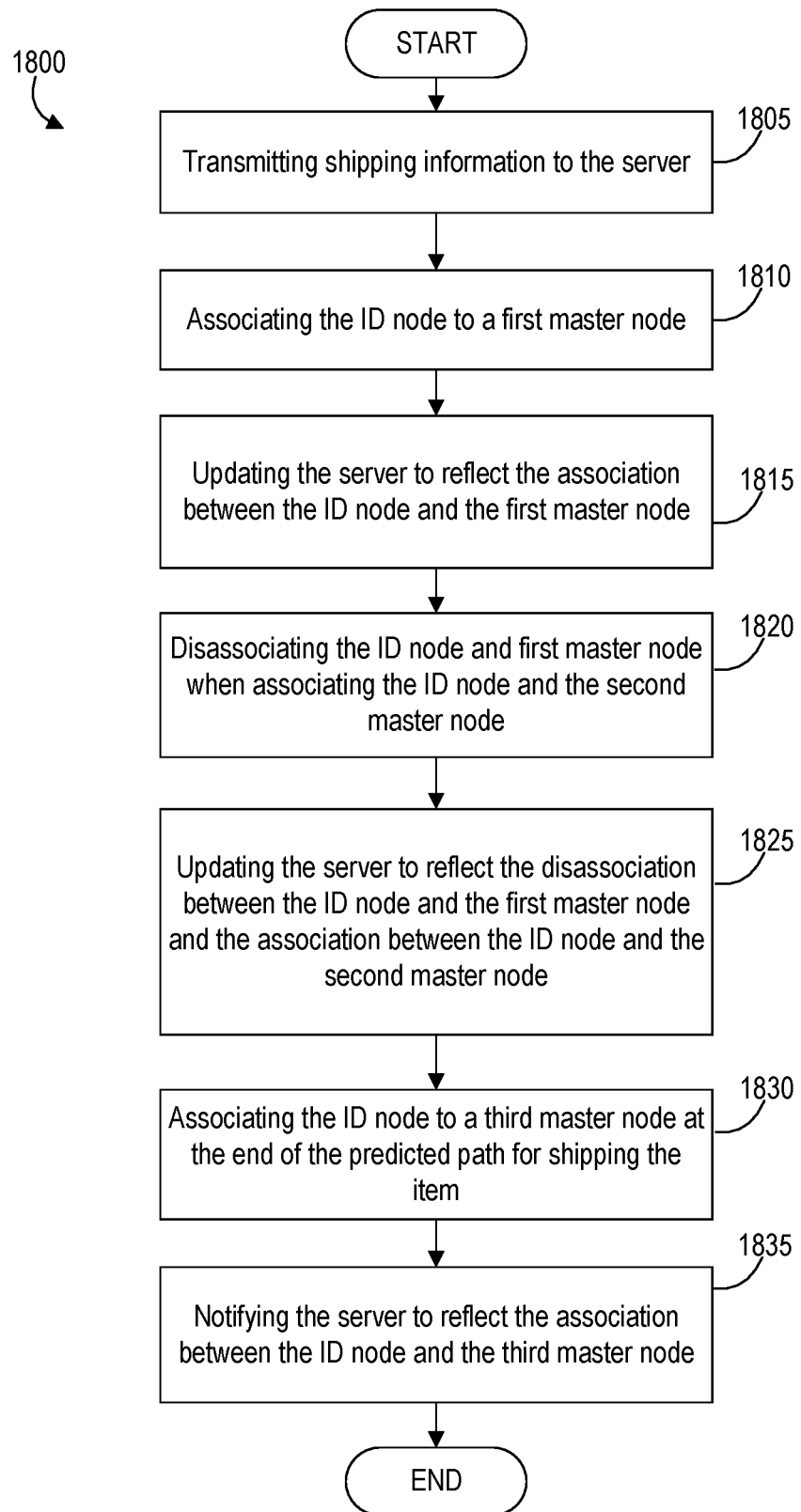
FIG. 18 is a flow diagram illustrating an example method for managing shipment of an item using a wireless node network in accordance with an embodiment of the invention.
Figure 19:
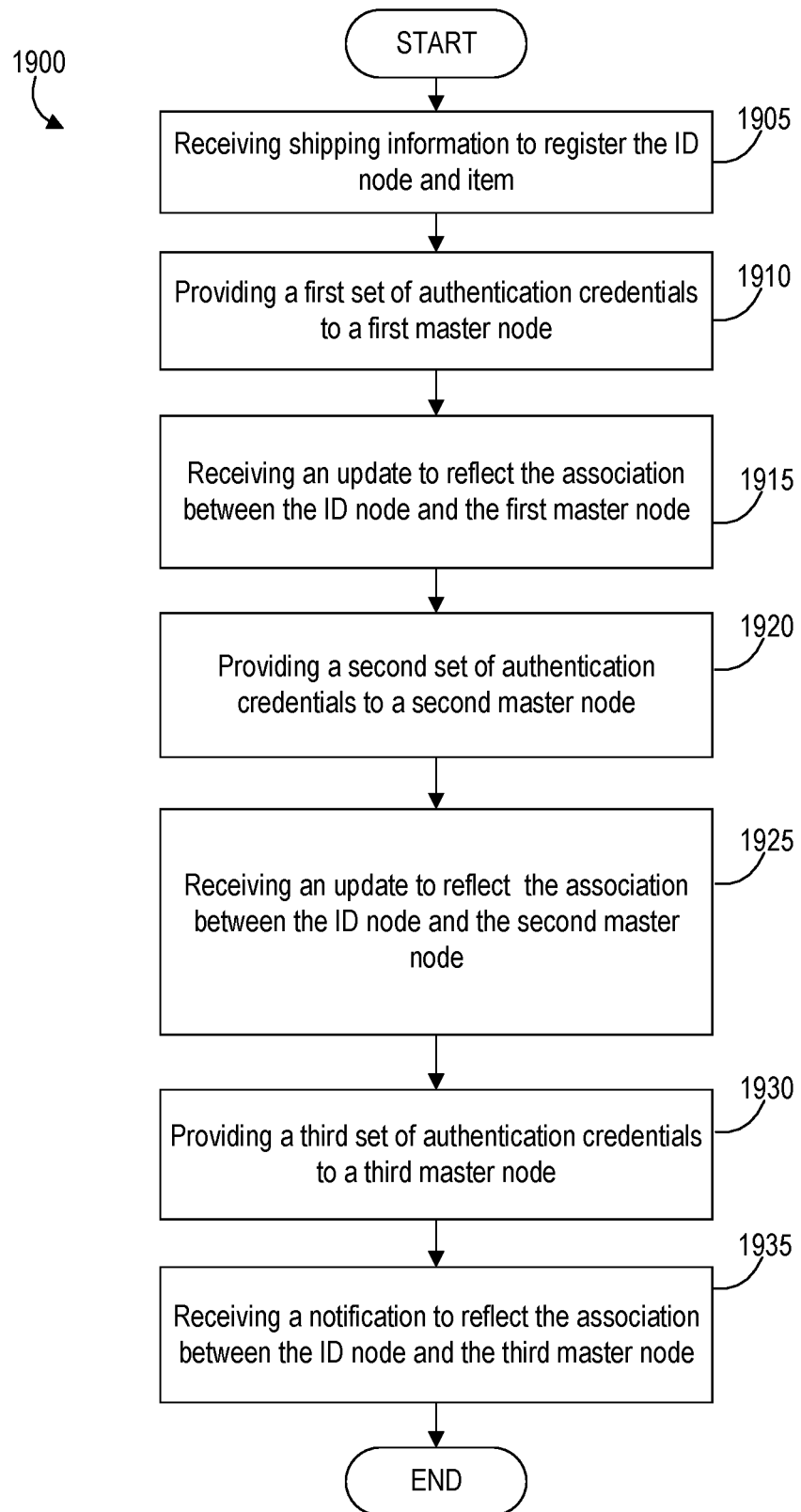
FIG. 19 is a flow diagram illustrating another example method for managing shipment of an item using a wireless node network in accordance with an embodiment of the invention.

FIGS. 18 and 19 are flow diagrams illustrating various exemplary methods for managing a shipment of an item using a wireless node network, such as that illustrated in FIG. 17. Referring now to FIG. 18, exemplary method 1800 begins by transmitting shipping information to the server to register the ID node and the item to be shipped at step 1805 and associating the ID node to a first master node related to a predicted path for shipping the item at step 1810. At step 1815, the server is updated to reflect the association between the ID node and the first master node. Typically, this may come in the form or a communication from the first master node to the server. When the first master node is a user access device (e.g., one of a laptop computer, a desktop computer, a tablet device, a personal area network device, a smartphone device, and a smart wearable device) that is operated by a shipping customer, the server may be updated to become aware that the ID node is associated with the first master node prior to a pick-up event in the predicted path.

For example, a shipping customer may use their smartphone to enter shipping information and register that the ID node and the item (such as package 130) are to be shipped from an origin point to a destination point. Prior to when the item and ID node are picked up by an initial courier (e.g., from a drop box, locker unit, or other receptacle), the shipping customer's smartphone operates as the first master node and is associated with the ID node. As such, and with an update to the server, the server now has visibility into the status and location of the ID node prior to a pick-up event in the predicted shipping path from the origin point to the destination point.

The method 1800 may continue at step 1820 by disassociating the ID node and the first master node when associating the ID node and a second master node related to the predicted path as the ID node transits the predicted path. In one example, the ID node need not disassociate with the first master node commensurate with associating with the second master node. Thus, those skilled in the art will appreciate that the ID node may be associated with one or more master nodes at a given point in time and may be selectively disassociated with certain master nodes depending on the need for the ID node to securely share data with different master nodes.

At step 1825, the server is updated to reflect the disassociation between the ID node and the first master node (if that has occurred yet) and the association between the ID node and the second master node as the ID node continues to transit the predicted path. At step 1830, the method may associate the ID node to a third master node near an end of the predicted path for shipping the item, and then at step 1835 notifies the server to reflect the association between the ID node and the third master node.

In the method 1800, associating the ID node to the third master node in step 1830 may be performed after a drop-off event in the predicted path. The method may also rely upon context data to adjust for an environmental aspect of the predicted path when associating the ID node to any of the first, second, or third master nodes.

For example, after the item and ID node are delivered to or near the destination, the recipient's smartphone may operate as the third master node associated with the ID node. Data, such as sensor data, may be shared with the recipient while the recipient's smartphone operates as the third master node associated with the ID node. As such, and with an update to the server, the server now has visibility into the status and location of the ID node after a drop-off event.

Thereafter, the recipient may unregister the ID node and item given the item is now in the recipient's possession and control. For example, the recipient may remove the ID node from the item (e.g., the package 130), deactivate the ID node to otherwise power down the device, update the server regarding the deactivated status of the ID node (and the disassociation of ID node and the third master node), and then clean up and/or recharge the ID node for future use in shipping another item.

Method 1800 may also include receiving context data related to the predicted path. In one embodiment, such context data may advantageously allow for adjustments due to one or more environmental aspects of the predicted path when associating the ID node to any of the master nodes. For example, the context data may include scan data indicating the type of material in package 130 (the item), which may cause RF shielding issues with the ID node.

Referring now to FIG. 19, exemplary method 1900 is explained from the perspective of the server, which can authorize certain types of node associations. The server may be updated, in some embodiments, with association information when an ID node and a master node are passively associated. In such a situation, the nodes have not established an authorized association where they can securely share data. However, as method 1900 explains in more detail, an embodiment may manage a shipment of an item when active associations are established.

Method 1900 begins with the server receiving shipping information to register the ID node and the item to be shipped in step 1905. The method 1900 then provides a first set of authentication credentials (e.g., security pin information) to a first master node to permit the ID node to associate with the first master node related to a predicted path for shipping the item at step 1910. In one example, the first master node may be a user access device, such as a laptop computer, a desktop computer, a tablet device, a personal area network device, a smartphone device, or a smart wearable device. And step 1920 may be performed prior to a pick-up even in the predicted path.

At step 1915, the server receives an update to reflect the association between the ID node and the first master node. The method 1900 then provides a second set of authentication credentials to a second master node to permit the ID node to associate with the second master node and disassociate the ID node from the first master node as the ID node transits the predicted path at step 1920. At step 1925, the server then receives an update to reflect the association between the ID node and the second master node as the ID node continues to transit the predicted path (or a portion of a predicted path). When the ID node and the first master node disassociate, the server may also be updated.

In some examples, the method 1900 may have the server provide a third set of authentication credentials to a third master node to permit the ID node to associate with the third master node as the ID node reaches an end of the predicted path for shipping the item at step 1930. In some examples, this step may be performed after a drop-off event in the predicted path.

Finally, at step 1935, the server receives a notification that reflects the association between the ID node and the third master node. When the ID node and the second master node disassociate, the server may also be updated.

In method 1900, another embodiment has the server providing any of the master nodes with context data related to an environmental aspect of a part of the predicted path. For example, exemplary context data may include layout data related to a facility in which the ID node is moving between master nodes. In more detail, the received context data may be relied upon to adjust for an environmental aspect of the predicted path when associating the ID node to any of the first, second, or third master nodes.

In still another embodiment, method 1900 may also determining a location of the ID node based upon association information received by the server and location information related to at least one of the first, second, or third master nodes.

As previously discussed, the server may predict a transit route from a first point to a second point along at least a portion of the predicted path for shipping the item. In one example, the first point is an origin and the second point is a destination point with both being identified in the shipping information of the item. However in other examples, the first and second point along a predicted path may merely be interim points without encompassing the originating shipment point or the ultimate destination of the item being shipped. Further, another example may adjust the predicted path as the ID node transits the path. In this way, the server may adapt based upon, for example, context data, so as to optimize or at least account for a changing contextual environment when managing the shipment of an item.

In another embodiment, a non-transitory computer-readable medium is disclosed that contains instructions, which when executed on a processor (e.g., processor 500 of server 100), performs another embodiment of a method for managing a shipment of an item using a wireless node network having at least one ID node, a plurality of master nodes, and a server. In this embodiment, the exemplary method begins with the server receiving shipping information to register the ID node and the item to be shipped. The method predicting a first portion of a transit route for the item from a first point to a second point. For example, a first point may be the origin point and the second point may be the destination point—both of which are identified in the shipping information. In another example, the first and second points are any two points along the transit route. Furthermore, the transit route may be predicted as a series of portions or segments that may use particular types of master nodes during transit (e.g., master nodes used by a particular courier for pick-up, an anticipated vehicle used by the pickup courier, one or more anticipated facilities that may be used by the vehicle, an anticipated air route (e.g., an anticipated departing airport, an anticipated aircraft, anticipated types of containers such as a type of ULD or pallet used on the aircraft, and an anticipated arriving airport), a facility near the anticipated arriving airport, a vehicle used to carry the item, and a courier that may deliver the item at the destination point). Those skilled in the art will realized that some of the potential portions of an exemplary predicted path or transit route may be relatively simple for a local delivery, or may be quite complex from an intermodal perspective when the origin point and destination points are very far away from each other.

Next, the method authorizes a first master node to associate or connect with the ID node near the origin point. This may be done prior to a pick-up event for the ID node and item being shipped. For example, when the first master node is a user access device (e.g., a laptop computer, a desktop computer, a tablet device, a personal area network device, a smartphone device, and a smart wearable device) for the shipping customer, visibility as to the status and location of the ID node may be extended to prior to a pick-up event. In one embodiment, such an authorization is performed by the server 100 when it receives information from the first master node regarding the ID node, determines that the first master node and the ID node should be actively paired and associated, and the server 100 sends the appropriate security pin information as a type of authorization credentials that permit the first master node to actively pair and connect with the ID node. After the first master node is associated with the ID node, the server receives an update reflecting the association.

Next, the server may authorize a second master node to associate with the ID node as management responsibility of the ID node is handed off from the first master node to the second master node at the second point on the predicted transit route. In one embodiment, the method may authorize the first master node to disassociate with the ID node. However, in other embodiments, the first master node may stay associated with the ID node—even after the ID node is authorized to associate with the second master node. The server then receives an update to reflect the association between the ID node and the second master node as the ID node continues on the predicted first portion of the transit route.

The method may further authorize the second master node to disassociate with the ID node and a third master node to associate with the ID node as management responsibility of the ID node is handed off from the second master node to the third master node near the destination point on the predicted transit route. This may be done prior to a pick-up event for the ID node and item being shipped. For example, when the third master node is a user access device (e.g., a laptop computer, a desktop computer, a tablet device, a personal area network device, a smartphone device, and a smart wearable device) for the recipient, visibility as to the status and location of the ID node may be extended to after a drop-off event. After the third master node is associated with the ID node, the server receives a notification to reflect the association between the ID node and the third master node.

And during the method, the server may determine a location of the ID node based upon association information received by the server and location information related to at least one of the first, second, or third master nodes. As discussed above, various techniques are available for locating a node and, in some cases, adjusting for adverse RF environmental conditions with context data to more accurately refine the location of a node. As such, the server keeps track of the location of nodes in the wireless node network, and may provide that information (as well as other types of shared or sensor information) when requested and authorized to do so.

From a system perspective of such a logistics application of a wireless node network, an exemplary system is disclosed for managing a shipment of an item using a wireless node network. With reference to FIG. 17, the exemplary system generally comprises an ID node (such as node 120a), a plurality of master nodes (such as nodes 110a-110h), and a server (such as server 100). The ID node is registered to the item (such as package 130) being shipped. Each of the master nodes are predicted to be located at a different part of an anticipated transit route for the item as the item is shipped from an origin point to a designation point of the anticipated transit route. Each of the master nodes is operative to communicate with the ID node over a short-range communication path, and operative to communicate with other master nodes and the server 100.

The server operates to track and report a location of the ID node and a location of the master nodes. As shown in FIG. 17, server 100 relies on network 105 to communicate with different master nodes (110a-110h) as well as user access devices 200, 205 that may operate and function as a master node associated with ID node 120a at certain times. As previously discussed, server 100 may employ a variety of different techniques (or a combination of different techniques) for determining the location of ID node 120a or one of the other nodes in the network.

The server is also operative to facilitate the transfer of management responsibility of the ID node between different master nodes as the ID node moves along the anticipated transit route. For example, as discussed above, nodes communicate via broadcast and scanning methods, and may be associated under control of the server 100 as part of managing the wireless node network. In this way, a first of the master nodes may be associated with the ID node prior to a pick-up event for the ID node and item to be shipped. In one example, user access device 200 may operate as a master node and be associated with ID node 120a prior to being placed into drop node 110a and picked up by a courier from the receptacle related to that drop node 110a.

Later, a second of the master nodes may be associated with the ID node after the ID node is disassociated with the first of the master nodes at an intermediate point of the anticipated transit route. And, a third of the master nodes may be associated with the ID node after a drop-off event for the ID node and item to be shipped. For example, user access device 205 may operate as a master node and be associated with ID node 120a after the ID node 120a and item are dropped off at an intended destination point (e.g., a type of drop-off event).

In an embodiment of the system, each of the master nodes may be operative to update the server upon completing a disassociation or association with the ID node. This provides the server with association information with which it can use to manage and track the nodes in the wireless node network. When associating nodes, the server may be operative to transmit a set of authorization credentials to one of the master nodes and the ID node to authorize a desired association between the master node and the ID node. The server may also be operative to determine the location of the ID node based upon context data, such as information relating to an environmental aspect of a part of the anticipated transit path (e.g., RF shielding aspects of the item being shipped with the ID node or a container holding the ID node, building layout information, etc.).

Those skilled in the art will readily appreciate that operations of such an exemplary wireless node network, as set forth herein, are not limited to tracking just a package, but may be used to manage logistics and tracking of other types of items, such as an object or a person. Indeed, some embodiments provide enhanced capabilities that facilitate better tracking of items, objects, and people as they move to a more restrictive indoor environment, by using a low power ID node in advertising mode in the presence of one or more master nodes.

Additional Node Enhancements & Improved Implementations

Figure 34:
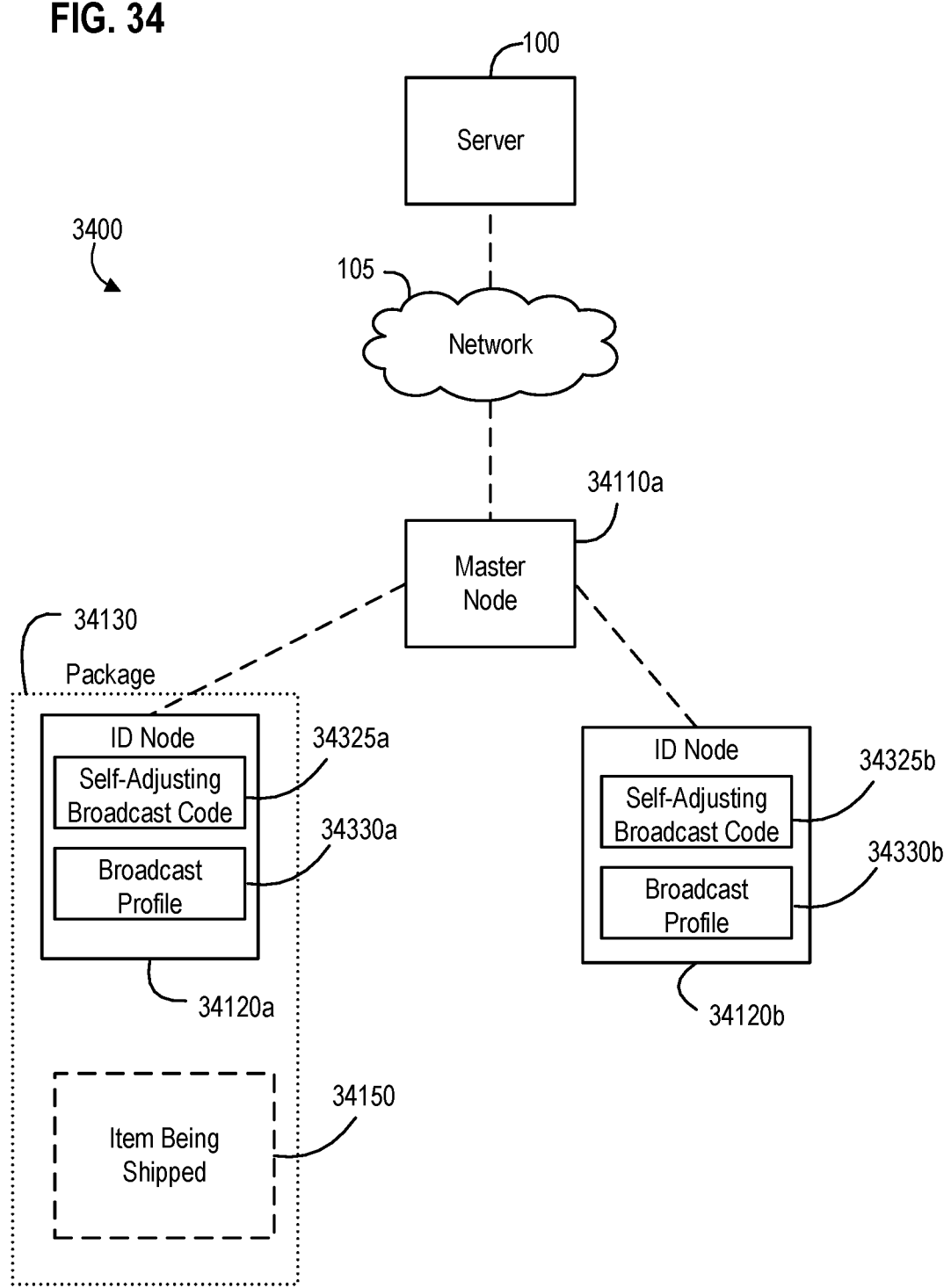
FIG. 34 is a diagram illustrating an exemplary enhanced self-adjusting wireless node system in accordance with an embodiment of the invention.

In light of the above description covering elements of an exemplary wireless node network and how they may be used to help locate and track items, further embodiments may enhance and improve how such elements communicate. For example, additional embodiments explained in more detail below describe nodes that may use self-adjusting broadcast settings, nodes that may deploy enhanced multi-component radios to improve how a node listens for other nodes and/or detects the location of other nodes, as well as enhanced communication management techniques deployed with a system of nodes faced with a congested node landscape that otherwise makes for difficult node-to-node control and communication exchanges. Still further embodiments focus on multiple features and aspects of a specialized container-centric type of node, which may deployed in such exemplary wireless node networks as part of a logistics container, such as a ULD or other logistics receptacle. FIGS. 34-99 help explain these further embodiments that enhance and improve locating, monitoring, and delivery management and are particularly useful in shipping, logistics, and transportation field applications using exemplary components of a wireless node network in accordance with various embodiments of the invention.

Power Profile Enhancements

As explained above, a node may operate in an exemplary wireless node network in accordance with a profile, such as a broadcast profile stored as profile data 330 in memory of the ID node or profile data 430 in memory of a master node. Profile data (such as data 330 or 430) is a type of data that is typically provided to the node and kept in volatile and/or non-volatile memory of the node as data defining a type operational behavior or parameters used for a particular operational behavior for the node in the network. The node may use such profile data by being instructed by a separate managing device to change operational behavior in accordance with the profile data.

However, additional embodiments involving may have a specially programmed node (such as an ID node or master node or other types of nodes) that can self-direct and self-adjust characteristics of its own operation according to profile data (such as how to broadcast an advertising signal according to a broadcast profile defining a set of low, medium, and high power levels to use at particular times) without requiring instructions from a managing device to change operational behavior. Such embodiments, for example, may self-adjust a broadcast setting based on self-detected events (generally referred to as broadcast monitoring events). Those network elements observing the self-adjusting node may become informed of the self-adjusting node's updated value for its broadcast setting from the signal header, which creates improved management efficiency as observing/managing nodes avoid the need to constantly send instructions to the self-adjusting node to change operational settings (such as output power level, frequency, or timing of the broadcasted advertising message emanating from the self-adjusting node under an updated or changed setting).

FIG. 34 is a diagram illustrating an exemplary enhanced self-adjusting wireless node system in accordance with an embodiment of the invention. Referring now to FIG. 34, an exemplary network of interrelated and interacting elements are shown configured as an exemplary system 3400, which includes server 100, master node 34110a, network 105 that provides a data connection between server 100 and master node 34110a, and finally several ID nodes (i.e., ID node 34120a, ID node 34120b) that are each connected to the master node 34110a. As shown in FIG. 34, ID node 34120a is disposed within package 34130 along with an item being shipped 34150 such that ID node 34120a may be associated with the item being shipped 34150 and tracked/monitored by master node 34110a as such. In other embodiments, ID node 34120b may also be similarly disposed within a package and associated with an item being shipped. Furthermore, in still other embodiments, exemplary system 3400 may include multiple master nodes (similar to master node 34110a) and additional ID nodes in configurations similar to, for example, that shown in FIG. 2.

In contrast to the ID nodes illustrated in FIGS. 1-4, ID node 34120a and ID node 34120b are shown as specially programmed to use self-adjusting broadcast code (such as 34325a and 34325b), which enables the respective ID node to make use of one or more onboard broadcast profiles (such as 34330a and 34330b) when autonomously self-adjusting to change or otherwise alter how the node broadcasts messages based on self-detected broadcast modification events. While master node 34110a is not shown having the self-adjusting broadcast code and related onboard broadcast profiles similar to those shown for ID nodes 34120a and 34120b, those skilled in the art will appreciate that as explained in more detail below, master node 34110a may be deployed within an embodiment of system 3400 to also be self-adjusting with one or more broadcast profiles.

Figure 35:
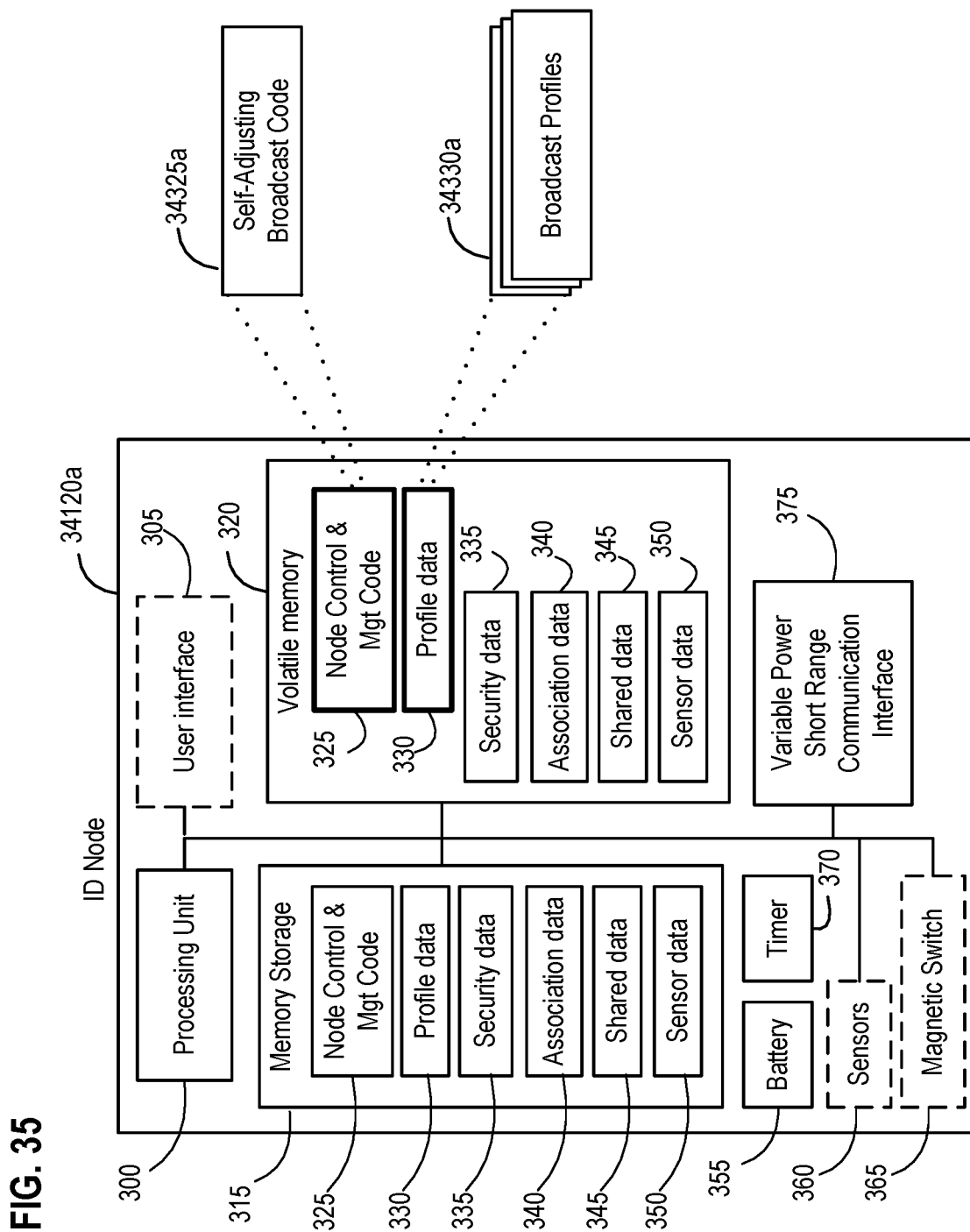
FIG. 35 is a diagram illustrating further details of an exemplary node that uses self-adjusting broadcast code and at least one broadcast profile as part of the system shown in FIG. 34 in accordance with an embodiment of the invention.
Figure 36:
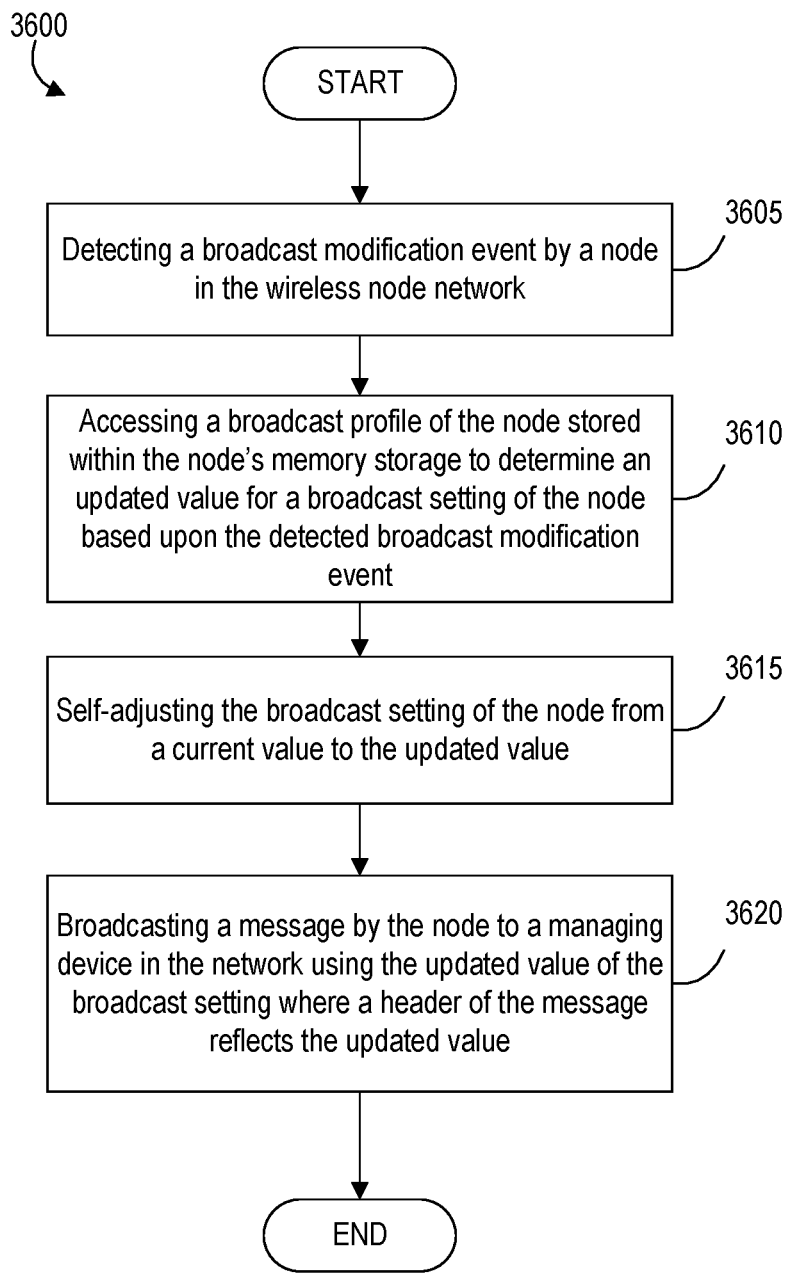
FIG. 36 is a flow diagram illustrating an exemplary method for self-adjusting a broadcast setting of the node in a wireless node network in accordance with an embodiment of the invention.

In general, exemplary system 3400 may, for example, operate with ID node 34120a detecting a type of broadcast modification event (such as detecting proximity to a conveyor structure or an elapsed time since capturing barcode data with onboard sensors). Based on this self-detected event, ID node 34120a may then access broadcast profile 34330a within the node's memory, determine an updated value for the node's broadcast setting based on the detected event, and self-adjust the node's broadcast setting using the updated value without relying upon a broadcast setting instruction message from master node 34110a. Such an operation of system 3400 may take place, for example, when package 34130 is placed on the conveyor structure that moves package 34130 (and ID node 34120a) closer and closer to master node 34110a. As a timer on ID node 34120a counts down from when the ID node 34120a has been placed on the conveyor, ID node 34120a may detect the end of a particular time period, which then causes the ID node 34120a to dynamically and autonomously self-adjust the node's own broadcast setting that alters its RF transmission output power level, frequency, or timing related to what the ID node 34120a is to be broadcasting during a next time period. As such, ID node 34120a may operate as a system component that autonomously self-adjusts the output power of broadcasted advertising messages, how often the node broadcasts such messages, or the frequency of such broadcasted advertising messages (or a combination of like types of broadcast setting changes). To accomplish such self-adjusting broadcast functionality, the node's broadcast profile 34330a has settings that may be defined for continuously changing settings (e.g., gradually changing on a smooth increase or decrease) and/or changing in discrete steps (e.g., incrementally changing from a current value to an updated value). Thus, a node (such as an ID node, master node that also has location circuitry, or other types of nodes described herein that can be deployed in a wireless node network) may employ a self-detecting and self-adjusting scheme of hardware, data, and software instructions or code to manage how the node is broadcasting without imposing further overhead burdens on a managing device in the network that normally controls and manages the node as it operates within the network. FIGS. 35 and 36 explain further details of such a node and how it operates.

In more detail, FIG. 35 provides a diagram illustrating further aspects of an exemplary ID node 34120a that uses self-adjusting broadcast code 34325a and at least one broadcast profile 34330a as part of the system 3400 shown in FIG. 34 in accordance with an embodiment of the invention. Referring now to FIG. 35, those skilled in the art will appreciate that ID node 34120a includes many of the same hardware, code, and data components as shown for exemplary ID node 120a of FIG. 3. As such, similar functionality exists for what is numbered the same and described above regarding exemplary ID node 120a of FIG. 3. Notably, the embodiment with exemplary ID node 34120a illustrated in FIG. 35 deploys node control and management code 325 (as stored in memory storage 315 and loaded for execution by processing unit 300 in volatile memory 320) and self-adjusting broadcast code 34325a. In some embodiments, self-adjusting broadcast code 34325a may be implemented as an integrated part of node control and management code 325, such as a programmatic function or program module within code 325. But in other embodiments, self-adjusting broadcasting code 34325a may be implemented separately from code 325.

In general, exemplary self-adjusting broadcast code 34325a coordinates the self-detection of broadcast modification events feedback from various elements within ID node 34120a, accesses one or more broadcast profiles 34330a, and enables the autonomous self-control and adjustment of how the node's communication interface 375 operates to broadcast advertising messages using updated broadcast settings pursuant to the broadcast profile 34330a in response to the detected broadcast modification events. In embodiments where there are multiple broadcast profiles 34330a resident in memory 315/320, self-adjusting broadcast code 34325a determines which communication profile to use (e.g., indoor broadcast profile, congested landscape broadcast profile, an outdoor broadcast profile, an airborne broadcast profile, and the like). This may, in some embodiments, be based on sensor data 350, shared data 345 (such as location data and context data relevant to the ID node), association data 340, and the like that provide insight on the ID node's communication environment and allow for a proactive selection of a desired communication profile to file such an environment.

In one embodiment, the broadcast profile 34330a may be established as a type of "ranging" profile that defined different output power levels in various ways. For example, the ranging profile may have a first broadcast setting (e.g., power level) for an initial range commensurate with a first time period elapsing after crossing a reference point or commensurate with a location of the node being proximate a first structure relatively near the reference point. As time goes on and further broadcast modification events are sensed or otherwise detected, a second broadcast setting may be used for a second range relative to the reference point, and so on. In a further embodiment, ID node 34210a may calibrate itself as it uses self-adjusting broadcast code 34325a and broadcast profiles 34330a by using captured barcode data at known locations with known distances to reference points (e.g., the location of master node 34110a).

FIG. 36 is a flow diagram illustrating an exemplary method for self-adjusting a broadcast setting of a node, such as ID node 34120a, in a wireless node network in accordance with an embodiment of the invention. Referring now to FIG. 36, method 3600 begins at step 3605 with the node detecting a broadcast modification event. In general, a broadcast modification event may be considered as an event sensed or detected by the node itself reflecting a relevant change in the operating environment of the node. For example, an embodiment may use a time-based event as the detected broadcast modification event. As such, in some embodiments, the current value of the broadcast setting may be used during a first time period according to the broadcast profile while the detected time-based event reflecting a broadcast modification event may comprise an end of that first time period. In other embodiments, the broadcast profile may define multiple time profile segments where different values of the broadcast setting are being applied by the node based upon a detected time or timer value. In more detail, a detected broadcast modification event may be a detected time-based event reflecting an end of a first time profile segment within a plurality time profile segments defined by the broadcast profile. The broadcast setting defined per the broadcast profile during each time profile segment may reflect a constant or changing profile during the respective time profile segment.

In a further embodiment, the broadcast modification event may comprise an association-based event detected when the node associates with another node in the wireless node network. For example, as discussed above relative to FIGS. 9 and 10, exemplary nodes (including ID node 34120a, ID node 34120b, and master node 34110a) are characteristically able to establish associations or logically connection relationships between each other where such associations are typically server-authorized and tracked as part of managing the different network elements in the wireless node network. Extending this type of association functionality to the nodes depicted in exemplary system 3400 shown in FIG. 34, an embodiment of ID node 34120a may become associated with the master node 34110a as the ID node 34120a (and its related package 34130 and item 34150) moves within range of the master node 34110a and after the server 100 directs the two nodes to associate (with authorization). As a result, information identifying the relationship between ID node 34120a and master node 34110a may be provided to server 100 and may be provided, as some point, to each of ID node 34120a and master node 34110a. Thus, exemplary association data 340 may exist in volatile memory 320 and/or memory storage 315 of ID node 34120a as a type of data identifying associations between nodes. Similar association data may exist within the memory of master node 34110a.

Another type of potential broadcast modification event may be a location-based event detected when the node is mobile and self-determines its present location to be proximate to a structure. As shown in FIG. 4, exemplary master node device 110a includes location circuitry 475 (such as GPS circuitry or other positioning circuitry) that allows the master node to self-determine its location. Furthermore, as described above, context data 560 may be provided by server 100 to the master node (such as master node 34110a) where the context data provides information related to different structures (e.g., a particular type of courier device, vehicle, facility, transportation container, etc.). Exemplary master node 34110a may leverage these same master node features to self-determine its present location to be proximate to a structure, as well as be deployed as a mobile type of node (such as a master node mounted within a vehicle or aircraft). Thus, detecting such location-based information by a similarly equipped master node may be considered a type of detected broadcast modification event under a further embodiment of method 3600.

Further still, the broadcast modification event in another embodiment may comprise a sensor-based event detected when a sensor on the node detects a change in an environmental condition. As shown in FIG. 34 as well as FIGS. 3 and 4, the nodes described herein may include sensors that generate sensor data, such as sensor data 350 in ID node 34120a or sensor data gathered by other nodes. Sensor data 350 may exist in volatile memory 320 and/or memory storage 315 as a type of data recorded and collected from an onboard sensor or from another node and may reflect a change in an environmental condition. For example, sensor data 350 may include temperature readings from a temperature sensor onboard an ID node (or data 450 from a sensor onboard a master node) and/or humidity readings from a humidity sensor in another node. Thus, when an onboard sensor detects a change in an environmental condition using a sensor deployed on the node, such a sensor-based event may be a type of detected broadcast modification event in an embodiment of method 3600.

And, in yet another embodiment, method 3600 may implement step 3605 where the detected broadcast modification event may comprise a combination of at least two from the group consisting of a time-based event, an association-based event, a location-based event, and a sensor-based event. As such, different embodiments of method 3600 may detect the broadcast modification event as more than one self-detected reflecting a type of change for the detecting node where the node may operate more efficiently or in a desired manner by switching its broadcast setting.

Method 3600 continues at step 3610 with the node accessing a broadcast profile stored within the node's memory in order to determine an updated value for the broadcast setting of the node based upon the detected broadcast modification event. Then, at step 3615, method 3600 has the node self-adjusting the broadcast setting of the node from a current value to the updated value.

For example, as shown in FIG. 35, processing unit 300 of exemplary ID node 34120a may access a broadcast profile 34330a when executing step 3610. For an embodiment where multiple broadcast profiles 34330a are stored within profile data 330, a further embodiment of step 3610 may also include first determining which of the broadcast profiles to use as the desired broadcast profile. In other words, an embodiment may maintain different communication profiles for the node and first determine which of the communication profiles to use as the broadcast profile when accessing the appropriate profile when determining the updated value for the broadcast setting. Further still, an embodiment may access the broadcast profile to determine the updated value after detecting the broadcast modification event and without being prompted with an instruction from a second node (such as master node 34110a) to adjust the broadcast setting.

In step 3610, the broadcast setting may be implemented as an RF transmission output power level setting identified as part of the broadcast profile of the node. In another embodiment, the broadcast setting of the node may be a frequency setting identified as part of the broadcast profile of the node. In yet another embodiment, the broadcast setting of the node may be a timing setting identified as part of the broadcast profile of the node. Further still, other embodiments may deploy a node having multi-variate broadcast settings as part of the node's broadcast profile (e.g., different broadcast settings that are based on two or more of RF transmission output power level, frequency, and/or timing settings that collectively adjust how the node broadcasts signals).

In more detail, the updated value of the broadcast setting, as determined in step 3610, may be implemented in a variety of ways. For example, the updated value may generally be implemented as one of multiple broadcast setting values maintained as part of the broadcast profile of the node. In some embodiments, the current value and the updated value of the broadcast setting for the node may be within a range defined by the node's broadcast profile of the node. In another embodiment, the updated value may be a changed broadcast setting where the change may, for example, relate to a period of time defined by the broadcast profile of the node. Further still, another embodiment may have the updated value for the broadcast setting being a change to at least one of a modified RF transmission output power level setting for the node as defined by the broadcast profile; a modified frequency setting for the node as defined by the broadcast profile; and a timing setting for the node as defined by the broadcast profile.

Additionally, the determined updated value for the broadcast setting may relate to structure in or near the operating environment of the node. In one embodiment, the updated value may be determined to as a predetermined value related to a structure in proximity to the node where the predetermined value is part of context data maintained in a memory storage of the node. For example, a ULD may be in proximity to ID node 34120a as the ULD may contain the package 34130 within which the ID node 34120a has been placed. As such, the ID node 34120a may determine the updated value for the broadcast setting to be a predetermined increase in RF transmission output power level relative to the proximity of the ULD (which may otherwise shield and attenuate signals broadcasted from ID node 34120a). In another embodiment, the updated value may be implemented as a predetermined value related to structure (such as a shipment receiving building) associated with a master node in the wireless node network. In more detail, an embodiment may implement the updated value as a default broadcast value related to an interior of a shipping container associated with the master node (such as when a master node is fixed to an interior of the shipping container so as to monitor and communicate with ID nodes deployed in packages maintained within the shipping container).

Method 3600 may continue in some embodiments to step 3620, where the node broadcasts a message to a managing device in the network (such as a managing master node) using the updated value of the broadcast setting and where a header of the message reflects the updated value. In more detail, the node (e.g., ID node 34120a) may broadcast a message with one or more advertising signals intended to be received by the device managing the broadcasting node (e.g., master node 34110a) where a header of the message (such as the header of the exemplary advertising message packet depicted in FIG. 7) updates the managing device about the updated value of the broadcast setting of the node (the updated value of the TX Power Level part of the header).

The nodes used in method 3600 may include an ID node and a master node (fixed or mobile), or a container node. In particular, such an ID node deployed as the self-adjusting node of method 3600 may be capable of communicating directly with a master node but incapable of communicating directly with a server in the wireless node network. Another embodiment has the node comprising a master node capable of self-locating, communicating directly with the ID node over a first communication path, and communicating directly with a server over a second communication path distinct from the first communication path. If the master node is at a fixed location, there may be little need for self-locating circuitry in the master node—thus, an embodiment may have the node being a fixed location master node that communicates directly with an ID node over a first communication path, and separately communicates directly with a server over a second communication path distinct from the first communication path. Further, an embodiment may have the node deployed as a container node associated with a particular container and capable of communicating directly with an ID node over a first communication path, communicating directly with a server over a second communication path distinct from the first communication path, but incapable of self-locating due to a lack of location circuitry.

Those skilled in the art will appreciate that method 3600 as disclosed and explained above in various embodiments may be implemented on a node (e.g., master node 34110a, ID node 34120a, or a container node attached to a logistics container used to temporarily maintain items or packages) running one or more parts of node control and management code 325 or 425 that includes a self-adjusting broadcast code module. Such code may be stored on a non-transitory computer-readable medium, such as memory storage 315 on ID node 34120a or memory storage on master node 34110a. Thus, when executing code 325 (or code 425 if on a master node), the respective node's processing unit may be programmatically transformed to become unconventionally operative to perform operations or steps from the exemplary methods disclosed above, including method 3600 and variations of that method.

A further embodiment of an exemplary self-adjusting broadcasting node apparatus (such as the ID nodes and master node illustrated in FIGS. 34 and 35) running such code as part of a wireless node network, may include at least a node processing unit, a memory storage, a communication interface, and detector circuitry. In this embodiment, the memory storage, communication interface, and detector are each coupled to the node processing unit. For example, as shown in FIG. 35, ID node 34120a has memory 315, memory 320, and variable power short range communication interface 375 coupled to processing unit 300. Further, the sensors 360 and timer 370 (each being examples of detector circuitry) are shown being operatively coupled to processing unit 300.

The memory storage (such as memory 315) in this exemplary self-adjusting broadcasting node apparatus maintains self-adjusting broadcast code (such as self-adjusting broadcast code 34325*a*) for execution by the node processing unit along with at least a broadcast profile (such as one of broadcast profiles 34330*a*). The communication interface in the embodiment is operative to communicate with a second device (e.g., an ID node or master node) in the wireless node network in accordance with the broadcast profile. As part of this embodiment, the detector circuitry is operative to generate data (e.g., time-based data, location-based data, and/or sensor-based data) related to a relevant broadcast modification event deemed important enough to have the node apparatus react with self-adjustments to how it broadcasts.

In more detail, the node processing unit of the embodiment operates to execute the self-adjusting broadcast program code section, which then causes the node apparatus to become specially programmed to control and perform the steps and operations as described above relative to method 3600 and variations of that method described above that transform the node apparatus in a non-conventional and innovative manner. More specifically, an embodiment may have the node processing unit being operative, when running such a self-adjusting broadcast program code section to specially adapt the apparatus, to receive the generated data related to the broadcast modification event from the detector; access the broadcast profile in the memory storage; determine an updated value of a broadcast setting for the communication interface according to the broadcast profile and based upon the generated data related to the broadcast modification event; self-adjust the broadcast setting from a current value to the updated value without receiving an adjustment instruction on the communication interface from the second device in the wireless node network; and cause the communication interface to operate in accordance with the updated value of the broadcast setting.

In further embodiments, the broadcast setting may comprise an RF transmission output power level setting, a frequency setting, or a timing setting identified as part of the broadcast profile (e.g., one of broadcast profiles 34330*a*). Further still, in some embodiments, the broadcast setting may be implemented as a combination of two or more of an RF transmission output power level setting, a frequency setting, or a timing setting identified as part of the broadcast profile.

The values in the broadcast profile for such broadcast settings may also be implemented in a variety of forms. For example, the updated value for the broadcast setting as accessed within the memory storage may comprise one of several different broadcast setting values maintained as part of the broadcast profile on the memory storage. In such an example, the updated value may be a lower RF power level compared to the current RF power level. In another example, the current value and the updated value may be implemented as different values within a range defined by the broadcast profile on the memory storage. The updated value, in some embodiments, may be a change to the broadcast setting that relates to a period of time defined by the broadcast profile. Further still, another embodiment may have the updated value be one or more of a modified RF transmission output power level setting for the communication interface as defined by the broadcast profile, a modified frequency setting for the communication interface as defined by the broadcast profile, and a timing setting for the communication interface as defined by the broadcast profile. For example, ID node 34120*a* may have one of broadcast profiles 34330*a* that defines different values for power, timing, and frequency settings with which to use when causing the communication interface 375 to broadcast advertising signals to communicate with other nodes.

In another embodiment, the memory storage may maintain context data related to an environment of the node apparatus. Such context data, as explained above, may include information related to different structures (e.g., a particular type of courier device, vehicle, facility, transportation container, etc.) in the general vicinity proximate to the node or in an anticipated environment for node as the node apparatus moves from location to different location. As such, the updated value for the broadcast setting may be implemented as a predetermined value related to a structure in proximity to the node apparatus (such as a conveyor system that is moving the node apparatus). Such a predetermined value may be a part of the context data maintained in the memory storage of the node apparatus.

In more detail, an embodiment may have the updated value for the broadcast setting being a predetermined value related to a structure, where the structure is associated with a master node as the second device in the wireless node network. For example, the master node may be dedicated to a storage facility or to a mobile delivery van or to a shipping container. When the structure is a shipping container associated with the master node, the updated value may be a default broadcast value related to an interior of that particular shipping container. In this way, the node apparatus may self-adjust its broadcast setting to stop broadcasting for a time period while within the shipping container or may self-adjust its broadcast setting to a higher RF transmission output power level to account for the shielding or attenuation characteristics related to the shipping container.

As noted above, a node's memory storage may include multiple broadcast profiles (such as profiles 34330*a* shown in FIG. 35). Thus, as part of an embodiment, the node processing may be further operative, when executing the self-adjusting broadcast code (such as code 34325*a*), to determine one of the multiple communication profiles as the broadcast profile to use. For example, one profile may be used for airborne transportation situations where the node apparatus has been loaded on an aircraft and is in the processing of being transported where another profile may be used for storage situations when the node apparatus is temporarily stored within a larger storage facility prior to pickup for delivery as part of a package. Indeed, yet another profile may be dedicated for use while in a mobile delivery situation where the node apparatus and its associated package and item being shipped (such as package 34130 and item 34150). As such, an embodiment may deploy different broadcast profiles depending on location, movement status, or relevant shipping phase (e.g., initial activation with the package, drop off, loading/unloading related to transport vehicles or containers, hand-off between custodians, airborne transport, land-based transport, sorting, storage, mobile delivery, post-delivery reporting, and the like).

Further embodiments may include more details on what is then broadcasted in accordance with the updated value of the broadcast setting. For example, in one embodiment, when the node processing unit causes the communication interface to operate in accordance with the updated value of the broadcast setting, the communication interface is controlled by the node processing unit to broadcast a message in accordance with the updated value such that a header of the message reflects the updated value. Such a message may be broadcast for reception by a managing device (e.g., a master node such as node 34110a) where the header of the message updates the managing device about the updated value of the broadcast setting of the node. For example, the header of the broadcasted message from the communication interface 375 of ID node 34120a may include a flag or other data bit/byte or information related to the updated value (such as an updated value of the TX Power Level flag as shown in exemplary advertising package 700 in FIG. 7).

As discussed above, the node processing unit is operative to receive data related to the broadcast modification event as generated by the detector. Further detailed embodiments may provide further specificity on characteristics of different types of detectors that sense or detect broadcast modification events that, once detected, indicate it is time to self-adjust the broadcast setting. For example, in one embodiment the detector may be implemented as timer circuitry (such as timer 370), which operates to generate the data related to a time-based broadcast modification event. More specifically, such a time-based event may a detected end of a first time period where prior to the end of the first time period, the node processing unit is operative to cause the communication interface to operate in accordance with the current value of the broadcast setting before moving to the updated value after the end of the first time period. In another embodiment, the broadcast profile may define multiple time profile segments where the time-based broadcast modification event may be the end of a first of the time profile segments. As such, the node processing unit is operative to cause the communication interface to operate in accordance with the current value of the broadcast setting during the first time profile segment, and then self-adjust the broadcast setting to an updated value during the next of the time profile segments.

In another embodiment, the detector may be implemented with a sensor coupled to the node processing unit (or interface circuitry in communication with and logically considered part of the node processing unit). Such a sensor is generally operative to sense an environmental condition proximate to the node apparatus as the generated data related to the broadcast modification event. As such, a sensor-based broadcast modification event may be detected and relevant data is captured or generated by the sensor when the sensor detects a threshold change in the environmental condition. For example, as shown and discussed relative to ID node 34120a, sensors 360 may be used as a type of detector that generate data related to a broadcast modification event, such as at least a threshold change in temperature, humidity, light, motion, impact, or other environmental condition relative to the node apparatus.

In still another embodiment where the node apparatus may be implemented with a master node (such as master node 34110a), the detector may be implemented with location circuitry (such as GPS circuitry 475 as shown and explained relative to FIG. 4 or other types of location circuits, proximity sensors, or distance detectors). Such location circuitry is generally coupled to the node processing unit and can determine a current location of the node apparatus as the generated data related to the broadcast modification event. In some embodiments, the data on the current location may be a coordinate location while other embodiments may generate data on the current location in terms of relative location (e.g., 5 feet from a wall, ground, ceiling, or other structure). In more detail, the broadcast modification event may be considered a location-based event detected when the node processing unit determines the node apparatus is located proximate to a structure based upon both context data maintained on the memory storage (a type of information about an anticipated operating environment for the node apparatus) and the current location of the node apparatus (a type of information about the actual operating environment for the node apparatus).

In some embodiments, the node apparatus may deploy multiple types of detectors (e.g., a timer, location circuitry, or sensors) so that a broadcast modification event may include a combination of at least two of a time-based event, a location-based event, and a sensor-based event. Thus, more complex embodiments may use different types of detectors to detect a relevant modification event as well as use multi-faceted broadcast profiles with broadcast settings having different types of values for different characteristics of how the communication interface may be self-adjusted to operate.

As described above, the node apparatus may be implemented as different types of node devices. For example, in one embodiment the node apparatus may be implemented as an ID node (such as ID node 34120a), which is capable of communicating directly with a master node (such as master node 34110a) as the second device over the communication interface but incapable of communicating directly with a server in the wireless node network. As such, the ID node apparatus may be at a low level of the wireless node network, with the master node at a middle level, and the server being at top level within the network.

In another embodiment, the node apparatus may be implemented as a master node. In this embodiment, the detector is implemented with location circuitry (such as GPS circuitry) coupled to the node processing unit and operative to determine a current location of the master node as the generated data related to the broadcast modification event. Thus, the detected broadcast modification event may be a location-based type of event when the node apparatus is implemented as a master node. In more detail, the node apparatus implemented as a master node may further include an additional communication interface. In particular, the node apparatus may include a server communication interface coupled to the node processing unit and operative to communicate directly with a server in the wireless node network over a network communication path (in addition to the communication interface that communicates with the second device in accordance with the broadcast profile). As such, the communication interface that communicates with the second device does so over a short range communication path with an ID node as the second device. Such a short range communication path is distinct from the network communication path used by the server communication interface.

Further still, an embodiment where the node apparatus may be implemented as a master node may be implemented with a fixed location master node at a mid-level of the wireless node network. Such a fixed location master node (while not requiring location circuitry) may also have a server communication interface coupled to the node processing unit and operative to communicate directly with a server in the wireless node network over a network communication path (similar to that described above).

And in still another embodiment, the node apparatus may be attached to or otherwise associated with a container used at least to temporarily maintain items (such as a container or ULD that may temporarily store package 34130 that includes ID node 34120a and item 34150). As discussed in more detail below, such an exemplary container node may be implemented as the node apparatus as attached or associated with the container and having a server communication interface coupled to the node processing unit and operative to communicate directly with a server in the wireless node network over a network communication path (again, similar to that described above for the master node).

These different embodiments of an exemplary node apparatus that are each self-adjusting with respect to broadcast settings of its broadcast profile may be used or deployed within a system level embodiment. For example, an exemplary embodiment of an enhanced self-adjusting wireless node system may generally include at least two node apparatus devices that interact with each other in an unconventional and innovative manner. In particular, the first node apparatus in the system is operative to at least (a) self-adjust a broadcast setting for the first node apparatus to an updated value in response to a detected broadcast modification event and based upon its broadcast profile, and (b) broadcast a message in accordance with the updated value of the broadcast setting such that the message has at least header information reflecting the updated value. The first node apparatus may self-adjust the broadcast setting to the updated value without being prompted by the second node apparatus to adjust the broadcast setting.

The system's second node apparatus is then operative to receive the message from the first node apparatus and store data from the message associated with the first node apparatus as well as the updated value based upon the header information in the received message. Such header information allows the second node apparatus to become aware of the changed or self-adjustment made by the first node in response to the detected broadcast modification event.

In more detail, the broadcast setting of the first node apparatus in the exemplary system may be an RF transmission output power level setting, a frequency setting, and/or a timing setting identified as part of the broadcast profile of the first node apparatus. In other words, the updated value may be a change to the broadcast setting where the change comprising one or more from a group consisting of a modified RF transmission output power level setting for the first node apparatus as defined by the broadcast profile, a modified frequency setting for the first node apparatus as defined by the broadcast profile, and a timing setting for the first node apparatus as defined by the broadcast profile. Explained in with respect to still another embodiment, the updated value for the first node apparatus may be a change to the broadcast setting where the change may be implemented as a combination of two or more from a group consisting of a modified RF transmission output power level setting for the first node apparatus as defined by the broadcast profile, a modified frequency setting for the first node apparatus as defined by the broadcast profile, and a timing setting for the first node apparatus as defined by the broadcast profile.

Further, the updated value for the broadcast setting may be one of multiple broadcast setting values maintained as part of the broadcast profile for the first node apparatus, or may be implemented as an updated value within a range defined by the broadcast profile for the first node apparatus.

As explained above relative to method 3600 as well as embodiments of the exemplary node apparatus, an embodiment of the system may have the first node apparatus detecting specific types of broadcast modification events that are relevant enough to network operations to warrant self-adjustment of how the first node communicates. For example, the broadcast modification event may be a time-based event detected by the first node apparatus at an end of a first time period during which the first node apparatus broadcasts in accordance with a current value of the broadcast setting. In another example, the broadcast modification event may be an association-based event detected when the first node apparatus associates with a second device in a wireless node network (such as when the second device (e.g., an ID node) is the second node apparatus in a managing device approved association relationship with the first node apparatus).

In still another example where the first node apparatus includes location circuitry to self-determine location (e.g., when the first node apparatus is a master node, such as node 34110a), the broadcast modification event may be a location-based event. Such a location-based event may be detected when the first node apparatus moves and the location circuitry self-determines a present location of the first node apparatus to be proximate to an anticipated structure (such as a storage area, a conveyor system, a delivery vehicle, or a logistics receptacle).

In another example, the first node apparatus may include at least one sensor that monitors an environmental condition relative to an environment of the first node apparatus. As such, the broadcast modification event may be a sensor-based event detected when the sensor on the first node apparatus detects a change in the environmental condition (such as a change in temperature, humidity, light, etc.) relative to the first node apparatus.

Further still, a system embodiment may have the first node apparatus detecting the broadcast modification event as a combination of at least two from the group consisting of a time-based event, an association-based event, a location-based event, and a sensor-based event.

Specialized Container Node

Figure 39:
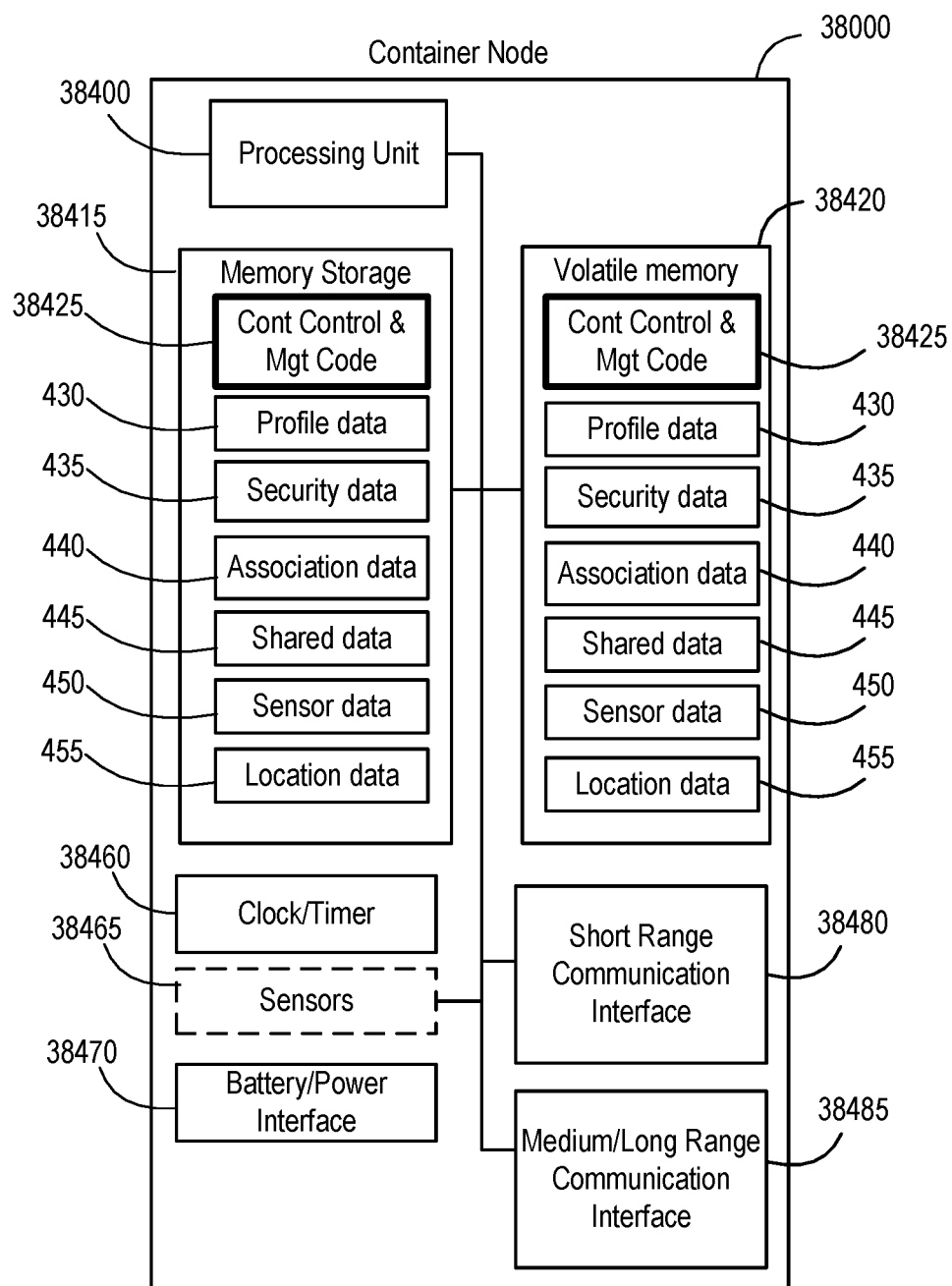
FIG. 39 is a diagram illustrating further details of the exemplary container node deployed within a multi-level wireless node network as shown in FIG. 38 where the network operating environment for the container node includes a package ID node associated with a package, a facility master node associated with a facility, and a server in accordance with an embodiment of the invention.
Figure 40:
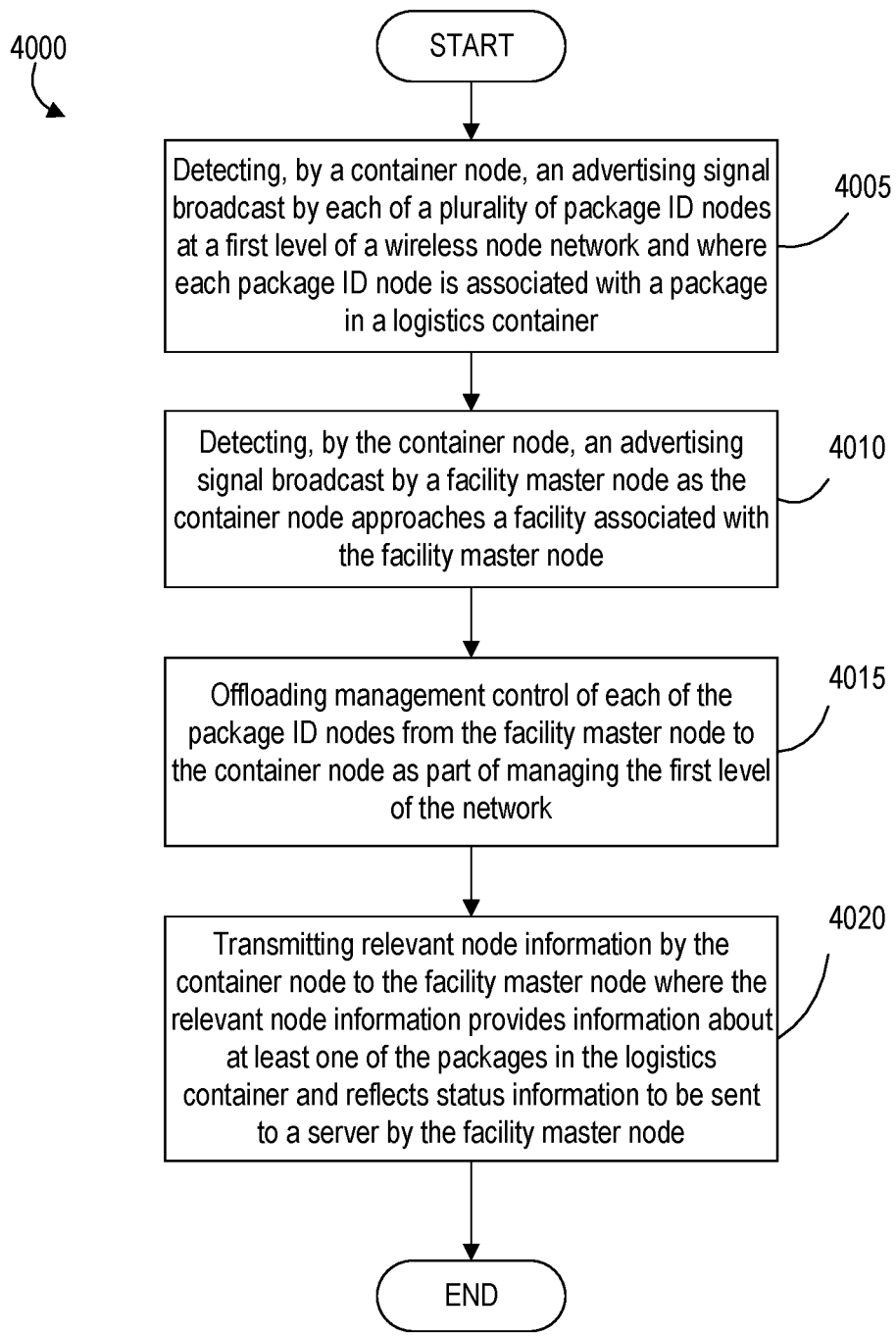
FIG. 40 is a flow diagram illustrating an exemplary method for managing a multi-level wireless node network having a plurality of package ID nodes at a first level of the network, a container node at a second level of the network, a facility master node at a third level of the network, and a server at fourth level of the network in accordance with an embodiment of the invention.

As discussed above, embodiments of different elements of the exemplary wireless node networks allow for deployment of a hierarchical network of elements useful in enhanced shipping operations. Generally, the elements described above fall within a few different hierarchical levels of the networks—namely, with an ID node at a first level of the network and a server at the top level of the network while a master node may be deployed at a middle level of the network. However, in additional embodiments, an enhanced exemplary wireless node network may include a further type of node element integrated with, attached to, or otherwise associated with a type of logistics container (such as a ULD used when transporting items on an aircraft, a trailer capable of being moved by a truck, a train car capable of being moved on a railway system by a locomotive, an intermodal shipping container capable of being moved on at least two different types of transportation modalities, and the like). This further type of node element is generally referred to as a container node. Further embodiments may deploy such a container node to facilitate enhanced system scanning capabilities that leverage off using this type of container node in addition to fixed facility nodes, along with localized scanning, and more intelligent and efficient use of the hierarchy of network elements to accomplish scanning for package ID nodes in order to better handle the congestion issues anticipated. As explained below, FIGS. 37-39 illustrate exemplary systems that deploy one or more container nodes and illustrate further details of an exemplary container node while FIG. 40 illustrates steps from an exemplary method performed by such a container node when operating to help manage at least a part of a multi-level wireless node network.

Figure 37:
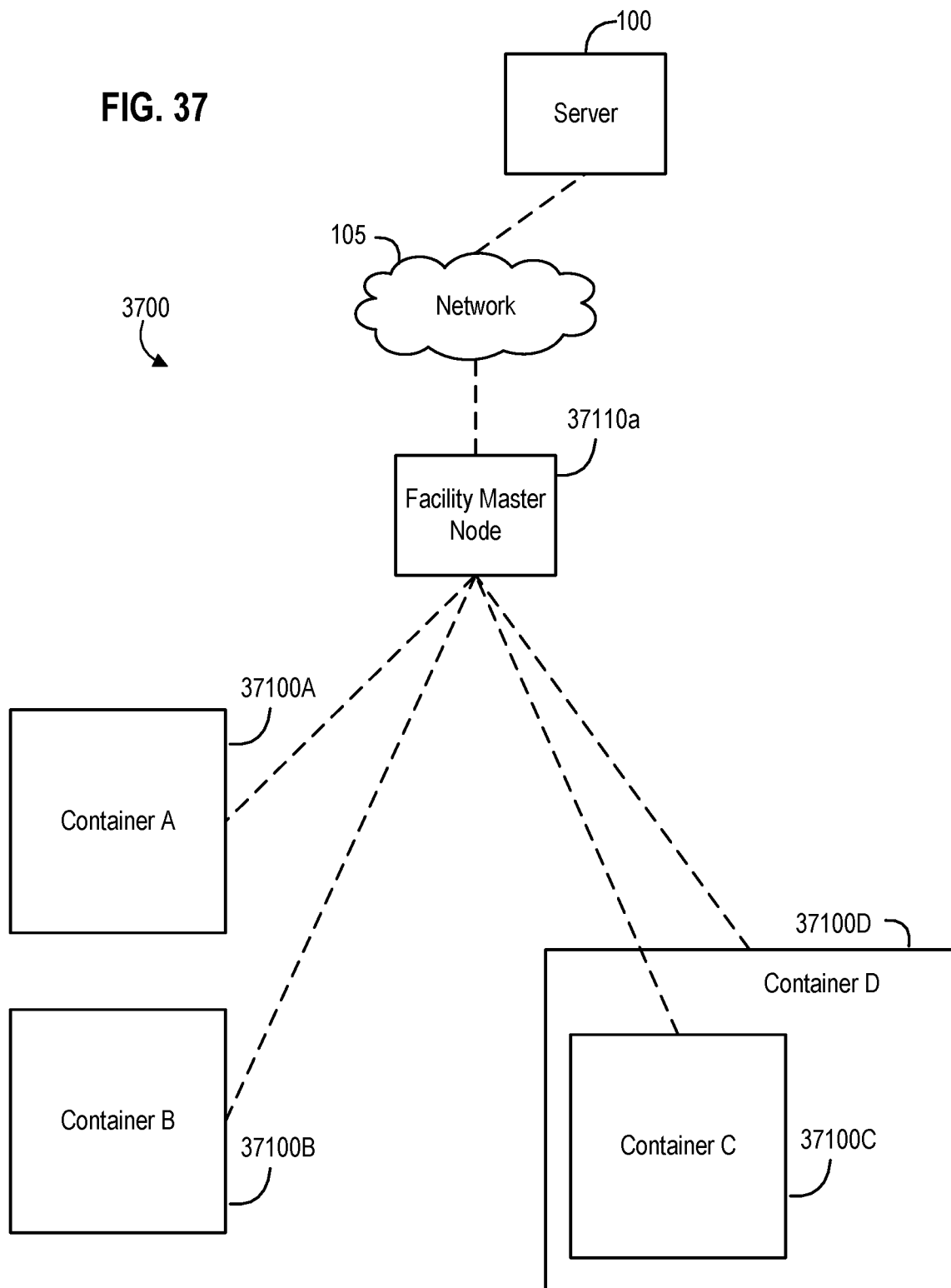
FIG. 37 is a diagram illustrating an exemplary enhanced logistics system for managing a multi-level wireless node network involving a plurality of packages in different containers in accordance with an embodiment of the invention.

In more detail, FIG. 37 is a diagram illustrating an exemplary enhanced logistics system for managing a multi-level wireless node network involving a plurality of packages in different containers in accordance with an embodiment of the invention. Referring now to FIG. 37, exemplary system 3700 is illustrated as including server 100 connected to facility master node 37110a through network 105. Those skilled in the art will appreciate that facility master node 37110a may be similarly constructed and programmed as explained above relative to master node 110a (and as shown in FIG. 4). As shown in FIG. 37, facility master node 37110a is operative to wirelessly communicate with node-based elements within each of container A 37100A, container B 37100B, container C 37100C, and container D 37100D. Containers A and B are shown as being separate and distinct from each other, while containers C and D are shown in a nested relationship. Each of containers A-D typically maintain, at least temporarily, items or packages being shipped or other containers maintaining one or more items or packages. As shown, the containers A-D may be one or more types of logistics containers. In other words, the system 3700 as shown in FIG. 37 may include a homogenous mixture of containers or may be deployed with a diverse heterogeneous mixture of different types of containers that are each node-enabled and operative to communicate with facility master node 37110a through their respective container nodes. And while further details of a particular exemplary container appears in FIG. 38 and further details of the node-based element disposed relative to that container appears in FIG. 39, the principles of such an embodiment of a container node element as disposed and used relative to the particular container may apply to each of containers C and D in their further hierarchy and nested relationship.

As shown in FIG. 37, the container node elements respectively disposed as part of containers A-D may separately communicate internally with node-enabled packages (or other node-enabled containers) respectively maintained therein while also being able to communicate with facility master node 37110a. In this way, the container node element may operate as a node similar to a master node but that needs not know its location, and as such it can provide a further level within the hierarchy to help manage as well as allow for robust and improved ways of to communicate with the facility master node 37110a.

Figure 38:
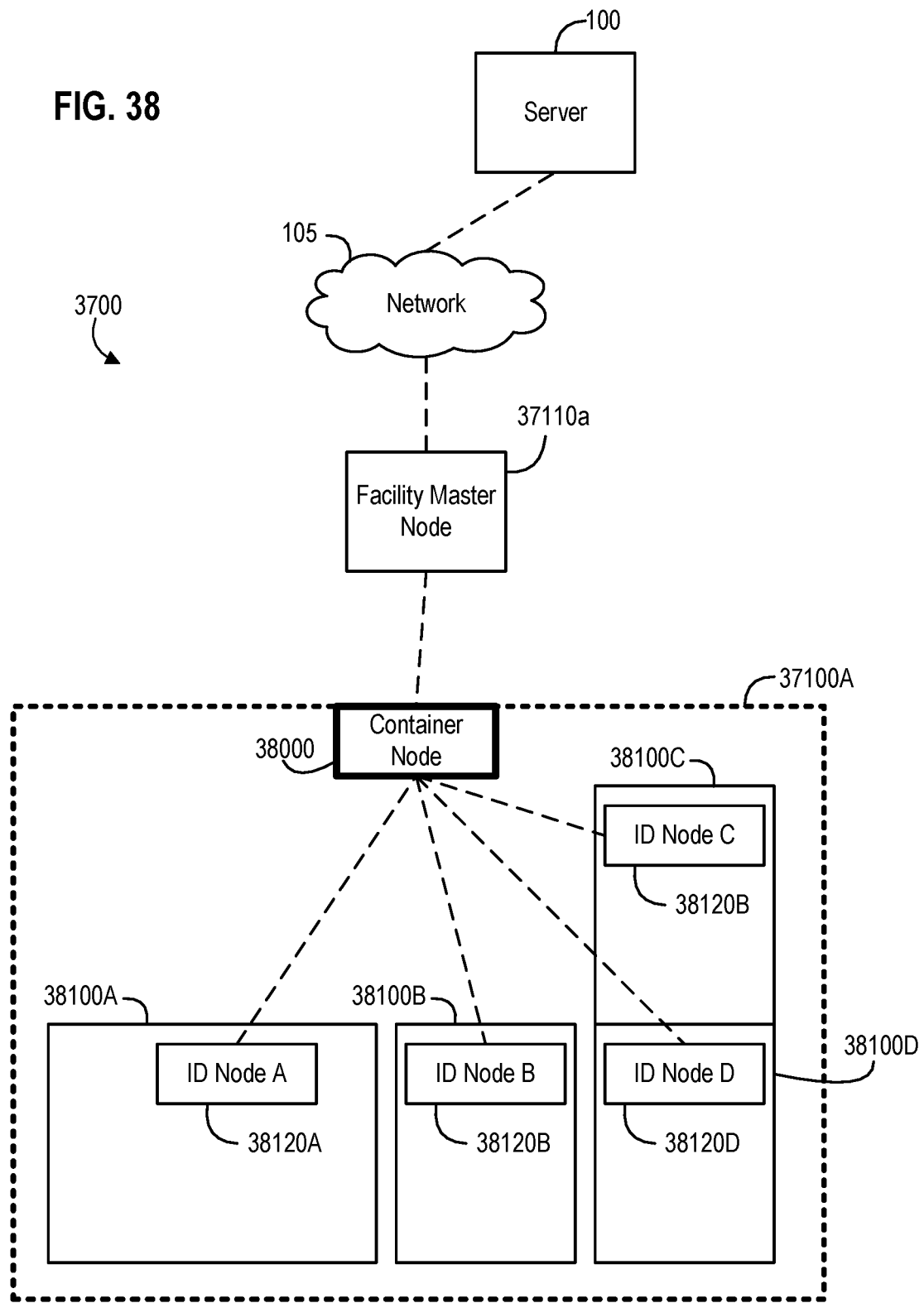
FIG. 38 is a diagram illustrating another exemplary enhanced logistics system for managing a multi-level wireless node network with further details regarding an exemplary container and a related exemplary container node shown with node-enabled packages maintained within the container in accordance with an embodiment of the invention.

FIG. 38 provides further details on an embodiment of system 3700. In particular, FIG. 38 is a diagram illustrating an embodiment of exemplary enhanced logistics system 3700 for managing a multi-level wireless node network with further details regarding exemplary container 37100A and a related exemplary container node 38000 shown with node-enabled packages 38100A-D maintained within the container 37100A in accordance with an embodiment of the invention. Referring now to FIG. 38, container node 38000 is shown as an additional and intermediate node that helps to offload some of the node management responsibility normally incumbent upon facility master node 37110. Container 37100A is shown as at least temporarily maintaining packages 38100A-38100D within an interior of the container 37100A. And as shown in FIG. 38, each of packages 38100A-38100D is a node-enabled package that has a respectively related one of ID nodes 38120A-38120D. In this manner, deployment of an ID node (such as nodes 38120A-38120D) within a package (such as packages 38100A-38100D) allows for monitoring and managing of the package via the related ID node as managed by container node 38000. While the relevant ID node is shown in FIG. 38 as being disposed within an interior of the package, those skilled in the art will appreciate that principles of these container node related embodiments are also applicable if the package ID node is implemented as an ID node incorporated into the packaging material itself or an ID node simply attached to an item being shipped. Thus, for purposes of these container node related embodiments, an exemplary package ID node may be implemented with an ID node placed within a package being shipped, with an ID node attached to the package, with an ID node incorporated into the packaging material of the package (or its internal cushioning material), or with an ID node simply attached to the item being shipped without further physical packaging material.

As shown in FIG. 38, exemplary container node 38000 is typically deployed as a container-centric intermediary node within the multi-level wireless node network system 3700. Embodiments of exemplary container node 38000 may be disposed in a various physical configurations relative to container 37100A. In general, container node 38000 may be disposed and considered part of container 37100A. For example, one embodiment of container node 38000 may be integrated or incorporated into the structure of container 37100A (e.g., built into the structure of container 37100A, such as the ceiling, walls, floor, or doors that provide ingress and egress). Another embodiment of container node 38000 may still be part of the container but be simply attached to the container (e.g., attached to a surface within the interior of container 37100A or attached to a surface on the exterior of container 37100A).

Further embodiments of exemplary container node 38000 may include certain components (e.g., sensors, antennas in communication with ID nodes A-D 38120A-D, etc.) exposed to the internal of the container 37100A while other components (e.g., sensors, antennas in communication with facility master node 37110a) may be exposed to the exterior of the container 37100A to enhance connectivity to internal node elements as well as external node elements. As will be explained in more detail below, enhanced system scanning capabilities may leverage off using this type of exemplary container node 38000 in addition to fixed facility master nodes (such as node 37110a), along with localized scanning and more intelligent & efficient use of the expanded hierarchy of nodes in the network to accomplish scanning for package ID nodes in order to better handle congestion issues with large volumes of packages and package ID nodes being handled in a given facility.

FIG. 39 provides even more detail about components making up an exemplary container node 38000 as an apparatus. In particular, FIG. 39 is a diagram illustrating further details of the exemplary container node 38000 deployed within a multi-level wireless node network 3700 as shown in FIG. 38 where the network operating environment for the container node includes a package ID node associated with a package, a facility master node associated with a facility, and a server in accordance with an embodiment of the invention. Referring now to FIG. 39, those skilled in the art will appreciate that one embodiment of exemplary container node 38000 includes many of the same hardware, code, and data components as shown for exemplary master node 110a of FIG. 4, but simplified so as not to include location circuitry. As such, similar functionality exists for what is numbered the same and described above regarding exemplary master node 110a of FIG. 4. Thus, while master node 110a shown in FIG. 4 includes processing unit 400, memory storage 415, volatile memory 420, clock/timer 460, sensors 465, battery/power interface 470, short range communication interface 475, and medium/long range communication interface 480, exemplary container node 38000 may use similar hardware components as shown in FIG. 39 including processing unit 38400, memory storage 38415, volatile memory 38420, clock/timer 38460, sensors 38465, battery/ power interface 38470, short range communication interface 38475, and medium/long range communication interface 38480.

Notably, one embodiment of exemplary container node 38000 illustrated in FIG. 39 deploys container control and management code 38425 (as stored in memory storage 38415 and loaded for execution by processing unit 38400 in volatile memory 38420), which is similar in functionality to master node control and management code 425 described above in more detail. Essentially, container control and management code 38425 operates similar to that as described above for master node control and management code 425 but further includes program code for enhanced management of package ID nodes and interactions with facility master node as described in more detail below with respect to FIG. 40. Thus, in the illustrated embodiment, such further program code is implemented as an integrated part of container control and management code 38425, such as one or more programmatic functions or additional program modules within code 38425. But in other embodiments, the further program code used to implement the method as described with respect to FIG. 40 may be implemented separately from code 325.

Those skilled in the art will also appreciate that another embodiment of a container node (not shown) may be implemented similar to an ID node, such as ID node 120a as shown and explained relative to FIG. 3, but with the addition of a medium/long range communication interface and use of further program code as part of or in conjunction with node control and management code 325 for enhanced management of package ID nodes when interacting with the package ID nodes and a facility master node as described in more detail below with respect to FIG. 40. Thus, this other type of embodiment of an exemplary container node would still have no location circuitry (as ID node 120a does not typically include such circuitry) but would be able to communicate over the two different communication interfaces for short range communication (e.g., BLE type of low power and short range formatted communications) and longer range communication (e.g., higher power and longer range cellular or Wi-Fi formatted communications). According, those skilled in the art will appreciate that an embodiment of a container node based upon such modifications to a ID node platform essentially works similarly to a master node that either does not know its own fixed location or does not have the ability to self-determine its own location though its own components.

An embodiment of the exemplary control and management code 38425 that provides for enhanced management of package ID nodes via interactions with package ID nodes and a facility master node as described in more detail below with respect to FIG. 40 may also include rules for managing which of its two different communication interfaces to use when communicating with the facility master node. In some embodiments, container node 38000 may have node processing unit communicating with facility master node 37110a over the medium/long range communication interface 38485 because the distance between the facility master node 37110a and container node 38000 may be too far for effective communications using the short range communication interface 38480. As such, range between the nodes may be a factor considered by the processing unit 38400 within container node 38000 when determining how to accomplish communicating with the facility master node 37110a.

However, when the range between the container node 38000 and facility master node 37110a is close enough to where the container node 38000 either interface may be used to established communications with the facility master node 37110a, other factors may be considered when determining which interface on the container node to use, such as relative congestion of data communications on the short range modes of communication versus the longer range mode of communication.

In another embodiment, container node 38000 may depend upon the medium/long range communication interface 38480 when node-to-node communications may not be possible with the short range communication interface 38485. For example, a ULD having a container node may be loaded on an aircraft where the vehicle master node or facility master node may not have an operating short range communication interface (or be implemented with a facility master node at a level in the network between the container node and a server, but where the facility master node implemented in this situation is not equipped with a short range communication interface). As such, container node 38000 is operative to determine which of the communication interfaces to use, and broadcast messages to and received messages from the facility master node using an appropriate one of the two communication interfaces onboard the container node 38000.

In operation, such an exemplary container node 38000 may function in a particularly programmed and collectively unconventional manner to add a further management layer within an exemplary wireless node network. FIG. 40 explains an embodiment of this further with a flow diagram illustrating an exemplary method for managing a multi-level wireless node network having a plurality of package ID nodes at a first level of the network, a container node at a second level of the network, a facility master node at a third level of the network, and a server at fourth level of the network in accordance with an embodiment of the invention. Referring now to FIG. 40, method 4000 begins at step 4005 with a container node detecting an advertising signal broadcast by each of the package ID nodes where the container node is part of a logistics container and each of the package ID nodes are respectively associated with one of a plurality of packages. For example, exemplary container node 38000 may perform step 4005 as shown in FIG. 38 by detecting advertising signals from each of ID nodes A-D 38120A-38120D, which are respectively associated with each of packages 38100A-38100D within container 37100A (which may be temporarily maintained within a mobile or static facility associated with facility master node 37110a). Thus, exemplary container node 38000 may perform step 4005 as a way of dedicated but generally localized scanning specific to the container.

At step 4010, method 4000 continues with the container node detecting an advertising signal broadcast by the facility master node as the container node approaches a facility associated with the facility master node. As such, an embodiment of method 4000 may have the container node at step 4010 detecting an advertising signal broadcast by the facility master node prior to when the container node arrives or is received at the facility associated with the facility master node. This advantageously allows for and facilitates enhanced management operations related to the packages being shipped within the container prior to arrival and reception at the facility.

At step 4015, method 4000 continues with the container node offloading management control of each of the package ID nodes from the facility master node to the container node as part of managing the first level of the network. In a more detail embodiment, offloading management control of each of the package ID nodes may involve distributing scanning responsibility for the package ID nodes from the facility master node to the container node so that the facility master node is not burdened with such scanning responsibility on the first level of the network.

Further still, the management control offloaded to the container node as part of step 4015 may involve various control and managerial tasks to be performed by the container node. For example, the management control offloaded may be controlling a broadcast setting for at least one of the package ID nodes. In particular, such control of the broadcast setting may have the container node identifying a location for the one of the package ID nodes in response to a location request received from the server by the facility master node. In this way, the container node (rather than the facility master node) may interact with one or more of the package ID nodes to determine the location of one of the package ID nodes and free up the facility master node to handle other higher level tasks.

Further still, an embodiment where the container node offloads management control of each of the package ID nodes from the facility master node as part of step 4015 may be implemented in various degrees and, in some cases, depend upon a threshold level of node congestion within a part of the wireless node network normally serviced by the facility master node. For example, if there are less than 10 containers within the facility serviced by the facility master node 3711, the container node 38000 may operate by taking on responsibility for a smaller subset of the tasks normally assigned to the facility master node when monitoring and communicating with package ID nodes (e.g., monitoring status, changing broadcast settings, gathering sensor data, determining relative location information, etc.). Likewise, if there are 10 or more, an embodiment of a container node may operate to offload a larger subset of the overall management control related to the package ID nodes from the facility master node so that the facility master node is less burdened from the relatively large number of containers serviced and monitored.

In a further detailed embodiment, offloading management control may have the container node communicating with each of the package ID nodes as part of monitoring and controlling the package ID nodes, receiving responses from the package ID nodes, and determining relevant node information (such as status information about at least one of the package ID nodes) from the responses received.

At step 4020, method 4000 has the container node transmitting relevant node information to the facility master node, where the relevant node information provides information about at least one of the packages in the logistics container and where the provided information reflects status information to be sent to the server by the facility master node. In this manner, the container node may transmits the result of one or more of the offloaded management control tasks so that the facility master node may make use of such information without the typically incumbent management interaction and control of those nodes at the first level of the network. In a more detailed embodiment, transmitting the relevant node information may further involve formatting a message for transmission using a long range communication interface on the container node (such as communication interface 38485) where the message provides the relevant node information as an update for the server, and then sending the message to the facility master node using the long range communication interface on the container node.

Step 4020 may also be implemented in some embodiments with the transmitted relevant node information providing at least some information on the one of the package ID nodes to be to be forwarded to the server as package ID node update information by the facility master node without requiring the facility master node to directly interact with any of the package ID nodes. The relevant node information in some embodiments may provide information (e.g., one or more of location data, profile data, security data, association data, shared data, and sensor data) about one of the package ID nodes associated with the one of the packages in the logistics container. Such sensor data may be provided as relevant node information, for example, and be or include data collected from a sensor on one of the package ID nodes or, in more detail, where the sensor data relates to at least one condition of the one of the packages as detected by the sensor (such as sensors 38465). Such location data may be provided as relevant node information, for example, and be or include data identifying a location for the one of the package ID nodes in response to a location request passed to the container node from the facility master node.

Further embodiments of method 4000 may provide more detail regarding various steps by leveraging multiple communication interfaces on the container node. For example, in one further embodiment, the container node may adaptively detect the advertising signal broadcast by the facility master node and transmit the relevant node information to the facility master node using one of a plurality of communication interfaces on the container node depending on communication congestion within a part of the wireless node network normally serviced by the facility master node. Thus, which of the communication interfaces may be used by the container node communicating with the facility master node per method 4000 may be done adaptively based on node congestion levels. If the short range communication path is crowded because, for example, the container maintains a large number of broadcasting package ID nodes or there are an unusually large number of containers that collectively maintain such a large number of broadcasting package ID nodes that must communicate over the short range communication path, the container node may adaptively select the medium/long range communication interface and use that for communicating with the facility master node. Likewise, if the short range communication path is relatively clear (e.g., there are only a small number of package ID nodes that may or may not be broadcasting over the short range communication path), the container node may adaptively select the short range communication interface and use that for communicating with the facility master node. Use of the short range versus the long range communication interface may also be according to a profile of rules maintained as part of profile data 430 on container node 38000 where such rules define different situations where one communication interface is preferred over the other. Such a profile of rules may be deployed when selectively or adaptively detecting or transmitting as explained above.

In somewhat similar fashion, in another embodiment, the container node may adaptively detect the advertising signal broadcast by the facility master node and transmit the relevant node information to the facility master node using one of the multiple communication interfaces on the container node depending on the ability of the facility master node to handle communications formatted for the one of the plurality of communication interfaces. For example, facility master node 37110*a* may be disposed at a location or position that is too far and out of range for the short range communication interface 38480 on container node 38000. Thus, facility master node 37110*a* may not be in a position to handle communications from container node 38000 formatted for the short range communication interface 38480 (e.g., BLE formatted communications) but may still be able to hand communications formatted for the medium/long range communication interface 38485 (e.g., Wi-Fi or cellular formatted communications).

In still further embodiments of method 4000, localized scanning may be more specifically implemented as part of step 4005. For example, in one embodiment, the container node may detect the advertising signal broadcast by each of the package ID nodes by localized scanning for each of the package ID nodes proximate to the logistics container using a short range communication interface on the container node (such as short range communication interface 38480 that can communicate over a specific short-range communication path using various types of short-range communication protocols (e.g., a Bluetooth® Low Energy (BLE) protocols, NFC protocols, ultra-wideband impulse radio communication protocols, ZigBee protocols, IEEE 802.15.4 standard communication protocols, and the like). In more detail, localized scanning may be implemented with the communication interface listening for the advertising signal broadcast from within the logistics container or proximate to an exterior of the logistics container.

Method 4000 as explained above focuses on the unconventional and advantageous operation of a container node that helps offload management control from the facility master node. Further embodiments of method 4000 may be implemented when the container node is used with different kinds of logistics container. For example, the logistics container as used in method 4000 may include, but is not limited to a unit load device (ULD) container capable of being transported within an airplane; a trailer capable of being moved by a truck; a train car capable of being moved on a railway system; or an intermodal shipping container capable of being moved on at least two different types of transportation modalities.

Those skilled in the art will appreciate that method 4000 as disclosed and explained above in various embodiments may be implemented on a container node (e.g., container node 38000 attached to a logistics container 37100A used to temporarily maintain items or packages 38100A-38100D) running one or more parts of container node control and management code (e.g., code 38425). Such code may be stored on a non-transitory computer-readable medium, such as memory storage 38415 on container node 38000. Thus, when executing code 38425, the container node's processing unit may be programmatically transformed to become unconventionally operative to perform operations or steps from the exemplary methods disclosed above, including method 4000 and variations of that method.

In more detail, an exemplary container node apparatus may be deployed within a multi-level wireless node network to help manage part of the network, which has at least a package ID node associated with a package, a facility master node associated with a facility, and a server (such as that shown in FIGS. 38 and 39). The container node in this detailed apparatus embodiment includes a node processing unit, a memory storage, and two different communication interfaces. The node processing unit is disposed as at least part of a logistics container—e.g., built as an integrated part of the logistics container, included part of a container node module to which the processing unit is attached or otherwise affixed and disposed relative to the logistics container, and the like. For example, an exemplary module having the container node's processing unit may be disposed as a part of the logistics container in a removable configuration so that the module may be temporarily secured to the logistics container and removed for service or use in another logistics container.

The memory storage and each communication interface are respectively coupled to the node processing unit of the container node. The memory storage is operative non-transitory memory that at least maintains container node management code for execution by the node processing unit (such as container control and management code 38425 as described in more detail above relative to FIGS. 39 and 40). The first communication interface coupled to the node processing unit operates to communicate with the package ID node over a first communication path in accordance with the container node management code. The second communication interface coupled to the node processing unit operates to communicate with the facility master node over a second communication path in accordance with the container node management code. In this manner, consistent with the exemplary container node 38000 as shown in FIG. 38, the container node apparatus is disposed at a level in the multi-level wireless node network between the package ID node and the facility master node.

The node processing unit of the container node operates to execute the container node management code, which then causes the container node apparatus to become specially programmed to help manage and control part of the multi-level wireless node network as the container node perform the steps and operations as described above relative to method 4000 and variations of that method described above that collectively transform the container node apparatus in a non-conventional and innovative manner. More specifically, an embodiment may have the node processing unit of the container node apparatus being operative, when running the container node management code, to specially adapt the container node apparatus to become operative to detect, via the first communication interface, an advertising signal broadcast by the package ID node; detect, via the second communication interface, an advertising signal broadcast by the facility master node as the logistics container approaches the facility associated with the facility master node; control, via the first communication interface, the package ID node as part of managing the first level of the network and without direct communications between the package ID node and the facility master node to offload management responsibility for the package ID node from the facility master node; and cause the second communication interface to transmit relevant node information by the container node to the facility master node, where the relevant node information provides information about the package and reflects status information to be forwarded as an update to the server by the facility master node (which may be implemented as a mobile master node associated with a mobile facility capable of temporarily maintaining the logistics container).

Further embodiments of such a container node may interact with the package ID node through the first communication interface to offload management responsibility for the package ID node from the facility master node in various ways that delegate managing this first level of the network. For example, the node processing unit may be operative to control, via the first communication interface, the package ID node by being further operative to (a) communicate with the package ID node as part of monitoring and controlling the package ID node at least as the logistics container approaches the facility (e.g., prior to arrival at the facility or receipt at the facility) or as the logistics container remains within the facility; (b) receive, through the first communication interface, a message from the package ID node; and (c) determine relevant node information from the response. This relevant node information would include at least status information about the package ID node and provides at least some information on the package ID node to be forwarded to the server as package ID node update information by the facility master node without requiring the facility master node to directly interact with the package ID node.

In another example of offloading management responsibility, the node processing unit may be able use the first communication interface to control the package ID node by being further operative to send the package ID node a control message through the first communication interface, where the control message adjusts a broadcast setting for the package ID node. In this situation, the control message may be part of identifying a location of the package ID node in response to a location request received from the server by the facility master node and forwarded to the node processing unit over the second communication interface.

In yet another embodiment with further details on offloading management responsibility, the node processing unit may use the first communication interface to control the package ID node (instead of having the facility master node responsible for controlling the package ID node directly) based upon a threshold level of node congestion within a part of the wireless node network normally serviced by the facility master node.

In still further embodiments of the container node apparatus, different types of relevant node information may transmitted by the container node to the facility master node. For example, an embodiment may have the relevant node information providing information about the package ID node via at least one of location data, profile data, security data, association data, shared data, and sensor data. Such sensor data may include data collected from a sensor on the package ID node (wherein the sensor data relates to at least one condition of the package). Additionally, such location data may identify a location for the package ID node in response to a location request passed to the container node from the facility master node. Thus, various types of data may be used in embodiments as the relevant node information to be transmitted to the facility master node.

In some embodiments, detecting signals from the package ID node may be implemented with localized scanning. In particular, the node processing unit may be operative to use the first communication interface to detect the advertising signal broadcast by the package ID node by causing the first communication interface to conduct localized scanning proximate to the logistics container, and cause the second communication interface to transmit a message with the relevant node information gathered from the localized scanning. In more detail, such localized scanning proximate to the logistics container may have the node processing unit being further operative to command the first communication interface to listen for the advertising signal broadcast from the package ID node located within the logistics container or located proximate to an exterior of the logistics container. In such a way, the node processing unit of the container node may help manage the first level of the network by being responsible for scanning for the package ID node instead of having the facility master node scanning for the package ID node.

Further embodiments of the container node apparatus may be used with different kinds of logistics containers. For example, the logistics container may include, but is not limited to a unit load device (ULD) container capable of being transported within an airplane; a trailer capable of being moved by a truck; a train car capable of being moved on a railway system; or an intermodal shipping container capable of being moved on at least two different types of transportation modalities.

Additional embodiments of the container node apparatus may deploy rules for the node processing unit on what interface to use when communicating with the facility master node. For example, the node processing unit may be operative to detect the advertising signal broadcast by the facility master node by communicating with the facility master node over one of the first communication path and the second communication path depending on communication congestion within a part of the wireless node network normally serviced by the facility master node or depending on the ability of the facility master node to handle communications formatted for the one of the plurality of communication interfaces. The existing congestion level relative to particular communication paths may be gauged in order for the container node to apply such communication rules on how it may effectively communicate with the facility master node. Likewise, rules on communication ranges or confirmed communication links for particular paths may be used when applying such rules and using an appropriate communication interface on the container node to communicate with the facility master node.

In light of the above discussion relative to an exemplary container node apparatus (as shown in FIGS. 38 and 39) and methods where such an exemplary container node may be deployed to interact with a multi-level network to help manage at least part of the network (as explained via the flowchart shown in FIG. 40), a further system embodiment may be described with reference to FIGS. 38-40. In particular, an exemplary enhanced logistics system for managing a multi-level wireless node network involving a plurality of packages may be described as follows. The exemplary system embodiment may include a server, a facility master node, a container node, and a plurality of package ID nodes respectively associated one of the packages. The server is disposed at a top level of the multi-level wireless node network and maintains information on additional node elements of the multi-level wireless node network. The facility master node, which is associated with a facility that can temporarily maintain the packages, is disposed at a second level of the multi-level wireless node network and deployed in operative communication with the server. The container node is disposed at a third level of the multi-level wireless node network and is deployed as part of a logistics container that currently maintains the plurality of packages (such as an integral, fixed, or removable part of the logistics container). The container node includes a long range communication interface providing access to a long range communication path and a short range communication interface providing access to a short range communication path distinct from the long range communication path. As such, the container node is in operative communication with at least the facility master node over the long range communication path using the long range communication interface. The package ID nodes are disposed at a fourth level of the multi-level wireless node network where each of the package ID nodes are respectively associated with one of the plurality of packages currently maintained with the logistics container as mentioned above. Each of the package ID nodes is in operative communication with the container node over the short range communication path via the short range communication interface of the container node.

As part of this exemplary enhanced systems embodiment, as the container node enters the facility associated with the facility master node (such as prior to when the container node has arrived or been received at the facility), the container node may operate to offload management responsibility for each of the package ID nodes from the facility master node when the container node uses the short range communication interface to control each of the package ID nodes without direct communication between the package ID node and the facility master node. In this way, the facility master node is not responsible for directly communicating with each of the package ID nodes. Further, the container node may also operate in the same situation to use the long range communication interface to transmit relevant node information to the facility master node. Such relevant node information is generally information about at least one of the packages that is gathered by the container node from at least one of the package ID nodes. Such relevant node information also reflects status information on at least one of the packages to be forwarded as an update by the facility master node to the server.

Controlling a package ID node is a way the system's container node may offload management responsibility from the facility master node. The container node may use the short range communication interface to control each of the package ID nodes by being further operative to send each of the package ID nodes a control message through the short range communication interface (e.g., via a BLE formatted short range wireless message), where the control message adjusts a broadcast setting for the respective package ID node. For example, the control message may be part of identifying a location of at least one of the package ID nodes in response to a location request received from the server by the facility master node and forwarded to the container node over the long range communication interface. As such, the control message from the container node may instruct the respective package ID node to vary its broadcast output power level as part of a locating technique deployed to locate the package ID node.

Further system embodiments may have the relevant node information providing information about the one of the package ID nodes, and further include at least one of location data, profile data, security data, association data, shared data, and sensor data related to the particular package ID node. Such sensor data may, for example, include data collected from a sensor on the one of the package ID nodes (where the sensor data may relate to at least one condition of the one of the packages—e.g., temperature, light, humidity/moisture, pressure, impact/shock, and the like related to an environment condition experienced by the particular package). And such location data, for example, may identify a location for the one of the package ID nodes in response to a location request passed to the container node from the facility master node.

The system's container node may also, in some embodiments, offload management responsibility for the package ID nodes from the facility master node when at least a threshold level of node communication congestion exists within a part of the wireless node network normally managed directly by the facility master node. For example, the container node may measure a level of node communication activity via one or both of its communication interfaces to establish a level of node communication congestion experienced by the facility master node. If the measured level exceeds a threshold level, the container node may be activated to further offload management and interactive tasks relating to the package ID nodes maintained within the container node's logistics container.

Further still, the system's container node may, in some embodiments, offload management responsibility by conducting localized scanning via the short range communication interface proximate to the logistics container to detect an advertising signal broadcast by each of the package ID nodes. In a further embodiment, the container node may conduct localized scanning via the short range communication interface proximate to the logistics container by using the short range communication interface to listen for the advertising signal broadcast from each of the package ID nodes located within the logistics container or located proximate to an exterior of the logistics container (e.g., as the logistics container is being loaded or unloaded and the package with the package ID node is not yet inside the container or has been unloaded to just outside the container). Thus, the system's container node may deploy its short range communication interface to accomplish interacting and interfacing with package ID nodes rather than have the facility master node be directly responsible for them. Stated another way, the system's container node may be responsible for using its short range communication interface to scan for each of the package ID nodes as part of managing the fourth level of the multi-level wireless node network while avoiding the overloading the facility master node with congested scanning responsibilities related to the plurality of package ID nodes and additional node devices in the wireless node network.

As with the container node embodiments and method embodiments described above, the container node in the exemplary enhanced system embodiment may be used with different kinds of logistics containers. For example, the logistics container may include, but is not limited to a unit load device (ULD) container capable of being transported within an airplane; a trailer capable of being moved by a truck; a train car capable of being moved on a railway system; or an intermodal shipping container capable of being moved on at least two different types of transportation modalities. Those skilled in the art will appreciate that use of the term "container" need not be a simple box-like structure, but itself may include a defined holding area on a transport or conveyance responsible for shipping items within the holding area (e.g., packaged items that have a package ID node that may be scanned by a container node attached to the transport or conveyance in or near the relevant holding area).

Additionally, the facility master node involved in this system embodiment may be associated with a mobile facility (as opposed to a fixed or stationary facility) that is capable of temporarily maintaining the logistics container. Example of such a mobile facility may be an airborne cargo hold capable of temporarily maintaining multiple ULD containers and having a mobile master node (such as airborne mobile master node 9415 shown in FIG. 21).

Those skilled in the art will appreciate that, in light of the details described above, other system embodiments may be deployed with fewer elements than described above. For example, a broader system embodiment may include the container node as described above along with a facility master node. The container node and facility master node in such an embodiment may operate and interoperate as described above, but the system embodiment need not necessarily include the package ID nodes being scanned or the server. Still another system embodiment may include the facility master node, container node, and at least one package ID node as described above without the explicit inclusion of a server at the top level of the network as an additionally required element of the particular system embodiment. Likewise, yet another system embodiment may include a server, facility master node, and container node as explicitly recited elements and as described above as operating and interoperating. Thus, the package ID nodes may not be expressly included as elements in this system embodiment, but the recited container node in the system would still operate to help manage those components on the lower level of the network.

Proactive Movement Notification Using Detectors on a Container Node

As explained above relative to FIGS. 38 and 39, a container node may be deployed with a logistics container at one level of a wireless node network and used to help manage at least a portion of the network. However, a further embodiment of a container node may be deployed with particular hardware and software components used to sense movements relative to the container and respond to such detected movement in various ways as part of the wireless node network. For example, this type of aspect may have an exemplary container node using an accelerometer or other type of movement or motion sensor (e.g., an inertial type of device) to detect movement and respond by notifying other network elements (e.g., package ID nodes, facility master nodes, server, and the like) regarding such movement or altering a broadcast profile based on the movement. In such an example, if the container is sensed as staying put or coming to rest, relevant nodes associated with the container may not need to broadcast frequently or may go into a "sleep" mode until movement is detected and only then start broadcasting again.

Figure 41:
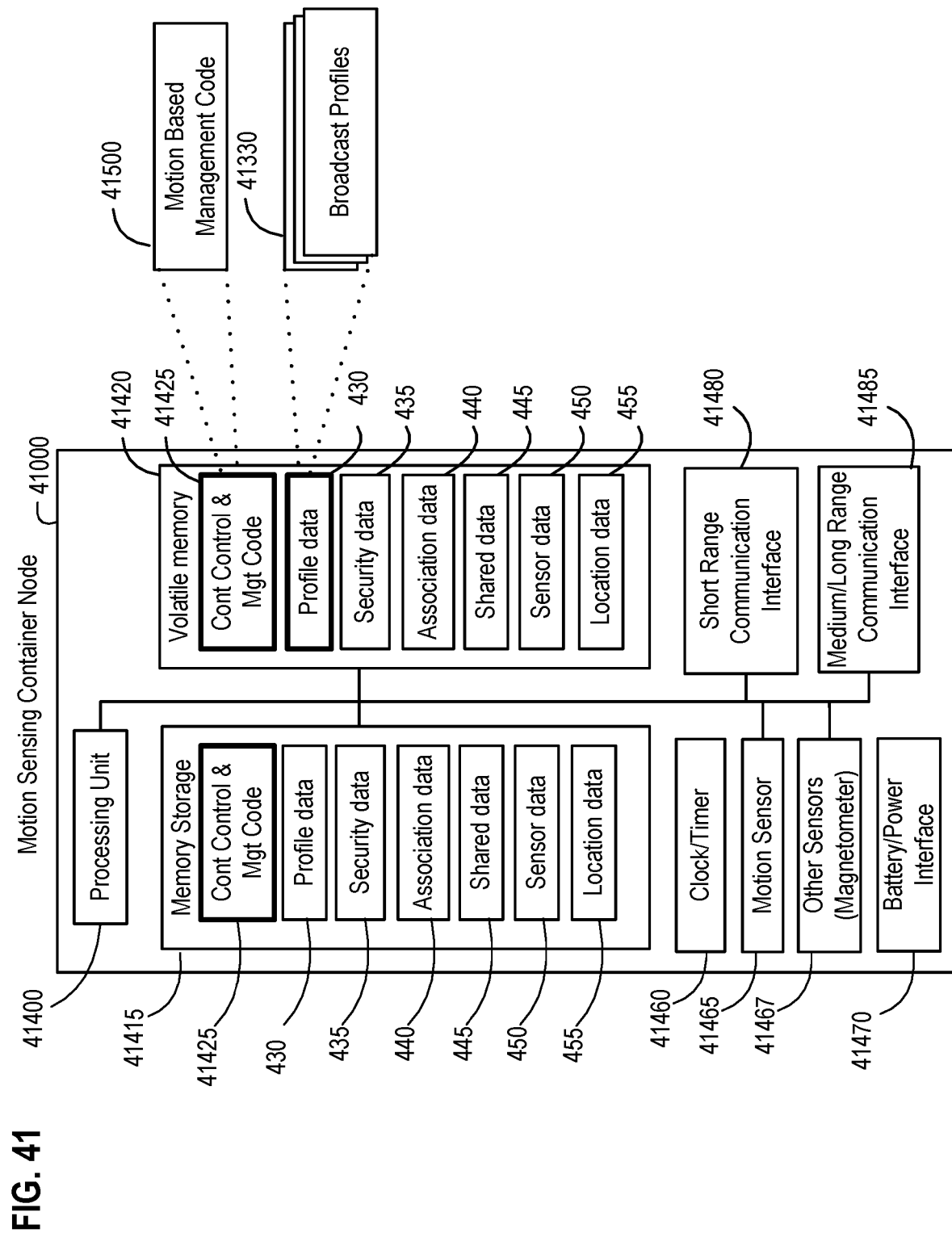
FIG. 41 is a diagram illustrating an exemplary motion sensing container node in accordance with an embodiment of the invention.

FIG. 41 is a diagram illustrating an exemplary motion sensing container node in accordance with an embodiment of the invention. Referring now to FIG. 41, exemplary motion sensing container node 41000 is shown similar to container node 38000 (which was earlier described as being similar in some embodiments to a master node of FIG. 4 without location circuitry). More specifically, those skilled in the art will appreciate that one embodiment of exemplary container node 41000 includes many of the same hardware, code, and data components as shown for exemplary master node 110*a* of FIG. 4, but simplified so as not to include location circuitry, as well as to that of exemplary container node 38000 illustrated in FIG. 39. As such, similar functionality exists for what is numbered the same or similarly and described above regarding exemplary master node 110*a* and exemplary container node 38000. Thus, while master node 110*a* shown in FIG. 4 is described as having processing unit 400, memory storage 415, volatile memory 420, clock/timer 460, sensors 465, battery/power interface 470, short range communication interface 475, and medium/long range communication interface 480, exemplary container node 38000 may use similar hardware components as shown in FIG. 39. This includes processing unit 38400, memory storage 38415, volatile memory 38420, clock/timer 38460, sensors 38465, battery/power interface 38470, short range communication interface 38475, and medium/long range communication interface 38480. Likewise, exemplary motion sensing container node 41000 may use similar use similar hardware components as shown in FIG. 41 including processing unit 41400, memory storage 41415, volatile memory 41420, clock/timer 41460, battery/power interface 41470, short range communication interface 38475, and medium/long range communication interface 41480.

Further, the embodiment of exemplary container node 41000 illustrated in FIG. 41 deploys container control and management code 41425 (as stored in memory storage 41415 and loaded for execution by processing unit 41400 in volatile memory 41420), which is similar in functionality to container control and management code 38425 as well as master node control and management code 425 described above in more detail. Such code, as previously described, generally controls the behavior of the node relating to communications (with a node advertise and query logic manager), information management (with an information control and exchange manager), power management (with a node power manager that interacts with the various communication interfaces, for example, to manage power consumption and broadcast power aspects at a low level), and association management (with an association manager). As such, container control and management code 41425 essentially operates similar to that as described above for container node control and management code 38425 (and master node control management code 425 but without the need for a location aware/capture module) but further includes motion-based management program code 41500 for motion-based management of a logistics container as described in more detail below with respect to the method described relative to FIG. 43. Thus, an embodiment of motion-based management program code 41500 may be implemented as an integrated part of container control and management code 41425, such as one or more programmatic functions or additional program modules that may be called within code 41425. However, in other embodiments, the motion-based management program code 41500 used to implement the method as described with respect to FIG. 43 may be implemented separately from code 41425 in a way that allows code 41500 to call some of the programmatic functions or program modules described as part of code 425 to implement the steps as laid out in the method of FIG. 43 and variations of that method as described herein.

In general, exemplary motion-based management code 41500 adapts container node 41000 such that the node detects motion-based events and responds in a way that intelligently alters a broadcast profile that is being currently used by the container node 41000. An exemplary broadcast profile may include a collection of one or more operating parameters used by the container node 41000 when broadcasting over one of the communication interfaces 41480, 41485. Such operating parameters, for example, may include parameters related to a broadcast output power level to use when communicating with other nodes or the frequency with which the relevant communication interface broadcasts (or whether it is to remain silent for a set duration). In some embodiments, a single broadcast profile for node 41000 may be maintained as part of profile data 460. In other embodiments, such as that shown in FIG. 41, container node 41000 maintains multiple broadcast profiles 41330 resident in profile data 460 of memories 41420/41415. Typically, motion-based management code 41500 determines which communication profile to use (e.g., indoor broadcast profile, congested landscape broadcast profile, an outdoor broadcast profile, an airborne broadcast profile, and the like), and the selected communication profile from broadcast profiles 41330 may then be altered accordingly in response to motion-based events as described in more detail below. Those skilled in the art will appreciate that the availability of multiple different broadcast profiles to use allows for a proactive selection of a desired communication profile to fit with a particular type of node operating environment.

As a measuring front end component for such motion-based management involving a logistics container, exemplary motion sensing container node 41000 includes various sensors, such as motion sensor 41465 as a sensor or detector with one or more sensing elements that can collectively detect a motion status relative to that which it is attached (e.g., a logistics container or part thereof). An exemplary implementation of motion sensor 41465 (or other sensors 41467) may include additional hardware (e.g., local sensor memory, battery backup, multiplexing hardware interfaces when using multiple sensing elements) and/or program/firmware features to manage the collection, storage, and sharing of the captured motion-related sensor data (such as motion status information). In some embodiments, motion sensor 41465 may be implemented with several types of motion sensors or motion/movement detectors, such as an inertial sensor, a shock detector, an accelerometer, a microelectromechanical (MEMS) sensor, and the like. And while sensor 41465 is explicitly shown in FIG. 41 as a motion sensor, those skilled in the art will appreciate that an embodiment of container node 41000 may also include other types of sensors or detectors 41467, such as one or more magnetic sensors (e.g., a magnetometer, gyroscopic sensor, etc.), electronic sensors (e.g., a voltage sensor, current sensor, electronic power sensor, etc.), and environmental sensors (e.g., pressure, light, temperature, humidity, magnetic field, altitude, attitude, orientation, proximity, etc.).

Figure 42:
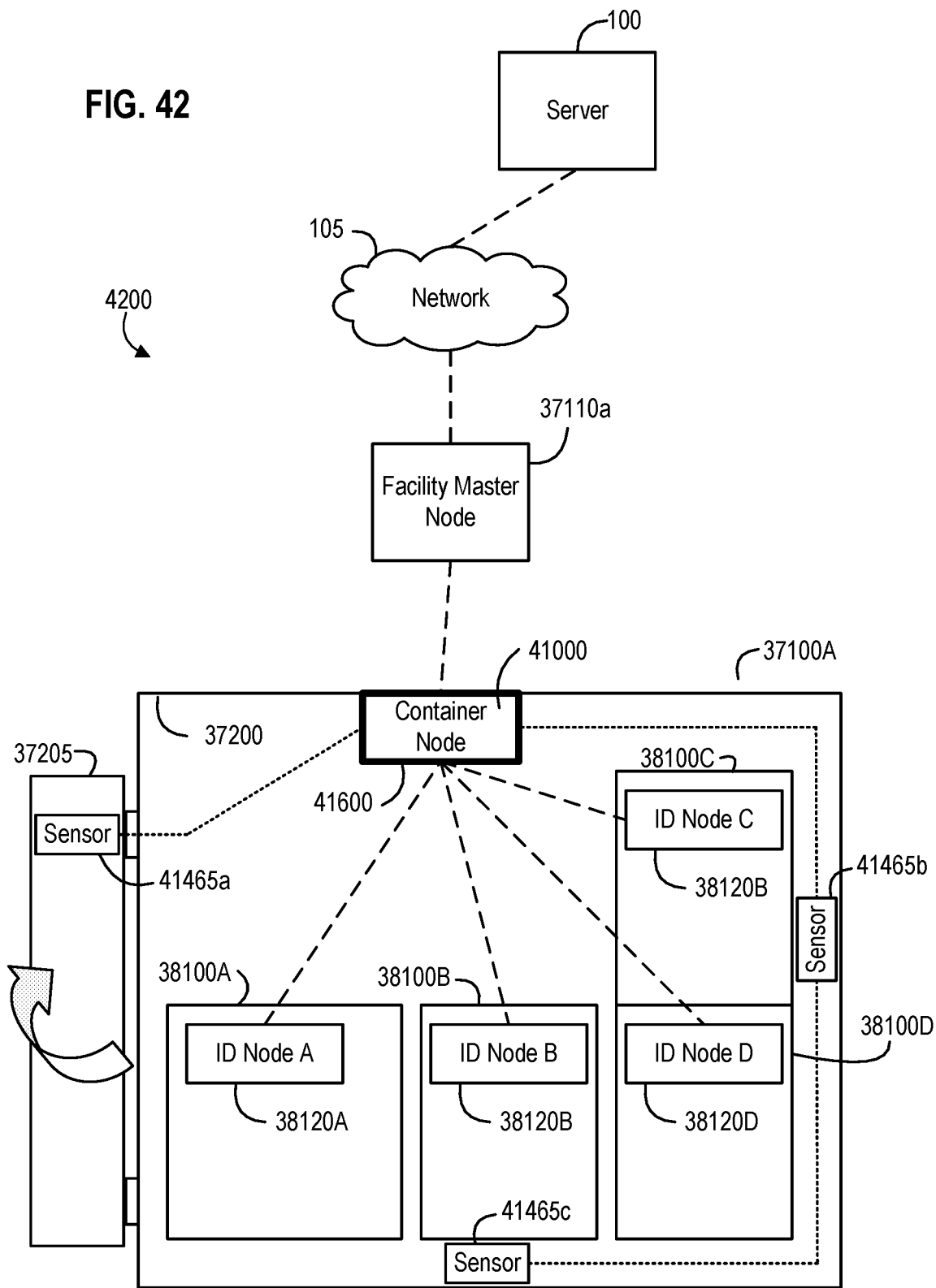
FIG. 42 is a diagram illustrating an exemplary motion-based management system for a logistics container that uses an exemplary motion sensing container node in accordance with an embodiment of the invention.

Exemplary container node 41000 as shown in FIG. 41 may be deployed alone or as part of various system embodiments providing node-implemented motion-based management of a logistics container, such as that shown in FIG. 42. In particular, FIG. 42 is a diagram illustrating an exemplary motion-based management system 4200 for an exemplary logistics container 37110A that uses an exemplary motion sensing container node 41000 in accordance with an embodiment of the invention. Referring now to FIG. 42, container node 41000 is shown attached to logistics container 37100A.

In general, the illustrated embodiment of logistics container 37100A is a box-like container made with a structural housing 37200 surrounding and defining an interior storage area within the housing 37200 capable of maintaining multiple items and/or packages. The container's door 37205 generally secures the interior storage area when in a closed position relative to the housing 37200 and provides access to the interior storage area through an opening or entrance when in an open position relative to the housing 37200. In the illustrated embodiment of FIG. 42, door 37205 is movably coupled to the housing portion via a set of one or more hinges as part of the door 37205 and attached to the housing 37200. Other embodiments of container 37100A may have different types of doors or other movable panels that may be configured to secure the interior storage area of a container.

The exemplary motion-sensing container node 41000 shown in FIG. 42 (and shown in greater detail in FIG. 41) is disposed as part of system 4200 and has an exterior housing 41600 that contains and protects the electronic hardware and components of the node 41000 (such as those shown in FIG. 41). As such, the housing 41600 of motion-sensing container node 41000 may be fixed or removably held in an attached position relative to the logistics container 31700A. In more detail, an embodiment the housing 41600 of motion-sensing container node 41000 may be disposed entirely within the housing 37200 of container 31700A, while another embodiment may have the housing 41600 of motion-sensing container node 41000 attached to the logistics container in such a manner where a portion of the housing 41600 for node 41000 is exposed to the interior storage area defined within housing 37200 of container 37100A while another portion of housing 41600 is exposed outside of the container 37100A. For example, an embodiment of node 41000 may use a 41600 housing that allows for one or more antennas of the node 41000 to be exposed outside of the container 37100A while allowing for one or more sensors (such as motion sensing elements 41465a-41465c that collectively implement an exemplary motion sensor 41465 as shown in FIG. 41) of the node 41000 to be exposed and deployed within the interior storage area of the container 37100A.

Within housing 41600, the exemplary motion-sensing container node 41000 includes at least a node processing unit (such as unit 41400) and a memory storage (such as memory storage 41415 and/or volatile memory 41420). The memory storage and the node processing unit are typically disposed within the housing 41600. The memory storage is coupled to the node processing unit and maintains at least motion-based management code (such as motion based management code 41500) for execution by the node processing unit 41400 and a broadcast profile (such as at least one of broadcast profiles 41330) defining at least one operational communication parameter for the container node 41000. The container node 41000 further includes at least a communication interface coupled to the node processing unit 41400 and operative to communicate with a second node over a communication path in accordance with the broadcast profile maintained in the memory storage. Those skilled in the art will appreciate that the communication interface may include transceiver hardware and firmware suitable for transmitting and receiving relevant messages in a format and paradigm corresponding to the communication path used to communicate with the second node.

As noted above, node 41000 further includes a motion sensor coupled to the node processing unit, where the motion sensor operates to detect a motion status of the logistics container and report the detected motion status to the node processing unit. Such a motion status may include, depending on the implementation, a moving status, a stationary status, an accelerating status, and/or a decelerating status of the logistics container. For example, if logistics container 31700A is being moved, but is on a transport or conveyance that is slowing down, one or more of motion sensors 41465a-c as shown in FIG. 42 will detect a decelerating motion status for container 31700A and report this to the node processing unit within container node 41000. In another example, where door 37205 is being opened, motion sensor 41465a sense movement of the door 37205 and will report a moving status (e.g., logistics container door movement) to the node processing unit as the detected motion status of the container 31700A.

In general, the motion sensing container node collectively operates to provide information about the container's motion status back to the container node's processing unit so that such information may be used to alter how the container node communicates with other nodes within a wireless node network (such as package ID nodes or master nodes). In particular, the node processing unit 41400 of node 41000, when executing the motion-based management code 41500 maintained on the memory storage 41415/41420, becomes specially programmed and thus operative to perform a series of unconventional and innovative functions as part of monitoring and reporting on the logistics container's motion status. Specifically, an embodiment of processing unit 41400 becomes operative, under control of at least the motion-based management code 41500, to receive the detected motion status from the motion sensor; store the detected motion status in the memory storage as a first motion status for the logistics container (e.g., stored as part of sensor data 450); receive a subsequent detected motion status from the motion sensor; compare the subsequent detected motion status to the first detected motion status for the logistics container; identify a changed motion condition for the logistics container based upon the comparison of the subsequent detected motion status and the first detected motion status; alter one or more operational communication parameters defined in the broadcast profile based upon the identified changed motion condition; and causing the communication interface to communicate with the second node in accordance with the altered operational communication parameter. Thus, an embodiment of exemplary container node 41000 has enhanced motion-based functionality to adapt how it communicates based on detection of the container's motion status.

The broadcast profile maintained on the memory storage may be implemented as one of several communication mode profiles (such as one of broadcast profiles 41330). As such, each of the communication mode profiles may define respectively different variations of the operational communication parameter used by the relevant communication interface on the container node when broadcasting a signal in an attempt to communicate with the second node. For example, revising an operational communication parameter may involve changing broadcast profiles such that an exemplary container node with a ULD container may essentially choose a "sleep/stationary" broadcast profile that broadcasts less frequently over a "moving" broadcast profile that may broadcast more frequently given a changed motion condition identified by the container node related to the ULD's motion status. However, in an embodiment using a single broadcast profile, an exemplary embodiment having a container node within a ULD container may be enabled to alter its broadcast profile by revising an operational communication parameter to broadcast less frequently when stationary or broadcast more frequently when moving given the changed motion condition identified by the container node related to the ULD's motion status.

In a more detailed embodiment, the node processing unit may alter the operational communication parameter by revising the operational communication parameter of the broadcast profile stored in the memory storage, where the revised operational communication parameter relates to how the container node communicates with the second node in accordance with the identified changed motion condition for the logistics container. Such a second node, in this more detailed embodiment, may be implemented with a server (e.g., server 100) managing a wireless node network that includes the container node apparatus; a facility master node (e.g., facility master node 37110*a*) managing the container node and in communication with a server managing a wireless node network that includes the container node apparatus and the facility master node; and/or a package ID node (e.g., ID node A 38120A) associated with a package maintained within the logistics container.

In even more detail, the revised operational communication parameter of the broadcast profile may be implemented in an embodiment to change a power level of a signal broadcast by the communication interface. In other embodiments, the revised operational communication parameter of the broadcast profile may change how frequently the node processing unit causes the communication interface to communicate with the second node. For example, when the changed motion condition indicates the logistics container is at least stationary or decelerating, the revised operational communication parameter of the broadcast profile may decrease how frequently the node processing unit causes the communication interface to communicate with the second node. In another example, after (a) the changed motion condition previously indicated the logistics container was stationary or decelerating and (b) a current changed motion condition indicates the logistics container is now moving or accelerating, the node processing unit may change the revised operational communication parameter to increase how frequently the container node communicates with the second node. And in yet another example, when the changed motion condition indicates the logistics container is at least one of moving or accelerating, the revised operational communication parameter of the broadcast profile may increase how frequently the node processing unit causes the communication interface to communicate with the second node. Thus, various embodiments may be deployed to adaptively change how the container node communicates with other nodes and based upon different types of changed motion conditions.

In a further embodiment, the communication interface on the container node apparatus may respond to input or instructions from the node processing unit by transmitting a message to the second node where the message is related to the changed motion condition of the logistics container. In this further embodiment, the second node may be implemented with at least one or a server, a master node, and a package ID node associated with a package maintained within the logistics container. Further still, the communication interface may be implemented as a long range interface (e.g., medium/long range communication interface 41485) operative to provide access to a server as the second node or a short range interface (e.g., short range communication interface 41480) operative to provide access to a package ID node as the second node, where such a package ID node is associated with a package maintained within the logistics container (e.g., such as package ID Node A 38120A associated with package 38100A maintained within logistics container 37100A).

When the communication interface is implemented as the short range interface (such as short range communication interface 41480 that may communicate using BLE formatted signals), the node processing unit may be further operative to cause the short range interface to transmit a control message to the package ID node. Such a control message may provide instructional input to the package ID node that alters operation of the package ID node based upon the identified changed motion condition of the logistics container. Thus, detected motion status related to the container may be used by multiple nodes to change not only the communication operation of the container node attached to the logistics container, but also to a package ID node within a package maintained with the same logistics container.

As shown in FIGS. 42 and 41 and described above, exemplary motion-sensing container node 41000 may be operational as an apparatus itself in an embodiment where the node is attached to a logistics container, such as container 37100A. FIGS. 41 and 42 also illustrate a further embodiment that focuses on using exemplary motion-sensing container node 41000 as a component of an exemplary motion sensing container apparatus. Such an embodiment of an exemplary motion sensing container apparatus generally includes both a logistics container (e.g., container 37100A) and a container node (e.g., node 41000) together where the container node is attached to the logistics container (e.g., fixed to, integrated as part of, or temporarily mounted to the container).

In this container apparatus embodiment, the logistics container maintains a plurality of packages (e.g., packages 38100A-38100D) within a housing portion having an opening that may be secured by a door portion movably coupled to the housing portion. In particular, the housing defines an interior storage area capable of maintaining the packages. The door secures the interior storage area when in a closed position relative to the housing, and provides access through the opening to the interior storage area when the door is in an open position relative to the housing.

An exemplary logistics container may be in a variety of forms in this container apparatus embodiment. For example, the logistics container may, in more detail, be implemented using a ULD container that may be specially designed and configured to be shipped on aircraft; an intermodal shipping container that is, for example, specially outfitted to be transported on a container ship and be transferred as a loaded unit for further transport on another mode of transportation (e.g., via railway or highway conveyance); a trailer that may be designed to be pulled behind a truck; a delivery vehicle that may be loaded and from which deliveries are made over land, air, and water; a secure drop box logistics receptacle; and a secure locker container. Each of such exemplary types of logistics container may be exposed to different motion stimulus, which may allow for a highly tuned and adaptive way of altering how an exemplary container node attached to or associated with the container may autonomously operate to change a communication profile when communicating with other nodes.

The exemplary container node attached to such a logistics container as part of this motion-sensing container apparatus embodiment may be a first node in a wireless node network. Consistent with what is explained above with respect to exemplary container node 41000, the container node in the motion-sensing container apparatus embodiment includes at least a motion sensor that detects a motion status of the logistics container, and a communication interface operative to allow the container node to communicate with a second node in the wireless node network in accordance with the container node's motion-dependent broadcast profile based upon the motion status detected by the motion sensor.

In more detail, the motion sensor in such a motion-sensing container apparatus embodiment may be implemented with different types of motion sensors, such as an inertial sensor, a shock detector, an accelerometer, and a microelectromechanical (MEMS) sensor. The detected motion status from the motion sensor in this apparatus embodiment may include a moving status, a stationary status, an accelerating status, and/or a decelerating status of the container.

The motion sensor in such a motion-sensing container apparatus embodiment may also be implemented with one or more similar or differing motion sensing elements. Thus, when the exemplary motion sensor in this container apparatus embodiment uses multiple sensing elements, at least one of the motion sensing elements may deployed relative to the door portion of the logistics container to sense movement of the door portion (such as when logistics personnel or other personnel open or close the door). Motion-based detection of access to within the logistics container (based on one of the motion sensing elements attached to the container's door in one embodiment) provides a self-detected stimulus that can be advantageously used by the container apparatus' container node to at least change how it broadcasts.

Further embodiments may have one of the motion sensing elements deployed to sense movement of the door in more specific ways. For example, various embodiments of such a motion sensing element may be implemented as an inertial sensor sensitive to inertial motion of the door; an optical sensor sensitive to light from outside the logistics container when the door is in the open position; a proximity sensor sensitive to a detected distance to the door so that opening the door results in a different detected distance to the door; an infrared sensor sensitive to motion of the door portion; a microwave sensor sensitive to motion of the door; an ultrasonic sensor sensitive to motion of the door; or an image sensor operative to capture image information over time of the door and, based upon analysis of the captured image over time, to detect motion of the door.

As noted above, the communication interface of the motion-sensing container apparatus embodiment's container node allows the container node to communicate via the motion-dependent broadcast profile with a second node. Examples of such a second node may include a server (e.g., server 100 as shown in FIG. 42) managing the wireless node network that includes the container node; a facility master node (e.g., facility master node 37110*a* as shown in FIG. 42) managing the container node and in communication with a server managing the wireless node network that includes the container node and the facility master node; or a package ID node (e.g., ID node A 38120A associated with package 38100A as shown in FIG. 42) associated with at least one of the packages maintained within the interior storage area of the logistics container.

Further embodiments of the motion-sensing container apparatus include more details of the motion-dependent broadcast profile. For example, the motion-dependent broadcast profile may be implemented as an operational node profile that changes how frequently the communication interface communicates with the second node based upon the motion status detected by the motion sensor. In another example, the motion-dependent broadcast profile may be implemented to decrease how frequently the communication interface communicates with the second node when the motion status detected by the motion sensor indicates the logistics container is at least one of stationary or decelerating. Furthermore, the motion-dependent broadcast profile may be implemented to increase how frequently the communication interface communicates with the second node when the motion status detected by the motion sensor indicates the logistics container is at least one of moving or accelerating. And in yet another embodiment, the motion-dependent broadcast profile may be implemented so as to change a power level of a signal broadcast by the communication interface based upon the motion status detected by the motion sensor.

The container node's communication interface in the motion sensing container apparatus may also take different forms in various embodiments. In one embodiment, the communication interface comprises a long range interface (such as medium/long range communication interface 41485) operative to provide access to a server as the second node. Such a long range interface may provide such access via a longer range communication protocol, such as with communications using Wi-Fi or cellular formats. However, in another embodiment, the communication interface may be a short range interface (such as short range communication interface 41480) operative to provide access to a package ID node as the second node, where the package ID node is associated with at least one of the packages maintained within the interior storage area of the logistics container. In more detail, such an embodiment of the short range interface may transmit a control message to the package ID node according to a short range communication protocol (such as BLE) based upon the motion status detected by the motion sensor in accordance with the motion-dependent broadcast profile. As such, the control message may provide an instructional input or command to the package ID node so as to alter operation of the package ID node.

The exemplary container node may also be deployed as a component in an exemplary motion-based management system for a logistics container maintaining a plurality of packages within the logistics container. This exemplary system embodiment essentially includes a plurality of package ID nodes and a container node associated with the logistics container. Each of the package ID nodes (e.g., ID nodes A-D 38120A-D) is associated with a different one of the packages (e.g., packages 38100A-D) maintained within the logistics container. The container node in this system embodiment comprises at least a motion sensor and a communication interface. The motion sensor of the container node operates to detect a motion status of the logistics container, while the communication interface operates to allow the container node to communicate with at least one of the package ID nodes in accordance with a motion-dependent broadcast profile based upon the motion status detected by the motion sensor. Thus, this particular system embodiment focuses on the hierarchy of a motion-sensitive container node and the package ID nodes as disposed within a logistics container.

In this systems embodiment, the motion sensor may be configured similar to that described above relative to the motion-sensing container apparatus embodiment where the detected motion status for the logistics container may be at least one of a moving status, a stationary status, an accelerating status, and a decelerating status. In particular, such a motion sensor of the container node may be implemented as, for example, an inertial sensor, a shock detector, an accelerometer, and a microelectromechanical (MEMS) sensor. And such a motion sensor may be implemented with one sensing element or multiple sensing elements. In one embodiment where at least one of the motion sensing elements is deployed relative to an access door on the logistics container to sense movement of the access door, the motion sensor may detect the motion status by detecting movement from the door-deployed sensing element(s). Such motion sensing element or elements deployed to sense movement of the access door may, for example be implemented as at least one of an inertial sensor sensitive to inertial motion of the access door; an optical sensor sensitive to light from outside the logistics container when the access door is in the open position; a proximity sensor sensitive to a detected distance to the access door; an infrared sensor sensitive to motion of the access door; a microwave sensor sensitive to motion of the access door; an ultrasonic sensor sensitive to motion of the access door, and an image sensor operative to capture image information over time of the access door to detect motion of the access door.

Further embodiments of the motion-based management system may include more details of the motion-dependent broadcast profile. For example, the motion-dependent broadcast profile in such a system embodiment may be implemented as an operational node profile that can change how frequently the communication interface communicates with one of the package ID nodes based upon the motion status detected by the motion sensor. In another example, the motion-dependent broadcast profile in such a system embodiment may decrease how frequently the communication interface communicates with one of the package ID nodes when the motion status detected by the motion sensor indicates the logistics container is at least one of stationary or decelerating. In still another example, the motion-dependent broadcast profile may increase how frequently the communication interface communicates with one of the package ID nodes when the motion status detected by the motion sensor indicates the logistics container is at least one of moving or accelerating. Additionally, a further embodiment may have the container node being operative to transmit a control message to one of the package ID nodes based upon the motion status detected by the motion sensor in accordance with the motion-dependent broadcast profile. Such a control message provide instructional input to the package ID node so as to alter the operation of the package ID node (e.g., having the package ID node shift to a "sleep" mode to converse battery life while the system's container node detects a stationary motion status).

Further embodiments of the motion-based management system may also include more details of the communication interface on the system's container node. For example, the communication interface may also be operative to allow the container node to communicate with a higher level node apparatus (in addition to communicating with a package ID node). This may be implemented with two different communication interfaces (such as interfaces 41480 and 41485); with a single communication interface that logically includes one interface to communicate with a package ID node and another interface to communicate with the higher level node apparatus (such as a facility master node); or a single communication interface that may communicate with both a package ID node and the higher level node apparatus over the same communication path (e.g., using BLE communications for container node's interface 41480 to communicate with both ID node A 38120A and facility master node 37110a when container node 41000 and facility master node 37110a are close enough for such communications).

Further embodiments of this motion-based management system for a logistics container may also provide more detailed implementations on the motion-dependent broadcast profile of the system's container node. For example, the motion-dependent broadcast profile may change a power level of a signal broadcast by the communication interface based upon the motion status detected by the motion sensor. In another example, the motion-dependent broadcast profile of the system's container node may also change how frequently the communication interface communicates with the higher level node apparatus based upon the motion status detected by the motion sensor (e.g., may decrease how frequently the communication interface communicates with the higher level node apparatus when the motion status detected by the motion sensor indicates the logistics container is at least one of stationary or decelerating or may increase how frequently the communication interface communicates with the higher level node apparatus when the motion status detected by the motion sensor indicates the logistics container is at least one of moving or accelerating.

A further embodiment may implement the higher level node apparatus with a server in direct communication with the container node via the communication interface. Another embodiment may implement the higher level node apparatus with a facility master node in direct communication with the container node via the communication interface, where the facility master node is managed by a server on a still higher level of the network. Thus, the communication interface recited in the system's container node may be implemented to communicate with various types of higher level node apparatus devices.

Expanding further, additional embodiments of an exemplary motion-based management system as explained above may expressly include a server in direct communication with the container node via the communication interface and/or a facility master node in direct communication with the container node via the communication interface, where the facility master node is also in communication with a server and managed by the server.

Figure 43:
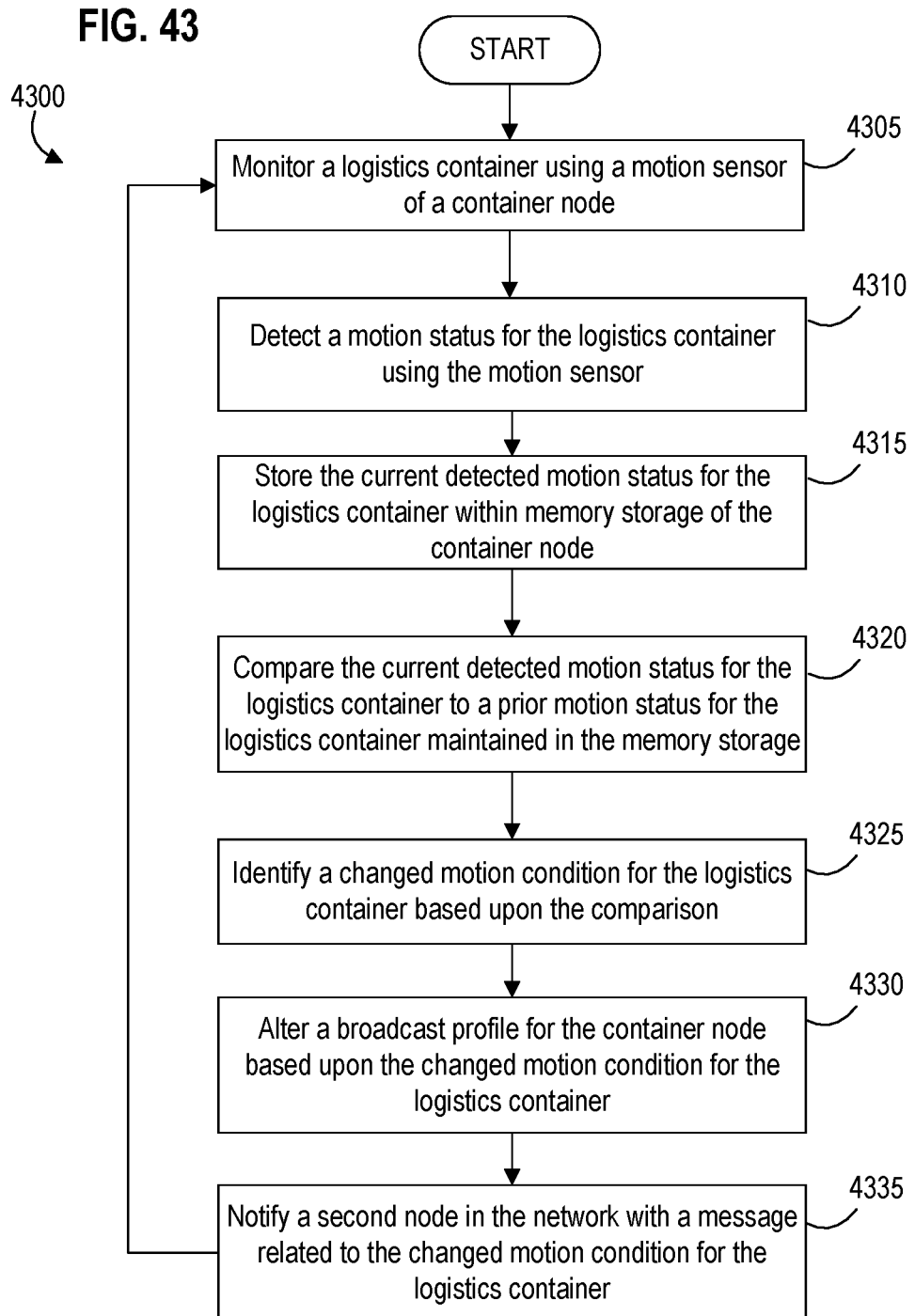
FIG. 43 is a flow diagram illustrating an exemplary method for motion-based management of a logistics container in accordance with an embodiment of the invention.

As described above, an exemplary container node (such as node 41000 illustrated in FIGS. 41 and 42) may operate as a component in various apparatus as well as more complex systems of components that implement devices used for motion-based management of a logistics container. FIG. 43 is a flow diagram illustrating an exemplary method more explicitly focused on the operation of such an exemplary container node when performing motion-based management of a logistics container in accordance with an embodiment of the invention. Referring now to FIG. 43, exemplary method 4300 begins at step 4305 with monitoring the logistics container using a motion sensor of the container node. More detailed embodiments may implement the motion sensor used in step 4305 with, for example, an inertial sensor, a shock detector, an accelerometer, or a microelectromechanical (MEMS) sensor. Such a motion sensor, as noted previously, may comprise one or multiple sensing elements (of the same type of sensing element or of a diverse mixture of different types of sensing elements suitable for the particular part of the logistics container being monitored).

At step 4310, method 4300 continues with detecting a motion status for the logistics container by the container node's motion sensor. Such a motion status may be reflected a movement detected (or no longer detected) to indicate and reflect a moving status, a stationary status, an accelerating status, or a decelerating status for the logistics container. In a more detailed embodiment where at least one sensing element is attached to a door portion of the logistics container to sense movement of the door portion, the motion sensor may detects the motion status by detecting movement from at least the door related sensing element.

At step 4315, method 4300 stores the current detected motion status for the logistics container within memory storage of the container node. For example, node processing unit 41400 may store the current detected motion status information received from motion sensor 41465 as part of sensor data 450 within its memory structures (e.g., memory storage 41415 and/or volatile memory 41420) as well as prior motion status information for the logistics from previous movement events related to the logistics container detected with the motion sensor. In another example, the motion sensor itself may implement a type of memory storage that is operative to locally store the current detected motion status information as well as prior motion status information.

At step 4320, method 4300 proceeds to have the container node comparing the detected motion status to a prior motion status for the logistics container maintained in the memory storage of the container node. This may, for example, be performed by the container node's processing unit (e.g., unit 41400). However, in another embodiment, this step may be performed locally within a motion sensor that may implement a local type of memory storage, as noted above, and have onboard logic that can locally compare different detected motion-related information (e.g., measurement values commensurate and corresponding to movement experienced by the logistics container).

At step 4325, method 4300 continues with the container node identifying a changed motion condition for the logistics container based upon the comparison of the detected motion status and the prior motion status. In a more detail embodiment of step 4325, when the current detected motion status information changes by a threshold amount when compared to a prior motion status information, then the container node may identify a changed motion condition (which will depend upon the particular currently detected motion status and the prior detected motion status). For example, logistics container 31700A may initially be stationary, but may be picked up and placed on a moving conveyor system. The container node 41000 attached to logistics container 31700A may compare (as part of an example of step 4325) a detected motion status related to the container (i.e., a moving status reflected by the motion sensor 41465 on container node 41000) to a previously detected and prior motion status for the same container (i.e., a stationary status reflected by the same motion sensor 41465).

At step 4330, method 4300 proceeds with altering a broadcast profile for the container node based upon the changed motion condition for the logistics container. In this particular way, the container node and its various components may operate according to method 4300 to yield a technical result that autonomously has the container node responsively changing aspects of its own broadcast profile using its own motion-based monitoring without relying upon a higher level node or server to cause such changes. In a further embodiment of step 4330, method 4300 may have the container node revising at least one parameter of the broadcast profile to change how the container node communicates with a second node (such as a server managing a wireless node network that includes the container node; a facility master node managing the container node and in communication with a server managing a wireless node network that includes the container node and the facility master node; or a package ID node associated with a package maintained within the logistics container). The revised parameter may, in some embodiments, change how frequently the container node communicates with the second node based upon the revised parameter of the broadcast profile. For example, the revised parameter may cause the container node to decrease how frequently the container node communicates with the second node when the changed motion condition indicates the logistics container is at least one of stationary or decelerating. In more detail, the revised parameter may cause the container node to increase how frequently the container node communicates with the second node after the changed motion condition previously indicated the logistics container is at least one of stationary or decelerating but a current changed motion condition indicates the logistics container is at least one of moving or accelerating. In still another example, the revised parameter may cause the container node to increase how frequently the container node communicates with the second node when the changed motion condition indicates the logistics container is at least one of moving or accelerating. And in yet another example, the revised parameter may cause the container node to change a power level of a signal broadcast by the container node based upon the revised parameter of the broadcast profile.

As previously described with respect to other above-described embodiments, further embodiments of step 4330 in method 4300 may involve more than one stored broadcast or communication mode profiles (e.g., such as broadcast profiles 41330). As such, altering the broadcast profile may be implemented in such an embodiment by selecting from multiple communication mode profiles (e.g., broadcast profiles 41330) based upon the changed motion condition when the container node identifies the changed motion condition. Each of the communication mode profiles defines a different set of operational parameters used by the container node when broadcasts a signal in an attempt to communicate with a second node, such as parameters that may be used when the container is airborne, when the container is being unloaded, and other logistics-oriented situations.

An embodiment of method 4300 may proceed directly from step 4330 back to step 4305 to begin monitoring again for another movement type of event (e.g., a drop, shock, impact, vibration, acceleration, deceleration, door opening, door closing, movement, or simply a lack of movement). However, a further embodiment of method 4300 may, at step 4335, have the container node notify a second node in a wireless node network (e.g., a server, a master node, and/or a package ID node associated with a package maintained within the logistics container) with a message related to the changed motion condition of the logistics container before proceeding back to step 4305.

In more detail, another embodiment of method 4300 may have the container node operating to specifically transmit a control message to a package ID node associated with a package maintained within the logistics container. The control message provides, in this embodiment, instructional input (e.g., commands, data, or other relevant operational information) to the package ID node that changes a communication profile for the package ID node relative to the identified changed motion condition of the logistics container. Thus, an expanded method 4300 may leverage the container node as both altering its own broadcast profile but also being able to alter a communication profile for one or more of the package ID nodes being managed by the container node and as disposed within packages maintained within the logistics container.

While FIGS. 37, 38, and 42 describe aspects of an exemplary logistics container 37100A that may be accessible by a door or other re-sealable or opening/closing structure so as to seal off the interior of the container, FIGS. 44-53 illustrate aspects of another type of logistics container that may also be used with an exemplary container node as described above. In general, the type of logistics container described in FIGS. 44-53 involves a node-enhanced base platform that supports packages and/or unpackaged items being transported and a cover for the base platform. Collectively as an assembled unit, the node-enhanced base and cover hold and maintain packages together in a secure manner. Such a two-part container essentially functions similar to a ULD type of logistics container in that both types of container hold and maintain packages for transport. However, as discussed in more detail below, this alternative type of logistics container (i.e., a base platform type of logistics container) may use a particular type of container node with further sensors on it.

Figure 44:
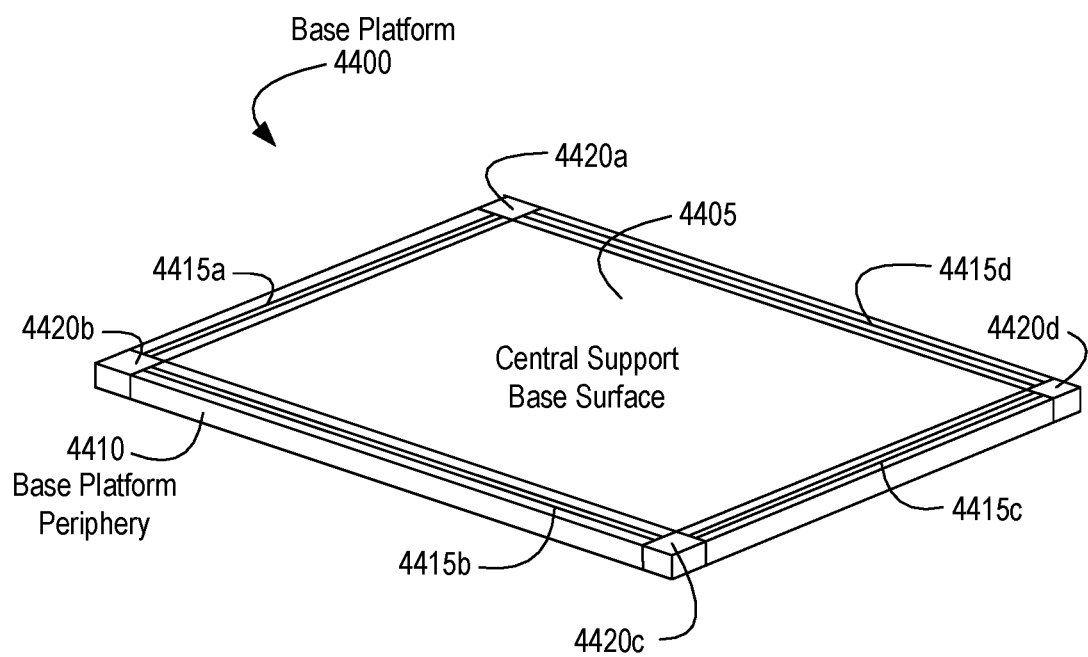
FIG. 44 is a diagram illustrating an exemplary base platform used as part of an alternative embodiment of a logistics container in accordance with an embodiment of the invention.

In more detail, FIG. 44 is a diagram illustrating an exemplary base platform used as part of an alternative embodiment of a logistics container in accordance with an embodiment of the invention. Referring now to FIG. 44, exemplary base platform 4400 is illustrated in perspective to show a central support surface 4405 surrounded by rail type of edge structure 4410 on the periphery of the base platform 4400. As explained further and shown in FIGS. 52 and 53, the base platform 4400 (via its central support surface 4405) is capable of supporting multiple packages via its central support surface 4405. In one embodiment, the central support surface 4405 may be implemented as a rigid skid such that the rail structure 4410 is disposed along its periphery as a foundation to which multiple base attachment points may be installed and deployed. Further embodiments of base platform 4400 may be implemented as pallet-based platforms that may be configured to nest or stack, and made from a variety of materials (e.g., metal, wood, plastic, etc.) of sufficient strength to support what is targeted to be shipped on its central support surface while allowing for base attachment points along its periphery that mate with parts of a cover (e.g., grommet-lined edges of a cargo net or connection clips used at dispersed points of the cover's edge).

The exemplary rail edge structure 4410 is shown having respective channels 4415a-4415d within its rail structure between each of the corners 4420a-4420d. The channels 4415a-4415d essentially provide a grooved slot-like location outside the central support base surface 4405 and near the periphery of the base platform. In this embodiment, it is within such channels 4415a-4415d where base attachment points may be mounted in various ways (such as those shown in FIGS. 48-49) and where an exemplary container node may be mounted (as shown in more detail in FIGS. 45, 50 and 51). In other embodiments, the rail structure itself may incorporate integrated base attachment points (such as eye-like holding points shown in FIGS. 48-49). Likewise, in other embodiments, the container node may be integrated as part of the base platform itself.

Figure 45:
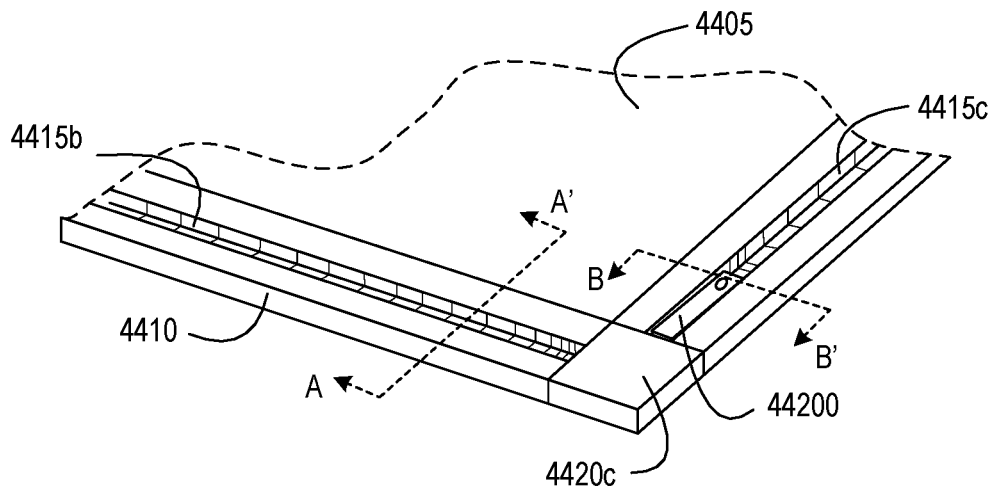
FIG. 45 is a close up diagram illustrating further details of a corner of the exemplary base platform shown in FIG. 44 in accordance with an embodiment of the invention.

FIG. 45 is a close up diagram illustrating further details of a corner of the exemplary base platform 4400 shown in FIG. 44 in accordance with an embodiment of the invention. Referring now to FIG. 45, the rail edge structure 4410 on the periphery of the base platform 4400 shows where an exemplary container node 44200 may be attached within one of the channels 4415c. In some embodiments, the entire container node 44200 (including all sensors and antennas) is localized to a small single location within a part of the base platform (such as being attached within channel 4415c next to corner 4420c). However, in other embodiments, container node 44200 may be deployed having a central housing located and attached to one part of the base platform (e.g., within channel 4415c next to corner 4420c) and multiple sensors and/or antenna elements dispersed at other parts of the base platform 4400. For example, an embodiment of container node 44200 may have one or more sensors and/or one or more antenna elements that may be, for example, disposed within each of channels 4415a-4415c, disposed proximate each of corners 4420a-4420c, and/or integrated into the central support base surface 4405 so as to provide a more robust reception field relative to the base platform 4400 capable of localizing signals nearby (e.g., within node-enabled packages supported by surface 4405).

As deployed relative to base platform 4400, exemplary container node 44200 is used as a node in a wireless node network of devices (similar to container node 4100 within the wireless node network of devices shown in FIG. 42). Container node 44200 (as shown on FIGS. 45, 50 and 51) is similarly configured to exemplary container node 41000 (as shown and explained relative to FIG. 41) and has at least a motion sensor and a communication interface. The motion sensor of node 44200 (similar to motion sensor 41465 of node 41000) may have one or more sensing elements and operates to detect a motion status of the logistics container made up of the base platform and a cover secured in place relative to the platform. The communication interface that operates to allow the container node 44200 to communicate with a second node in the wireless node network in accordance with a motion-dependent broadcast profile (such as one or more of broadcast profiles 41330) based upon the motion status detected by the motion sensor of node 44200 (e.g., whether the container using base platform 4400 is detected as having a moving status, a stationary status, an accelerating status, or a decelerating status).

As noted with container node 41000, exemplary container node 44200 may also include further sensors (such as the other sensors 41467 described with node 41000 shown in FIG. 41) that are operatively coupled to the node's processing unit. Thus, in one embodiment, container node 44200 may include a magnetometer type of additional sensor (e.g., sensor 41467) that measures a magnetic field strength proximate the logistics container (i.e., the combined base platform and its secured cover). In such an embodiment, the communication interface may also allow the wireless container node to communicate with the second node in accordance with the motion-dependent broadcast profile further based upon the measured magnetic field strength. Stated another way in more detail, the container node may communicate with the second node via the communication interface in accordance with the motion-dependent broadcast profile and further based upon a change in magnetic field strength as measured by the magnetometer over a period of time. Thus, an embodiment of container node 44200 that deploys a magnetometer in addition to the motion sensor provides a type of motion and magnetic sensing container apparatus that is autonomously responsive to movement (via detected acceleration) and changes in the magnetic field exposed to the container.

Figure 46:
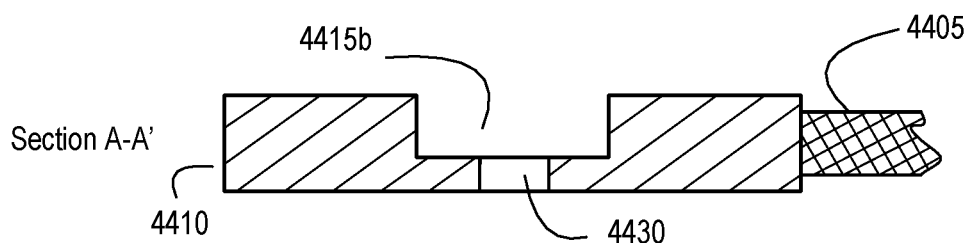
FIG. 46 is a diagram illustrating a cross-sectional view of a first exemplary type of periphery edge piece from the exemplary base platform shown in FIG. 44 in accordance with an embodiment of the invention.
Figure 47:
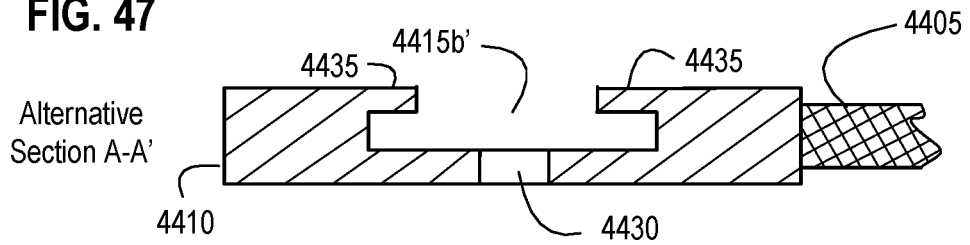
FIG. 47 is a diagram illustrating a cross-sectional view of a second exemplary type of periphery edge piece from the exemplary base platform shown in FIG. 44 in accordance with an embodiment of the invention.

FIGS. 46 and 47 show different configurations for typical channels in the base platform's rail structured periphery. In particular, FIG. 46 is a diagram illustrating a cross-sectional view of a first exemplary type of periphery edge piece from the exemplary base platform shown in FIG. 44 in accordance with an embodiment of the invention. Referring now to FIG. 46, the illustrated A-A' sectional view relative to FIG. 45 is shown in cross-section with channel 4415b as a straight slot-like channel structure that has periodically disposed holes 4430 through the bottom of the channel 4415b. FIG. 47 shows a cross-sectional view of a second exemplary configuration for periphery edge structure 4410 where the channel 4415b' is configured with a retaining style slot channel structure with periodically disposed holes 4430 through the bottom of channel 4415b'. Such a retaining style slot channel structure includes captive overhanging flanges 4435 that operate to hold items placed within the channel 4415b'.

Figure 48:
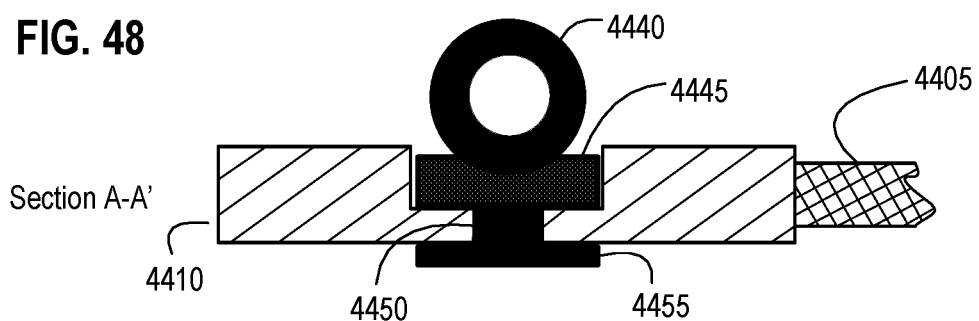
FIG. 48 is a diagram illustrating a cross-sectional view of an exemplary base attachment point used with the first exemplary type of periphery edge piece from the exemplary base platform shown in FIG. 46 in accordance with an embodiment of the invention.
Figure 49:
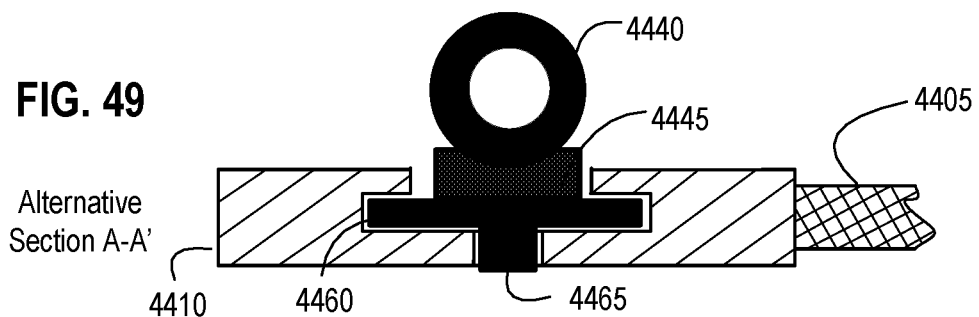
FIG. 49 is a diagram illustrating a cross-sectional view of another exemplary base attachment point used with the second exemplary type of periphery edge piece from the exemplary base platform shown in FIG. 47 in accordance with an embodiment of the invention.

In general, the channels on periphery 4410 allow for insertable base attachment points (e.g., movable eye structures that may be selectively secured in place) to be used along the periphery 44100 so that a cover may be secured in place with such attachment points. FIGS. 48 and 49 show different configurations of exemplary base attachment points as disposed and attached relative to these different configurations of channels 4415b, 4415b' of base platform 4400. For example, FIG. 48 shows a cross-sectional view of an exemplary base attachment point as mated to channel 4415b as shown in FIG. 46. This embodiment of exemplary base attachment point is shown with an eyelet 4440 and base 4445 that fit within channel 4415b. Attached to base 4445 is a post 4450 and securing hardware 4455 that allow post 4450 to be kept within the relative hole 4430 within the channel 4415b. In some embodiments, post 4450 and securing hardware 4455 may be implemented as a threaded bolt and nut combination. In still other embodiments, hole 4430 may be threaded to receive a threaded version of post 4450 (which then may not require further securing hardware 4455). Those skilled in the art will appreciate that other embodiments may implement post 4450 and securing hardware 4455 via other types of mechanically captive structure that secures eyelet 4440 and base 4445 in place relative to the periphery 4410 of base platform 4400.

FIG. 49 is a diagram illustrating a cross-sectional view of another exemplary base attachment point used with the second exemplary type of periphery edge piece from the exemplary base platform shown in FIG. 47 in accordance with an embodiment of the invention. Referring now to FIG. 49, a similar eyelet and base 4455 is shown configured with an attachment flange 4460 and post 4465, which mate with the configuration of channel 4415b' including overhanging flanges 4435 and hole 4430. In this embodiment, post 4465 may be spring loaded to retract within base 4445 such that the attachment flange structure 4460 may selectively slide within channel 4415b' to a desired position, where post 4465 may then extend into hole 4430 as another exemplary way to secure the eyelet 440 in place relative to the periphery 4410 of base platform 4400.

Figure 50:
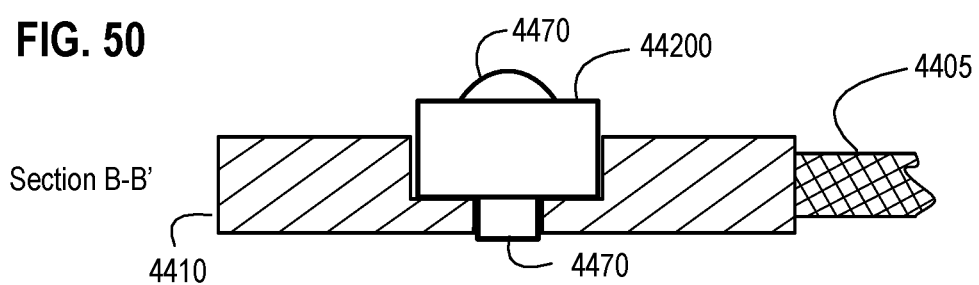
FIG. 50 is a diagram illustrating a cross-sectional view of an exemplary container node as attached to the first exemplary type of periphery edge piece from the exemplary base platform shown in FIG. 46 in accordance with an embodiment of the invention.
Figure 51:
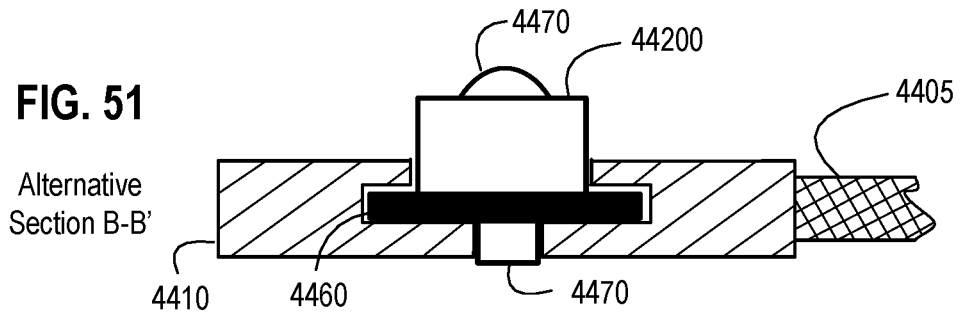
FIG. 51 is a diagram illustrating a cross-sectional view of the exemplary container node as attached to the second exemplary type of periphery edge piece from the exemplary base platform shown in FIG. 47 in accordance with an embodiment of the invention.

In like manner, FIGS. 50 and 51 show how container node 44200 may be attached to base platform 4400 via the differently configured channels. As shown in perspective in FIG. 45, exemplary container node 44200 is attached to base platform 4400 within channel 4415c near corner 4420c. FIG. 50 is a diagram illustrating a cross-sectional view of exemplary container node 44200 as attached via a threaded screw 4470 within the configuration of channel 4415c (similar to that shown as channel 4415b in FIG. 46). While node 44200 is shown attached to base platform 4400, other embodiments may have node 44200 attached in other ways (e.g., glued, clamped, etc.) that may be permanent or temporary so that node 44200 may be removed or replaced. Further embodiments may have node 44200 configured with base platform 4400 in a more integrated manner where the node 44200 is built into the platform's structure. In other words, exemplary container node 44200 may be removably secured to the base platform or, in some embodiments, be integrated as part of the base platform. Likewise, exemplary container node 44200 may be implemented using an attachment flange 4460 and post 4470 as shown in the configuration of the base platform's channel (similar to that shown and explained relative to FIG. 47).

Figure 52:
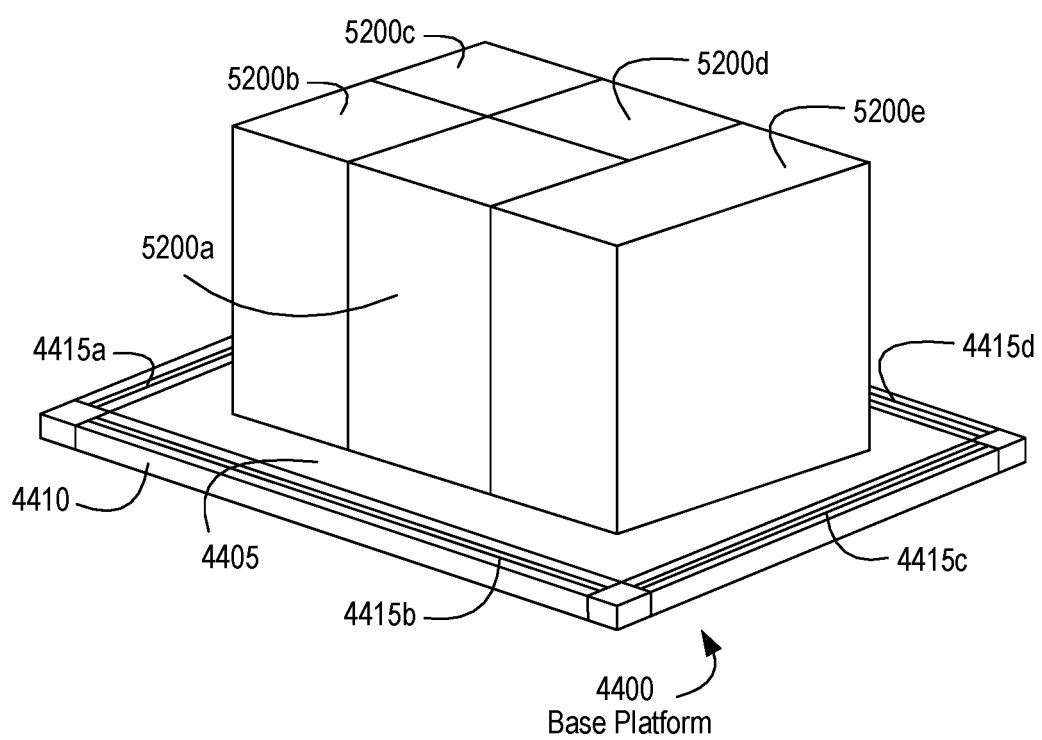
FIG. 52 is a diagram illustrating how a plurality of exemplary packages may be disposed relative to the base platform of FIG. 44 when the base platform is part of an exemplary motion sensing container in accordance with an embodiment of the invention.
Figure 53:
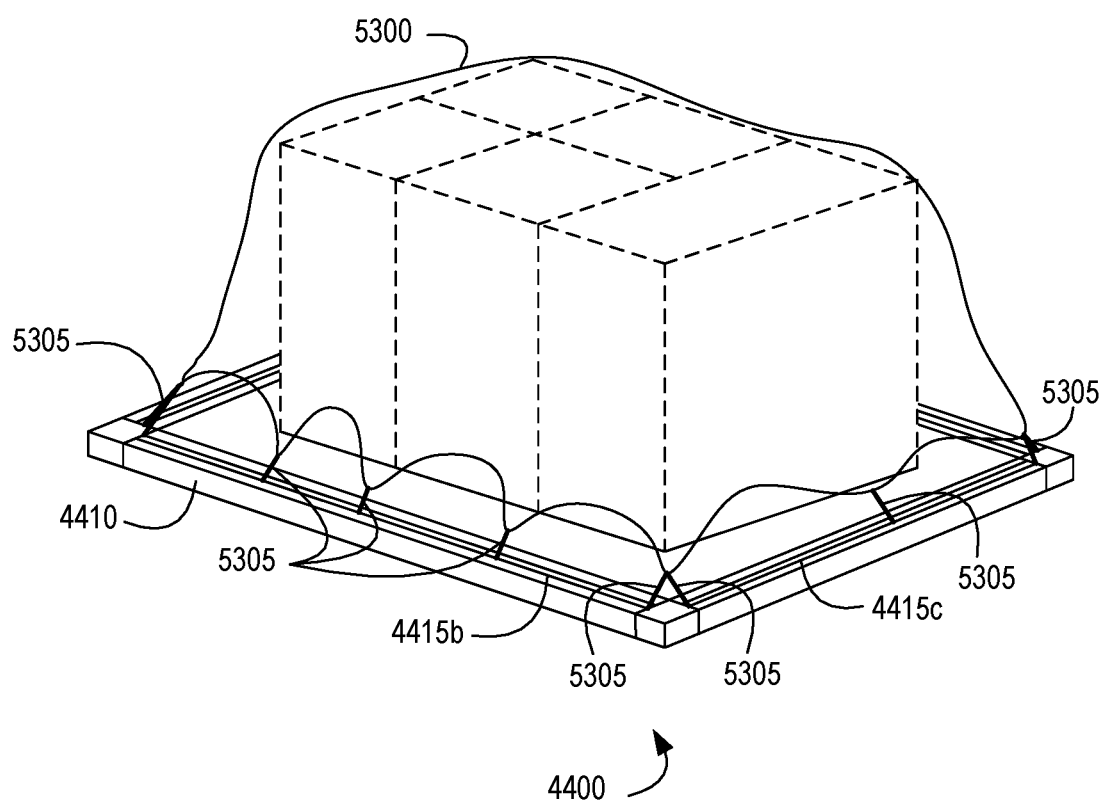
FIG. 53 is a diagram illustrating an exemplary flexible cover secured over packages and to the base platform of FIG. 44 as part of an exemplary motion sensing container in accordance with an embodiment of the invention.

FIG. 52 is a diagram illustrating how a plurality of exemplary packages may be disposed relative to the base platform 4400 shown in FIG. 44 when the base platform 4400 is part of an exemplary motion sensing container in accordance with an embodiment of the invention. Referring now to FIG. 52, exemplary packages 5200a-5200e are shown loaded or otherwise disposed on top of the central support surface 4405 of base platform 4400. Once in this configuration, an exemplary cover 5300 may be deployed over the packages 5200a-5200e as shown in FIG. 53. In general, the cover 530 operates as a type of cargo restraint system that is attached to the base platform. As shown in FIG. 53, exemplary cover 5300 includes multiple cover attachment points that can be at least temporarily secure to base attachment points on edges of the base platform. For example, and as shown in FIG. 53, cover 5300 is deployed as a flexible cover (e.g., a cargo net, webbing, braided net, reinforced tarp, and the like) with multiple tie-down straps 5305 (used as cover attachment points) that connect to base attachment points deployed within channels 4415a-4415d along the entire edge of base platform 4400. When secured to the base attachment points via such straps 5305, the cover 5300 is capable of securing the plurality of packages 5200a-5200e to the base platform 4400.

As assembled and shown in FIG. 53, the alternative embodiment of a logistics container (i.e., base platform 4400 and flexible cover 5300 secured with straps 5350) may be deployed with exemplary container node 44200 (as shown in FIG. 45) to make up an embodiment of a motion sensing container apparatus able to communicate with other nodes. Examples of such other nodes may include a server managing the wireless node network that includes the container node 44200; a facility master node managing the container node 44200 and in communication with a server managing the wireless node network that includes the container node 44200 and the facility master node; or a package ID node associated with at least one of the packages 5200*a*-5200*e* supported by the base platform 44200 of the logistics container and secured in place with the flexible cover 5300 of the logistics container.

Like container node 41000 as shown and explained above relative to FIGS. 41 and 42, the container node 44200 deployed as part of this embodiment of a motion sensing container apparatus may have its motion-dependent broadcast profile changing how frequently the communication interface of node 44200 communicates with the second node based upon at least one of the motion status detected by the motion sensor and the magnetic field strength measured by the magnetometer. In more detail, the motion-dependent broadcast profile may decrease how frequently the communication interface of node 44200 communicates with the second node when at least one of the motion status detected by the motion sensor and the magnetic field strength measured by the magnetometer indicates the logistics container is at least one of stationary or decelerating. The motion-dependent broadcast profile for node 44200 may also increase how frequently the communication interface of node 44200 communicates with the second node when at least one of the motion status detected by the motion sensor and the magnetic field strength measured by the magnetometer indicates the logistics container is at least one of moving or accelerating. In a further embodiment, the motion-dependent broadcast profile of node 44200 may change a power level of a signal broadcast by the node's communication interface based upon the motion status detected by the motion sensor and/or the magnetic field strength measured by the magnetometer.

As deployed as part of this embodiment of a motion sensing container apparatus, an embodiment of the communication interface used in container node 44200 may be a long range interface (such as interface 41485) that provides access to a server, or may be a short range interface (such as interface 41480) operative to provide access to a package ID node associated with at least one of the packages 5200*a*-5200*e* supported on the base platform 4400 of the logistics container. Such a short range interface may be used in node 44200 to transmit a control message (in accordance with the motion-dependent broadcast profile) to the package ID node based upon one of the motion status detected by the motion sensor; the magnetic field strength measured by the magnetometer; or a combination of the detected motion status and magnetic field strength. Such a control message may provide instructional input via, for example, a command or instruction to the package ID node to alter operation of the package ID node (such as having the control message causing the package ID node increase how frequently it transmits an advertising signal so that the container node 44200 receives more frequent updates from the package ID node).

Enhanced Package Placement Tracking Using a Motion-Sensitive Container Node

While an exemplary container node may be deployed, as explained above, for motion-based (e.g., detected physical movement, detected changes in magnetic fields) changes to how the container node communicates in various embodiments, additional embodiments may use an exemplary container node with a motion sensor (such as an accelerometer) to enhance determinations on whether a package has been placed within a particular logistics container. In general, a container node (as deployed with a logistics container) may detect a broadcast signal from an approaching package's ID node as the package is being loaded into the logistics container having the container node. However, this may happen while other container nodes placed within other neighboring logistics containers also detect the broadcast signal from the package's ID node. Thus, at times, simply detecting a close signal from a package's ID node may not be sufficiently accurate to conclusively determine if a package has been placed within a particular logistics container. Accordingly, in some embodiments, a logistics container receiving the package may also sense a bump or other impact force through sensors on the onboard container node. The detected or sensed bump or impact represents placement of the package within that particular container. Thus, detection of the broadcast signal from the package's ID node may be coupled with the detection of such a bump or impact and, collectively, used as a "tie breaker" when automatically monitoring and managing loading operations. As such, this technology-driven enhanced monitoring solution yields a technical effect, for example, of improving how package placement may be tracked in a logistics container using a specially configured and programmed container node. Stated another way, while detected information from a node-enabled and broadcasting package may be captured by a neighboring group of container nodes in respective logistics containers, the combined use of the detected impact/bump by one of the logistics containers automatically increases the confidence level of that package having been placed within that particular logistics container.

Figure 54:
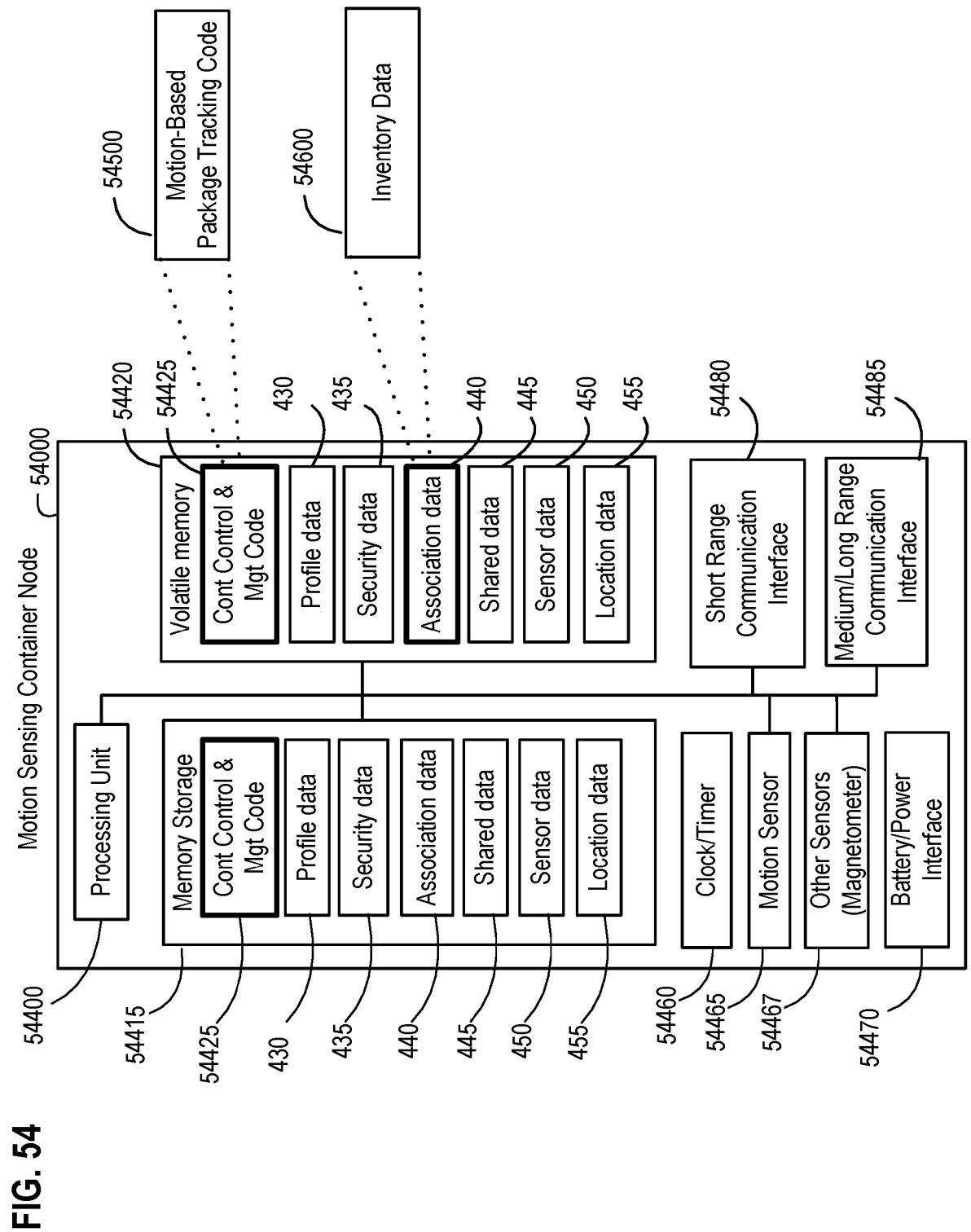
FIG. 54 is a diagram illustrating an embodiment of an exemplary motion sensing container node used for improved tracking of packages placed within a logistics container in accordance with an embodiment of the invention.

FIG. 54 is a diagram illustrating an embodiment of an exemplary motion sensing container node configured for use when improved tracking of packages placed within a logistics container in accordance with an embodiment of the invention. Referring now to FIG. 54, exemplary motion sensing container node 54000 is shown similar to container nodes 38000 and 41000 (which were earlier described as being similar in some embodiments to a master node of FIG. 4 without location circuitry). More specifically, those skilled in the art will appreciate that one embodiment of exemplary container node 54000 includes many of the same hardware, code, and data components as shown for exemplary master node 110*a* of FIG. 4, but simplified so as not to include location circuitry, as well as to that of exemplary container node 38000 illustrated in FIG. 39 and container node 41000 illustrated in FIG. 41. As such, similar functionality exists for what is numbered the same or similarly and described above regarding exemplary master node 110*a* and exemplary container nodes 38000 or 41000. Thus, while master node 110*a* shown in FIG. 4 is described as having processing unit 400, memory storage 415, volatile memory 420, clock/timer 460, sensors 465, battery/power interface 470, short range communication interface 475, and medium/long range communication interface 480, exemplary container node 54000 may use similar hardware components as shown in FIG. 54. This includes processing unit 54400, memory storage 54415, volatile memory 54420, clock/timer 54460, sensors 54465 and 5467, battery/power interface 54470, short range communication interface 54475, and medium/long range communication interface 54480.

Further, the embodiment of exemplary container node 54000 illustrated in FIG. 54 deploys container control and management code 54425 (as stored in memory storage 54415 and loaded for execution by processing unit 54400 in volatile memory 54420), which is similar in functionality to container control and management code 38425, container control and management code 41425, and master node control and management code 425 described above in more detail. Such code, as previously described, generally controls the behavior of the node relating to communications (with a node advertise and query logic manager), information management (with an information control and exchange manager), power management (with a node power manager that interacts with the various communication interfaces, for example, to manage power consumption and broadcast power aspects at a low level), and association management (with an association manager). As such, container control and management code 54425 essentially operates similar to that as described above for container node control and management code 38425 and code 41425 (and master node control management code 425 but without the need for a location aware/capture module) but further includes motion-based package tracking program code 54500 for improved and enhanced motion-based tracking of package placement within a logistics container as described in more detail below with respect to methods described relative to FIGS. 56-58. Thus, an embodiment of motion-based package tracking program code 54500 may be implemented as an integrated part of container control and management code 54425, such as one or more programmatic functions or additional program modules that may be called within code 54425. However, in other embodiments, the motion-based package tracking program code 54500 used to implement the methods as described with respect to FIGS. 56-58 may be implemented separately from code 54425 in a way that allows code 54500 to call some of the programmatic functions or program modules described as part of code 425 to implement the steps as laid out in the methods of FIGS. 56-58 and variations of those methods as described herein.

In general, exemplary motion-based package tracking code 54500 adapts the operation of container node 54000 such that the node detects motion-based events (and in many embodiments also detecting signals broadcast by a node-enabled package) and, based upon such detected items, responds in an unconventional way that automatically determines whether a package was placed within the logistics container associated with container node 54000 so that the container node 54000 may proactively report this determination up to a managing node in the network. As such determinations are made, an embodiment of container node 54000 running exemplary motion-based package tracking code 54500 may also update an inventory of the related logistics container. Such current inventory information related to the logistics container may be kept as inventory data 54600 within container node 54000. In some embodiments, inventory data 54600 may be included and maintained as part of association data 440 in both of memory storage 54415 and volatile memory 54420, where the data 54600 reflects what packages have been determined to be associated with the logistics container related to the container node 54000. However, in other embodiments, inventory data 54600 may be maintained as a separate data structure from what is maintained as association data 440.

As a measuring front end component for a motion-based package placement tracking involving a logistics container, exemplary motion sensing container node 54000 includes various sensors, such as motion sensor 54465 as a sensor or detector with one or more sensing elements that can collectively detect or sense an impact force relative to that which it is attached (e.g., a logistics container or part thereof). An exemplary implementation of motion sensor 54465 (or other sensors 54467) may include additional hardware (e.g., local sensor memory, battery backup, multiplexing hardware interfaces when using multiple sensing elements) and/or program/firmware features to manage the detection, collection, storage, and sharing of the captured motion-related sensor data (such as a sensed impact force and a notification generated by the sensor about the sensed impact force). In some embodiments, motion sensor 54465 may be implemented with several types of motion sensors or motion/movement detectors, such as an inertial sensor, a shock detector, an accelerometer, a microelectromechanical (MEMS) sensor, and the like. And while sensor 54465 is explicitly shown in FIG. 54 as a motion sensor, those skilled in the art will appreciate that an embodiment of container node 54000 may also include other types of sensors or detectors 54467, such as one or more magnetic sensors (e.g., a magnetometer, gyroscopic sensor, etc.), electronic sensors (e.g., a voltage sensor, current sensor, electronic power sensor, etc.), and environmental sensors (e.g., pressure, light, temperature, humidity, magnetic field, altitude, attitude, orientation, proximity, etc.).

Figure 55:
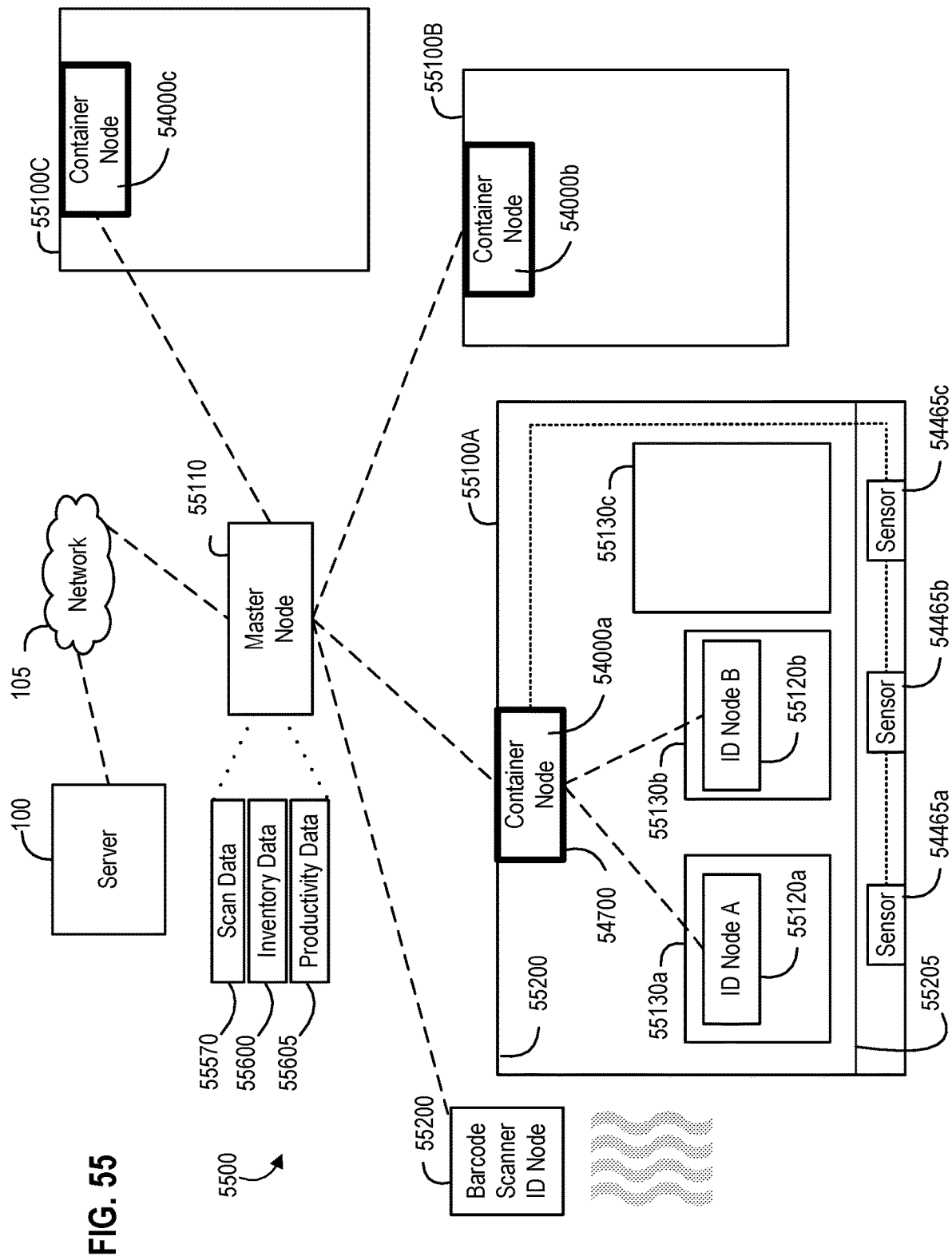
FIG. 55 is a diagram illustrating an exemplary motion-based system for improved tracking of packages placed within one of a group of different node-enabled logistics containers in accordance with an embodiment of the invention.

Exemplary container node 54000 as shown in FIG. 54 may be deployed alone or as part of various system embodiments providing node-implemented motion-based enhanced tracking of package placement in a node-enabled logistics container, such as that shown in FIG. 55. Referring now to FIG. 55, an exemplary motion-based system 5500 is shown that offers improved tracking of packages placed within one of a group of different node-enabled logistics containers in accordance with an embodiment of the invention. In other words, exemplary motion-based system 5500 deploys container nodes 54000a-54000c in respective ones of multiple logistics containers 55100A-55100C, along with a master node 55110 that wirelessly interacts with and manages the container nodes 55100A-55100C and a server 100 that interacts with and manages the master node 55110 over network 105.

In more detail, exemplary container node 54000a is shown in FIG. 55 as an exemplary motion-based apparatus deployed in logistics container 55100A for improved tracking of package placement within logistics container 55100A. Logistics container 55100A is shown having a container housing 55200 and floor structure 55205 that, collectively, define an interior storage area capable of maintaining packages, such as packages 55130a-55130c. Some of these packages may be node-enabled packages (i.e., package 55130a associated with ID node A 55120a and package 55130b associated with ID node B 55120b), while others may be a package without a node associated with it (i.e., package 55130c). While not explicitly shown to avoid confusion and a cluttered diagram, those skilled in the art will appreciate that container 55100A may be accessed via a doorway or other entrance structure that can be closed to seal off the interior storage area of the container 55100A.

The container node 54000a associated with logistics container 55100A shown in FIG. 55 has a housing 54700, which is attached to logistics container 55100A. Many of components of exemplary container node 54000a are maintained within housing 54700. For example, consistent with what was discussed above and shown in FIG. 54, container node 54000 has at least a node processing unit 54400 and memory storage 55415 disposed within the node housing 54700. Memory storage 54415 is accessibly coupled to the node processing unit 54400 and maintaining at least the motion-based package tracking code 54500 for execution by the node processing unit 54400 (once loaded into volatile memory 54420).

Several other components of exemplary container node 54000*a* may not be completely maintained within node housing 54700. For example, exemplary container node 54000*a* includes a short range communication interface (such as interface 54480) and a medium/long range communication (such as interface 54485) where both are operatively coupled to the node processing unit 54400. As such, the short range communication interface allows the container node 54000*a* to communicate over a short range communication path with an ID node associated with a package to be shipped (such as ID node A 55120*a* associated with package 55130*a*). And the longer range communication interface allows the container node 54000*a* to communicate over a long range communication path with a managing node, such as master node 55110. These communication interfaces disposed as part of container node 54000*a* may be implemented with certain parts (e.g., antennas or the entire transceiver unit and antenna (or units and different antennas) collectively making up the communication interface) disposed outside of housing 54700. For example, the short range communication interface may be configured with multiple radios or multiple antenna elements with parts of or whole radio units dispersed in different parts around the interior storage area of container 55100A so to provide a more robust reception field and enable more efficient localization of signals emanating from various nodes within the container 55100A.

In addition to the communication interfaces, the exemplary container node 54000*a* shown in FIG. 55 further includes at least one motion sensor (such as motion sensor 54465) that can detect an impact force on the logistics container 55100A. In response to such a detected impact force, the motion sensor generates a reporting signal about the detected impact force and provides the reporting signal back to the node processing unit (i.e., processing unit 54400) within container node 54000*a*.

As noted above relative to FIG. 54, motion sensor 54465 may be implemented with more than one sensing element. The sensor or even each sensing element may include additional hardware (e.g., local sensor memory, battery backup, multiplexing hardware interfaces when using multiple sensing elements) and/or program/firmware features to manage the detection, collection, storage, and sharing of the captured motion-related sensor data (such as a sensed impact force and a notification generated by the sensor about the sensed impact force). As shown in FIG. 55, the motion sensor for exemplary container node 54000*a* is implemented with multiple sensing elements 54465*a*-54465*c* disposed within the logistics container to monitor an interior storage area of the logistics container 55100A. Specifically, each of the sensing elements 54465*a*-54465*c* may be disposed proximate to a different portion of the interior storage area within logistics container 55100A. For example, motion sensing elements 54465*a*-54464*c* are each located relative to different parts of floor 55205 of container 55100A. In some embodiments, an individual sensing element may sense an impact force for the motion sensor to generate the reporting signal provided back to the node processing unit within container node 54000*a*. However, in other embodiments, more than one of the sensing elements may collectively detect or sense the impact force relative to the logistics container or part thereof.

As configured to provide enhanced multi-mode monitoring (e.g., electronic signal communication as well as physical impact sensing), container node 54000*a* provides an concretely deployed technical solution using unconventional functionality of the node 54000*a* yielding a technical result that improves how to monitor loading of logistics container 55100A. In doing so, an embodiment of the node processing unit 54400 of exemplary container node 54000*a* in FIG. 55, when executing the motion-based package tracking code 54500 maintained on the memory storage 54415 (and as loaded and running in volatile memory 54420), becomes operative to cause the short range communication interface to electronically listen for an ID node (such as ID node A 55120*a*) in accordance with a scanning mode of the container node 54000*a*. For example, the short range communication interface 54480 of node 54000*a* may scan or listen for a BLE formatted signal being broadcast by an ID node (such as ID node A 55120*a* associated with package 55130*a*) near node 54000*a*. Detection of such a BLE formatted signal may occur as the package 55130*a* with ID node A 55120*a* is being moved towards the logistics container 55100A (e.g., during a loading operation of different containers 55100A-55100C) prior to being actually being placed within container 55100A, such as upon approach to a particular one of the containers 55100A-55100C, and/or as the package 55130*a* is being placed within the interior storage area of container 55100A.

Once the particular ID node is heard by the communication interface 54480 via the detected signal broadcast from the ID node, the programmed processing unit of node 54000*a* identifies a device signature of that ID node from the signal broadcast from the ID node and detected by the communication interface. In more detail, an embodiment of the programmed node processing unit of node 54000*a* may identify the device signature of the ID node from, for example, at least one of a series of increasingly stronger signals broadcast from the ID node and detected by the communication interface as the ID node moves closer to the container node 54000*a*.

The programmed node processing unit of container node 5400*a* then interacts with the container node's motion sensor (e.g., one or more of sensor elements 55465*a*-55465*c*) to receive the reporting signal from the motion sensor indicating the motion sensor detected the impact force on the logistics container 55100A after detecting the signal broadcast from the ID node. The reporting signal, in some embodiments, may indicate a level of the impact force as detected by the motion sensor.

From there, the programmed node processing unit of the container node 54000*a* determines whether the detected signal broadcast from the package's ID node (such as a signal detected from the ID node A 55120*a* in package 55130*a*) and the detected impact force indicate the package (such as package 55130*a*) was placed within the logistics container. In an embodiment where the reported signal from the motion sensor indicates a level of the impact force, this level is then used as a factor in determining whether the detected signal broadcast from the package's ID node and such a detected force impact level indicate the package was actually placed within the specific logistics container.

In a more detailed embodiment, the node processing unit 54400 of node 54000*a* may also use clock/timer 54460 (or an integrated timer circuit within processing unit 54400) to track an elapsed time between when the short range communication interface detects the signal broadcast from the ID node and when the motion sensor detects the impact force. Such an elapsed time may also be used as a monitoring-based factor when the processing unit determines whether the detected signal broadcast from the ID node and the detected impact force indicate the package was placed within the logistics container. For example, if the tracked elapsed time falls outside of a predetermined threshold time period, the node processing unit 5440 of node 54000*a* may determine the package was not placed within container 55100A associated with node 54000*a*. Thus, node processing unit 54400 of container node 54000*a* may be programmed and operative to intelligently monitor different activity relative to the logistics container 55100A (e.g., a detected impact relative to container 55100A, relevant electronic signals received from a package ID node (such as 55120*a*), and/or the timing related to the two sensed events) to automatically determine whether the package was placed within container 55100A.

Based upon such a multi-mode determination, the processing node of container node 54000*a* then causes the longer range communication interface to transmit a notification to a managing node, such as master node 55110 or even server 100. Such a notification includes at least the identified device signature of the ID node and status information reflecting that the detected signal and the sensed impact force indicating the ID node associated with the package was placed within the logistics container 54100A.

In a further embodiment of container node 54000*a*, its node processing unit may then update inventory information (such as inventory data 54600) maintained on the memory storage of the node 54000*a* after determining whether the detected signal broadcast from the ID node and the detected impact force indicate the package was placed within the logistics container. Such inventory information allows the container node 54000*a* to locally track the contents of the logistics container 55100A.

In further embodiments, the longer range communication interface may also receive a confirmation message from the managing node (e.g., managing node 55110 or server 100) and pass the confirmation message to the node processing unit 54400 of node 54000*a*. Such a confirmation message verifies that the package 55130*a* was properly placed within the logistics container 55100A. For example, such a message may confirm that the package 55130*a* was supposed to be loaded within logistics container 55100A and, upon receipt of such a confirmation, the node processing unit of node 54000*a* may update inventory data 54600 that tracks the contents of the logistics container 55100A.

However, in another embodiment where package 55130*a* is supposed to loaded and shipped within another container (such as container 55100B), the confirmation message received by container node 54000*a* in logistics container 55100A may indicate that the package 55130*a* just loaded was, in fact, improperly loaded within container 55100A (i.e., confirmed misload situation relative to package 55130*a*), which requires further action to be taken to unload package 55130*a*. In a more detailed embodiment, a misload message may then be generated by container node 54000*a* and transmitted to a user access device (not shown but similar to user access device 200 in FIG. 2) operating as a type of ID node and under the operation of loading personnel involved in loading container 54000*a*.

Figure 56:
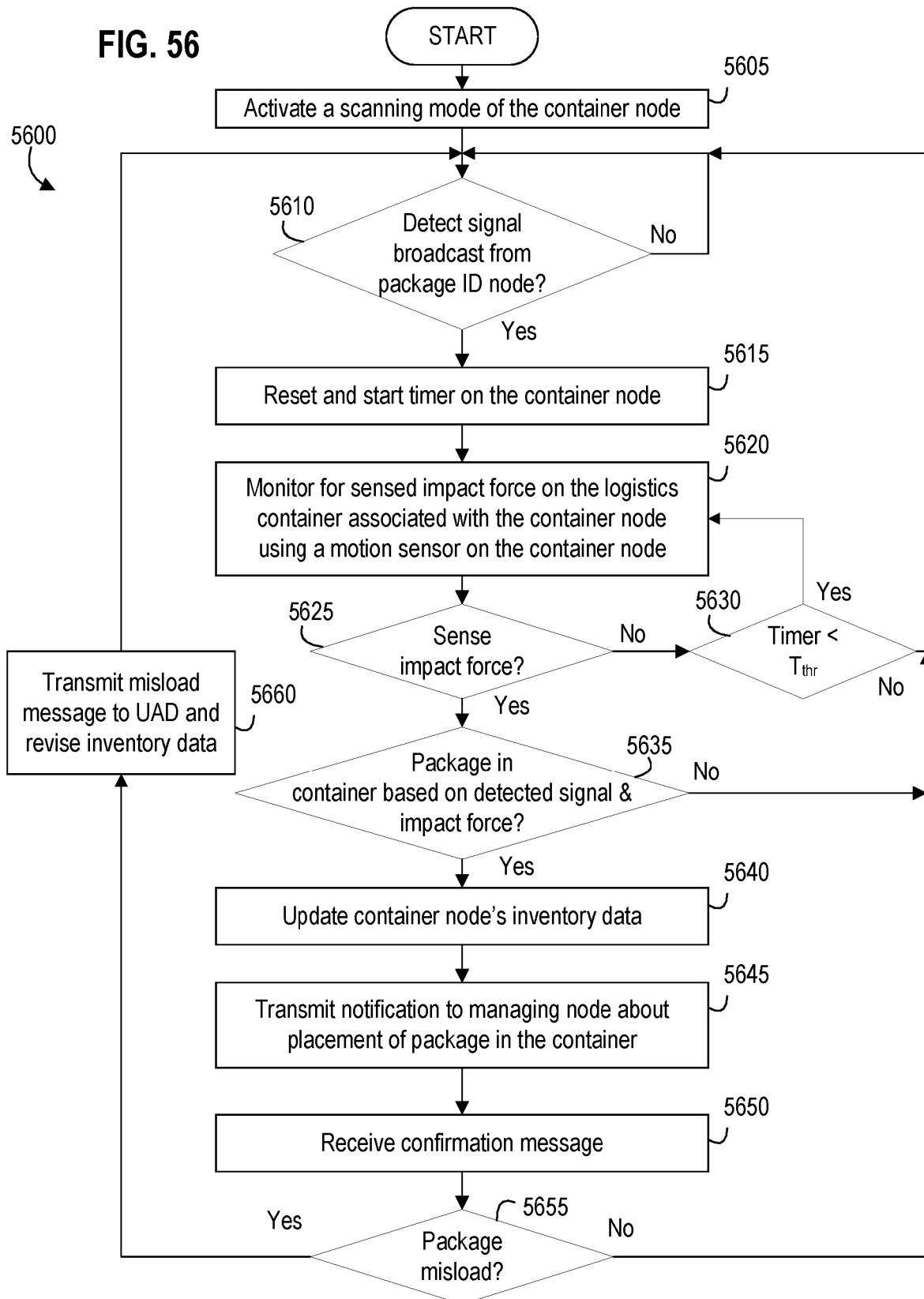
FIG. 56 is a flow diagram illustrating an exemplary motion-based method for improved tracking of package placement in a logistics container using a container node associated with the logistics container in accordance with an embodiment of the invention.

With the above-described context of exemplary container node 54000 as shown in FIG. 54 and how container node 54000*a* may be deployed as part of logistics container 55100A in FIG. 55, FIG. 56 is a flow diagram illustrating an exemplary motion-based method for improved tracking of package placement in a logistics container using a container node (such as node 54000 or 54000*a*) associated with the logistics container in accordance with an embodiment of the invention. Referring now to FIG. 56, method 5600 begins at step 5605 with the container node activating a scanning mode to electronically listen for an ID node associated with a package (i.e., a package ID node). For example, exemplary container node 54000*a* may activate a passive or active mode of operation where it is scanning or listening for other nodes. As such, when container node 54000*a* is scanning while passive, the node will receive advertising data packets, but will not acknowledge and send SCAN_REQ messages in compliance with BLE standards. However, when container node 54000*a* is scanning while active, the node will receive advertising data packets, and will acknowledge receipt by sending a SCAN_REQ message in accordance with BLE standards.

At step 5610, if the container node detects a signal broadcast from the ID node associated with the package, method 5600 proceeds from step 5610 to 5615. Otherwise, step 5610 continues to scan for signals broadcast from a package ID node, such as advertising packet signals from an ID node.

At step 5615, an embodiment of method 5600 may have the container node reset and start a timer. Such a timer may be used to track the elapsed time since the detected signal to when the container node senses an impact form from its motion sensor. As discussed relative to step 5635 below, such an elapsed time may also be considered when determining whether the package was placed within the specific logistics container associated with the container node.

Thus, at step 5620, method 5600 essentially enters a state where the container node monitors for a sensed impact force using a motion sensor on the container node (such as motion sensor 54465 on exemplary container node 54000 or any of sensor elements 54465*a*-54465*c* on exemplary container node 54000*a*). As noted above, an exemplary motion sensor may be implemented as an inertial sensor, a shock detector, an accelerometer, and a microelectromechanical (MEMS) sensor. In some embodiments, such as that shown in FIG. 55, the motion sensor may be implemented with multiple sensing elements that, in further embodiments, are disposed proximate to different portions of an interior storage area within the logistics container (e.g., sensor elements 54465*a*-54465*c* on exemplary container node 54000*a* are shown disposed proximate different areas of floor 55205 of logistics container 55100A).

At step 5625, method 5600 determines whether the container node's motion sensor has sensed an impact on the logistics container after detecting the signal broadcast from the ID node. For example, the motion sensor may report information on a level of the impact force as sensed by one or more of the sensing elements within the interior of the logistics container. If an impact force has been sensed, step 5625 proceeds directly to step 5635. Otherwise, step 5625 proceeds back through step 5630 where an embodiment of method 5600 may have the container node check to see if the elapsed time on the started timer (see step 5615) meets or exceeds a threshold time period.

At step 5635, method 5600 proceeds with the container node determining if package is in the logistics container based upon the sensed impact force and the detected signal. In other words, the container node determines in step 5635 whether the detected signal broadcast from the ID node and the sensed impact force (or level of such a sensed impact force) indicate the package was placed within the logistics container (such as within an interior storage area of the logistics container). Thus, if the container node determines the package was placed within the logistics container as part of step 5635, then method 5600 proceeds from step 5635 to step 5640. Otherwise, method 5600 proceeds from step 5635 directly back to step 5610 to look for signals from another package ID node and restart the motion-based tracking of package placement within the logistics container.

In a further embodiment of method 5600, step 5635 may also include determining whether the detected signal and the sensed impact force indicate the package was placed within the logistics container based upon an elapsed time between when the container node detects the signal broadcast from the ID node and when the motion sensor senses the impact force. In other words, the elapsed time from the timer started at step 5615 allows the container node to further consider a timing aspect along with the existence of the two different detected events (i.e., the detected signal broadcast from the package ID node and the sensed impact force relative to the logistics container). For example, if a signal broadcast from the package ID node is detected by the container node, and an impact force of sufficient magnitude is sensed via the motion sensor of the container node, and the relative timing of those events is within a threshold time period, the container node may automatically determine that such factors indicated the package was placed within the logistics container. Further embodiments may refine such a determination with a particular threshold impact force level to be detected and/or a particular threshold signal power level to be detected. Such refined embodiments may allow for better determination resolution in step 5635 when the logistics container associated with the container node is in a crowded area with other logistics containers or in an area with multiple actively broadcasting package ID nodes.

At step 5640, an embodiment of method 5600 may have the container node updating inventory information maintained on a memory storage of the container node after determining whether the detected signal broadcast from the ID node and the detected impact force indicate the package was placed within the logistics container. Such inventory information (e.g., inventory data 54600 shown within memory of exemplary container node 54000) exists and may be updated to locally track the contents of the logistics container.

At step 5645, method 5600 proceeds with the container node transmitting a notification to a managing node (such as a master node or a server in the wireless node network). Such a notification reflects the detected signal and the sensed impact force, which collectively indicate the package was placed within the logistics container. In this way, an embodiment of method 5600 may have the container node updating a component higher within the network of elements, such as shown in FIG. 55, with a status of a loading operation as reflected by the local determination of the package having been placed within the container node's logistics container.

At step 5650, an embodiment of method 5600 may have the container node receiving a confirmation message from the managing node in response to transmitting the notification at step 5465. Such a confirmation message received in step 5650 verifies that the package was placed within the logistics container. The verification in the confirmation message, in some instances, may confirm the package was placed in the appropriate logistics container, after which the inventory information on the memory storage may be updated (rather than at step 5640). However, in other instances, the verification in the confirmation message may indicate the package has been misloaded or loaded into an inappropriate logistics container. Thus, an embodiment of method 5600 may proceed to step 5660 from decision step 5655 if the package has been misloaded.

At step 5660, the container node associated with the logistics container now may take proactive and automatic steps to rectify and address the package misloaded situation automatically detected. As such, the container node in step 5660 may generate and transmit a misload message to a user access device (UAD—such as user device 200 shown in FIG. 2) operating as a type of ID node and under the operation of loading personnel involved in loading the logistics container related to the container node. The container node, as part of step 5660, may also revised the inventory data locally stored indicating the current contents of the logistics container. Thereafter, step 5660 proceeds back to step 5610 to look for signals from another package ID node.

However, if the confirmation message received at step 5650 verifies the package was properly loaded and was supposed to be loaded into the particular logistics container related to the container node performing method 5600, method 5600 need not engage in step 5660 and simply proceeds from step 5655 directly back to step 5610 to look for signals from another package ID node.

In light of the above description of exemplary container node 54000a as shown in FIGS. 54 and 55 and the exemplary motion-based method 5600 for improved tracking of package placement as explained relative to FIG. 56 and implemented with a container node, such as node 54000a, a further embodiment of a motion-based apparatus for improved tracking of package placement essentially comprises both the logistics container and its related container node. In general, such an embodiment may be implemented as a container node-enabled logistics container, such as logistics container 55100A and related container node 54000a, and where the container node part of the overall apparatus operates similar to that described above relative to method 5600 and its variants.

In more detail, an embodiment of such a motion-based apparatus for improved tracking of package placement includes a type of logistics container that maintains (at least temporarily) one or more packages (such as exemplary logistics container 55100A as shown and explained in FIG. 55) within an interior storage area for the packages. The embodiment of the motion-based apparatus also includes a container node attached to the logistics container (such as exemplary container node 54000a as shown and explained relative to FIGS. 54-56). In this embodiment, the container node further comprises a node processing unit (such as processing unit 54400), a memory storage (such as memories 54415 or 54420), a motion sensor (such as motion sensor 54465 or collectively the group of motion sensing elements 54465a-54465c), and two communication interfaces (such as interfaces 54480, 54485). Each of the memory storage, the motion sensor, and the two communication interfaces is coupled to the node processing unit of the container node. One of the communication interfaces is operative to communicate over a short range communication path with an ID node associated with a package to be shipped (such as ID node A 55120a associated with package 55130a), while the second communication interface is operative to communicate over a long range communication path with a managing node (such as master node 55110).

The container node's motion sensor is disposed within the logistics container to monitor the interior storage area of the logistics container. Specifically, the motion sensor is deployed to detect an impact force on the interior storage area of the logistics container and generate a reporting signal about the detected impact force (such as a signal that indicates a level of the impact force detected). The motion sensor may be implemented with various types of sensors, such as an inertial sensor, a shock detector, an accelerometer, and a microelectromechanical (MEMS) sensor. In further embodiments, the container node's motion sensor may also be implemented as multiple sensing elements where each are disposed proximate to different portions of the interior storage area of the logistics container of the overall apparatus.

The container node's memory maintains at least motion-based package tracking node (such as code 54500) for execution by the node's processing unit. As such, and when executing the motion-based package tracking code, the container node's processing unit becomes specially programmed as part of this apparatus embodiment to provide motion-based tracking of package placement relative to what may be loaded within the logistics container. In more details, the container node's processing unit becomes operative to cause the first communication interface to electronically listen for the ID node in accordance with a scanning mode of the container node apparatus and then identify a device signature of the ID node from a signal broadcast from the ID node and detected by the first communication interface. In some embodiments, identifying the device signal may be accomplished based upon at least one of a series of increasingly stronger signals broadcast from the ID node and detected by the first communication interface. The container node's processing unit is then further operative to receive the reporting signal from the motion sensor (indicating the motion sensor has detected the impact force on the logistics container after detecting the signal broadcast from the ID node) and then determine whether the detected signal broadcast from the ID node and the detected impact force indicate the package was placed within the logistics container. After this determination based on the multi-mode measurement input to the container node (e.g., the detected electronic signal and the sensed impact force), the container node's processing unit is operative to cause the second communication interface to transmit a notification to a managing node (such as a master node or server). The transmitted notification includes the identified device signature of the ID node and status information reflecting that the detected signal and the sensed impact force indicating the ID node associated with the package was placed within the logistics container.

In a further embodiment of the apparatus, the container node's processing unit may be programmed via the motion-based package tracking code to also track an elapsed time between when the first communication interface detects the signal broadcast from the ID node and when the motion sensor detects the impact force. As such and in that further embodiment, the container node's processing unit may be operative to determine whether the detected signal broadcast from the ID node and the detected impact force indicate the package was placed within the logistics container based upon the elapsed time being within a threshold time period. In other words, if the two different events detected relative to the ID node are detected within the threshold time period, the container node's processing may indicate the package was actually placed within the logistics container. Such a determination may also depend, in other embodiments, upon the level of the impact force as detected by the motion sensor and indicated in the reporting signal.

Additionally, further embodiments of such an apparatus embodiment may maintain and update an inventory for the logistics container of the apparatus. For example, the container node's processing unit may be programmed to update inventory information maintained on the memory storage after determining whether the detected signal broadcast from the ID node and the detected impact force indicate the package was placed within the logistics container. However, in another example, updating the inventory information may occur by the container node's processing unit after the second communication interface receives a confirmation message from the managing node and passes the confirmation message to the node processing unit. Such a confirmation message verifies that the package was placed within the logistics container so that the container node's processing unit waits to update inventory information tracking the contents of the logistics container until after receiving the confirmation message.

An even more detailed system level embodiment related to motion-based tracking of package placement within a logistics container and methods of its operation may involve specific operations of a master node as it interacts with multiple exemplary container nodes as associated with respective logistics containers. As shown in FIG. 55, exemplary master node 55110 is disposed as a type of managing node in a network level one up from each of container nodes 54000a-54000c and a network level down from server 100 within the exemplary motion-based system 5500. As such, exemplary master node 55110 interactively communicates with server 100 and with each of container nodes 54000a-54000c as part of a monitored loading operation where the container nodes can deploy motion-based tracking of package placement functionality relative to their respective logistics container (as describe above relative to FIGS. 54-56).

Figure 57:
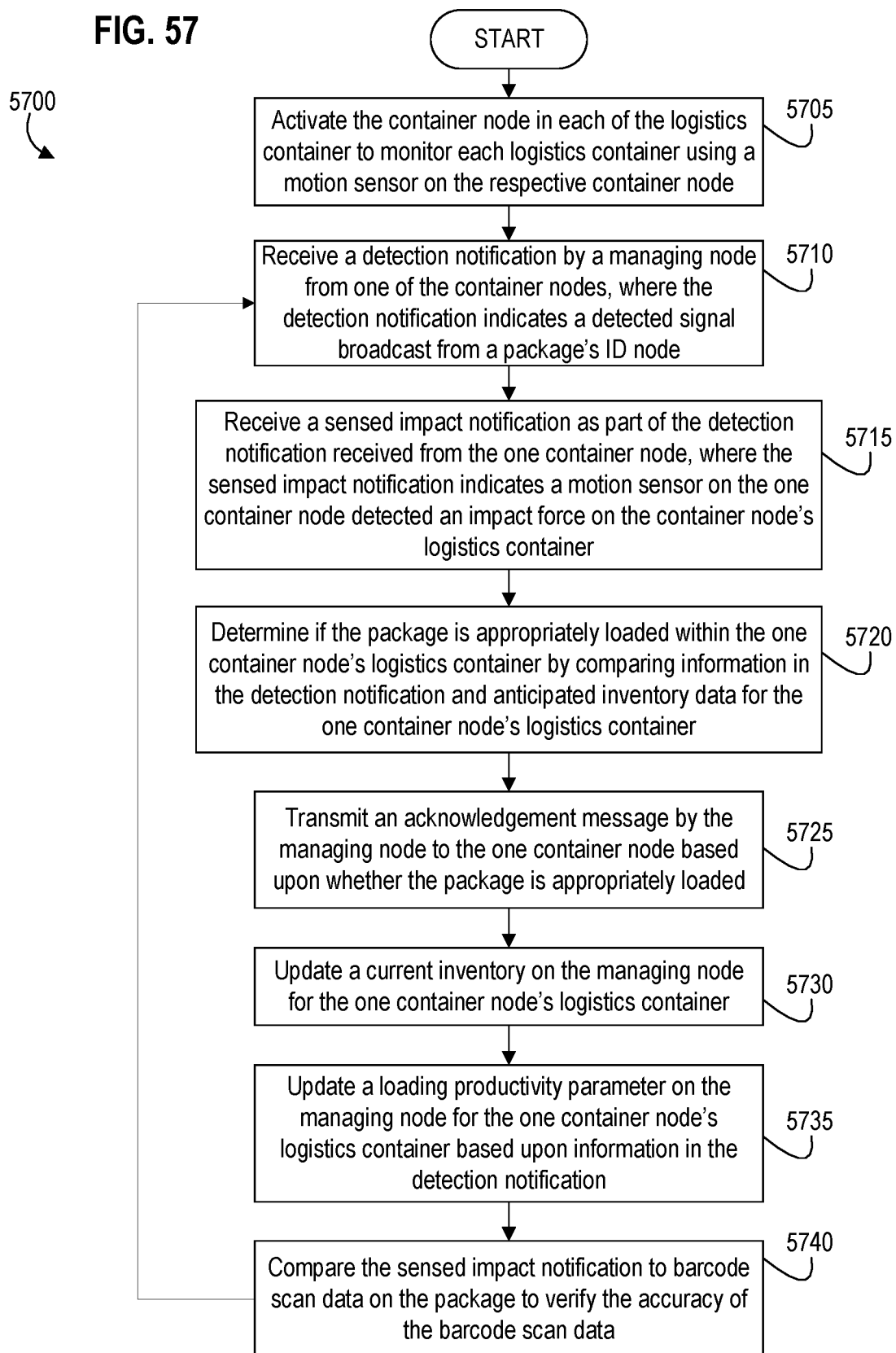
FIG. 57 is a flow diagram illustrating an exemplary motion-based method for improved tracking of package placement relative to a plurality of container node enabled logistics containers as part of a monitored loading operation using a wireless node network including at least a managing node in accordance with an embodiment of the invention.

Referring now to FIG. 55, exemplary master node 55110 is illustrated as being an example of master node 110a as shown and described relative to FIG. 4 with some further refinements. In other words, the functionality of exemplary master node 55110 may build upon similar hardware and software as explained above relative to exemplary master node 110a. More specifically, as described relative to FIG. 55 and below with regard to method 5700 as shown in FIG. 57 for motion-based tracking of package placement related to a monitored loading operation of multiple logistics containers, the particular functionality of exemplary master node 55110 may be implemented as part of master control & management code 425 (as stored onboard exemplary master node 55110).

Additionally, when operating to interact and interface with various container nodes 54000a-54000c that deploy motion-based tracking of package placement (as discussed in the various embodiments above), exemplary master node 55110 generally creates and/or stores some additional type of data within the memory (such as memory storage 415 or volatile memory 420) of exemplary master node 55110. For example, exemplary master node 55110 typically maintains inventory data 55570, which locally represents at least anticipated inventory information relative to different logistics containers. Such inventory data 55570 may, in some embodiments, be generated by the master node 55110 based upon relevant shipment data 580 provided by server 100 or may, in other embodiments, be provided from server as anticipated inventory information for a particular logistics container that is being loaded (such as containers 55100A-55100C).

As such logistics containers are being loaded with packages (which expressly include packaged items and non-packaged items to be shipped via such a container), exemplary master node 55110 may generate and store loading productivity information as productivity data 55605. Such data 55605, as described in more detail below, generally relates to timing of relevant tracked package placement events for particular logistics containers and, more specifically, may indicate how quickly the logistics container associated with a particular container node is being loaded as part of the monitored loading operation when automatically tracked using wireless node devices, such as exemplary container nodes 54000a-54000c.

As the logistics containers 55100A-55100C are being loaded with packages (e.g., packaged items and non-packaged items to be shipped via such a container), exemplary master node 55110 may receive and/or access barcode scan data associated with particular packages. Such scan data is generally stored as scan data 55570 on master node 55110, which may be sent to master node 55110 from server 100 (e.g., scan data 570 maintained within server 100 on captured barcode information on items being shipped) or from a barcode scanning device, such as an ID node enabled barcode scanner 55200 used to capture barcode information related to the package. Those skilled in the art will appreciate that such an ID node enable barcode scanner 55200 may be implemented based upon exemplary ID node 120*a* where one of the sensors 360 may include a barcode scanner (e.g., laser-based or image capture type of device) that extracts barcode information from an externally viewable/scannable barcode label on a package.

FIG. 57 is a flow diagram illustrating an exemplary motion-based method for improved tracking of package placement relative to a plurality of container node-enabled logistics containers as part of a monitored loading operation using a wireless node network including at least a managing node (such as a master node or a server) in accordance with an embodiment of the invention. Referring now to FIG. 57, method 5700 begins at step 5705 where a container node in each of the logistics containers is activated to monitor an interior package storage area of each of the logistics containers using at least a motion sensor on the container node. Such a motion sensor may, for example, use one or more sensing elements and may collectively be implemented as an inertial sensor, a shock detector, an accelerometer, or a microelectromechanical (MEMS) sensor. When implemented with multiple sensing elements, each sensing element of a particular motion sensor may be disposed proximate to different portions of the interior package storage area (such as proximate to different portions of floor 55205 in logistics container 55100A). For example, as shown in FIG. 55, each of container nodes 54000*a*-54000*c* may be activated, as part of system 5500, to monitor the interior package storage area within each of their respective logistics containers 55100A-55100C.

At step 5710, method 5700 has the managing node receiving a detection notification from one of the container nodes where the detection notification indicates at least detection of a signal broadcast from an ID node in the wireless node network and an identification of the ID node. Such an ID node is associated with a package involved in the loading operation. For example, step 5710 may be implemented when master node 5510 receives a detection notification from container node 54000*a*, and that notification indicates detection of a signal from ID node A 55120*a* associated with package 55130*a* and the identification of ID node A 55120*a*. In more detail, the detection notification sent to master node 55110 may have a device signature for ID node A 55120*a* derived from the signal broadcast from the ID node A 55120*a*. Such a device signature generally operate as an identifier of the ID node, such as MAC address or a shipment tracking number unique to the node, and may be included in part of the signal broadcast from the ID node (such as a part of the signal's header).

At step 5715, method 5700 has the managing node receiving a sensed impact notification as part of the detection notification received from the reporting one of the container nodes. The sensed impact notification provided as part of the notification received by the managing node indicates a motion sensor on the reporting container node detected an impact force on its related logistics container. Stated another way, the managing node receives information from one of the container nodes about a detected package ID node signal as well as a detected impact force on the container node's logistics container as part of steps 5710 and 5715.

In a more detailed embodiment of method 5700, the sensed impact notification received by the managing node may indicate the motion sensor on the reporting container node detected the impact force on the logistics container associated with the reporting container node within a threshold time period after the reporting container node's short range communication interface detected the signal broadcast from the ID node. Such a sensed impact notification may also, in a further embodiment, indicate the detected impact force on the logistics container associated with the reporting container node was at least the threshold level of impact force. Thus, the received detection notification may include detection details relating to the different monitored events (detection of an electronic signal from a package ID node and detection of a physical impact force) as well as level, timing, and threshold information about such events centric to the container node's associated logistics container.

At step 5720, method 5700 proceeds with the managing node determining if the package is appropriately loaded within the logistics container associated with the reporting container node by comparing information in the received detection notification from the reporting container node and anticipated inventory data for the logistics container associated with the reporting container node. In a more detailed embodiment of method 5700, step 5720 may first involve having the managing node accessing its memory storage to locate shipping information on the relevant package based upon the identification of the ID node included in the detection notification. Then, the managing node may read the anticipated inventory data for the logistics container associated with the reporting container node from the managing node's memory storage and verify the package is appropriately loaded based upon a comparison of the package's located shipping information and the anticipated inventory data for the logistics container associated with the reporting container node.

Next, at step 5725, method 5700 has the managing node transmitting an acknowledgement message to the reporting one of the container nodes based upon whether the managing node determines the package is appropriately loaded. This feedback, in some further embodiments, may be used by the relevant container node (as explained above) as part of generating and transmitting a misload message to a user access device operated by logistics personnel (e.g., tablet or handheld smartphone operating as a type of ID node, such as user access devices 200, 205) so that the logistics personnel are automatically and proactively notified of the misloading situation. This has an advantageous effect based upon this technical interactive node solution of opening a corrective window during the loading operation, rather than finding out about the misloaded package after the logistics container has been closed up and moved from the loading location.

Steps 5730 and 5735 of method 5700 may have the managing node updated load operation related information in response to the received information from the reporting container node. In particular, at step 5730, method 5700 has the managing node updating current inventory information for the logistics container associated with the reporting container node to reflect appropriate placement of the package associated with the ID node as being part of an inventory of contents maintained within the logistics container associated with the reporting container node. For example, as shown in FIG. 55, master node 55110 may update inventory data 55600 with current inventory information for logistics container 55100A associated with container node 54000a to reflect appropriate placement of package 55130a (which is associated with ID node A 55120a) as being part of what is now maintained within logistics container 55100A.

In some further detailed embodiments of method 5700, the acknowledgement message (originally transmitted back to the reporting container node about whether the managing node determined the package is appropriately loaded in step 5725) may include a confirmation message to the reporting container node with the updated current inventory information for the logistics container associated with the reporting container node when the anticipated inventory data and the shipping information are used by the managing node to verify that the package is appropriately loaded within the logistics container associated with the one of the container nodes. The confirmation message's updated current inventory information may, for example, reflect appropriate placement of the ID node's package as being in the reporting container node's logistics container. Further still, other embodiments may have the managing node reporting the updated current inventory information up to the server in the wireless node network.

While step 5730 focuses on updating inventory information, step 5735 may be employed in an embodiment of method 5700 to have the managing node update a loading productivity parameter in response to receiving the sensed impact notification. Such a loading productivity parameter is related to the logistics container associated with the particular reporting container node and indicates how quickly that logistics container is being loaded as part of the loading operation. For example, master node 55110 may implement step 5735 in an embodiment of method 5700 by updating productivity data 55605 as a way or recording relevant information about the loading process taking place relative to each of the containers 55100A-55100C that are monitored by container nodes 54000a-54000c as well as master node 55110. Further still, and similar to the updated current inventory information, an embodiment may also have master node 55110 reporting the updated loading productivity parameter to server 100 in the wireless node network. In other embodiments, such updated loading productivity parameter information may already be stored on the server 100 when the server operates as the managing node for purposes of method 5700.

Finally, at step 5740, an embodiment of method 5700 may leverage barcode scan data that has been gathered relative to the package during loading as a further check on whether the loading processes for the relevant logistics container is being performed accurately. In more detail, at step 5740, the managing node may compare (a) the sensed impact notification indicating the package was loaded into the particular logistics container associated with the reporting container node and (b) barcode scan data related to the package (such as scan data 55570 reported to and stored within the managing node via the server or a separate barcode scanner (e.g., barcode scanner ID node 55200) to verify the accuracy of the barcode scan data.

In light of the above-described method 5700 focusing on specific operations from a managing node perspective (and its variants), a further exemplary system level embodiment involving motion-based tracking of package placement within a logistics container may deploy multiple container node-enabled logistics containers (such as containers 55100A-55100C), each of which are disposed and interact with a managing node (such as master node 55110) as part of a monitored loading operation where one or more packages are being loaded into one or more of the logistics containers. Each of the logistics containers has an interior storage area capable of maintaining at least one package and includes a respective container node that, as explained in the embodiments above relative to FIGS. 54-56, may monitor and track package placement within their logistics container. In this way, the different logistics containers in this system embodiment are respectively associated with different container nodes.

In more detail, the container nodes in this system embodiment (such as the examples shown in FIG. 55) represent a mid-level monitoring and managing element of a wireless node network. In general, each of the container nodes in this exemplary system embodiment includes at least a motion sensor and two different communication interfaces. The container node's motion sensor is deployed and disposed relative to the container node's associated logistics container such that the motion sensor (with one or more sensing elements) operates to detect an impact force on that logistics container. In more detailed embodiments, the container node's motion sensor may be implemented with an inertial sensor, a shock detector, an accelerometer, and a microelectromechanical (MEMS) sensor.

One of the communication interfaces on the container node (e.g., short range communication interface 54480 on exemplary container node 54000 as shown in FIG. 54) operates to communicate over a short range communication path with an ID node associated with a package to be shipped (such as ID node A 55120a associated with package 55130a or ID node B 55120b associated with package 55130b). The ID node in communication with the container node via this first communication interface is representative of a low-level element of the wireless node network. The other communications interface on the container node (e.g., medium/long range communication interface 54485 on exemplary container node 54000 as shown in FIG. 54) operates to communicate over a long range communication path (typically in a distinct format when compared to the format used by the first communication interface).

Configured in this manner, each of the container nodes in this system embodiment are operative to cause the first communication interface to enter a scanning mode that electronically listens for a signal broadcast from such an ID node; identify a device signature of the ID node when the container node's first communication interface detects the signal broadcast from the ID node; determine whether the container node's motion sensor detected the impact force within a threshold time from when the first communication interface detected the signal broadcast from the ID node, and then cause the container node's second communication interface to transmit a notification to the managing node. Such a notification includes the identified device signature of the ID node and motion status information reflecting whether the motion sensor detected the impact force within the threshold time.

The managing node in this exemplary system embodiment represents and is disposed as an upper-level element of the wireless node network that is logically associated with each of the mid-level container nodes. In other words, the managing node may be deployed in a server-authorized logical relationship with the container nodes that has the managing node interactively receiving information from and managing each of the container nodes. In more detail, the managing node in this system embodiment (e.g., the master node 5510 as deployed in system 5500 shown in FIG. 55) communicates with each of the container nodes over the long range communication path (e.g., Wi-Fi, cellular, or the like) to receive the above-described transmitted notification from each of the container nodes. In response to receiving the transmitted notification from each of the container nodes, the managing node in this system embodiment operates at this upper-level of the network (e.g., a hierarchical network having the managing node, the container nodes on a level down, and one or more package ID node on a further level down) to identify one of the container nodes. The managing node performs this identification task based upon the motion status information in the transmitted notification from the reporting container nodes indicates detection of the impact force. The managing node in this systems embodiment also determines a confirmation level indicating a successful load of the package associated with the ID node (i.e., the ID node identified in the received notification). To do this, the managing node compares information in the notification (e.g., the identified device signature of the ID node derived from part of that node's broadcasted signal and motion status information reflecting whether the motion sensor detected the impact force within the threshold time) and anticipated inventory data for the logistics container associated with the identified container node. In some embodiments, the motion status information reflects whether the detected impact force was at least a threshold level of force. Then, the managing node, as part of this exemplary system embodiment, transmits an acknowledgement message to the identified one of the container nodes based upon the determined confirmation level.

In more detail, an embodiment of the managing node used as part of such a system embodiment may deploy a memory storage maintaining at least shipping information on the package and the anticipated inventory data for the logistics container associated with the one of the container node. The managing node may then, as part of the system, determine the confirmation level indicating the successful load of the package by accessing the memory storage within the managing node to locate the shipping information on the package based upon the identified device signature of the ID node included in the transmitted notification from the identified one of the container nodes. The managing node may also access its memory storage to locate the anticipated inventory data for the logistics container associated with the identified one of the container nodes. The managing node may then determine the confirmation level by comparing the shipping information on the package and the anticipated inventory data for the logistics container associated with the identified one of the container nodes to verify the package was properly loaded.

Further still, if the confirmation level indicates the package was properly loaded, the system embodiment's managing node may update current inventory information maintained in the memory storage to reflect proper loading of the package associated with the ID node as being part of an inventory of contents maintained within the logistics container associated with the identified one of the container nodes. And if the confirmation level indicates the package was properly loaded, the acknowledgement message transmitted by the managing node may comprise a confirmation message to the identified one of the container nodes. Such a confirmation message may include the updated current inventory information on the logistics container associated with the identified one of the container nodes. In further embodiments, the updated current inventory information may be reported by the managing node to a server at a top-level of the network (i.e., in a level above that of the managing node, the container nodes, and any package associated ID nodes that may make up the wireless node network)

However, if the confirmation level indicates the package was not properly loaded, the acknowledgement message transmitted by the managing node in the system embodiment may include an unload warning to the identified one of the container nodes indicating a misloaded status of the package.

In addition to monitoring tracked package placement related to container node-enabled logistics containers, the system embodiment's managing node may track productivity of loading the different logistics containers. For example, a further embodiment may have the managing node being further operative to update a loading productivity parameter in response to receiving the transmitted notification from one of the container nodes. Such a loading productivity parameter is related to the logistics container associated with the identified one of the container nodes transmitting the notification, and indicates how quickly that particular logistics container associated with the identified container node is being loaded as part of the monitored loading operation.

And as noted above, the managing node may verify the accuracy of barcode scan data gathered relative to the package during loading. To do so, a further system embodiment may have the managing node verify the accuracy of barcode scan data captured during the monitored loading operation and maintained within the memory storage by comparing (a) the confirmation level indicating the successful load of the package to (b) the barcode scan data related to the package.

While the above description relies on detecting an electronic signal broadcast from a package's ID node as part of the multi-mode monitoring used to track package placement in the various embodiments described, a further embodiment may use multi-mode monitoring in the form of impact detection and barcode scanning (and in even some cases detecting ID node signals) in order to track package placement within a logistics container using a container node. For example, as shown in FIG. 55, exemplary logistics container 55100A currently maintains different packages 55130*a*-55130*c*. Packages 55130*a* and 55130*b* are each enhanced with respective ID nodes 55120*a* and 55120*b*. However, package 55130*c* is not enhanced with an ID node. Thus, when package 55130*c* is being loaded, there are no ID node broadcast signals to detect emanating from package 55130*c*. As such, a further embodiment of exemplary container node 54000*a* may still be able to track package placement within container 55100A. In general, an impact detected by the container node's motion sensor may be correlated back to information on a barcode scanning event for the same package as a way to track package placement. Thus, a package without an operating ID node may be loaded and received within logistics container 55100A with the exemplary container node 54000*a* deploying another type of multi-mode monitoring to track package placement pursuant to the method (and its variants) explained below with respect to FIG. 58.

Figure 58:
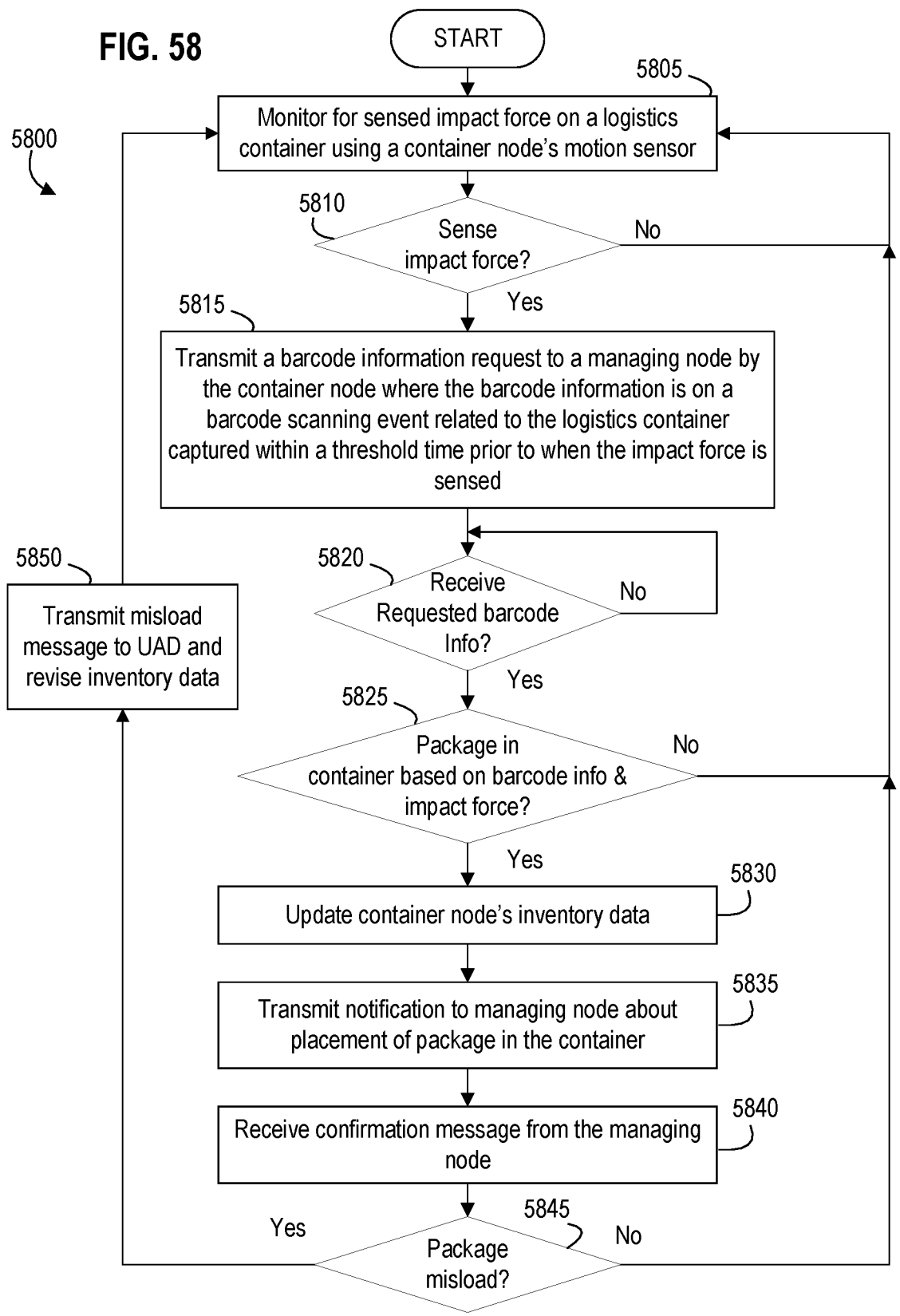
FIG. 58 is a flow diagram illustrating an exemplary motion-based method for improved tracking of package placement in a container node enabled logistics container in a monitored loading operation involving ID node enabled packages and non-node enabled packages in accordance with an embodiment of the invention.

In more detail, FIG. 58 is a flow diagram illustrating an exemplary motion-based method for improved tracking of package placement in a container node enabled logistics container in a monitored loading operation capable of handling ID node enabled packages and non-node enabled packages in accordance with an embodiment of the invention. Referring now to FIG. 58, exemplary method 5800 begins at step 5805 where the container node monitors for a sensed impact force on the logistics container using a motion sensor on the container node (such as motion sensor 54465 on exemplary container node 54000 or any of sensor elements 54465a-54465c on exemplary container node 54000a). As noted above, an exemplary motion sensor may be implemented as an inertial sensor, a shock detector, an accelerometer, and a microelectromechanical (MEMS) sensor. In some embodiments, such as that shown in FIG. 55, the motion sensor may be implemented with multiple sensing elements that, in further embodiments, are disposed proximate to different portions of an interior storage area within the logistics container (e.g., sensor elements 54465a-54465c on exemplary container node 54000a are shown disposed proximate different areas of floor 55205 of logistics container 55100A).

At step 5810, method 5800 determines whether the container node's motion sensor has sensed an impact on the logistics container. For example, the motion sensor may report information on a level of the impact force as sensed by one or more of the sensing elements within the interior of the logistics container. If an impact force has been sensed, step 5810 proceeds directly to step 5815. Otherwise, step 5810 proceeds back to step 5805 for continued monitoring.

At step 5815, method 5800 proceeds with the container node transmitting a request for barcode information to a managing node. The requested barcode information corresponds to a barcode scanning event related to the logistics container and captured within a threshold time prior to when the impact force was sensed. In other words, the container node requests barcode information from the managing node where the barcode information is locally stored on the managing node (e.g., recently stored information within scan data 55570 on master node 55110) as barcode scan data captured related to loading the container node's logistics container and captured sufficiently near when the container node's motion detector sensed an impact force. For example, barcode scanner ID node 55200 may be located and used near a doorway into logistics container 55100A. As such, barcode scanner ID node 55200 may capture and transmit relevant barcode information about package 55130a up to master node 55110 as package 55130a is being loaded into logistics container 55100A. In this way, master node 55110 may maintain such barcode information (including timing information about the barcode scanning event related to package 55130a) as part of scan data 55570 onboard the memory of master node 55110. As such, the container node at step 5815 essentially queries the managing node (e.g., master node 55110) for such relevant and time sensitive barcode information. Accordingly, at step 5820, if the container node receives the requested barcode information from the managing node, step 5820 proceeds to step 5825. Otherwise, step 5820 proceeds back and remains waiting to receive the requested barcode information.

In some embodiments, such relevant and time sensitive barcode information may have already been transmitted to the container node by the managing node or directly from an ID node based barcode scanner (as described above) so that the time sensitive and relevant barcode information is accessible on the container node without wasting processing time of the container node requesting and receiving such information from an outside source (e.g., the managing node) in steps 5815 and 5820.

At step 5825, method 5800 proceeds with the container node determining if a first package is in the logistics container based upon the sensed impact force and the received time sensitive barcode information. In other words, the container node determines in step 5825 whether the barcode information and the sensed impact force collectively indicate that the package was placed within the interior storage area of the logistics container by considering, for example, how quickly the impact force was sensed after the scanned barcode event occurred. In some embodiments, the level of such a sensed impact force may also be a further factor on whether the package was placed within the logistics container (such as if the level of the sensed impact was too small or below a threshold level). In such an example where the sensed impact is much smaller than anticipated and less than a threshold, the package may not be within that logistics container despite the timing of how quickly the impact force was sensed relative to when the package's barcode information was scanned. However, if the sensed impact is above the threshold level and is sensed quickly after when the package's barcode information was captured, then the package may be determined in step 5825 to be within the logistics container. And even if the impact force was sensed as being above the threshold level, the time between such impact force sensing and when the package's barcode scan information is captured may be too long to determine that the package is in the logistics container. Such differences in aspects of what is multi-mode monitored relative to the logistics container may be considered when determining if the package was placed within the logistics container.

Thus, if the container node determines the package was placed within the logistics container as part of step 5825, then method 5800 proceeds from step 5825 to step 5830. Otherwise, method 5800 proceeds from step 5825 directly back to step 5805 to monitor for other sensed impact forces and restart the motion-based tracking of package placement within the logistics container.

In a more detailed embodiment of method 5800, the determination in step 5825 may be based upon a time difference between a time of capture associated with the barcode scanning event and when the motion sensor senses the impact force. As such, the determination in step 5825 may depend upon whether this elapsed time or time difference is within a threshold time period. For example, an embodiment may use 5 seconds as an exemplary threshold time period to compare when there as a relevant barcode scanning event for the logistics container to when an impact force is detected relative to the logistics container. If the compared or elapsed time is greater than 5 seconds, the container node determines the package was not placed within the logistics container. But if the compared or elapsed time is less than 5 seconds, the container node determines that such multi-modal monitoring results indicate the package was placed within the logistics container even if the package does not have an ID node deployed within it to communicate with the container node.

At step 5830, method 5800 may have the container node updating the container node's inventory data. In particular, an embodiment of method 5800 may have the container node updating inventory information maintained on a memory storage of the container node after determining if this package is placed within the container based on the received barcode information and the sensed impact force. For example, such updated inventory information may be kept as data 54600 stored within memory of exemplary container node 54000 as shown in FIG. 54.

At step 5835, method 5800 proceeds with the container node transmitting a notification to a managing node (such as a master node or a server in the wireless node network). Such a notification reflects that the received barcode information and the sensed impact force collectively indicate the package was placed within the logistics container. In this way, an embodiment of method 5800 may have the container node updating a managing component higher within the network with a status of a loading operation as reflected by the local determination of the package having been placed within the container node's logistics container even when the package is not enabled with an ID node.

At step 5840, an embodiment of method 5800 may have the container node receiving a confirmation message from the managing node in response to transmitting the notification at step 5835. Such a confirmation message received in step 5840 verifies that the package was placed within the logistics container. The verification in the confirmation message, in some instances, may confirm the package was placed in the appropriate logistics container, after which the inventory information on the memory storage may be updated (rather than at step 5830). However, in other instances, the verification in the confirmation message may indicate this non-node enabled package has been misloaded or loaded into an inappropriate logistics container. Thus, an embodiment of method 5800 may proceed to step 5850 from decision step 5845 if the package has been misloaded.

At step 5850, the container node associated with the logistics container now may take proactive and automatic steps to rectify and address the misloaded package situation automatically detected. As such, the container node in step 5850 may generate and transmit a misload message to a user access device (UAD—such as user device 200 shown in FIG. 2) operating as a type of ID node and under the operation of loading personnel involved in loading the logistics container related to the container node. The container node, as part of step 5850, may also revise the inventory data locally stored indicating the current contents of the logistics container. Thereafter, step 5850 proceeds back to step 5805 to continue monitoring for detected or sensed impact forces on the logistics container.

However, if the confirmation message received at step 5840 verifies the package was properly loaded and was supposed to be loaded into the particular logistics container related to the container node performing method 5800, method 5800 need not engage in step 5850 and simply proceeds from step 5845 directly back to step 5805 to continue monitoring for detected or sensed impact forces on the logistics container.

In a further embodiment, multi-mode monitoring by the container node for packages with an ID node depending on detected electronic ID node signals and sensed impact forces (as set forth in the various embodiments of method 5600 described above) may be combined with multi-mode monitoring for packages without an ID node where time-sensitive barcode information is gathered and used with the sensed impact forces (as set forth in the various embodiments of steps 5805-5825) to supplement how to determine if a package is in the particular logistics container. In other words, a first package that does not have an ID node within it may be monitored by the container node in compliance with method 5600 as described above (and its variants) while a second package that does have an ID node associated with it may also be monitored by the container node in compliance with method 5800 as described above (and its variants) as part of determining whether the first and second packages are placed within the container node's logistics container.

In more detail, the embodiment of method 5800 as described above may be further supplemented with steps that have the container node activating a scanning mode of the container node to electronically listen for a package ID node associated with a second package as the logistics container is being loaded. In doing so, this further embodiment of method 5800 may then have the container node detect a signal broadcast from the package ID node associated with the second package. This may be accomplished, in some instances, when the container node detects a series of increasingly stronger signals broadcast from the package ID node that has the effect of indicating the second package is growing more proximate to the logistics container. Next, this further embodiment of method 5800 may have the motion sensor on the container node sense a further impact force on the logistics container after detecting the signal broadcast from the package ID node.

The container node, in this further embodiment, may then determine whether the detected signal broadcast from the package ID node and the sensed further impact force indicate that the second package was placed within the logistics container. For example, such a determination may be based upon an elapsed time between when the container node detects the signal broadcast from the package ID node with the second package and when the motion sensor senses the further impact force. In another example, this determination may be based on whether such an elapsed time is within a threshold time period. In still another example, this determination may be based upon the further impact force as sensed by the motion sensor (or multiple sensing elements collectively making up the motion sensor) within an interior storage area of the logistics container so that the sensed impact force is focused on and relevant to the interior storage area.

This further embodiment of method 5800 may then have the container node transmitting a further notification to the managing node. Such a further notification reflects the detected signal (or series of signals) and the sensed further impact force collectively indicating that the second package was placed within the logistics container.

Additionally, similar to steps 5640 and 5650 as described with respect to method 5600, this further embodiment of method 5800 may be extended to also have the container node updating inventory information maintained on a memory storage of the container node after determining whether the detected signal broadcast from the package ID node and the sensed further impact force indicate the second package was placed within the logistics container, as well as receiving a confirmation message by the container node from the managing node, where the confirmation message verifies that the second package was placed within the logistics container.

As described above relative to exemplary method 5800 and its variants, an exemplary container node performs such steps. Thus, exemplary container node apparatus for improved tracking of package placement in a logistics container may implemented with an exemplary container node as shown in FIG. 54 (as container node 54000) and as described relative to FIG. 55 (as container node 54000a) that is operative to function as set forth above in method 5800 and its variants.

Building upon such a container node apparatus, various system embodiments may be used for improved tracking of package placement during a monitored loading operation. For example, one system embodiment may involve two components—i.e., the container node and its logistics container. Such a container node may be implemented as described above for an exemplary container node apparatus (as shown in FIG. 54 (as container node 54000) and as described relative to FIG. 55 (as container node 54000a) and operative to function as set forth above in method 5800 and its variants). Likewise, the logistics container associated with the container node may be implemented as any of the exemplary logistics containers discussed above, such as logistics container 55100A.

Another system embodiment example may involve a master node (such as master node 55110) as it interacts and manages a container node as described above relative to FIGS. 54, 55, 56, and 58 (and their respective variants). Such a system embodiment may be further expanded to include the logistics container associated with the container node, multiple container nodes (and their respective logistics containers), and a package ID node associated with one package (as a node-enabled package) and where there is another package being loaded that is not enabled with an ID node.

Active Shipment Management within a Node-Enabled Vehicle

As discussed above relative to FIGS. 20 and 21, embodiments that deploy different types of nodes described herein may be applied to a vehicular environment when dealing with logistics operations where a node is to be located within a vehicle and, perhaps, relocated or removed (such as when delivering a node-enabled package from the vehicle). Beyond this, further embodiments may actively manage shipment of the node-enabled package from such a mobile delivery platform through interrelated operations and interactions between different types of nodes that verify the package is on a particular vehicle and, in some embodiments, may actively adjust the environment of the package (e.g., remotely control a cooling/heating element associated with the package)). Still further embodiments may locate the container within the vehicle and consider weights/balance limitations and involved automated unloading instructions to address any issues automatically sensed and identified.

Figure 59:
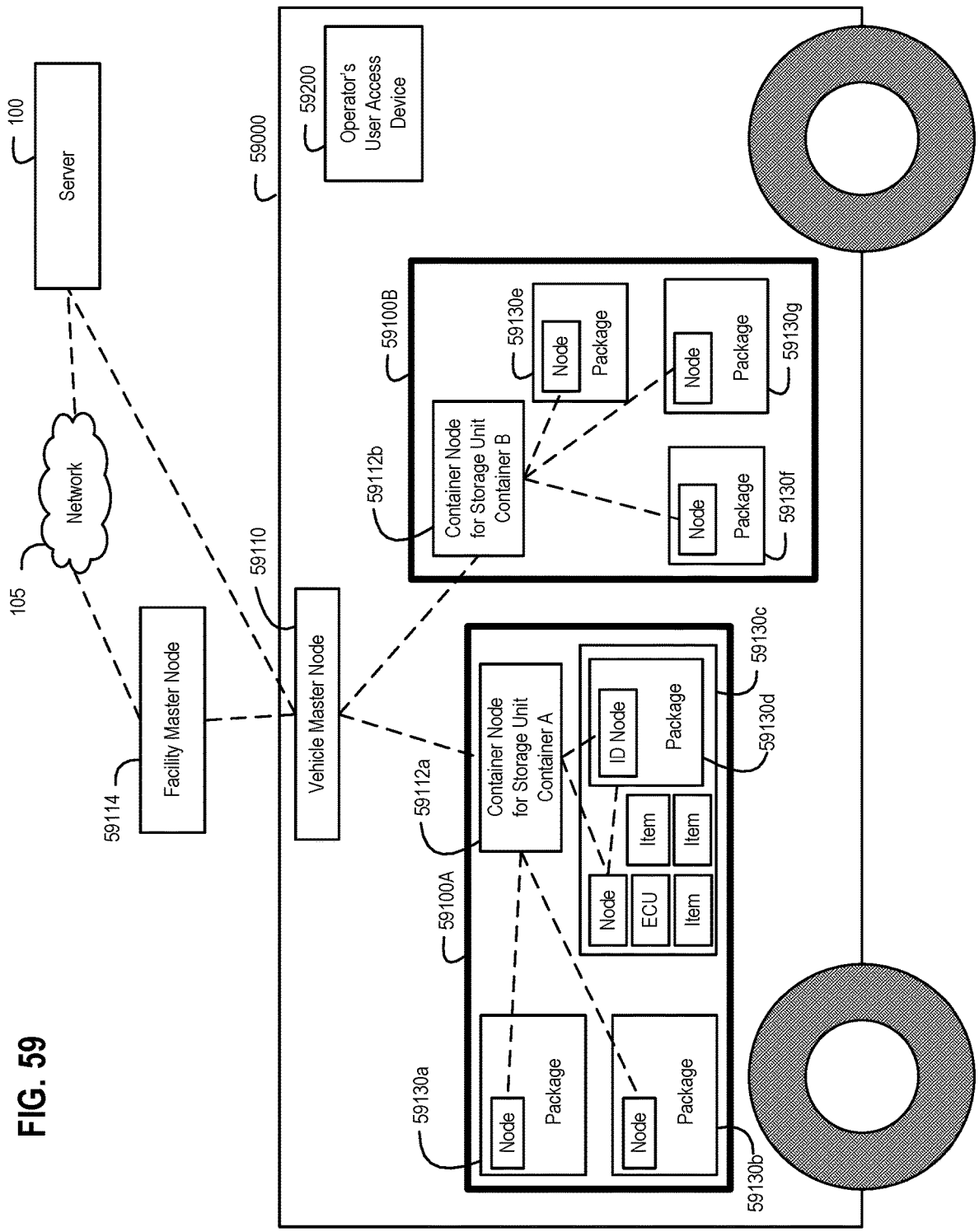
FIG. 59 is a diagram illustrating an exemplary active shipment management system as deployed within an exemplary wireless network enabled vehicle in accordance with an embodiment of the invention.

FIG. 59 is a diagram illustrating an exemplary active shipment management system as deployed within an exemplary wireless network enabled vehicle in accordance with an embodiment of the invention. Referring now to FIG. 59, an exemplary active shipment management system is shown in an embodiment with different types of nodes deployed relative to an exemplary vehicle 59000. In general, similar to vehicle 9300 shown in FIG. 20, exemplary vehicle 59000 is an example of a general mobile logistics transport or conveyance that can carry packages or containers with packages. Such a vehicle may be implemented with an automobile, a delivery van, an autonomous vehicle, a truck, a trailer, a train car, an aircraft, a marine vessel (ship, barge), and the like. Within exemplary vehicle 59000, different containers or container storage units may be placed for transport, such as a cardboard box, metal or plastic container, ULD type of container, or other types of storage unit containers. Each of such containers (generally referred to as container storage units) within vehicle 59000 may maintain a variety of different items and/or packages may be maintained. In other words, different embodiments of a storage unit container (such as storage unit container A 59100A and storage unit container B 59100B) may store a single package, multiple packages, unpackaged items, a mix of packaged and unpackaged items, or may storage a wide variety of different types of packages that use different types of packaging materials (e.g., corrugated fiberboard boxes, wooden and non-wooden pallets, containers, etc.) and in small or large numbers depending on the intended use and what is to be transported within such a storage unit container. As shown in FIG. 59, exemplary vehicle 59000 at least temporarily maintains storage unit container A 59100A and storage unit container B 59100B. Within storage unit container A 59100A, packages 59130a-d are shown as being stored. Likewise, storage unit container B 59100B is illustrated as storing packages 59130e-g.

Vehicle 59000 is illustrated as including a variety of node-based devices capable of communicating with each other as parts of a wireless node network, such as a package-based ID node, a container node, a vehicle node, and a user access device (such as a smartphone or tablet) operating as a type of ID node. In particular, exemplary vehicle 59000 includes a vehicle master node 59110 (a general example of a vehicle node) disposed with the vehicle 59000. The vehicle master node 59110 provides a wireless communication path from within the vehicle to a managing node (such as facility master node 59114 or server 100) located external to the vehicle 59000. Each of storage unit container A 59100A and storage unit container B 59100B within vehicle 59000 include a respective associated container node 59112a, 59112b. Container node 59112a communicates with and helps manage different ID nodes disposed within packages 59130a-59130c kept within storage unit container A 59100A. Likewise, container node 59112b communicates with and helps manage different ID nodes disposed within packages 59130e-59130g kept within storage unit container B 59100B. The ID nodes are associated with different packages 59130a-59130g being shipped in different storage unit containers 59100A, 59100B within vehicle 59000. As generally explained above with reference to exemplary ID node 120a (on which each of the ID nodes in the various packages 59130a-59130g is based), each of the ID nodes can send and receive advertising signals when disposed within the vehicle 59000 to communicate with other ID nodes as well as with the container node associated with the storage unit container maintaining the particular ID node.

As shown in FIG. 59, an embodiment of an exemplary active management system relative to wireless network enabled vehicle 59000 has vehicle node 59110 being operative to broadcast a management request within the vehicle 59000. The management request broadcast by vehicle node 59110 relates to an ID node-enabled package being shipped (such as ID node-enabled package 59130a). In this example systems embodiment, exemplary container node 59112a receives the broadcasted management request related to the package 59130a. Container node 59112a identifies the ID node associated with the package based upon shipping information included in the management request, and thus is able to filter out signals from other ID nodes that are unrelated to the management request. With the identification of the ID node associated with the relevant package 59130a, container node 59112a listens within its storage unit container A 59100A to receive one or more broadcasted advertising signals from the package's ID node as part of determining a location of that ID node (which may, for example, be accomplished via the various techniques disclosed above). Based upon the determined location of that ID node, the container node 59112a verifies the relevant package is on vehicle 59000 and, in response to the location-based verification, transmits a verification message to the vehicle node 59110 indicating whether the package 59130a is verified as being on the vehicle 59000.

In response to the verification message, vehicle node 59110 is further operative to transmit a shipment update message to a managing node external to the vehicle (such as facility master node 59114 or server 100 (directly or via an indirect path through network 105 when using facility master node 59114 as a messaging intermediary). Furthermore, in this embodiment, those skilled in the art will appreciate that exemplary facility master node 59114 may be based upon exemplary master node 110*a* as explained above relative to FIG. 4, and as deployed within FIG. 59 may be associated with a delivery location, transfer facility, or a master node associated with another type of delivery conveyance (e.g., train, truck, ship, etc.) that manages or is able to communicate with vehicle node 59110 on vehicle 59000.

In this system embodiment, the shipment update message transmitted by vehicle node 59110 is based upon the verification message received by the vehicle node 59110 and indicates updated shipping information related to the package 59130*a*. In more detail, the package's updated shipping information may include a package status indicating the package is or is not on the wireless network enabled vehicle 59000. In still further embodiments, the package's updated shipping information received by vehicle node 59110 may include an unloading instruction for the package relative to the location of the ID node or an environmental condition information related to the package and the location of the ID node (as explained in more detail below related to exemplary package 59130*c*).

In a further system embodiment, a container node may transmit warnings, generate specific instructions, and update logistics loading and unloading information relative to its storage unit container. For example, exemplary container node 59112*a* may be further operative to transmit an imbalance warning to vehicle node 59110 when the container node 59112*a* identifies an imbalance condition based upon (a) shipping information related to package 59130*a* and (b) a comparison of the determined location of the ID node for package 59130*a* and a weight-related placement scheme, which may be related to vehicle 59000 or the storage unit container 59100A associated with the container node 59112*a*. As such, the container node in this further system embodiment may proactively and automatically identify an imbalance condition relative to the package as it sits within the storage unit container and/or the vehicle as a whole and automatically notify the vehicle node about such a condition. Thereafter, in this further system embodiment, the vehicle node may generate a vehicle imbalance notification in response to receiving the imbalance warning from the container node. Such a vehicle imbalance notification may be sent, for example, to an external managing node for the vehicle (e.g., facility master node 59114 or server 100) or to an operator/occupant of the vehicle via an operator's user access device 59200 (setup similarly as a user access device (UAD) 200 operating as an ID node).

In another embodiment, the container node 59112*a*, for example, may generate a location-based unload instruction for the package 59130*a* upon verifying the package is on the vehicle 59000 and based upon the determined location of the ID node. The determined location upon which the location-based unload instruction is based may be the location of the ID node relative to within the particular storage unit container or, in other instances, relative to which the vehicle as a whole (or within a specific part of the vehicle, such as a cargo area).

In some embodiments, container node 59112*a* may update a location-based unload scheme for the vehicle 59000. This may happen locally to a copy of the location-based unload scheme for vehicle 59000 kept within the memory of container node 59112*a*. In such a case, the container node 59112*a* modifies part of the information within its copy of the location-based vehicle unload scheme and may transmit the updated scheme to the vehicle node. However, in another example, container node 59112*a* may not keep a local copy of the vehicle's location-based unload scheme. In such a case, the container node 59112*a* may update a location-based unload scheme for the vehicle 59000 by sending the modified information to vehicle node 59110, which then modifies the vehicle node's copy of the location-based unload scheme.

Figure 60:
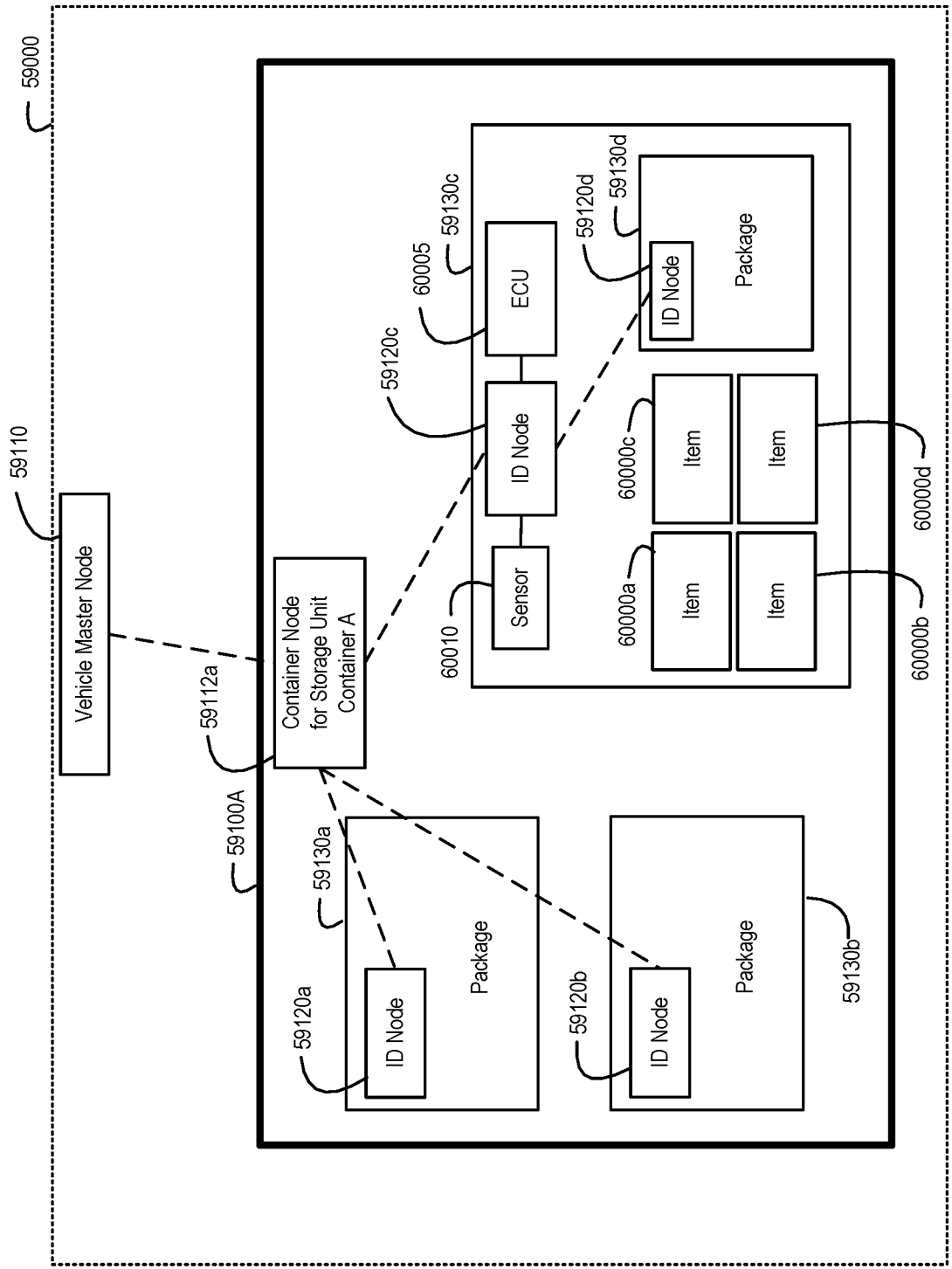
FIG. 60 is a diagram illustrating further details of an exemplary ID node enabled package maintained within the exemplary wireless network enabled vehicle as shown in FIG. 59 where the ID node enabled package includes an exemplary environmental control unit operative with the ID node in the package in accordance with an embodiment of the invention.

In some active shipment management system embodiments, a storage unit container or a package as part of the system may include an environment control unit (ECU) that essentially operates similar to a heater, air conditioner, and/or humidifier to keep a desired temperature and/or humidity in its surrounding area for the benefit of what is being shipped within the relevant storage unit container or package. FIG. 60 is a diagram illustrating further details of an exemplary ID node enabled package maintained within the exemplary wireless network enabled vehicle as shown in FIG. 59 where the ID node enabled package includes an exemplary environmental control unit operative with the ID node in the package in accordance with an embodiment of the invention. Referring now to FIG. 60, exemplary storage unit container A 59100A from within vehicle 59000 is shown in more detail with packages 59130*a*-59130*d* and their respectively associated ID nodes 59120*a*-59120*d*. As shown in FIG. 60, items 60000*a*-60000*d* and package 59130*d* (enabled with ID node 59120*d*) are collectively disposed in a nested configuration within package 59130*c* (enabled with ID node 59120*c*). In this manner, package 59130*c* provides further packaging for groups of items and/or packages (some of which may be node-enabled, such as package 59130*d*).

Package 59130*c* is also illustrated having an exemplary environmental control unit (ECU) 60005 disposed within it and operatively coupled to the ID node 59120*c* associated with package 59130*c*. ID node 59120*c* is responsive to a control message generated by container node 59112*a* and provided to ID node 59120*c* in order to cause ID node 59120*c* to adjust a setting of the environmental control unit 60005 by changing at least one control parameter (e.g., temperature) in order to provide a desired thermal effect on the contents of the ID node's package 59130*c*. In a further embodiment, container unit 59112*a* may generate such a control message based upon sensor data received from the package's ID node 59120*c*. For example, ID node 59120*c* may include an environmental sensor 60010 (similar to sensor 360 explained relative to an embodiment of ID node 120*a* in FIG. 3). Sensor 60010 operates to capture sensor data characterizing a status of package 59130*c*, such as a temperature of the interior of package 59130*c*. Sensor 60010 provides the captured sensor data to ID node 59120*c*, which may provide the sensor data to container node 59112. As such, the control message generated by container node 59112 may be an ECU adjustment based upon the sensor data as provided by ID node 59120*c* to the container node 59112*a*.

Other embodiments may have ECU modules in more than one of the packages or, more generally, in more than one of the storage unit containers. Furthermore, those skilled in the art will appreciate that a nested ID node-enable package, such as package 59120*d*, may indirectly provide sensor data to a container node, such as container node 59112*a*, using a sensor associated with its ID node 59120*d* to capture the sensor data characterizing the interior of package 59120*d*. In this way, ID node 59120*d* may receive the sensor data from its sensor, transmit the sensor data to the ID node 59120*c* for the enveloping package 59120*c*, and then ID node 59120*c* may provide the sensor data received from ID node 59120*d* back up to container node 59112*a* as a type of feedback for controlling ECU 60005.

Figure 61:
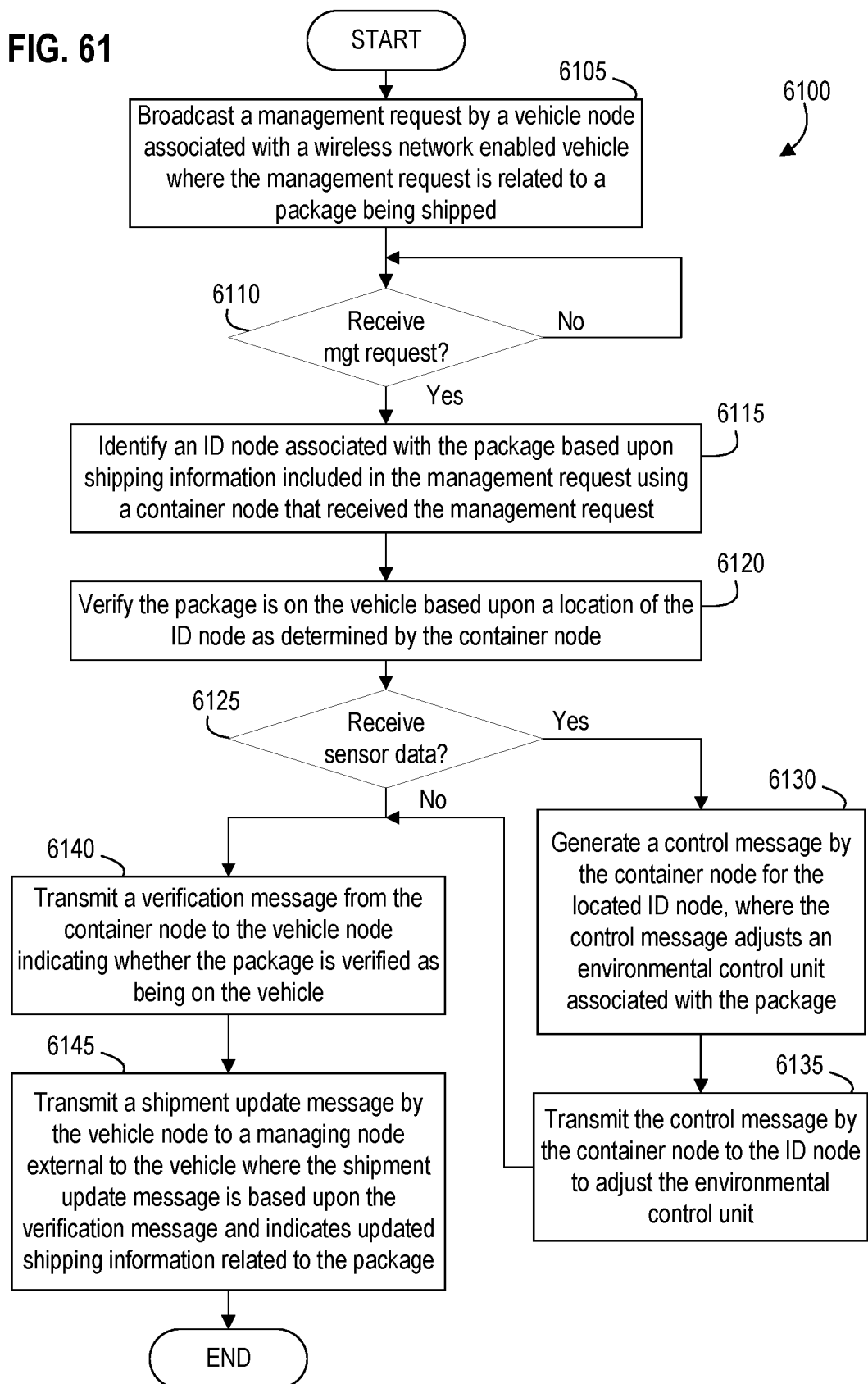
FIG. 61 is a flow diagram illustrating an exemplary method for active shipment management within a wireless network enabled vehicle in accordance with an embodiment of the invention.

In light of the above-described exemplary components that make up and interact with each other collectively as an exemplary active shipment management system, a further embodiment more specifically focuses on system's method of operation. In more detail, FIG. 61 is a flow diagram illustrating an exemplary method for active shipment management within a wireless network enabled vehicle in accordance with an embodiment of the invention. Referring now to FIG. 61, method 6100 begins at step 6105 where a vehicle node (such as vehicle master node 59110) broadcasts a management request within a wireless network enabled vehicle (such as vehicle 59000). The management request broadcast by the vehicle node is related to a particular package being shipped.

At step 6110, method 6100 waits for a container node within the system to receive the broadcasted management request. As such, if the container node receives the broadcasted management request from vehicle's vehicle node, then step 6110 proceeds to step 6115. Otherwise, method 6100 stays in step 6110. The receiving container node may be one of multiple container nodes disposed within the wireless network enabled vehicle and is associated with a storage unit operative to maintain the package. For example, as shown in FIG. 59, at both of container nodes 59112a and 59112b may have received the management request broadcast by vehicle master node 59110, and each of container node 59112a and 59112b are associated with different storage unit containers that each may maintain the package of interest related to the management request.

At step 6115, method 6100 proceeds with having the container node identifying an ID node associated with the package of interest based upon shipping information included in the management request. In this way, for example, container node 59112a may identify ID node 59120a associated with package 59130a based upon shipping information for the package included in the management request received by container node 59112a.

At step 6120, method 6100 proceeds to have the container node verify the package is on the wireless network enabled vehicle based upon a location of the ID node as determined by the container node. For example, as part of step 6120, container node 59112a may interact with ID node 59120a to determine the location (actionable or actual) of ID node 59120a via various techniques as described above (e.g., methods that involve controlling an RF characteristic of a node (e.g., an RF output signal level and/or RF receiver sensitivity level), determining relative proximity, considering association information for ID node 59120a, considering location adjustments for context information and an RF environment, chaining triangulation, as well as hierarchical and adaptive methods that combine various location methodologies to locate ID node 59120a). Such a location may be a relative location within the container node's storage unit container or, in some cases, it may be a location within the vehicle (or a portion of the vehicle).

At step 6125, an embodiment of method 6100 may determine whether the container node has received any sensor data from the package. As explained above, a node-enabled package in an embodiment may also include an environmental control unit (ECU), which may be controlled by the package's ID node to provide a desired thermal effect on the contents of the package. For example, ID node 59120c may provide sensor data from sensor 60010 in an embodiment of step 6125. As such, if the container node has received sensor data from the package (notably, from the package's ID node), then step 6125 may proceed to steps 6130 and 6135 in an embodiment of method 6100. Otherwise, step 6125 proceeds directly to step 6140.

At step 6130, an embodiment method 6100 proceeds with the container node generating a control message for the located ID node. Such a control message (which may be based upon the sensor data provided by the ID node) adjusts an environmental control unit associated with the package, such as providing at least one control parameter to the located ID node to cause the environmental control unit to provide a desired thermal effect on the package. And at step 6135, an embodiment of method 6100 may also have the container node transmit the control message to the ID node in order to effect the adjustment of the package's environmental control unit. For example, container node 59112a as shown in FIG. 60 may have received sensor data originally captured by sensor 60010 and transmitted by ID node 59120c. Such sensor data may indicate a rising temperature above a desired threshold temperature (e.g., a desired shipping temperature for items 60000a-60000d within package 59130c). As a result, container node 59112a may generate a control message that changes a temperature control parameter that causes ECU 60005 to begin to cool the interior of package 59130c back down below or just to the desired threshold temperature.

At step 6140, method 6100 proceeds with the container node transmitting a verification message to the vehicle node in response to the determined of step 6120. Specifically, the verification message indicates whether the package is verified as being on the wireless network enabled vehicle as determined in step 6120. Thereafter, the vehicle node transmits a shipment update message to a managing node external to the wireless network enabled vehicle in step 6145. The managing node (e.g., a master node (such as facility master node 59114) or a server (such as server 100)) generally tracks and manages the vehicle node. Thus, the shipment update message sent to the managing node is based upon the verification message received by the vehicle node and indicating updated shipping information related to the package. For example, such updated shipping information may include an unloading instruction for the package relative to the location of the ID node, an environmental condition information related to the package and the location of the ID node, a package status indicating the package is on the wireless network enabled vehicle, and a package status indicating the package is not on the wireless network enabled vehicle.

A more detailed embodiment of method 6100 beyond step 6145 may have the container node generating a location-based unload instruction for the package. Such a location-based unload instruction is based upon and related to the determined location of the ID node within the storage unit or within the vehicle.

Another detailed embodiment of method 6100 beyond step 6145 may have the container node updating a location-based unload scheme for the wireless enabled vehicle based upon the location of the ID node. As noted above, this may be accomplished by the container node modifying locally stored data representing the location-based unload scheme for the vehicle or, in some embodiments, may have the container node sending modified data or instructions on what to modify in data stored within the vehicle node representing the location-based unload scheme.

Figure 62:
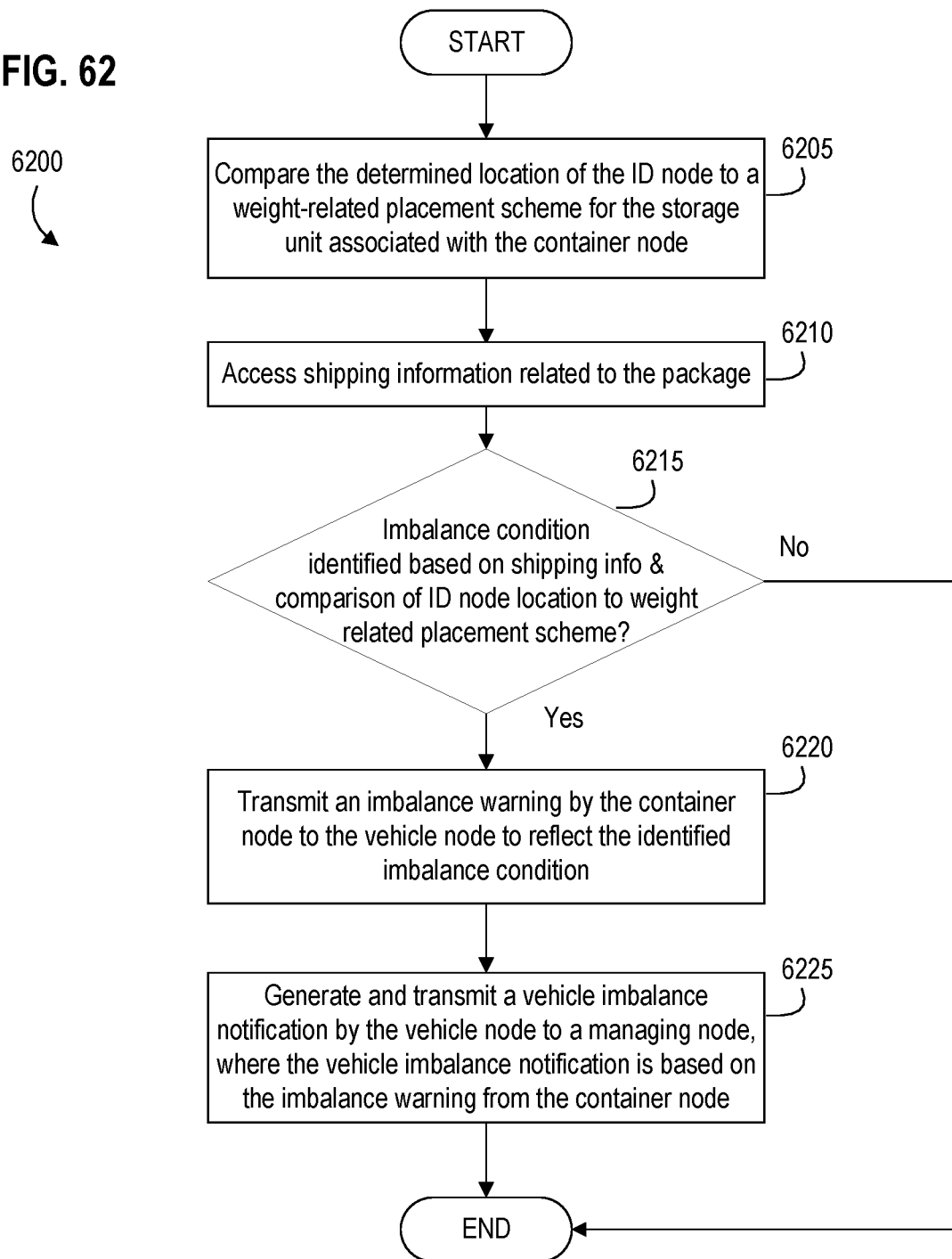
FIG. 62 is a flow diagram illustrating additional steps in a further embodiment of the exemplary method for active shipment management as shown in FIG. 61 in accordance with an embodiment of the invention.

FIG. 62 is a flow diagram illustrating still other steps in a further embodiment of the exemplary method 6100 for active shipment management as shown in FIG. 61 in accordance with an embodiment of the invention that involves a weight-related placement scheme. Referring now to FIG. 62, the additional steps (collectively referred to as sub-method 6200) begin at step 6205 where the container node may compare the determined location of the ID node (from step 6120) to a weight-related placement scheme for the ID node's package. Such a weight-related placement scheme may, for example, be related to the container node's storage unit container or the vehicle (e.g., a storage area within the vehicle, such as a van's rear storage area or an aircraft's cargo area).

At step 6210, the container node may access shipping information related to the particular package associated with the located ID node. Such information may, in some embodiments, be locally already available within memory of the container node. In other embodiments, the container node may request and receive the particular shipping information from the vehicle node (which may have such information locally or need to further request and receive such information from a managing node, such as facility master node 59114 or server 100).

At step 6215, the container node may automatically identify an imbalance condition based upon the accessed shipping information related to the package and the resulting comparison of package's ID node location relative to the weight-related placement scheme. For example, the shipping information for the package may provide weight information for this specific package to the container node. Thus, based upon the container node's technical ability to locate the package's ID node and the container node's determination of the package's weight (per the accessed shipping information), the container node can automatically identify an imbalance condition by comparing this information to the weight-related placement scheme without the need for a scale within the storage unit container or the vehicle. If the imbalance condition is found (e.g., comparing such information to the weight-related placement scheme shows an inconsistency with the scheme's threshold weights relative to particular parts of the storage unit container or vehicle), then step 6215 continues to steps 6220 and 6225. Otherwise, sub-method 6200 concludes after step 6215 given such active shipment monitoring shows the package is placed in a location consistent with the weight-related placement scheme.

At step 6220, given the imbalance condition identified with respect to the package, the container node may transmit an imbalance warning to the vehicle node so as to report the identified imbalance condition related to the package. At step 6225, sub-method 6200 may continue with the vehicle node generating a vehicle imbalance notification based upon the imbalance warning transmitted by the container node, and then transmitting the vehicle imbalance notification to a managing node (such as facility master node 59114 or server 100). In this manner, wireless node-based components within the node-enabled vehicle and external to the node-enabled vehicle may be proactively informed about the imbalance condition.

Further still, an embodiment may also have the vehicle node or managing node automatically responding to such imbalance condition information (such as by sending a message to operator's user access device 59200 that is operating as another wireless node). For example, the operator's user access device 59200 may be implemented based upon an ID node with a display and such that the device can communicate directly with vehicle master node 59110 via a short range communication interface but that cannot communicate directly with server 100. Such an implementation may use BLE formatted communications so as to keep the vehicle's operator informed of what is being automatically and proactively monitored and identified onboard the vehicle. However, another example implementation of the operator's user access device 59200 may be based upon a type of master node that can communicate directly with vehicle master node 59110 via a short range communication interface (e.g., via a BLE formatted short range communication path) and also communicate directly with server 100 via a longer range communication interface (e.g., via Wi-Fi or cellular communication paths)). Such an implementation may take the form of a cellular and Bluetooth enabled smartphone or portable tablet device having a touchscreen with which the operator may view information and provide feedback to other wireless node components in the active shipment management system.

Figure 64:
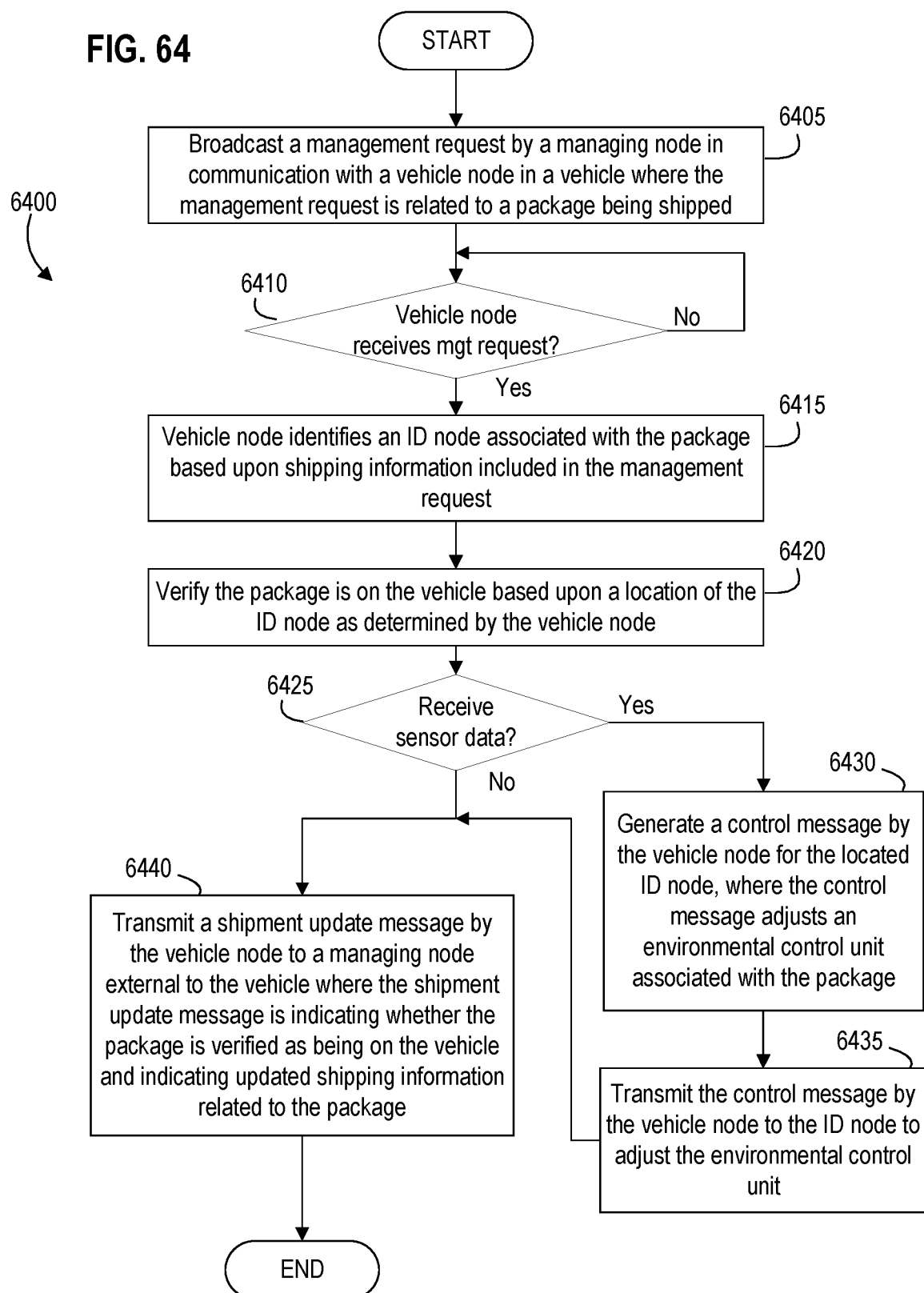
FIG. 64 is a flow diagram illustrating an exemplary method for active shipment management within a wireless network enabled vehicle as shown in FIG. 63 in accordance with an embodiment of the invention.
Figure 65:
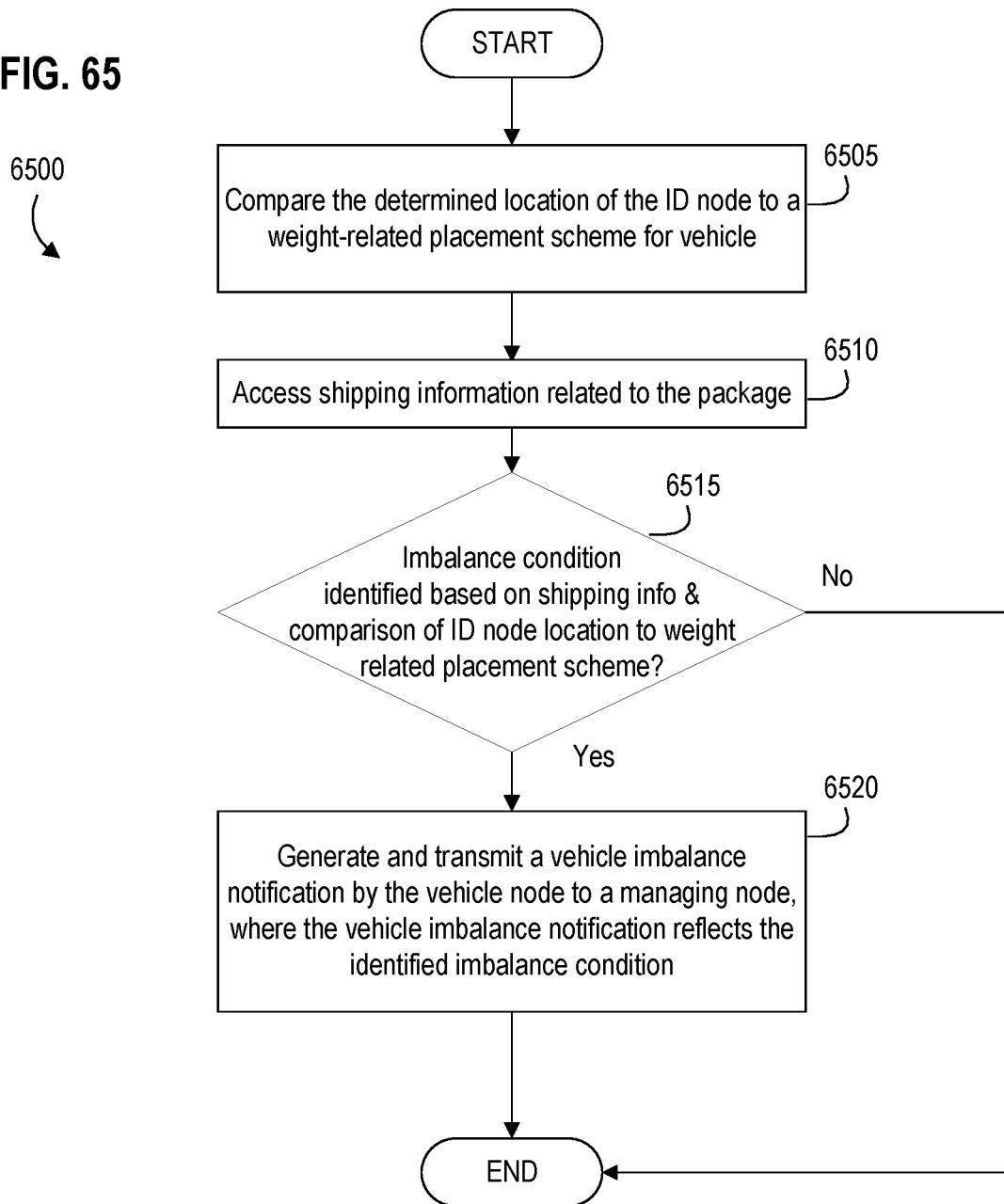
FIG. 65 is a flow diagram illustrating additional steps in a further embodiment of the exemplary method for active shipment management as shown in FIG. 64 in accordance with an embodiment of the invention.

In addition to the embodiments discussed above relative to FIGS. 59-62, an alternative embodiment of an active shipment management system within a wireless network enabled vehicle may involve ID nodes associated with respective packages maintained within the vehicle and a vehicle node disposed within the vehicle (dispensing with the container node layer within the hierarchical wireless network of such a system). An example of such an alternative system embodiment is shown via the illustrated components in FIG. 63 and the exemplary method steps as shown in FIGS. 64 and 65, where interactive communications with the package ID nodes rest with the vehicle node and are not distributed at a container level to storage container unit related container nodes.

Figure 63:
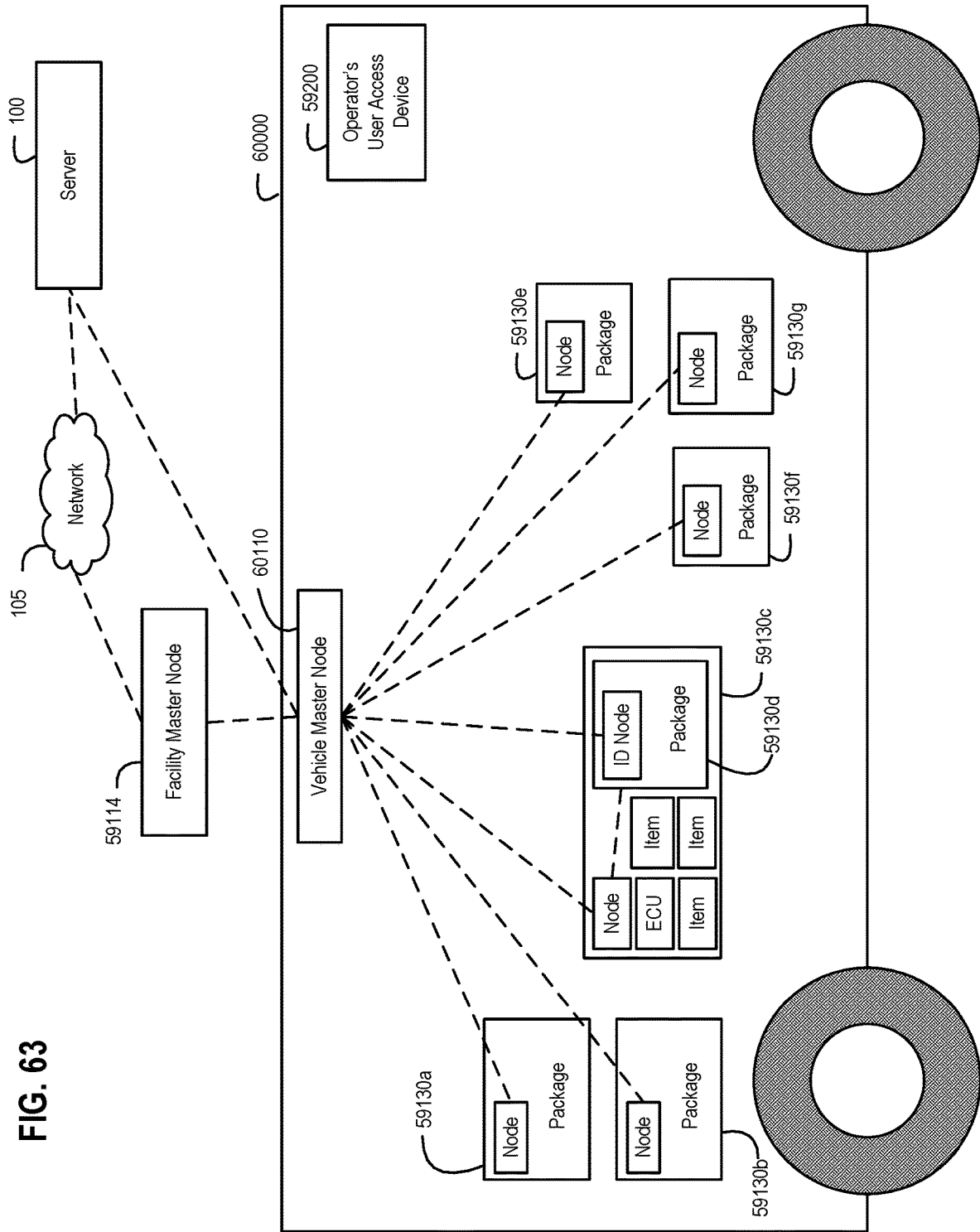
FIG. 63 is a diagram illustrating an exemplary active shipment management system as deployed within an exemplary wireless network enabled vehicle where the vehicle operates as a mobile storage unit for ID node enabled packages without using separate containers and container nodes in accordance with an embodiment of the invention.

In more detail, FIG. 63 is a diagram illustrating another exemplary active shipment management system embodiment as deployed within an exemplary wireless network enabled vehicle where the vehicle operates as a mobile storage unit for ID node enabled packages without using separate containers and related container nodes in accordance with an embodiment of the invention. In general, the system embodiment shown in FIG. 63 is similar to the embodiment shown in FIG. 59, with the exception being that there are no storage unit containers for the packages 59130a-59130g and no container nodes. As such, each of the package ID nodes 59120a-59120g communicates directly with the vehicle node 60110 and vice versa in a particular and unconventional manner as part of such an embodiment of an active shipment management system.

In this illustrated embodiment in FIG. 63, the exemplary alternative system includes a vehicle node 60110 disposed within and associated with vehicle 60000. In more detail, such a vehicle 60000 may be implemented as a mobile storage unit capable of maintaining multiple shippable items, such as a delivery van or an aircraft having a cargo area for hauling shippable items (e.g., packages). The vehicle node 60110, implemented as a type of master node (such as master node 110a) and includes at least a first communication interface providing a first wireless communication path from within the vehicle 60000 to facility master node 59114 operating as a managing node external to the vehicle. In some embodiments, the server may operate as the managing node for the vehicle master node 60110. Additionally, vehicle node 60110 also includes a second communication interface providing a second wireless communication path to ID nodes associated with packages 59130a-59130g being shipped within vehicle 60000. As such, the first wireless communication path is distinct from the second wireless communication path so that the ID nodes may communicate directly with vehicle master node 60110 but not directly with the managing node (e.g., server 100). Similar to that described relative to FIG. 59, each of the ID nodes in packages 59130a-59130g can broadcast advertising signals when disposed within the vehicle 60000 as a way to communicate with the vehicle master node 60110 and/or each other.

As part of this alternative system embodiment, the vehicle master node 60110 is operatively programmed to perform a collective set of steps that, when considered together, provide for enhanced and unconventional active shipment monitoring and management relative to the vehicle 60000 and its package contents. Specifically, as deployed in this alternative system embodiment, the vehicle master node 60110 operates to receive a management request over the first wireless communication path from the managing node (whether implemented as the facility master node 59114 or the server 100). Such a management request relates to a particular package being shipped, such as package 59130c. In response to receiving the management request, the vehicle master node 60110 identifies an ID node associated with the package 59130c based upon shipping information included in the management request and then receives one or more broadcasted advertising signals over the second wireless communication path from the ID node as part of determining a location of that particular ID node. Based upon the determined location of the ID node (as performed by the vehicle master node 60110), the vehicle master node 60110 verifies that the package is on the vehicle 60000. Thereafter, the vehicle master node 60110 transmits a shipment update message over the first wireless communication path back up to the managing node (whether the facility master node 59114 or the server 100). Such a shipment update message indicates whether the package is verified as being on the vehicle 60000 and indicates updated shipping information related to the package. Such updated shipping information may comprise, for example, an unloading instruction for the package 59130c relative to the location of its ID node, an environmental condition information related to the package 59130c and the location of its ID node, a package status indicating that package 59130c is on the vehicle 60000, and a package status indicating that package 59130c is not on the vehicle (if that is in fact the case).

Similar to that shown in FIGS. 59 and 60, the alternative system embodiment of FIG. 64 may also include an environment control unit (ECU) operatively coupled to an ID node and associated with a package. For example, package 59130c is shown in FIG. 63 having an ECU that is controlled by the ID node within package 59130c. In particular, an embodiment of the ECU may be controlled via a control message generated by the vehicle node 60110 and provided to the ID node 59130c to cause the ID node to adjust a setting of the ECU (e.g., a desired temperature to which the ECU can be set). Similar to that shown in FIG. 60, the ID node within package 59130c of FIG. 63 may include a sensor (such as a temperature sensor) that captures sensor data (such as temperature readings) characterizing a status of the package 59130c. Such sensor data may be provided by the ID node within package 59130c to the vehicle node 60110, so that any control message generated by the vehicle node 60110 may be based upon such sensor data. As such, the control message generated by the vehicle node 60110 may provide one or more control parameters to the located ID node, which then causes the ECU in accordance with the provided control parameters to provide a desired thermal effect on the package (e.g., heating or cooling the environment within package 59130c to a desired temperature consistent with the provided control parameters).

Further embodiments of this alternative system may have the vehicle node 60110 generating notifications or instructions relative to the located ID node and its related package (such as package 59130c). For example, vehicle node 60110 may generate a vehicle imbalance notification when the vehicle node 60110 identifies an imbalance condition when shipping information related to the package indicates a particular weight for the package and such a weight and location of the package (as corresponding to the determined location of the package's ID node) compared to a weight-related placement scheme automatically identify an imbalance condition within the vehicle 60000. Such a weight-related placement scheme may be implemented as a data record accessible to the vehicle node 60110 that relates to a balanced cargo load for the vehicle 60000. Such a data record representing such a weight-related placement scheme may be loaded into vehicle node 60110 in a "push" type of manner from the managing node in communication with vehicle node 60110 (e.g., facility master node 59114 or server 100). In this way, the vehicle node 60110 may be preloaded with relevant placement, locating, and unloading information specific to the particular contents to be carried within vehicle 60000.

Still further embodiments of this alternative system may have vehicle node 60110 updating a location-based unload scheme for the vehicle 60000 stored as a data record within memory on vehicle node 60110 and/or generating a location-based unload instruction for the package 59130c upon verifying the package is on the vehicle 60000 and based upon the determined location of the ID node within package 59130c.

Thus, the above described alternative embodiment of an active shipment management system involves the particular operations of the vehicle node (such as vehicle master node 60110) as it interacts with at least one of the ID nodes (such as the ID node within package 59130c) maintained within the vehicle (such as vehicle 60000). Further system embodiments may also include, for example, multiple ID nodes, the managing node (such as facility master node 59114 and/or server 100), a nested package having at least one further ID node enabled package within the nested package, and/or an operator user access device (such as device 59200) that may be the recipient of notifications and instructions from the vehicle node regarding the located ID node within the vehicle.

As noted above, FIGS. 64 and 65 provide exemplary steps on how such a vehicle node (e.g., vehicle master node 60110) in such an alternative system embodiment for active shipment management may operate. In particular, FIG. 64 is a flow diagram illustrating an exemplary method for active shipment management within a wireless network enabled vehicle as shown in FIG. 63 in accordance with an embodiment of the invention. Referring now to FIG. 64, exemplary method 6400 begins at step 6405 where a managing node (such as facility master node 59114 or server 100) broadcasts a management request to a vehicle node within a wireless network enabled vehicle (such as node 60110 within vehicle 60000). The management request broadcast by the managing node is related to a particular package being shipped.

At step 6410, method 6400 waits for a vehicle node within the system to receive the broadcasted management request. As such, if the vehicle node receives the broadcasted management request from managing node, then step 6410 proceeds to step 6415. Otherwise, method 6400 stays in step 6410. The vehicle associated with the vehicle node may be implemented as a type of mobile storage unit that can at least temporarily maintain multiple shipping items (such as a delivery van that can temporarily store multiple packages for delivery or an aircraft that can temporarily store multiple packages for transport).

At step 6415, method 6100 proceeds with having the vehicle node identifying an ID node associated with the package of interest based upon shipping information included in the management request. In this way, for example, vehicle node 60110 may identify the ID node associated with package 59130*a* based upon shipping information for the package included in the management request received by vehicle node 60110 from the managing node.

At step 6420, method 6400 proceeds to have the vehicle node verify the package is on the wireless network enabled vehicle based upon a location of the package's ID node as determined by the vehicle node. For example, as part of step 6420, vehicle node 60110 may interact with the ID node associated with and packed within package 59130*c* to determine the location (actionable or actual) of that ID node via various techniques as described above (e.g., methods that involve controlling an RF characteristic of a node (e.g., an RF output signal level and/or RF receiver sensitivity level), determining relative proximity, considering association information for ID node 59120*a*, considering location adjustments for context information and an RF environment, chaining triangulation, as well as hierarchical and adaptive methods that combine various location methodologies to locate the ID node within package 59120*c*). Such a location may, for example, be determined as a location within the mobile storage unit implemented by the vehicle.

At step 6425, an embodiment of method 6400 may determine whether the vehicle node has received any sensor data from the package. As explained above, a node-enabled package in an embodiment may also include an environmental control unit (ECU), which may be controlled by the package's ID node to provide a desired thermal effect on the contents of the package. For example, the ID node within package 59130*c* may provide sensor data from the ID node's sensor in an embodiment of step 6425. As such, if the vehicle node has received sensor data from the package (notably, from the package's ID node), then step 6425 may proceed to steps 6430 and 6435 in an embodiment of method 6400. Otherwise, step 6425 proceeds directly to step 6440.

At step 6430, an embodiment method 6400 proceeds with the vehicle node generating a control message for the located ID node. Such a control message (which may be based upon the sensor data provided by the ID node) adjusts an environmental control unit associated with the package, such as providing at least one control parameter to the located ID node to cause the environmental control unit to provide a desired thermal effect on the package. And at step 6435, an embodiment of method 6400 may also have the vehicle node transmit the control message to the ID node in order to effect the adjustment of the package's environmental control unit. For example, vehicle node 60110 as shown in FIG. 63 may have received sensor data originally captured by the sensor in the ID node associated with package 59130*c*. Such sensor data may indicate a rising temperature above a desired threshold temperature (e.g., a desired shipping temperature for the contents of package 59130*c*). As a result, vehicle node 60110 may generate a control message that changes a temperature control parameter that causes the ECU in package 59130*c* to begin to cool the interior of package 59130*c* back down below or just to the desired threshold temperature.

At step 6440, method 6400 proceeds with the vehicle node transmitting a shipment update message to a managing node external to the wireless network enabled vehicle. The managing node (e.g., a master node (such as facility master node 59114) or a server (such as server 100)) generally tracks and manages the vehicle node 60110. The transmitted shipment update message is the way the vehicle node indicates whether the package is verified as being on the wireless network enabled vehicle and also indicates updated shipping information related to the package. And similar to what has been described, such updated shipping information may include an unloading instruction for the package relative to the location of the ID node, an environmental condition information related to the package and the location of the ID node, a package status indicating the package is on the vehicle, and a package status indicating the package is not on the wireless network enabled vehicle.

A more detailed embodiment of method 6400 beyond step 6440 may have the vehicle node generating a location-based unload instruction for the package. Such a location-based unload instruction is based upon and related to the determined location of the ID node within the vehicle.

Another detailed embodiment of method 6400 beyond step 6440 may have the vehicle node updating a location-based unload scheme for the wireless enabled vehicle based upon the location of the ID node. As noted above, this may be accomplished by the vehicle node modifying locally stored data representing the location-based unload scheme for the vehicle.

FIG. 65 is a flow diagram illustrating still other steps in a further embodiment of the exemplary method 6400 for active shipment management as shown in FIG. 64 in accordance with an embodiment of the invention that involves a weight-related placement scheme. Referring now to FIG. 65, the additional steps (collectively referred to as sub-method 6500) begin at step 6505 where the vehicle node may compare the determined location of the ID node (from step 6420) to a weight-related placement scheme for the ID node's package. Such a weight-related placement scheme may, for example, be related to the mobile storage area within the vehicle (e.g., such as a van's rear storage area or an aircraft's cargo area).

At step 6510, the vehicle node may access shipping information related to the particular package associated with the located ID node. Such information may, in some embodiments, be locally already available within memory of the vehicle node. In other embodiments, the vehicle node may request and receive the particular shipping information from the managing node (which may have such information locally or need to further request and receive such information from a server, such as server 100).

At step 6515, the vehicle node may automatically identify an imbalance condition based upon the accessed shipping information related to the package and the resulting comparison of package's ID node location relative to the weight-related placement scheme. For example, the shipping information for the package may provide weight information for this specific package to the vehicle node. Thus, based upon the vehicle node's technical ability to interact with the package's ID node and determine a location of the package's ID node and the vehicle node's determination of the package's weight (per the accessed shipping information), the vehicle node can automatically identify an imbalance condition by comparing this information to the weight-related placement scheme without the need for a scale within the vehicle. If the imbalance condition is found (e.g., comparing such information to the weight-related placement scheme shows an inconsistency with the scheme's threshold weights relative to particular parts of the vehicle), then step 6515 continues to step 6520. Otherwise, sub-method 6500 concludes after step 6515 given such active shipment monitoring shows the package is placed in a location consistent with the vehicle's weight-related placement scheme.

At step 6520, sub-method 6500 may continue with the vehicle node generating and transmitting a vehicle imbalance notification to a managing node (such as facility master node 59114 or server 100). In this manner, wireless node-based components within the node-enabled vehicle and external to the node-enabled vehicle may be proactively informed about the vehicle's imbalance condition.

Further still, an embodiment may also have the managing node automatically responding to such imbalance condition information (such as by sending a message to operator's user access device 59200 that is operating as another wireless node). For example, the operator's user access device 59200 shown in FIG. 63 (similar to that shown in FIG. 59) may be implemented based upon an ID node with a display and such that the device can communicate directly with vehicle master node 60110 via a short range communication interface but that cannot communicate directly with server 100. Such an implementation may use BLE formatted communications so as to keep the vehicle's operator informed of what is being automatically and proactively monitored and identified onboard the vehicle. However, another example implementation of the operator's user access device 59200 may be based upon a type of master node that can communicate directly with vehicle master node 60110 via a short range communication interface (e.g., via a BLE formatted short range communication path) and also communicate directly with server 100 via a longer range communication interface (e.g., via Wi-Fi or cellular communication paths)). Such an implementation may take the form of a cellular and Bluetooth enabled smartphone or portable tablet device having a touchscreen with which the operator may view information and provide feedback to other wireless node components in the active shipment management system.

Deployment of Enhanced Multi-Radio Features in Nodes

Further embodiments may leverage the use a specially enhanced container node within a logistics container in order to better localize other nodes within the container, outside the container, and/or supported on a part of the container. In general, such enhanced embodiments may involve multiple radio elements (e.g., multiple antenna elements, dedicated radio units, or both) deployed as part of the container node to monitor inside, outside, or both inside and outside of the logistics container. This may be applied with logistics containers that are sealed containers that transport packages or items for shipment (such as with a ULD, a closed trailer, train car, or intermodal shipping container) but may also be used with logistics containers based upon a storage platform (such as an enhanced base pallet that is used to support packages being shipped or an open trailer having a floor and side walls that supports packages being shipped). Different antenna configurations may be used to further enhance node locating via focused antenna patterns (e.g., directional vs. omni-directional vs. phased array). Additional embodiments may have the container node's controller (e.g., the programmed processing unit within the container node) actively manage and select which radio/antenna elements to use, thus providing more refined location information of packages within the container and/or providing location/orientation information about the container as disposed within a physical storage (e.g., a building, a vehicle, an aircraft, a trailer, and the like). Such information as generated by the container node at that level allows for a multiple antenna node-based solution that yields measurement-based information used, for example, as part of automatic weight and balance determinations for the container node's logistics container.

Figure 66:
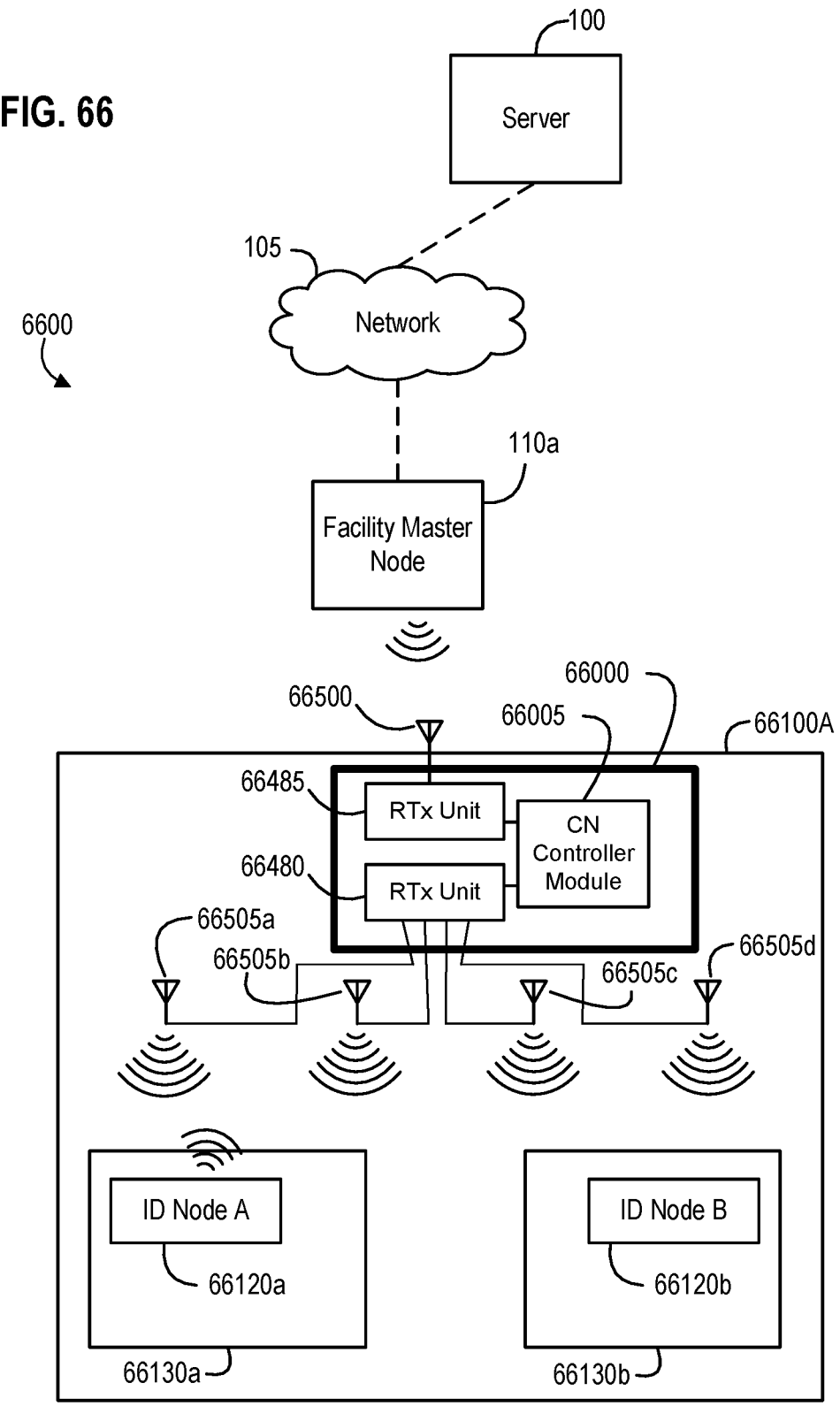
FIG. 66 is a diagram illustrating an exemplary enhanced container node apparatus disposed as part of a wireless node network capable logistics container and having at least one improved radio transceiver for reception of a node inside of the logistics container as deployed in accordance with an embodiment of the invention.

FIG. 66 is a diagram illustrating an exemplary enhanced container node apparatus disposed as part of a wireless node network capable logistics container and having at least one improved radio transceiver for reception of a node inside of the logistics container as deployed in accordance with an embodiment of the invention. Referring now to FIG. 66, exemplary logistics container 66100A is shown maintaining two packages 66130a, 66130b. Package 66130a is enabled with ID node A 66120a. Likewise, package 66130b is enabled with ID node B 66120b. An exemplary enhanced container node 66000 is disposed on the logistics container 66100A to generally monitor the interior of container 66100A as well as communicate with a facility master node 110a associated with a physical storage (such as a vehicle or building). Facility master node 110a may be implemented as a type of wireless master node element that can communicate with one or more container nodes (such as container node 66000) as well as electronically interact with server 100 (via network 105).

Exemplary enhanced container node 66000 may be implemented similar to container nodes 38000, 41000, or 54000a as described above but with differences related to how they respectively implement their communication interfaces and the respective programming of their processing units. In more detail, exemplary enhanced container node 66000 is shown having a processing-based controller module 66005 that is operatively coupled to each of two different radio transceivers (RTx unit 66480 and RTx 66485) for communicating with nodes within the logistics container and with nodes external to the logistics container as explained in more detail below. In general, controller module 66005 is a processor-based electronic computing circuit, such as a microcontroller, that contains a processing core, memory (volatile and non-volatile memory), and programmable input/output peripherals (e.g., UARTs, timers, counters, clocks, A/D and D/A converters, buffers, serial interfaces, parallel interfaces, sensors, and the like). Some embodiments of controller module 66005 may be implemented as a single integrated circuit (e.g., system on a chip (SOC) type devices) while other embodiments may implement the container node's controller module with a collection of separate circuit devices, such as a processing unit, memory, processing peripherals, and programmable interfaces as needed for the intended container node implementation. The memory within the controller module 66005 is operative to maintain relevant operational data and program instructions to support the operations as described in more detail below when using such radio transceivers.

While the exemplary short range and medium/long range communication interfaces as described with respect to exemplary container nodes 38000, 41000, or 54000a allow for the use of separate communication paths when communicating with different nodes, the use of further enhanced radio transceivers RTx unit 66480 and RTx 66485 allows the container node 66000 to refine and improve how it can communicate with and locate other nodes. As shown in FIG. 66, RTx unit 66485 is generally a radio transceiver operatively coupled to the container node controller 66005 that includes an antenna 66500. As such, RTx unit 66485 facilitates wireless communication access through antenna 66500 to the facility master node 110a disposed external to the logistics container 66100A. However, in the embodiment shown in FIG. 66, RTx unit 66480 is generally another radio transceiver operatively coupled to the container node controller 66005 that includes multiple antenna elements 66505a-66505d. Collectively, these antenna elements 66505a-66505d are disposed in a spatially disperse configuration relative to the logistics container 66100A and provide RTx unit 66480 with multi-antenna wireless communication access to one or more package ID nodes (e.g., ID node A 66120a and/or ID node B 66120b) disposed within the logistics container 66100A.

In such a spatially disperse configuration, the antenna elements 66505a-66505d are physically located relative to different parts of the logistics container 66100A. For example, in one embodiment, the antenna elements 66505a-66505d may be disposed along an axis of the logistics container, such as on the interior ceiling of the logistics container along a central axis that runs the length of the logistics container. As such, each of the antenna elements 66505a-66505d may be implemented with an antenna pattern focused on one of multiple different portions of a storage area within the logistics container 66100A, which further helps to localize signals monitored within the storage area. In more detail, an embodiment may have these antenna elements 66505a-66505d mounted, secured, attached, or otherwise disposed on multiple different interior surfaces (such as along the ceiling, door, side walls, or floor) of the logistics container 66100A. As such, an embodiment of container node 66000 may deploy antenna elements 66505a-66505d in a spatially disperse configuration that allow for the RTx unit 66480 to use such elements as parts of a collective beamforming phased array antenna where signals received from different antenna elements are processed by RTx unit 66480 for adaptive and directional signal transmission and reception relative to the interior of the logistics container 66100A (rather than a simple omni-directional approach using a single antenna element).

Figure 67:
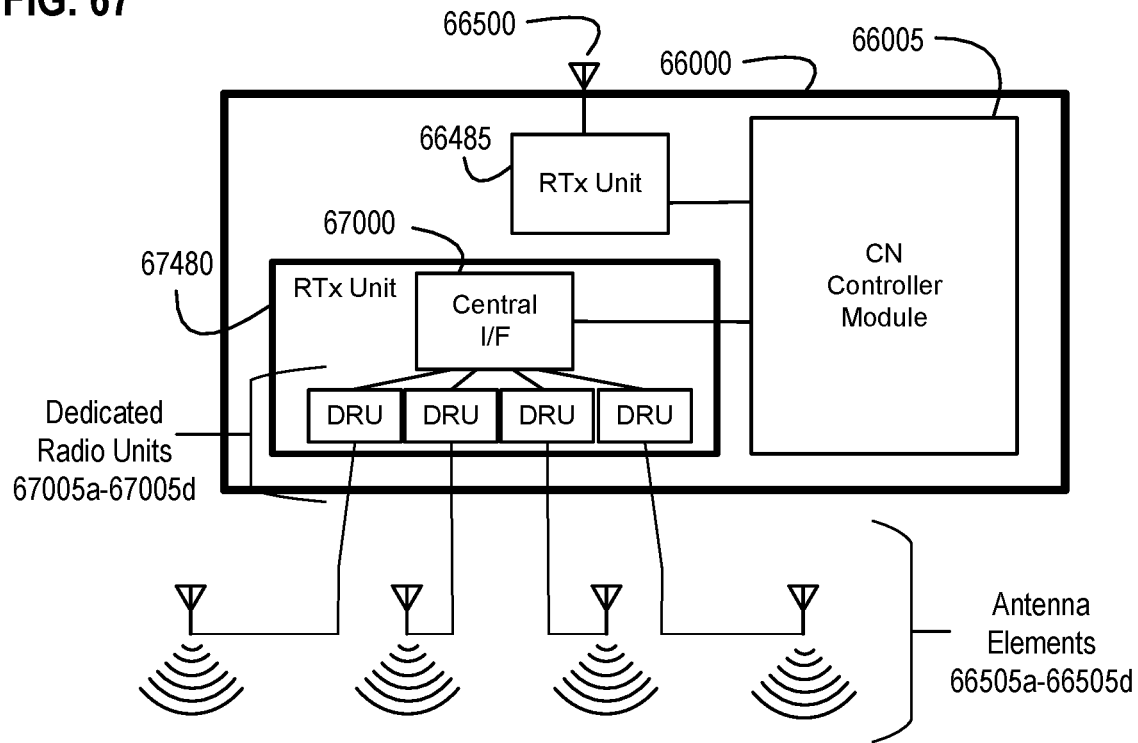
FIG. 67 is a diagram of further internal details of an exemplary enhanced container node having a radio transceiver with dedicated radio units and corresponding antenna elements in accordance with an embodiment of the invention.
Figure 68:
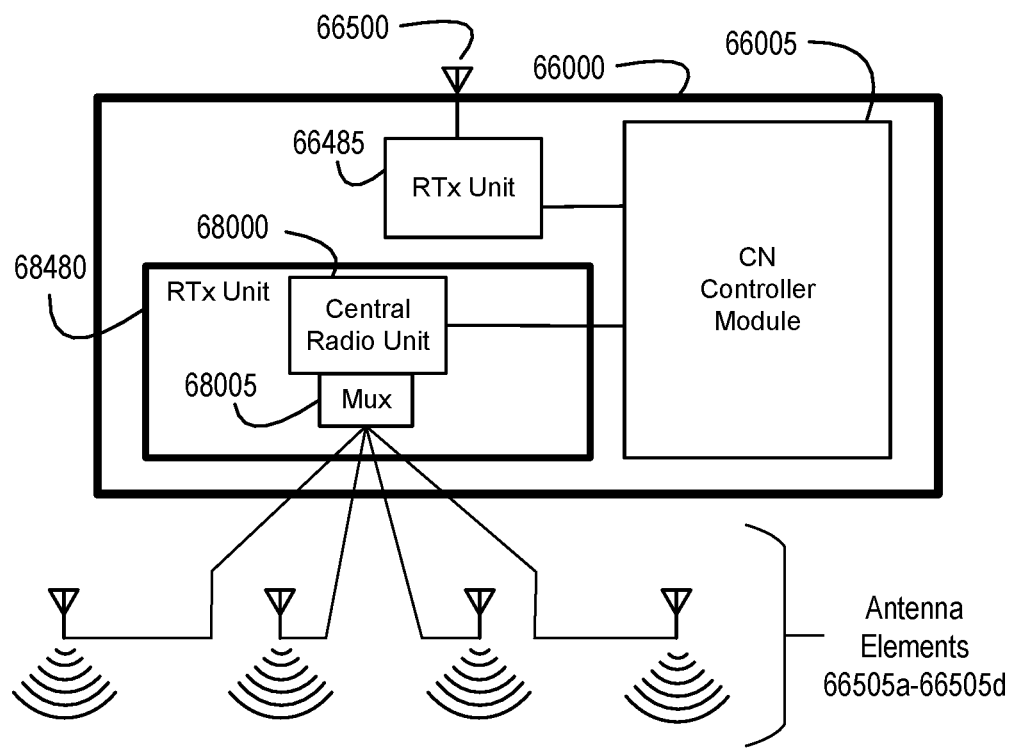
FIG. 68 is a diagram of further internal details of an exemplary enhanced container node having a radio transceiver with a single radio unit selectively coupled to multiple antenna elements in accordance with an embodiment of the invention.

FIGS. 67 and 68 provide further details with respect to how exemplary RTX unit 66480 may be implemented in different embodiments. In particular, FIG. 67 is a diagram of further internal details of exemplary enhanced container node having a radio transceiver with dedicated radio units and corresponding antenna elements in accordance with an embodiment of the invention. Referring now to FIG. 67, exemplary radio transceiver unit RTx 67480 is coupled to container node controller module 66005 and includes a central interface 67000, multiple dedicated radio units 67005a-67005d, and multiple antenna elements 66505a-66505d that each correspond to one of the dedicated radio units 67005a-67005d. Central interface 67000 may be implemented with switching circuitry that can provide signals and commands from controller module 66005 to selective ones of the dedicated radio units 67005a-67005d. Each of the dedicated radio units 67005a-67005d generally has its own radio transceiver for independent reception and transmission of wireless signals through a corresponding one of the antenna elements 66505a-66505d. Those skilled in the art will appreciate that in this manner, each of the dedicated radio units may be individually selected (e.g., via commands from controller module 66005 and the switching circuitry of central interface 67000) to receive or transmit information but with this architecture can also do so simultaneously while other dedicated radio units receive or transmit wireless signals (or at least have overlapping signals being received or transmitted to other nodes).

FIG. 68 is a diagram of further internal details of an exemplary enhanced container node having an alternative type of radio transceiver unit capable of working with multiple antenna elements. Referring now to FIG. 68, exemplary container node 66000 is shown with RTx unit 68480 operatively coupled to the container node's controller module 66005 and includes a single central radio unit 68000 that is coupled to the multiple antenna elements 66505a-66505d via switching circuitry 68005 (generally labeled "mux" corresponding to multiplexer). Mux 68005 may be implemented with switching circuitry that can provide a selective communication path from an RF input/output of central radio unit 68000 to and from antenna elements 66505a-66505d. As such, those skilled in the art will appreciate that each of the antenna elements 66505a-66505d may be individually selected or selected in subgroups (e.g., via commands from controller module 66005 that have central radio unit 68000 controlling the switching circuitry of mux 68005) so that the central radio unit 68000 can receive or transmit information via the selected element or subgroup of antenna elements, but does so with a single radio unit (rather than multiple radio units as shown in FIG. 67).

As such, an apparatus embodiment may use elements of such an enhanced container node 66000 as part of a wireless node network capable logistics container. In more detail, such an apparatus embodiment would include at least a container node controller and two different radio transceivers. The container node controller, such as controller module 66005 as shown in FIGS. 66-68, is an element of the container node that is disposed on the logistics container. One of the radio transceivers in this apparatus embodiment (e.g., RTx unit 66485) is operatively coupled to the container node controller and has an antenna (e.g., antenna element 66500) providing this radio transceiver with wireless communication access to a master node (e.g., facility master node 110a) disposed external to the logistics container. The second of the radio transceivers (e.g., RTx unit 66480) is also operatively coupled to the container node controller and includes multiple antenna elements (e.g., antenna elements 66505a-66505d) disposed in a spatially disperse configuration relative to the logistics container (such as along an axis of the logistics container, on different surfaces of the logistics container, or near different corners of the logistics container). These multiple antenna elements advantageously provide the second radio transceiver with multi-antenna wireless communication access to an ID node within a package (e.g., ID node A 66120a within package 66130a) disposed within the logistics container.

An embodiment of the second radio transceiver may be implemented with a single central radio unit (such as that shown in FIG. 68) that is coupled to each of the antenna elements. However, another embodiment of the second radio transceiver may be implemented with multiple radio units where each are respectively coupled with different antenna elements. In more detail, the second radio transceiver may be implemented to have a central communication interface operatively coupled to the container node controller, and with each of the multiple dedicated radio units coupled to the central communication interface and one of the antenna elements. In this way, the particular antenna element coupled to each of the dedicated radio units may monitor a different portion of the logistics container's storage area. For example, as shown in FIGS. 66 and 67, each of dedicated radio units 67005a-67005d are connected with respective ones of antenna elements 66505a-66505d, which are spatially dispersed to monitor different portions of the interior of logistics container 66100A.

In operation, the container node controller of this apparatus embodiment may send a location control message to the second radio transceiver when attempting to locate the package ID node. As such, the second radio transceiver responds by selecting different subsets of the antenna elements to receive an inbound wireless signal from the package ID node. In doing so, the second radio transceiver detects reception information about the inbound wireless signal for each of the different selected subsets of the antenna elements as they are selected. Such detected reception information (e.g., different signal power levels of the broadcast advertising signals from the package ID node as received by the different subsets of antenna elements) is collectively provided by the second radio transceiver to the container node controller. This may happen in a burst with all of the different detected reception information or may happen sequentially as each different subset of antenna elements are selected and corresponding signal reception information is detected.

With the detected reception information from the second radio transceiver, the container node controller determines a location of the package ID node relative to the logistics container based upon the detected reception information from the second radio transceiver. For example, the container node controller may find that the signal power level of package ID node signals detected are strongest relative to certain antenna elements located relative to certain parts of the logistics container. As such, the container node controller may determine a localized relative position of the package ID node using such reception information leveraged by the different subsets of antenna elements of the second radio transceiver. Thereafter, the container node controller may send an instruction to the first radio transceiver to cause the first radio transceiver to transmit a location determination message to the master node. Such a location determination message reflects the determined location of the package ID node relative to the logistics container.

In a further apparatus embodiment, the second radio transceiver may be operative to select the different subsets of antenna elements by the second radio transceiver may be accomplished when the second radio transceiver controls which of the different subsets of the antenna elements provides a wireless reception input for the second radio transceiver. For example, with the antenna elements disposed in a spatially diverse configuration (such as on an axis of the container along the ceiling of the container), the second radio transceiver may cycle through each antenna element being connected to the wireless reception input of the transceiver so that as each antenna element is connected, the second radio transceiver is using an antenna having a reception field in different parts of the logistics container. And as the second radio transceiver cycles through different subsets of the antenna elements (e.g., individually through each element, through different groups of the antenna elements, such as a group of the antenna elements on one side of the container and another group of the antenna elements disposed on another side of the container), the second radio transceiver can detect a different observed signal strength of the inbound wireless signal for each of the different selected subsets of the antenna elements.

Using such detected signal strengths relative to the different selected subsets of the antenna elements, the location of the package ID node relative to the logistics container may be determined as a relative location within the storage area of the logistics container. More specifically, an embodiment may have the container node controller determine the relative location of the package ID node within the storage area of the logistics container in response to receiving detected reception information from the second radio transceiver by (a) comparing the detected reception information for each of the different selected subsets of the antenna elements; (b) identifying one of the selected subsets of antenna elements having a maximum observed signal strength of the inbound wireless signal; and (c) determining the relative location of the package ID node as being related to a focal area within the storage area for the identified one of the selected subsets of antenna elements in (b). In other words, by deploying multiple antenna elements in a physically and spatially disperse configuration, one of the antenna elements may observe the package ID node's signals to be higher than the other antenna elements, which then has the container node's controller determining that the package ID node's relative location is the location within the container's storage area where that one antenna element's is focused.

In still additional apparatus embodiments, the container node controller may generate placement feedback information about the package ID node based upon the determined location of the package ID node relative to the logistics container. In such a case, the container node controller may also cause the first radio transceiver to broadcast a placement feedback message to the master node based upon the generated placement feedback information. The container node controller may generate such placement feedback information as including a loading status parameter, a current weight parameter, and/or a current balance parameter. The loading status parameter may indicate whether the package ID node is located within the logistics container in accordance with a loading plan for that logistics container compared to the determined location of the package ID node relative to the logistics container. The current weight parameter for the logistics container may be based at least upon a weight of a package associated with the package ID node. And the current balance parameter for the logistics container may be based at least upon the determined location of the package ID node relative to the logistics container and the weight of the package associated with the package ID node. Thus, an embodiment of the container node controller may even further enhance monitored loading/shipment/unloading operations with such automatic and proactive messaging about placement feedback in time to avoid placement, weight, and balance related issues with the ID node's package as it sits within the logistics container.

In the above described enhanced container node apparatus embodiment, such an apparatus may be used with various types of logistics containers. For example, the enhanced container node apparatus may be used with a unit load device (ULD) container capable of being transported within an airplane; a trailer capable of being moved by a vehicle (such as a cargo trailer pulled by a truck); a train car capable of being moved on a railway system; and an intermodal shipping container capable of being moved on at least two different types of transportation modalities.

As described above relative to FIGS. 44-53, an exemplary logistics container may also be implemented using a logistics storage platform, such as a palletized base platform, that supports items (e.g., ID node enabled packages) that are being stored, moved or transported. In more detail, this type of exemplary logistics container may be implemented with a base platform and a flexible cover that is removably attachable to the base platform in order to secure the package ID node relative to the base platform.

Another exemplary logistics container may be implemented using one or more shelves capable of supporting items (e.g., ID node enabled packages). Each of such shelves may be associated with an enhanced container node deployed with multiple antenna elements to communicate with the package ID nodes supported on the shelf in a more localized manner as described above.

While the above description relates to an exemplary enhanced container node apparatus, such an apparatus may be deployed as part of a larger system embodiment that includes the logistics container. In some examples of such a system embodiment, some or all of the elements making up such an enhanced container node may be built into or be an integrated part of the logistics container. However, in other examples, the container node with its multiple antenna elements may be disposed on the logistics container when operating as the system but in a configuration that has the container node being removable and replaceable and/or with antenna elements that may be changed in configuration to adaptively monitor different portions of the container's storage area as desired or dictated by the packaging contents intended to be shipped within the container.

In more detail, an exemplary embodiment of an enhanced wireless node network capable container system, such as that shown in FIG. 66, generally includes a logistics container, a container node controller, and two different radio transceivers—one of which having multiple antenna elements. The system's container node controller (such as controller module 66005) is disposed on the logistics container—e.g., in an attached or integrated manner relative to an accessible storage area within the logistics container or in a removable manner using an attachable housing for the container node within which the container node controller is disposed. The system's first radio transceiver (e.g., RTx unit 66485) is operatively coupled to the container node controller and has a first antenna (e.g., 66500) providing wireless communication access to a master node (e.g., facility master node 110*a*) disposed external to the logistics container. While the system's second radio transceiver (e.g., RTx unit 66480) is also operatively coupled to the container node controller, the second radio transceiver advantageously includes multiple antenna elements (e.g., antenna elements 66505*a*-66505*d*) placed in a dispersed configuration relative to the logistics container so as to provide reception/transmission coverage that is spread out within different parts of the logistics container. As such, the antenna elements provide the second radio transceiver with multi-antenna wireless communication access to a package ID node disposed with a package maintained within the logistics container. For example, antenna elements 66505*a*-66505*d* are disposed in different parts of logistics container 66100A to provide RTx unit 66480 of container node 66000 with multi-antenna wireless localized access to the ID node A 66120*a* within package 66130*a*.

In this configuration, the system's container node and the second radio transceiver interact in an unconventional manner to determine the location of the package ID node within the container. In more detail, the system's container node controller may generate and send a location control message to the system's second radio transceiver when attempting to determine the location of the package ID node within the container. In response, the second radio transceiver selects different subsets of the antenna elements to receive an inbound wireless signal from the package ID node so that the second radio transceiver detects reception information about the inbound wireless signal for each of the different selected subsets of the antenna elements. In more detail, the second radio transceiver may perform this type of selection and detection by controlling which of the different subsets of the antenna elements (located in different parts of the logistics container) provides a wireless reception input for the second radio transceiver. For example, as shown in FIG. 66, antenna elements 66505*a*-66505*d* are disposed relative to 4 different parts of logistics container 66100A. Exemplary RTx unit 66480 may select each of these antenna elements as a subset of the group of antenna elements and selectively connect each of the antenna elements to an RF front end of RTx unit 66480. Depending on how the RTx unit 66480 is implemented, this may involve selecting a particular dedicated radio unit within RTx unit 66480 for a particular antenna element via a central communication interface (such as that shown in the radio transceiver embodiment of FIG. 67) or it may involve establishing a switched electrical connection between a single central radio unit within RTx unit 66480 and the particular antenna element (such as that shown in the radio transceiver embodiment of FIG. 68). Thus, as each of the antenna elements 66505*a*-66505*d* are connected to the RF front end of RTx unit 66480, an embodiment may have the RTx unit 66480 observing a signal strength of the detected inbound wireless signal that is being broadcast from package ID node A 66120*a*. This may be done for each of the different subsets of antenna elements (e.g., as each antenna element is connected to and provides a reception front end antenna for RTx unit 66480).

The system's second radio transceiver provides the detected reception information to the container node controller. In general, the second radio transceiver may provide the detected reception information (e.g., the observed signal strengths relative to each selected subset of antenna elements) to the container node controller in a single message after all the reception information has been gathered or, in some embodiments, provide the detected reception information sequentially to the container node controller as each subset of antenna elements has been selected and the reception information for the currently selected subset of antenna elements has been detected.

The system's container node controller, armed with the collected reception information for each of the selected subsets of antenna elements, then determines a location of the package ID node relative to the system's logistics container based upon the detected reception information and causes the first radio transceiver to transmit a location message reflecting the determined location of the package ID node relative to a storage area within the system's logistics container to the master node. In more detail, the system's container node controller may determine the relative location of the package ID node within the storage area of the logistics container by comparing the observed signal strength for each of the different selected subsets of the antenna elements; (b) identify one of the antenna subsets as having a maximum observed signal strength, and (c) determine the relative location of the package ID node as being related to a focal area within the storage area for the identified antenna subset. For example, referring back to the system 6600 shown in FIG. 66, the controller module 66005 of exemplary container node 66000 may compare the signal strength measured and observed by RTx unit 66480 when individually and separately using each of antenna elements 66505*a*-66505*d* to identify antenna element 66505*a* as having a relative maximum of the observed signal strengths for the broadcast signal from ID node A 66120*a*. Thus, controller module 66005 may determine the relative location of the package ID node A 66120*a* as the focal area for antenna element 66505*a*—i.e., the left side of container 66100A as shown in FIG. 66.

As explained above, the antenna elements used with the system's second radio transceiver are in a dispersed configuration relative to parts of the system's logistics container. For example, the antenna elements may be located in a spatially disperse configuration along an axis of the logistics container, on different surfaces within the container (e.g., the ceiling, door, side walls, floor), or at various locations relative to the interior of the logistics container in a configuration that focuses each antenna elements' respective antenna pattern on a different part of the container's storage area.

Like that discussed above relative to an apparatus embodiment, the container node controller in a system embodiment may generate placement feedback information about the package ID node based upon the determined location of the package ID node relative to the logistics container. In such a case, the system's container node controller may also cause the first radio transceiver to broadcast a placement feedback message to the master node based upon the generated placement feedback information. The system's container node controller may generate such placement feedback information as including a loading status parameter, a current weight parameter, and/or a current balance parameter. The loading status parameter may indicate whether the package ID node is located within the logistics container in accordance with a loading plan for that logistics container compared to the determined location of the package ID node relative to the logistics container. The current weight parameter for the logistics container may be based at least upon a weight of a package associated with the package ID node. And the current balance parameter for the logistics container may be based at least upon the determined location of the package ID node relative to the logistics container and the weight of the package associated with the package ID node. Thus, the system's container node controller may be implemented with functionality that further enhances monitored loading/shipment/unloading operations with such automatic and proactive messaging about placement feedback in time to avoid placement, weight, and balance related issues with the ID node's package as it sits within the system's logistics container.

Similar to that described above on how an apparatus embodiment of the enhanced container node may be used with different types of logistics containers, the system embodiment's logistics container element may be implemented in a variety of ways. For example, the logistics container may be implemented as a unit load device (ULD) container capable of being transported within an airplane; a trailer capable of being moved by a vehicle (such as a cargo trailer pulled by a truck); a train car capable of being moved on a railway system; an intermodal shipping container capable of being moved on at least two different types of transportation modalities; a logistics storage platform, such as a palletized base platform, that supports items (e.g., ID node enabled packages) that are being moved or transported (similar to that described relative to FIGS. 44-53 showing a base platform and a flexible cover that is removably attachable to the base platform in order to secure the package ID node relative to the base platform); or one or more shelves capable of supporting items (e.g., ID node enabled packages). Each of such shelves may be used in a system embodiment with the container node's multiple antenna elements to communicate with the package ID nodes supported on the shelf in a more localized manner as described above.

As described above, the exemplary system embodiment leverages using multiple antenna elements of an enhanced container node to help determine a location of a package ID node relative to the container node's logistics container. However, a further system embodiment may also include the master node (e.g., facility master node 66110*a* as shown and explained with reference to the system 6600 shown in FIG. 66) and how it may interact with the other system elements, such as generating a location request relative to the package ID node and sending that location request to the container node's controller (and which then causes the container node controller to generate the location control message sent to the container node's second radio transceiver). Such a master node element in this system embodiment may also receive the location determination message from the container node controller and, in some cases, pass along such information to a server (e.g., server 100) that reflects the determined location of the package ID node relative to the logistics container. This master node element may also receive the placement feedback message from the container node controller and, in some cases, send information about the package ID node's placement within the logistics container to the server. Such a server may also be an additional element of an even larger system embodiment, such as system 6600 as shown in FIG. 66.

Figure 69A:
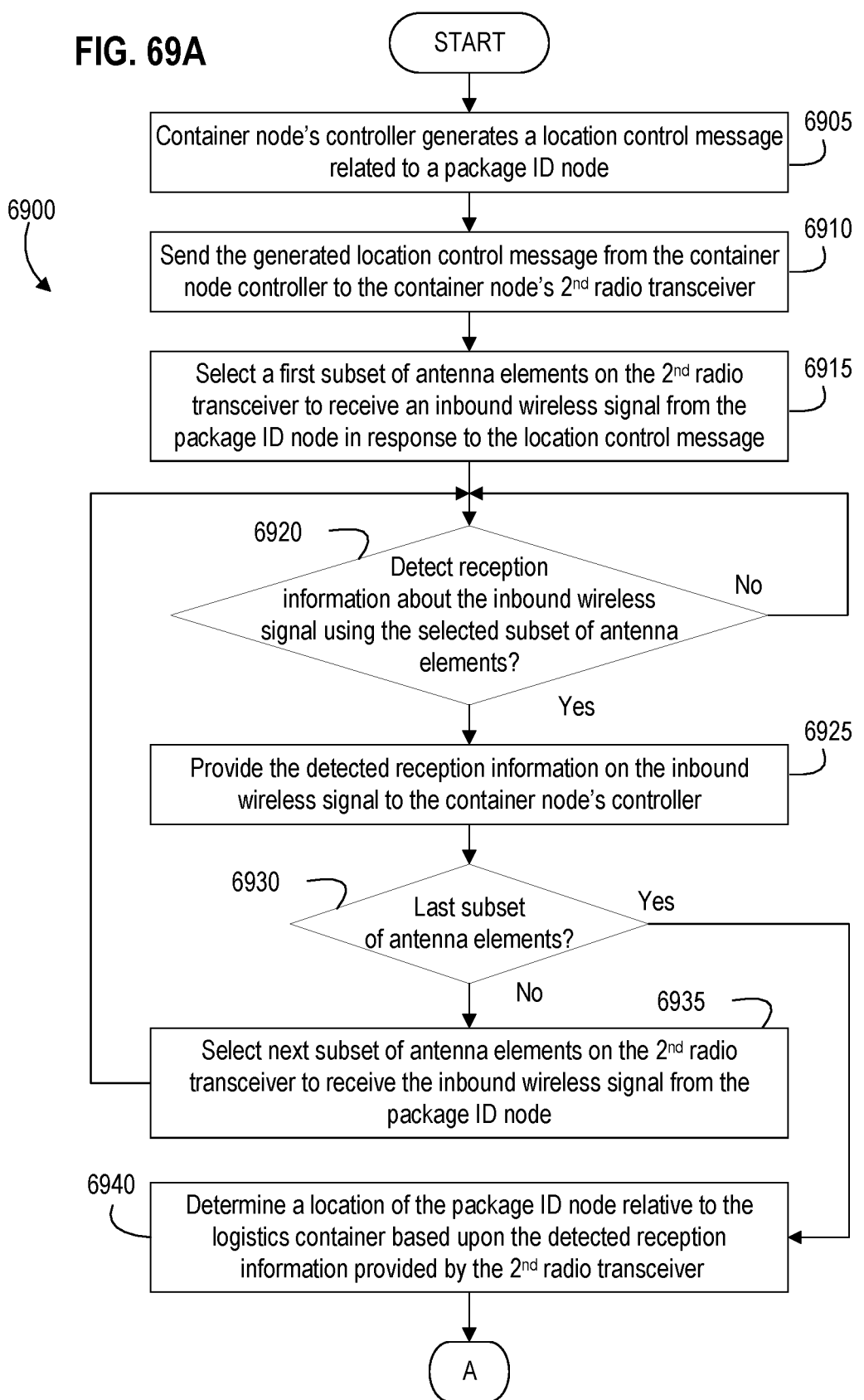

In light of the above described different apparatus embodiments of an enhanced container node and systems embodiments that leverage use of an enhanced container node (or components of such a node), a further embodiment may be presented in the form of a system-level method that focuses on how different nodes and node elements unconventionally and advantageously interact to help located a package ID node within a logistics container. FIGS. 69A and 69B are, collectively, a flow diagram illustrating an exemplary method implemented by a multi-antenna container node for locating a package ID node within a storage area of the logistics container in accordance with an embodiment of the invention. Referring now to FIG. 69A, exemplary method 6900 is a multi-antenna container node implemented method of locating a package ID node within a storage area of a logistics container, where the container node is disposed on the logistics container and has at least a container node controller, a first radio transceiver, and a second radio transceiver. As noted above in more detail relative to both the apparatus and systems embodiments, an exemplary logistics container deployed relative to this method may come in a variety of forms (e.g., a ULD, trailer, train car, intermodal shipping container, a pallet-type logistics storage platform (that may include a cargo net to secure and contain packages to the platform), and one or more shelf structures). Exemplary method 6900 begins at step 6905 with the container node controller generating a location control message related to a package ID node. Such a location control message may be generated in response to an inquiry message received by the container node controller from a master node external to the logistics container (e.g., a message received by container node controller module 66005 through a first radio transceiver 66485 and its antenna 66500 from facility master node 110*a*, which is external to exemplary logistics container 66100A).

At step 6910, method 6900 proceeds with the container node controller (e.g., the controller module 66005 within exemplary container node 66000) sending the location control message to a second radio transceiver of the multi-antenna container node (e.g., RTx unit 66480) having multiple antenna elements disposed in a spatially disperse configuration relative to the logistics container. These antenna elements provide the second radio transceiver with multi-antenna wireless communication access to the package ID node disposed within the storage area of the logistics container.

At step 6915, method 6900 proceeds with the second radio transceiver activating or otherwise selecting a first subset of the antenna elements on the front end of the transceiver so that the second radio transceiver receives an inbound wireless signal from the package ID node in response to the location control message. The first subset is selected as method 6900 cycles through each of the different subsets via steps 6920-6935 as discussed below, before step 6930 has method 6900 proceeding to step 6940.

Those skilled in the art will appreciate that the subsets may include one antenna element as a subset or may include multiple antenna elements as a subset. For example, the second radio transceiver may simply cycle through each different antenna element as a subset so that the transceiver receives signal information as each of the different antenna elements is selected and used as the antenna front end for the second radio transceiver. However, in other embodiments, the second radio transceiver may select different groups of the antenna elements as the different subsets where the groups of antenna elements correspond to a proximity to a part of the logistics container. Thus, an example may have the second radio transceiver selecting two different subsets of the antenna elements—one subset being a group of the antenna elements physically located proximate one part of the logistics container, while the other subset is a group of the remaining antenna elements physically located proximate the remaining part of the logistics container. Those skilled in the art will appreciate that deploying a larger number of antenna elements and/or refining such groupings of the antenna elements may provide a way of refining the determined location as determined by embodiments described herein.

A more detailed embodiment of method 6900 may have the second radio transceiver selecting the first subset in step 6915 by controlling which of the different subsets of the antenna elements provides a wireless reception input for the second radio transceiver. Thus, in an even more detailed embodiment, the second radio transceiver may have a central communicating interface and different dedicated wireless radio units respectively paired and coupled to each of the different antenna elements. As such, the second radio transceiver may select different subsets of the antenna elements to receive the inbound wireless signal when the central communication interface of the second radio transceiver receives the location control message and then selects which of the different dedicated wireless radio units that are part of the transceiver will provide reception information about the inbound wireless signal from the package ID node. When the second radio transceiver is deployed with such different dedicated wireless radio units (such as units 67005a-67005d shown in FIG. 67), selecting the different dedicated radio units may involve incrementally activating each of the different dedicated radio units to incrementally monitor the different portions of the storage area (i.e., so that each of the selected or activate different dedicated wireless radio units detects a relative signal strength of the inbound wireless signal as reception information).

Controlling which of the different subsets of antenna elements may provide the wireless reception input for the second radio transceiver as part of step 6915 (as well as step 6935) may also be accomplished by electronically establishing a selective connection between a single central radio unit within the second radio transceiver and the different antenna units (e.g., as shown with mux 68005 and central radio unit 68000 in FIG. 68).

At step 6920, method 6900 proceeds with the second radio transceiver detecting reception information about the inbound wireless signal for the selected subset of the antenna elements. Such reception information may be in the form of an observed signal strength of the inbound wireless signal as received through the selected subset of antenna elements. Once this is done, step 6920 proceeds to step 6925 where the second radio transceiver provides detected reception information to the container node controller. At step 6930, if the currently selected subset of antenna elements is the last one, then method 6900 proceeds directly to step 6940. Otherwise, step 6930 moves to step 6935 where the next subset of antenna elements is selected and method 6900 proceeds back to step 6920 to detect the relevant reception information for that next subset.

At step 6940, method 6900 has the container node controller determining the location of the package ID node relative to the logistics container based upon the detected reception information provided by the second radio transceiver. Such a location may be determined as a relative location within the storage area of the logistics container based upon the detected reception information provided by the second radio transceiver (e.g., a location defined relative to parts of the storage area—such as within a left side or a right side of the container). In more detail, a further embodiment of step 6940 may have the container node controller comparing the detected reception information for each of the different selected subsets of the antenna elements in order to identify one of the selected subsets of antenna elements having a maximum observed signal strength of the inbound wireless signal. Using this identified subset of antenna elements, the container node controller may determine the relative location of the package ID node within the storage area as being a location of a focal area within the storage area for the identified one of the selected subsets of antenna elements. For example, if the second radio transceiver is coupled to four different antenna elements and each of the antenna elements are disposed along an axis of the logistics container, an antenna mapping file may be stored within memory of the container node controller that keeps a list of antenna elements relative to particular areas of the logistics container depending on how the antenna elements are mounted within the logistics container. The determining step 6940 may thus be accomplished with the container node controller comparing the reception information to identify which of the antenna element subgroups received a signal having the highest strength relative to what was received by the other antenna element subgroups, and then mapping the identified antenna element subgroup to an area within the logistics container based upon the antenna mapping file information. After step 6940, method 6900 proceeds through transition point A to FIG. 69B.

Referring now to FIG. 69B, method 6900 continues through transition point A to step 6945 where the container node controller generates a location determination message to reflect the determined location of the package ID node relative to the logistics container so that, at step 6950, the first radio transceiver of the multi-antenna container node transmits the location determination message to a master node disposed external to the logistics container.

A further embodiment of method 6900 may continue to step 6955 where the container node controller may generate placement feedback information about the package ID node based upon the determined location of the package ID node relative to the logistics container. The placement feedback information generated by the container node controller may include a loading status parameter, a current weight parameter, and/or a current balance parameter. The loading status parameter indicates whether the package ID node is located within the logistics container in accordance with a loading plan for the logistics container (also stored as a file within the container node controller's memory) compared to the determined location of the package ID node relative to the logistics container. The current weight parameter for the logistics container is based at least upon a weight of a package associated with the package ID node, which may be determined from the package's shipping information stored within the container node controller's memory as received by the container node controller from the master node or, in some embodiments, from the package's ID node. The current balance parameter for the logistics container is based at least upon the determined location of the package ID node relative to the logistics container and the weight of the package associated with the package ID node.

For example, a particular logistics container may have packages and weights of such packages that are tracked by the container node controller relative to their location as placed within the logistics container. The particular logistics container, such as a ULD container, may have shipment and loading guidelines that identify how much weight the container can hold altogether as well as an identified imbalance threshold based on weight and location. The ULD may need to meet balance requirements (e.g., center of gravity, etc.) in order to meet regulatory requirements for transport on an aircraft. If the ULD container has too much weight on one side, safety may be compromised when moving such a unbalanced ULD container. The ability of the container node controller to automatically and proactively sense and notify other logistics devices about such an imbalance situation through the technical deployment of an enhanced container node apparatus or system using such an enhanced container node is a technical solution to a technical and potentially physically dangerous problem.

Finally, at step 6960, method 6900 proceeds with the first radio transceiver transmitting such a placement feedback message to the master node based upon the generated placement feedback information.

In summary, the embodiments described above relative to FIGS. 66, 67, 68, 69A and 69B focus on apparatus, systems, and methods that involve an enhanced container node (or parts of such a node) having multiple antenna elements deployed to enhance how to locate a broadcasting package ID node stored within a logistics container.

Further embodiments described below relative to FIGS. 70-80 focus on apparatus, systems, and methods that involve another type of enhanced container node (or parts of such a node) having multiple antenna elements used to help determine the location of a logistics container having the enhanced container node (or parts of the node) within a larger physical storage, such as a storage facility, trailer, or airplane cargo compartment.

Figure 70:
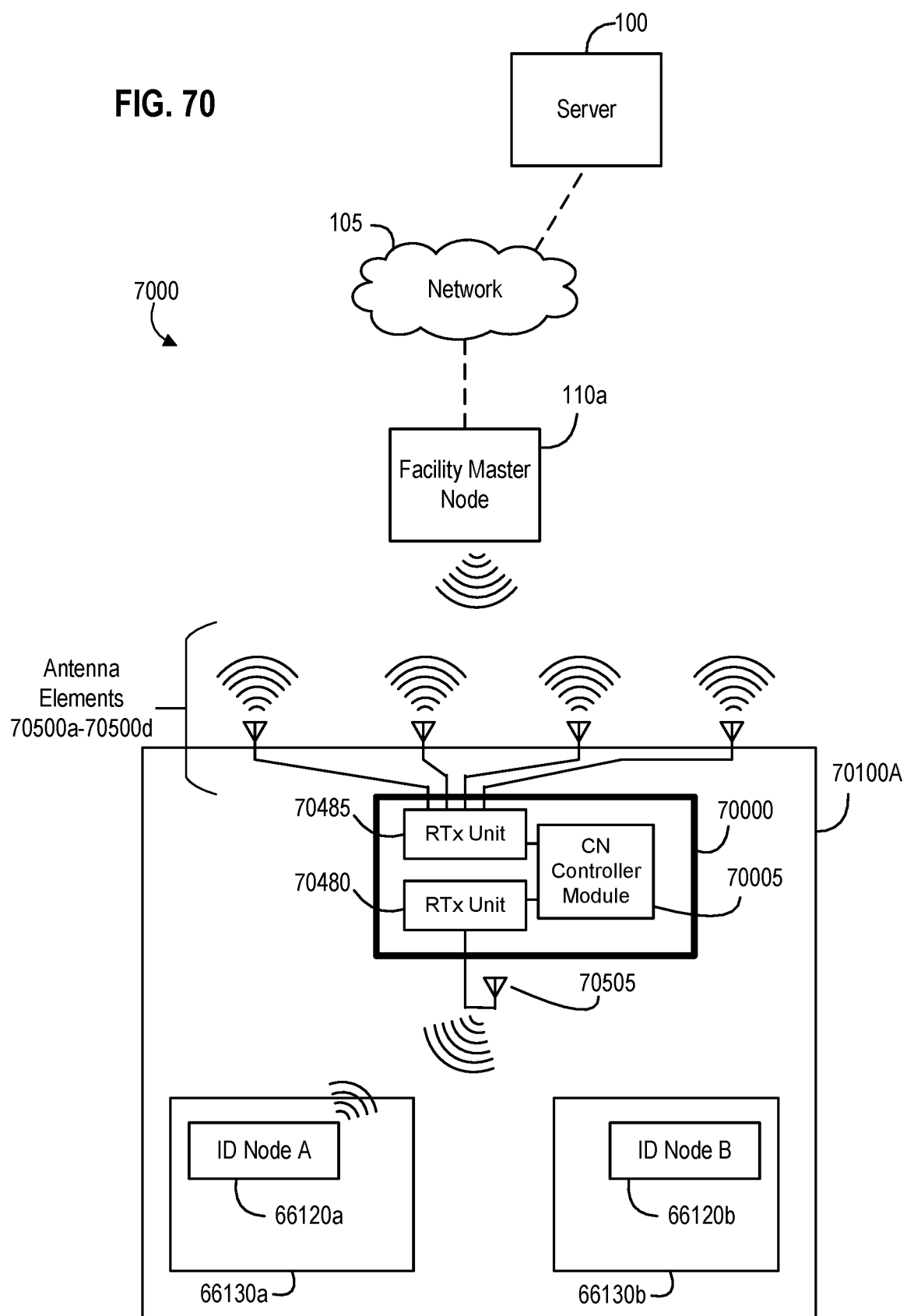
FIG. 70 is a diagram illustrating an exemplary enhanced container node apparatus disposed as part of a wireless node network capable logistics container and having at least one improved radio transceiver for reception of a node outside of the logistics container as deployed in accordance with an embodiment of the invention.

FIG. 70 is a diagram illustrating another embodiment of an exemplary enhanced container node apparatus disposed as part of a wireless node network capable logistics container and having at least one improved radio transceiver for reception of a node outside of the logistics container as deployed in accordance with an embodiment of the invention. In general, the exemplary system shown in FIG. 70 includes server 100, network 105, and facility master node 110*a* similar to that shown in FIG. 66. And similar to what is illustrated in FIG. 66, FIG. 70 shows an exemplary logistics container 70100A maintaining two packages 66130*a*, 66130*b*. Package 66130*a* is enabled with ID node A 66120*a*. Likewise, package 66130*b* is enabled with ID node B 66120*b*. So while logistics container 70100A maintains similar packages and their respective ID nodes, exemplary logistics container 70100A as shown in FIG. 70 deploys a different type of enhanced container node.

In more detail, exemplary enhanced container node 70000 is disposed on the logistics container 70100A to generally monitor the interior of container 70100A as well as communicate with a facility master node 110*a* associated with a physical storage (such as a storage facility, trailer, or airplane cargo compartment). Facility master node 110*a* may be implemented as a type of wireless master node element that can communicate with one or more container nodes (such as container node 70000) as well as electronically interact with server 100 (via network 105).

Exemplary enhanced container node 70000 may be implemented with internal components similar to exemplary container nodes 38000, 41000, 54000*a*, or 66000 as described above but with differences related to how container node 70000 implements its communication interfaces and the respective programming of their processing units. Notably, in contrast with exemplary container node 66000 that deploys multiple antenna elements 66505*a*-66505*d* for interacting with the ID nodes within the logistics container, exemplary enhanced container node 70000 makes use of multiple antenna elements 70500*a*-70500*d* for interacting with the facility master node 110*a* external to the logistics container.

In more detail, exemplary enhanced container node 70000 is shown having a processing-based controller module 70005 that is operatively coupled to each of two different radio transceivers (RTx unit 70480 and RTx 70485) for communicating with nodes within the logistics container 70100A (e.g., ID node A 66120*a* and/or ID node B 66120*b*) and with nodes external to the logistics container 70100A (e.g., facility master node 110*a*) as explained in more detail below. In general, controller module 70005 (also generally referred to as a container node controller) is a processor-based electronic computing circuit, such as a microcontroller, that contains a processing core, memory (volatile and non-volatile memory), and programmable input/output peripherals (e.g., UARTs, timers, counters, clocks, A/D and D/A converters, buffers, serial interfaces, parallel interfaces, sensors, and the like). Some embodiments of controller module 70005 may be implemented as a single integrated circuit (e.g., system on a chip (SOC) type devices) while other embodiments may implement the container node's controller module 70005 with a collection of separate circuit devices, such as a processing unit, memory, processing peripherals, and programmable interfaces as needed for the intended container node implementation. Those skilled in the art will appreciate that the memory within the controller module 70005 is operative to maintain relevant operational data and program instructions to support the operations as described in more detail below when using such enhanced radio transceivers.

While the exemplary short range and medium/long range communication interfaces as described with respect to exemplary container nodes 38000, 41000, or 54000*a* allow for the use of separate communication paths when communicating with different nodes, the use of further enhanced radio transceivers RTx unit 70480 and RTx 70485 allows the container node 70000 to refine and improve how it can communicate with and locate other nodes. As shown in FIG. 70, RTx unit 70480 is generally a radio transceiver operatively coupled to the container node controller 70005 that includes an antenna 70505. As such, RTx unit 70480 facilitates wireless communication access through antenna 70505 to one or more package ID nodes (e.g., ID node A 66120*a* and/or ID node B 66120*b*) disposed within the logistics container 70100A. However, in the embodiment shown in FIG. 70, RTx unit 70485 is generally another radio transceiver operatively coupled to the container node controller 70005 that includes multiple antenna elements 70500*a*-70500*d*. Collectively, these antenna elements 70500*a*-70500*d* are disposed in a spatially disperse configuration relative to the logistics container 70100A and provide RTx unit 70485 with multi-antenna wireless communication access to facility master node 110*a*, which may be fixed relative to a reference position within a physical storage.

Figure 71:
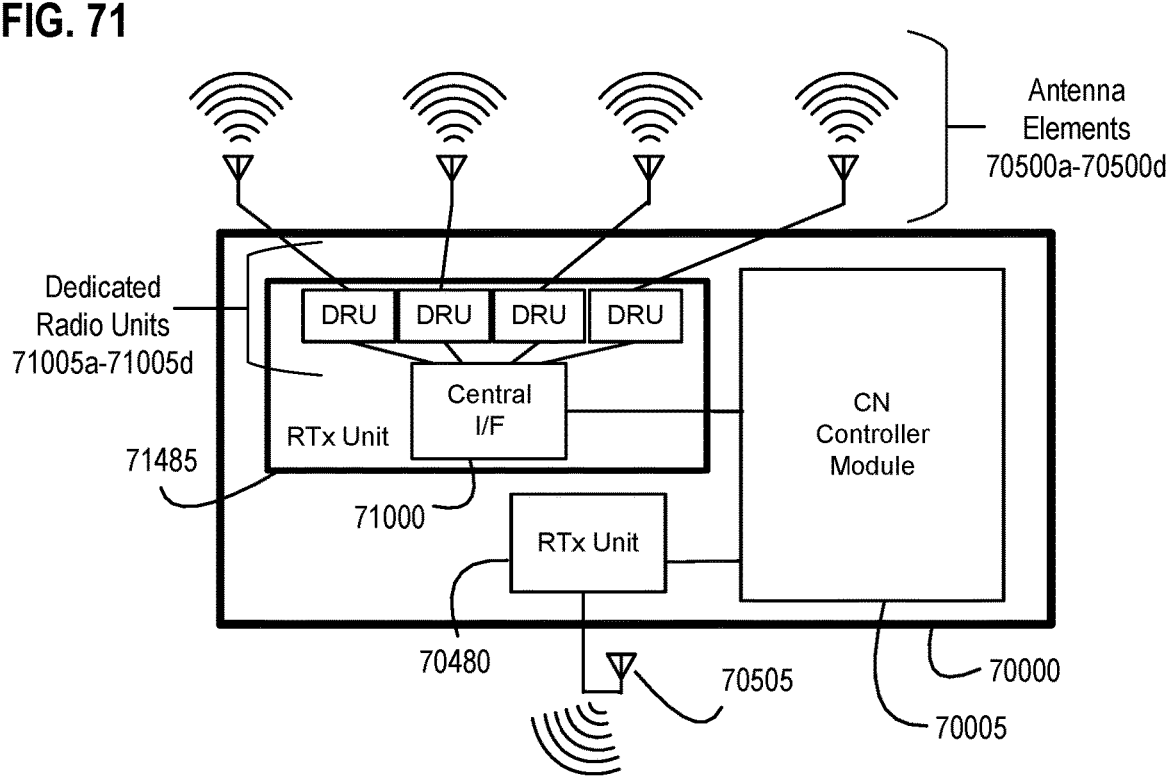
FIG. 71 is a diagram of further internal details of an exemplary enhanced container node having a radio transceiver with dedicated radio units and corresponding antenna elements that receive signals from outside of a logistics container in accordance with an embodiment of the invention.
Figure 72:
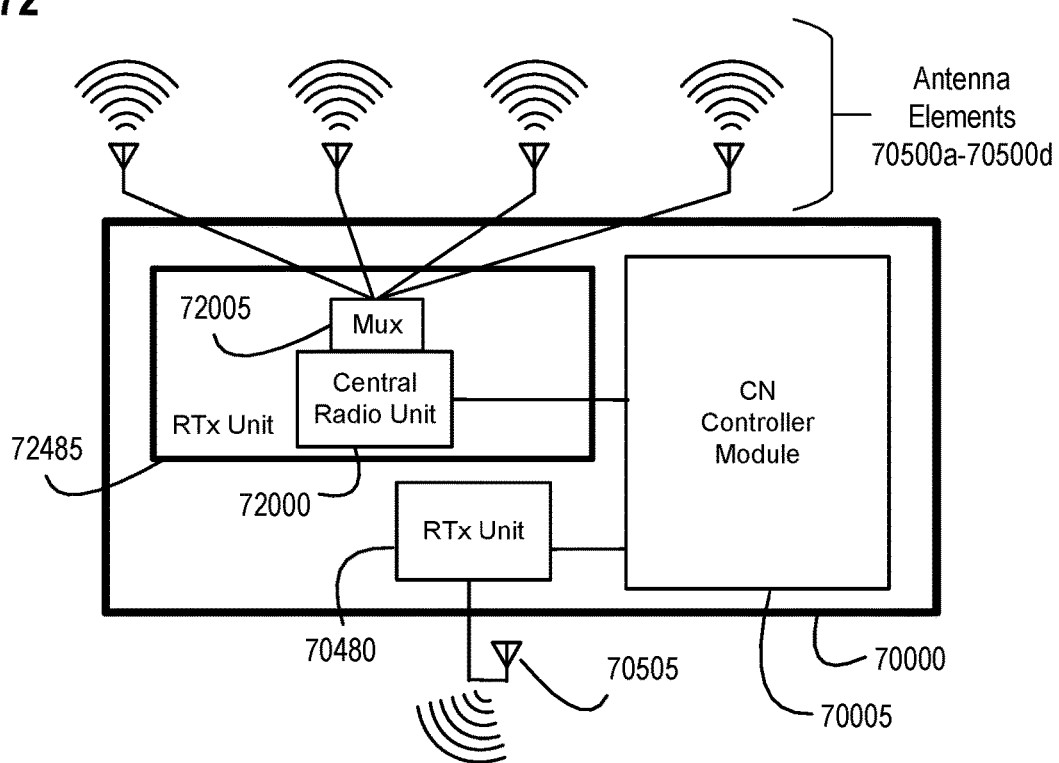
FIG. 72 is a diagram of further internal details of an exemplary enhanced container node having a radio transceiver with a single radio unit selectively coupled to multiple antenna elements that receive signals from outside of a logistics container in accordance with an embodiment of the invention.

FIGS. 71 and 72 provide further details with respect to how exemplary RTX unit 70485 may be implemented in different embodiments. In particular, FIG. 71 is a diagram of further internal details of exemplary enhanced container node having a radio transceiver implemented with multiple dedicated radio units and corresponding antenna elements that receive signals from outside of a logistics container in accordance with an embodiment of the invention. Referring now to FIG. 71, exemplary radio transceiver unit RTx 70485 is coupled to container node controller module 70005 and includes a central interface 71000, multiple dedicated radio units 71005*a*-71005*d*, and multiple antenna elements 70500*a*-70500*d* that each correspond to one of the dedicated radio units 71005*a*-71005*d*. Central interface 71000 may be implemented (similar to interface 67000) with switching circuitry that can provide signals and commands from controller module 70005 to selective ones of the dedicated radio units 71005*a*-71005*d*. Each of the dedicated radio units 71005*a*-71005*d* generally has its own radio transceiver for independent reception and transmission of wireless signals through a corresponding one of the antenna elements 70500*a*-70500*d*. Those skilled in the art will appreciate that in this manner, each of the dedicated radio units 71005*a*-71005*d* may be individually selected (e.g., via commands from controller module 70005 and the switching circuitry of central interface 71000) to receive or transmit information but with this architecture can also do so simultaneously while others of dedicated radio units 71005*a*-71005*d* receive or transmit wireless signals (or at least have overlapping signals being received or transmitted to other nodes).

FIG. 72 is a diagram of further internal details of an exemplary enhanced container node having an alternative type of radio transceiver unit capable of working with multiple antenna elements. Referring now to FIG. 72, exemplary container node 70000 is shown with RTx unit 70485 operatively coupled to the container node's controller module 70005 and includes a single central radio unit 72000 that is coupled to the multiple antenna elements 70500*a*-70500*d* via switching circuitry 72005 (generally labeled "mux" corresponding to a type of multiplexer or RF switch). Mux 72005 may be implemented with switching circuitry that can provide a selective communication path from an RF input/output of central radio unit 72000 to and from antenna elements 70500*a*-70500*d*. As such, those skilled in the art will appreciate that each of the antenna elements 70500*a*-70500*d* may be individually selected or selected in subgroups (e.g., via commands from controller module 70005 that have central radio unit 72000 controlling the switching circuitry of mux 72005) so that the central radio unit 72000 can receive or transmit information via the selected element or subgroup of antenna elements, but does so with a single radio unit (rather than multiple radio units as shown in FIG. 71).

Figure 74:
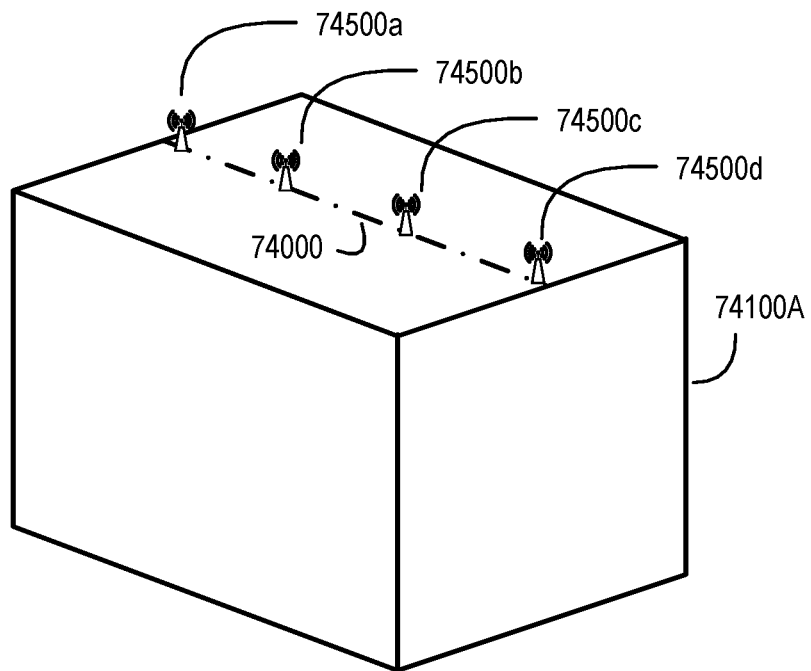
FIG. 74 is a diagram of an exemplary logistics container having antenna elements disposed in an exemplary configuration that is spatially disperse along an axis of the logistics container in accordance with an embodiment of the invention.
Figure 75:
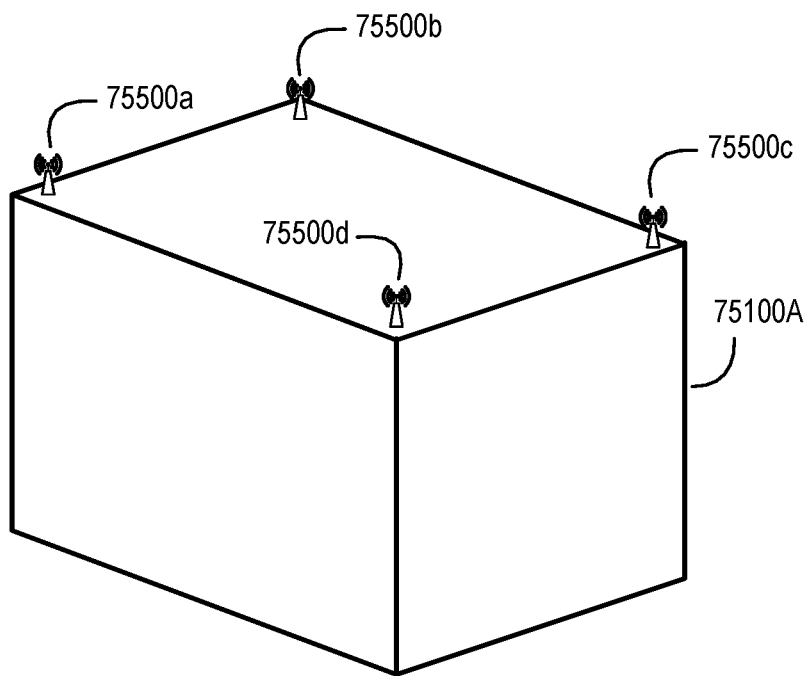
FIG. 75 is a diagram of an exemplary logistics container having antenna elements disposed in an exemplary configuration spaced at different corners of the logistics container in accordance with an embodiment of the invention.

FIGS. 74-77 illustrate further details of various examples of logistics container that may be enabled with such an enhanced container node 70000. In more detail, FIGS. 74 and 75 illustrate exemplary spatially diverse antenna element configurations relative to a logistics container enabled by enhanced container node 70000. Referring now to FIG. 74, an exemplary logistics container 74100A is shown having antenna elements 74500*a*-74500*d* disposed in an exemplary configuration that is spatially disperse along an axis 74000 of the logistics container 74100A in accordance with an embodiment of the invention. In this way, the antenna elements 74500*a*-74500*d* (similar to antenna elements 70500*a*-70500*d* as shown and explained relative to FIG. 70 when connected to RTx units 70485, 71485, or 72485) are positioned on different points of the logistics container 74100A. In similar fashion, FIG. 75 illustrates another exemplary logistics container 75100A having antenna elements 75500*a*-75500*d* disposed in an exemplary configuration spaced at different corners of the logistics container 75100A in accordance with an embodiment of the invention. Still other embodiments may deploy antenna elements for communication with a master node external to the logistics container in different arrangements that separate each of the antenna elements or, alternatively, separates different groups of the antenna elements into subsets located apart from each other to leverage that separation to help determine a refined relative position and/or angular orientation of the logistics container relative to the physical storage.

Figure 76:
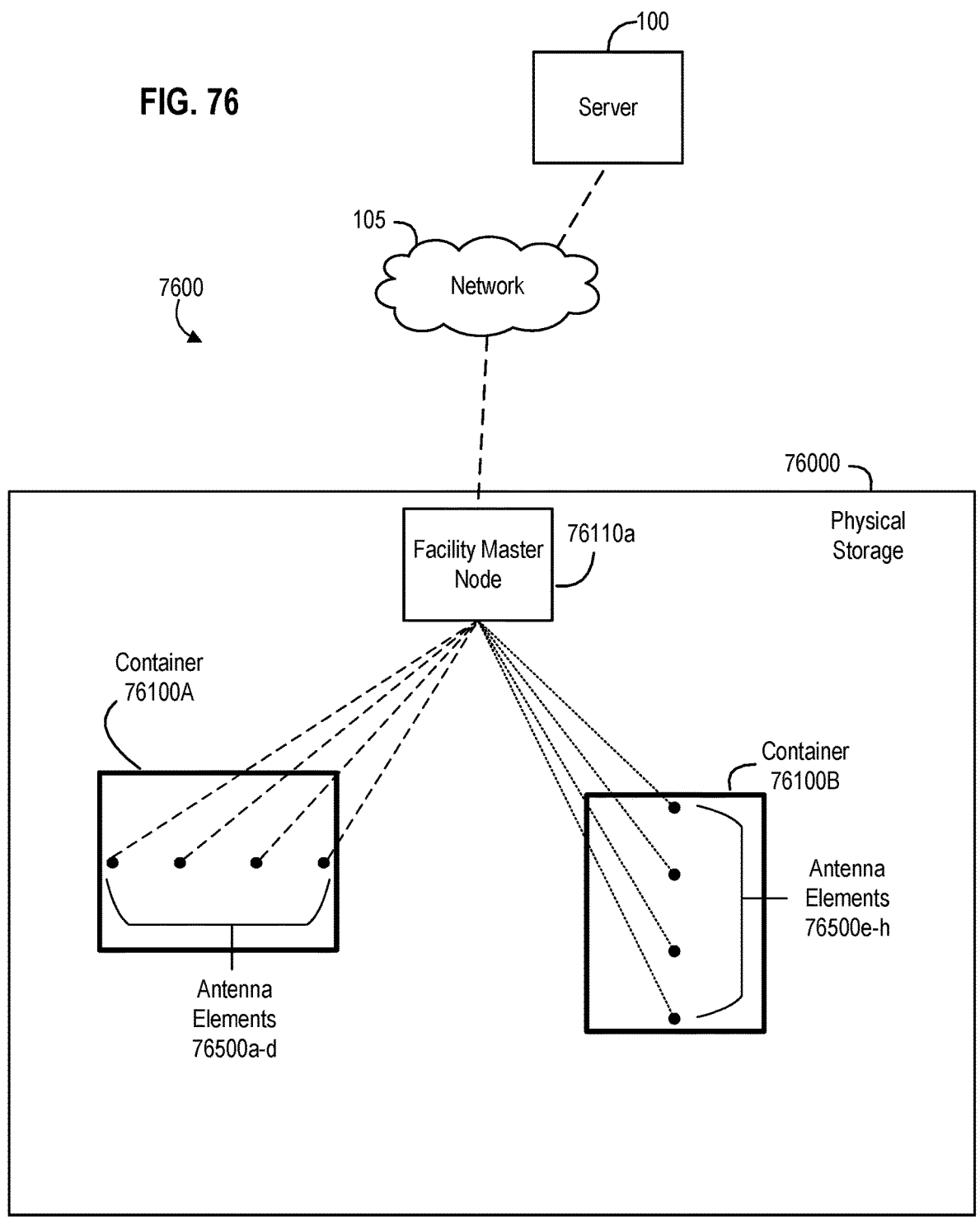
FIG. 76 is a diagram illustrating an exemplary embodiment of multiple wireless node network capable logistics containers having axis-located antenna elements and positioned within a physical storage that is associated with a facility master node in accordance with an embodiment of the invention.
Figure 77:
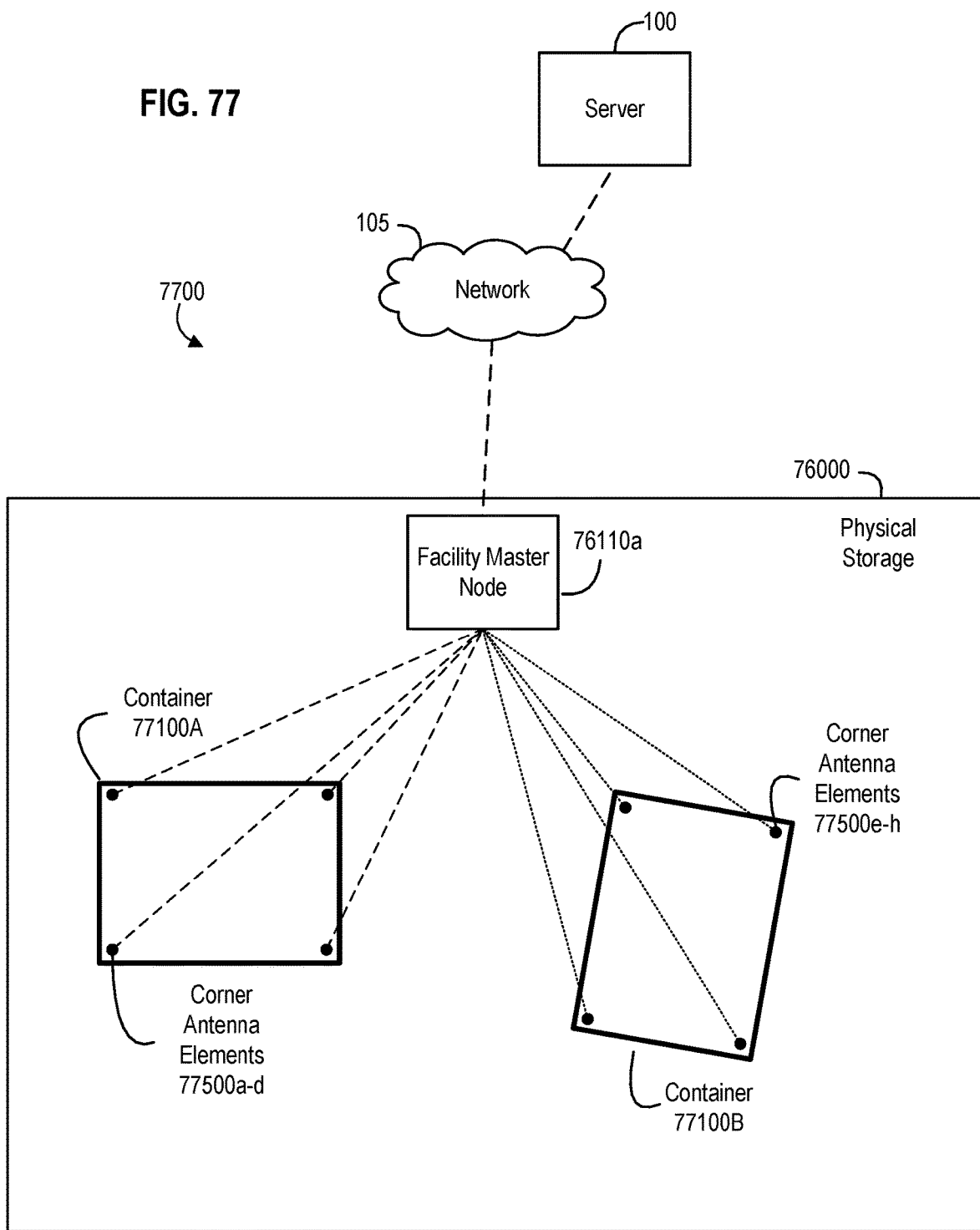
FIG. 77 is a diagram illustrating an exemplary embodiment of multiple wireless node network capable logistics containers having corner-located antenna elements and positioned within a physical storage that is associated with a facility master node in accordance with an embodiment of the invention.

This aspect of physically separated and spatially diverse configurations of the antenna elements that communicate with the master node may be shown in more detail in FIGS. 76 and 77. FIG. 76 is a diagram illustrating an exemplary embodiment of multiple wireless node network capable logistics containers 76100A, 76100B having axis-located antenna elements (similar to that shown in FIG. 74) and positioned within a physical storage 76000 that is associated with a facility master node 76110*a* in accordance with an embodiment of the invention. As shown in FIG. 76 and explained in more detail below, an observed signal strength of what is broadcast from facility master node 76110*a* may be detected at each of antenna elements 76500-76500*d* on container 76100A (or by different subgroups of such antenna elements). As described in more detail below, the observed signal strength at each antenna element (or in some cases, an average observed signal strength for the subgroup of antenna elements) may be compared to the broadcasted power level as sent by the facility master node 76110*a* as part of determining a distance to the master node from each antenna element or subgroup of antenna elements. With such information, an estimated relative location (such as in the form of an estimated placement region within the physical storage) and angular orientation may be determined by the container node controller within the logistics container.

In similar fashion, FIG. 77 shows another exemplary embodiment of multiple wireless node network capable logistics containers 77100A, 77100B having different corner-located antenna elements (similar to that shown in FIG. 75) and positioned within physical storage 76000 that is associated with facility master node 76110*a* in accordance with an embodiment of the invention. As shown in FIG. 77, the antenna elements 77500*a*-77500*d* on container 77100A and antenna elements 77500*e*-77500*h* on container 77100B are more widely dispersed on the respective containers, which provides greater diversity in the determined distances from the master node to each antenna element (via the observed signal strength at each antenna element positioned in their respective points on or as part of the logistics container). Thus, like that described relative to antenna elements 76500-76500*d* on container 76100A, the antenna elements 77500*a*-77500*d* on container 77100A may be used by the container node controller within the container 77100A to determine an estimated relative location (e.g., an estimated placement region within the physical storage 7600) and an angular orientation for container 77100A.

For example, with a known location of the facility master node 76110*a* relative to the physical storage 7600, the different distances from each antenna element to the common facility master node 76110*a* allows for a relative determination of location for the logistics container having the antenna elements (even if not with absolute coordinates). Such a relative location may be in the form of a relative distance from the fixed location of the facility master node 76110*a* in the physical storage 76000 based upon averages of the distances from each antenna element on the logistics container to the facility master node. The differences of such antenna element to master node distances and the known respective positions of the antenna elements as disposed on the logistics container then allows the container node within the logistics container to identify an angular orientation of the container. Such relative locations and angular orientations may, in some embodiments, be determined by the container node controller within the relevant logistics container using reverse trilateration with the known positional information and relative distance information from the relevant detected reception information.

Various embodiments that use enhanced container nodes (e.g., exemplary enhanced container node 70000) having multiple antenna elements to communicate with a master node may deploy and use different types of logistics containers. For example, such a logistics container may include a unit load device (ULD) container capable of being transported within an airplane; a trailer capable of being moved by a vehicle; a train car capable of being moved on a railway system; an intermodal shipping container capable of being moved on at least two different types of transportation modalities; or a type of logistics storage platform (such as a base platform and a flexible cover that is removably attachable to the base platform in order to secure the package ID node relative to the base platform as the logistics container or a node-enabled shelf (similar to the base platform) capable of supporting the package ID node and a package associated with the package ID node.

Various exemplary embodiments may also deploy and use different types of physical storages within with to maintain such containers. For example, such a physical storage may be implemented with a unit load device (ULD) container capable of being transported within an airplane and capable of maintaining other types of containers; a cargo area of an airplane capable of maintaining various ULD containers; a trailer capable of being moved by a vehicle and maintaining other types of containers within the trailer; a train car capable of being moved on a railway system and maintaining various containers within the train car's storage area; an intermodal shipping container capable of being moved on at least two different types of transportation modalities and within which various containers may be held and maintained; as well as a physical building (such as a fixed storage facility, a designated portion of a building, or a designated storage area in or proximate to a building).

In light of the above discussion, an apparatus embodiment may use elements of such an enhanced container node 70000 as part of a wireless node network capable logistics container. In more detail, such an apparatus embodiment would include at least a container node controller and two different radio transceivers. The container node controller, such as controller module 70005 as shown in FIGS. 70-72, is an element of the container node 70000 that is disposed on the logistics container 70100A. Being disposed on the logistics container may include being integrated as part of the container or as being simply attached to the container in a permanent or removable manner. A first of the radio transceivers (e.g., RTx unit 70485) is operatively coupled to the container node controller and includes multiple antenna elements (e.g., antenna elements 70500*a*-70500*d*) disposed in a spatially disperse configuration relative to the logistics container (e.g., disposed along an axis of the logistics container (similar to that shown in FIG. 74), integrated within different parts of the logistics container, on different external surfaces of the logistics container, on different internal surfaces of the logistics container when the material of the logistics container allows each antenna element to receive a wireless signal broadcast from outside the logistics container, or near different corners of the logistics container (similar to that shown in FIG. 75)). In some embodiments, the spatially dispersed configuration of the antenna elements may have a first portion of the antenna elements as one or more integrated parts of the logistics container while also having a second portion of the antenna elements as one or more attachable antenna components mounted to the logistics container. These multiple antenna elements advantageously provide the first radio transceiver with multi-antenna wireless communication access to a master node, which is associated with the physical storage (e.g., facility master node 110*a*) and disposed at a fixed position relative to the physical storage and external to the logistics container.

The second of the radio transceivers in this apparatus embodiment (e.g., RTx unit 70480) is also operatively coupled to the container node controller and has an antenna (e.g., antenna element 70505) providing this radio transceiver with wireless communication access to a package ID node (e.g., ID node A 66120*a*), which is disposed within the logistics container and associated with a package (e.g., package 66130*a*) maintained within the logistics container.

An embodiment of the first radio transceiver may be implemented with a single central radio unit (such as that shown in FIG. 72) that is coupled to each of the antenna elements. However, another embodiment of the first radio transceiver may be implemented with multiple radio units where each are respectively coupled with different antenna elements (such as that shown in FIG. 71). In more detail, the first radio transceiver may be implemented to have a central communication interface operatively coupled to the container node controller, and with each of the multiple dedicated radio units coupled to the central communication interface and one of the antenna elements. In this way, the particular antenna element coupled to each of the dedicated radio units in the first radio transceiver may monitor for signals emanating from the master node.

In operation, the first radio transceiver with its multiple antenna elements and the container node controller interact in a specific, focused, unconventional and advantageous way involving further interactions with the master node in order to determine a location of the logistics container associated with the enhanced controller node apparatus. In particular, the container node controller may send a location control message to the first radio transceiver in response to a location request message received from the master node over the first radio transceiver. The first radio transceiver responds to the location control message by selecting different subsets of the antenna elements to receive an inbound wireless signal from the master node. As each subset of antenna elements are selected (even if each subset is a single antenna element), the first radio transceiver detects reception information about the inbound wireless signal using the selected subset of antenna elements as an active wireless reception input for the RF front end of the transceiver. Such detected reception information may take the form of measured or observed signal strengths of the master node's inbound wireless signal as detected with the selected subset of antenna elements. The first radio transceiver then provides the detected reception information to the container node controller.

With the detected reception information from the first radio transceiver (that is in communication with the master node), the container node controller determines a location of the logistics container relative to the physical storage based upon the detected reception information from the first radio transceiver and then causes the first radio transceiver to transmit a location determination message to the master node. Such a location determination message reflects the determined location of the logistics container relative to the physical storage associated with the master node.

In more detailed embodiments, the container node controller may use the detected reception information relative to the different selected subsets of antennas in a particular manner in order to determine the relative location of the logistics container within the physical storage. For example, in one further apparatus embodiment, the container node controller may determine the location of the logistics container relative to the physical storage based upon an average of the detected reception information from each of the different selected subsets of the antenna elements. With spatially separated antenna elements, such an average may generally provide a relative location in terms of how far away the logistics container is from the master node within the physical storage (e.g., within a specific range distance from the master node, and the like). This may be relevant in a general example where the physical storage is a long trailer and a master node fixed at the front closed end of the trailer is in communication with the enhanced container node apparatus deployed within a logistics container in the trailer. In this example, the ability of the enhanced container node apparatus to determine a relative location of its associated logistics container to be a certain distance from the fixed master node yields a technical solution that aids logistics monitoring and handling of the logistics container itself.

In a further detailed embodiment, the container node controller may determine the location of the logistics container relative to the physical storage by using the detected reception information to identify an observed signal strength relative to a broadcast signal strength for the master node's inbound wireless signal for each of the different selected subsets of the antenna elements. Once this relative difference in observed to broadcasted signal strength information is identified for each of the antenna element subsets, the container node controller may determine an estimated placement region within the physical storage for the logistics container as the determined location of the logistics container relative to the physical storage. Such an estimated placement region is based upon the identified relative observed signal strengths of the inbound wireless signal as associated with the respective positions for each of the different selected subsets of the antenna elements. For example, the container node controller may determine the broadcast signal strength of the master node's inbound wireless signal from information in the signal's package header. With the different observed signal strengths detected at the positions known for each of the subsets of antenna elements relative to the logistics container, the container node controller is able to use reverse trilateration to determine the estimated placement region within the physical storage. In other words, the container node controller may identify the observed signal strength relative to the broadcast signal strength for the master node's inbound wireless signal as indicated by a broadcast power setting parameter in a header of the inbound wireless signal, and then determine the estimated placement region using reverse trilateration based upon the fixed position of the master node relative to the physical storage.

In even more detail, an embodiment may have the apparatus' container node controller able to determine the location of the logistics container relative to the physical storage by first identifying an angular orientation of the logistics container relative to the master node based upon the identified relative observed signal strength of the inbound wireless signal as associated with a respective position for each of the different selected subsets of the antenna elements. Based upon (1) the identified relative observed signal strength of the inbound wireless signal as associated with a respective position for each of the different selected subsets of the antenna elements and (2) the identified angular orientation of the logistics container relative to the master node, the container node controller may then identify a refined relative position of the logistics container within the physical storage for the logistics container as the determined location of the logistics container relative to the physical storage. Thus, the known spatial disposition of the different antenna elements may be used and leveraged by the apparatus' container node controller and the multiple antenna element based first radio transceiver to help determine a relative position of the logistics container within a physical storage associated with the master node through such interactions between these specific nodes and node elements.

In a further extension of the above detailed embodiment, the location determination message generated by the container node controller may include further information other than just the location of the logistics container relative to the physical storage. For example, such a location determination message may also reflect the identified angular orientation of the logistics container relative to the physical storage associated with the master node.

In another example, the container node controller may maintain loading plan information for the physical space within its memory storage. Such loading plan information may be preloaded into the container node controller or sent to the container node controller via the master node to identify different containers and their intended locations within the physical space. In such an embodiment, the location determination message may also include a loading status parameter proactively informing the master node whether the logistics container is located within the physical storage in accordance with the loading plan for the physical storage compared to the determined location of the logistics container relative to the physical storage. This may advantageously help offload some of the physical space monitoring tasks normally performed by the master node associated with the physical space.

Thus, exemplary embodiments of an enhanced container node apparatus (e.g., such as that shown in FIG. 70) may be deployed to use multiple antenna elements in communication with a master node to determine a location of the logistics container associated with the enhanced container node apparatus.

While the above description relates to an exemplary enhanced container node apparatus that communicates with a master node via multiple antenna elements, such an apparatus may be deployed as part of a larger system embodiment that includes the logistics container as a component. In some examples of such a system embodiment, some or all of the elements making up such an enhanced container node may be built into and be an integrated part of the logistics container. However, in other examples, the container node with its multiple antenna elements may be disposed on the logistics container when operating as the system but in a configuration that has the container node being removable and replaceable and/or with antenna elements that may be removably placed at different locations on logistics container.

In more detail, an exemplary embodiment of an enhanced wireless node network capable container system, such as that shown in FIG. 70, generally includes a logistics container, a container node controller, and two different radio transceivers—one of which having multiple antenna elements. The system's container node controller (such as controller module 70005) is disposed on the logistics container—e.g., in an attached or integrated manner relative to an accessible storage area within the logistics container 70100A or in a removable manner using an attachable housing for the container node 70000 within which the container node controller 70005 is disposed.

The system's first radio transceiver (e.g., RTx unit 70485) is operatively coupled to the container node controller and has multiple antenna elements (e.g., antenna elements 70500*a*-70500*d*) placed in a dispersed configuration relative to the logistics container so as to provide reception/transmission coverage that is spread out on different parts of the logistics container (e.g., similar to that shown in FIGS. 74 and 75). As such, the antenna elements provide the first radio transceiver with multi-antenna wireless communication access to a master node (e.g., facility master node 110*a*) disposed external to the logistics container. For example, as shown in FIG. 70, antenna elements 70500*a*-70500*d* are disposed in different parts of logistics container 70100A to provide RTx unit 70485 of container node 70000 with multi-antenna wireless access to facility master node 110*a* (i.e., multiple reception locations with which to receive a signal being broadcast from master node 110*a*). While the system's second radio transceiver (e.g., RTx unit 70480) is also operatively coupled to the container node controller, this second transceiver and has an antenna (e.g., antenna element 70505, which may be implemented as an omni-directional antenna) providing wireless communication access to a package ID node disposed with a package maintained within the logistics container.

In operation, those skilled in the art will appreciate that this system embodiment's container node controller and the different radio transceivers interoperate as discussed above relative to the apparatus embodiment of an enhanced container node apparatus embodiment that deploys multiple antenna elements to communicate with a master node as part of determining a location of the logistics container. Additionally, a system embodiment may also include the logistics container in addition to the controller node controller and the two enhanced radio transceivers.

A further embodiment of such a system embodiment may also include the master node that is disposed external to the system's logistics container at the fixed position relative to the physical storage. For example, such a further system embodiment may generally comprise logistics container 70100A, container node controller 70005 (as disposed within container node 70000 that is on the container 70100A), a first radio transceiver implemented with RTx unit 70485 and antenna elements 70500*a*-70500*d*, a second radio transceiver implemented as RTx unit 70480 with antenna 70505, and facility master node 110*a* that is located at a fixed position relative to a physical storage and that broadcasts a signal for reception by actively selected subsets of antenna elements 70500*a*-70500*d* in order to determine the relative location and/or angular orientation of container 70100A related to the physical storage. The master node in this system embodiment may be operative to generate a location request relative to the logistics container and transmit that location request to the container node's controller via the first radio transceiver (which then causes the container node controller to generate the location control message sent to the container node's first radio transceiver). Such a master node element in this system embodiment may also receive the location determination message from the container node controller and, in some cases, pass along information to a server (e.g., server 100) that reflects the determined location of the package ID node relative to the logistics container. Such a server may also be an explicit element of a larger system embodiment, such as system 7000 as shown in FIG. 70.

Figure 78:
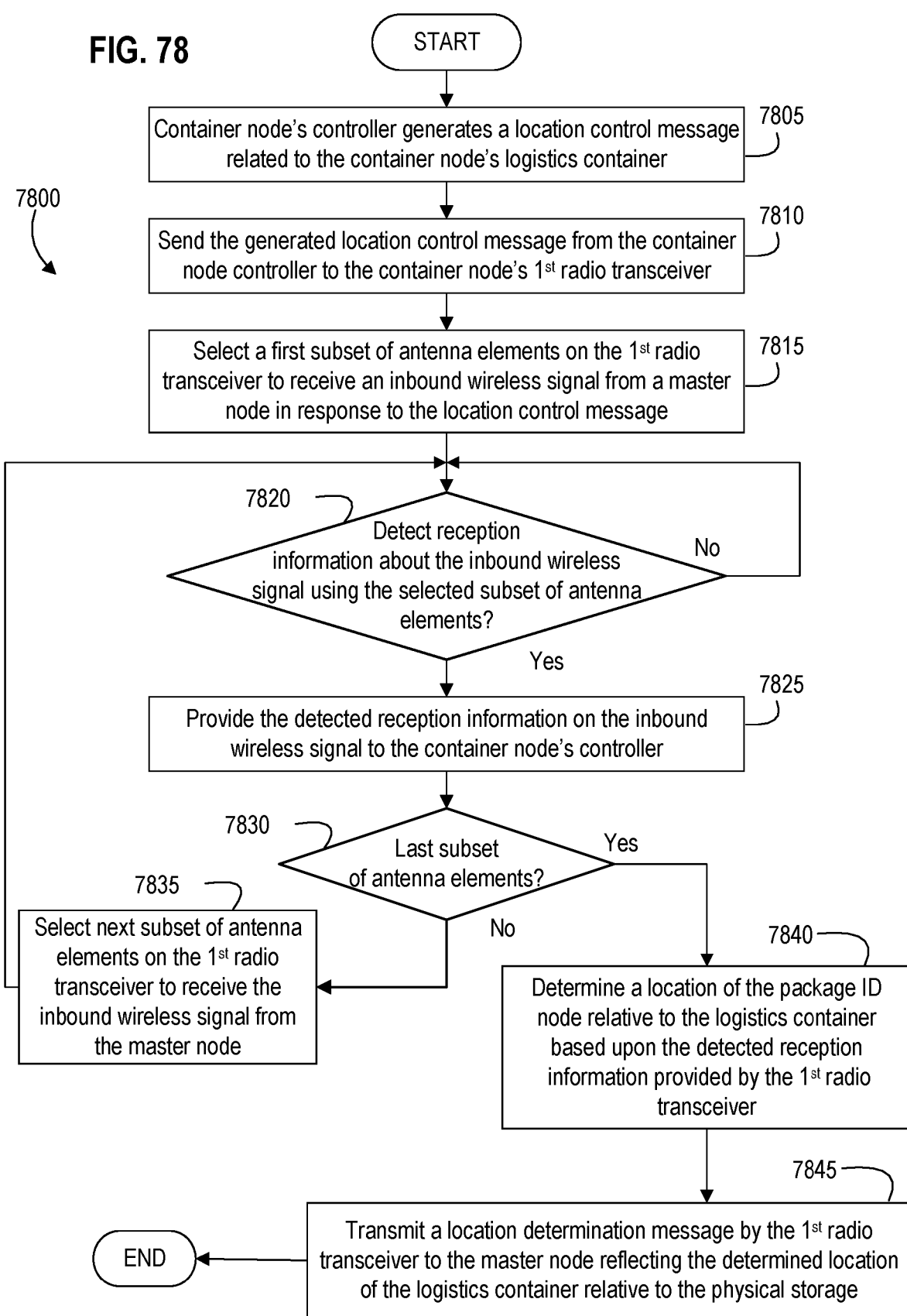
FIG. 78 is a flow diagram illustrating an exemplary method of locating a multi-antenna container node enhanced logistics container disposed within a physical storage having an associated master node located at a fixed position relative to the physical storage, the container node in the logistics container having at least a container node controller, a first radio transceiver, and a second radio transceiver in accordance with an embodiment of the invention.

In light of the above described different apparatus and systems embodiments leveraging use of an enhanced container node (or components of such a node) that deploy multiple antenna elements when communicating with a master node external to the container node's logistics container, a further embodiment may be presented in the form of a system-level method that focuses on how different nodes and node elements collectively and advantageously interact in an unconventional manner to help determine a relative location of the logistics container with respect to the physical storage associated with the master node. FIG. 78 is a flow diagram illustrating an exemplary method implemented by a multi-antenna container node for locating the logistics container relative to a physical storage associated with a master node in accordance with an embodiment of the invention. Exemplary method 7800, as shown and explained relative to FIG. 78, is directed to a multi-antenna container node implemented method of locating a package ID node within a storage area of a logistics container, where the container node is disposed on the logistics container and has at least a container node controller, a first radio transceiver, and a second radio transceiver. An exemplary logistics container deployed relative to an implementation of method 7800 may come in a variety of forms (e.g., a ULD, trailer, train car, intermodal shipping container, a pallet-type logistics storage platform (that may include a cargo net to secure and contain packages to the platform), and one or more shelf structures). An exemplary physical storage associated with the master node deployed relative to an implementation of method 7800 may also come in a variety of forms (e.g., a unit load device (ULD) container capable of being transported within an airplane and capable of maintaining other types of containers; a cargo area of an airplane capable of maintaining various ULD containers; a trailer capable of being moved by a vehicle and maintaining other types of containers within the trailer; a train car capable of being moved on a railway system and maintaining various containers within the train car's storage area; an intermodal shipping container capable of being moved on at least two different types of transportation modalities and within which various containers may be held and maintained; as well as a physical building (such as a fixed storage facility, a designated portion of a building, or a designated storage area in or proximate to a building)).

Exemplary method 7800 begins at step 6905 where the container node controller generates a location control message related to a positon of the controller node's logistics container. This step may, for example, be performed by the container node controller after having received a location request message from the master node associated with the physical storage. In a particular example, server 100 may receive a request to determine a location of a particular logistics container 77100A (as shown in FIG. 77) and, as a result, sends the facility master node 76110*a* associated with physical storage 7600 an inquiry about logistics container 77100A. Facility master node 76110*a* may service the server's inquiry by sending the location request message to the container node controller within logistics container 77100A. Based upon such a received location request message, the container node controller (such as controller module 70005) generates the relevant location control message.

At step 7810, method 7800 has the container node controller of the multi-antenna container node (e.g., container node 70000) sending the location control message to the first radio transceiver of the multi-antenna container node (e.g., RTx unit 70485). The first radio transceiver used in method 7800 has antenna elements disposed in a spatially disperse configuration relative to the logistics container. In this manner, the multiple antenna elements (e.g., antenna elements 70500A-70500*d*) as disposed relative to different parts of the logistics container provide the first radio transceiver with multi-antenna wireless communication access to the master node disposed external to the logistics container. For example, the spatially disperse configuration of the antenna elements relative to the logistics container may have the antenna elements disposed along an axis of the logistics container (similar to that shown in FIG. 74); integrated within different parts of the logistics container (such as a top or corners of the logistics container); disposed on or attached to different external surfaces of the logistics container; disposed on or attached to different internal surfaces of the logistics container when the material of the logistics container allows each antenna element to receive a wireless signal broadcast from outside the logistics container; or near different corners of the logistics container (similar to that shown in FIG. 75)). In some embodiments of method 7800, the spatially dispersed configuration of the antenna elements may have a first portion of the antenna elements as one or more integrated parts of the logistics container while also having a second portion of the antenna elements as one or more attachable antenna components mounted to the logistics container. These multiple antenna elements advantageously provide the first radio transceiver with multi-antenna wireless communication access to a master node, which is associated with the physical storage (e.g., facility master node 110*a*) and disposed at a fixed position relative to the physical storage and external to the logistics container.

At step 7815, method 7800 proceeds by having the first radio transceiver, in response to the location control message from the container node controller, selecting a first subset of the first radio transceiver's antenna elements. This may be a single antenna element located at a particular position on the logistics container, or in other examples, may be several of the antenna elements grouped as the first subset near the particular position on the logistics container. The selected first subset of antenna elements may then be coupled or connected to an RF front end of the first radio transceiver so as to allow for a purposefully selective reception of an inbound wireless signal broadcast from the master node via just the selected subset of antenna elements (as explained in more detail relative to step 7820). In other words, the first radio transceiver may control which of the different subsets of its antenna elements to selectively activate in order to provide an active wireless reception input for the first radio transceiver through the selected subset of antenna elements.

At step 7820, method 7800 continues with the first radio transceiver detecting reception information about the inbound wireless signal from the master node using the selected subset of the antenna elements. In particular, the detected reception information may be in the form of an observed signal strength of the inbound wireless signal from the master node for the selected subset of the antenna elements. Method 7800 waits in step 7820 until the reception information using the selected subset of antenna elements has been captured or detected before method 7800 moves to step 7825 where the first radio transceiver provides the detected reception information to the container node controller.

At step 7830, method 7800 proceeds to step 7840 if the current subset of antenna elements is the last of the subsets, but otherwise proceeds to step 7835 to have the first radio transceiver select the next subset of antenna elements and continue back to step 7820.

At step 7840, method 7800 has the container node controller determine a location of the logistics container relative to the physical storage based upon the detected reception information from the first radio transceiver. In some instances, the location of the logistics container relative to the physical storage may be determined based upon an average of the detected reception information from each of the different selected subsets of the antenna elements. For example, as shown in FIG. 77, the detected reception information from each of the corner antenna elements 77500*a*-77500*d* positioned at corner locations of logistics container 77100A may allow the container node controller within logistics container 77100A to determine the location of container 77100A based upon an average of the observed signal strengths at each of the corner antenna elements 77500*a*-77500*d*.

In a more detailed embodiment of method 7800, step 7840 may be performed by the container node by identifying observed signal strengths and using known positional information for the antenna element subsets as part of determining an estimated placement region within the physical storage to be where the logistics container is located. Specifically, in such a detailed embodiment, the container node controller may first use the detected reception information to identify an observed signal strength relative to a broadcast signal strength for the master node's broadcasted signal (e.g., as indicated by a broadcast power setting parameters in the header of the master node's broadcasted signal) for each of the different selected subsets of the antenna elements. The container node controller then may record an association in its memory of each of identified relative observed signal strengths of the master node's wireless signal with a respective position for each of the different selected subsets of the antenna elements. Thus, with the positional information within the controller's memory on where the different subsets of antenna elements lie with respect to the logistics container and with the identified observed signal strengths as associated with the positional information, the container node controller may then determine an estimated placement region within the physical storage for the logistics container as the determined location of the logistics container relative to the physical storage. Such a determination may use, for example, reverse trilateration based upon the fixed position of the master node relative to the physical storage, the relative signal strength information and the positional information on the different antenna element subsets.

In still a further embodiment, the container node controller may determine the location of the logistics container relative to the physical storage as a refined position based upon an identified angular orientation of the logistics container. In particular, the container node may first identify an angular orientation of the logistics container relative to the master node based upon the identified relative observed signal strength of the inbound wireless signal as associated with a respective position for each of the different selected subsets of the antenna elements. Based upon the identified relative observed signal strength of the inbound wireless signal as associated with a respective position for each of the different selected subsets of the antenna elements and the identified angular orientation of the logistics container relative to the master node, the container node controller may then identify a refined relative position of the logistics container within the physical storage for the logistics container as the determined location of the logistics container relative to the physical storage. Such a refined relative position may include a distance component indicating generally how far the logistics container is located relative to the fixed location of the master node within the physical space and an angular orientation component indicating generally how the logistics container is oriented (e.g., with a certain side of the logistics container being closest to the master node's location based on the differences in observed signal strengths at different antenna element subsets).

At step 7845, method 7800 concludes with the first radio transceiver of the multi-antenna container node transmitting a location determination message (as generated by the container node controller) to the master node where the location determination message reflects the determined location of the logistics container relative to the physical storage associated with the master node. In a further embodiment, such a location determination message may reflect an identified angular orientation of the logistics container relative to the physical storage associated with the master node. And in still another embodiment, such a location determination message may include a loading status parameter informing the master node whether the logistics container is located within the physical storage in accordance with a loading plan for the physical storage when compared to the determined location of the logistics container relative to the physical storage. Such a loading plan may be stored within a memory on the multi-antenna container node and accessible by the container node controller. For example, a front part of the physical storage near a doorway may be designed for items or packages that are supposed to be unloaded first but loaded in last given proximity to the doorway of the storage. Accordingly, an exemplary loading plan file stored within the container node controller (e.g., preloaded or provided on request by a master node, such as the master node associated with the storage) may indicate that the logistics container is supposed to be placed in the front part of the physical storage. However, if the container node controller communicates in a manner as described above with the master node and used its multiple antennas to determine the location of its logistics container is, in fact, in a rear part of the physical storage, the container node controller may set the loading status parameter part of the location determination message sent to the master node to include a misload condition particular to that logistics container as positioned within the physical storage so that the master node, or a server in communication with the master node, may further automatically and proactive notify logistics personnel related to the physical storage (e.g., via messaging to a user access device, such as a smartphone or tablet based device operating as a type of ID node).

Figure 73:
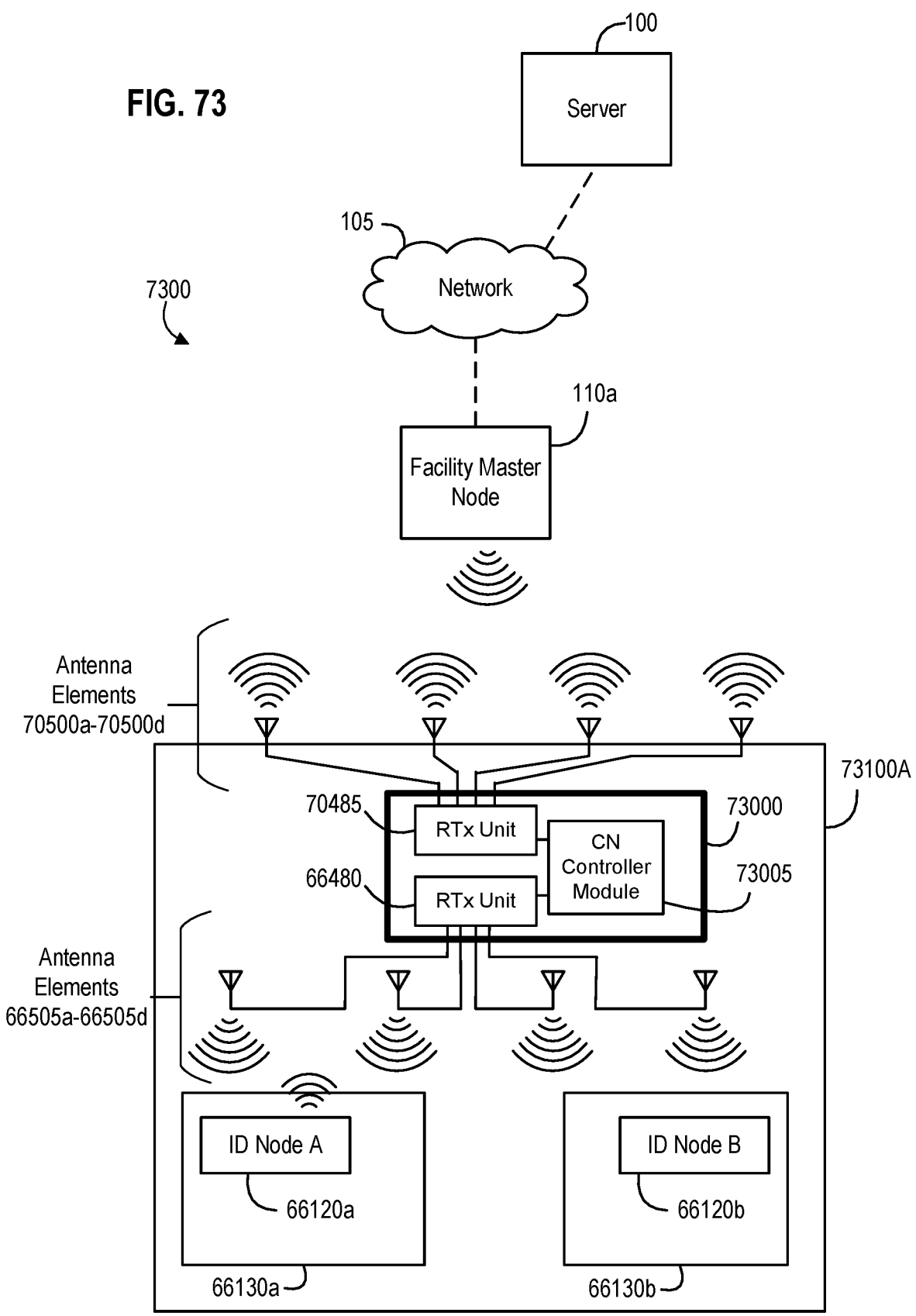
FIG. 73 is a diagram illustrating a further embodiment of an exemplary enhanced container node apparatus disposed as part of a wireless node network capable logistics container and having a first improved radio transceiver for reception of a node outside of the logistics container and a second improved radio transceiver for reception of a node inside of the logistics container as deployed in accordance with an embodiment of the invention.

Those skilled in the art will appreciate that a further combination type of embodiment of an enhanced container node apparatus may determine the relative location of the package ID node within the container with a first group of multiple antenna elements (similar to that shown in FIG. 66) and also may also determine a relative location of the logistics container within a physical storage using a second group of multiple antenna elements (similar to that shown in FIG. 70). This generally combines the related multi-antenna components (e.g., antenna elements and their associated enhanced radio transceivers) to provide the functionality of a container node disposed on a logistics container that operates as described above relative to both exemplary enhanced container node 66000 and exemplary enhanced container node 70000. Such a further combination apparatus embodiment is depicted in more detail in FIG. 73, which illustrates such an exemplary combination enhanced container node apparatus 73000 disposed as part of a wireless node network capable logistics container 73100A and having one improved radio transceiver 70485 for reception of signals from master node 110a outside of the logistics container 73100A and a second improved radio transceiver 66480 for reception of signals from a package ID node 66120a inside of the logistics container 73100A. As shown in FIG. 73, those skilled in the art will appreciate that container node controller 73005 within container node 73000 is operative to interact with RTx unit 66480 and its multiple antenna elements 66505a-66505d for communicating with and locating an ID node within the logistics container 73100A in a manner as described above relative to FIGS. 66, 67, 68, 69A, and 69B. Likewise, container controller node 73005 is also operative in this embodiment to interact with RTx unit 70485 and its multiple antenna elements 70500a-70500d for communicating with facility master node 110a and locating container 73100A within a physical storage associated with the facility master node as described above relative to FIGS. 70-73 and 74-78. Thus, FIG. 73 presents a combination type of embodiment that deploys a different multi-antenna, multi-radio transceivers as part of another type of enhanced container node in an apparatus embodiment; a system embodiment that uses such an apparatus and may also include the logistics container, facility master node, and server as these elements are deployed relative to each and interact as described above; and a method embodiment that combines the operations as presented in the combined flow diagrams of FIGS. 69A, 69B, and 78 as described above.

As described above relative to FIGS. 44-53, an exemplary platform-based logistics container may be associated with a type of container node. A general embodiment of this type of platform-based logistics container may be implemented as a logistics storage platform having a mechanical base that essentially supports items (e.g., ID node enabled packages) that are being stored, moved or transported on a central support surface of the base. This type of exemplary logistics container may also include a flexible cover (such as cargo netting) that is removable and attaches to the base platform in order to secure one or more node enabled packages relative to the base platform as previously described above.

Another example of such a platform-based logistics container is when the base platform is implemented as a shelf type of platform (such as shelving disposed in a building, in a delivery vehicle, or mounted within a larger logistics container). Such a shelf may be implemented as support surface base and, in some embodiments, may include multiple shelves and may include walls to further provide container support to any items maintained on the shelf. And, like the other logistics containers described above, such a shelf or platform-based logistics container may be enabled with an enhanced container node having multiple antenna elements. FIGS. 79-82 provide further details of different embodiments of exemplary logistics containers that may be coupled to and used with an enhanced container node (e.g., enhanced container nodes 66000 or 73000) having multiple antenna elements for determining a location of a package ID node.

Figure 79:
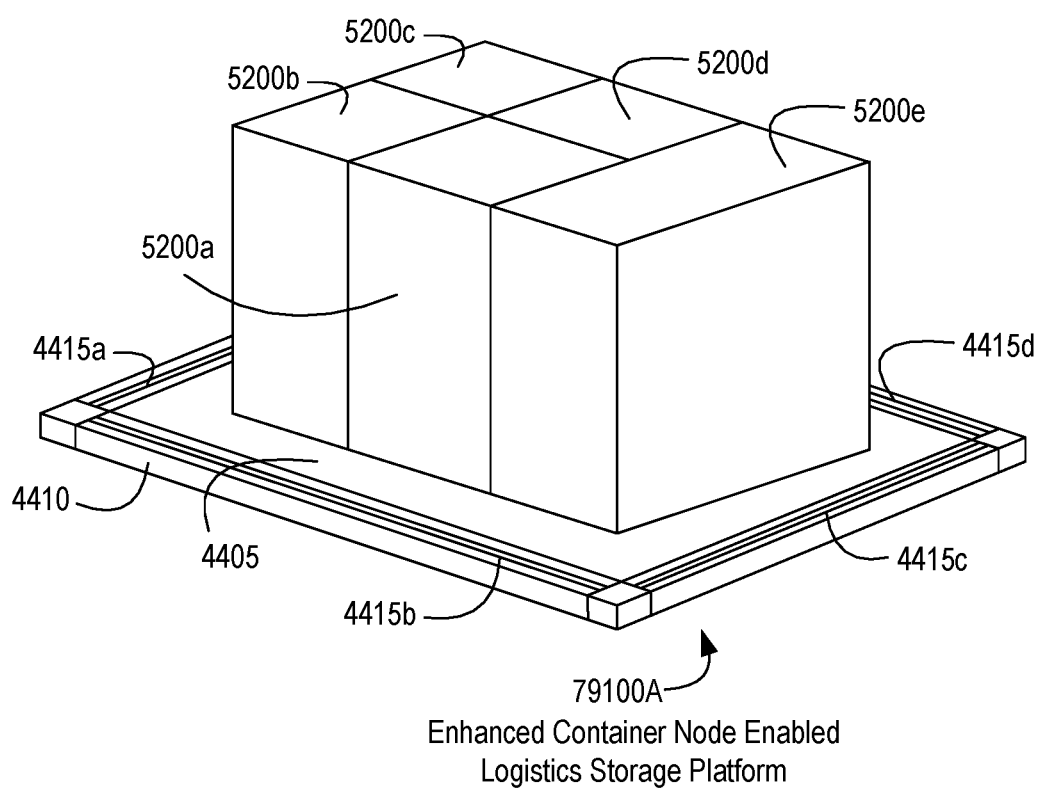
FIG. 79 is a diagram illustrating an alternative embodiment of a logistics container implemented with an exemplary a logistics storage platform for securing, storing, and transporting ID node enabled packages in accordance with an embodiment of the invention.

In more detail, FIG. 79 is a diagram illustrating an alternative embodiment of a logistics container implemented as an exemplary logistics storage platform for securing, storing, transporting ID node enabled packages in accordance with an embodiment of the invention. Referring now to FIG. 79, enhanced container node enabled logistics storage platform 79100A is shown as being similar to exemplary base platform 4400 of FIG. 44 in that it includes a central support surface 4405 surrounded by rail type of edge structure 4410 on the periphery of the base platform 4400. Similar to base platform 4400 shown in FIG. 53, platform 79100A may use the same type of exemplary cover 5300 (e.g., cargo netting) having multiple cover attachment points that can be temporarily secured to different base attachment points disposed along the edges of the base of platform 79100A (e.g., base attachment points illustrated in FIGS. 48-49 that attach within channels disposed within the rail edge structure of similar base platform 4400). And similar to base platform 4400 of FIG. 44, platform 79100A as shown in FIG. 79 has an enhanced type of container node secured within a channel 4415*a* along the periphery of the base of platform 79100A (shown in more detail in FIG. 80). Additionally, the container node deployed with platform 79100A is an exemplary enhanced container node having multiple antenna elements for communicating with package ID nodes being supported on the platform 79100A.

Figure 80:
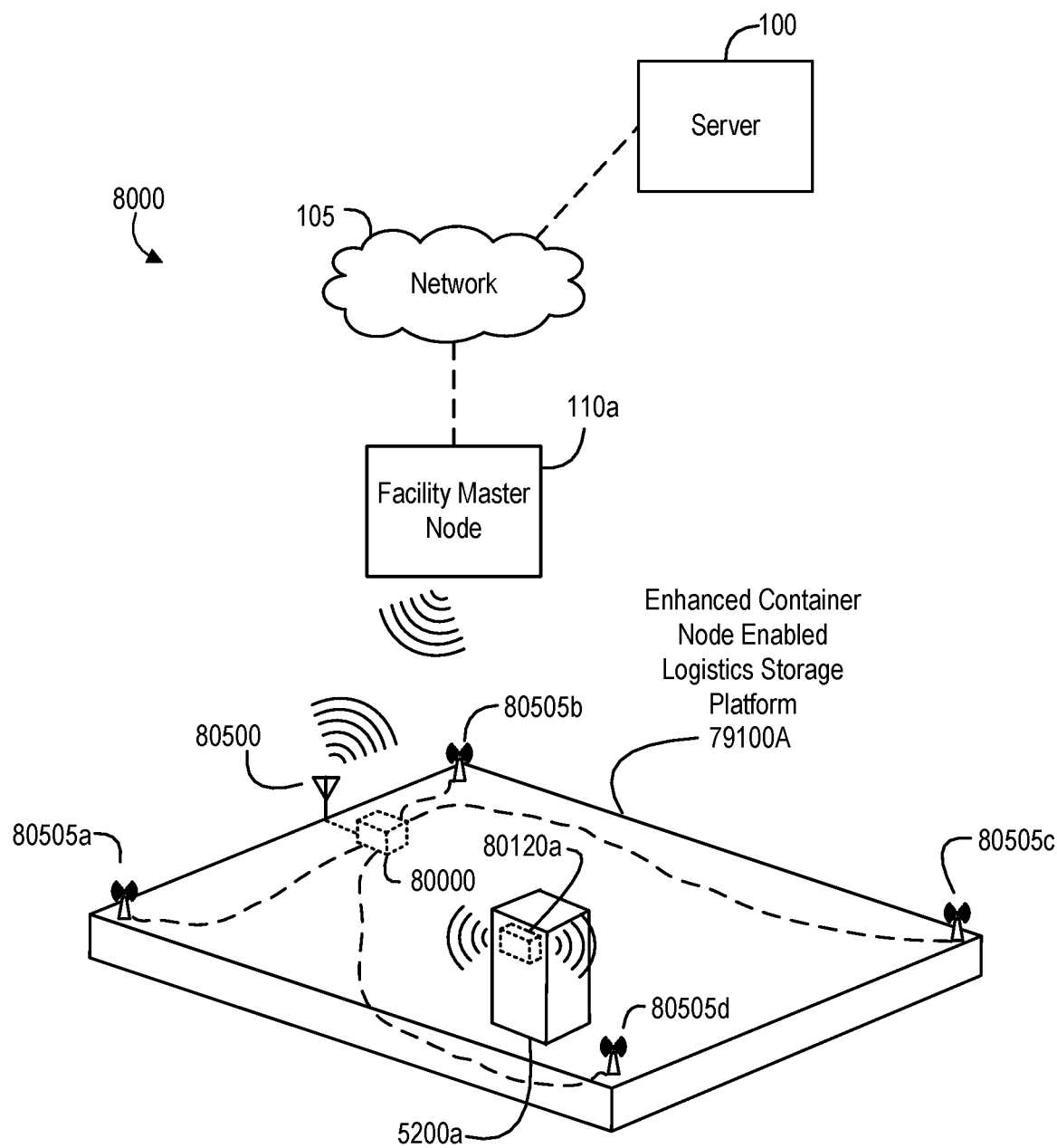
FIG. 80 is a more detail diagram illustrating an exemplary enhanced container node having multiple antenna elements as deployed as part of the exemplary logistics platform shown in FIG. 79 in accordance with an embodiment of the invention.

FIG. 80 is a more detail diagram illustrating an exemplary system 8000 that has a server 100, a facility master node 110*a* in communication with the server 100, and an exemplary enhanced container node 80000 that communicates with the facility master node 110*a* through antenna 80500. Exemplary enhanced container node 80000 is further shown as being attached to platform 79100A, but those skilled in the art will appreciate that node 80000 may be attached, secured, or integrated into to other parts of platform 79100A. Exemplary enhanced container node 80000 is shown having multiple antenna elements 80505*a*-80505*d* disposed near the corners of platform 79100A. In this manner, each of antenna elements 80505*a*-80505*d* may have a characteristic antenna pattern for reception and transmission that is focused on different parts of the support surface of platform 79100A. While shown being disposed near or at the corners of platform 79100A, those skilled in the art will appreciate that other embodiments may have the antenna elements 80505*a*-80505*c* spatially disposed on or within platform 79100A along an axis of the logistics storage platform.

Those skilled in the art will appreciate that enhanced container node 80000, similar to enhanced container node 66000, includes a controller module and two radio transceiver units similar to container node controller module 66005 and RTx units 66485, 66480. As such, each of the antenna elements 80505*a*-80505*d* are coupled to RF input/outputs of one of the radio transceiver units within container node 80000 so that selective ones of the antenna elements 80505*a*-80505*d* may communicate with an ID nodes associated with a package supported on platform 79100, such as ID node 80120*a* within package 5200*a* as shown in FIG. 80.

In operation and as shown in FIG. 80, the antenna elements 80505*a*-80505*d* are deployed and used with platform-based enhanced container node 80000 for localized tracking and locating of particular ID nodes in packages that are supported on platform 79100A. More particularly, the radio transceiver within node 80000 connected to antenna elements 80505*a*-80505*c* may receive a location control message from the container node controller within node 80000. In response, the radio transceiver selects different subsets of the antenna elements 80505*a*-80505*d* to receive an inbound wireless signal from package ID node 80120*a*. For example, the radio transceiver in node 80000 may selectively use each corner located individual antenna element as a subset. In this manner, the radio transceiver may cycle through each antenna element to selectively detect reception information about the inbound wireless signal from package ID node 80120*a*. The radio transceiver then provides the detected reception information to the container node controller within enhanced container node 80000— e.g., as the reception information is incrementally captured for each of the subsets or in a collective burst with reception information provided for all of the subsets.

With this reception information (e.g., observed signal strength measurements for the detected inbound wireless signal from package ID node 80120*a*), the container node controller determines a location of the package ID node 80120*a* relative to the logistics storage platform 79100A based upon the detected reception information, and then causes the other radio transceiver to transmit a location message to the master node reflecting the determined location of the package ID node 80120*a* relative to the logistics storage platform 79100A. For example, the container node controller within platform-based enhanced container node 80000 may compare each of the observed signal strength measurements made when selectively connecting one of the radio transceivers within node 80000 to individual ones of antenna elements 80505*a*-80505*d*. As shown in FIG. 80, an observed signal strength of the signal broadcast from ID node 80120*a* would be the greatest when received through antenna element 80505*c*. As a result, the container node controller within node 80000 may determine the location of package ID node 80120*a* as a relative location (e.g., in a quadrant of platform 79100A closest to the focal area of antenna element 80505*c*) and then have a location message sent to master node 110*a* reflecting that localized measurement-based location determination.

Similar to other enhanced container node embodiments described above, the container node controller within enhanced container node 80000 may generate placement feedback information about package ID node 80120*a* based upon the determined location of the package ID node 80120*a* relative to logistics storage platform 79100A, and cause one of the radio transceivers in node 80000 to broadcast a placement feedback message to the facility master node 110*a* over antenna 80500 based upon the generated placement feedback information. Such placement feedback information may include a loading status parameter, a current weight parameter, and a current balance parameter similar to that previously described. For example, the loading status parameter may indicate whether the package ID node is located on the logistics storage platform 79100A in accordance with a loading plan for that logistics storage platform 79100A compared to the determined location of the package ID node 80120*a* relative to the logistics storage platform 79100A. An exemplary current weight parameter for the logistics storage platform 79100A may be based at least upon a weight of package 5200*a* associated with the package ID node 80120*a*. And an exemplary current balance parameter for the logistics storage platform 79100A may be based at least upon the determined location of the package ID node 80120*a* on the logistics storage platform 79100A and the weight of the package 5200*a* associated with the package ID node 80120*a*.

Figure 81:
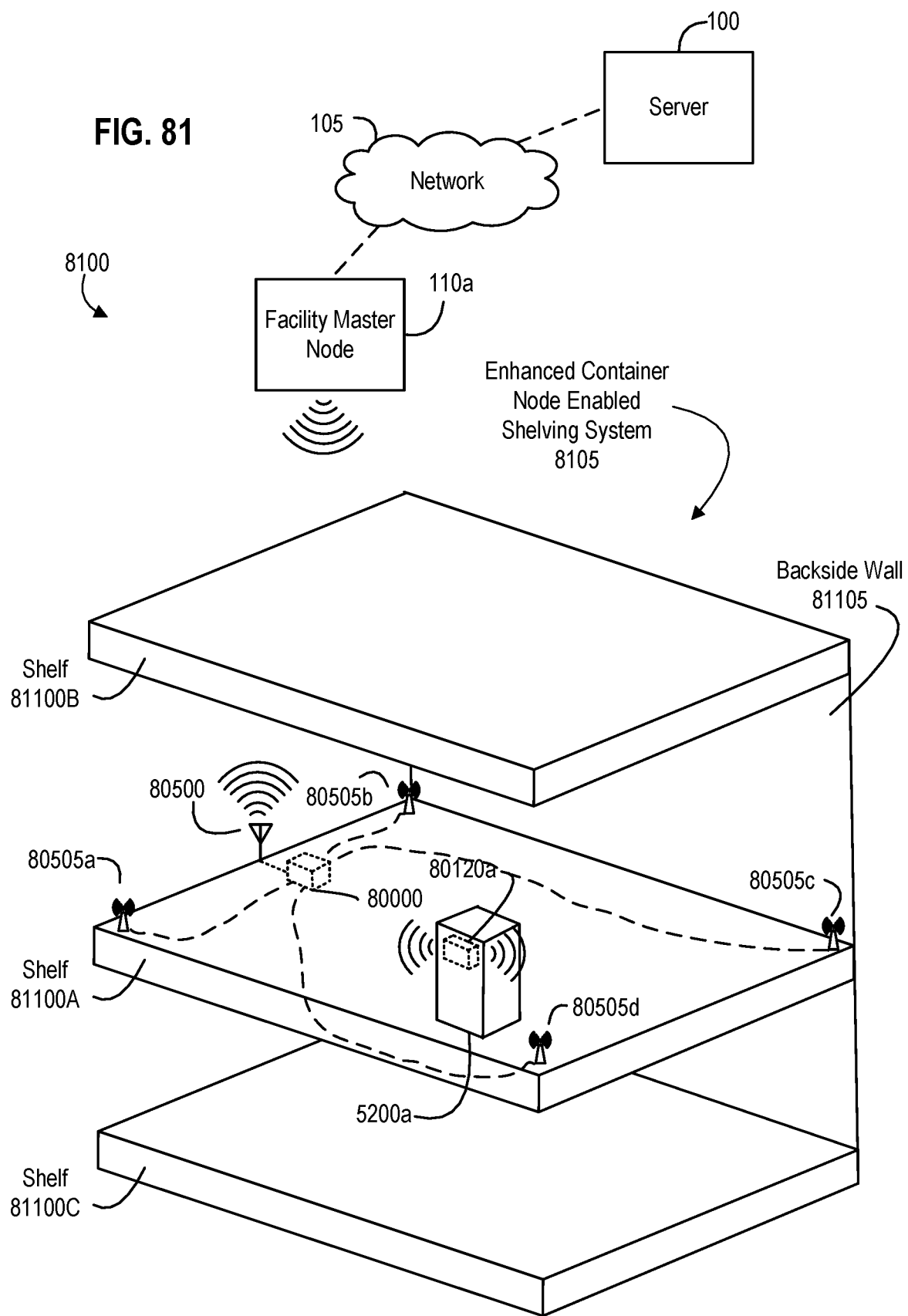
FIG. 81 is a diagram illustrating another alternative embodiment of a logistics container that uses shelving platforms for securing, storing, and transporting ID node enabled packages in accordance with an embodiment of the invention.

Similar principles may be applied to a system that deploys multiple platform-based logistics container using one or more shelves capable of supporting items (e.g., ID node enabled packages). Each of such shelves may be associated with an enhanced container node (similar to node 80000) deployed with multiple antenna elements to communicate with the package ID nodes supported on that shelf in a localized manner allowing for container node measurement-based location determinations. FIG. 81 is a diagram illustrating such an alternative embodiment of a logistics container that uses shelving platforms for securing, storing, and transporting ID node enabled packages in accordance with an embodiment of the invention. Referring now to FIG. 81, shelf 81100A is shown similar to platform 79100A in that shelf 81100A is another example of a platform-based logistics container enhanced with container node 80000 and its multiple antenna elements 80505a-80505d. Exemplary shelf 81000A, along with shelves 81100B and 81100C, may be attached to a common backside wall 81105 to form an enhanced container node enabled shelving system 8105. This exemplary shelving system 8105 may be implemented as standalone shelving or built-in shelving relative to a storage area, building, mobile conveyance, or the like where each shelf in such a system may be container node enabled so that each node-enabled shelf may actively use its multiple antenna elements disposed relative to its shelf structure to determine the location of a particular ID node relative to the shelf.

Such a shelving system 8105 may further operate as part of a larger system 8100 via communication with a facility master node 110a, which is in further communication with server 100. As such, system 8100 may be implemented to track and management movement of packages, such as package 5200a shown supported on shelf 81100A. The enhanced container node 80000 may operate as described above to determine the location of package ID node 80120a relative to shelf 81100A and notify master node 110a regarding the determined location. Facility master node 110a may further update server with information on the determined location of the package ID node 80120a (and its package 5200a).

Figure 82:
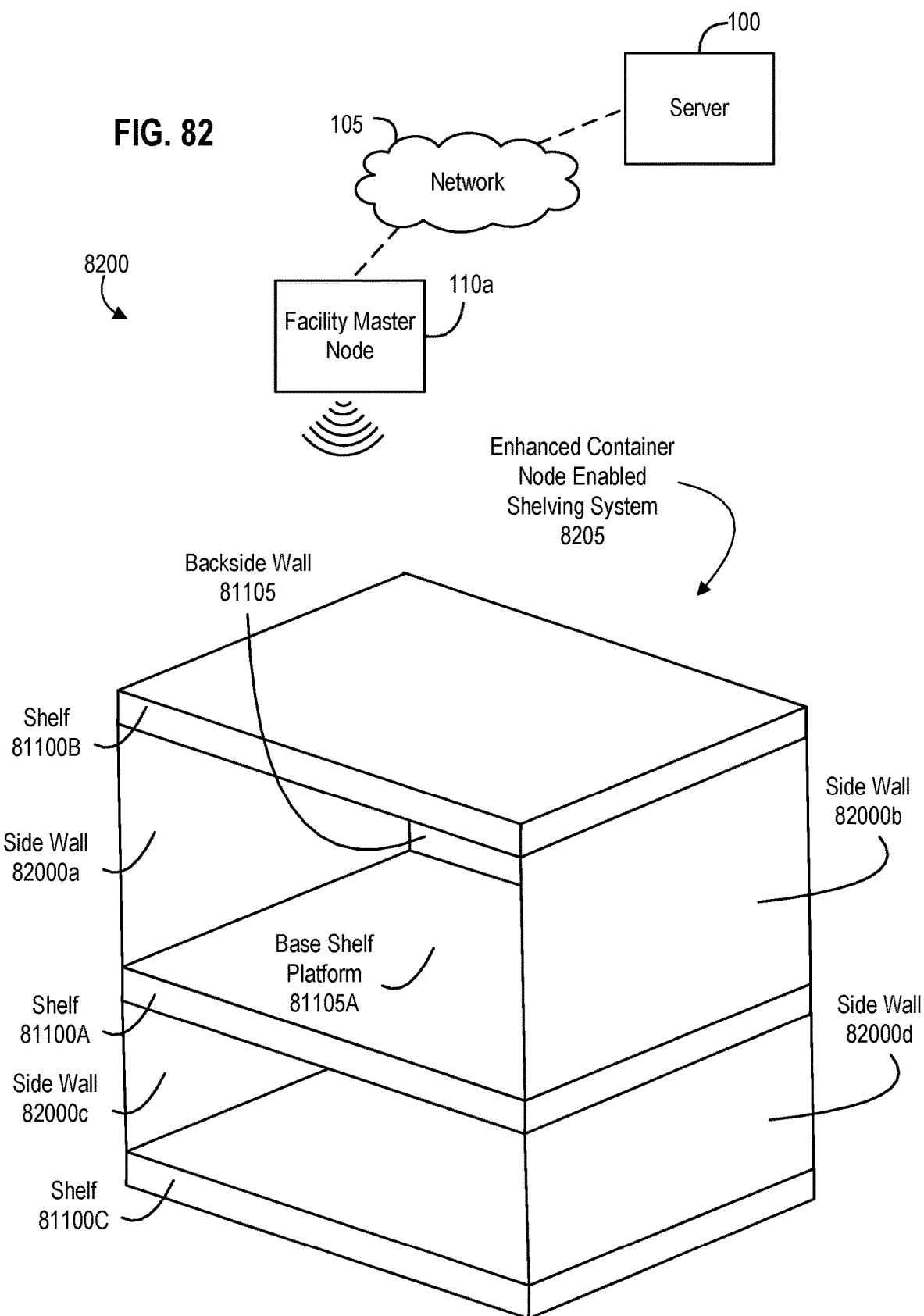
FIG. 82 is a diagram illustrating yet another alternative embodiment of a logistics container that uses shelving platforms having a base platform and side walls in accordance with an embodiment of the invention.

Such a node-enabled shelving system may also be implemented, as shown in FIG. 82, with various side walls relative to one or more of the shelves so that the antenna elements may be mounted on or within the base platform of the shelf as well as one or more of the side walls. For example, as shown in FIG. 82, another embodiment of an enhanced node enabled shelving system 8205 has multiple shelves 81100A-81100C, a common backside wall 81105, and side walls 82000a-82000d. In this manner, antenna elements, such as elements 80505a-80505d, may be disposed relative to node-enabled shelf 81100A on the shelf itself, on side wall 82000a, side wall 82000b, and backside wall 81105 in a spatially diverse configuration so that the different antenna patterns focus on not only different two-dimensional locations relative to the shelf 81100A but may also provide reception granularity in a third dimension (i.e., height above the shelf) via selective subsets of antenna elements disposed at different heights above the shelf 81100A. Thus, the multiple antenna elements used to help locate a package ID node supported on shelf 81100A may be disposed on or built into a top surface of the shelf's base platform, a bottom surface of the shelf's base platform, a side wall surface relative to the shelf, and an interior part of the shelf.

Use of Dedicated Listening Receivers and Command Radios in Wireless Nodes

As described above, different embodiments of a wireless node network used in logistics and shipping operations may use multiple radio elements to enhance certain monitoring operations related to node-enabled packages being shipped, such as determining the location of the node-enabled packages and the location of a container relative to a master node enabled physical storage space. Still further embodiments may have an improved type of wireless monitoring node within such a wireless node network where the node uses special dedicated radio transceivers to help enhance and improve monitoring of low-level ID nodes. In particular, this type of monitoring node may have one or more dedicated listener radio receivers that can scan/listen for broadcast signals from low-level package associated ID nodes on particular channels (e.g., a particular frequency) at the same time, while also having one or more separately dedicated command radio transceivers to communicate instructions (e.g., association instructions, power changing instructions, etc.) to such low-level ID nodes. The low-level ID nodes may be programmed by this type of monitoring node via such instructions to advertise or broadcast in a desired way. For example, the ID nodes may be instructed to change how the ID node broadcasts using a particular broadcast profile or specific parameters within a broadcast profile (e.g., instructions that change how a low-level ID node broadcasts at a particular signal power level, broadcasts on a particular signal frequency, and/or broadcasts according to timing parameters that set how often the particular ID node transmits (or how long to wait before transmitting a next signal). With the low-level ID nodes broadcasting as instructed, the monitoring node may assign the different dedicated listener or node monitoring radio receivers to listen to a particular channel (e.g., frequency) such that the receivers are assigned to different channels so as not miss overlapping or simultaneous broadcasts from the different low-level ID nodes.

Deploying such separate dedicated command transmitters and dedicated node monitoring receivers enhances this type of monitoring node's ability to handle dense node environments where the monitoring node may interact with a relatively large number of low-level ID nodes. In some embodiments, programming or providing instructions to different low-level ID nodes may be much more time consuming than just listening for relevant signals. Thus, using exemplary embodiments of this type of monitoring node helps the node avoid spending too much time in a programming mode sending instructions to low-level ID nodes and, as a result, be a more effective listener to handle and monitor more congested logistics environments, such as large storage facilities, aircraft cargo storage compartments, and other large conveyances that may temporarily store and transport ID node enabled items being shipped. FIGS. 83-86 provide further details of various exemplary apparatus, system, and method embodiments related to this type of monitoring node and how it may be leveraged in wireless node logistics monitoring solutions that yield enhanced and improved monitoring results in an unconventional and advantageous manner.

Figure 83:
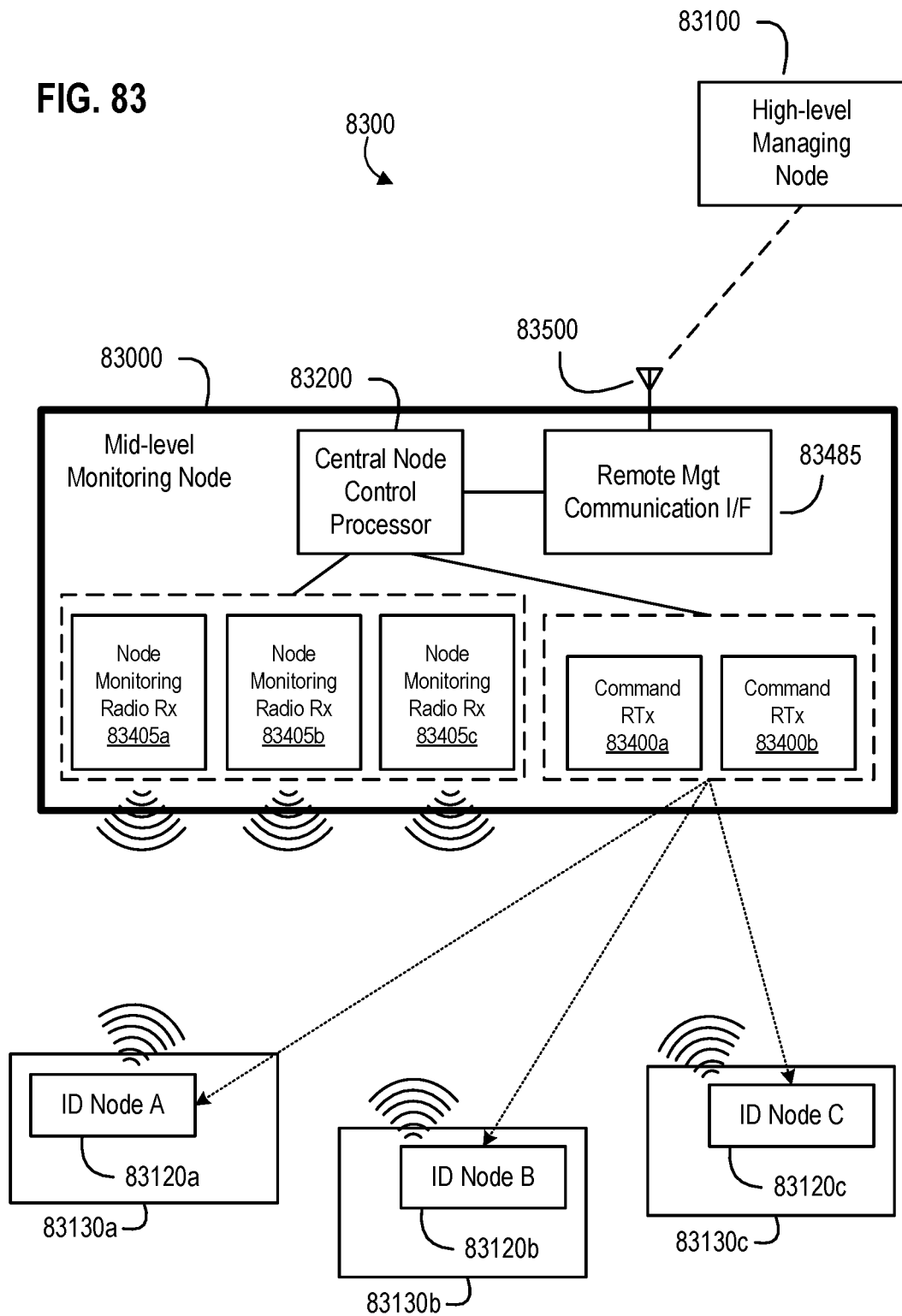
FIG. 83 is a diagram illustrating an embodiment of an exemplary dedicated multi-radio system and apparatus for logistics node monitoring disposed in a wireless node network having a plurality of low-level ID nodes and a high-level managing node, wherein each of the low-level ID nodes is associated with one of a plurality of items being shipped in accordance with an embodiment of the invention.

FIG. 83 is a diagram illustrating an embodiment of an exemplary dedicated multi-radio system and apparatus for logistics node monitoring disposed in a wireless node network having a plurality of low-level ID nodes and a high-level managing node, wherein each of the low-level ID nodes is associated with one of a plurality of items being shipped in accordance with an embodiment of the invention. Referring now to FIG. 83, an exemplary system 8300 is shown having a high-level managing node 83100, a mid-level monitoring node 83000, and multiple packages 83130*a*-83130*c* (each having a respective ID node 83120*a*-83120*c*). In general, exemplary mid-level monitoring node 83000 may be implemented with processing, memory, and general peripheral circuitry as described relative to an exemplary master node 110*a* or an exemplary container node described above but with specialized short range communication interfaces implemented with separate dedicated command radio and dedicated monitoring receivers that can handle overlapping programming events and overlapping ID node signal broadcasts. In more detail, exemplary mid-level monitoring node 83000 is shown in FIG. 83 as having a central node control processor 83200 (similar to the processing elements described relative to an exemplary master node or container node) that is operatively coupled to a remote management communication interface 83485 (which is connected to antenna 83500). As such, the remote management communication interface 83485 (and antenna 83500) provides the central node control processor 83200 with communication access to the high-level managing node 83100 (e.g., a server or a master node that interacts with mid-level monitoring node 83000).

While central node control processor 83200 uses remote management communication interface 83485 to communicate with elements higher within the network, such as high-level managing node 83100, processor 83200 is also operatively coupled to two different types of dedicated radio elements that interact with low-level ID nodes—namely, a dedicated command radio transceiver and a separate dedicated node monitoring radio receiver. A general embodiment of mid-level monitoring node 83200 may include one or more of each. In more detail and as shown in FIG. 83, central node control processor 83200 of exemplary mid-level monitoring node 83000 is coupled to a first and second command radio transceiver (i.e., command RTx units 83400*a*, 83400*b*). The first command radio transceiver 83400*a* is dedicated to providing the central node control processor 83200 with a first command interface to multiple low-level ID nodes, such as ID node A 83120*a*, ID node B 83120*b*, and ID node C 83120*c*. As such and using this dedicated type of first command interface, the first command radio transceiver 83400*a*, in response to a node instruction command received by the central node control processor 83200 from the high-level managing node 83100, may be controlled to transmit an ID node instruction from the central node control processor 83200 to at least one of the low-level ID nodes, such as ID node A 83120*a*. Such ID node instructions are commands intended to be processed by the receiving ID node to change its operation. For example, such an ID node instruction may include a node association operation instruction causing the receiving low-level ID node to responsively establish a permitted node relationship with another node element in the wireless node network; a node broadcast operation instruction causing the receiving low-level ID node to responsively alter a broadcasting status; an instruction causing the receiving low-level ID node to responsively alter a broadcasting power level; an instruction causing the at least one of the receiving low-level ID node to responsively alter a broadcasting timing parameter; and a node data transmission operation instruction causing the receiving low-level ID node to responsively broadcast data gathered by that ID node (e.g., sensor data related to a package associated with the ID node or sensor data received by that ID node from another ID node that has shared the sensor data).

The second command radio transceiver 83400*b* similarly provides the central node control processor 83200 with a parallel command interface to the low-level ID nodes (e.g., ID node A 83120*a*, ID node B 83120*b*, and ID node C 83120*c*). This parallel command interface allows the second command radio transceiver 83400*b*, in response to another node instruction command received by the central node control processor 83200 from the high-level managing node 83100, may be controlled to transmit another ID node instruction from the central node control processor 83200 to another of the low-level ID nodes while the first command radio transceiver 83400*a* transmits the ID node instruction to one of the low-level ID nodes. In this manner, the first command interface provided by the first command radio transceiver 83400*a* and the parallel command interface provided by the second command radio transceiver 83400*b* may be established and used as part of an embodiment of mid-level monitoring node 83000 to permit at least overlapping communication of different command instructions to different ones of the low-level ID nodes.

In addition to the dedicated command radio transceivers 83400*a*-83400*b*, the central node control processor 83200 in exemplary mid-level monitoring node 83000 is coupled to multiple node monitoring radio receivers—e.g., node monitoring radio Rx units 83405*a*-83405*c*. The first node monitoring radio receiver 83405*a* is operatively coupled to the central node control processor 83200 and assigned by the central node control processor 83200 to listen for one or more signals from at least one of the low-level ID nodes 83120*a*-83120*c* over a first channel (e.g. a first range of frequencies). The second node monitoring radio receiver 83405*b* is also operatively coupled to the central node control processor 83200 and may be assigned by the central node control processor 83200 to listen for signals broadcast by the low-level ID nodes 83120*a*-83120*c* over a second channel (e.g. a second range of frequencies) simultaneously as the first node monitoring radio receiver 83405*a* listens for signals from these low-level ID nodes over the first channel such that the first channel does not overlap with the second channel. Similarly, the third node monitoring radio receiver 83405*c* is also operatively coupled to the central node control processor 83200 and may be assigned by the central node control processor 83200 to listen for signals from at least one of the low-level ID nodes 83120*a*-83120*c* over a third channel (e.g. a first range of frequencies) simultaneously as each of the first node monitoring radio receiver 83405*a* and the second node monitoring radio receiver 83405*b* listens for signals from at least one of the low-level ID nodes such that the third channel is distinct from the first channel and the second channel.

In more detail, exemplary central node control processor 83200 is programmed to responsively assign these radio receiver units 83405*a*-83405*c* based upon monitoring commands received from the high-level managing node. For example, central node control processor 83200 assigns the first node monitoring radio receiver 83405*a* to listen for one or more signals from the low-level ID nodes 83120*a*-83120*c* over the first channel in response to a first monitoring command received over the remote management communication interface 83485 from the high-level managing node 83100. Similarly, the central node control processor 83200 may assign the second node monitoring radio receiver 83405*b* to listen for the one or more signals from the low-level ID nodes 83120*a*-83120*c* over the second channel in response to a second monitoring command received over the remote management communication interface 83485 from the high-level managing node 83100. Likewise, the central node control processor 83200 may assign the third node monitoring radio receiver 83405*c* to listen for one or more signals from the low-level ID nodes 83120*a*-83120*c* over the third channel in response to a third monitoring command received over the remote management communication interface 83485 from the high-level managing node 83100.

Thus, a dedicated multi-radio apparatus for logistics node monitoring disposed in a wireless node network may be deployed to improve how to control and monitor low-level ID nodes associated with packages being shipped. Such an exemplary multi-radio apparatus deployed as mid-level monitoring node may be used in a system that includes at least the mid-level monitoring node (e.g., mid-level monitoring node 83000) and the high-level monitoring node (e.g., high-level monitoring node 83100 implemented as a server or a master node type of network element).

A further more detailed system embodiment may be deployed having such a high-level managing node, the mid-level monitoring node, and at least a first low-level ID node disposed relative to a first package being shipped and a second low-level ID node disposed relative to a second package being shipped. For example, as shown in FIG. 83, such an exemplary system 8300 may include high-level managing node 83100, the mid-level monitoring node 83000 as described above, a first low-level ID node 83120*a* disposed relative to package 83130*a* being shipped and a second low-level ID node 83120*b* disposed relative to package 83130*b* being shipped. The high-level managing node 83100 is disposed in the wireless node network and at least maintains association information relating the first low-level ID node 83120*a* and package 83130*a* and maintains association information relating the second low-level ID node 83120*b* and the second package 83130*b*. The mid-level monitoring node 83000, also disposed in the wireless node network, communicated with the high-level managing node 83100 as noted above, and is operative to monitor for one or more signals from at least one of the first low-level ID node and the second low-level ID node in response to a control input message received from the high-level managing node 83100 using the components of exemplary mid-level monitoring node 83000 described above.

Specifically, the system's mid-level monitoring node comprises at least a central node control processor, one or more command radio transceivers, and one or more node monitoring radio receivers. In this exemplary system embodiment, the central node control processor is programmed to operate as described above relative to processor 83200 to be responsible for coordinating the monitoring for the one or more signals from the first low-level ID node 83120*a* and the second low-level ID node 83120*b*. The remote management communication interface (e.g., interface 83485) is operatively coupled to the central node control processor 83200 and provides the central node control processor with access to the high-level managing node and the control input message from the high-level managing node. Each of the command radio transceivers are operatively coupled to the central node control processor and respectively dedicated to providing the central node control processor with different command interfaces to each of the first low-level ID node and the second low-level ID node. Such a command interface allows the respective command radio transceiver to an ID node instruction from the central node control processor to one of the first low-level ID node and the second low-level ID node based upon the control input message. And similar to that described above regarding exemplary mid-level monitoring node 83000, each of the node monitoring radio receivers in the system's mid-level monitoring node is operatively coupled to the central node control processor and assigned by the central node control processor to listen for the one or more signals from at least one of the first low-level ID node and the second low-level ID node over a first channel.

Figure 84:
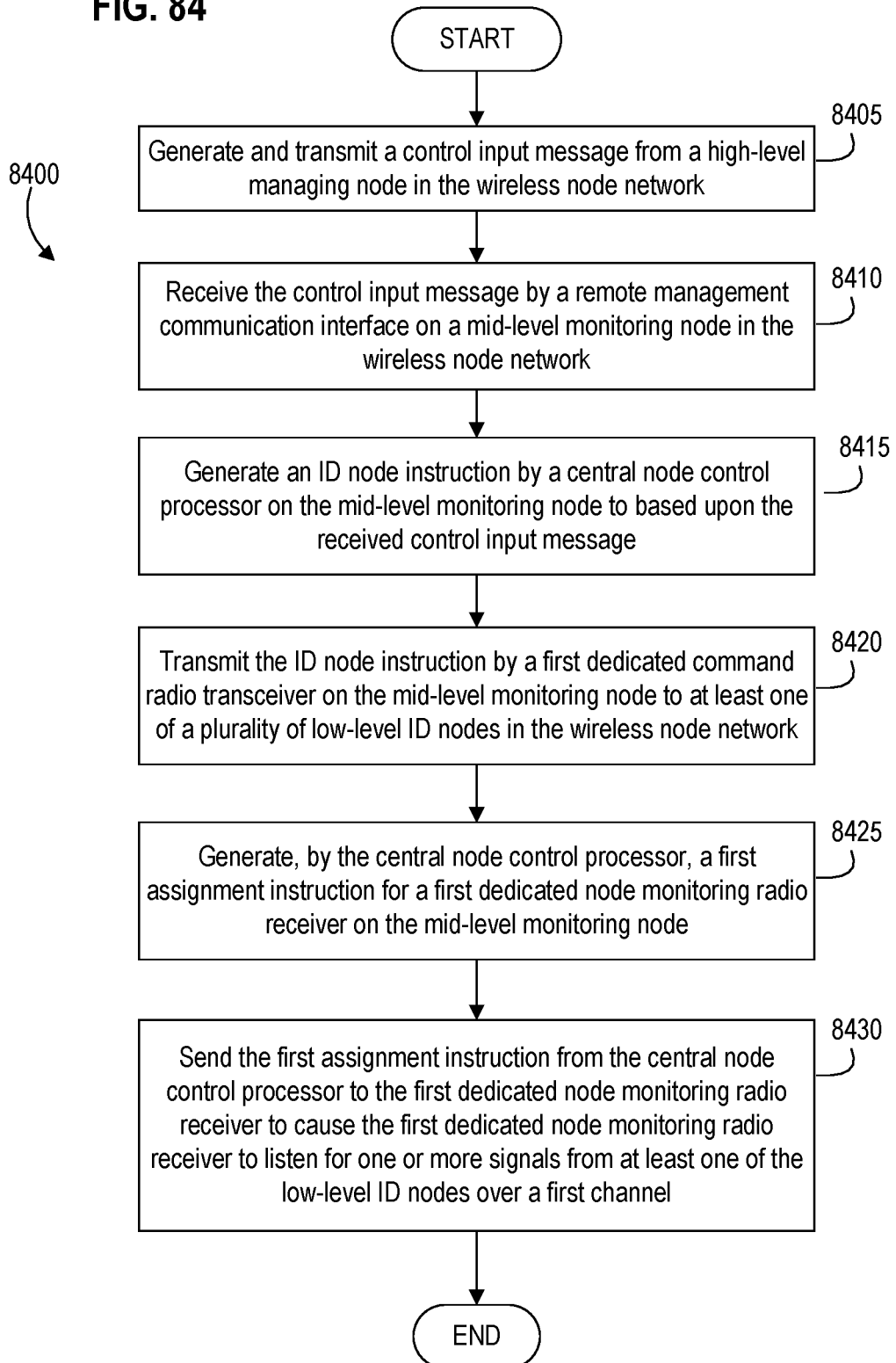
FIG. 84 is a flow diagram illustrating an exemplary method for logistics node monitoring in a wireless node network using a dedicated multi-radio mid-level monitoring node apparatus with a high-level managing node and multiple low-level ID nodes associated with different items being shipped in accordance with an embodiment of the invention.

In operation, the mid-level monitoring node and its components interact in an unconventional manner when conducting logistics monitoring as part of such a system. In more detail, FIG. 84 is a flow diagram illustrating an exemplary method for logistics node monitoring in a wireless node network using a dedicated multi-radio mid-level monitoring node apparatus with a high-level managing node and multiple low-level ID nodes associated with different items being shipped in accordance with an embodiment of the invention. Referring now to FIG. 84, method 8400 begins at step 8405 where the high-level managing node generates a control input message and transmits the control input message to the mid-level monitoring node. The high-level managing node may be implemented as a server or a master node that communicates with the mid-level monitoring node through its remote management communication interface. Such a high-level managing node may generate and transmit the control input message as a command formatted for the mid-level monitoring node that alters how components of the mid-level monitoring node are configured for multi-radio element monitoring and controlling of low-level ID nodes.

At step 8410, method 8400 has the remote management communication interface on the mid-level monitoring node receiving the control input message from the high-level managing node. For example, remote management communication interface 83485 of exemplary mid-level monitoring node 83000 may receive information representing the control input message from the high-level managing node 83100 through antenna 83500 and pass the received control input message information to the central node control processor 83200 so that the central node control processor 83200 may implement changes in response to the control input message.

At step 8415, method 8400 continues with the central node control processor generating an ID node instruction in response to the control input message. As noted before, examples of different ID node instructions may include, but are not limited to, a node association operation instruction that causes an ID node to responsively establish a permitted node relationship with another node element in the wireless node network; a node broadcast operation instruction that causes an ID node to responsively alter a broadcasting status (e.g., an instruction causing the ID node to responsively alter a broadcasting power level or alter a broadcasting timing parameter); and a node data transmission operation instruction causing an ID node to responsively broadcast data gathered by that ID node (such as sensor data related to a package associated with that ID node).

At step 8420, method 8400 proceeds with the first command radio transceiver on the mid-level monitoring node transmitting the generated ID node instruction to at least one of the low-level ID nodes. As a dedicated command radio transceiver, the first command radio transceiver provides the mid-level monitoring node with a first dedicated command interface to the low-level ID nodes. In some embodiments of method 8400, additional ID node instructions may be generated and transmitted to other ID nodes through steps similar to step 8415 and 8420 using a second command radio transceiver on the mid-level monitoring node. As such, the second command radio transceiver in this extension of method 8400 provides the central node control processor with a parallel command interface to the low-level ID nodes. Stated another way, the first command interface provided by the first command radio transceiver and the parallel command interface provided by the second command radio transceiver permits at least overlapping communication of different command instructions to different ones of the low-level ID nodes. Those skilled in the art will appreciate that method 8400 may be extended further with additional versions of steps 8415 and 8420 for still further ID node instructions that are transmitted to other ID nodes via a third or more command radio transceiver.

In this way, step 8420 may be performed in response to a first node instruction command received over the remote management communication interface from the high-level managing node. Likewise, those skilled in the art will appreciate that when a second command radio transceiver is involved, the step of transmitting the additional ID node instruction via this second command radio transceiver may be performed in response to a second node instruction command received over the remote management communication interface from the high-level managing node.

At steps 8425 and 8430, method 8400 turns to configuring the mid-level monitoring node's dedicated monitoring radio receiver(s). Thus, at step 8425, method 8400 proceeds with the central node control processor generating a first assignment instruction for a first node monitoring radio receiver on the mid-level monitoring node. In more detail, this first assignment instruction is a command generated by the central node control processor that assigns the first node monitoring radio receiver to listen for one or more signals from the low-level ID nodes over the first channel (e.g., a particular frequency or frequency range) in response to a first monitoring command received by the processor over the remote management communication interface from the high-level managing node. In a further embodiment, method 8400 may also have the central node control processor generating a second assignment instruction as part of step 8425 that assigns a second node monitoring radio receiver to listen for one or more signals from the low-level ID nodes over a second channel in response to a second monitoring command received over the remote management communication interface from the high-level managing node. In similar fashion, still another embodiment of method 8400 may have the central node control processor generating a third assignment instruction as part of step 8425 that assigns the third node monitoring radio receiver to listen for one or more signals from the low-level ID nodes over a third channel in response to a third monitoring command received over the remote management communication interface from the high-level managing node.

At step 8430, method 8400 proceeds with the central node control processor in the mid-level monitoring node sending the generated first assignment instruction to the first node monitoring radio receiver to cause the first node monitoring radio receiver to listen for one or more signals from at least one of the low-level ID nodes over the first channel (e.g., a first frequency, first set of frequencies, or a first subset of ID nodes deemed to belong to a first channel). A similar step is performed in the further embodiments described above for generated second and third assignment instructions relative to respective second and third node monitoring radio receivers disposed as part of the mid-level monitoring node. In this way, the second assignment instruction to the second node monitoring radio receiver causes the second node monitoring radio receiver to listen for one or more signals from at least one of the low-level ID nodes over the second channel simultaneously as the first node monitoring radio receiver listens for the one or more signals from at least one of the low-level ID nodes over the first channel, where the first channel does not overlap with the second channel. Likewise, the third assignment instruction to the third node monitoring radio receiver causes the third node monitoring radio receiver to listen for one or more signals from at least one of the low-level ID nodes over a third channel simultaneously as each of the first node monitoring radio receiver and the second node monitoring radio receiver listens for the signals from at least one of the low-level ID nodes, where the third channel is distinct from the first channel and the second channel.

Upon completion of method 8400, the specialized and dedicated radio elements of the mid-level monitoring node have been programmatically configured so that the mid-level monitoring node enters an enhanced monitoring state of operation to better handle congested node environments with, for example, a large number of package ID nodes deployed as low-level ID nodes in the network.

Figure 85:
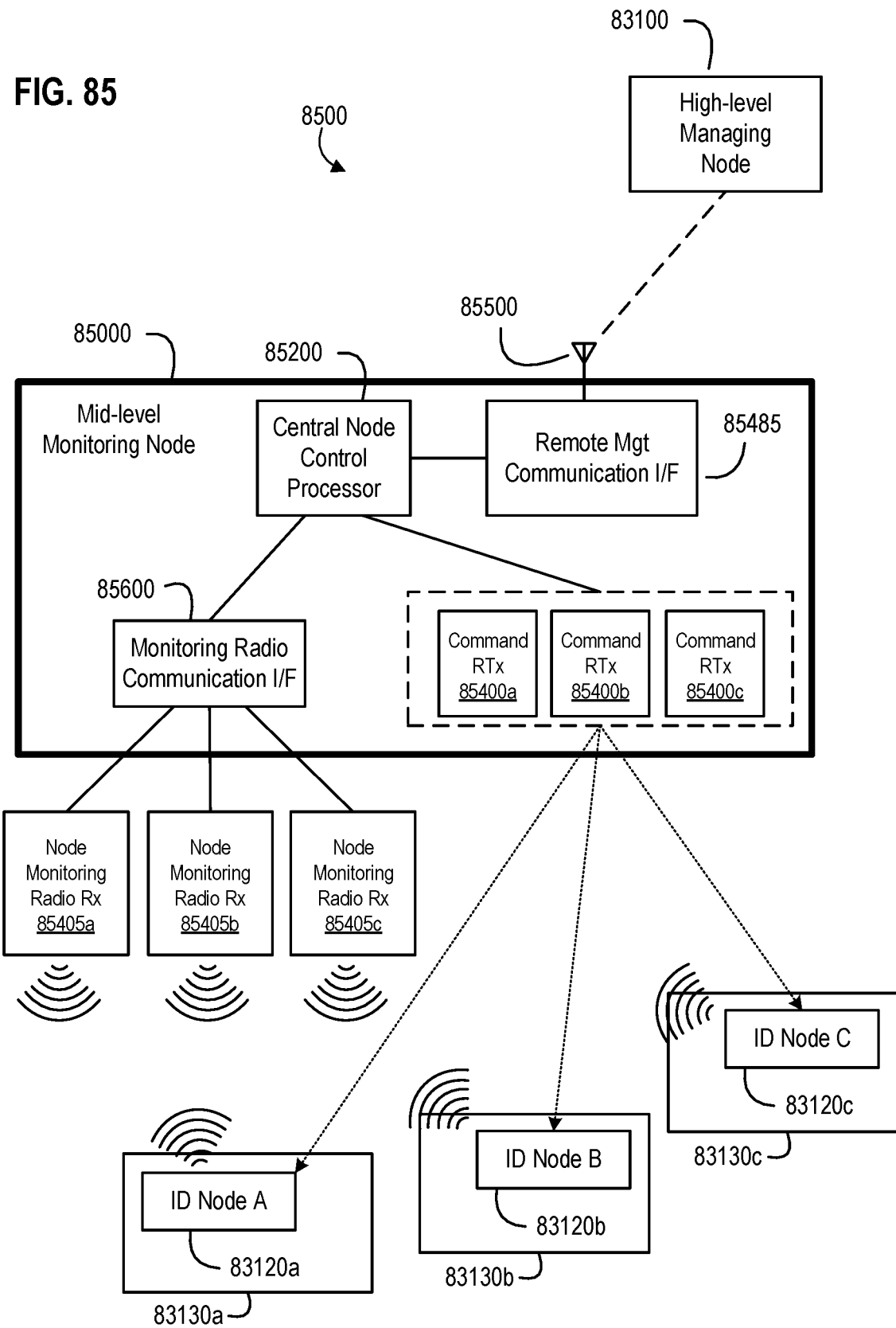
FIG. 85 is a diagram illustrating an alternative embodiment of an exemplary dedicated multi-radio system and apparatus for logistics node monitoring disposed in a wireless node network in accordance with an embodiment of the invention.

As shown in FIG. 83, an embodiment of exemplary mid-level monitoring node 83000 may include the radio receivers and transceivers as incorporated or integrated parts of the mid-level monitoring node. However, alternative embodiments of an exemplary mid-level monitoring node may deploy some of the radio elements as separate devices external to mid-level monitoring node. For example, FIG. 85 is a diagram illustrating such an alternative embodiment of an exemplary dedicated multi-radio system and apparatus for logistics node monitoring disposed in a wireless node network in accordance with an embodiment of the invention. Referring now to FIG. 85, exemplary system 8500 is shown with an exemplary mid-level monitoring node 85000 in communication with high-level managing node 83100 (as described above) as well as in communication with ID node A 83120*a*, ID node B 83120*b*, and ID node C 83120*c* (each of which being related to respective different packages 83130*a*-83130*c* being shipped and monitored). In general, exemplary mid-level monitoring node 85000 shown in FIG. 85 is similar to exemplary mid-level monitoring node 83000 shown in FIG. 83. Both have components that are dedicated command radio units and dedicated node monitoring radio units. However, as shown in FIG. 85, some of the dedicated radio components may be implemented as integrated parts of the mid-level monitoring node 85000 while others of the dedicated radio components may be implemented as physically separate devices from node 85000. Relative to such physically separate dedicated radio units, the mid-level monitoring node 85000 may operate as a remote manager for the separate dedicated radio units.

In more detail, the embodiment of a dedicated multi-radio system 8500 for logistics node monitoring is disposed in a wireless node network having a plurality of low-level ID nodes 83120*a*-83120*c* and high-level managing node 83100 (such as a server or master node). In one embodiment, the system may include the mid-level monitoring node 85000 and one or more node monitoring radio receiver units 85405*a*-85405*c* in communication with the mid-level monitoring node 85000 as separate devices. In general, the mid-level monitoring node 85000 coordinates monitoring for one or more signals from at least one of the low-level ID nodes 83120*a*-83120*c* in response to a control input (e.g., a message with control information or other commands for node 85000) from the high-level managing node 83100.

Similar to node 83000, the exemplary mid-level monitoring node 85000 in system 8500 further comprises a central node control processor 85200, a remote management communication interface 85485, one or more command radio transceivers 85400a-85400c, and a monitoring radio communication interface 85600. In this embodiment, the central node control processor 85200 is configured and programmed so that it operates to coordinate monitoring for one or more signals from at least one of the low-level ID nodes 83120a-83120c. The remote management communication interface 85485 (similar to interface 83485) is operatively coupled to the central node control processor 85200 and provides the central node control processor 85200 with communication access via its antenna 85500 to the high-level managing node 83100. As such, the remote management communication interface 85485 receives the control input from the high-level managing node 83100 through its antenna 85500 and passes that control input to the central node control processor 85200.

All of the command radio transceivers 85400a-85400c are operatively coupled to the central node control processor 85200. As such, each of the command radio transceivers is dedicated to providing the central node control processor 85200 with a different command interface to the low-level ID nodes 83120a-83120c. For example, a first command radio transceivers 85400a provides a first command interface for the central node control processor 85200, which allows for transmission of a first ID node instruction from the central node control processor 85200 of the mid-level monitoring node 85000 to at least one of the low-level ID nodes 83120a-83120c. Thus, the different command interfaces provided by each of the command radio transceivers 85400a-85400c may operate in parallel. As such, these different command interfaces using the different command radio transceivers 85400a-85400c of node 85000 permit at least overlapping communication of different command instructions (e.g., one or more of the different types of ID node instructions as explained above) to different ones of the low-level ID nodes 83120a-83120c.

The monitoring radio communication interface 85600 of mid-level monitoring node 85000 is also operatively coupled to the central node control processor 85200. In one embodiment, in response to feedback received by the monitoring radio communication interface 85600 from the central node control processor 85200 related to the control input received from high-level managing node 83100, the monitoring radio communication interface 85600 may generate and send different assignment instructions to different ones of the separate dedicated node monitoring radio receivers 85405a-85405c. However, in other embodiments, the monitoring radio communication interface 85600 may operate more as a switching interface to pass along relevant assignment instructions generated by the central node control processor 85200 to specific ones of the separate dedicated node monitoring radio receivers 85405a-85405c.

As mentioned above, each of the dedicated node monitoring radio receivers 85405a-85405c is separately disposed relative to mid-level monitoring node 85000 and is in communication with the mid-level monitoring node 85000 through the monitoring radio communication interface 85600. Each of these distinct and separate dedicated node monitoring radio receivers 85405a-85405c may be responsive to assignment instructions received from the mid-level monitoring node 85000 to listen for one or more signals from at least one of the low-level ID nodes 83120a-83120c over a first channel. In some embodiments, there may be a single dedicated node monitoring radio receiver deployed separate from mid-level monitoring node 85000 (such as receiver 85405a), but in other embodiments multiple separate receivers may be deployed. For example, mid-level monitoring node 85000 is shown in FIG. 85 in communication with a second separate dedicated node monitoring radio receiver 85405b, which is responsive to a second assignment instruction to listen for one or more signals from at least one the low-level ID nodes 83120a-83120c over a second channel simultaneously as the first node monitoring radio receiver unit 85405a listens for one or more signals from at least one of the low-level ID nodes 83120a-83120c over the first channel, where the first channel does not overlap with the second channel. Mid-level monitoring node 85000 is also shown in FIG. 85 in communication with a third separate dedicated node monitoring radio receiver 85405c, which is responsive to a third assignment instruction to listen for one or more signals from at least one the low-level ID nodes 83120a-83120c over a third channel simultaneously as each of the first node monitoring radio receiver unit 85405a and the second node monitoring radio receiver unit 85405b listens for signals from the low-level ID nodes 83120a-83120c where the third channel is distinct from the first channel and the second channel. As noted above, such channels may be considered particular signal frequencies or frequency ranges that different from one another.

Thus, the different node monitoring radio receiver units may detect different signals in their respective channels at the same time and provide different detection notifications back to the mid-level monitoring node 85000. For example, one node monitoring radio receiver unit 85405a may transmit a first detection notification to the monitoring radio interface 85600 of the mid-level monitoring node 85000. Such a first detection notification reflects the detection of any signals from at least one of the low-level ID nodes 83120a-83120c over the first channel. At the same time, a second node monitoring radio receiver unit 85405b may transmit a second detection notification to the monitoring radio interface 85600 of the mid-level monitoring node 85000. Such a second detection notification reflects detection of any signals from at least one of the low-level ID nodes 83120a over the second channel while the first node monitoring radio receiver unit 85400a detects a signal from at least one of the low-level ID nodes 83120a-83120c over the first channel.

Another system embodiment may focus on a dedicated multi-radio system for logistics node monitoring disposed in a wireless node network having at least two low-level ID nodes (such as ID nodes 83120a, 83120b associated with respective packages 83130a, 83130b being shipped) and a high-level managing node (such as high-level managing node 83100 that may be implemented as a server or master node. This system embodiment generally comprises a mid-level monitoring node (such as node 85000) and two separate node monitoring radio receiver units. The mid-level monitoring node has communication access to the high-level managing node over a first communication path (such as a longer range Wi-Fi or cellular formatted communication path) and communication access to the two low-level ID nodes over a second communication path (such as a shorter range BLE formatted communication path). The mid-level monitoring node in this embodiment is responsive to a control input received from the high-level managing node over the first communication path to generate multiple monitoring assignment task instructions related to scanning for one or more signals from the low-level ID nodes.

A first of the node monitoring radio receiver units (such as node monitoring radio receiver 85405a) is responsive to a first of the monitoring assignment task instructions to scan for one or more signals from the low-level ID nodes over a first channel (e.g., a specific frequency or range of frequencies). This first monitoring assignment task instruction is received by the first node monitoring radio receiver over a third communication path (wired or wireless) connecting the separate radio receiver unit and the mid-level monitoring node.

A second of the node monitoring radio receiver units (such as node monitoring radio receiver 85405*b*) is responsive to a second of the monitoring assignment task instructions to scan for one or more signals from the low-level ID nodes over a second channel (e.g., another frequency or range of frequencies different from and does not overlap with that associated with the first channel) simultaneously while the first node monitoring radio receiver unit scans for the one or more signals from the low-level ID nodes over the first channel. In this configuration, the second monitoring assignment task instruction is received by the second node monitoring radio receiver over the third communication path from the mid-level monitoring node.

The mid-level monitoring node in this alternative system embodiment may include multiple command radio transceivers (such as command radio transceivers 85400*a*-85400*c*) that respectively provide different command interfaces to different ID nodes and permit at least overlapping communication of different command instructions (e.g., different ID node instructions as explained above to different ones of the low-level ID nodes.

Still a further embodiment may deploy programmable dedicated multi-mode radio elements as part of an exemplary mid-level monitoring node based apparatus or system. In these embodiments, the multi-mode radio elements are generally programmable radio transceivers that may be selectively assigned to operate as either a dedicated command radio transceiver that sends ID node instructions to particular ID nodes or a dedicated node monitoring radio receiver setup and programmatically configured to listen for signals from an ID node at a particular frequency or frequency range. The ability to selectively deploy multi-mode or radio elements capable of being programmed to handle different dedicated transmitter/receiver tasks (i.e., different command and node monitoring roles) within the exemplary mid-level monitoring node allows the same mid-level monitoring node to be used as an apparatus or an element of a larger system embodiment to handle complex and changing node landscapes where some of the multi-mode radio elements may be changed from a dedicated command radio transceiver to a dedicated node monitoring radio receiver unit.

Figure 86:
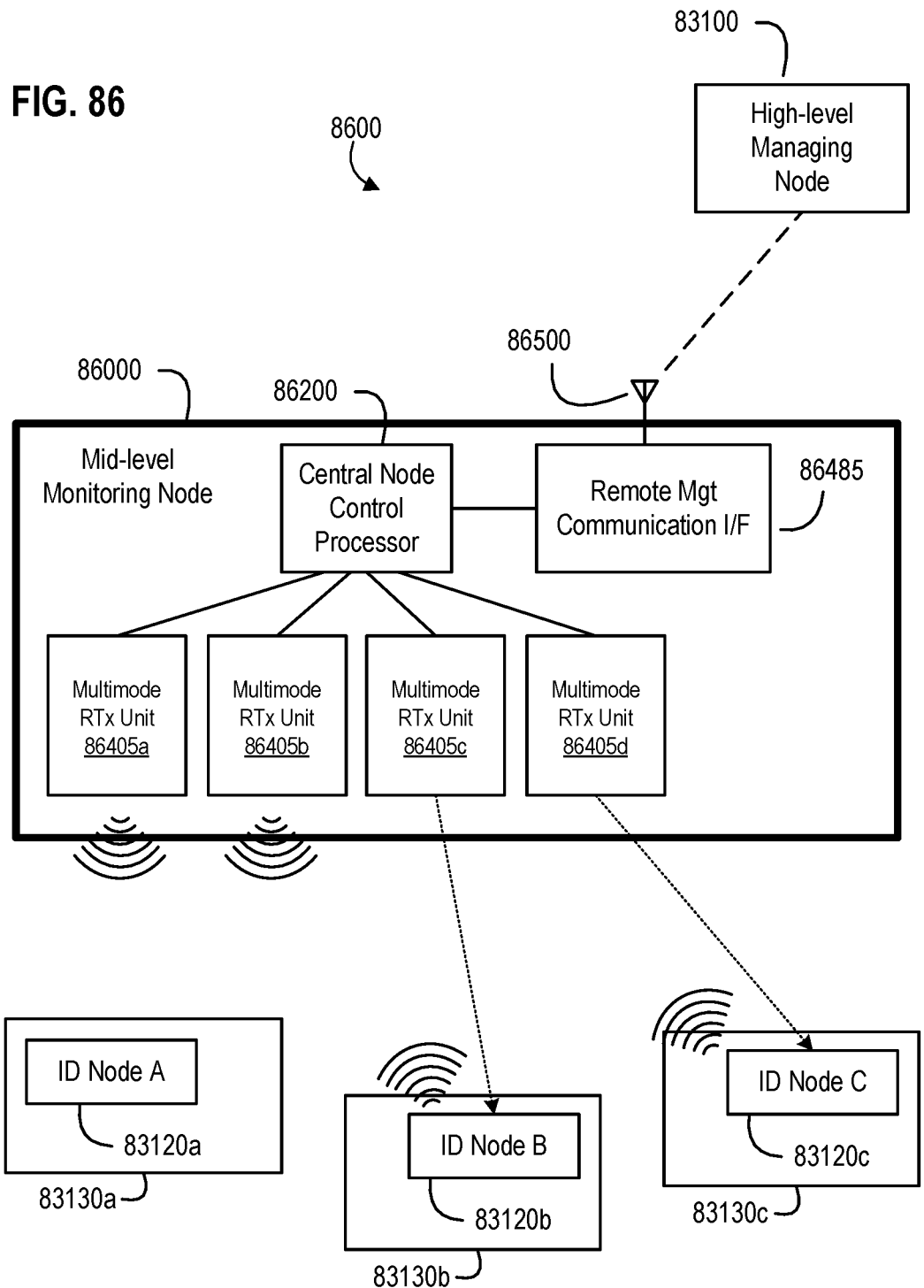
FIG. 86 is a diagram illustrating another alternative embodiment of an exemplary dedicated multi-radio system and apparatus for logistics node monitoring disposed in a wireless node network in accordance with an embodiment of the invention.

FIG. 86 is a diagram providing further details of such an alternative embodiment of an exemplary dedicated multi-mode radio based apparatus and system for logistics node monitoring disposed in a wireless node network in accordance with an embodiment of the invention. Referring now to FIG. 86, exemplary system 8600 is shown having high-level managing node 83100 (e.g., implemented as a server or master node) that communicates with an exemplary mid-level monitoring node 86000, which is specially composed and configured to communicate with multiple low-level ID nodes 83120*a*-83120*c* associated with respective packages 83130*a*-83130*c* being shipped. Similar to nodes 83000 and 85000, exemplary mid-level monitoring node 86000 includes a central node control processor 86200 that may communicate with high-level managing node 83100 through remote management communication interface 86485 (similar to interfaces 83485 and 85485) and antenna 86500.

Exemplary mid-level monitoring node 86000 further includes multiple multi-mode radio transceiver units 86405*a*-86405*d* (labeled as "Multimode RTx Unit" devices on FIG. 86). Each of the multi-mode radio transceiver units 86405*a*-86405*d* are operatively coupled to the central node control processor 86200, which controls the particular mode in which the respective multi-mode radio transceiver unit will operate. In a system embodiment, the high-level managing node 83100 may provide control input information to the processor 86200 of mid-level monitoring node 86000 in order to assign or program the particular mode state desired for each of the multi-mode radio transceivers 86405*a*-86405*d*. In response, central node control processor 86200 may generate and transmit appropriate mode comments to each of the multi-mode radio transceivers 86405*a*-86405*d*. As such, each of the multi-mode radio transceivers 86405*a*-86405*d* may be selectively configured vis such programmatic commands to operate as a dedicated command radio transceiver or a dedicated node monitoring radio receiver.

For example, as shown in FIG. 86, exemplary multi-mode radio transceiver units 86405*c* and 86405*d* have received specific mode commands from central node control processor 86200 to temporarily place each of these respective units into a dedicated command mode state. As such, multi-mode radio transceiver unit 86405*c* enters a mode state where it is dedicated to providing a command interface where one or more ID node instructions are transmitted to ID node B 83120*b* while multi-mode radio transceiver unit 86405*d* enters a mode where it is dedicated to providing a different or parallel command interface where one or more ID node instructions are transmitted to ID node C 83120*c* while unit 86405*c* transmits ID node instructions to ID node B 83120*b*. In this manner, two of the multi-mode radio transceiver units within exemplary mid-level monitoring node 86000 may be programmatically configured as needed for the monitoring environment faced by node 86000 when deployed in a shipment application when multiple low-level ID nodes need to be configured in an overlapping manner (e.g., have different ID node instructions transmitted as at least overlapping communications) or re-configured via node 86000.

Further, in the example shown in FIG. 86, exemplary multi-mode radio transceiver units 86405*a* and 86405*b* have received specific mode commands from central node control processor 86200 to temporarily place each of these respective units into a dedicated node monitoring radio receiver mode state. As such, multi-mode radio transceiver unit 86405*a* listens for one or more signals from at least one of the low-level ID nodes 83120*a*-83120*c* over a first designated channel (e.g., a first frequency range) while multi-mode radio transceiver unit 86405*b* listens for one or more signals from at least one of the low-level ID nodes 83120*a*-83120*c* over a second designated channel (e.g., a second frequency range). In this manner, the other two of the multi-mode radio transceiver units within exemplary mid-level monitoring node 86000 may be programmatically configured as needed for the monitoring environment faced by node 86000 when deployed in a shipment application when multiple low-level ID nodes need to be separately and simultaneously monitored via node 86000 over different frequency ranges so as not to miss receiving ID node broadcast events.

Thus, as shown in FIG. 86, a system embodiment may generally comprise the high-level managing node 83100 and elements of the exemplary mid-level monitoring node 86000 (such as the multi-mode radio transceiver units) as described above as interactive components that can be configured to provide selective dedicated command interfaces and dedicated node monitoring receivers when managing and monitoring multiple ID node enabled packages being shipped. A further system embodiment may focus on such a mid-level monitoring node 86000 (and its multi-mode radio transceiver units) and include two or more of the low-level ID nodes 83120a-83120c associated with respective packages 83130a-83130c being shipped. Still another system embodiment may focus on the larger system 8600, which may generally comprise the high-level managing node 83100, elements of the exemplary mid-level monitoring node 86000 (such as the multi-mode radio transceiver units) as described above as interactive components that can be configured to provide selective dedicated command interfaces and dedicated node monitoring receivers, and two or more ID node enabled packages being shipped.

Improved Communications in Congested Node Landscapes

As previously described, an exemplary ID node may be considered a low-level wireless sensor-based processing node device that may be included, attached, paired or otherwise logically associated with an item being shipped and as an electronic sensor-based device that monitors the item and its condition before, during, and/or after shipment as well as interacting with other wireless nodes that are collectively part of a logistics network of nodes. Also, as previously described, such ID nodes may be controlled and monitored by different interacting elements of the logistics network of hierarchically related devices, such as other ID nodes, master nodes, container nodes, and servers.

As such logistics networks of hierarchically related devices grow larger in number of nodes and denser in terms of operating nodes in a given area, the different devices may encounter communication problems due to node congestion. Stated another way, when the density of active logistics-related nodes of a logistics network in a given area becomes too large, the electronic landscape may become so active that some devices in the logistics network cannot properly communicate with other devices in the logistics network. As a result, controlling and monitoring package-related ID nodes can become increasingly difficult based upon the operating node density. Thus, the operating node density can negatively impact communication between interacting elements of the logistics network (such as a package ID node reporting sensor information relevant to its associated package to a master node or when a package ID node requests association permission to become associated with another master node given movement and a new location of the package ID node).

For example, a shipping and logistics company may operate a package shipment processing facility that temporarily stores a large number of node-enabled packages as part of shipping such packages. Additionally, such a facility may have different delivery vehicles unloading more node-enabled packages for temporary storage within the facility, while other delivery vehicles are being loaded with some of the temporarily stored node-enabled packages. Thus, the shipment processing facility may have an extremely high operating node density at certain times and relative to certain locations within the facility (which can create node communication problems), while the facility may have lower operating node densities at other times and at other locations. To address such problems faced when operating node density exceeds a tolerable threshold, an embodiment of logistics-related node elements can be actively managed by a server or at least one master node in a logistics wireless node network in an advantageously unconventional manner that successfully accommodates higher operating node densities while allowing for successful controlling and monitoring of the different node elements at the same time.

In general, such an embodiment may deploy a managing element (e.g., a server or master node) that may be programmed to use a type of communication "pruning" technique where a neighboring node near a targeted node for communication is instructed to stop broadcasting for a specific time interval so that the target node may communicate with less potential interference during that time interval. This helps to take pressure off communications with the target node during that time interval and, also, provides time for the node landscape surrounding the target node to change so that an updated operating node density may improve to where such communication pruning is no longer needed.

This type of pruning may take place for one or more different nodes near the target node (e.g., incrementally changing a broadcast profile for each of the different nodes so that the same node is not "pruned" to stop broadcasting for too long). Such pruning may also take place with clusters of nodes that are treated the same way (e.g., changing a broadcast profile for all nodes in a particular cluster or group of nodes or incrementally doing so for different clusters of the nodes near the target node). As described in more detail below relative to FIGS. 87A-99, different embodiments may leverage such unconventional pruning and clustering techniques as performed by different types of managing elements disposed within a logistics node network.

Figure 87A:
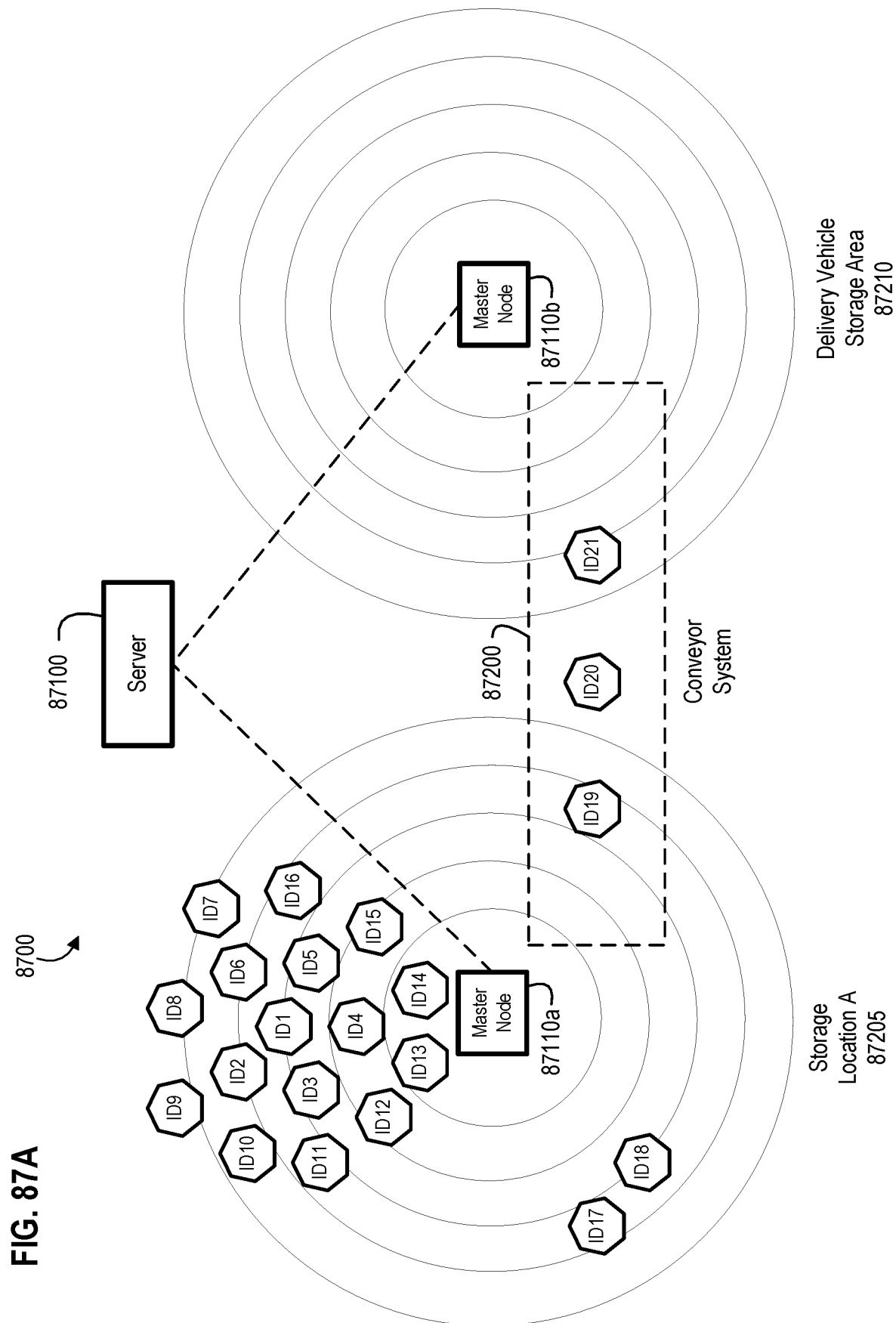
FIGS. 87A-87D are related diagrams illustrating an exemplary system of logistics node elements that include an exemplary server that provides enhanced communication management for a congested node environment in accordance with an embodiment of the invention.

In more detail, FIGS. 87A-87D are related diagrams illustrating an exemplary system of logistics node elements that include an exemplary server as a type of managing element that provides enhanced communication management for a congested node environment in accordance with one or more embodiments of the invention. Referring now to FIG. 87A, an exemplary enhanced system 8700 for communication management is shown with server 87100, master nodes 87110a, 87110b, and ID nodes ID1-ID21. Server 87100 is shown deployed as an exemplary managing element of the wireless node networked system 8700 and may be implemented based on exemplary server 100 as explained in more detail above relative to FIG. 5 with further programmatic modifications as explained in more detail below relative to FIG. 90. As shown in FIG. 87A, server 87100 communicates with master nodes 87110a and 87110b via a direct communication path (e.g., Wi-Fi, cellular, or the like) while server 87100 may communicate indirectly with ID nodes ID1-ID21 via an indirect communication path through at least one of the master nodes 87110a, 87110b and that further uses a short range communication path (e.g., BLE formatted communications) between that respective master node and one or more of the ID nodes. Thus, the indirect communication path uses at least one of the master nodes (and may use one or more ID nodes) as an intermediary type of node between a specific ID node and server 87100.

As part of exemplary communication management system 8700, the master nodes 87110a and 87110b and ID nodes ID1-ID21 are respectively located at different locations. For example, master node 87110a is shown as being generally located relative to a storage location A 87205 where it may monitor and communicate with other nodes in that vicinity (represented by the concentric circles centered upon the location of master node 87110a). Storage location A 87205 may, for instance, be implemented as a temporary storage room within a shipment processing facility, a storage area within a tractor trailer, or a cargo area of an aircraft used to transport shipments. In the example shown in FIG. 87A, master node 87110b is generally located relative to a delivery vehicle storage area 87210 of such a shipment processing facility and is may also monitor and communicate with other nodes in that vicinity (represented by the concentric circles centered upon the location of master node 87110b). The delivery vehicle storage area 87210 in this example may be configured to receive packages or items for delivery via one or more delivery vehicles (as shown expressly in FIGS. 89A-89B). Furthermore, delivery vehicle storage area 87210 may be linked with storage location A 87205 by an exemplary conveyor system 87200, which essentially operates to help move the packages or items from the storage location A 87205 into the delivery vehicle storage area 87210. Those skilled in the art will appreciate that ID node enabled packages and items may be moved manually or via other types of transport mechanisms between locations have different master nodes in other embodiments where node congestion issues may arise.

As shown in FIG. 87A, each of ID nodes ID1-ID21 are generally paired with one or more of such packages or items being shipped. Those skilled in the art will appreciate that while exemplary ID nodes ID1-ID21 are shown in FIG. 87A, their respective related or paired package or item is not explicitly shown for purpose of clarity and to avoid excessively crowding the illustration in FIG. 87A. Thus, the symbol for each of ID nodes ID1-ID21 represents an exemplary ID node (such as ID node 120a explained above relative to FIG. 3) and may also represent such an ID node along with its included, attached, paired or otherwise logically associated respective package(s) or item(s) (e.g., an ID node included in the box of a packaged item being shipped along with other related packages).

In the initial configuration shown in FIG. 87A, exemplary ID nodes ID1-ID16 are disposed as a group near to and within communication range of master node 87110a at the storage location A 87205. For example, ID nodes ID1-ID16 may be contained within a single storage bin or container so that the nodes are in relative close proximity to each other. ID nodes ID17 and ID18 are also within communication range of master node 87110a and at storage location A 87205, but are located apart from the group of ID nodes ID1-ID16. For example, ID nodes ID17 and ID18 may have just arrived (with their respective items being shipped) at storage location A 87205 while the group of ID nodes ID1-ID16 (with their respective items being shipped) may be temporarily held in a particular holding area of the storage location A 87205 separate from where incoming packages may arrive. Further, ID nodes ID19-ID21 (with their respective items being shipped) are shown as being moved from storage location A 87205 to delivery vehicle storage area 87210 (and from within the communication range of master node 87110a to within the communication range of master node 87110b) via conveyor system 87200.

Figure 87B:
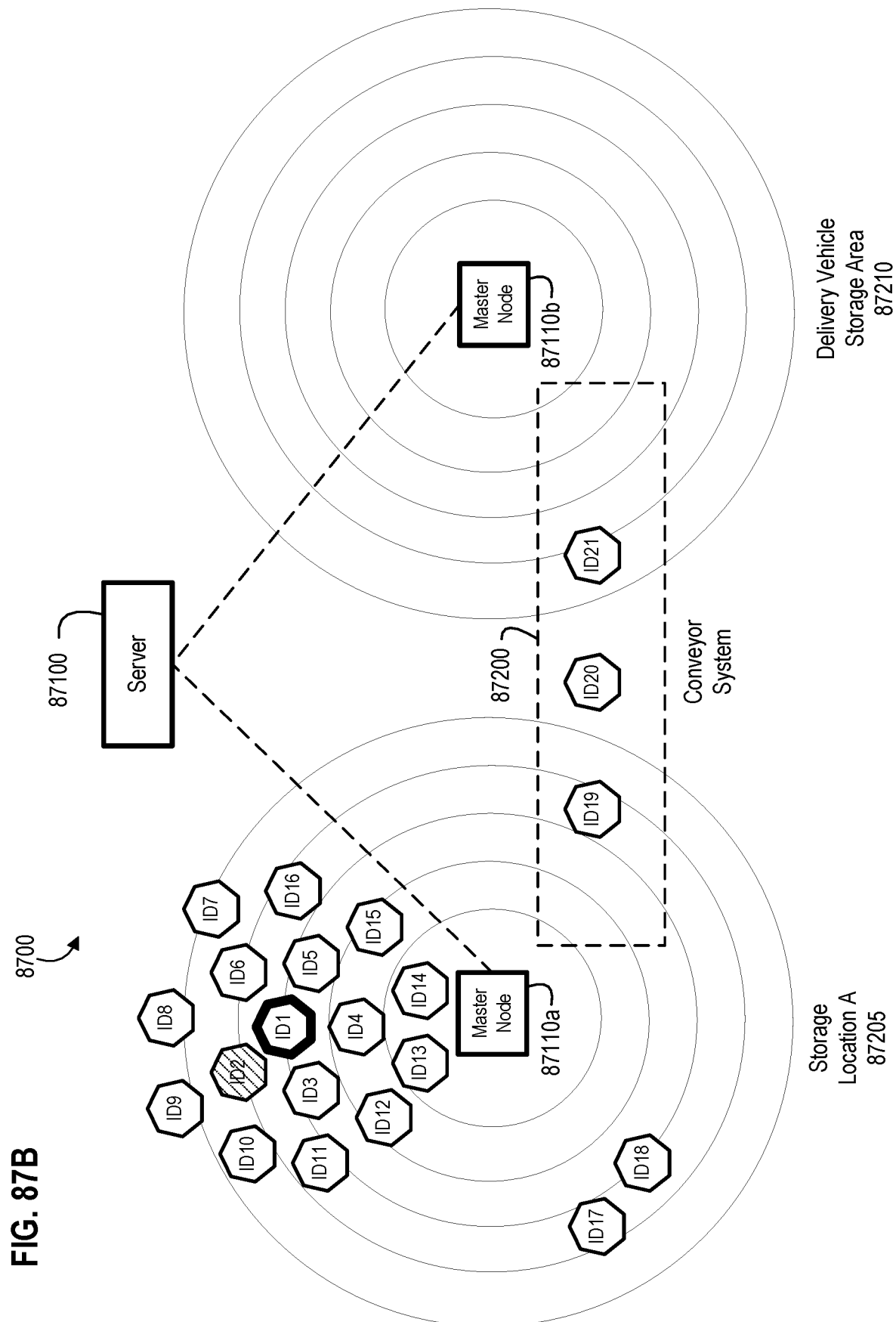

In FIG. 87B, exemplary server 87100 begins to programmatically implement enhanced communication management techniques that would allow for more robust communications between the nodes shown, especially in light of the congestion environment of ID nodes ID1-ID16. In particular, exemplary server 87100 executes communication management software program code and instructions (such as high density node communication management code 90000 shown in FIG. 90 that may be part of the server's control and management code as described above) to programmatically transform the server's functionality with a collection of operative steps that help improve how nodes can communicate in dense node environments. As such, server 87100 is operative to identify one of the wireless nodes (e.g., a master node or ID node) as a "target" node at an initial location so that enhanced management steps may be further taken by server 87100 to enhance and improve the ability of that target node to successfully communicate in the operating node environment surrounding the target node.

For example, as shown in FIG. 87B, server 87100 may identify ID node ID1 as the target node located within the communication range of master node 87110a and identify that ID node ID1 is surrounded by the group of ID nodes ID2-ID16 proximate to the initial location of ID node ID1. Next, server 87100 determines the operating node density of this group of ID nodes relative to ID node ID1 relative to a threshold node density value. For example, server 87100 may determine that within a certain distance range relative to ID node ID1 the operating node density is currently 15 operating nodes for those that fall within that range (i.e., the group of ID nodes ID2-ID16). If the operating node density threshold is set at 5 nodes, then server 87100 identifies that target node ID is currently in an overly congested node environment given the determined operating node density exceeds this threshold. As a result, the server 87100 is then operative to transmit a change in a broadcast profile to at least one neighboring node from the group of ID nodes ID2-ID16 proximate to the initial location of the target node ID1. For example, in the embodiment shown in FIG. 87B, exemplary server 87100 may cause ID node ID2 to change its broadcast profile so that ID node ID2 temporarily ceases broadcasting during a first time interval. Here, ID node ID2 may be selected for this type of "pruning" or temporary cease in broadcasting because ID node ID2 may be determined by server 87100 as being located closest to the target ID node ID relative to a least a majority of the remaining nodes in the group of ID nodes ID2-ID16. In another example, server 87100 may select ID node ID2 because it has been broadcasting at a higher signal power level than others in the group of ID nodes ID2-ID16.

In other embodiments, more than one neighboring node may be pruned. For example, in the embodiment shown in FIG. 87C, exemplary server 87100 may alternatively cause multiple nodes (such as ID nodes ID2-ID6) from the initial group of nodes proximate to target ID node ID (i.e., ID nodes ID2-ID16) to temporarily cease broadcasting for the first time interval. Thus, each of ID nodes ID2-ID6 are shown in shaded form to represent that they have been selected for "pruning" by the server 87100 so that all of ID nodes ID2-ID6 temporarily cease broadcasting during the first time interval. This subgroup of ID nodes ID2-ID6 from the initially identified group of proximate nodes ID2-ID16 relative to the location of target ID node ID1 is an example of how the server 87100 may identify ID nodes ID2-ID6 as a subgroup cluster of nodes from the initially identified group of proximate nodes ID2-ID16 that collectively represent at least one neighboring node to the target node ID node ID1 in this particular embodiment.

In a further embodiment, exemplary server 87100 may cause one or more different nodes in the subgroup ID2-ID6 to incrementally cease broadcasting temporarily during one or more parts of the first time interval rather than have all nodes in the subgroup cluster of nodes temporarily cease broadcasting during that whole time interval. For example, server 87100 may cause ID node ID2 to temporarily cease broadcasting for a first part of the first time interval, and then switch to causing ID node ID3 to temporarily cease broadcasting for a second part of the first time interval. This may continue for each of the ID nodes ID4-6 so that different ones of ID nodes ID2-ID6 are instructed to temporarily cease broadcasting in a sequential order (which may be selected randomly within this subgroup cluster or based upon power levels being otherwise broadcast and/or frequencies used by those nodes in the subgroup cluster). Alternatively, server 87100 may break up the different nodes in the subgroup cluster of nodes ID2-ID6 into further subgroups (e.g., first causing both nodes ID2 and ID3 to temporarily cease broadcasting, then causing both ID nodes ID4 and ID5 to temporarily cease broadcasting, and the like). Still a further embodiment may have server 87100 causing two or more different nodes in the subgroup ID2-ID6 to cease broadcasting temporarily in at least an overlapping fashion during one or more parts of the first time interval rather than have all nodes in the subgroup cluster of nodes temporarily cease broadcasting.

Figure 87C:
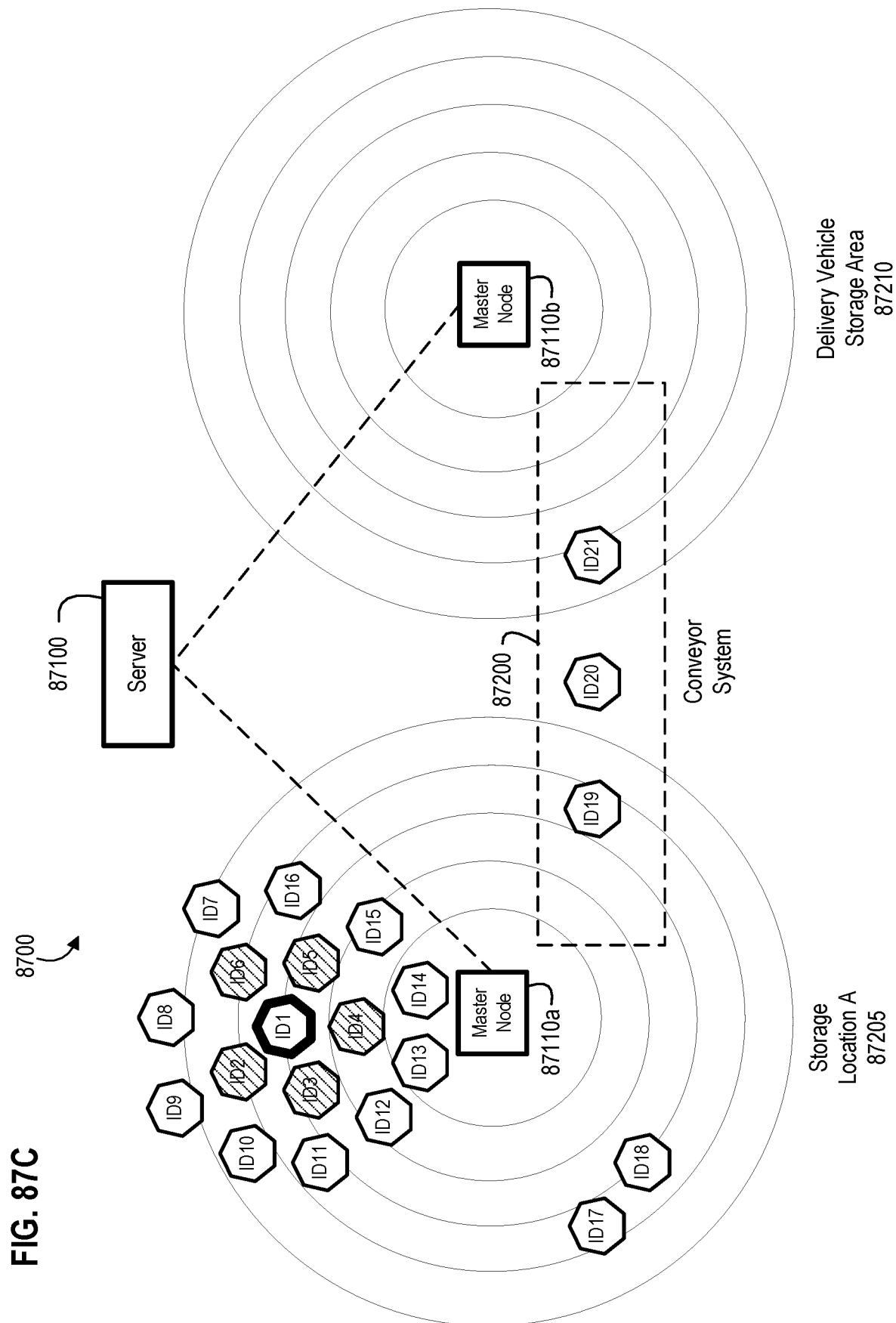
Figure 87D:
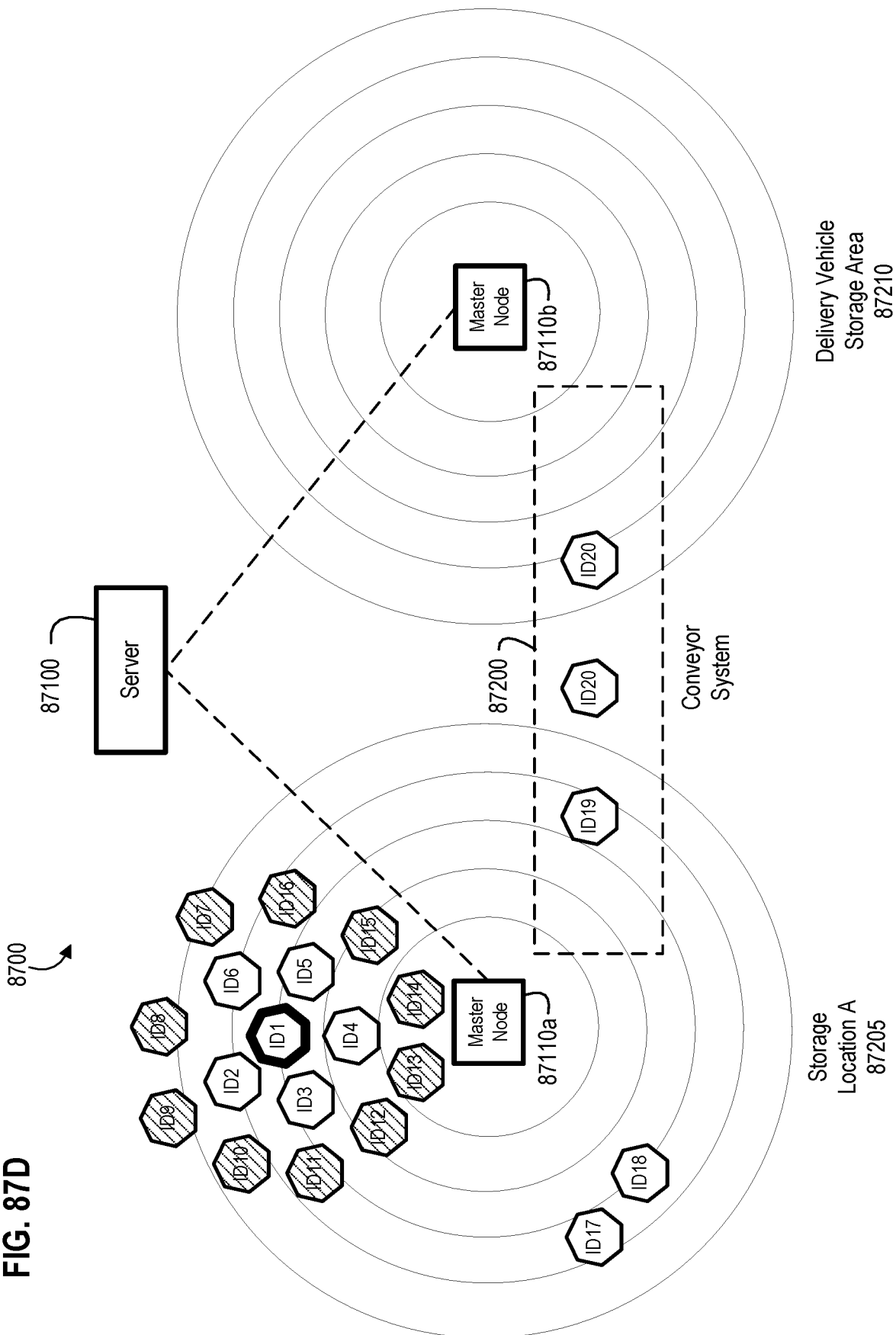

In the embodiment shown in FIG. 87D, server 87100 may have caused another subgroup cluster of nodes (i.e., ID nodes ID7-ID16) from the initial group of nodes (i.e., ID nodes ID2-ID16) proximate to target ID node ID1 to temporarily cease broadcasting during the first time interval. Here, this second subgroup cluster of ID nodes ID7-ID16 includes a larger number of nodes and may be selected by the server 87100 given the server 87100 has determined the location of such ID nodes ID7-ID16 are a greater distance from target ID node ID1 than the first subgroup cluster of nodes. This second subgroup cluster of ID nodes ID7-ID16 may have also been selected by the server 87100 based upon their respective presently broadcasting power levels and/or frequencies.

In more detail, an embodiment may have the server 87100 identify different subgroup clusters of nodes from this type of initial group of other node proximate to the target node based upon a clustering parameter (such as power levels and/or frequencies used). Such a clustering parameter, for example, may also include shipping information stored on the server and related to each other nodes in the initial group. In this manner, one subgroup cluster of nodes (e.g., ID nodes ID7-ID16) may be clustered or grouped for purposes of pruning given they collectively are to be delivered to one or more locations near the delivery vehicle storage area 87210 while another subgroup cluster of nodes (e.g., ID nodes ID2-ID16) may be associated or paired with packages that are indicated, via relevant shipping information stored on server 87100, to be staying in storage location A 87205 while the first subgroup cluster of nodes will be moving on.

In another example, the clustering parameter used by server 87100 may include context data stored on the server. As explained above in more detail, context data (such as context data 560) relates to an anticipated environment for a node, such as data related to structures (e.g., layout information, data on buildings, machinery, containers with shielding properties, etc.) near the node that may affect communication to and from the node. Thus, such context data that may be used by server 87100 as a type of clustering parameter may include information for each node in the initial group of nodes proximate the target node during predicted movement of each node in the group.

In still another example, the clustering parameter used by server 87100 may include association data stored on the server. Consistent with what is described above relative to exemplary association data 540, such association data that may be used by server 87100 as a type of clustering parameter identifying server-permitted relationships between different ones of the nodes in the initial group of nodes proximate the target node. For example, ID nodes ID2-ID6 may be associated with target ID node ID1, which may receive sensor data from each of ID nodes ID2-ID6. By identifying the subgroup cluster of nodes ID2-ID6 based on their respective associations to target ID node ID1, the server 87100 may allow ID nodes ID2-1D6 to continue detecting using onboard sensors but to temporarily cease communications, while allowing the target ID node ID1 that has already gathered the sensor data from those other ID nodes ID2-ID6 to better communicate back to master node 87110*a* without the interference from nodes ID2-ID6. This type of dynamic and selective use of different kinds of clustering parameters provides the server 87100 with a robust set of tools with which to deploy in an embodiment when managing a highly congested node landscape.

When the first time interval elapses, the nodes (e.g., master nodes, ID nodes, or both) that were temporarily caused by server 87100 to cease broadcasting may revert back to a normal broadcasting mode per their individual and respective broadcast profiles. At this point, an embodiment of the server 87100 may recheck or update the operating node density relative to the previously identified target node to determine if further enhanced communication controls are desired relative to that target node with further or different pruning and/or clustering for pruning.

For example, many of the nodes may not have moved after the first time interval elapsed. As such, if server 87100 updates the operating node density relative to target ID node ID1 and that density still exceeds the threshold, server 87100 may cause the second subgroup cluster of ID nodes IDT-16 (as shown in FIG. 87D) to temporarily cease broadcasting in a second time interval rather than cause the same subgroup cluster of ID nodes ID2-ID6 (as shown in FIG. 87C) to again cease broadcasting during the first time interval.

Figure 88A:
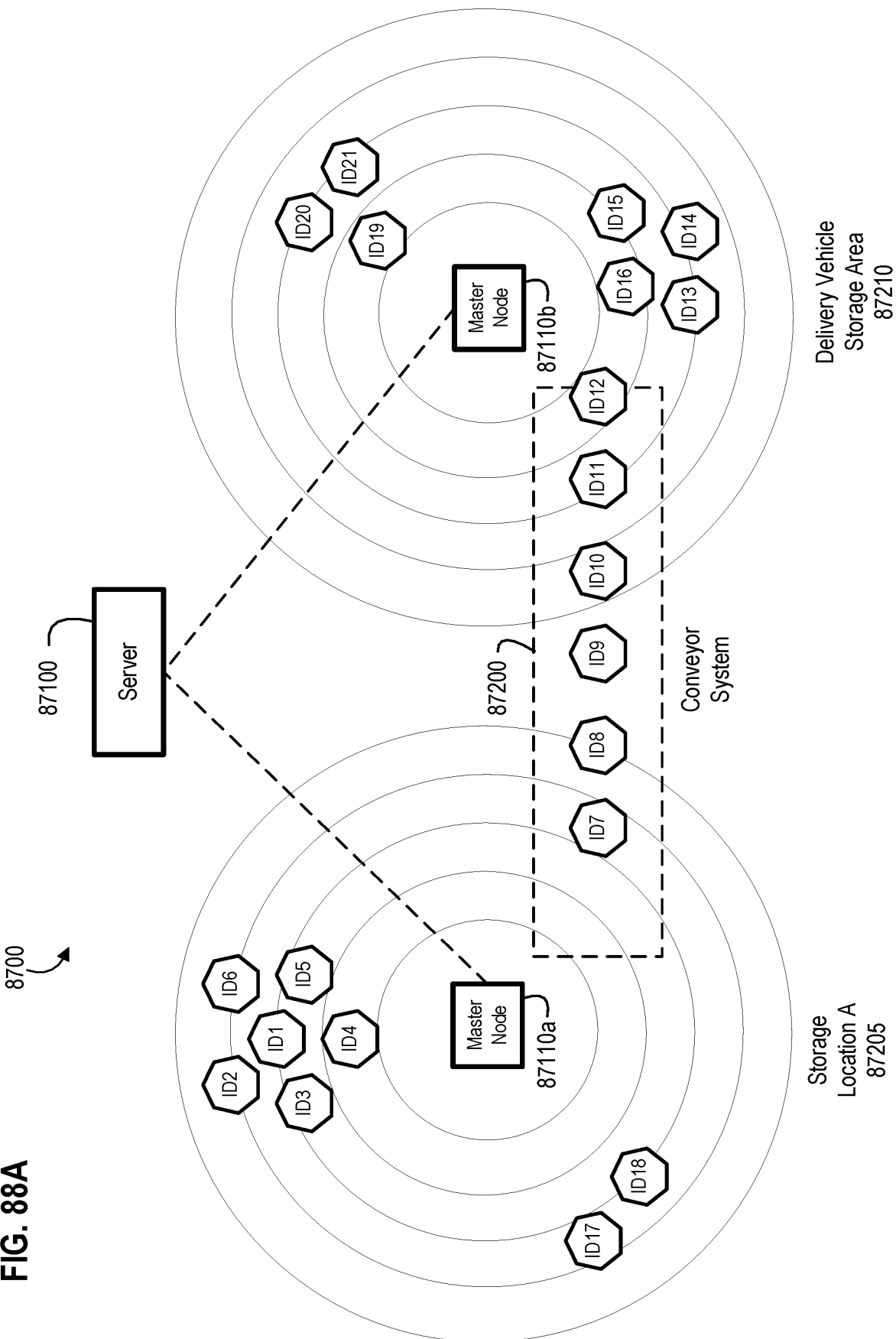
FIGS. 88A-88B are related diagrams illustrating the exemplary system shown in FIG. 87A after a time interval has expired and some of the logistics node elements have moved to where the exemplary server provides enhanced communication management for an updated node environment in accordance with an embodiment of the invention.

However, in another example, some of the nodes may have moved during the first time interval. For instance, some of the nodes may have been moved with their respective packages from the storage location A 87205 to the delivery vehicle storage area 87210 during the first time interval. As such and as shown in FIG. 88A, ID nodes ID7-ID16 and ID19-ID21 may be in different locations after the first time interval expires when compared to their respective positions as shown in FIG. 87A. In this new node landscape configuration, target ID node ID1 is operating with a different proximate operating node density environment and server 87100 may revisit how it may be managing communications with target ID node ID1 using an updated operating node density near the location of the target node and re-clustering for additional pruning techniques that may cause different neighboring nodes to temporarily cease broadcasting during a time interval after the first time interval expired.

Figure 88B:
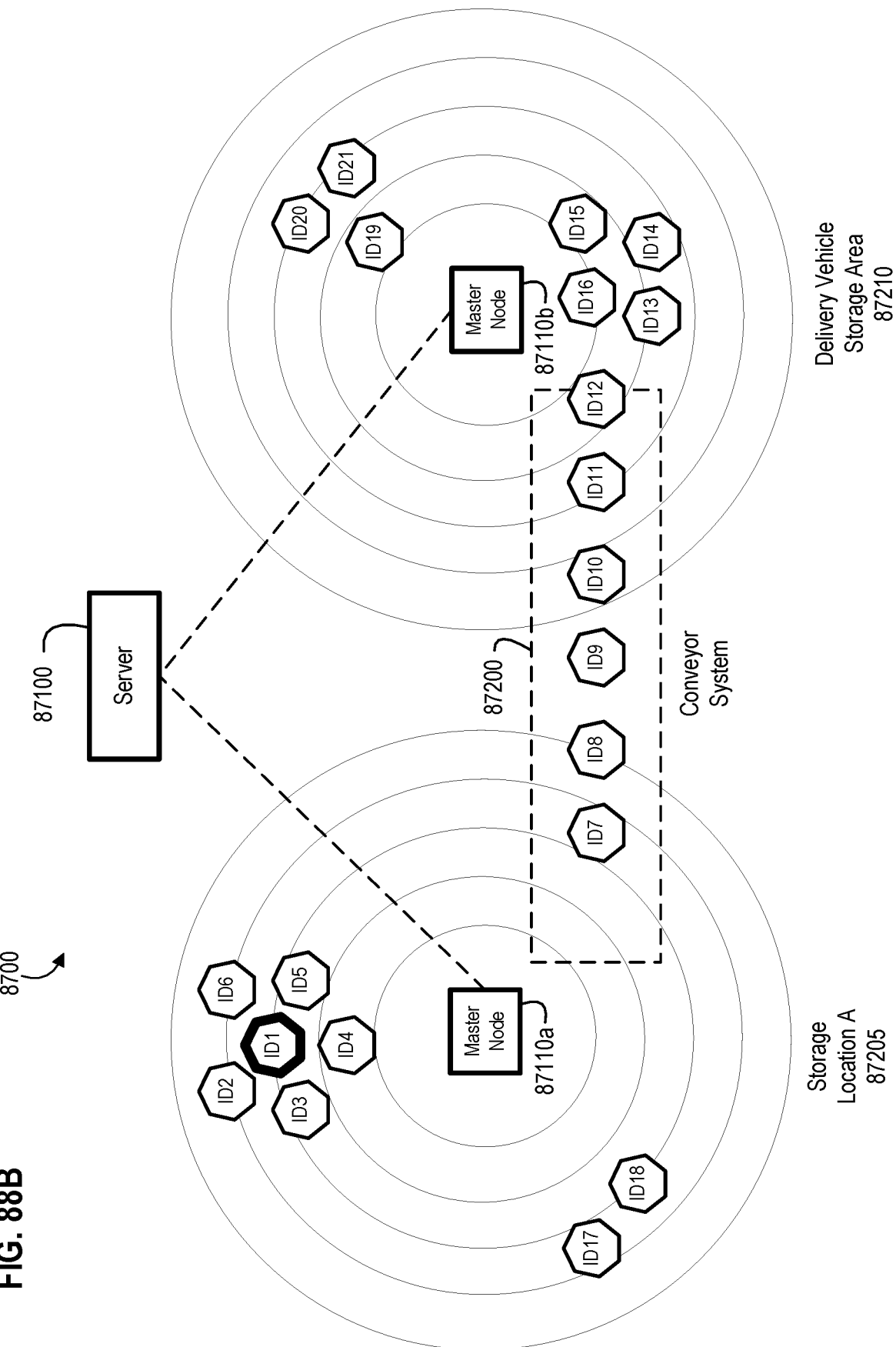

In more detail, server 87100 may be further operative to determine, after the first time interval expires, an updated operating node density of an updated group of other nodes proximate to the current location of the target node ID1. For example, as shown in FIG. 88B, server 87100 may determine that an updated operating node density relative to target node ID1 is 5, which corresponds to the group of ID nodes ID2-ID6 proximate to the location of target node ID1. In the example shown in FIG. 88B, the updated operating node density is 5, which does not exceed the value of the operating node density threshold in this example. Thus, server 87100 need not prune any of the neighboring nodes near target ID node ID1. However, if server 87100 did find the updated operating node density exceeds the threshold once the first time interval expires, server 87100 may transmit a further change in the broadcast profile to at least one of ID nodes ID2-ID6. Such a further change in the broadcast profile would cause that ID node from the updated group of ID nodes ID2-ID6 to temporarily cease broadcasting during a second subsequent time interval. Thus, server 87100 is able to actively manage communications with target ID node ID1 in such a dynamically changing node landscape.

While target node ID1, as shown in FIG. 88B, appears stationary relative to its initial position shown in FIG. 87A, those skilled in the art will appreciate that the target node may be mobile and have a different updated location at the end of the first time interval compared to where it was located at the beginning of the first time interval. Such movement may have the target node located proximate an entirely different set of nodes compared to where it was at the beginning of the first time interval. In other words, the updated group of other nodes near the target node may be different in composition compared to the initial group of other nodes near the target node due to the target node's own movement during the first time interval.

Similar to that shown in FIG. 87D, server 87100 may use a subgroup cluster of nodes out of the updated group of node proximate to the updated location of the target node. As such, the server 87100 may be further operative to identify updated subgroup clusters of nodes from the updated group of other nodes proximate to the updated location of the target node, and then transmit the further change in the broadcast profile to each node in a first of the updated subgroup clusters of nodes if the updated operating node density exceeds the threshold after the first time interval expires. Such a further change in the broadcast profile causes each node in that first updated subgroup cluster of nodes to temporarily cease broadcasting during the second time interval. Thus, a similar subgroup clustering technique may be deployed after the first time interval expires and there remains a need to prune via updated subgroup clusters of neighboring nodes.

Further changes in broadcast profiles may also be made by the server 87100 after the second time interval expires. For example, server 87100 may transmit a further change in the broadcast profile to each node in a second of the updated subgroup clusters of nodes near the target node after the second time interval expires when the updated operating node density still exceeds the threshold. This further change in the broadcast profile transmitted to each node in the second of the updated subgroup clusters of nodes causes a temporary cease of broadcasting for each node in the second of the updated subgroup clusters of nodes during a third time interval.

Figure 89A:
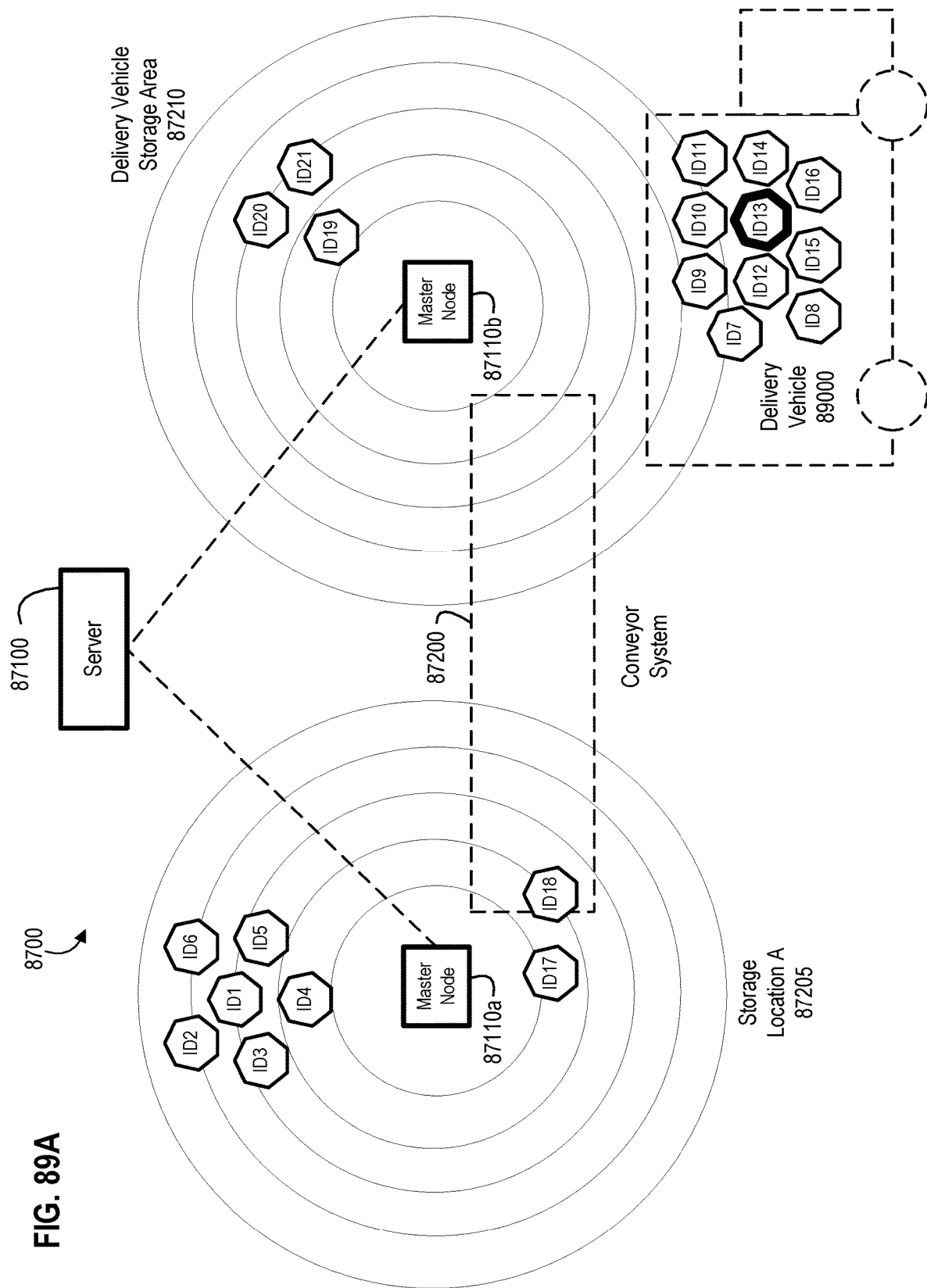
FIGS. 89A-89B are related diagrams illustrating the exemplary system shown in FIG. 87A after a further time interval has expired and some of the logistics node elements have moved within a congested node environment on an exemplary delivery vehicle in accordance with an embodiment of the invention.

In FIG. 89A, the nodes ID1-ID21 within the illustrated logistics node network are shown in a later configuration. Here, various nodes and their associated items/packages have moved from the delivery vehicle storage area 87210 and then into an exemplary delivery vehicle 89000. In particular, ID nodes ID7-ID16 are shown as having been moved into delivery vehicle 89000, but communications to and from some of those ID nodes may be hampered due to the potential for a congested operating node environment within the delivery vehicle 89000. As such, server 87100 may take steps to manage communications related to the ID nodes within the delivery vehicle 89000.

For example, in the embodiment shown in FIG. 89A, server 87100 may identify ID node ID13 as another target node located within the communication range of master node 87110b (or within the communication range of a vehicle master node (not shown) within delivery vehicle 89000). Similar to the example explained above relative to target ID node ID1 in FIGS. 87A-D, server 87100 may identify that new target node ID node ID13 is surrounded by the group of ID nodes ID7-ID12, ID14-ID16 proximate to the location of ID node ID13 within the delivery vehicle 89000.

Figure 89B:
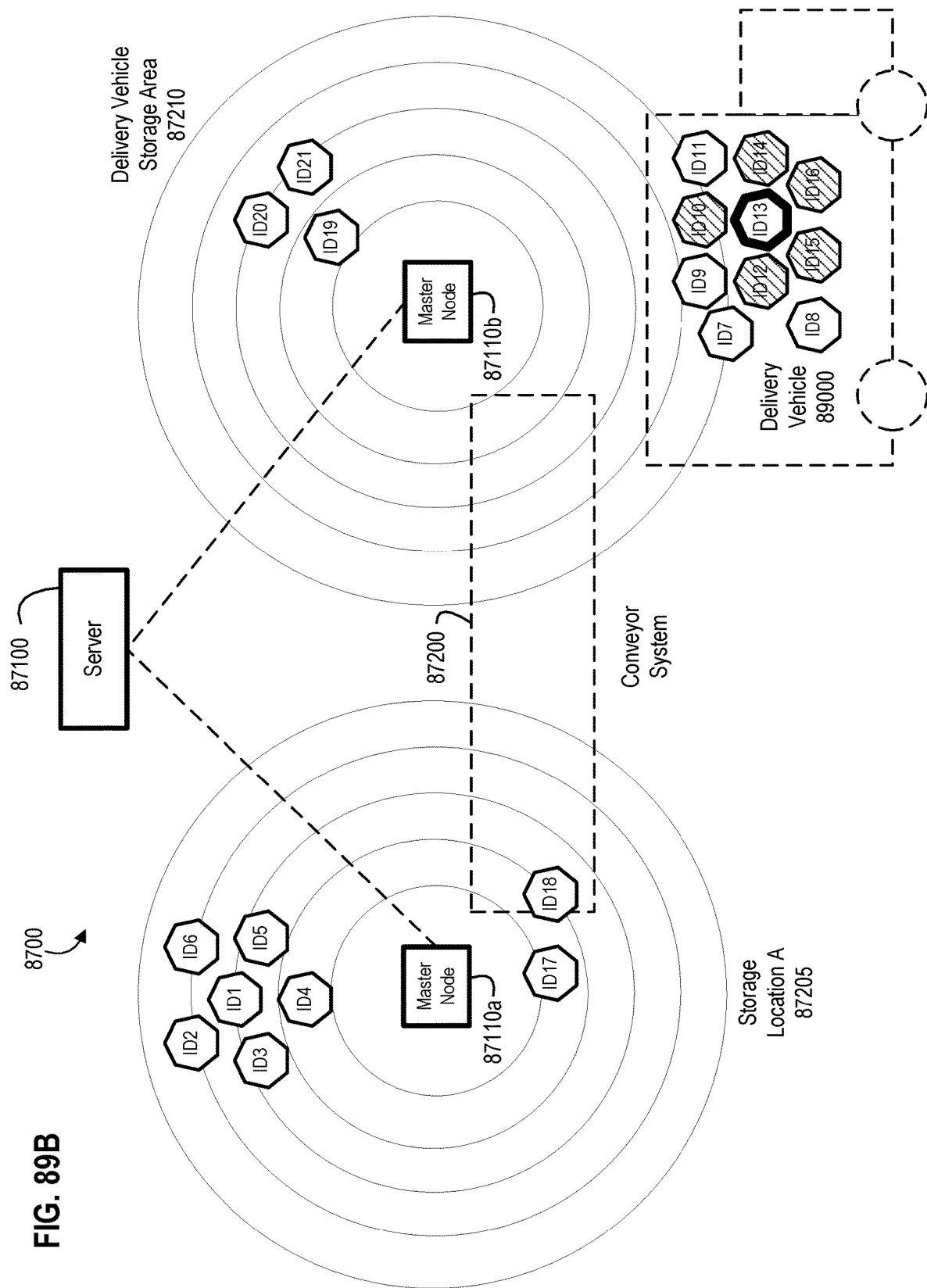

Next, server 87100 determines the operating node density of this group of ID nodes relative to ID node ID13 as compared to a threshold node density value (such as 5). In the example of FIG. 89A, server 87100 may determine that within a certain distance range relative to target ID node ID13 the operating node density is currently 9 operating nodes for those that fall within that range (i.e., the group of ID nodes ID7-ID12 and ID14-ID16 disposed and located within the delivery vehicle 89000). Accordingly, server 87100 identifies that target node ID13 is currently in an overly congested node environment given the determined operating node density exceeds the threshold of 5. As a result, the server 87100 is then operative to transmit a change in a broadcast profile to at least one neighboring node from the group of ID nodes ID7-ID12 and ID14-ID16 proximate to the location of the target node ID13 within delivery vehicle 89000. For example, as shown in FIG. 89B, exemplary server 87100 may cause a selected subgroup cluster of ID nodes ID10, ID12, and ID14-ID16 to change their respective broadcast profiles so that each of these ID nodes temporarily ceases broadcasting during another time interval.

Those skilled in the art will appreciate that the selection of one or more of neighboring nodes of target ID node ID13 within delivery vehicle 89000 to be those that are caused to temporarily cease broadcasting may be implemented similar to and consistent with the example explained above relative to target ID node ID1. Thus, such neighboring nodes that are pruned to temporarily cease broadcasting for a time interval may include a single node during the time interval, multiple nodes as a subgroup cluster during the time interval, multiple nodes that incrementally change their respective broadcasting profile during the time interval, or all nodes within a specific range of the target node during the time interval.

Those skilled in the art will also appreciate that while contemplated deployment of such unconventional communication management techniques in a logistics environment may involve much larger numbers of logistics related nodes at different levels of the logistics network (including both low level ID nodes and higher level master node) and higher operating node density situations, the example embodiments shown in FIGS. 87A-89B are simplified for ease of discussion and clarity.

Figure 90:
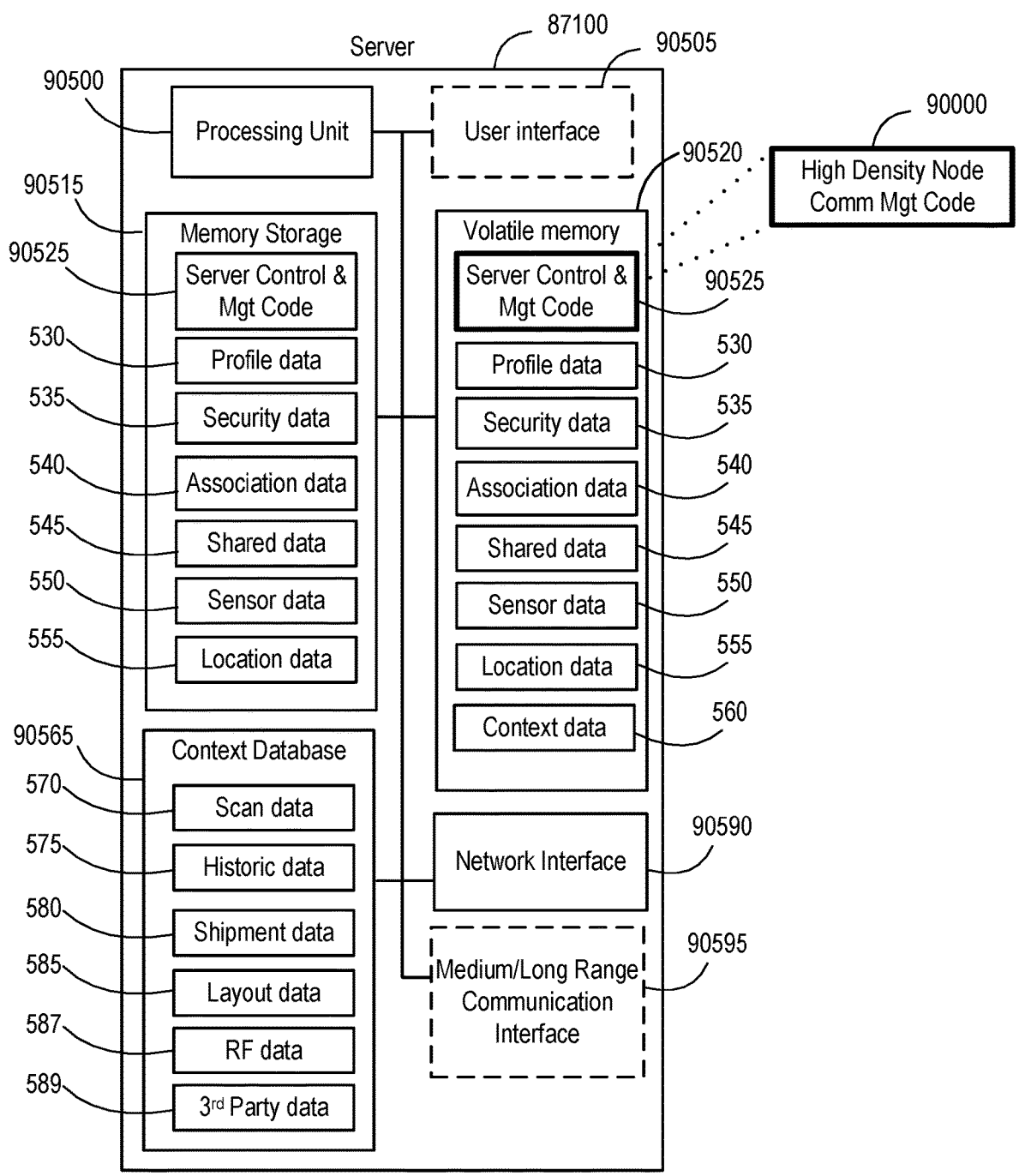
FIG. 90 is a diagram illustrating further details of the exemplary server used in the system shown in FIGS. 87A-89B to provide enhanced communication management for a congested node environment in accordance with an embodiment of the invention.

In the embodiments shown in FIGS. 87A-89B, exemplary server 87100 is a managing type of component of a logistics network that implements enhanced communication management for congested node environments. FIG. 90 is a diagram illustrating further details of exemplary server 87100 in accordance with an embodiment of the invention that uses high density node communication management code 90000 as part of server control and management code 90525 to implement such enhanced communication management functionality in an unconventional manner. Referring now to FIG. 90, exemplary server 87100 is shown similar to server 100 (which was earlier described relative to FIG. 5). More specifically, those skilled in the art will appreciate that one embodiment of exemplary server 87100 includes many of the same hardware, code, and data components as shown for exemplary server 100 of FIG. 5. As such, similar functionality exists for what is numbered the same or similarly and described above regarding exemplary server 100. Thus, while server 100 shown in FIG. 5 is described as having processing unit 500, user interface 505, memory storage 515, volatile memory 520, context database 565, network interface 590, and medium/long range communication interface 595, those skilled in the art will appreciate that exemplary server 87100 may use similar hardware components as shown in FIG. 5. This includes at least processing unit 90500, user interface 90505, memory storage 90515, volatile memory 90520, context database 90565, network interface 90590, and medium/long range communication interface 90595.

Further, the embodiment of exemplary server 87100 illustrated in detailed FIG. 90 deploys high density node communication management code 90000, which is stored in memory storage 90515 as part of server control and management code 90525. High density node communication management code 90000 may be loaded into volatile memory 90505 for execution by processing unit 90500. The server control and management code 525, as previously described, generally controls the behavior of the server relating to communications (with a node advertise and query logic manager), information management (with an information control and exchange manager), power management (with a node power manager that interacts with the various communication interfaces, for example, to manage power consumption and broadcast power aspects at a low level), and association management (with an association manager). As such, server control and management code 90525 essentially operates similar to that as described above for server node control and management code 525 but further includes high density node communication management code 90000 for functions used to provide enhanced communication management of wireless nodes operating in a congested logistics node network environment as described in FIGS. 87A-89B above and as described in more detail below with respect to the methods described relative to FIGS. 91 and 92. Thus, an embodiment of high density node communication management code 90000 may be implemented as an integrated part of server control and management code 90525, such as one or more programmatic functions or additional program modules that may be called within code 90525. However, in other embodiments, the high density node communication management code 90000 used to implement the method as described with respect to FIGS. 87A-89B, 91, and 92 may be implemented separately from code 90525 in a way that allows code 90000 to call some of the programmatic functions or program modules described as part of code 525 (or 90525) to implement the steps as laid out in the methods illustrated by FIGS. 91-92 and variations of those methods as described herein.

In general, exemplary high density node communication management code 90000 programmatically adapts and transforms the operation of server 87100 such that server 87100 unconventionally functions to generally identify a target node; determine an operating node density relative to that target node based upon locations known or determined by the server of the target node and other neighboring nodes; and cause one or more of the neighboring nodes to temporarily cease broadcasting for a particular time interval via transmitted changes to those nodes' broadcast profiles. In some embodiments, the transmitted change may be implemented with a command to simply temporarily cease broadcasting for the time interval. This may have the receiving node altering the current parameters of its broadcasting profile. However, in other embodiments, the transmitted change may take the form of a server instruction for the particular neighboring node to use a different broadcast profile for a set period of time. In some instances, such an instruction may also have the particular neighboring node revert back to the original broadcast profile after the set period of time ends. Those skilled in the art will appreciate that the availability of multiple different broadcast profiles to use allows for a proactive selection of a desired communication profile to fit with a particular type of node operating environment or instructions received from the server regarding changed communication related operations for the node.

Figure 91:
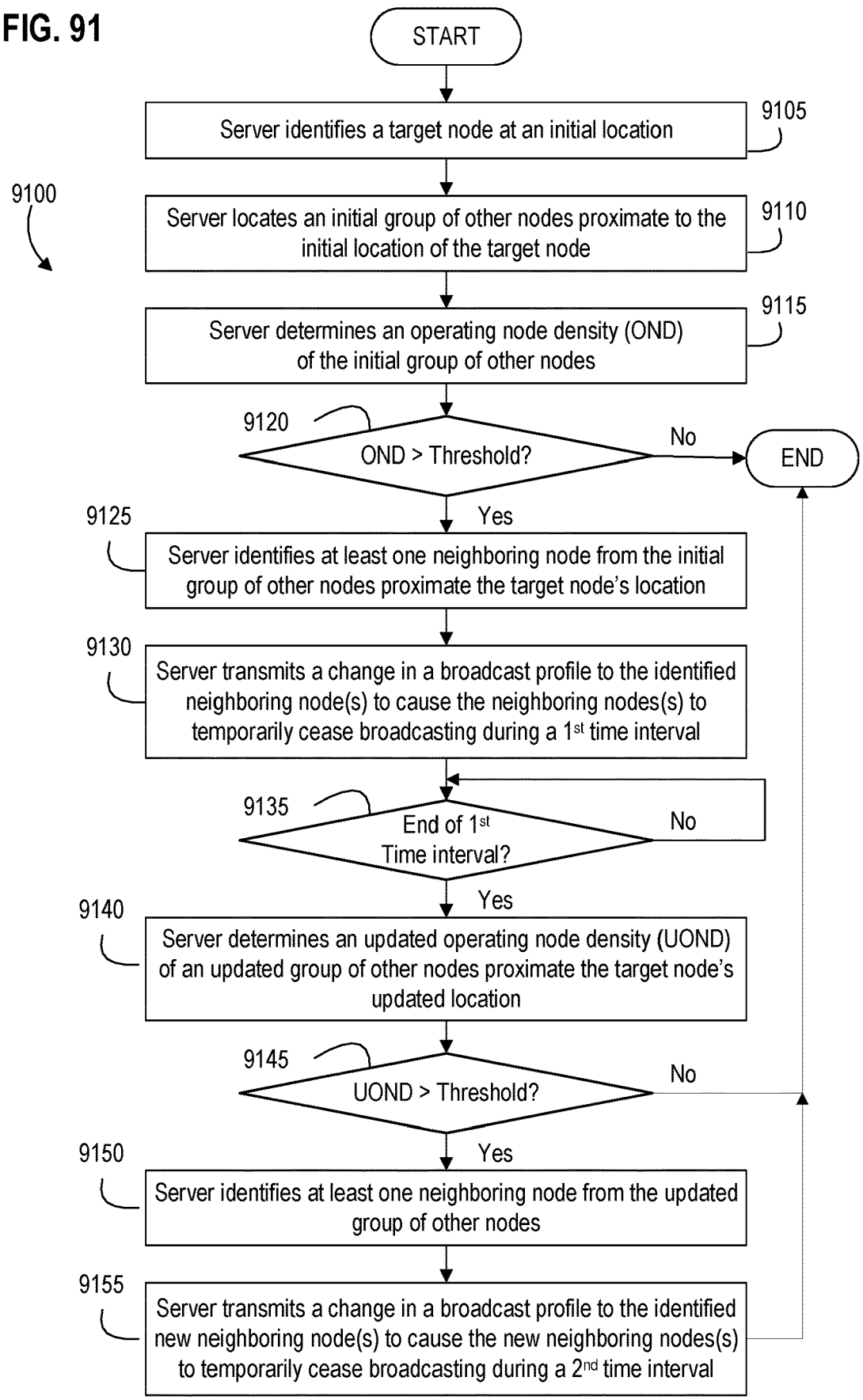
FIG. 91 is a flow diagram illustrating an exemplary enhanced method of communication management of a plurality of wireless nodes by a server operating in a wireless node network in accordance with an embodiment of the invention.

FIG. 91 is a flow diagram illustrating an exemplary enhanced method of communication management of a plurality of wireless nodes by a server operating in a wireless node network in accordance with an embodiment of the invention. Exemplary method 9100 generally focuses on server-implemented steps that collectively amount to unconventional server functionality that has the technical effect of enhancing communication management relative to a particular target node within the wireless node network. Stated another way, exemplary method 9100 generally focuses on a collection of steps performed by a server (such as server 87100) that addresses a congested logistics network issue with unconventional server functionality that improves the communication operations of the target node within the wireless node network.

Referring now to FIG. 91, exemplary method 9100 begins at step 9105 with the server identifying a target node from multiple nodes (master nodes or ID nodes) within the wireless node network. As explained in the examples shown in FIG. 87A-87D, server 87100 identifies the target node as ID node ID1 deployed at a lower level of the network and associated with an item/package being shipped or transported. However in another embodiment, server 87100 may have identified the target node as master node 87110*a* at a middle level of the network.

At step 9110, method 9100 proceeds with the server locating an initial group of other nodes proximate to the initial location of the target node. Thus, in the example shown in FIG. 87B, server 87100 may determine the location of ID nodes ID2-ID16 as being in an initial group of other nodes within a particular range that is proximate to the initial location of target node ID1.

At step 9115, method 9100 proceeds with the server determining an operating node density (OND) of the identified initial group of other nodes proximate to the initial location of the target node. For example, for the initial group of ID nodes ID2-ID16 proximate ID node ID1, server 87100 would determine this initial group of nodes has an operating node density of 15. At step 9120, method 9100 checks to see if the determined operating node density is greater than a threshold value for the operating node density. If so, then step 9120 proceeds to step 9125. Otherwise, there is no need to have the server take further communication management actions related to the identified target node and step 9120 proceeds to the end of method 9100. For example, in the embodiment shown and explained relative to FIG. 87B, server 87100 determines that the current operating node density for target node ID1 (15) exceeds the threshold value set for the operating node density (5), so further communication management actions by server 87100 are warranted relative to target node ID1 and method 9100 proceeds from step 9120 to step 9125.

At step 9125, method 9100 has the server identifying at least one neighboring node from the initial group of other nodes proximate to the target node's initial location. In one embodiment, the neighboring node comprises a single node from those within the initial group of other nodes. Such a single node may be located closer to the target node compared to at least a majority of the remaining nodes in the initial group of other nodes. For example, as shown in FIG. 87B, server 87100 may identify ID node ID2 (which may be paired with a package) as the neighboring node that will be temporarily pruned to cease broadcasting for a time (as explained in more detail below).

In another embodiment, the at least one neighboring node identified in step 9125 may be a subgroup cluster of nodes from the initial group of other nodes proximate to the initial location of the target node. For example, as shown in FIG. 87C, server 87100 may identify ID nodes ID2-ID6 as the neighboring nodes that will be temporarily pruned to cease broadcasting for a time (as explained in more detail below) in order to effect easier communication to and from target ID node ID1.

When "clustering" or identifying subgroup clusters of nodes from the initial group of nodes proximate the target node's location, a further embodiment may have the server identifying such subgroup clusters of nodes using a clustering parameter that distinguishes different nodes within the initial group. For example, a clustering parameter may be shipping information stored on the server and related to each node in the initial group of other nodes. Using such shipping information as a clustering parameter, the server may identify one subgroup cluster of nodes from the initial group as including those nodes having a first common destination address or location for delivery or transfer, while identifying another subgroup cluster of nodes from the initial group as including those nodes having a second destination address or location for delivery or transfer.

In another example, the clustering parameter may involve context data stored on the server and relating to an anticipated environment for each node in the initial group of other nodes during predicted movement of each node in the group of other nodes. Using context data as the clustering parameter, the server may identify one subgroup cluster of nodes from the initial group as including those nodes currently moving on a conveyor system (such as conveyor system 87200), while identifying another subgroup cluster of nodes from the initial group as including those nodes within a building (such as nodes still located within storage location A 87205).

In still another example, the clustering parameter may involve association data stored on the server where the association data identifies server-permitted logical relationships between different ones of the nodes in the initial group of other nodes. Using association data as the clustering parameter, the server may identify one subgroup cluster of nodes from the initial group as including those nodes currently associated with one master node, while identifying another subgroup cluster of nodes from the initial group as including those nodes current associated within another master node in close proximity to the target node.

At step 9130, method 9100 has the server transmitting a change in a broadcast profile to the identified neighboring node(s) from the initial group given the operating node density exceeds the threshold. This change in the broadcast profile causes the neighboring node(s) to temporarily cease broadcasting during a first time interval. Thus, this server initiated proactive operation changes the electronic communication landscape for the target node so to improve the communication operations of the target node in an unconventional manner.

When the neighboring node(s) are identified as a subgroup cluster of nodes, a further embodiment of step 9130 may have the server transmitting the change in the broadcast profile to each node in the subgroup cluster of nodes given the operating node density exceeds the threshold. This change in the broadcast profile causes each node in the subgroup cluster of nodes to temporarily cease broadcasting during the first time interval.

In an embodiment that uses multiple subgroup clusters of nodes, another further embodiment of step 9130 may be implemented by identifying a plurality of subgroup clusters of nodes from the initial group of other nodes as the at least one neighboring node, and then having the server transmitting the change in the broadcast profile to each node in one or more of the subgroup clusters of nodes if the operating node density exceeds the threshold. Such a change in the broadcast profile causes each node in those different subgroup clusters of nodes to temporarily cease broadcasting during the first time interval.

At step 9135, method 9100 has the server waiting until the end of the first time interval. During this time, the changes transmitted to the appropriate neighboring nodes in step 9130 have those nodes ceasing their broadcasting activity so that the target node can more effectively communicate in such a congested environment. But once the first time interval ends or expires, step 9135 proceeds to step 9140.

At step 9140, method 9100 proceeds to have the server determine an updated operating node density (UOND) of an updated group of other nodes in the plurality of wireless nodes proximate to an updated location of the target node. At this point in time, some of the nodes in the logistics-related node network may have moved—including the target node. This dynamic aspect of such a logistics-related node network with mobile nodes causes the operational node landscape to change over time. As a result, the updated location of the target node may be different when compared to the initial location (i.e., the location in step 9105). Furthermore, given movement of the nodes, the updated group of other nodes may be different compared to the initial group of other nodes near the target node as previously located in step 9110.

If the server determines in step 9145 that the updated operating node density (UOND) for the target node at its updated location is greater than the threshold, then the target node is still deemed to be in a congested node landscape where server-based communication management actions may be warranted to help locally reduce potential communication interference from neighboring nodes. Thus, if the UOND is greater than the threshold, step 9145 proceeds to step 9150. Otherwise, if the UOND is not greater than the threshold, the server may permit normal communications to occur with the regular broadcast profile settings as they are with the neighboring nodes proximate the target node.

At step 9150, method 9100 proceeds with the server identifying at least one neighboring node from the updated group of the other nodes within a proximate range of the target node's updated location, and then in step 9155 has the server transmitting a further change in the broadcast profile to at least one node from the updated group of other nodes proximate to the updated location of the target node given the updated operating node density exceeds the threshold. This further change in the broadcast profile causes the at least one node from the updated group of other nodes to temporarily cease broadcasting during a second time interval. Such a neighboring node or nodes from the updated group may be just one node near the target node or a subgroup cluster of multiple nodes near the target node. Further still, the neighboring nodes caused to temporarily cease broadcasting during the second time interval may be a second subgroup cluster of nodes (distinct from or not having all of the same nodes as the first subgroup cluster of nodes that where caused to temporarily cease broadcasting during the first time interval).

In still another further embodiment of method 9100, the server may identify multiple updated subgroup clusters of nodes from the updated group of other nodes proximate to the updated location of the target node once the first time interval expires as part of step 9150. As such, a further embodiment of step 9155 may have the server transmitting the further change in the broadcast profile to each node in a first of the updated subgroup clusters of nodes (to cause each node in the first of the updated subgroup clusters of nodes to temporarily cease broadcasting during the second time interval). Alternatively, the server may transmit the further change in the broadcast profile to the first of the updated subgroup clusters during one part of the second time interval and then transmit the further change in broadcast profile to a second of the updated subgroup clusters during another part of the second time interval (e.g., another non-overlapping part of the second time interval or another partially overlapping part of the second time interval). Similar clustering parameters may be used by the server when identifying such updated neighboring nodes—whether single nodes, a subgroup cluster, or multiple subgroup clusters. Likewise, similar updating of operating node density relative to a target node may be performed by the server after the second time interval expires and similar pruning/clustering communication management techniques may be enacted by the server in still a third or subsequent time interval as needed to help proactively create an improved node landscape relative to the target node's location so that the target node may communicate more effectively without undue interference.

Those skilled in the art will appreciate that method 9100 as disclosed and explained above in various embodiments may be implemented on a server apparatus, such as server 87100 illustrated in FIGS. 87A-90, running one or more parts of server control and management code 90525 (i.e., the high density node communication management code 90000). Such code may be stored on a non-transitory computer-readable medium such as memory storage 90515 on server 87100. Thus, when executing code 90525 (that is implemented to include such high density node communication management code 90000), the server's processing unit 90500 may become unconventionally operative to perform operations or steps from the exemplary methods disclosed above, including method 9100 and variations of that method.

Figure 92B:
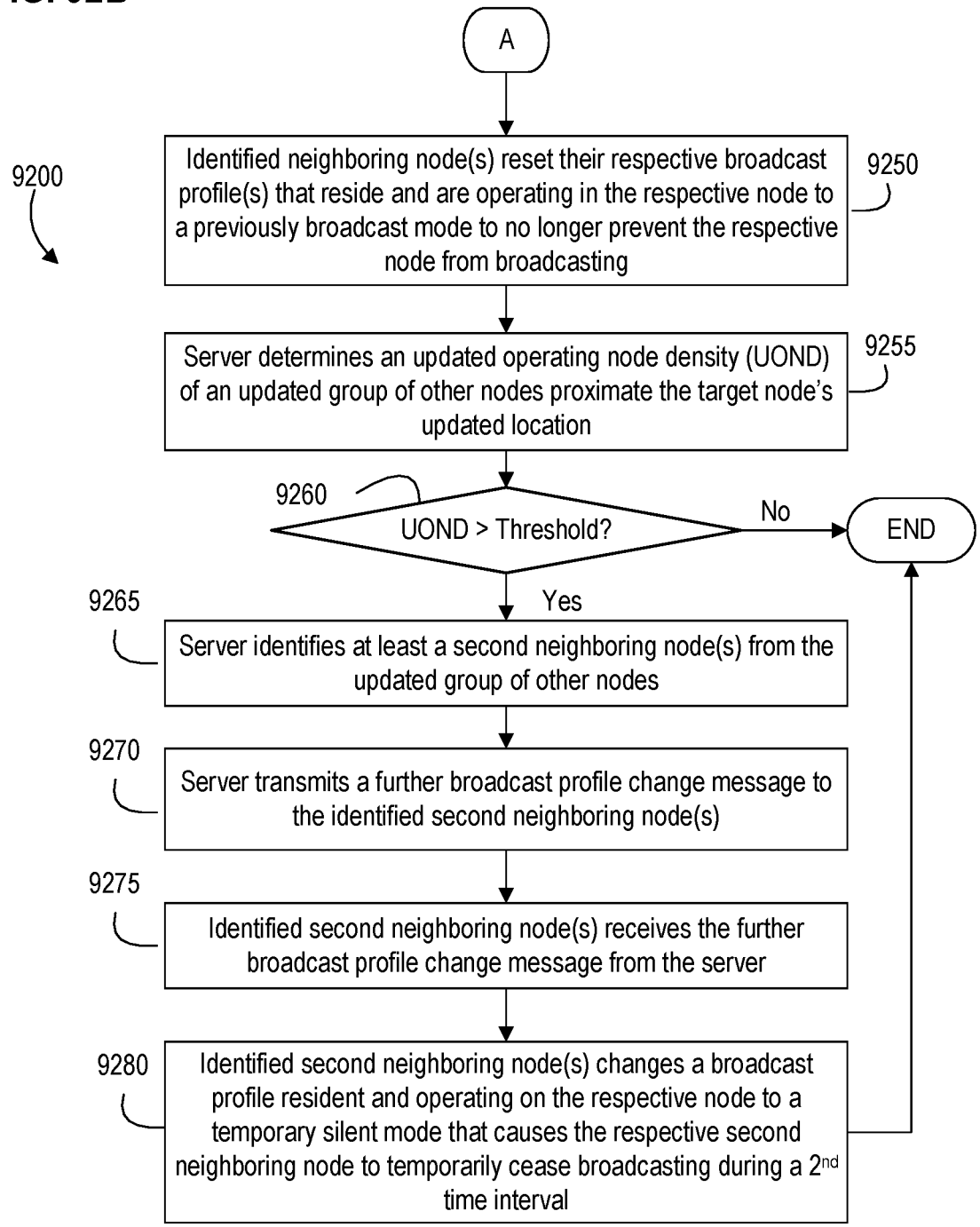

While method 9100 and its variations as described above focus on unconventional operations of a server as it enhances communication management for target nodes in a wireless node network, a further method may focus on more detailed operations of both the server and the target node's neighboring nodes as they collectively provide enhanced communication management as a system to address an overly congested node operating environment. FIGS. 92A-92B are collectively a flow diagram illustrating another exemplary enhanced method of communication management of a plurality of wireless nodes by a server and a target node's neighboring node(s) as they interact within a wireless node network in accordance with an embodiment of the invention.

In general, method 9200 includes specific steps performed by a server (similar to that shown and described above relative to method 9100 and its variations), but also includes detailed steps performed by the identified neighboring node(s) that are near the target node (e.g., steps 9235, 9240, 9250, 9275, and 9280). In more detail and referring now to FIG. 92A, exemplary method 9200 begins at step 9205 with the server identifying the target node from the plurality of wireless nodes in a logistics-related wireless node network (such as that shown in FIG. 87A). In this step, the target node is at an initial location, such as located in a storage location. The target node may be identified as a master node capable of separately communicating with the server over a first communication path and communicating with at least a portion of the network's wireless nodes over a second communication path (such as communicating with ID nodes that each are paired with different packages).

At step 9210, method 9200 proceeds with the server identifying and locating an initial group of other nodes that are within a predetermined distance from the initial location of the target node. Thus, in the example shown in FIG. 87B, server 87100 may determine the location of ID nodes ID2-ID16 as being in an initial group of other nodes within a particular distance from the initial location of target node ID1. Each of ID nodes ID2-ID16 may be ID nodes that are attached to, associated with, or otherwise paired with different packages.

At step 9215, method 9200 proceeds with the server determining an operating node density (OND) of the identified initial group of other nodes before proceeding to step 9220. If the determined operating node density is not greater than a threshold value, method 9200 concludes given the identified target node is able to communicate effectively with an operating node density at a sufficiently low level to permit such communication without interference from other surrounding nodes. However, if the determined operating node density is greater than a threshold value, step 9220 proceeds to step 9225.

At step 9225, method 9200 has the server identifying at least one neighboring node from the initial group of other nodes within the particular distance from the target node's initial location. As previously explained, such a neighboring node relative to a target node may be identified as one node, a group of several nodes (a subgroup cluster), or multiple groups of several nodes (multiple subgroup clusters) from those other nodes within the initial group near the target node. Stated another way, in one embodiment, a neighboring node may be identified in step 9225 as a single node in the initial group (such as an ID node paired with a package) that is located closer to the target node compared to at least a majority of the remaining nodes in the initial group. In another embodiment, the neighboring node identified in step 9225 may be one or more subgroup clusters of multiple nodes from the initial group of other nodes.

When identifying the neighboring nodes in step 9225, the server may rely upon a clustering parameter when identifying and categorizing some of the nodes in the initial group into the one or more subgroup cluster of nodes used as neighboring nodes for purposes of pruning to aid communication to and from the target node. For example and as explained in more detail above, the clustering parameter used by the server may be information stored on the server, such as shipping information related to each node in the initial group, context data related to an anticipated environment for each node in the initial group of other nodes during predicted movement of each node in the group of other nodes, or association data identifying server-permitted relationships between different nodes in the initial group.

With the one or more neighboring nodes identified in step 9225, method 9200 proceeds to step 9230 where the server transmits a broadcast profile change message to the identified neighboring node(s) from the initial group given the operating node density exceeds the threshold. Thus, when the neighboring node is a subgroup cluster of nodes, the server transmits the broadcast profile change message to each node in the subgroup cluster of nodes as part of step 9230. As explained in steps 9235 and 9240 in more detail, the transmitted broadcast profile change message causing each node in the subgroup cluster of nodes to temporarily cease broadcasting during the first time interval. In a further embodiment when the server identifies multiple subgroup clusters from nodes as potential neighboring nodes, the server may transmit the broadcast profile change message to each node in a first of the subgroup clusters of nodes, given the operating node density exceeds the threshold, to cause each node in the first of the subgroup clusters of nodes to temporarily cease broadcasting during the first time interval. In another further embodiment, the server may transmit the broadcast profile change message to each node in a second of the subgroup clusters of nodes after the first time interval expires and if the operating node density still exceeds the threshold. The broadcast profile change message transmitted to each node in the second subgroup clusters of nodes causes a temporary cease of broadcasting for each node in the second subgroup clusters of nodes during a second time interval.

At step 9235, method 9200 has the identified neighboring node(s) receiving the broadcast profile change message from the server. If the identified neighboring node is a master node, that master node may directly receive the broadcast profile change message from the server. However, when the identified neighboring node is an ID node (such as a package ID node paired with a package or item being shipped), that ID node may indirectly receive the broadcast profile change message from the server using an intermediary master node at a mid-level of the wireless node network.

At step 9240, method 9200 has the identified neighboring node(s) changing a broadcast profile resident and operating on that wireless node to a temporary silent mode. Such a temporary silent mode causes that neighboring node to temporarily cease broadcasting during a first time interval. When the first time interval expires, method 9200 proceeds from step 9245 through transition A to step 9250 in FIG. 92B. Referring now to FIG. 92B at step 9250, method 9200 proceeds with the identified neighboring node(s) resetting their respective broadcast profile to a previous broadcast mode in order to no longer prevent node(s) from broadcasting.

At step 9255, method 9200 proceeds with the server determining an updated operating node density (UOND) of an updated group of other nodes in the plurality of wireless nodes that are within the predetermined distance from an updated location of the target node. Such an updated location of the target node may be different compared to the target node's initial location if the target node has moved during the first time interval. Likewise, those skilled in the art will appreciate that the updated group of other nodes is different compared to the initial group of other nodes due to node movement. Thus, the updated operating node density related to the target node reflects a potentially changed operating node landscape for the target node.

At step 9260, method 9200 has the server determining if the updated operating node density is greater than the threshold value. If the determined updated operating node density is not greater than the threshold value, step 9260 moves to the end of method 9200 as the target node now no longer needs server-based enhanced communication management assistance in order to sufficiently communicate with other nodes. However, if the determined updated operating node density is greater than the threshold value, step 9260 proceeds to step 9265.

At step 9265, method 9200 has the server identifying at least a second neighboring node or neighboring nodes to the target node from the updated group of other nodes and then transmitting a further broadcast profile change message to the identified second neighboring node(s) in step 9270. At step 9275, method 9200 has the identified second neighboring node(s) receiving the broadcast profile change message from the server. Then, at step 9280, method 9200 has the identified second neighboring node(s) changing a broadcast profile resident and operating on the identified neighboring node(s) to the temporary silent mode that causes such nodes to temporarily cease broadcasting during a second time interval.

In a further embodiment of method 9200, step 9265 may have the server identifying multiple updated subgroup clusters of nodes from the updated group of other nodes in the plurality of wireless nodes that are within the predetermined distance from an updated location of the target node. With these identified multiple updated subgroup clusters of nodes as potential neighboring nodes that may be temporarily silenced, the server may transmit the further broadcast profile change message to each node in a first of the updated subgroup clusters of nodes given the updated operating node density exceeds the threshold after the first time interval expires. This further broadcast profile change message causes each node in this first updated subgroup clusters of nodes to temporarily cease broadcasting during the second time interval.

Thereafter, the server may also transmit the further broadcast profile change message to each node in a second of the updated subgroup clusters of nodes after the second time interval expires and if the updated operating node density still exceeds the threshold. At this point, the further broadcast profile change message transmitted by the server to each node in the second of the updated subgroup clusters of nodes causes a temporary cease of broadcasting for each node in the second of the updated subgroup clusters of nodes during a third time interval. As such, the server and the nodes operating as neighboring nodes relative to the target node may function as a type of system that enhances how the target node can communicate with other elements of a wireless node network.

Figure 93:
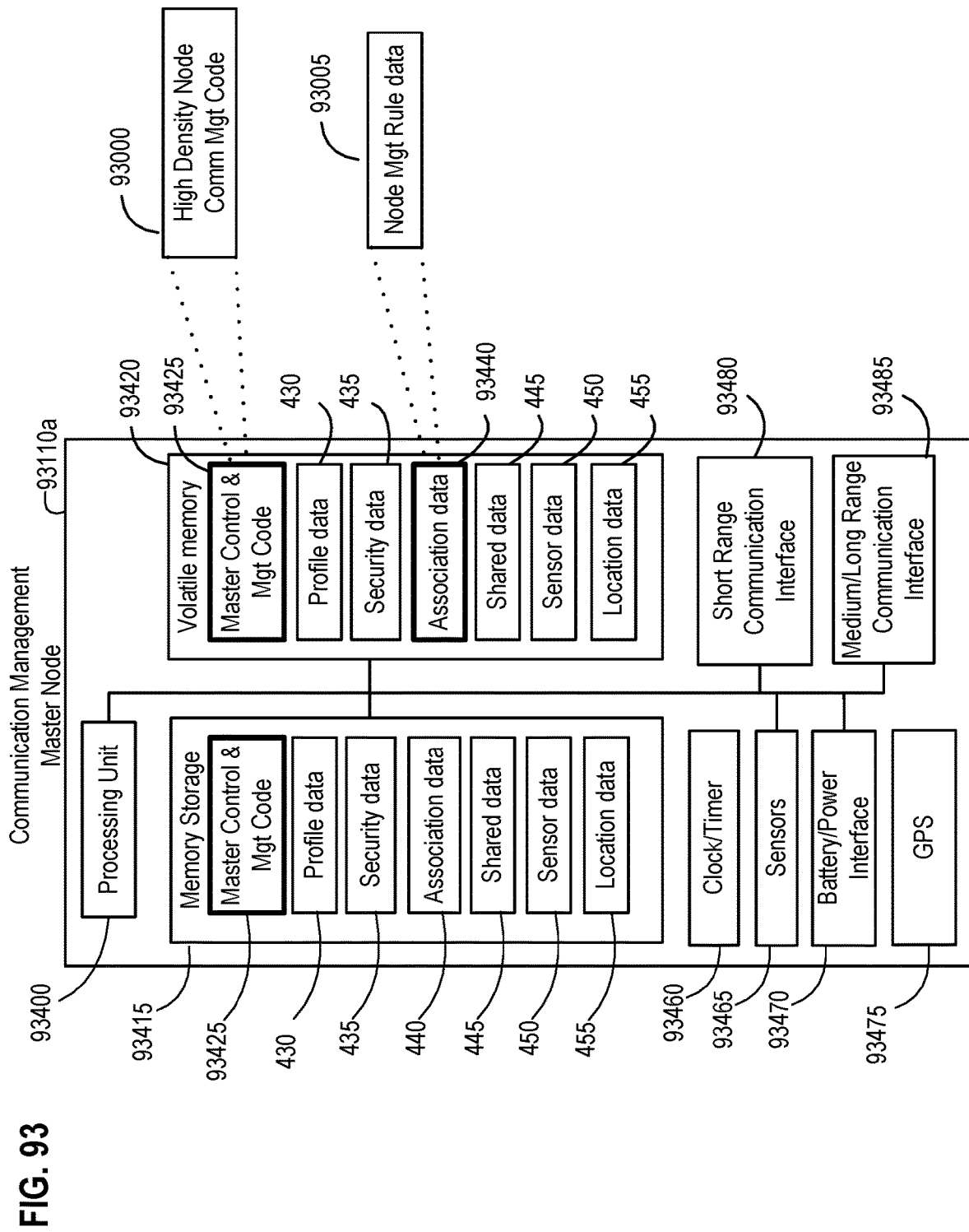
FIG. 93 is a diagram illustrating details of an exemplary modified master node that uses one or more node management rules to provide enhanced communication management for a congested node environment in accordance with an embodiment of the invention.

While a server, such as server 87100) as shown and explained relative to FIGS. 87A-92B, may be deployed in different embodiments that provide enhanced communication management relative to a target node in a wireless node network in order to improve target node communication operations in a congested node environment, further embodiments may deploy a specially programmed master node (i.e., a communication management master node) for this type of role within the logistics related wireless node network. In general, an exemplary communication management master node, as modified with programming to provide enhanced communication management functionality, may be deployed at a layer of the network below the server and rely on node management rule data provided by the server when interacting with neighboring nodes of a target node. Such node management rule data (such as a whitelist type of data structure) helps to identify which other lower level nodes within the network fall within the control of that particular master node. FIG. 93 is a diagram illustrating details of an exemplary modified master node that uses one or more node management rules to provide enhanced communication management for a congested node environment in accordance with an embodiment of the invention.

Referring now to FIG. 93, exemplary communication management master node 93110*a* is illustrated in accordance with an embodiment of the invention that uses high density node communication management code 93000 as part of master control and management code 93425 to implement such enhanced communication management functionality in an unconventional manner. Those skilled in the art will appreciate that exemplary master node 93110a is shown similar to master node 425 (previously described relative to FIG. 4) as well as master nodes 87110a and 87110b (previously described as deployed in the embodiments shown in FIGS. 87A-89B). More specifically, those skilled in the art will appreciate that an embodiment of exemplary master node 93110a includes many of the same hardware, code, and data components as shown for exemplary master node 425 (as well as master nodes 87110a, 87110b). As such, similar functionality exists for what is numbered the same or similarly and described above regarding exemplary master node 425. Thus, while master node 425 shown in FIG. 4 is described as having processing unit 400, memory storage 415, volatile memory 420, clock/timer 460, sensors 465, battery/power interface 470, GPS 475, short range communication interface 480, and medium/long range communication interface 485, those skilled in the art will appreciate that exemplary master node 93110a may use similar hardware components as shown in FIG. 4. This includes at least processing unit 93400, memory storage 93415, volatile memory 93420, clock/timer 93460, sensors 93465, battery/power interface 93470, GPS 93475, short range communication interface 93480, and medium/long range communication interface 93485.

Further, the embodiment of exemplary communication management master node 93110a illustrated in detailed FIG. 93 deploys high density node communication management code 93000, which is stored in memory storage 93415 as part of master control and management code 93425. High density node communication management code 93000 may be loaded into volatile memory 93420 for execution by processing unit 93400. The master control and management code 425, as previously described, generally controls the behavior of the master node relating to communications (with a node advertise and query logic manager), information management (with an information control and exchange manager), power management (with a node power manager that interacts with the various communication interfaces, for example, to manage power consumption and broadcast power aspects at a low level), association management (with an association manager), and location determination functionality (with a location aware/capture module). As such, master control and management code 93425 essentially operates similar to that as described above for master node control and management code 425 but further includes high density node communication management code 93000 for functions used to provide enhanced communication management of wireless nodes operating in a congested logistics node network environment as described in FIGS. 87A-89B and in more detail below with respect to the methods described relative to FIG. 94. Thus, an embodiment of high density node communication management code 93000 may be implemented as an integrated part of master control and management code 93425, such as one or more programmatic functions or additional program modules that may be called within code 93425. However, in other embodiments, the high density node communication management code 93000 used to implement the method as described with respect to FIGS. 87A-89B, and 94 may be implemented separately from code 93425 in a way that allows code 93000 to call some of the programmatic functions or program modules described as part of code 425 (or 93425) to implement the steps as laid out in the method illustrated by FIG. 94 and variations of that method as described herein.

In general, exemplary high density node communication management code 93000 programmatically adapts and transforms the operation of exemplary communications management master node 93110a such that master node 93110a unconventionally functions to generally identify a target node using a node management rule 93005 provided by a server (such as server 87100); determine an operating node density relative to that target node based upon locations known or determined by the server of the target node and other neighboring nodes; and cause one or more of the neighboring nodes to temporarily cease broadcasting for a particular time interval via transmitted changes to those nodes' broadcast profiles. In some embodiments, the transmitted change may be implemented with a command to simply temporarily cease broadcasting for the time interval. This may have the receiving node altering the current parameters of its broadcasting profile. However, in other embodiments, the transmitted change may take the form of a master node instruction for the particular neighboring node to use a different broadcast profile for a set period of time. In some instances, such an instruction may also have the particular neighboring node revert back to the original broadcast profile after the set period of time ends. Those skilled in the art will appreciate that the availability of multiple different broadcast profiles to use allows for a proactive selection of a desired communication profile to fit with a particular type of node operating environment or instructions received from the server regarding changed communication related operations for the node.

As noted above, the exemplary communication management master node 93110a may identify the target node from a subset of the wireless nodes within the logistics-related wireless node network. This subset of wireless nodes is defined by node management rule 93005, which is initially received from the server and stored within the master node as a type of association data (e.g., association data 93440 similar to that generally described above as association data 440). An embodiment of communication management master node 93110a may receive an initial instance of node management rule 93005, but may also receive an update for the node management rule from the server. Such an updated node management rule defines an alternative subset of the wireless nodes assigned to the master node for communication management. This may occur periodically given the dynamic nature of movement of the nodes within the logistics-related wireless node network. For example, the communication management master node 93110a may receive an update for node management rule 93005 after a time interval expires where the master node has caused certain neighboring nodes near a target node to temporarily cease broadcasting.

Figure 94:
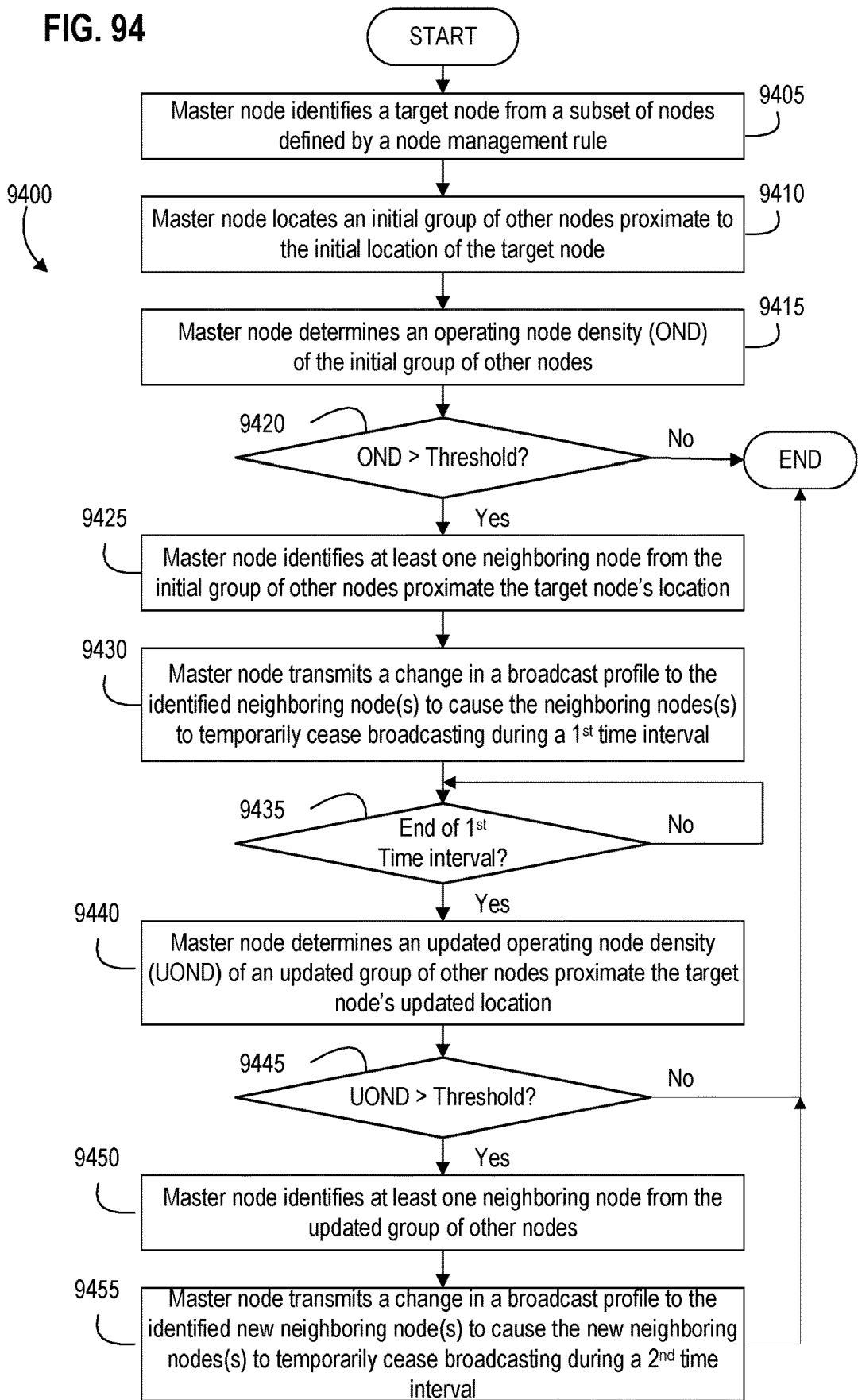
FIG. 94 is a flow diagram illustrating an exemplary enhanced method of communication management of a plurality of wireless nodes by a communication management master node operating in a wireless node network in accordance with an embodiment of the invention.

FIG. 94 is a flow diagram illustrating an exemplary enhanced method of communication management of a plurality of wireless nodes by a communication management master node, such as master node 93110a, operating in a wireless node network in accordance with an embodiment of the invention. Exemplary method 9400 generally focuses on master node-implemented steps that collectively amount to unconventional master node functionality from a mid-level of the network that has the technical effect of enhancing communication management relative to a particular target node within the wireless node network. Stated another way, exemplary method 9400 generally focuses on a collection of steps performed by a specially programmed master node (such as master node 93110a) that addresses a congested logistics network issue with unconventional functionality that leverages a node management rule provided by a server in the network as part of improving the communication operations of the target node within the wireless node network. Thus, method 9400 generally describes master node operations that interact with a server and other nodes in the network to enhance communication management via similar pruning techniques as described above relative to a target node and neighboring node(s).

Referring now to FIG. 94, exemplary method 9400 begins at step 9405 with an exemplary communication management master node identifying a target node from a subset of the wireless nodes (master nodes and/or ID nodes) where the subset is defined by a node management rule (such as node management rule 93005) received from a server and stored within the master node. The identified target node is currently at an initial location. For example, as shown in FIG. 87A-87D, master node 87110a may be modified as a communication management master node 93110a to use high density node communication management code 9300 and node management rule data 93005 to identify the target node as ID node ID1 deployed at a lower level of the network and associated with an item/package being shipped or transported.

At step 9410, method 9400 proceeds with the server locating an initial group of other nodes proximate to the initial location of the target node. Thus, in the example shown in FIG. 87B, master node 87110a (modified to be implemented as master node 93110a) may determine the location of ID nodes ID2-ID16 as being in an initial group of other nodes within a particular range that is proximate to the initial location of target node ID1.

At step 9415, method 9400 proceeds with the master node determining an operating node density (OND) of the identified initial group of other nodes proximate to the initial location of the target node. For example, for the initial group of ID nodes ID2-ID16 proximate ID node ID1, master node 87110a (modified to be implemented as master node 93110a) would determine this initial group of nodes has an operating node density of 15. At step 9420, method 9400 checks to see if the determined operating node density is greater than a threshold value for the operating node density. If so, then step 9420 proceeds to step 9425. Otherwise, there is no need to have the master node take further communication management actions related to the identified target node and step 9420 proceeds to the end of method 9400. For example, in the embodiment shown and explained relative to FIG. 87B, master node 87110a (modified to be implemented as master node 93110a) determines that the current operating node density for target node ID1 (15) exceeds the threshold value set for the operating node density (5), so further communication management actions by master node 87110a (modified to be implemented as master node 93110a) are warranted relative to target node ID1 and method 9400 proceeds from step 9420 to step 9425.

At step 9425, method 9400 has the master node identifying at least one neighboring node from the initial group of other nodes proximate to the target node's initial location. In one embodiment, the neighboring node comprises a single node from those within the initial group of other nodes. Such a single node may be located closer to the target node compared to at least a majority of the remaining nodes in the initial group of other nodes. For example, as shown in FIG. 87B, master node 87110a (modified to be implemented as master node 93110a) may identify ID node ID2 (which may be paired with a package) as the neighboring node that will be temporarily pruned to cease broadcasting for a time (as explained in more detail below).

In another embodiment, the neighboring node or nodes identified in step 9425 may be a subgroup cluster of nodes from the initial group of other nodes proximate to the initial location of the target node. For example, as shown in FIG. 87C, master node 87110a (modified to be implemented as master node 93110a) may identify ID nodes ID2-ID6 as the neighboring nodes that will be temporarily pruned to cease broadcasting for a time (as explained in more detail below) in order to effect easier communication to and from target ID node ID1.

When "clustering" or identifying subgroup clusters of nodes from the initial group of nodes proximate the target node's location, a further embodiment may have the master node identifying such subgroup clusters of nodes using a clustering parameter that distinguishes different nodes within the initial group. For example, a clustering parameter may be shipping information provided by the server to the master node and related to each node in the initial group of other nodes. Using such shipping information as a clustering parameter, the master node may identify one subgroup cluster of nodes from the initial group as including those nodes having a first common destination address or location for delivery or transfer, while identifying another subgroup cluster of nodes from the initial group as including those nodes having a second destination address or location for delivery or transfer.

In another example, the clustering parameter may involve context data provided by the server to the master node and relating to an anticipated environment for each node in the initial group of other nodes during predicted movement of each node in the group of other nodes. Using context data as the clustering parameter, the master node may identify one subgroup cluster of nodes from the initial group as including those nodes currently moving on a conveyor system (such as conveyor system 87200), while identifying another subgroup cluster of nodes from the initial group as including those nodes within a building (such as nodes still located within storage location A 87205).

In still another example, the clustering parameter may involve association data identifying server-permitted logical relationships between different ones of the nodes in the initial group of other nodes. Using association data as the clustering parameter, the master node may identify one subgroup cluster of nodes from the initial group as including those nodes currently associated with one master node, while identifying another subgroup cluster of nodes from the initial group as including those nodes current associated within another master node in close proximity to the target node.

At step 9430, method 9400 has the master node transmitting a change in a broadcast profile to the identified neighboring node(s) from the initial group given the operating node density exceeds the threshold. This change in the broadcast profile causes the neighboring node(s) to temporarily cease broadcasting during a first time interval. Thus, this master node initiated proactive operation changes the electronic communication landscape for the target node so to improve the communication operations of the target node in an unconventional manner.

When the neighboring node(s) are identified as a subgroup cluster of nodes, a further embodiment of step 9430 may have the master node transmitting the change in the broadcast profile to each node in the subgroup cluster of nodes given the operating node density exceeds the threshold. This change in the broadcast profile causes each node in the subgroup cluster of nodes to temporarily cease broadcasting during the first time interval.

In an embodiment that uses multiple subgroup clusters of nodes, another further embodiment of step 9430 may be implemented by identifying a plurality of subgroup clusters of nodes from the initial group of other nodes as the at least one neighboring node, and then having the master node transmitting the change in the broadcast profile to each node in one or more of the subgroup clusters of nodes if the operating node density exceeds the threshold. Such a change in the broadcast profile causes each node in those different subgroup clusters of nodes to temporarily cease broadcasting during the first time interval.

At step 9435, method 9400 has the master node waiting until the end of the first time interval. During this time, the changes transmitted to the appropriate neighboring nodes in step 9430 have those nodes ceasing their broadcasting activity so that the target node can more effectively communicate in such a congested environment. But once the first time interval ends or expires, step 9435 proceeds to step 9440.

At step 9440, method 9400 proceeds to have the master node determine an updated operating node density (UOND) of an updated group of other nodes in the plurality of wireless nodes proximate to an updated location of the target node. At this point in time, some of the nodes in the logistics-related node network may have moved—including the target node. This dynamic aspect of such a logistics-related node network with mobile nodes causes the operational node landscape to change over time. As a result, the updated location of the target node may be different when compared by the master node to the initial location of the target node. Furthermore, given movement of the nodes, the updated group of other nodes may be different compared to the initial group of other nodes near the target node as previously located in step 9410.

If the master node determines in step 9445 that the updated operating node density (UOND) for the target node at its updated location is greater than the threshold, then the target node is still deemed to be in a congested node landscape where master node-based communication management actions may be warranted to help locally reduce potential communication interference from neighboring nodes. Thus, if the UOND is greater than the threshold, step 9445 proceeds to step 9450. Otherwise, if the UOND is not greater than the threshold, the master node may permit normal communications to occur with the regular broadcast profile settings as they are with the neighboring nodes proximate the target node.

At step 9450, method 9400 proceeds with the master node identifying at least one neighboring node from the updated group of the other nodes within a proximate range of the target node's updated location, and then in step 9455 has the master node transmitting a further change in the broadcast profile to at least one node from the updated group of other nodes proximate to the updated location of the target node given the updated operating node density exceeds the threshold. This further change in the broadcast profile causes the at least one node from the updated group of other nodes to temporarily cease broadcasting during a second time interval. Such a neighboring node or nodes from the updated group may be just one node near the target node or a subgroup cluster of multiple nodes near the target node. Further still, the neighboring nodes caused to temporarily cease broadcasting during the second time interval may be a second subgroup cluster of nodes (distinct from or not having all of the same nodes as the first subgroup cluster of nodes that where caused to temporarily cease broadcasting during the first time interval).

In still another further embodiment of method 9400, the master node may identify multiple updated subgroup clusters of nodes from the updated group of other nodes proximate to the updated location of the target node once the first time interval expires as part of step 9450. As such, a further embodiment of step 9455 may have the master node transmitting the further change in the broadcast profile to each node in a first of the updated subgroup clusters of nodes (to cause each node in the first of the updated subgroup clusters of nodes to temporarily cease broadcasting during the second time interval). Alternatively, the master node may transmit the further change in the broadcast profile to the first of the updated subgroup clusters during one part of the second time interval and then transmit the further change in broadcast profile to a second of the updated subgroup clusters during another part of the second time interval (e.g., another non-overlapping part of the second time interval or another partially overlapping part of the second time interval). Similar clustering parameters may be used by the master node when identifying such updated neighboring nodes—whether single nodes, a subgroup cluster, or multiple subgroup clusters. Likewise, similar updating of operating node density relative to a target node may be performed by the master node after the second time interval expires and similar pruning/clustering communication management techniques may be enacted by the master node in still a third or subsequent time interval as needed to help proactively create an improved node landscape relative to the target node's location so that the target node may communicate more effectively without undue interference.

Those skilled in the art will appreciate that method 9400 as disclosed and explained above in various embodiments may be implemented on a master node apparatus, such as master node 87110a illustrated in FIGS. 87A-89B and modified to be implemented as master node 93110a as shown in FIG. 93, running one or more parts of master control and management code 93425 (i.e., the high density node communication management code 93000) and using exemplary node management rule data 93005. Such code and data may be stored on a non-transitory computer-readable medium such as memory storage 93415 on master node 87110a (modified to be implemented as master node 93110a). Thus, when executing code 93425 (that is implemented to include such high density node communication management code 93000), the master node's processing unit 93400 may become unconventionally operative to perform operations or steps from the exemplary methods disclosed above, including method 9400 and variations of that method.

Those skilled in the art will appreciate that, when master nodes 87110a and 87110b as shown in FIGS. 87A-89B are implemented to embody exemplary communication management master node 93110a, a system-level embodiment may include multiple communication management master nodes (each responsible enhanced communication management within different parts of the wireless node network) and a server that provides the initial instance of the particular node management rule for each of these master nodes as well as updates to those rules over time.

Figure 95A:
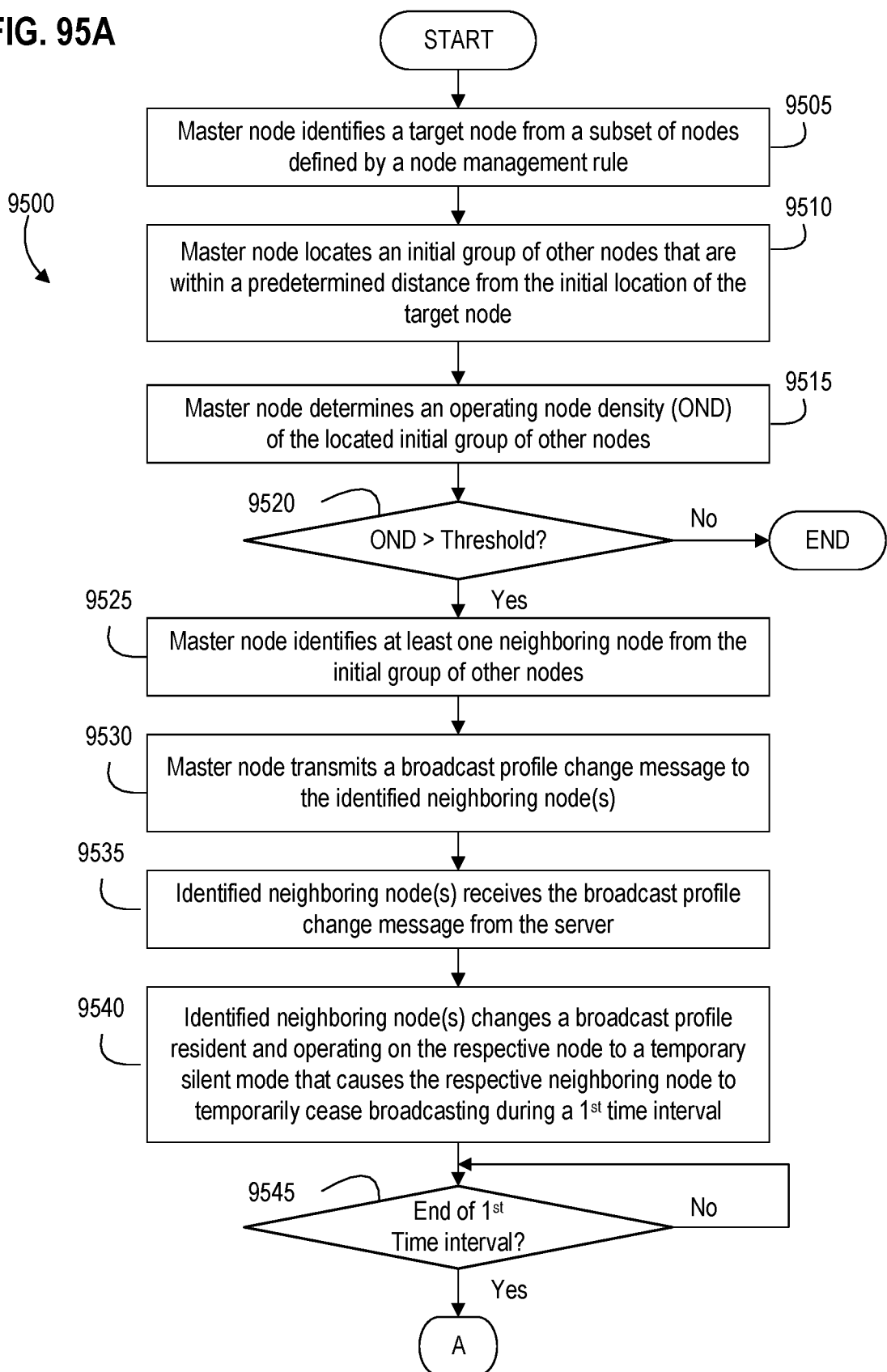
FIGS. 95A-95B are collectively a flow diagram illustrating another exemplary enhanced method of communication management of a plurality of wireless nodes by a communication management master node and a target node's neighboring node(s) as they interact within a wireless node network in accordance with an embodiment of the invention.
Figure 95B:
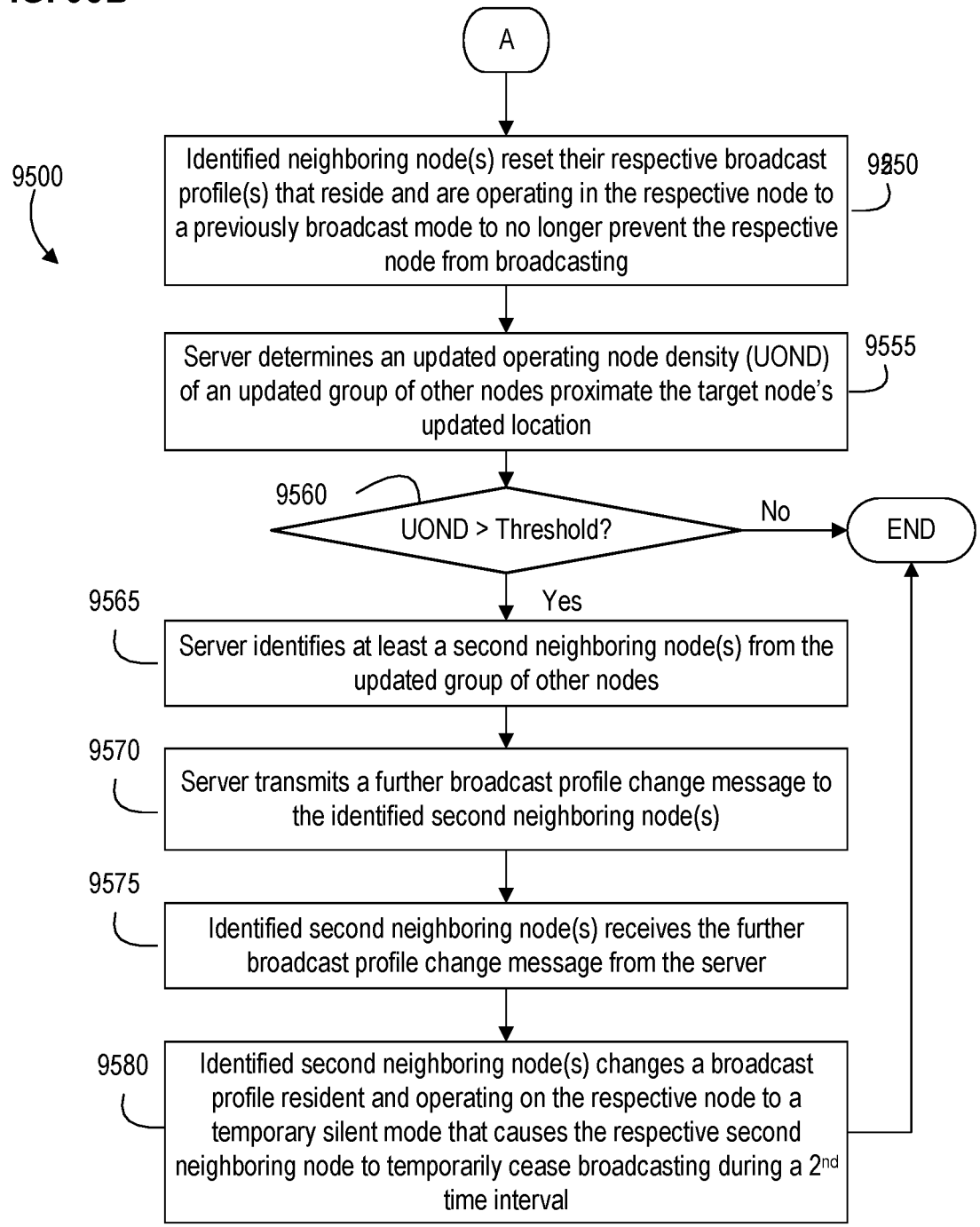

While method 9400 and its variations as described above focus on unconventional operations of an exemplary communication management master node (such as master node 93110a) as it enhances communication management for target nodes in a wireless node network, a further method may focus on more detailed operations of both such an exemplary communication management master node and the target node's neighboring nodes as they collectively provide enhanced communication management as a system to address an overly congested node operating environment. FIGS. 95A-95B are collectively a flow diagram illustrating another exemplary enhanced method of communication management of a plurality of wireless nodes by a communication management master node and a target node's neighboring node(s) as they interact within a wireless node network in accordance with an embodiment of the invention.

In general, method 9500 includes specific steps performed by an exemplary communication management master node (similar to that shown and described above relative to method 9400 and its variations), but also includes detailed steps performed by the identified neighboring node(s) that are near the target node (e.g., steps 9535, 9540, 9550, 9575, and 9580). In more detail and referring now to FIG. 95A, exemplary method 9500 begins at step 9505 with the master node identifying the target node from a subset of the wireless nodes in a logistics-related wireless node network (such as that shown in FIG. 87A). The subset of wireless nodes identified are defined by a node management rule (such as that stored in node management rule data 93005) received by the master node from the server and stored within a memory of the master node. In this step, the target node is at an initial location, such as located in a storage location, relative to other nodes in the subset.

At step 9510, method 9500 proceeds with the master node identifying and locating an initial group of other nodes that are within a predetermined distance from the initial location of the target node. Thus, in the example shown in FIG. 87B, master node 87110*a* (modified to be implemented as an exemplary communication management master node 93110*a*) may determine the location of ID nodes ID2-ID16 as being in an initial group of other nodes within a particular distance from the initial location of target node ID1. Each of ID nodes ID2-ID16 may be ID nodes that are attached to, associated with, or otherwise paired with different packages.

At step 9515, method 9500 proceeds with the master node determining an operating node density (OND) of the identified initial group of other nodes before proceeding to step 9520. If the determined operating node density is not greater than a threshold value, method 9500 concludes given the identified target node is able to communicate effectively with an operating node density at a sufficiently low level to permit such communication without interference from other surrounding nodes. However, if the determined operating node density is greater than a threshold value, step 9520 proceeds to step 9525.

At step 9525, method 9500 has the master node identifying at least one neighboring node from the initial group of other nodes within the particular distance from the target node's initial location. As previously explained, such a neighboring node relative to a target node may be identified as one node, a group of several nodes (a subgroup cluster), or multiple groups of several nodes (multiple subgroup clusters) from those other nodes within the initial group near the target node. Stated another way, in one embodiment, a neighboring node may be identified by the master node in step 9525 as a single node in the initial group (such as an ID node paired with a package) that is located closer to the target node compared to at least a majority of the remaining nodes in the initial group. In another embodiment, the neighboring node identified by the master node in step 9525 may be one or more subgroup clusters of multiple nodes from the initial group of other nodes.

When identifying the neighboring nodes in step 9525, the master node may rely upon a clustering parameter when identifying and categorizing some of the nodes in the initial group into the one or more subgroup cluster of nodes used as neighboring nodes for purposes of pruning to aid communication to and from the target node. For example and as explained in more detail above, the clustering parameter used by the master node may be information received from a server and stored on the master node, such as shipping information related to each node in the initial group, context data related to an anticipated environment for each node in the initial group of other nodes during predicted movement of each node in the group of other nodes, or association data identifying server-permitted relationships between different nodes in the initial group.

With the one or more neighboring nodes identified in step 9525, method 9500 proceeds to step 9530 where the master node transmits a broadcast profile change message to the identified neighboring node(s) from the initial group given the operating node density exceeds the threshold. Thus, when the neighboring node is a subgroup cluster of nodes, the master node transmits the broadcast profile change message to each node in the subgroup cluster of nodes as part of step 9530. As explained in steps 9535 and 9540 in more detail, the transmitted broadcast profile change message causing each node in the subgroup cluster of nodes to temporarily cease broadcasting during the first time interval. In a further embodiment when the master node identifies multiple subgroup clusters from nodes as potential neighboring nodes, the master node may transmit the broadcast profile change message to each node in a first of the subgroup clusters of nodes, given the operating node density exceeds the threshold, to cause each node in the first of the subgroup clusters of nodes to temporarily cease broadcasting during the first time interval. In another further embodiment, the master node may transmit the broadcast profile change message to each node in a second of the subgroup clusters of nodes after the first time interval expires and if the operating node density still exceeds the threshold. The broadcast profile change message transmitted to each node in the second subgroup clusters of nodes causes a temporary cease of broadcasting for each node in the second subgroup clusters of nodes during a second time interval.

At step 9535, method 9500 has the identified neighboring node(s) receiving the broadcast profile change message from the master node. If the identified neighboring node is a master node, that master node may directly receive the broadcast profile change message from the master node operating as the communication management master node (e.g., master node 93110*a*). However, when the identified neighboring node is an ID node (such as a package ID node paired with a package or item being shipped), that ID node may indirectly receive the broadcast profile change message from the master node operating as the communication management master node.

At step 9540, method 9500 has the identified neighboring node(s) changing a broadcast profile resident and operating on that wireless node to a temporary silent mode. Such a temporary silent mode causes that neighboring node to temporarily cease broadcasting during a first time interval. When the first time interval expires, method 9500 proceeds from step 9545 through transition A to step 9550 in FIG. 95B. Referring now to FIG. 95B at step 9550, method 9500 proceeds with the identified neighboring node(s) resetting their respective broadcast profile to a previous broadcast mode in order to no longer prevent node(s) from broadcasting.

At step 9555, method 9500 proceeds with the master node determining an updated operating node density (UOND) of an updated group of other nodes in the plurality of wireless nodes that are within the predetermined distance from an updated location of the target node. Such an updated location of the target node may be different compared to the target node's initial location if the target node has moved during the first time interval. Likewise, those skilled in the art will appreciate that the updated group of other nodes is different compared to the initial group of other nodes due to node movement. Thus, the updated operating node density related to the target node reflects a potentially changed operating node landscape for the target node.

At step 9560, method 9500 has the master node determining if the updated operating node density is greater than the threshold value. If the determined updated operating node density is not greater than the threshold value, step 9560 moves to the end of method 9500 as the target node now no longer needs master node-based enhanced communication management assistance in order to sufficiently communicate with other nodes. However, if the determined updated operating node density is greater than the threshold value, step 9560 proceeds to step 9565.

At step 9565, method 9500 has the master node identifying at least a second neighboring node or neighboring nodes to the target node from the updated group of other nodes and then transmitting a further broadcast profile change message to the identified second neighboring node(s) in step 9570. At step 9575, method 9500 has the identified second neighboring node(s) receiving the broadcast profile change message from the master node. Then, at step 9580, method 9500 has the identified second neighboring node(s) changing a broadcast profile resident and operating on the identified neighboring node(s) to the temporary silent mode that causes such nodes to temporarily cease broadcasting during a second time interval.

In a further embodiment of method 9500, step 9565 may have the master node (e.g., master node 87110a modified to be implemented as an exemplary communication management master node 93110a) identifying multiple updated subgroup clusters of nodes from the updated group of other nodes in the plurality of wireless nodes that are within the predetermined distance from an updated location of the target node. With these identified multiple updated subgroup clusters of nodes as potential neighboring nodes that may be temporarily silenced, the master node may transmit the further broadcast profile change message to each node in a first of the updated subgroup clusters of nodes given the updated operating node density exceeds the threshold after the first time interval expires. This further broadcast profile change message causes each node in this first updated subgroup clusters of nodes to temporarily cease broadcasting during the second time interval.

Thereafter, the master node may also transmit the further broadcast profile change message to each node in a second of the updated subgroup clusters of nodes after the second time interval expires and if the updated operating node density still exceeds the threshold. At this point, the further broadcast profile change message transmitted by the master node to each node in the second of the updated subgroup clusters of nodes causes a temporary cease of broadcasting for each node in the second of the updated subgroup clusters of nodes during a third time interval. As such, the communication management master node and the nodes operating as neighboring nodes relative to the target node function as a type of system that enhances how the target node can communicate with other elements of a wireless node network.

As explained relative to exemplary method 9500 and the related variations described above, a system-level embodiment may include a communication management master node (such as master node 87110a modified to be implemented as exemplary communication management master node 93110a) and one or more neighboring nodes relative to a target node. Such a master node and the neighboring node(s) for elements of such an exemplary system for enhanced communication management that improves communications to and from the target node. Those skilled in the art will appreciate that a further system-level embodiment may comprise a server interacting with multiple master nodes that are deployed as communication management master nodes (such as both of master nodes 87110a and 87110b when both are implemented as exemplary communication master nodes similar to node 93110a). Generally, in such a further system-level embodiment, the server provides dedicated node communication management rules to each of the master nodes and the master nodes may conduct pruning operations that overlap in time that separately and independently enhance communication management of two different target nodes during time intervals that may at least overlap (or over the same time interval). As such, the system may help two different target nodes to communicate with each other or with other nodes.

Figure 96A:
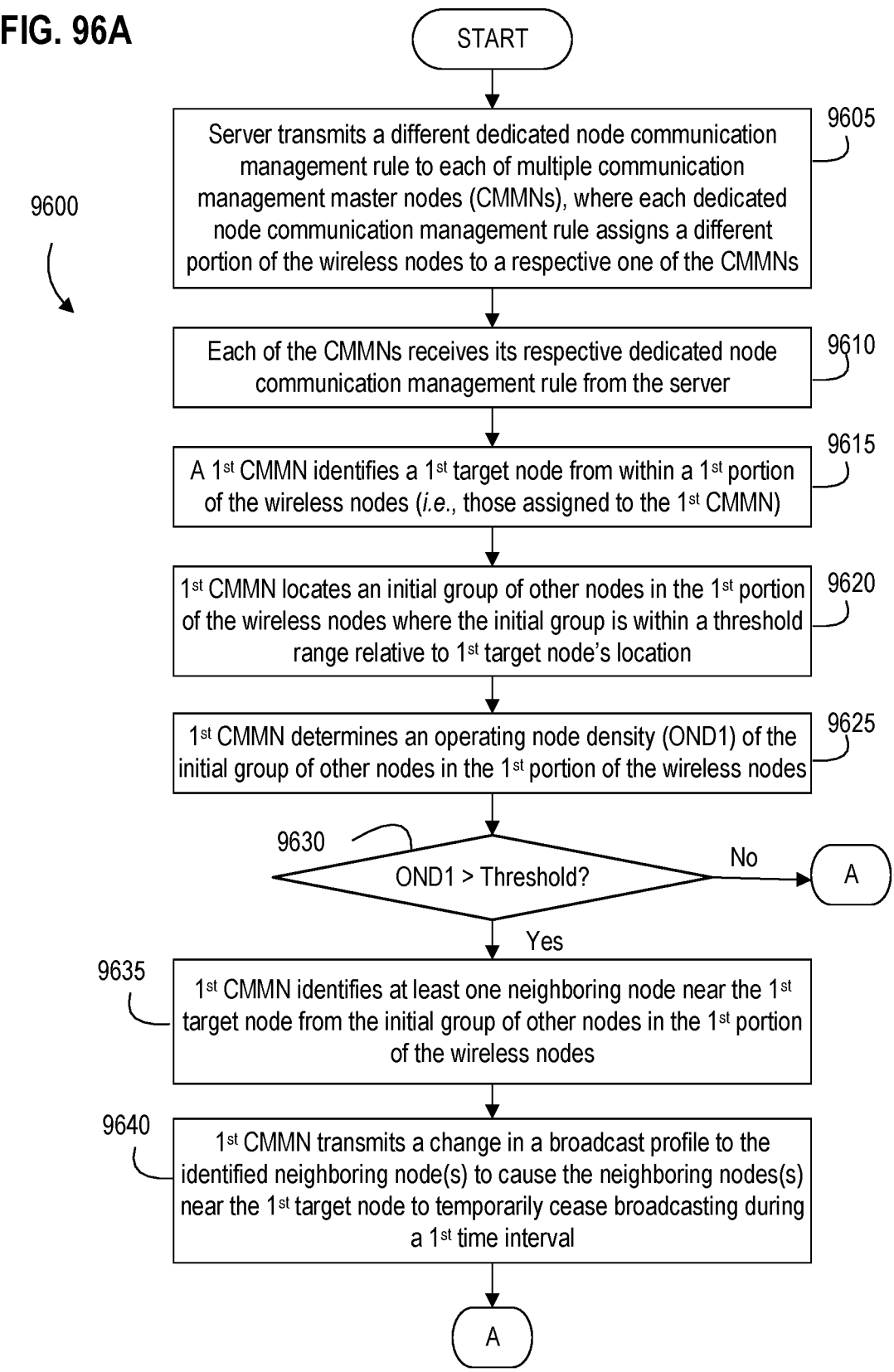

FIGS. 96A-96B are collectively a flow diagram illustrating another exemplary enhanced method of communication management of a plurality of wireless nodes by a server and multiple communication management master nodes as they interact within a wireless node network in accordance with an embodiment of the invention. Referring now to FIG. 96A, exemplary method 9600 illustrates an embodiment of a method of communication management of a plurality of wireless nodes disposed in a hierarchical wireless node network having at least the plurality of wireless nodes disposed at a low level in the network, a plurality of master nodes disposed at a middle level in the network and physically located in different locations, and a server disposed at a top level in the network.

Method 9600 begins at step 9605 with the server transmitting a different dedicated node communication management rule to each of multiple master nodes (implemented as different communication management master nodes (CMMNs) similar to master node 93110a). Each of the dedicated node communication management rules (e.g., a master node specific rule stored as node management rule data 93005) assigns a different portion of the wireless nodes in the network to a respective one of the CMMNs. For example, as shown in FIG. 89A, a system embodiment may include server 87100 that interacts directly with each of master nodes 87110a and 87110b (which in this example may be implemented as an embodiment of exemplary communication management master node 93110a). As such and in this example, server 87100 may transmitting a different dedicated node communication management rule to each of CMMN 87110a and 87110b. The dedicated node communication management rule sent to CMMN 87110a assigns ID nodes ID1-ID6, ID17, and ID18 to CMMN 87110a for purposes of communication management. Likewise, the dedicated node communication management rule sent to CMMN 87110b assigns ID nodes IDT-16, and ID19-ID21 to CMMN 87110b for purposes of communication management.

At step 9610, method 9600 proceeds to have each of the master nodes receive a respective one of the dedicated node communication management rules from the server. With their respectively different dedicated node communication management rules stored in onboard memory, each of the master nodes may access their node communication management rules as a type of white list of appropriate wireless nodes within the network that are the responsibility of that master node for purposes of enhanced communication management in congested node environments.

At step 9615, method 9600 proceeds with a first of the master nodes (1$^{st}$ CMMN) identifying a first target node from within a first portion of the wireless nodes (i.e., the portion of wireless nodes assigned to the 1$^{st}$ CMMN). At this point, the first target node is disposed at a first physical location. For example, in the example shown in FIG. 89A, master node 87110a (as the 1$^{st}$ CMMN) may identify ID node ID1 as the first target node from those nodes assigned to master node 87110a pursuant to a dedicated node communication management rule received by master node 87100a from server 87100.

At step 9620, method 9600 continues with the 1$^{st}$ CMMN locating an initial group of other nodes in the first portion of wireless nodes that are within a threshold range relative to the first location of the first target node. As such, in the example of FIG. 89A, master node 87110a operating as the 1$^{st}$ CMMN may locate an initial group of other nodes within a threshold range of the location of ID node ID1 to include ID nodes ID2-ID6.

At step 9625, method 9600 proceeds to have the 1$^{st}$ CMMN determine an operating node density (OND1) of the initial group of other nodes in the first portion of wireless nodes, and then, at step 9630, determines whether that operating node density if greater than a threshold value as a gauge of the operating node congestion near the first target node. If the operating node density OND1 is not greater than the threshold value, then step 9630 proceeds directly through transition A to step 9645 (as shown in FIG. 96B). Otherwise, if the operating node density OND1 is found to be greater than the congestion threshold value in step 9630, method 9600 proceeds to step 9635.

At step 9635, method 9600 proceeds to have the 1$^{st}$ CMMN identify at least one neighboring node near the first target node from the initial group of other nodes in the first portion of wireless nodes. Such a neighboring node relative to the first target node may be identified as one node, a group of several nodes (a subgroup cluster), or multiple groups of several nodes (multiple subgroup clusters) from those other nodes within the initial group near the first target node (which may determine such subgroup clusters of node based upon different types of clustering parameters).

At step 9640, method 9600 continues by having the 1$^{st}$ CMMN transmit a change in a broadcast profile to the identified neighboring node(s) to cause the identified neighboring node(s) related to the first portion of the wireless nodes to temporarily cease broadcasting during a first time interval. Thereafter, method 9600 proceeds through transition A to step 9645 in FIG. 96B.

Referring now to step 9645 in FIG. 96B, method 9600 proceeds with a second of the master nodes (2$^{nd}$ CMMN) identifying a second target node from within a second portion of the wireless nodes (i.e., the portion of wireless nodes assigned to the 2$^{nd}$ CMMN). At this point, the second target node is disposed at a second physical location (different from the first physical location where the first target node is located). For example, in the example shown in FIG. 89A, master node 87110b (as the 2$^{nd}$ CMMN) may identify ID node ID13 as the second target node from those nodes assigned to master node 87110b pursuant to a dedicated node communication management rule received by master node 87100b from server 87100.

At step 9650, method 9600 continues with the 2$^{nd}$ CMMN locating an initial group of other nodes in the second portion of wireless nodes that are within a threshold range relative to the second location of the second target node. As such, in the example of FIG. 89A, master node 87110b operating as the 2$^{nd}$ CMMN may locate an initial group of other nodes within a threshold range of the location of ID node ID13 to include ID nodes ID7-ID12 and ID14-ID16.

At step 9655, method 9600 proceeds to have the 2$^{nd}$ CMMN determine an operating node density (OND2) of the initial group of other nodes in the second portion of wireless nodes, and then, at step 9660, determines whether that operating node density if greater than a threshold value as a gauge of the operating node congestion near the second target node. If the operating node density OND2 is not greater than the threshold value, then step 9660 proceeds and concludes method 9600. Otherwise, if the operating node density OND2 is found to be greater than the congestion threshold value in step 9660, method 9600 proceeds to step 9665.

At step 9665, method 9600 proceeds to have the 2$^{nd}$ CMMN identify at least one neighboring node near the second target node from the initial group of other nodes in the second portion of wireless nodes. Such a neighboring node relative to the second target node may be identified as one node, a group of several nodes (a subgroup cluster), or multiple groups of several nodes (multiple subgroup clusters) from those other nodes within the initial group near the second target node (which may determine such subgroup clusters of node based upon different types of clustering parameters).

At step 9670, method 9600 concludes by having the 2$^{nd}$ CMMN transmit a change in a broadcast profile to the identified neighboring node(s) to cause the identified neighboring node(s) related to the second portion of the wireless nodes to temporarily cease broadcasting during a second time interval, which may be non-overlapping or have an overlapping time period with respect to the first time interval.

In still another embodiment, a type of centralized communication management master node may be deployed with programmatically implemented functionality used to enhance centralized high density node communication management via other master nodes. Generally, in such an environment, this type of centralized communication management master node (also referred to as a "primary master node" for purposes of enhanced communication management via pruning techniques) may be deployed at a central position relative to a portion of the wireless node network. From this central position, the primary master node generally functions as a network element that communicates with a server while also communicating with other master nodes within a communication range of the primary master node. At this position relative to the other master nodes, the primary master node may be deployed as a primary controller of the other master nodes relative to enhanced communication management functions performed by each of the other master nodes.

In more detail, such an exemplary primary master node may be positioned, for example, at a general "RF centroid" location relative to the other master nodes so that the primary master node has similar (but not necessarily identical) communication with each of the certain other master nodes being managed by that centralized pruning master node. As explained in more detail below, an exemplary primary master node may also be implemented with one or more improved communication interfaces that use different radio and/or antenna technology that gives the primary master node a different range/sensitivity for communicating with the other master nodes over longer distances when compared to conventionally equipped master nodes that may be listening to the primary master node. Thus, with such an exemplary primary master node responsible to managing other master nodes for purposes of enhanced communication management, an embodiment may include a mix of more passive and active master nodes that interact as part of enhancing communication management and facilitating improved communications to and from a target node within the network in overly congested node environments.

Figure 97:
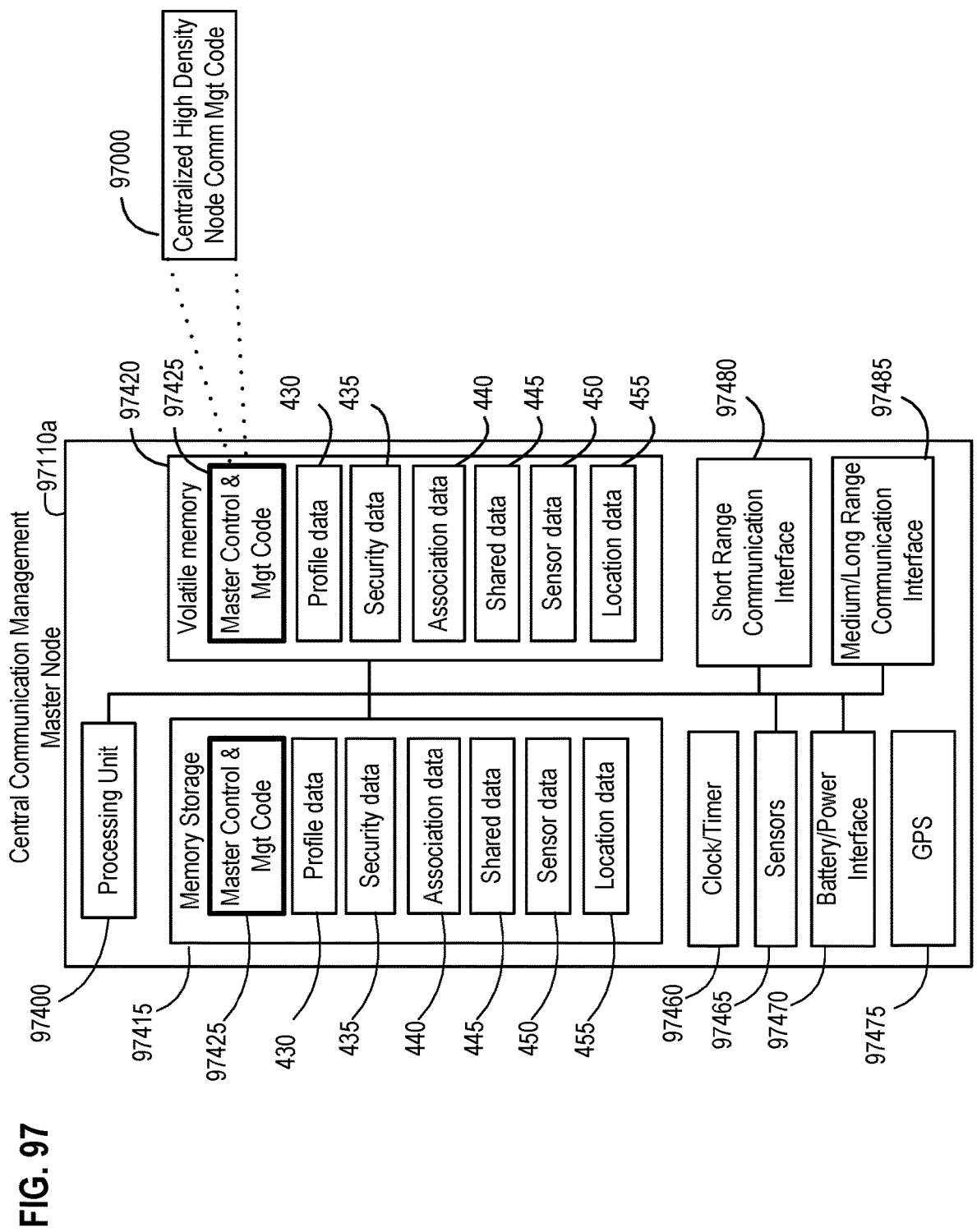
FIG. 97 is a diagram illustrating details of an exemplary centralized communication management master node (also referred to as a primary master node) that controls other master nodes as part of providing enhanced communication management for a congested node environment in accordance with an embodiment of the invention.

FIGS. 97-99 illustrate various embodiments that include and leverage use of such an exemplary primary master node apparatus for purposes of enhanced communication management within an overly congested node environment. More specifically, FIG. 97 is a diagram illustrating details of an exemplary primary master node 97110a that controls other master nodes as part of providing enhanced communication management for a congested node environment in accordance with an embodiment of the invention. Referring now to FIG. 97, exemplary centralized communication management master node 97110a (commonly referred to as a "primary master node" for purposes of enhanced communication management) is illustrated in accordance with an embodiment of the invention that uses centralized high density node communication management code 97000 as part of master control and management code 97425 to implement the enhanced communication management functionality on priority master node 97110a in an unconventional manner. Those skilled in the art will appreciate that exemplary primary master node 97110a is shown in FIG. 97 similar to master node 425 (previously described relative to FIG. 4); master nodes 87110a and 87110b (previously described as deployed in the embodiments shown in FIGS. 87A-89B); and master node 93110a (previously described as deployed in the embodiments shown in FIGS. 94-96b). More specifically, those skilled in the art will appreciate that an embodiment of exemplary primary master node 97110a includes many of the same hardware, code, and data components as shown for exemplary master node 425 (as well as master nodes 87110a, 87110b, and 93110a). As such, similar functionality exists for what is numbered the same or similarly and described above regarding exemplary master node 425. Thus, while master node 425 shown in FIG. 4 is described as having processing unit 400, memory storage 415, volatile memory 420, clock/timer 460, sensors 465, battery/power interface 470, GPS 475, short range communication interface 480, and medium/long range communication interface 485, those skilled in the art will appreciate that exemplary master node 97110a may use similar hardware components as shown in FIG. 4. This includes at least processing unit 97400, memory storage 97415, volatile memory 97420, clock/timer 97460, sensors 97465, battery/power interface 97470, GPS 97475, short range communication interface 97480, and medium/long range communication interface 97485.

Additionally, exemplary primary master node 97110a deploys centralized high density node communication management code 97000, which is stored in memory storage 97415 as part of master control and management code 97425. Centralized high density node communication management code 97000 may be loaded into volatile memory 97420 for execution by processing unit 97400. The master control and management code 425, as previously described, generally controls the behavior of a master node relating to communications (with a node advertise and query logic manager), information management (with an information control and exchange manager), power management (with a node power manager that interacts with the various communication interfaces, for example, to manage power consumption and broadcast power aspects at a low level), association management (with an association manager), and location determination functionality (with a location aware/capture module). As such, master control and management code 97425 essentially operates similar to that as described above for master node control and management code 425 but further includes centralized high density node communication management code 97000 for functions used to coordinate and interact with other master nodes as part of providing enhanced communication management of wireless nodes operating in a congested logistics node network environment as described more detail below with respect the systems shown in FIGS. 98A-98C and to the methods described relative to FIG. 99. Thus, an embodiment of centralized high density node communication management code 97000 may be implemented as an integrated part of master control and management code 97425, such as one or more programmatic functions or additional program modules that may be called within code 97425. However, in other embodiments, the centralized high density node communication management code 97000 used to implement the method as described with respect to FIGS. 98A-98C and 99 may be implemented separately from code 97425 in a way that allows code 97000 to call some of the programmatic functions or program modules described as part of code 425 (or 97425) to implement the steps as laid out in the method illustrated in the flowchart of FIG. 94 and variations of that method as described herein.

In general, exemplary centralized high density node communication management code 97000 programmatically adapts and transforms the operation of exemplary primary master node 97110a such that primary master node 97110a unconventionally functions to receive a communication from a server, which assigns the primary master node the particular role of managing specific other master nodes and ID nodes collectively within a communication range of the primary master node. In response, the primary master node then generally identify a target node from those other master nodes and ID nodes; determine an operating node density relative to that target node based upon locations known or determined by the primary master node of the target node and other neighboring nodes; and cause one or more of the neighboring nodes to temporarily cease broadcasting for a particular time interval via transmitted changes to those nodes' broadcast profiles. The primary master node may also determine an updated operating node density of an updated group of master nodes and ID nodes within range of the target node, and transmit a further change in the broadcast profile to one or more nodes from the updated group to cause those nodes to temporarily cease broadcasting during a subsequent time interval. And while the server may assign the primary master node to be an active manager for enhanced communications related to the target node, the server may also assign the other master nodes to a passive role in such enhanced communication management relative to the target node in that the other master nodes must listen to the primary master node for direction and control related to enhanced communication management relative to the target node via pruning and clustering techniques.

Additionally, an embodiment of primary master node 97110a may implement its exemplary medium/long range communication interface 97485 with a wireless transceiver that has enhanced performance compared to the other master nodes that operate in a passive role in such enhanced communication management relative to the target node. For example, the medium/long range communication interface 97485 in an embodiment of primary master node 97110*a* may be implemented with a wireless transceiver having a larger broadcast power with which to transmit messages (e.g., broadcast profile change messages and passive node communication management rules) to other nodes compared to the broadcast power for similar interfaces used in the other master nodes that operate in a passive role. Further enhancements to such a medium/long range communication interface 97485 may include using multiple radios (e.g., using dedicated radios for different passive master nodes) and/or using antennas that may deploy multiple antenna elements capable of beam-forming to enhance, for example, a transmission pattern and range for the interface 97485 relative to different other passive master nodes.

Figure 98A:
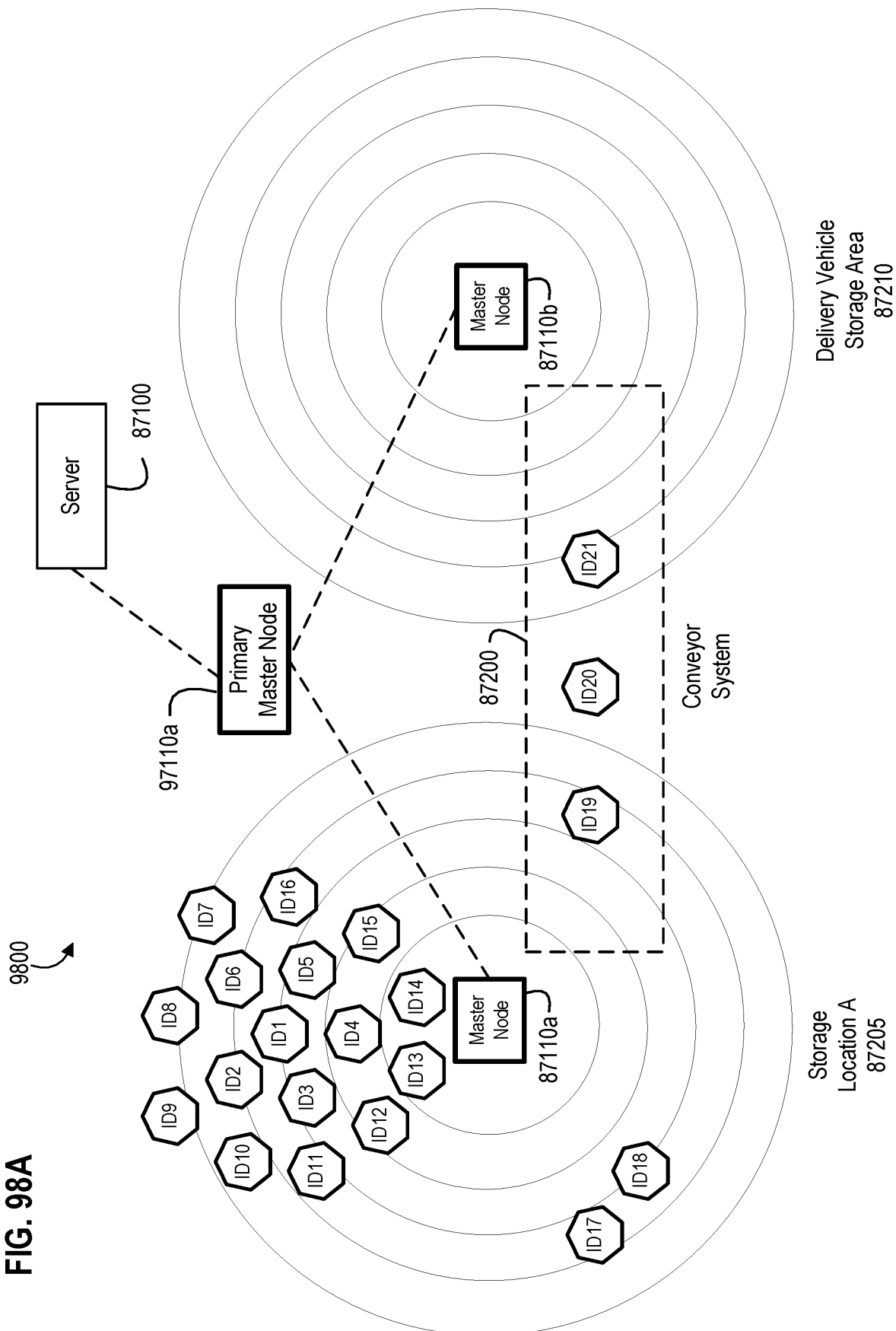
FIGS. 98A-98C are related diagrams illustrating an exemplary system of logistics node elements that include an exemplary primary master node that controls other master nodes as part of providing enhanced communication management for a congested node environment in accordance with an embodiment of the invention.
Figure 98B:
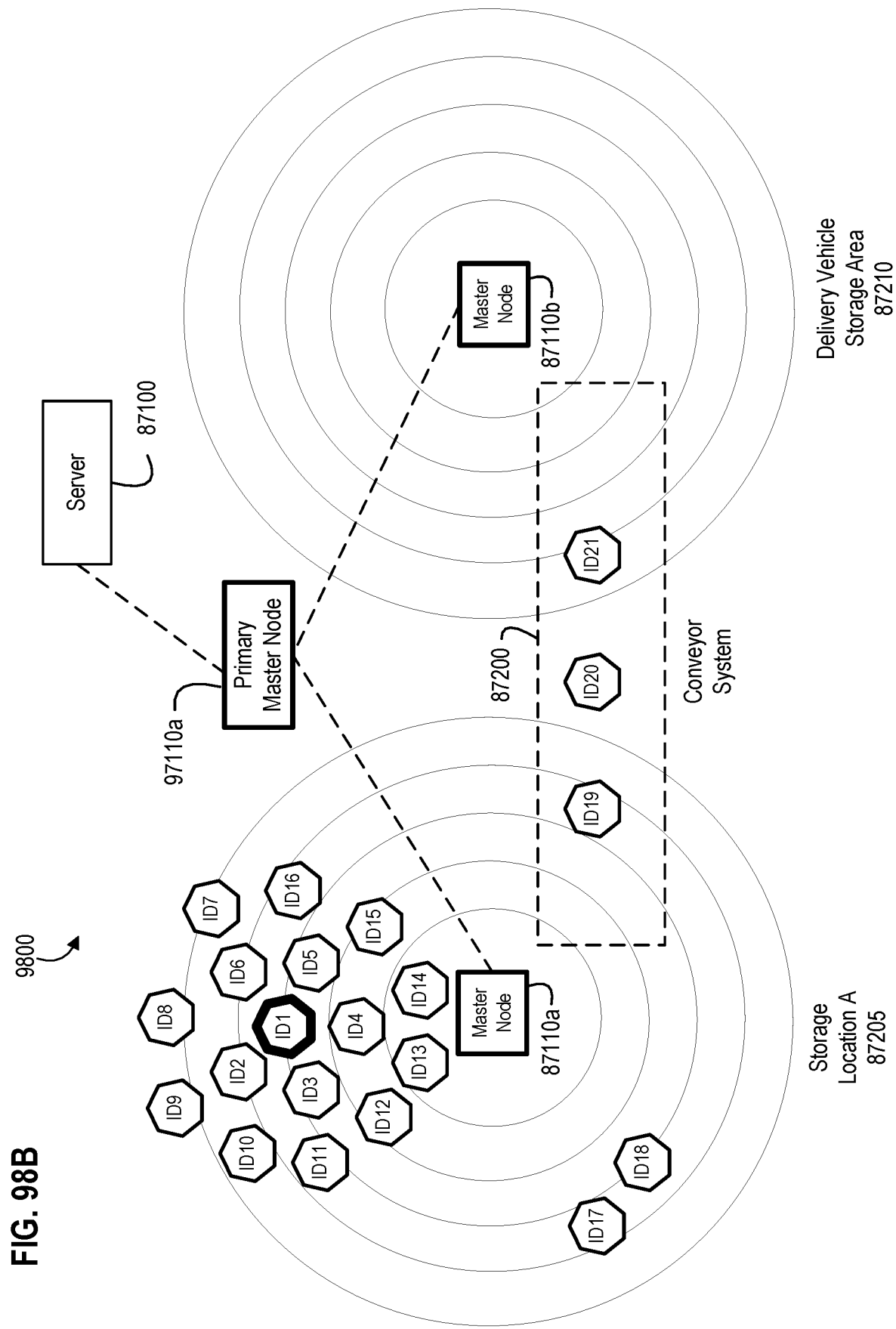
Figure 98C:
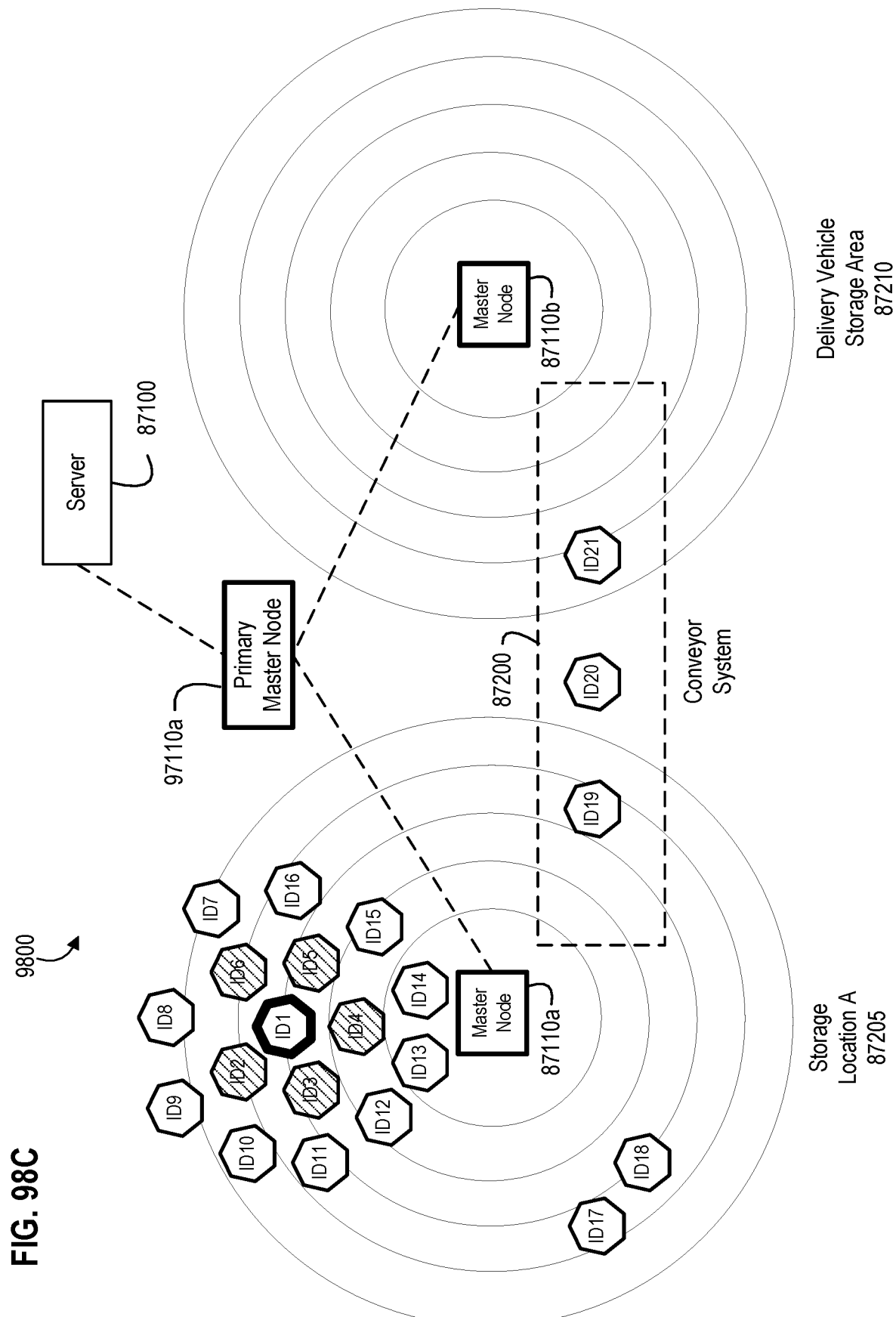

FIGS. 98A-98C are diagrams illustrating an exemplary system 9800 of logistics node elements that include an exemplary primary master node 97110*a* deployed to control other master and ID nodes as part of providing enhanced communication management for an overly congested node environment in accordance with an embodiment of the invention. Referring now to FIG. 98A, those skilled in the art will appreciate that the system 9800 of network elements illustrated may be deployed in manner to provide enhanced communication management for the congested node environment while substantially distributing the enhanced communication management responsibility down from a server-level of the network. In particular, exemplary system 9800 is shown as comprising a server 87100, a primary master node 97110*a*, two other master nodes 87110*a*, 87110*b* within the communication range of primary master node 97110*a*, and ID nodes ID1-ID21 (some or all of which being paired with a shipment package that may be located at storage location A 87205, on conveyor system 87200, or in delivery vehicle storage area 87210).

As shown in the embodiment illustrated in FIGS. 98A-98C, the primary master node 97110*a* in system 9800 may be disposed at an RF centroid relative to the other master nodes 87110*a*, 87110*b*. In this position, the primary master node 97110*a* may be deployed in a position that provides similar communications with each of the other master nodes—e.g., via relative distances to each of the other master nodes and/or relative transmission distances (which may take into account RF interference and attenuation from surrounding structure) to each of the other master nodes). Primary master node 97110*a* may also have with a communication range that is greater than each of master nodes 87110*a*, 87110*b* via an enhanced communication interface as discussed above. Thus, primary master node 97110*a* may communicate with at least each of master nodes 87110*a*, 87110*b* and, in some embodiments, also with each of ID nodes ID1-ID21.

As part of system 9800, primary master node 97110*a* is generally used to control the other master nodes 87110*a*, 87110*b* as part of providing enhanced communication management. For example, in operation of exemplary system 9800, server 87100 may transmit an active node communication rule to the primary master node 97110*a*. Upon receipt of this active node communication rule, the primary master node becomes assigned to operate as a primary master node managing specific other master nodes and ID nodes collectively within a communication range of the primary master node 97110*a*. For example, as shown in the embodiment illustrated in FIG. 98A, primary master node 97110*a* may receive such an active node communication rule from server 87100, which assigns primary master node 97110*a* with enhanced communication management responsibility for each of master nodes 87110*a* and 87110*b* as well as ID nodes ID1-ID21.

Thereafter, primary master node 97110*a* (in this active role) may transmit passive node communication management rules to each of master nodes 87110*a* and 87110*b*. In another embodiment, the server 87100 may alternatively transmit such passive node communication management rules to each of master nodes 87110*a* and 87110*b*. Upon receipt of their respective passive node communication management rules, each of master nodes 87110*a* and 87110*b* becomes a passive listener for purposes of enhanced communication management and allow primary master node 97110*a* to control the process of pruning and, in some embodiments clustering, related to improving communications with a target node (such as one of master nodes 87110*a* and 87110*b* or ID nodes ID1-ID21). In other words, in such a passive listener role per their respectively received passive node communication management rule, the primary master node 97110*a* (or server 87100) causes each of the master nodes 87110*a* and 87110*b* to operate as a passive "child" node under control of the primary master node for enhanced communication management purposes related to overly congested node environments. Thus, even if server 87100 provides the passive node communication management rule, such a rule has the effect of causing the recipient master node to look at the primary master node 97110*a* for control and direction for purposes of enhanced communication management relative to a particular target node in the network.

As shown in the example illustrated in FIG. 98B, the primary master node 97110*a* of exemplary system 9800 begins the active management effort by generally identifying a target node, determining if the operating node density relative to that target node warrants further enhanced communication management intervention by primary master node 97110*a*, and (if necessary) pruning relevant neighboring nodes (as a single node, subgroup cluster of nodes, or multiple subgroup clusters of nodes as described above) so as to cause it/them to temporarily cease broadcasting for a time period.

For example, in FIG. 98B, primary master node 97110*a* has identified ID node ID1 as a target node. Those skilled in the art will recognize that in the example shown in FIGS. 98A-98C, the target node may be any of master nodes 87110*a*, 87110*b* (listening as child nodes to primary master node 97110*a* for purposes of enhanced communication management) and ID nodes ID1-ID21. As shown in FIG. 98C, primary master node 97110*a* then determines that the operating node density of an initial group of other nodes near target ID node ID (e.g., the group with a threshold range of target ID node ID1 including ID nodes ID2-ID16) is greater than a threshold value, which then causes the primary master node 97110*a* to responsively transmit a change in a broadcast profile to each of neighboring nodes ID2-ID6 so as to cause them to temporarily cease broadcasting for a time period. Thus, the primary master node 97110*a* may cause one or more neighboring nodes (such as one node near the target node, a group of several nodes (a subgroup cluster) near the target node, or multiple groups of several nodes (multiple subgroup clusters) near the target node) to temporarily cease broadcasting and temporarily improve the ability of the target node to communicate during that time period.

A similar process may take place with primary master node 97110*a* upon expiration of the time period and reassessment of what nodes are near the updated location of the target node, and whether an updated operating node density indicates the primary master node 97110a should transmit a further change to at least one neighboring node from an updated group of nodes near the updated location of the target node.

FIG. 99 is a flow diagram illustrating an exemplary enhanced method of communication management involving a plurality of wireless nodes that leverages use of a primary master node that controls other master nodes in accordance with an embodiment of the invention. In this embodiment, the enhanced method of communication management may be performed by certain elements of a hierarchical wireless node network having at least a plurality of wireless ID nodes disposed at a low level in the network, multiple master nodes disposed at a middle level in the network and physically located in different locations, and a server disposed at a top level in the network. In more detail, and referring now to FIG. 99, method 9900 begins at step 9905 where the server transmits an active node communication management rule assigning a first of the master nodes to operate as a primary master node (e.g., primary master node 97110a) that manages the other master nodes (e.g., master nodes 87110a, 87110b) as well as the ID nodes (e.g., ID nodes ID1-ID21, each which being paired with a package being shipped) collectively within a communication range of the first master node.

At step 9910, method 9900 continues with the first master node receiving the active node communication management rule from the server. For example, in the embodiment shown in FIGS. 98A-98C, one of the master nodes shown as part of system 9800 (i.e., primary master node 97110a) receives the active node communication management rule in a message from server 87100. In one example, the active node communication management rule may operate to initiate execution of an embodiment of centralized high density communication management code 97000 on master node 97110a so that master node 97110a becomes operative to function as the previously described primary master node that manages and controls other master nodes and/or ID nodes collectively within the communication range of master node 97110a. However, in another example, an embodiment of the centralized high density communication management code 97000 may already be running and simply waiting for receipt of the active node communication management rule from server 87100 in order to proceed further.

At step 9915, an embodiment method 9900 may have the other master nodes receiving a passive node communication management rule from either the server or the first master node operating as the primary master node. Such a passive node communication management rule generally causes each of the others master nodes to operate as a passive child node under the control of the first master node (that is now actively operating as the primary master node).

At step 9920, method 9900 has the first master node identifying a target node from the other master nodes and ID nodes collectively within the communication range of the first master node. The identified target node is disposed at a first location within the communication range of the first master node. For example, the primary master node 97110a shown in FIG. 98B may identify ID node ID1 as a target node within the communication range of primary master node 97110a.

At step 9925, method 9900 continues with the first master node (e.g., primary master node 97110a) locating an initial group from the other master nodes and/or ID nodes that are within a threshold range relative to the target node's first location. Then, at step 9930, method 9900 has the first master node determining an operating node density (OND) of the located initial group of other nodes.

At step 9935, if the determined operating node density is greater than a threshold value (which may represent a tolerable operating node density threshold for a node landscape surrounding the target node), method 9900 continues to step 9940. Otherwise, step 9935 concludes to an end of method 9900.

At step 9940, method 9900 has the first master node identifying at least one neighboring node from the initial group of other nodes. Such a neighboring node or nodes may be identified as a single node near the target node, a group of several nodes (a subgroup cluster) near the target node, or multiple groups of several nodes (multiple subgroup clusters) near the target node. For example, as shown in FIG. 98C, ID nodes ID2-ID6 may be identified by primary master node 97110a to be relevant neighboring nodes of target ID node ID1 for purposes of enhanced communication to and from ID node ID1.

Finally, at step 9945, method 9900 concludes with the first master node transmitting a change in a broadcast profile to the identified neighboring node or nodes. This transmitted change in the broadcast profile causes those neighboring node from the initial group to temporarily cease broadcasting during a first time interval.

In a further embodiment, the first time interval has expired and the first master node (operating as a primary master node) determines an updated operating node density of an updated group of the others master nodes and ID nodes that are within the threshold range relative to an updated location of the target node. As such, the first master node may then transmit a further change in the broadcast profile to at least one node from the updated group if the updated operating node density of the updated group exceeds the threshold once the first time interval expires. Such a further change in the broadcast profile causes the at least one node (e.g., one or more neighboring nodes relative to where the target node is now located) from the updated group of other nodes to temporarily cease broadcasting during a second time interval.

Those skilled in the art will appreciate that at least steps 9910-9945 of method 9900 as disclosed and explained above in various embodiments may be implemented on a master node programmed to operate as an exemplary primary master node, such as primary master node 97110a illustrated in FIGS. 97-98C, running one or more parts of master control and management code 97425 (i.e., the centralized high density node communication management code 97000). Such code may be stored on a non-transitory computer-readable medium such as memory storage 97415 on primary master node 97110a. Thus, when executing code 97425 (that is implemented to include such centralized high density node communication management code 97000), the master node's processing unit 97400 may become unconventionally operative to perform operations or steps from the exemplary methods disclosed above, including method 9900 and variations of that method.

In summary and in light of the above description of the various embodiments, it should be emphasized that a sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments to better communicate with, manage, and locate nodes in a wireless node network or use such nodes and network elements as part of a hierarchical node network deployed in a logistics environment as a technical solution to various technical logistics problems. Moreover, those skilled in the art will understand that at least some of the exemplary embodiments disclosed herein may be used independently from one another and/or in combination with one another and may have applications to devices and methods not disclosed herein.

Those skilled in the art will also appreciate that embodiments may provide one or more advantages, and not all embodiments necessarily provide all or more than one particular advantage as set forth herein. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A method for motion-based management of a logistics container using one or more elements of a wireless node network including a container node, wherein the container node being associated with the logistics container and equipped with a motion sensor, the method comprising:
   detecting a motion status for the logistics container by the motion sensor of the container node associated with the logistics container;
   comparing, by the container node, the detected motion status to a prior motion status for the logistics container;
   identifying, by the container node, a changed motion condition for the logistics container based upon the comparison of the detected motion status and the prior motion status; and
   altering a motion-dependent broadcast profile for the container node based upon the changed motion condition for the logistics container,
   wherein the step of altering the motion-dependent broadcast profile further comprises revising, by the container node, at least one parameter of the motion-dependent broadcast profile to change how the container node communicates with a second node, the second node being one of the elements in the wireless node network and wherein the second node comprises a package ID node associated with a package maintained within the logistics container,
   and wherein the method further comprises transmitting, by the container node, a control message to the package ID node associated with the package maintained within the logistics container, the package ID node being within the package, attached to the package, a part of the package or embedded into the package, the control message providing instructional input to the package ID node that changes a communication profile for the package ID node relative to the identified changed motion condition of the logistics container wherein the instructional input further comprises having the package ID node shift to a sleep mode when the changed motion condition is detected by the container node as being a stationary motion status.

2. The method of claim 1, wherein the motion sensor comprises one from a group consisting of an inertial sensor, a shock detector, an accelerometer, and a microelectromechanical (MEMS) sensor.

3. The method of claim 1, wherein the motion sensor of the container node comprises a plurality of sensing elements.

4. The method of claim 3, wherein the logistics container comprises a housing portion and a door portion, the housing portion defining an interior storage area, wherein the door portion is coupled to the housing portion to secure the interior storage area when in a closed position and provide access to the interior storage area when in an open position;
   wherein at least one of the plurality of sensing elements is attached to the door portion and is operative to sense movement of the door portion; and
   wherein detecting the motion status by the motion sensor of the container node further comprises detecting movement from at least one of the plurality of sensing elements of the motion sensor.

5. The method of claim 1, wherein the detected motion status for the logistics container comprises at least one of a moving status, a stationary status, an accelerating status, and a decelerating status.

6. The method of claim 1, wherein the revising step further comprises changing how frequently the container node communicates with the second node based upon the revised parameter of the motion-dependent broadcast profile.

7. The method of claim 6, wherein the step of changing how frequently the container node communicates with the second node further comprises decreasing how frequently the container node communicates with the second node when the changed motion condition indicates the logistics container is at least one of stationary or decelerating.

8. The method of claim 7 further comprising increasing how frequently the container node communicates with the second node after the changed motion condition previously indicated the logistics container is at least one of stationary or decelerating but a current changed motion condition indicates the logistics container is at least one of moving or accelerating.

9. The method of claim 6, wherein the step of changing how frequently the container node communicates with the second node further comprises increasing how frequently the container node communicates with the second node when the changed motion condition indicates the logistics container is at least one of moving or accelerating.

10. The method of claim 1, wherein the revising step further comprises changing a power level of a signal broadcast by the container node based upon the revised parameter of the motion-dependent broadcast profile.

11. The method of claim 1, wherein the step of altering the motion-dependent broadcast profile comprises selecting from a plurality of communication mode profiles based upon the changed motion condition when the container node identifies the changed motion condition, wherein each of the plurality of communication mode profiles defines a different set of operational parameters used by the container node when broadcasts a signal in an attempt to communicate with a second node, the second node being one of the elements in the wireless node network.

12. The method of claim 1, further comprising notifying, by the container node, a second node as one of the elements in the wireless node network with a message related to the changed motion condition of the logistics container.

13. The method of claim 12, wherein the second node comprises at least one or a server, a master node, and a package ID node associated with a package maintained within the logistics container.

14. A motion sensing container node apparatus deployed within a logistics container and for use as one of a plurality of elements in a wireless node network, the container node apparatus comprising:

a node housing attached to the logistics container;
    a node processing unit disposed within the node housing;
    a memory storage disposed within the node housing and coupled to the node processing unit, the memory storage maintaining motion-based management code for execution by the node processing unit and a motion-dependent broadcast profile defining at least one operational communication parameter for the container node apparatus;
    a communication interface coupled to the node processing unit and operative to communicate with a second node over a communication path in accordance with the motion-dependent broadcast profile maintained in the memory storage, the second node being one of the elements in the wireless node network;
    a motion sensor coupled to the node processing unit, the motion sensor detecting a motion status of the logistics container and reporting the detected motion status to the node processing unit;
    wherein the node processing unit, when executing the motion-based management code maintained on the memory storage, is operative to
        receive the detected motion status from the motion sensor,
        store the detected motion status in the memory storage as a first motion status for the logistics container,
        receive a subsequent detected motion status from the motion sensor,
        compare the subsequent detected motion status to the first detected motion status for the logistics container,
        identify a changed motion condition for the logistics container based upon the comparison of the subsequent detected motion status and the first detected motion status,
        alter the operational communication parameter defined in the motion-dependent broadcast profile based upon the identified changed motion condition, and
        cause the communication interface to communicate with the second node in accordance with the altered operational communication parameter;
    wherein the communication interface is further operative to transmit a message to the second node in response to an input from the node processing unit, the message being related to the changed motion condition of the logistics container and wherein the communication interface comprises a short range interface operative to provide access to a package ID node as the second node, wherein the package ID node is associated with a package maintained within the logistics container and the package ID node is within the package, attached to the package, a part of the package or embedded into the package, and wherein the node processing unit is further operative to cause the short range interface to transmit a control message to the package ID node, the control message providing instructional input to the package ID node that alters operation of the package ID node based upon the identified changed motion condition of the logistics container wherein the instructional input further comprises having the package ID node shift to a sleep mode when the changed motion condition is detected by the container node as being a stationary motion status.

15. The apparatus of claim 14, wherein the motion sensor comprises one from a group consisting of an inertial sensor, a shock detector, an accelerometer, and a microelectromechanical (MEMS) sensor.

16. The apparatus of claim 14, wherein the motion sensor comprises a plurality of sensing elements.

17. The apparatus of claim 16, wherein the logistics container comprises a housing portion and a door portion, the housing portion defining an interior storage area, wherein the door portion is coupled to the housing portion to secure the interior storage area when in a closed position and provide access to the interior storage area when in an open position;
    wherein at least one of the plurality of sensing elements of the motion sensor is attached to the door portion of the logistics container and is operative to sense movement of the door portion; and
    wherein the motion sensor is operative to detect the motion status by detecting movement from at least one of the plurality of sensing elements of the motion sensor.

18. The apparatus of claim 14, wherein the detected motion status for the logistics container comprises at least one of a moving status, a stationary status, an accelerating status, and a decelerating status.

19. The apparatus of claim 14, wherein the node processing unit is operative to alter the operational communication parameter by being further operative to revise the operational communication parameter of the motion-dependent broadcast profile stored in the memory storage, wherein the revised operational communication parameter relates to how the container node communicates with the second node in accordance with the identified changed motion condition for the logistics container.

20. The apparatus of claim 19, wherein the revised operational communication parameter of the motion-dependent broadcast profile changes how frequently the node processing unit causes the communication interface to communicates with the second node.

21. The apparatus of claim 20, wherein the revised operational communication parameter of the motion-dependent broadcast profile decreases how frequently the node processing unit causes the communication interface to communicate with the second node when the changed motion condition indicates the logistics container is at least one of stationary or decelerating.

22. The apparatus of claim 21, wherein the node processing unit is further operative to change the revised operational communication parameter to increase how frequently the container node communicates with the second node after (a) the changed motion condition previously indicated the logistics container is at least one of stationary or decelerating and (b) a current changed motion condition indicates the logistics container is now at least one of moving or accelerating.

23. The apparatus of claim 20, wherein the revised operational communication parameter of the motion-dependent broadcast profile increases how frequently the node processing unit causes the communication interface to communicates with the second node when the changed motion condition indicates the logistics container is at least one of moving or accelerating.

24. The apparatus of claim 19, wherein the revised operational communication parameter of the motion-dependent broadcast profile changes a power level of a signal broadcast by the communication interface.

25. The apparatus of claim 14, wherein the motion-dependent broadcast profile maintained on the memory storage comprises a plurality of communication mode profiles, wherein each of the plurality of communication mode profiles defining respectively different variations of the operational communication parameter used by the communication interface when broadcasting a signal in an attempt to communicate with the second node.

* * * * *